(12) United States Patent
Foster et al.

(10) Patent No.: US 11,308,487 B1
(45) Date of Patent: Apr. 19, 2022

(54) SYSTEM, METHOD AND PROGRAM PRODUCT FOR OBTAINING DIGITAL ASSETS

(71) Applicant: Gemini IP, LLC, New York, NY (US)

(72) Inventors: Duncan Carl Cock Foster, New York, NY (US); Griffin Cock Foster, New York, NY (US); Cameron Howard Winklevoss, New York, NY (US); Tyler Howard Winklevoss, New York, NY (US)

(73) Assignee: Gemini IP, LLC, New York, NY (US)

( * ) Notice: Subject to any disclaimer, the term of this patent is extended or adjusted under 35 U.S.C. 154(b) by 115 days.

(21) Appl. No.: 16/687,230

(22) Filed: Nov. 18, 2019

Related U.S. Application Data

(63) Continuation-in-part of application No. 16/437,841, filed on Jun. 11, 2019, now Pat. No. 10,540,654, and a continuation-in-part of application No. 16/421,975, filed on May 24, 2019, now Pat. No. 10,540,653, which is a continuation of application No. 16/293,531, filed on Mar. 5, 2019, now Pat. No. 10,373,158, and a continuation-in-part of application No. 16/036,469, filed on Jul. 16, 2018, now Pat. No. 10,929,842, which is a continuation-in-part of
(Continued)

(51) Int. Cl.
| | |
|---|---|
| *G06Q 20/38* | (2012.01) |
| *G06Q 40/04* | (2012.01) |
| *G06Q 30/06* | (2012.01) |
| *G06Q 20/36* | (2012.01) |

(52) U.S. Cl.
CPC ....... *G06Q 20/3829* (2013.01); *G06Q 20/389* (2013.01); *G06Q 30/0609* (2013.01); *G06Q 40/04* (2013.01); *G06Q 20/3674* (2013.01); *G06Q 20/382* (2013.01)

(58) Field of Classification Search
None
See application file for complete search history.

(56) References Cited

U.S. PATENT DOCUMENTS

| | | |
|---|---|---|
| 4,790,431 A | 12/1988 | Reel et al. |
| 5,675,649 A | 10/1997 | Brennan et al. |
| (Continued) | | |

FOREIGN PATENT DOCUMENTS

| | | |
|---|---|---|
| CA | 2627540 A1 | 9/2009 |
| CN | 103927656 | 7/2014 |
| (Continued) | | |

OTHER PUBLICATIONS

Lucas Mearian "what's a smart contract (and how does it work)?", Jul. 29, 2019 (Year: 2019).*
(Continued)

*Primary Examiner* — Jacob C. Coppola
*Assistant Examiner* — Timothy Paul Sax
(74) *Attorney, Agent, or Firm* — Lee & Hayes, P.C.

(57) ABSTRACT

The present invention generally relates to the use of stable value digital assets and/or fiat-backed digital assets as cryptocurrencies that can be linked to other digital assets using blockchain technology and/or through a peer-to-peer network. In embodiments, the present invention relates to specific applications of non-fungible digital assets tied to a peer-to-peer network, such as a blockchain network.

73 Claims, 138 Drawing Sheets

Related U.S. Application Data application No. 16/020,534, filed on Jun. 27, 2018, now Pat. No. 10,373,129, which is a continuation-in-part of application No. 15/960,040, filed on Apr. 23, 2018, now Pat. No. 10,438,290, said application No. 16/293,531 is a continuation-in-part of application No. 15/960,040, filed on Apr. 23, 2018, now Pat. No. 10,438,290, said application No. 16/293,531 is a continuation-in-part of application No. 16/020,534, filed on Jun. 27, 2018, now Pat. No. 10,373,129, said application No. 16/293,531 is a continuation-in-part of application No. 16/282,955, filed on Feb. 22, 2019, which is a continuation-in-part of application No. 16/280,788, filed on Feb. 20, 2019, now Pat. No. 11,139,955, which is a continuation-in-part of application No. 15/973,140, filed on May 7, 2018, now abandoned, and a continuation-in-part of application No. 15/960,040, filed on Apr. 23, 2018, now Pat. No. 10,438,290, and a continuation-in-part of application No. 15/973,175, filed on May 7, 2018, now abandoned, said application No. 16/280,788 is a continuation-in-part of application No. 15/920,042, filed on Mar. 13, 2018.

(60) Provisional application No. 62/728,441, filed on Sep. 7, 2018, provisional application No. 62/721,983, filed on Aug. 23, 2018, provisional application No. 62/764,977, filed on Aug. 17, 2018, provisional application No. 62/689,563, filed on Jun. 25, 2018, provisional application No. 62/683,412, filed on Jun. 11, 2018, provisional application No. 62/660,655, filed on Apr. 20, 2018, provisional application No. 62/647,353, filed on Mar. 23, 2018, provisional application No. 62/638,679, filed on Mar. 5, 2018, provisional application No. 62/642,931, filed on Mar. 14, 2018, provisional application No. 62/642,946, filed on Mar. 14, 2018, provisional application No. 62/629,417, filed on Feb. 12, 2018, provisional application No. 62/680,775, filed on Jun. 5, 2018, provisional application No. 62/684,023, filed on Jun. 12, 2018, provisional application No. 62/702,265, filed on Jul. 23, 2018, provisional application No. 62/764,978, filed on Aug. 17, 2018, provisional application No. 62/732,347, filed on Sep. 17, 2018.

(56) References Cited

U.S. PATENT DOCUMENTS

| | | | |
|---|---|---|---|
| 5,799,287 | A | 8/1998 | Dembo |
| 5,950,176 | A | 9/1999 | Keiser et al. |
| 6,021,257 | A | 2/2000 | Chikauchi |
| 6,157,920 | A | 12/2000 | Jakobsson et al. |
| 6,505,174 | B1 | 1/2003 | Keiser et al. |
| 6,523,012 | B1 | 2/2003 | Glassman et al. |
| 6,583,712 | B1 | 6/2003 | Reed et al. |
| 7,136,834 | B1 | 11/2006 | Adcock et al. |
| 7,167,565 | B2 | 1/2007 | Rajasekaran |
| 7,308,428 | B1 | 12/2007 | Federspiel et al. |
| 7,330,538 | B2 | 2/2008 | Dunsmuir |
| 7,356,500 | B1 | 4/2008 | Waelbroeck et al. |
| 7,391,865 | B2 | 6/2008 | Orsini et al. |
| 7,428,506 | B2 | 9/2008 | Waelbroeck et al. |
| 7,487,123 | B1 | 2/2009 | Keiser et al. |
| 7,565,313 | B2 | 7/2009 | Waelbroeck et al. |
| 7,647,264 | B2 | 1/2010 | Hatheway et al. |
| 7,677,974 | B2 | 3/2010 | Van Luchene |
| 7,680,715 | B2 | 3/2010 | Waelbroeck et al. |
| 7,685,052 | B2 | 3/2010 | Waelbroeck et al. |
| 7,693,775 | B2 | 4/2010 | Korhammer et al. |
| 7,716,484 | B1 | 5/2010 | Kaliski, Jr. |
| 7,747,515 | B1 | 6/2010 | Merrin et al. |
| 7,769,678 | B2 | 8/2010 | Toffey |
| 7,778,919 | B2 | 8/2010 | Waelbroeck et al. |
| 7,814,000 | B2 | 10/2010 | Waelbroeck et al. |
| 7,831,507 | B2 | 11/2010 | Merrin et al. |
| 7,848,991 | B1 | 12/2010 | Buck |
| 7,848,993 | B1 | 12/2010 | Buck |
| 7,865,425 | B2 | 1/2011 | Waelbroeck et al. |
| 7,870,058 | B2 | 1/2011 | Maltzman |
| 7,870,059 | B2 | 1/2011 | Shapiro et al. |
| 7,870,062 | B2 | 1/2011 | Waelbroeck et al. |
| 7,873,573 | B2 | 1/2011 | Realini |
| 7,877,318 | B2 | 1/2011 | Shapiro et al. |
| 7,882,013 | B2 | 2/2011 | Shapiro et al. |
| 7,882,014 | B2 | 2/2011 | Shapiro et al. |
| 7,882,015 | B2 | 2/2011 | Shapiro et al. |
| 7,890,417 | B2 | 2/2011 | Hanson et al. |
| 7,895,112 | B2 | 2/2011 | Richmann et al. |
| 7,899,726 | B2 | 3/2011 | Harris |
| 7,904,376 | B2 | 3/2011 | Shapiro et al. |
| 7,908,203 | B2 | 3/2011 | Shapiro et al. |
| 7,908,205 | B2 | 3/2011 | Waelbroeck et al. |
| 7,908,206 | B2 | 3/2011 | Waelbroeck et al. |
| 7,917,425 | B2 | 3/2011 | Waelbroeck et al. |
| 7,933,827 | B2 | 4/2011 | Richmann et al. |
| 7,996,261 | B1 | 8/2011 | Waelbroeck et al. |
| 7,999,748 | B2 | 8/2011 | Ligtenberg et al. |
| 8,005,743 | B2 | 8/2011 | Tupper et al. |
| 8,010,438 | B2 | 8/2011 | Waelbroeck et al. |
| 8,015,099 | B2 | 9/2011 | Reid |
| 8,019,665 | B2 | 9/2011 | Hausman |
| 8,041,628 | B2 | 10/2011 | Waelbroeck et al. |
| 8,046,290 | B2 | 10/2011 | Fitzpatrick et al. |
| 8,055,576 | B2 | 11/2011 | Merrin et al. |
| 8,065,217 | B2 | 11/2011 | Beddis |
| 8,069,106 | B2 | 11/2011 | Waelbroeck et al. |
| 8,073,763 | B1 | 12/2011 | Merrin et al. |
| 8,082,205 | B2 | 12/2011 | Lutnick et al. |
| 8,095,455 | B2 | 1/2012 | Shapiro et al. |
| 8,095,456 | B2 | 1/2012 | Waelbroeck et al. |
| 8,103,579 | B1 | 1/2012 | Berkeley, III et al. |
| 8,108,278 | B2 | 1/2012 | Tzekin et al. |
| 8,108,283 | B2 | 1/2012 | Dimitri et al. |
| 8,108,299 | B1 | 1/2012 | Waelbroeck et al. |
| 8,117,105 | B2 | 2/2012 | Ford et al. |
| 8,117,609 | B2 | 2/2012 | Lantz et al. |
| 8,139,770 | B2 | 3/2012 | Zheng et al. |
| 8,156,036 | B1 | 4/2012 | Waelbroeck et al. |
| 8,165,954 | B2 | 4/2012 | Waelbroeck et al. |
| 8,224,702 | B2 | 7/2012 | Mengerink et al. |
| 8,229,855 | B2 | 7/2012 | Huang et al. |
| 8,229,859 | B2 | 7/2012 | Samid |
| 8,239,330 | B2 | 8/2012 | Montero et al. |
| 8,244,622 | B2 | 8/2012 | Hughes, Jr. et al. |
| 8,249,965 | B2 | 8/2012 | Tumminaro |
| 8,255,297 | B2 | 8/2012 | Morgenstern et al. |
| 8,266,045 | B2 | 9/2012 | Waelbroeck et al. |
| 8,271,375 | B2 | 9/2012 | Mahoney et al. |
| 8,275,692 | B2 | 9/2012 | Cartledge et al. |
| 8,280,797 | B2 | 10/2012 | Hatheway et al. |
| 8,285,629 | B2 | 10/2012 | Lutnick et al. |
| 8,301,542 | B2 | 10/2012 | Adcock et al. |
| 8,306,910 | B2 | 11/2012 | Wilkes |
| 8,311,920 | B2 | 11/2012 | Lutnick et al. |
| 8,321,323 | B2 | 11/2012 | Lutnick et al. |
| 8,326,751 | B2 | 12/2012 | Driemeyer et al. |
| 8,346,651 | B2 | 1/2013 | Freitas et al. |
| 8,352,326 | B2 | 1/2013 | Betzler et al. |
| 8,359,253 | B2 | 1/2013 | Waelbroeck et al. |
| 8,359,260 | B2 | 1/2013 | Merrin et al. |
| 8,380,612 | B2 | 2/2013 | Hanson et al. |
| 8,386,362 | B2 | 2/2013 | Failla et al. |
| 8,386,373 | B2 | 2/2013 | Fitzpatrick et al. |
| 8,452,703 | B2 | 5/2013 | O'Leary et al. |
| 8,494,949 | B2 | 7/2013 | Gilbert et al. |
| 8,515,857 | B2 | 8/2013 | Lutnick et al. |
| 8,521,627 | B2 | 8/2013 | Ford et al. |

(56) References Cited

U.S. PATENT DOCUMENTS

| | | |
|---|---|---|
| 8,548,898 B2 | 10/2013 | Merrin et al. |
| 8,560,431 B2 | 10/2013 | Lutnick et al. |
| 8,566,213 B2 | 10/2013 | Sweeting et al. |
| 8,577,772 B2 | 11/2013 | Heckman et al. |
| 8,583,544 B2 | 11/2013 | Ford et al. |
| 8,606,685 B2 | 12/2013 | Keiser et al. |
| 8,620,759 B1 | 12/2013 | Virgilio et al. |
| 8,630,951 B2 | 1/2014 | Wilkes |
| 8,635,144 B2 | 1/2014 | Waelbroeck et al. |
| 8,688,525 B2 | 4/2014 | Minde |
| 8,688,563 B2 | 4/2014 | Mehew et al. |
| 8,712,903 B2 | 4/2014 | Lutnick et al. |
| 8,712,914 B2 | 4/2014 | Lyons et al. |
| 8,719,131 B1 | 5/2014 | Roth et al. |
| 8,732,065 B1 | 5/2014 | Hayes, Jr. |
| 8,744,952 B2 | 6/2014 | Mortimer et al. |
| 8,744,954 B2 | 6/2014 | Buck |
| 8,751,362 B1 | 6/2014 | Lutnick |
| 8,768,819 B2 | 7/2014 | Lutnick et al. |
| 8,775,298 B2 | 7/2014 | Waelbroeck et al. |
| 8,886,561 B2 | 11/2014 | Gilbert et al. |
| 8,959,031 B2 | 2/2015 | Merrin et al. |
| 8,977,565 B2 | 3/2015 | Alderucci et al. |
| 9,064,256 B2 | 6/2015 | Foley et al. |
| 9,704,143 B2 | 7/2017 | Walker et al. |
| 9,727,909 B2 | 8/2017 | Mackay |
| 9,794,074 B2 | 10/2017 | Toll et al. |
| 9,811,869 B2 | 11/2017 | Wilson et al. |
| 10,026,082 B2 | 7/2018 | Davis |
| 10,084,762 B2 | 9/2018 | Versteeg et al. |
| 10,146,792 B1 | 12/2018 | Dobrek et al. |
| 10,269,084 B2 | 4/2019 | Wilson et al. |
| 10,540,639 B2 | 1/2020 | Brock et al. |
| 2002/0143614 A1 | 10/2002 | MacLean et al. |
| 2002/0171546 A1 | 11/2002 | Evans et al. |
| 2003/0009413 A1 | 1/2003 | Furbush et al. |
| 2003/0014749 A1 | 1/2003 | Simons et al. |
| 2003/0225672 A1 | 12/2003 | Hughes et al. |
| 2004/0049464 A1 | 3/2004 | Ohmori et al. |
| 2004/0143710 A1 | 7/2004 | Walmsley |
| 2004/0193657 A1 | 9/2004 | Saito et al. |
| 2004/0243488 A1 | 12/2004 | Yamamoto et al. |
| 2005/0044022 A1 | 2/2005 | Spirgel et al. |
| 2005/0240510 A1 | 10/2005 | Schweickert et al. |
| 2007/0117615 A1 | 5/2007 | Van Luchene |
| 2007/0146797 A1 | 6/2007 | Sakai et al. |
| 2007/0219869 A1 | 9/2007 | Haines et al. |
| 2007/0271455 A1 | 11/2007 | Nakano et al. |
| 2008/0109280 A1 | 5/2008 | Csoka |
| 2008/0120221 A1 | 5/2008 | Toneguzzo |
| 2008/0140578 A1 | 6/2008 | Felt et al. |
| 2008/0167965 A1 | 7/2008 | Von Nothaus et al. |
| 2008/0215474 A1 | 9/2008 | Graham et al. |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0119200 A1 | 5/2009 | Riviere |
| 2009/0132830 A1 | 5/2009 | Haga et al. |
| 2009/0265268 A1 | 10/2009 | Huang et al. |
| 2010/0094771 A1 | 4/2010 | VanderPal |
| 2010/0174646 A1 | 7/2010 | Cole et al. |
| 2010/0228674 A1 | 9/2010 | Ogg et al. |
| 2010/0250360 A1 | 9/2010 | Ball et al. |
| 2010/0306084 A1 | 12/2010 | Ciptawilangga |
| 2011/0110516 A1 | 5/2011 | Satoh |
| 2011/0112662 A1 | 5/2011 | Thompson et al. |
| 2011/0231913 A1 | 9/2011 | Feng et al. |
| 2011/0270748 A1 | 11/2011 | Graham, III et al. |
| 2011/0302412 A1 | 12/2011 | Deng et al. |
| 2012/0078693 A1 | 3/2012 | Wilkes |
| 2012/0101886 A1 | 4/2012 | Subramanian et al. |
| 2012/0123924 A1 | 5/2012 | Rose et al. |
| 2012/0185395 A1 | 7/2012 | Wilkes |
| 2012/0239543 A1 | 9/2012 | Ryan |
| 2012/0278200 A1 | 11/2012 | van Coppenolle et al. |
| 2013/0036373 A1 | 2/2013 | Alderfer et al. |
| 2013/0041773 A1 | 2/2013 | Muse |
| 2013/0054471 A1 | 2/2013 | Samid |
| 2013/0061049 A1 | 3/2013 | Irvine |
| 2013/0159699 A1 | 6/2013 | Torkkel |
| 2013/0166455 A1 | 6/2013 | Feigelson |
| 2013/0191277 A1 | 7/2013 | O'Leary et al. |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary et al. |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1 | 5/2014 | Endo et al. |
| 2014/0141869 A1 | 5/2014 | Shore |
| 2014/0156497 A1 | 6/2014 | Mehew et al. |
| 2014/0164251 A1 | 6/2014 | Loh |
| 2014/0233740 A1 | 8/2014 | Niamut et al. |
| 2014/0310527 A1 | 10/2014 | Veugen et al. |
| 2014/0344015 A1 | 11/2014 | Puertolas-Montanes et al. |
| 2014/0359291 A1 | 12/2014 | Wilson et al. |
| 2015/0033301 A1 | 1/2015 | Pianese |
| 2015/0120567 A1 | 4/2015 | Van Rooyen et al. |
| 2015/0120569 A1 | 4/2015 | Belshe |
| 2015/0170112 A1 | 6/2015 | DeCastro |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik |
| 2015/0262168 A1 | 9/2015 | Armstrong |
| 2015/0262171 A1 | 9/2015 | Langschaedel |
| 2015/0262172 A1 | 9/2015 | Rebernik |
| 2015/0262173 A1 | 9/2015 | Durbin et al. |
| 2015/0262176 A1 | 9/2015 | Langschaedel |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |
| 2015/0348169 A1 | 12/2015 | Harris et al. |
| 2015/0356523 A1 | 12/2015 | Madden |
| 2015/0356555 A1 | 12/2015 | Pennanen |
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0027229 A1 | 1/2016 | Spanos et al. |
| 2016/0028552 A1 | 1/2016 | Spanos et al. |
| 2016/0078219 A1 | 3/2016 | Hernan |
| 2016/0080156 A1 | 3/2016 | Kaliski, Jr. et al. |
| 2016/0086187 A1 | 3/2016 | Joao |
| 2016/0092988 A1 | 3/2016 | Letourneau |
| 2016/0112200 A1 | 4/2016 | Kheterpal et al. |
| 2016/0125040 A1 | 5/2016 | Kheterpal et al. |
| 2016/0162873 A1 | 6/2016 | Zhou et al. |
| 2016/0203448 A1 | 7/2016 | Metnick et al. |
| 2017/0005804 A1 | 1/2017 | Zinder |
| 2017/0017955 A1 | 1/2017 | Stern et al. |
| 2017/0091750 A1 | 3/2017 | Maim |
| 2017/0124535 A1 | 5/2017 | Juels et al. |
| 2017/0132630 A1 | 5/2017 | Castinado |
| 2017/0154331 A1 | 6/2017 | Voorhees |
| 2017/0293898 A1 | 10/2017 | Rampton |
| 2018/0025455 A1 | 1/2018 | Wilson et al. |
| 2018/0068359 A1 | 3/2018 | Preston et al. |
| 2018/0089758 A1 | 3/2018 | Stradling et al. |
| 2018/0089759 A1 | 3/2018 | Stradling et al. |

(56) References Cited

U.S. PATENT DOCUMENTS

| | | | |
|---|---|---|---|
| 2018/0089760 A1 | 3/2018 | Stradling et al. | |
| 2018/0089761 A1 | 3/2018 | Stradling et al. | |
| 2018/0091316 A1 | 3/2018 | Stradling et al. | |
| 2018/0204192 A1 | 7/2018 | Whaley et al. | |
| 2018/0225660 A1* | 8/2018 | Chapman | G06Q 20/3827 |
| 2018/0367298 A1 | 12/2018 | Wilson et al. | |
| 2019/0043048 A1 | 2/2019 | Wilson et al. | |
| 2019/0050541 A1 | 2/2019 | Wilson et al. | |
| 2019/0050832 A1 | 2/2019 | Wilson et al. | |
| 2019/0052454 A1 | 2/2019 | Wilson et al. | |
| 2019/0052458 A1 | 2/2019 | Wilson et al. | |
| 2019/0057211 A1 | 2/2019 | Wilson et al. | |
| 2019/0057362 A1 | 2/2019 | Wilson et al. | |
| 2019/0057382 A1 | 2/2019 | Wilson et al. | |
| 2019/0058592 A1 | 2/2019 | Wilson et al. | |
| 2019/0058600 A1 | 2/2019 | Wilson et al. | |
| 2019/0058733 A1 | 2/2019 | Wilson et al. | |
| 2019/0066065 A1 | 2/2019 | Wilson et al. | |
| 2019/0066228 A1 | 2/2019 | Wilson et al. | |
| 2019/0068365 A1 | 2/2019 | Wilson et al. | |
| 2019/0073646 A1 | 3/2019 | Wilson et al. | |
| 2019/0095880 A1 | 3/2019 | Glover et al. | |
| 2019/0095909 A1 | 3/2019 | Wilson et al. | |
| 2019/0102758 A1 | 4/2019 | Wilson et al. | |
| 2019/0116024 A1 | 4/2019 | Wilson et al. | |
| 2019/0130391 A1 | 5/2019 | Wright et al. | |
| 2019/0130399 A1 | 5/2019 | Wright et al. | |
| 2019/0220836 A1* | 7/2019 | Caldwell | G06Q 20/3829 |
| 2019/0236564 A1 | 8/2019 | Cantrell et al. | |
| 2020/0143367 A1* | 5/2020 | LeBeau | G06Q 20/3829 |
| 2020/0167769 A1* | 5/2020 | Green | G06Q 20/389 |
| 2020/0327609 A1* | 10/2020 | Dubrofsky | G06Q 20/0658 |
| 2020/0380476 A1* | 12/2020 | Trudeau | G06Q 20/0655 |
| 2021/0357489 A1* | 11/2021 | Tali | G06F 21/32 |

FOREIGN PATENT DOCUMENTS

| | | |
|---|---|---|
| EP | 2634738 A1 | 4/2013 |
| WO | WO 00/26745 | 5/2000 |
| WO | WO2000026745 A2 | 5/2000 |
| WO | WO 01/67409 | 9/2001 |
| WO | WO 01/86373 | 11/2001 |
| WO | WO 2008/127428 | 10/2008 |
| WO | WO2011008630 | 1/2011 |
| WO | WO2013034278 A2 | 3/2013 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | 2016-015041 A1 | 1/2016 |
| WO | WO 2016/088659 | 1/2016 |
| WO | WO 2016/022864 | 2/2016 |
| WO | WO 2016/029119 | 2/2016 |

OTHER PUBLICATIONS

[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).

2-of-3 Paper Wallets, Bitcoin Forum (published Jan. 29, 2013), https://bitcointalk.org/index.php?topic=139625. msg1487254 (last visited Dec. 4, 2013).

A Physical Price Tag For A Digital Currency. Introducing Bittag., BitTag, http://bittag.net/ (last visited Feb. 5, 2014).

A powerful trading platform for Bitcoin traders, BTXTrader.com (Aug. 13, 2013) Internet Archive, https://web.archive.org/web/20130813052513/http://www.btxtrader.com/.

About Bitcoin, Bitcoin.org (May 2, 2013) Internet Archive, http://web.archive.org/web/20130502214154/http://bitcoin.org/en/about.

An Open Source P2P Digital Currency, Bitcoin.org, http://bitcoin.org/en/ (last visited Jul. 22, 2013).

Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).

Bitcoin Fund Exclusively Available On EXANTE's Platform, EXANTE, https://exante.eu/press/news/266/ (last visited Oct. 10, 2013).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (last visited Dec. 5, 2013).

Bitcoin, Wikipedia (Jun. 24, 2013), Internet Archive http://web.archive.org/web/20130624030646/http://en.wikipedia.org/wiki/Bitcoin.

Bitcoinaverage code repository, GitHub, https://github.com/bitcoinaverage/bitcoinaverage/commits/master?page=134 (last visited Feb. 24, 2014).

BitcoinAverage.com—independent bitcoin price, Bitcoin Forum, https://bitcointalk.org/index.php?topic=270190.0 (last visited Feb. 24, 2014).

BitcoinAverage.Com, Reddit, http://www.reddit.com/r/Bitcoin/comments/1jl9c2/ (last visited Feb. 24, 2014).

Bitcoin's First Kiosk, Robocoin (Jul. 2, 2013) Internet Archive, https://web.archive.org/web/20130702171110/https://robocoinkiosk.com/.

Bitcoin's First Real ATM, Robocoin Blog, http://blog.robocoinkiosk.com/ (last visited Nov. 11, 2013).

Bitflash Weekly Review (Apr. 14, 2014), Pantera, https://panteracapital.com/bitflash/ (last visited Apr. 15, 2014).

Bob Sullivan, 'Deadbeat bidders' dog eBay sellers, NBCNews.com (published Sep. 5,2002), http://www.nbcnews.com/id/3078738/ns/technology_and_sciencetech_and_gadgets/t/deadbeat-bidders-dog-ebay-sellers/#.U4inz_IdXuS (last visited May 30, 2014).

Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).

Buying and Selling Linden Dollars, Second Life, http://community.secondlife.com/t5/English-Knowledge-Base/Buying-and-selling-Linden-dollars/ta-p/700107 (last visited Dec. 9, 2013).

Charts, Bitcoin Charts (May 10, 2013) Internet Archive, https://web.archive.org/web/20130510172057/http://bitcoincharts.com/charts/.

Choose Your Wallet, Bitcoin.org (May 30, 2013) Internet Archive, http://web.archive.org/web/20130530072551/http://bitcoin.org/en/choose-your-wallet.

Circle (May 19, 2 014) Internet Archive, https://web.archive.org/web/20140519175717/https://www.circle.com/.

Coinbase, Bitcoin Wallet (Jul. 22, 2013) Internet Archive, http://web.archive.org/web/20130722200359/https://coinbase.com/.

Coinbase, Bitcoin Wallet, https://coinbase.com/ (last visited Aug. 15, 2013).

CoinDesk Bitcoin Price Index, CoinDesk, http://www.coindesk.com/price/ (last visited Oct. 23, 2013).

Coindesk, This week we released the first version of our mobile app on iPhone, Twitter (published May 2, 2014), https://twitter.com/coindesk/status/462255287177453568?refsrc=email (last visited May 5, 2014).

Durnford, Barter network aims to help Mile End's cash-strapped live well, The Gazette [Montreal, Que] (Jan. 23, 1996).

Electrum, Bitcoin wiki, https://en.bitcoin.it/wiki/Electrum (last visited Jul. 22, 2013).

Elliptic Vault Secure, Worry-free Storage for Your Bitcoins, Elliptic.co (Jan. 12, 2014) Internet Archive, https://web.archive.org/web/20140112043128/https://www.elliptic.co/vault.

FAQ: What's the Difference Between PPCoin and Bitcoin?, GitHub, https://github.com/ppcoin/ppcoin/wiki/FAQ (last visited Jul. 22, 2013).

First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-currency-exchange-coinqxcom-in-beta-2014-05-21 (last visited May 21, 2014).

(56) References Cited

OTHER PUBLICATIONS

How Bitcoin Works Under the Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, Next (published Jan. 1999), http://cryptome.org/jya/digicrash.htm (last visited Jan. 9, 2014).
How Does Bitcoin Work?, Bitcoin.org, (May 1, 2013) Internet Archive, http://web.archive.org/web/20130501092121/http://bitcoin.org/en/how-it-works.
How is Mt.Gox weighted average calculated?, Bitcoin Forum (Mar. 18, 2013), https://bitcointalk.org/index.php?topic=154548.0 (last visited Jul. 25, 2013).
Ina Steiner, eBay Mulls New Feature to Eliminate Deadbeat Bidders, Ecommerce Bytes Blog (published May 12, 2012), http://www.ecommercebytes.com/C/blog/blog.pl?/pl/2012/5/1336831866.html (last visited May 30, 2014).
Independent Bitcoin Price, BitcoinAverage, https://bitcoinaverage.com/explain.htm (last visited Mar. 4, 2014).
Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).
James Ball, Meet the seven people who hold the keys to worldwide internet security, The Guardian, http://www.theguardian.com/technology/2014/feb/28/seven-people-keys-worldwide-internet-security-web (last visited Mar. 7, 2014).
Jeremy Allaire, What We Have Been Up to at Circle, The Circle Blog (May 19, 2014) Internet Archive, https://web.archive.org/web/20140519162958/https://www.circle.com/2014/05/15/circle-update/.
Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable-lrue.
John Biggs, Xapo Raises $20 Million ro Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).
Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Larry Ren, Proof of Stake Velocity: Building the Social Currency of the Digital Age, www.reddcoin.com (Apr. 2014).
Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).
Markets API, Bitcoin Charts (Jun. 3, 2013) Internet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
Writing Upgradable Smart Contracts in Solidity Narayan Prusty @narayanprusty—qnimate com (Accessed Jun. 8, 2018) 9 pgs., http://qnimate.com/writing-upgradable-smart-contracts-in-ethereum/, Internet.

Japanese Banks to Harness Ripple DLT for Consumer Payments App, Wolfie Zhao, CoinDesk (Mar. 7, 2018) https://qww.coindesk.com/japanese-banks-to-harness-ripple-dlt-for-consumer-payments-app/?ct=Sailthru_BI_Newsletters&mt=8&nr_email_referer=1%E2%80%A6, Internet.
Introducing Compound, the Money Market Protocol, Robert Leshner, Medium.com (Jan. 30, 2018) https://medium.com/compound-finance/introducing-compound-the-money-market-protocol-4b9546bac87, Internet.
LeviarCoin Announces Crowdsale for Its Revolutionary Blockchain-Based In-App Purchases and Software Protection Platform—LeviarCoin (Jun. 2, 2017) https://www.prnewswire.com/news-releases/leviarcoin-announces-crowdsale-for-ts-revolutionary-blockchain-based-in-app-purchases-and-software-protection-platform-300468062.html, Internet.
Leviar—An Anonymous, Secure and Private Cryptocurency—Leviar Coin, 16 pgs.
Goldman Sachs files patent for virtual settlement currency—Jennifer Hughes, Financial Times (Dec. 3, 2015) https://www.ft.com/content/b0d8f614-997c-11e5-9228-87e603d47bdc, Internet.
Money Services Business (MSB) Registration for TrueUSD, TrustToken Team, www.trusttoken.com (Accessed Apr. 16, 2018) https://blog.trusttoken.com/money-services-business-msb-registration-for-trueusd-b0a5fc1ee673, Internet.
TrueCoin is registering as a Money Service Business (MSB), TrustToken Team, www.trusttoken.com (Accessed Apr. 16, 2018) https://blog.trusttoken.com/truecoin-is-registering-as-a-money-service-business-msb-866c25561675, Internet.
TrueUSD, the world's first legally-backed stable cryptocurrency, is now trading on Bittrex, TrustToken Team, www.trusttoken.com (Accessed Apr. 16, 2018) https://blog.trusttoken.com/trueusd-the-worlds-first-legally-backed-stable-cryptocurrency-is-now-trading-on-bittrex-6a49b621f058, Internet.
Trueusd, the world's only stable cryptocurrency redeemable for USD, is now tradeable with Ether on Bittrex, TrustToken Team, www.tmsttoken.com (Accessed Apr. 16, 2018) https://blog.trusttoken.com/trueusd-the-worlds-first-egally-backed-stable-cryptocurrency-is-now-tradeable-with-ether-on-5ab45091314e, Internet.
Who are the correspondent banks and trustee partners for TrueUSD?, TrustToken Team, www.trusttoken.com (Accessed Apr. 16, 2018) https://blog.trusttoken.com/who-are-the-correspondent-banks-and-trustee-partners-for-trueusd-e12508f0d5a2, Internet.
Rafael Cosman, https://www.facebook.com/rafaelCosman, Internet, accessed Apr. 16, 2018, 14 pgs., Facebook, Internet.
Erin Hobey, Co-Founder Rafael Cosman: TrustToken is an Asset Tokenization Platform Backed by Real Assets that Democratize Access Both to Investment Opportunities & Capital, https://www.crowdfundinsider.com/2018/02/128365-interview-trusttoken-rafael/, Feb. 20, 2018 @ 12:30 p.m.—accessed Apr. 16, 2018, 10 pgs., Internet.
TrustProtocol, Commits—trusttoken/TrustProtocol—GitHub, https://github.com/trusttoken/TrustProtocol/commits/master?after=54f8673366f8dc79cbf4f2aa3e9416bb7c18150d+34, 1 pg., accessed Apr. 16, 2018, Internet.
Patent Application Full Text and Image Database, Results of Search in PGPUB Production Database Mar. 15-Sep. 30, 2001 for: IN/"Cosman; Rafael," 1 pg., U.S. Patent & Trademark Office.
Rafael Cosman, Rafael Cosman (@RafaelCosman) | Twitter, https://twitter.com/rafaelcosman?lang=en, accessed Apr. 16, 2018, 23 pgs., Internet.
Rafael Cosman, RafaelCosman (Rafael Cosman) / Repositories—GitHub, https://github.com/RafaelCosman?page=2&tab=repositories, accessed Apr. 16, 2018, 3 pgs., Internet.
Rafael Cosman, RafaelCosman (Rafael Cosman) / Repositories—GitHub, https://github.com/RafaelCosman?tab=repositories, accessed Apr. 16, 2018, 4 pgs, Internet.
Rafael Cosman, RafaelCosman (Rafael Cosman)—GitHub, https://github.com/RafaelCosman, accessed Apr. 16, 2018, 1 pg., Internet.
Rafael Cosman, Deep Dive with Rafael Cosman, CTO & Cofounder TrustToken, https://www.tokendaily.co/p/deep-dive-with-rafael-cosman-cto-cofounder-trusttoken, accessed Apr. 16, 2018, 5 pgs., Token Daily, Internet.

(56) References Cited

OTHER PUBLICATIONS

Stephen Kade, TrueUSD: A Stablecoin That You Can Redeem 1-for-1 for US Dollars, https://blog.trusttoken.com/trueusd-a-usd-backed-stablecoin-you-can-trust-9688796cfd0d, Jan. 23, 2018—accessed Apr. 16, 2018, 9 pgs., Internet.
Trusttoken, Tokenization you can Trust, https://twitter.com/TrustToken, accessed Apr. 16, 2018, 18 pgs., TrustToken (@TrustToken) | Twitter, Internet.
Trusttoken, Introducing Crunchbase Pro, https://www.crunchbase.eom/organization/trusttoken#section-overview, accessed Apr. 16, 2018, 1 pg., TrustToken | Crunchbase, Internet.
Trusttoken, Tokenization you can Trust, https://github.com/trusttoken, accessed Apr. 16, 2018, 2 pgs., TrustToken—GitHub, Internet.
Trusttoken, Executive Summary, https://docsend.com/view/ws6tkvs, Feb. 14, 2018 (accessed Apr. 16, 2018) 7 pgs., Version 0.61, TrustToken, Internet.
Techrecaps, TrustToken Private and Public Pre-Sale FAQ, https://hackernoon.com/trusttoken-launches-trueusd-stablecoin-on-bittrex-exchange-f506ac5cf6fc, Mar. 8, 2018 (accessed Apr. 16, 2018) 4 pgs., TrustToken, Internet.
Trusttoken Team, TrustToken Launches TrueUSD Stablecoin on Bittrex Exchange, https://blog.trusttoken.com/trusttoken-pre-sale-and-main-sale-faq-f7914f74fb6d, Feb. 15, 2018 (accessed Apr. 16, 2018) 5 pgs., TrustToken, Internet.
Cosmos, A Network of Distributed Ledgers, Jae Kwon and Ethan Buchman, https://cosmos.network/resources/whitepaper, (accessed May 29, 2018) Whitepaper—Resources—Cosmos Network, Internet.
The Security Token Thesis—Hacker Noon, Stephen McKeon, https://hackernoon.com/the-security-token-thesis-4c5904761063, (Accessed May 29, 2018), Hackernoon.com, Internet.
Compound: The Money Market Protocol—Version 0.2 (Feb. 2018) Robert Leshner, Geoffrey Hayes, 10 pgs., https://compound.finance, Internet.
Interledger Architecture | Interledger (Accessed May 29, 2018), 11 pgs. https://interledger.org/rfcs/0001-interledger-architecture/draft-2.html, Internet.
JPMorgan Has Big Plans for Blockchain by Rakesh Sharma, May 10, 2018, Investopedia, 6 pgs., https://www.investopedia.com/news/jpmorgan-has-big-plans-blockchain/, Internet.
JPMorgan Trial Puts Debt Issuance on a Blockchain, Sujha Sundararajan, CoinDesk, (Apr. 10, 2018) 8 pgs., https://www.coindesk.com/jpmorgan-trial-puts-debt-issuance-on-a-blockchain/, Internet.
Polkadot paper, Dr. Gavin Wood, Version: 1 (Sep. 20, 2017).
John McCrank—UK-based Coinfloor to launch physically settled bitcoin futures—Reuters (Accessed Jun. 18, 2018 )2 pgs., https://uk.reuters.com/article/uk-crypto-currencies-coinfloor/uk-based-coinfloor-to-launch-physically-settled-bitcoin-futures-idUKKCNGQ2DF, Internet.
Cosmos, A Network of Distributed Ledgers, Jae Kwon and Ethan Buchman, Cosmos Network (Accessed May 29, 2018) Internet, https://cosmos.network/resources/whitepaper.
Burnable Token, OpenZeppelin.org (accessed Jun. 18, 2018) https://openzeppelin.org/api/docs/tokenERC20BurnableToken html, 2 pages.
Coinbase Custody is Officially Open for Business, The Coinbase Blog, Sam McIngvale (July 2) https://blog.coinbase.com/coinbase-custody-is-officially-open-for-business-182c297d65d9, 4 pages.
Coinbase Custody—coinbase.com (retrieved Jul. 9, 2018) https://custody.coinbase.com/, 3 pages.
Dapp-bin/wallet.sol at mastet—ethereum/dapp-bin—GutHub (retrieved Jun. 21, 2018) https:github.com/ethereum/fapp-bin/blob/master/wallet/wallet.sol, 7 pages.
Token Standard Extension for Increasing & Decreasing Supply, Alex Miller—ethereum/EIPs—GitHub (retrieved Jun. 21, 2018), https://github.com/ethereum/EIPs/pull/621, 21 pages.
ERC 644: Token Standard for Modular and Upgradeable Tokens—Issue #644—ethereum/EIPs—GitHub, (opened by chrisfranko—Jun. 16, 2017) https://github.com/ethereum/EIPs/issues/644, 9 pages.
GitHub—BitGo/eth-multisig-v2: Multi-Sig Wallet v2, supporting original Wallet.sol methods with additional confirmAnd Execute improvements to allow for single-transaction signing by multiple owners (retrieved Jun. 21, 2018) https://github.com/BitGo/eth-multisig-v2, 2 pages.
Fundamentals, FAQ (Accessed Jun. 26, 2018) 10 pgs. https://faq.rsk.com/en/main/, Internet.
Mike Calvanese, Flexible Upgradability for Smart Contracts—Level K—Medium (Mar. 10) 15 pgs., https://medium.com/level-k/flexible-upgradability-for-smart-contracts-9778d80d1638.
Ico/contracts/BurnableToken.sol at master—TokenMarketNet/ico—GitHub (Accessed Jun. 18, 2018) 1 pp., https://github.com/TokenMarketNet/ico/blob/master/contracts/BurnableToken.sol, Internet.
Ico/MintableToken.sol at master—TokenMarketNet/ico—GitHub (Accessed Jun. 21, 2018), 2 pgs., https://github.com/TokenMarketNet/ico/blob/master/contracts/MintableToken.sol, Internet.
Ico/UpgradeableToken.sol at master—TokenMarketNet/ico—GitHub (Accessed Jun. 8, 2018) 3 pgs., https://github.com/TokenMarketNet/ico/blob/master/contracts/UpgradeableToken.sol, Internet.
MintableToken contract MintableToken is StandardToken—OpenZeppelin 1.8.0, OpenZeppelin.org (Accessed Jun. 18, 2018) 3 pgs., https://openzeppelin.org/api/docs/token_ERC20_MintableToken.html, Internet.
GitHub—gnosis/MultiSigWallet: Allows multiple parties to agree on transactions before execution,(Accessed Jun. 21, 2018) 3 pgs., https://github.com/Gnosis/MultiSigWallet, Internet.
GitHub—ConsenSys/MultiSigWallet—- Ethereum MultiSigWallet (accessed Jun. 21, 2018) 1 pg., 3. https://github.com/ConsenSys/MultiSigWallet, Internet.
New batchoverflow Bug in Multiple ERC20 Smart Contracts (CVE-2018-10299) a Blockchain Security Company—Peckshield (Apr. 22, 2018) medium.com/@peckshield/alert-new-batchoverflow-bug-in-multiple-erc20-smart-contracts-cve-2018-10299-511067db6536, Internet.
Home—OmniLayer/omnicore Wiki—GitHub—Welcome to the Omni Core wiki! (Accessed Jun. 26, 2018) 1 pg., https://github.com/OmniLayer/omnicore/wiki, Internet.
StandardToken—contract StandardToken is ERC20, BasicToken—OpenZeppelin (Accessed Jun. 21, 2018) https://openzeppelin.org/api/docs/token_ERC20_StandardToken.html, Internet.
Openzeppelin-solidity/BurnableToken.sol at master—OpenZeppelin/openzeppelin-solidity—GitHub (Accessed Jun. 18, 2018) 1 pg., https://github.com/OpenZeppelin/openzeppelin-solidity/blob/master/contracts/token/ERC20/BurnableToken.sol, Internet.
OpenZeppelin/openzeppelin-solidity (Accessed Jun. 21, 2018) 3 pgs., https://github.com/OpenZeppelin/openzeppelin-solidity/blob/master/contracts/token/ERC20/StandardToken.sol, Internet.
Smart Contract Upgradeability using Eternal Storage (Accessed Jun. 8, 2018) 6 pgs., 3. https://blog.zeppelinos.org/smart-contract-upgradeability-using-eternal-storage/, Internet.
Superbitcoin—Supersmartbitcoin.com (Accessed Jun. 26, 2018) 8 pgs., http://supersmartbitcoin.com/, Internet.
Tether: Fiat currencies on the Bitcoin blockchain (20 pgs.).
Upgradable Solidity Contract Design—Rocket Pool—Medium, David Rugendyke (Nov. 21, 2017) 21 pgs., https://medium.com/rocket-pool/upgradable-solidity-contract-design-54789205276d, Internet.
Writing upgradable contracts in Solidity - Colony, Elena Dimitrova (Jun. 8, 2016) 18 pgs., https://blog.colony.io/writing-jpgradeable-contracts-in-solidity-6743f0eecc88, Internet.
U.S. Appl. No. 61/954,434, filed Mar. 17, 2014.
U.S. Appl. No. 61/990,017, filed May 7, 2014.
U.S. Appl. No. 62/042,676, filed Aug. 27, 2014.
U.S. Appl. No. 62/056,100, filed Sep. 26, 2014.
U.S. Appl. No. 62/086,669, filed Dec. 2, 2014.
U.S. Appl. No. 62/099,992, filed Jan. 15, 2015.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.

(56) References Cited

OTHER PUBLICATIONS

Ken Hawkins, Exchange-Traded Funds (ETFs), Investopedia (May 12, 2013) Internet archive, https://web.archive.org/web/20130512125447/http://www.investopedia.com/university/exchange-traded-fund/.
Proof of stake instead of proof of work, Bitcoin Forum, https://bitcointalk.org/index.php?topic=27787 (last visited Nov. 6, 2015).
Trading Namecoins for Bitcoins, Bitcoin Forum, https://bitcointalk.org/index.php?topic=6289.0 (last visited Nov. 6, 2015).
"What is Blockchain Technology?" Quora. N.p. Jan. 15, 2009. Web. Jun. 9, 2017. <https://www.quora.com/What-is-blockchain-technology-1 >.
Bankex Proof-of-Asset Protocol—The Smart White Paper, version 0.3.1 beta (Oct. 19, 2017) 36 pgs.
Atmia ATM Industry Association Position Paper, www.atmia.com, Internet.
Winklevosses' Gemini to Offer Cryptocurrency Block Trading, Olga Kharif and Matthew Leising, Bloomberg.com (Apr. 9, 2018) https://www.bloomberg.com/news/articles/2018-04-09/winklevoss-s-gemini-to-offer-cryptocurrency-block-trading, Internet.
A block chain based decentralized exchange, Harsh Patel.
Marketplace—Gemini, web.archive.org (Last modified Jan. 8, 2018) http://web.archive.org/web/20180125115941/https://gemini.com/marketplace/, Internet.
Marketplace—Gemini, web.archive.org (Last modified Nov. 25, 2017) http://web.archive.org/web/20171211092415/https://gemini.com/marketplace/, Internet.
Marketplace, Gemini.com (Last modified Sep. 20, 2018) https://gemini.com/marketplace/, Internet.
The Ripple Network Review—What is Ripple?, Donald McIntyre—Etherplan (Aug. 1, 2013) https://etherplan.com/2013/08/01/the-npple-network-review-what-is-ripple/4103/, Internet.
World Bank taps Australia's CBA for blockchain bond, Reuters (Aug. 9, 2018) https://www.reuters.com/article/us-worldbank-cba-blockchain/world-bank-taps-australias-cba-for-blockchain-bond-idUSKBN1KV02D, Internet.
Jeanine Hightower-Sellitto Declaration under 37 C.F.R. § 1.132 filed in U.S. Appl. No. 15/960,040 on Feb. 15, 2019.
Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.
Notice of References Cited, U.S. Appl. No. 12/192,809 (Oct. 10, 2012).
Online auctions: An in-depth look, National Consumers League, http://www.nclnet.org/personal-finance/121-online-auctions/279online-auctions-an-in-depth-look (last visited May 30, 2014).
PPCoin Proof of Stake Minting Setup Guide, Bitcoin Forum (Apr. 25, 2013) https://bitcointalk.org/index.php?topic=187714.0 (last visited Jul. 22, 2013).
PPCoin, Wikipedia, http://en.wikipedia.org/wiki/PPCoin (last visited Jul. 22, 2013).
Private Bitcoin Insurance, Inscrypto, http://go.inscrypto.com (last visited Jan. 24, 2014).
Proof-of-stake, Wikipedia, http://en.wikipedia.org/wiki/Proof-of-stake (last visited Jul. 22, 2013).
Proof-of-work System, Wikipedia, http://en.wikipedia.org/wiki/Proof-of-work (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Rob Wile, Shares of No-Name Tech Company Go Crazy After It Announces It's Getting Into the Bitcoin Game, Business Insider, http://www.businessinsider.com/wpcs-bitcoin-2013-12?nr_email_referer=1&utm_source=Triggermail&utm_medium=email&utm_content=emailshare (last visited Dec. 30, 2013).
Satoshi Nakamoto, Bitcoin: A Peer-to-Peer Electronic Cash System (Oct. 31, 2008).
Securing Your Wallet, Bitcoin.org (Jul. 21, 2013) Internet Archive, http://web.archive.org/web/20130721194621/http://bitcoin.org/en/secure-your-wallet.
Security for Your Peace of Mind, Coinbase, https://coinbase.com/security (last visited Oct. 28, 2013).
Shamir's Secret Sharing, Wikipedia, http://en.wikipedia.org/wiki/Shamir's_Secret_Sharing (last visited Jul. 22, 2013).
Some Things You Need to Know, Bitcoin.org (May 2, 2013) Internet Archive, http://web.archive.org/web/20130502051011/http://bitcoin.org/en/you-need-to-know.
Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).
Sunny King & Scott Nadal, PPCoin: Peer-to-Peer Crypto-Currency with Proof-of-Stake, (Aug. 19, 2012).
TigerDirect.com Now Accepts Bitcoin Payments!, TigerDirect, http://www.tigerdirect.com/bitcoin/ (last visited Feb. 6, 2014).
U.S. Appl. No. 60/884,172, filed Jan. 9, 2007.
U.S. Appl. No. 61/225,256, filed Jul. 14, 2009.
USD Average Price History, BitcoinAverage, https://bitcoinaverage.com/charts.htm@USD-averages-all (last visited Feb. 24, 2014).
Using Offline Wallets in Armory, Armory (May 20, 2013) Internet Archive, http://web.archive.org/web/20130520100213/https://bitcoinarmory.com/using-offline-wallets-in-armory/.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).
Why Bitcoin is Changing the World, Bitcoin.org (Jun. 20, 2013) Internet Archive, http://web.archive.org/web/20130620062218/http://bitcoin.org/en/innovation.
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.
World Gold Council, How SPDR Gold Shares (2840 HK) are Created and Redeemed (Mar. 2013).
Bitcoin, A Primer for Policymakers(2013).
Bitcoin: a first assessment, FX and Rates | Global, Bank of America Merrill Lynch (Dec. 5, 2013).
Bitcoin: Questions, Answers, and Analysis of Legal Issues, Congressional Research Service (Dec. 20, 2013).
The audacity of bitcoin, Risks and opportunities for corporates and investors,Global Rates & FX Research, J.P. Morgan (Feb. 11, 2014), http://www.jpmorganmarkets.com/GlobalFXStrategy.
John Heggestuen, BITCOIN: How It Works, and How It Could Fundamentally Change How Companies and Individuals Handle Payments, BI Intelligence (Jan. 30, 2014).
Bitcoin: Intrinsic Value as Conduit for Disruptive Payment Network Technology, Wedbush, Computer Services: Financial Technology (Dec. 1, 2014).
Digitizing Trust: Leveraging the Bitcoin Protocol Beyond the "Coin", Wedbush, Computer Services: Financial Technology (Jan. 2, 2014).
Bitcoin: Watch the Innovation, Not the Price, Wedbush, Computer Services: Financial Technology (Feb. 14, 2014).
"How Bitcoin is Driving Digital Innovation in Entertainment, Mediaand Communications (EMC), PwC Consumer Intelligence Series, Digital Disruptor, (Jan. 27, 2014)."
Bitcoins and Banks: Problematic currency, interesting payment system, UBS, Global Research (Mar. 28, 2014).
François R. Velde, Bitcoin: A primer, The Federal Reserve Bank of Chicago, Chicago Fed Letter (Dec. 2013).
David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).
All About Bitcoin, Goldman Sachs, Global Macro Research, Top of Mind, Issue 21 (Mar. 11, 2014).
Julieta Duek and Demian Brener, Bitcoin: Understanding and Assessing potential Opportunities, Quasar Ventures, (Jan. 2014).
"Yacine Ghalim and Max Niederhofer, bitcoin: Primer, State of Play, Discussion, Courmayeur, Sunstone Capital (Jan. 24, 2014)".

(56) References Cited

OTHER PUBLICATIONS

Timing and Sizing the Era of Bitcoin, Wedbush, Computer Services: Financial Technology (May 27, 2014).
State of Bitcoin 2014, CoinDesk (Feb. 26, 2014).
Ronald A. Glantz, Pantera Primer, (Mar. 11, 2014).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).
Blocktrail|Bitcoin Block Explorer, Blocktrail (Aug. 18, 2014), https://www.blocktrail.com/.
Jerry Bito and Andrea Castillo, Bitcoin a Primer for Policymakers, Mercatus Center, George Mason University (2013).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
International Search Report and Written Opinion issued in Application No. PCT/US16/25189 dated Jul. 1, 2016 (15 pp.).
"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.
"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.
International Search Report and Written Opinion issued in Application No. PCT/US16/040711 dated Oct. 4, 2016 (14 pages).
"Blockchain Technologies Corp Makes History, 2016 Iowa Caucus Results Forever Documented on Blockchain", https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.
"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.
"Nasdaq Launches Enterprise-Wide Blockchain Technology Initiative", Nasdaq, https://globenewswire.com/news-release/2015/05/11/734456/10133665/en/Nasdaq-Launches-Enterprise-Wide-Blockchain-Technology-Initiative.html, May 11, 2015, 3 pages.
"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Ondustry.html, Mar. 14, 2016, 3 pages.
Nakamoto, S., "Bitcoin: A Peer-to-Peer Electronic Cash System,"www.bitcoin.org, 9 pages.
Daniel Cawrey, Eschewing Price, Pantera Launches Bitindex to Track Bitcoin, CoinDesk (Jul. 10, 2014), http://www.coindesk.com/eschewing-price-pantera-launches-bitindex-track-bitcoin/ (last visited Jul. 11, 2014).
"Coinsetter Launches Out of Beta, Platform Now a Full U.S.Bitcoin Exchange, Coinsetter blog (Jul. 24, 2014), http://www.coinsetter.com/blog/2014/07/24/coinsetter-launches-beta-platform-now-full-us-bitcoin-exchange/ (last visited Jul. 24, 2014)."
Request for Administrative Ruling on the Application of FinCEN's Regulations to a Virtual Currency Trading Platform, United States Department of the Treasury, FinCEN, (Oct. 27, 2014).
Request for Administrative Ruling on the Application of FinCEN's Regulations to a Virtual Currency Payment System, United States Department of the Treasury, FinCEN, (Oct. 27, 2014).
Daniel Roberts, On Winklevoss Bitcoin index, it's open season for developers, Fortune, (Jul. 22, 2014).
Evan L. Greebel et al., Recent Key Bitcoin and Virtual Currency Regulatory and Law Enforcement Developments, Virtual Currency Advisory, Katten Muchin Rosenman LLP (Nov. 13, 2014).
BTC, Google Finance, https://www.google.com/finance?q=CURRENCY%3ABTC&ei=T-euU7jVFZOUwQPNklHYCQ (last visited Jul. 11, 2014).
Sanjay Panikkar et al., ADEPT: An IoT Practitioner Perspective, IBM (2015).
Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw bitcoin.html.
NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).
Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).
"We make it easy to build secure, high-level services on topof the Bitcoin protocol, Trusted Coin (Dec. 26, 2013) Internet Archive, https://web.archive.org/web/201312262324331https://api.trustedcoin.com/f."
WINKBTCO Index, Bloomberg Finance L.P. (Jun. 16, 2014).

* cited by examiner

Transaction Ledger 115

| Transaction ID | Date | Fee | Origin Identifiers | Amount from Origin | Destination Identifiers | Destination Amount |
|---|---|---|---|---|---|---|
| f06db23bc69b7fc155f337 3aa6e41cdc1c75da613685 95c017b13d7b7c16552 | 2014-06-24 20:41:32 | 0 | 19ZmwSkMbkTjA7qRUdUEiwLqgRaMRRLDkh | 500 | 122BNoyhmuUt9G9mdEm3mN4nb73c1UgNKt | 1000 |
| 9cd9cef3b96936c8c3a1b7c 1f6a0de17a3cfc194c575b7 82638bef85c069de58 | 2014-06-24 20:41:32 | 0.0001 | 1EvwbspDSjYbH2ZSq6TFbPxftkM8ej5YqP | 45.9983 | 1PXdpLs2k3ETn9vcL4SRp3UiHxHiiMizXb / 1BS6XTQKH2uiJS1GG96SRncn8YmS6jintKaC | 42.1724747 / 3.8257253 |
| 5f2fb8557633e61e9ab20e b46152a97423c7b3a38b7 414e7c672d41efd9c830 | 2014-06-24 20:41:32 | 0 | 1Su7FXhfiaW7EYWwiv2ayA9duahXb35Rnv | 303.92706127 | 17ZCqyj7KtgfNhGVWVLc8gdDi6ByyRUqZ8G / 12eqiZbQpRoYqa6BxGtWqpBd5UpwZqCek | 154.77363532 / 149.15342595 |
| 535936b198bb3fcbc8d15e e38bb735c6929dd36Ceae05 e27a19514bc4be82d69f | 2014-06-24 20:41:32 | 0.00005 | 1JW8RphYjfsnTyV4W62GHpm9ChA2wVPvap | 18.04275292 | 1Bv9zi9SkSWp3pgVDtrVtTNQafFauKXoUk / 1GnhQNChquusqgGAtVujjmqxPtk8P2y4EV | 17.2974792 / 0.75 |
| 4616a18de8943f33da984 12a6f3f70c5c08436837d7f b28b3ea9936f31b55ef | 2014-06-24 20:41:32 | 0.0001 | 1GD64WARGDLYG71WTTgCpRMpePr1BnmGij | 5 | 1HrjlqUAer7yLiNP8pPxSmhQoifGqW3NffA / 1NRNnusa3D4sxxzig5fvwnX1thDnR9w3ZJ / 1GD64WARGDLYG71WTTgCpRMpePr1BnmGij | 3.45703882 / 0.01388369 / 1.52397749 |

FIG. 2

(LOGO) Etherscan
The Ethereum Block Explorer

LOGIN | Search by Address/Txhash/Block/Ens

HOME   BLOCKCHAIN ˅   ACCOUNT ˅   TOKEN ˅   CHART   MISC ˅

(LOGO) TOKEN Insights Network                     Home / Token Tracker / Insights Network Sponsored Link: ⚡ 300cubits TEU token-ICO starts 12Apr: blockchain solution and the bitcoin for the $150B shipping. Contribute Now!

TokenTracker Summary                                                      Reputation NEUTRAL

| | | | |
|---|---|---|---|
| Total Supply: | 209,823,468.99723293 INSTAR ($10,542,262.52) | ERC20 Contract: | 0x... |
| Value per Token: | $0.0502 @ 0.000095 Eth (-4.18%) | Token Decimals: | 18 |
| Token Holders: | 5819 addresses | Official Links: | 🌐 ▢ ✎ ⓘ ≡ ↔ |
| No. Of Transfers: | 13163 | Search/Filter By: | Enter Token Address of TxHash |

2208    2210    2212

Token Transfers | Token Holders | Token Info | Read Smart Contract | Comments

↓ A Total of 13163 events found

First | Prev | Page 1 of 264 | Next | Last

| | | 2202 | 2204 | 2206 |
|---|---|---|---|---|
| TxHash | Age | From | To | Quantity |
| 0x1138f4b1c7e8... | 1 hr ago | 0x8a861bd48487... | 0x7a8d8acc7e4d... | 2,000 |
| 0x6107e4c184bc1... | 1 hr 6 mins ago | 0x87a7ec8484844... | 0x8b4cbcad8c39... | 24,971.239327218133804607 |
| 0x6107e1b48b9... | 1 hr 6 mins ago | 0x7a8b0abcd407a... | 0x87a7ec8484844... | 24,971.239327218133804607 |
| 0x09477ac2888e... | 1 hr 7 mins ago | 0x87a7ec8484844... | 0x40bc7cb4d830... | 21,427.718756858570777938 |
| 0x09477ac2888a... | 1 hr 7 mins ago | 0x7a8b0abcd407b... | 0x87a7ec8484844... | 21,427.718756858570777938 |
| 0x3ebc1ac5d5e28... | 1 hr 14 mins ago | 0x78a46a2110c4f... | 0x8c801bd45dd7... | 2,000 |
| 0x7c3895b1a7ee... | 1 hr 27 mins ago | 0x87a7ec8484844... | 0x7a48babcd407b... | 43,812.247328343310366 |

FIG. 2A

DASHBOARD FIAT INTERFACE

DASHBOARD FIAT INTERFACE

DASHBOARD FIAT INTERFACE

DASHBOARD FIAT INTERFACE

DASHBOARD DIGITAL ASSET INTERFACE

DASHBOARD DIGITAL ASSET INTERFACE

DASHBOARD DIGITAL ASSET INTERFACE

DASHBOARD DIGITAL ASSET INTERFACE

DASHBOARD SVCoin INTERFACE

DASHBOARD SECURITY TOKEN INTERFACE

S1202: Security Token issuer log into digital asset exchange

S1204: Security token issuer requests a transfer of SVCoins to Security Token Holders

S1206: Digital Asset Exchange System (or other Trusted Entity) analyses request from S1204:
- S1206-a – verify user and sufficient fiat currency for user
- S1206-b -- verify digital asset addresses for recipients (Security Token holders)
- S1206-c - determine payment amount for each Security Token Holder

S1208: Generate requested Stable Value Tokens:
- S1208-a- debit funds from fiat ledger for Security token issuer and credit fiat ledger for trust account
- S1208-b– update token ledger to reflect new coins and deposits
- S1208-c – publish to blockchain network new transactions

S1210: Sends messages confirming transactions

FIG. 12

```
┌─────────────────────────────────────────────┐
│ S1414: determining, at the digital asset token │
│ issuer system, that the first designated key    │
│ pair has authority to obtain the first sum,     │
│ performing the steps of:                         │
└─────────────────────────────────────────────┘
                      ↓
┌─────────────────────────────────────────────┐
│ S1414A(1) : generating first instructions to    │
│ obtain the first sum of stable value digital    │
│ asset tokens and transfer said first sum to     │
│ the first request public key                     │
└─────────────────────────────────────────────┘
                      ↓
┌─────────────────────────────────────────────┐
│ S1414A(2) : sending the first computer the      │
│ first instructions;                              │
└─────────────────────────────────────────────┘
                      ↓
┌─────────────────────────────────────────────┐
│ S1414A(3): signing, by the first computer using │
│ the first designated private key, the first    │
│ instructions                                     │
└─────────────────────────────────────────────┘
                      ↓
┌─────────────────────────────────────────────┐
│ S1414(4): sending, by the first computer to the │
│ digital asset token system the signed first    │
│ instructions;                                    │
└─────────────────────────────────────────────┘
                      ↓
┌─────────────────────────────────────────────┐
│ S1414(5): sending, by the digital asset token  │
│ issuer system to the plurality of geographically│
│ distributed computer systems, the signed first │
│ instructions.                                    │
└─────────────────────────────────────────────┘
                      ↓
┌─────────────────────────────────────────────┐
│              GO TO FIG. 14D.                     │
└─────────────────────────────────────────────┘
```

FIG. 14B

```
┌─────────────────────────────────────────────────────────┐
│ S1414': determining that the first designated key pair  │
│ does not have authority to obtain the first sum         │
└─────────────────────────────────────────────────────────┘
                            │
                            ▼
┌─────────────────────────────────────────────────────────┐
│ S1414B(1): sending a to obtain the first sum of stable  │
│ value digital asset tokens and transfer said first sum to│
│ the first request public key;                           │
└─────────────────────────────────────────────────────────┘
                            │
                            ▼
┌─────────────────────────────────────────────────────────┐
│ S1414B(2): generating first instructions to obtain the  │
│ first sum of stable value digital asset tokens and to   │
│ assign the obtained first sum to the first request public│
│ key,                                                    │
└─────────────────────────────────────────────────────────┘
                            │
                            ▼
┌─────────────────────────────────────────────────────────┐
│ S1414B(3): sending, by the first computer system to     │
│ the plurality of geographically distributed computer    │
│ systems, the signed first instructions.                 │
└─────────────────────────────────────────────────────────┘
                            │
                            ▼
┌─────────────────────────────────────────────────────────┐
│                    TO FIG. 14 D                         │
└─────────────────────────────────────────────────────────┘
```

FIG. 14C

S1415: confirming, by the digital asset token issuer system, that the first sum of stable value digital asset tokens has been obtained and transferred.

S1416: receiving a second request to obtain a third sum of stable value digital asset tokens in exchange for a fourth sum of fiat.

S1418: confirming, by the digital asset token issuer system, receipt of the fourth sum of fiat.

S1420: determining, by the digital asset token issuer system, whether the first designated key pair has authority to obtain the third sum.

S1422: determining that the second designated key pair has authority to obtain the third sum S1422A(1): generating, second instructions to obtain the third sum of stable value digital asset tokens S1422A(2): transferring the second directions from the digital asset token issuer system to a portable memory device;

S1422A(3): transferring the second instructions from the portable memory device to the second computer;

S1422A(4): signing, by the second computer, the second instructions using the second designated private key;

S1422A(5): transferring the digitally signed second instructions from the second computer to a second portable memory device;

S1422A(6): sending the second digitally signed instructions from the memory device to the plurality of geographically distributed computer systems S1424: confirming, by the digital asset token issuer, that the third sum of stable value digital asset tokens have been obtained and transferred

FIG. 14E

S1422": providing a third designated key pair on a third computer system not operatively or physically connected to the distributed ledger or the internet, S1422C(1): generating third instructions to obtain the third sum of stable value digital asset tokens and transfer said third sum to the third request public key;

S1422C(2): transferring, by the digital asset token issuer system to a third portable memory device, the third instructions;

S1422C(3): transferring the third instructions from the third portable memory device to the third computer;

S1422C(4): digitally signing, the third instructions using the third designated private key to generate the third digitally signed instructions;

S1422C(5): transferring, by the third computer to a fourth portable memory device, the third digitally signed instructions;

S1422C(6): sending the third digitally signed instructions from the fourth portable memory device to the plurality of geographically distributed computer systems.

S1424: confirming, by the digital asset token issuer, that the third sum of stable value digital asset tokens have been obtained and transferred

FIG. 14G

S1602A: Receiving, from the first user device, an authentication request including first user credential information associated with the first user

S1602B: Determining that the first user device is authorized to access the digital asset exchange computer system based on at least in part, the first user credential information

S1602C: Generating first graphical user interface information for displaying a first graphical user interface on the first user device

S1602D: Transmitting, to the first user device, the first graphical user interface information

FIG. 16B

S1604A: Receiving, from the first user device, a first electronic request to withdraw stable value digital asset tokens

S1604B: In response to the first electronic request, obtaining first account balance information of the first user indicating a first amount of available fiat for the first user held by the digital asset exchange on behalf of the first user

S1604C: Generating second graphical user interface information including at least the first account balance information

S1604D: Transmitting, to the first user device, the second graphical user interface information

S1604E: Receiving, from the first user device, a second electronic withdrawal request comprising at least:
    (1) a first amount of stable value digital asset tokens to be withdrawn; and
    (2) a destination public address on the underlying blockchain to transfer the first amount of stable value digital asset tokens

FIG. 16C

S1606A: Calculating a second amount of fiat based on the first amount of stable value digital asset tokens S1606B: Determining that the second amount of fiat is less than the first amount of available fiat of the first user S1606C: In the case where the second amount of fiat is less than the first amount of fiat, determining a third amount of fiat associated with an updated amount of available fiat of the first user S1606D: Updating the first account ledger database to reflect that the updated amount of available fiat of the first user is the third amount of fiat S1606E: Updating a stable value digital asset token issuer fiat ledger to increase the balance of fiat by the second amount of fiat S1606F: Generating a first transaction request for the blockchain network, from a first digital asset exchange public key address on the blockchain to a first contract address associated with a stable value token issuer

S1702A: Receiving, from the first user device, an authentication request including first user credential information associated with the first user S1702B: Determining that the first user device is authorized to access the digital asset exchange computer system based on at least in part, the first user credential information S1702C: Generating first graphical user interface information for displaying a first graphical user interface on the first user device S1702D: Transmitting, to the first user device, the first graphical user interface information

FIG. 17B

```
┌─────────────────────────────────────────────────────────┐
│ S1704A: Receiving, from the first user device, a first  │
│ electronic request to deposit stable value digital asset│
│ tokens                                                  │
└─────────────────────────────────────────────────────────┘
                            │
                            ▼
┌─────────────────────────────────────────────────────────┐
│ S1704B: In response to the first electronic request,    │
│ obtaining first account balance information of the first│
│ user indicating a first amount of available fiat for the│
│ first user held by the digital asset exchange on behalf │
│ of the first user                                       │
└─────────────────────────────────────────────────────────┘
                            │
                            ▼
┌─────────────────────────────────────────────────────────┐
│ S1704C: Obtaining a user specific destination address   │
│ uniquely associated with the first user                 │
└─────────────────────────────────────────────────────────┘
                            │
                            ▼
┌─────────────────────────────────────────────────────────┐
│ S1704D: Generating second graphical user interface      │
│ information including at least a first account balance  │
│ information and the user specific destination address   │
└─────────────────────────────────────────────────────────┘
                            │
                            ▼
┌─────────────────────────────────────────────────────────┐
│ S1704E: Transmitting, to the first user device, the     │
│ second graphical user interface information             │
└─────────────────────────────────────────────────────────┘
                            │
                            ▼
┌─────────────────────────────────────────────────────────┐
│ S1704F: Receiving, from the first user device, a second │
│ electronic deposit request                              │
└─────────────────────────────────────────────────────────┘
```

FIG. 17C

S1706A: Calculating a second amount of fiat based on the first amount of stable value digital asset tokens

S1706B: Determining that the first amount of stable value digital asset tokens is present at the designated public address of the first user

S1706C: In the case where the first amount of stable value tokens is present at the designated public address of the first user, determining a third amount of fiat associated with an updated amount of available fiat of the first user

S1706D: Updating the fiat account ledger database to reflect that the updated amount of available fiat of the first user is the third amount of fiat

S1706E: Generating a first transaction request for the blockchain network, from a first digital asset exchange public key address to a first contract address associated with a stable value token issuer

S1706F: (Optional) Updating a stable value digital asset token issuer fiat ledger to decrease a balance of fiat by the second amount of fiat

**PROXY Smart Contract
1310**

Contract Address 1

**PROXY Contract Instructions
1310A-1**

PROXY Delegation Instructions Module 1829

PROXY Authorization Instructions Module 1831

FIG. 18B

PRINT LIMITER Smart Contract
1360

Contract Address 3

PRINT LIMITER Contract Instructions
1360A-1

PRINT LIMITER Token Creation Instructions Module 1833

PRINT LIMITER First Authorization Instructions Module 1839

PRINT LIMITER Second Authorization Instructions Module 1841

PRINT LIMITER Third Authorization Instructions Module (optional) 1835

Token Transfer Instructions Module (optional) 1843

Token Destruction Instructions Module (optional) 1845

Token Balance Modification Instructions Module (optional) 1847

FIG. 18C

CUSTODIAN 2 Smart Contract
1350

Contract Address 6

CUSTODIAN 2 Contract Instructions
1350A-1

CUSTODIAN 2 First Authorization Instructions Module
1849

CUSTODIAN 2 Second Authorization Instructions Module 1851

FIG. 18D

S2002: providing a first designated key pair including a first designated public key of an underlying digital asset and a corresponding first designated private key, wherein the first designated private key is stored on a first computer system which is connected to the distributed public transaction ledger through the internet

↓

S2004: providing a second designated key pair including a second designated public key of the underlying digital asset and a corresponding second designated private key, wherein the second designated private key is stored on a second computer system which is not operatively or physically connected to the distributed public transaction ledger or internet

↓

S2006: providing first smart contract instructions (e.g. proxy smart contract instructions) for a digital asset token associated with a first contract address associated with the underlying digital asset

↓

S2008: providing second contract instructions (e.g. print limiter smart contract instructions) for the digital asset token associated with a second contract address associated with the underlying digital asset

↓

S2010: providing third smart contract instructions (e.g. custodian smart contract instructions) for the digital asset token associated with a third contract address associated with the underlying digital asset

Continued from FIG. 20B

S2030: generating, by the digital asset token issuer system, a third transaction request to be digitally signed by at least the second designated private key including the first unique request hash S2032: transferring, from the digital asset token issuer system to a first portable memory device, the third transaction request;

S2034: transferring, from the first portable memory device to the second computer system, the third transaction request S2036: digitally signing, by the second computer system, the third transaction request using the second designated private key to generate a third digitally signed transaction request S2038: sending, from a second portable memory device using the digital asset token issuer system, via the underlying blockchain, the third digitally signed transaction request to the third contract address

FIG. 20C

S2102: providing a first designated key pair including a first designated public key of an underlying digital asset and a corresponding first designated private key, wherein the first designated private key is stored on a first computer system which is connected to the distributed public transaction ledger through the internet

↓

S2104: providing a second designated key pair including a second designated public key of the underlying digital asset and a corresponding second designated private key, wherein the second designated private key is stored on a second computer system which is not operatively or physically connected to the distributed public transaction ledger or internet

↓

S2106: providing first smart contract instructions (e.g. proxy smart contract instructions) for a digital asset token associated with a first contract address associated with the underlying digital asset

↓

S2108: providing second contract instructions (e.g. print limiter smart contract instructions) for the digital asset token associated with a second contract address associated with the underlying digital asset

↓

S2110: providing third smart contract instructions (e.g. custodian smart contract instructions) for the digital asset token associated with a third contract address associated with the underlying digital asset

↓

S2112: providing fourth smart contract instructions (e.g. store smart contract instructions) for the digital asset token associated with a fourth contract address associated with the underlying digital asset

↓

S2114: providing fifth smart contract instructions (e.g. impl smart contract instructions) for the digital asset token associated with a fifth contract address associated with the underlying digital asset

↓

Continued with FIG. 21B

FIG. 21A

Security Token
6805

Smart Contract Address
6805A

Security Token Smart Contract Instructions
6805B create security tokens module 6918 transfer security tokens module 6920 destroy security tokens module 6922 access data module 6924 authorize instructions module 6926 calculate excess collateral module 6928 generate collateral information message module 6930 send collateral information message module 6932

FIG. 25B

SVCoin Token
6807

Smart Contract Address
6807A

Stable Value Token Smart Contract Instructions
6807B create stable value token module 6934 transfer stable value token module 6936 destroy stable value token module 6938 authorization instruction module 6940

FIG. 25C

S7002: Publishing, by an administrator system associated with an administrator, contract parameters.

S7004: Receiving, by the administrator system, a plurality of indications of interest.

S7006: Matching, by the administrator system, a first user response with a second user response.

S7008: Providing, on the underlying blockchain, a stable value token smart contract having a first contract address for a stale value digital asset token.

S7010: Providing, on the underlying blockchain, a security token smart contract having a second contract address.

S7012: Setting up, by the administrator system, a first trade between the first user and the second user, the first trade using the security token smart contract on the underlying blockchain (Further Detailed Flow Charts - FIGS. 70B-70D)

S7014: Collecting, from the security token contract, excess collateral in the first trade (Further Detailed Flow Charts - FIGS. 70E-70F)

FIG. 26A

S7012: Setting up, by the administrator system, a first trade between the first user and the second user, the first trade using the security token smart contract on the underlying blockchain

S7016: generating, by the administrator system, first trade instructions for the security token smart contract, the first trade instructions including requests to execute the first trade between a first public address associated with the first user and a second user public address associated with the second user

S7018: generating, by the administrator system, first hashed trade instructions based on the first trade instructions;

S7020: sending, by the administrator system via the underlying blockchain from an administrator public address to the second contract address, a first transaction request

S7022: obtaining, by the administrator system, the first trade identification of the first trade;

S7024: (optional) monitoring, by the administrator system, transactions on the blockchain to determine the first trade identification as calculated by the security token smart contract;

S7026: sending, by the administrator system, the first trade identification to the first user device associated with the first user;

S7028: sending, by the administrator system, the first trade identification to the second user device associated with the second user

S7030: (optional) sending, from the first user device via the underlying blockchain from a first user public address to the first contract address, a second transaction request Continued with FIG. 70C

FIG. 26B

Continued from FIG. 70B

S7032: (optional) sending, from the second user device via the underlying blockchain from a second user public address to the second contract address, a third transaction request S7034: monitoring, by the administrator system, transactions of stable value digital asset tokens on the blockchain to determine that the second contract address has received at least the following:
    (1) the first amount of collateral in stable value digital asset tokens from the first user; and
    (2) the second amount of collateral in stable value digital asset tokens from the second user;

S7036 (optional) monitoring, by the administrator system, the first contract address to determine whether the first amount of collateral is received at the second contract address;

S7038: (optional) monitoring, by the administrator system, the first contract address to determine whether the second amount of collateral is received at the second contract address;

S7040: (optional) receiving, from the second contract address, a collateral confirmation message confirming that:
    (1) the first amount of collateral has been received at the second contract address; and
    (2) the second amount of collateral has been received at the second contract address;

S7042: sending, by the administrator system via the underlying blockchain from the administrator public address to the second contract address, a fourth transaction request

FIG. 26C

S7012: Setting up, by the administrator system, a first trade between the first user and the second user, the first trade using the security token smart contract on the underlying blockchain S7042: Sending, by the administrator system via the underlying blockchain to the second contract address, a first transaction request S7044: Sending, from the first user device via the underlying blockchain to the first contract address, a second transaction request, S7046: Sending, from the second user device via the underlying blockchain to the second contract address, a third transaction request S7048: Sending, by the administrator system via the underlying blockchain from the administrator public address to the first contract address, a fourth transaction request,

FIG. 26D

S7014: Collecting, from the security token contract, excess collateral in the first trade S7060: sending, by an oracle service via the underlying blockchain from an oracle address associated with an oracle interface to the second contract address, a fifth transaction request, the fifth transaction request including a fifth message comprising first benchmark information;

S7062: executing, by the security token smart contract in response to receiving the fifth message, instructions to store the first benchmark information;

S7064: sending, by the administrator system via the underlying blockchain, from the administrator public address to the second contract address, a sixth transaction request S7066: executing, by the security token smart contract in response to receiving the instructions contained in the fifth message, instructions to calculate first excess collateral for the first user and second excess collateral for the second user by using the first trade instructions and the first benchmark information S7068: in the case where either the first excess collateral is greater than zero or the second excess collateral is greater than zero, sending, by the security token smart contract via the underlying blockchain from the second contract address to the first contract address, a sixth transaction request

FIG. 26F

Published Contract 7102

Inception Date 7104: July 19, 2018
Inception Value 7106: $10,000
Benchmark Data 7108: S&P 500
Contract Duration Data 7110: 5 days
Collateral Requirement 7112: 100 SV Coins
Notional Value 7114: $10,000

FIG. 27A

Published Contract 7116

Inception Date 7118: July 20, 2018
Inception Value 7120: $1,000
Benchmark Data 7122: S&P 500
Contract Duration Data 7124: 2 Days
Collateral Requirement 7126: 10 SV Coins
Notional Value 7128: $1,000
Early Termination Rules 7130: None
Second Benchmark Data 7132: Winkdex

FIG. 27B

First Indication of Interest 7134

From: Alice
To: Gemini

ID No. 12345 (7136)
Buy (7138)

FIG. 27C

First Indication of Interest 7140

From: Alice
To: Gemini

ID No. 12345 (7142)
Buy (7144)
Alice Public Address (7146)
100 Stable Value Coins (7148)

FIG. 27D

Second Indication of Interest 7150

From: Bob
To: Gemini

ID No. 54321 (7152)
Sell (7154)

FIG. 27E

Second Indication of Interest 7156

From: Bob
To: Gemini

ID No. 54321 (7158)
Sell (7160)
Bob Public Address (7162)
100 Stable Value Coins (7164)

FIG. 27F

S7302: Receiving, by an administrator system associated with an administrator, a contract request.

S7304: Generating, by the administrator system, graphical user interface information including at least one prompt for the first user to provide contract parameters related to the smart contract to be generated.

S7306: Sending, by the administrator system, the graphical user interface information to a first user device.

S7308: Receiving, from the first user device, in response to the at least one prompt, contract information related to the contract parameters of the contract to be generated.

S7310: Storing, in a memory operably connected to the administrator system, the contract information.

FIG. 28

S3916: Increasing the total supply of the digital asset tokens by a digital asset token issuer system S3920: generating a first transaction request including a first message including a first request to increase the total supply of the digital asset tokens to a second amount S3922: sending the first transaction request from a first designated public address to a fourth contract address S3924: sending the first transaction request from the fourth contract address to a second contract address S3926: obtaining a first unique lock identifier S3928: generating a second transaction request including a second message including a second request to unlock the total supply of the digital asset tokens

CONTINUED WITH FIG. 39D

FIG. 39C

```
CONTINUED FROM FIG. 39D
```

S3940: digitally signing, by the second computer system, the third transaction request using the second designated private key to generate a third digitally signed transaction request S3942: sending, from the portable memory device, the third digitally signed transaction request to the third contract address

FIG. 39E

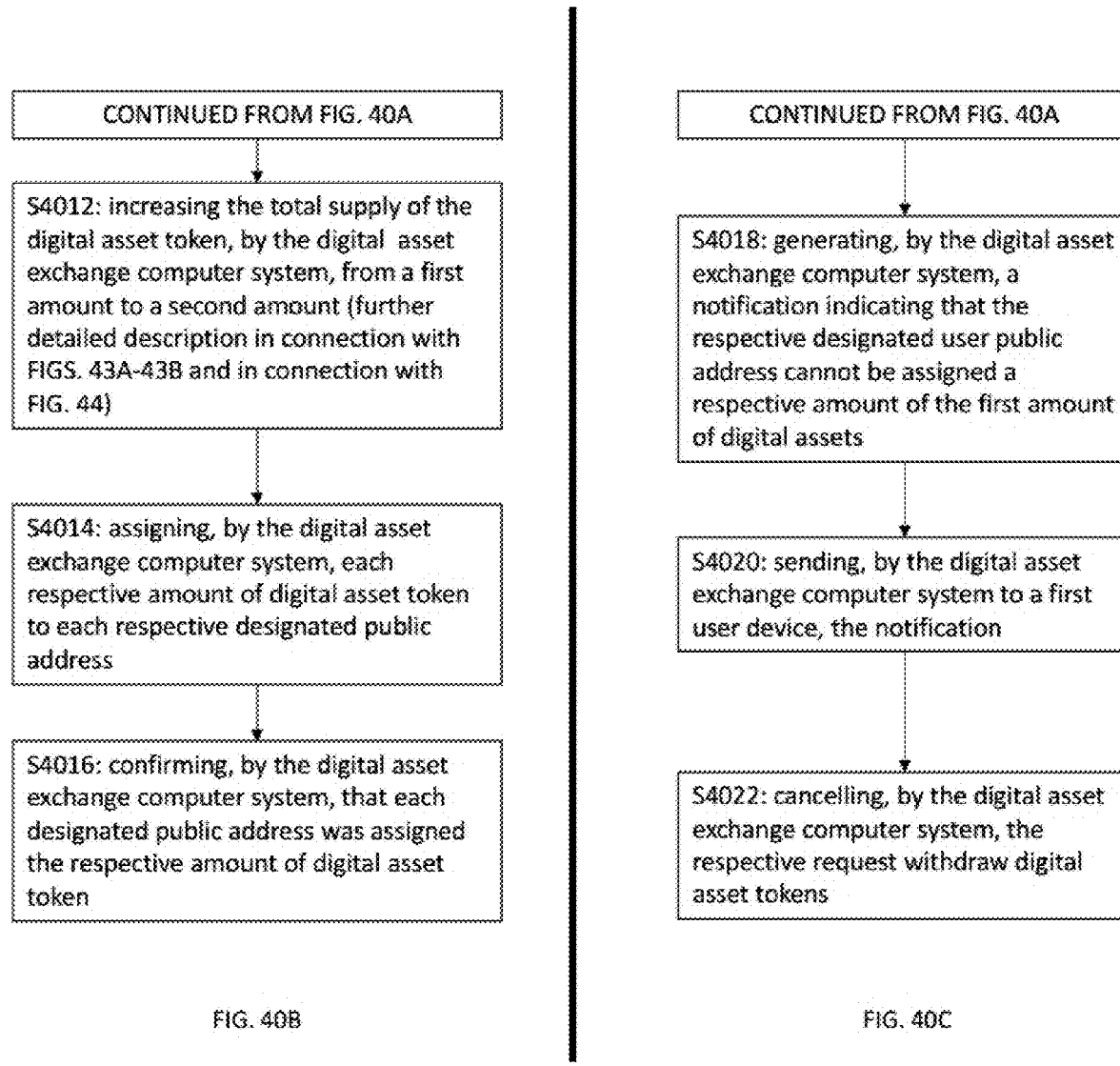

S4004: providing a plurality of designated key pairs, each of the plurality of designated key pairs including a respective designated public key of an underlying digital asset and a corresponding designated private key S4102: providing a first designated key pair of the plurality of designated key pairs, the first designated key pair including a first designated public key of the underlying digital asset and a corresponding first designated private key, wherein the first designated private key is stored on a first computer system which is connected to the distributed public transaction ledger through the internet S4104: providing a second designated key pair of the plurality of designated key pairs, the second designated key pair including a second designated public key of the underlying digital asset and a corresponding second designated private key, wherein the second designated private key is stored on a second computer system which is not operatively or physically connected to the distributed public transaction ledger or internet

FIG. 41

S4006: providing a plurality of smart contract instructions associated with a plurality of smart contracts associated with a digital asset token, each of the plurality of smart contracts being associated with a respective smart contract address associated with the underlying digital asset S4202: providing first smart contract instructions of the plurality of smart contract instructions (e.g. PROXY smart contract instructions) for a digital asset token associated with a first contract address associated with the underlying digital asset S4204: providing second contract instructions of the plurality of smart contract instructions (e.g. PRINT LIMITER smart contract instructions) for the digital asset token associated with a second contract address associated with the underlying digital asset S4206: providing third smart contract instructions of the plurality of smart contract instructions (e.g. custodian smart contract instructions) for the digital asset token associated with a third contract address associated with the underlying digital asset S4208: providing fourth smart contract instructions of the plurality of smart contract instructions (e.g. IMPL smart contract instructions) for the digital asset token associated with a fourth contract address associated with the underlying digital asset S4210: providing fifth smart contract instructions of the plurality of smart contract instructions (e.g. STORE smart contract instructions) for the digital asset token associated with a fourth contract address associated with the underlying digital asset

FIG. 42

S4012: increasing the total supply of the digital asset token, by a digital asset exchange computer system, from a first amount to a second amount S4302: generating, by the digital asset exchange computer system, a first transaction request including a first message including a first request to increase the total supply of the digital asset token to the second amount of digital asset tokens S4304: sending, by the digital asset exchange computer system, the first transaction request from a first public key address associated with a designated public key of a first designated key pair of the plurality of designated key pairs to a fifth contract address associated with a fifth smart contract of the plurality of smart contracts S4306: sending, by the digital asset exchange computer system, the first transaction request from the fifth contract address to a second contract address associated with a second smart contract of the plurality of smart contracts S4308: obtaining, by the digital asset exchange computer system, a first unique lock identifier, based on reference to the blockchain S4310: generating, by the digital asset exchange computer system, a second transaction request including a second message including a second request to unlock the total supply of the digital asset token in accordance with the first request and including the first unique lock identifier S4312: sending by the digital asset exchange computer system via the underlying blockchain, the second transaction request from the first public key address to a third contract address associated with a third smart contract of the plurality of smart contracts

CONTINUED WITH FIG. 43B

FIG. 43A

S4012: (optional): determining, for each designated public address of the list of designated public addresses, whether a respective designated public address is authorized S4502: accessing, by the digital asset exchange computer system, user identification data associated with each customer of the plurality of customers of the digital asset exchange S4504: determining whether the user identification data includes one or more whitelists

NO → CONTINUED WITH FIG. 40B

YES ↓

S4506: accessing, by the digital asset exchange computer system, the one or more whitelists, wherein each of the one or more whitelists includes at least one authorized public address S4508: determining whether the respective designated address is the at least one authorized public address

YES → CONTINUED WITH FIG. 40B

NO ↓

CONTINUED WITH FIG. 40C

FIG. 45

S4602: Providing a digital asset security token database including a log of digital asset security tokens including a first set of digital asset addresses and a respective digital asset security token amount

S4604: Providing a fiat-backed digital asset database stored on a distributed transaction ledger, the fiat-backed digital asset data base including a log of fiat backed digital assets including a second set of digital asset addresses and a respective fiat-backed digital asset amount

S4608: Obtaining, by a trusted entity system, a first sum of fiat-backed digital assets

S4610: Accessing, by the trusted entity system, the digital asset security token database

S4612: Determining a respective payment amount

S4614: Generating, by the trusted entity system, transaction instructions to transfer the respective payment amount

S4616: Publishing, by the trusted entity system to the peer-to-peer network, transaction instructions associated with crediting the respective payment amount

S4618: Notifying, each digital asset addresses of each respective transfer

FIG. 46

S4610: Accessing, by the trusted entity system, the digital asset security token database S4702: Determining each respective digital asset address of the first set of digital asset addresses for each respective digital asset security token holder S4704: Determining the respective digital asset security token amount associated with each respective digital asset address

FIG. 47

S4802: Authenticating, by a digital asset exchange computer system, an access request by a first user device S4808: Receiving, by the digital asset exchange computer system, an authentication request including first user credential information S4810: Determining, by the digital asset exchange computer system, that the first user device is authorized to access the digital asset exchange computer system S4812: Generating, by the digital asset exchange computer system, first graphical user interface information S4814: Transmitting, from the digital asset exchange computer system to the first user device, the first graphical user interface information

FIG. 48B

S4804: Obtaining, by the digital asset exchange computer system, a withdraw request

S4816: Receiving, by the digital asset exchange computer system, a first request to withdraw fiat-backed digital assets

S4818: Obtaining, by the digital asset exchange computer system, first account balance information of the first user indicating a first amount of available fiat

S4820: Generating, by the digital asset exchange computer system, second graphical user interface information

S4822: Transmitting, by the digital asset exchange to the first user device, the second graphical user interface information

S4824: Receiving, by the digital asset exchange computer system from the first user device, a second electronic withdrawal request of a first amount of fiat-backed digital assets

FIG. 48C

S4806: Processing, by the digital asset exchange computer system, the withdraw request S4826: Calculating, by the digital asset exchange computer system, a second amount of fiat based on the first amount of fiat-backed digital assets S4828: Determining, by the digital asset exchange computer system, that the second amount of fiat is less than or equal to the first amount of available fiat S4830: Determining, by the digital asset exchange computer system, a third amount of fiat associated with an updated amount of available fiat of the first user S4832: Updating, by the digital asset exchange computer system, a fiat account ledger database S4834: Updating, by the digital asset exchange computer system, a fiat-backed digital asset issuer fiat ledger S4836: Generating, by the digital asset exchange computer system, a first transaction request S4838: Transmitting, by the digital asset exchange computer system to a peer-to-peer network, the first transaction request S4840: Confirming the balance of the first user includes the first amount of fiat-backed digital assets

FIG. 48D

S4904: Obtaining, by the digital asset exchange computer system, a deposit request > S4908: Receiving, by the digital asset exchange computer system, a first request to deposit fiat-backed digital assets > S4910: Obtaining, by the digital asset exchange computer system, first account balance information of the first user indicating a first amount of available fiat > S4912: Obtaining, by the digital asset exchange computer system, a destination address > S4914: Generating, by the digital asset exchange computer system, second graphical user interface information > S4916: Transmitting, by the digital asset exchange computer system to the first user device, the second graphical user interface information > S4918: receiving, by the digital asset exchange computer system from the firs user device, a second deposit request

FIG. 49B

```
S4906: processing, by the digital asset exchange computer system, the deposit request S4920: Calculating, by the digital asset exchange computer system, a second
    amount of fiat based on the first amount of fiat-backed digital assets
                                    ↓
    S4922: Determining, by the digital asset exchange computer system, that a first
    amount of fiat-backed digital assets is present in a designated public address
                                    ↓
    S4924: Determining, by the digital asset exchange computer system, a third
    amount of fiat associated with an updated amount of available fiat of the first user
                                    ↓
    S4926: Updating, by the digital asset exchange computer system, a fiat account
    ledger database
                                    ↓
    S4928: Updating, by the digital asset exchange computer system, a fiat-backed
    digital asset issuer fiat ledger
                                    ↓
    S4930: Generating, by the digital asset exchange computer system, a first
    transaction request
                                    ↓
    S4932: (optional) updating, by the digital asset exchange computer system, a fiat
    backed digital asset issuer fiat ledger
                                    ↓
    S4934: transmitting, by the digital asset exchange computer system to the peer-
    to-peer network, the first transaction request
                                    ↓
    S4936: confirming that the first amount of fiat-backed digital assets are not
    present at the designated public address of the first user
```

FIG. 49C

S5006: receiving a first order to purchase an amount of a first non-fungible token S5014: receiving, by the non-fungible token platform from the first user device, a first order to purchase the amount of the first non-fungible token S5016: obtaining, by the non-fungible token platform, a first smart contract address associated with a first smart contract S5018: receiving, by the non-fungible token platform from the first user, a first payment for the amount of the first non-fungible token S5020: verifying, by the non-fungible token platform, the first order

FIG. 50B

SYSTEM, METHOD AND PROGRAM PRODUCT FOR OBTAINING DIGITAL ASSETS

REFERENCE TO RELATED APPLICATIONS

This application is a continuation-in-part of U.S. patent application Ser. No. 16/437,841, filed on Jun. 11, 2019 and entitled SYSTEM, METHOD AND PROGRAM PRODUCT FOR GENERATING AND UTILIZING STABLE VALUE DIGITAL ASSETS, which claims the benefit of and priority to each of U.S. Provisional Application No. 62/683,412, filed on Jun. 11, 2018 and entitled SYSTEM, METHOD AND PROGRAM PRODUCT FOR GENERATING AND UTILIZING STABLE VALUE DIGITAL ASSETS; U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/437,841 is a continuation-in-part of U.S. patent application Ser. No. 16/421,975, filed on May 24, 2019 and entitled SYSTEM, METHOD AND PROGRAM PRODUCT FOR MODIFYING A SUPPLY OF STABLE VALUE DIGITAL ASSET TOKENS, which is a continuation of U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS which claims the benefit of and priority to each of U.S. Provisional Application No. 62/638,679, filed on Mar. 5, 2018 and entitled SYSTEM, METHOD AND PROGRAM PRODUCT FOR GENERATING AND UTILIZING STABLE VALUE DIGITAL ASSETS; U.S. Provisional Application No. 62/647,353, filed on Mar. 23, 2018 and entitled SYSTEM, METHOD AND PROGRAM PRODUCT FOR GENERATING AND UTILIZING STABLE VALUE DIGITAL ASSETS; U.S. Provisional Application No. 62/660,655, filed on Apr. 20, 2018 and entitled SYSTEM, METHOD AND PROGRAM PRODUCT FOR GENERATING AND UTILIZING STABLE VALUE DIGITAL ASSETS; U.S. Provisional Application No. 62/683,412, filed on Jun. 11, 2018 and entitled SYSTEM, METHOD AND PROGRAM PRODUCT FOR GENERATING AND UTILIZING STABLE VALUE DIGITAL ASSETS; U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/036,469, filed on Jul. 16, 2018 and entitled SYSTEM, METHOD, AND PROGRAM PRODUCT FOR DEPOSITING AND WITHDRAWING STABLE VALUE DIGITAL ASSETS IN EXCHANGE FOR FIAT, which in turn is a continuation-in-part of U.S. patent application Ser. No. 16/020,534, filed on Jun. 27, 2018 and entitled SYSTEM, METHOD, AND PROGRAM PRODUCT FOR GENERATING AND UTILIZING STABLE VALUE DIGITAL ASSETS, which in turn is a continuation-in-part of U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of: U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/020,534 filed on Jun. 27, 2018 and entitled SYSTEM, METHOD, AND PROGRAM PRODUCT FOR GENERATING AND UTILIZING STABLE VALUE DIGITAL ASSETS, which claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/036,469 also claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/282,955, filed on Feb. 22, 2019 and entitled SYSTEMS, METHODS, AND PROGRAM PRODUCTS FOR DEPOSITING, HOLDING, AND/OR DISTRIBUTING COLLATERAL AS A TOKEN IN THE FORM OF DIGITAL ASSETS ON AN UNDERLYING BLOCKCHAIN, which in turn is a continuation-in-part to U.S. Non-Provisional patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN, which in turn claims priority to U.S. Provisional Application Ser. No. 62/684,023 filed on Jun. 12, 2018 and entitled SYSTEMS, METHODS, AND PROGRAM PRODUCTS FOR LOANING DIGITAL ASSETS; U.S. Provisional Application No. 62/680,775, filed on Jun. 5, 2018 and entitled SYSTEMS, METHODS, AND PROGRAM PRODUCTS FOR LOANING DIGITAL ASSETS; U.S. Provisional Application No. 62/702,265, filed on Jul. 23, 2018 and entitled SYSTEMS, METHODS, AND PROGRAM PRODUCTS FOR LOANING DIGITAL ASSETS AND FOR DEPOSITING, HOLDING, AND/OR DISTRIBUTING COLLATERAL AS A TOKEN ON AN UNDERLYING BLOCKCHAIN; U.S. Provisional Patent Application Ser. No. 62/764,978, filed on Aug. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN; and U.S. Provisional Patent Application Ser. No. 62/732,347, filed on Sep. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, the entire content of each of each of which is hereby incorporated by reference herein. U.S. Non-Provisional patent application Ser. No. 16/280,788 also claims priority as a continuation-in-part to U.S. Non-Provisional patent application Ser. No. 15/973,140, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application Ser. No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, U.S. Provisional Patent Application Ser. No. 62/642,931, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed on Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein. U.S. Non-Provisional patent application Ser. No. 16/280,788 also claims priority as a continuation-in-part to U.S. Non-Provisional patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, and U.S. Provisional Patent Application Ser. No. 62/647,353, filed on Mar. 23, 2018 and entitled SYSTEM, METHOD AND PROGRAM PRODUCT FOR GENERATING AND UTILIZING STABLE VALUE DIGITAL ASSETS and U.S. Provisional Patent Application Ser. No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/973,175, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application No. 62/642,931 filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, and U.S. Provisional Patent Application Ser. No. 62/660,655 filed on Apr. 20, 2018 and entitled SYSTEMS, METHODS, and PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/920,042, filed on Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, which in turn claims priority to U.S. Provisional Patent Application No. 62/629,417 filed Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

FIELD

The present invention relates to a method, system, and program product relating to obtaining one or more non-fungible digital assets on a peer-to-peer network, such as a blockchain.

BACKGROUND

In recent times, using blockchain technology, peer-to-peer networks and/or tokens to track inventory, including potentially, equities or shares in a fund has been a subject of a lot of discussion. Moreover, the use of smart contracts to generate tokens (such as security tokens) on a blockchain have also become the subject of a lot of discussion.

However, current blockchain technology (and other peer-to-peer networks), as implemented, do not have adequate technological solutions to paying interest, dividends, royalties and/or other forms of payouts on such investments in a stable value digital asset and/or a fiat-backed digital asset which is tied to the same blockchain and/or peer-to-peer network as security tokens.

Further, current blockchain technology, as implemented, does not have adequate technological solutions to provide for modifying a supply of stable value digital assets and/or fiat-backed digital assets in the context of directly printing such digital asset tokens to one or more customers or security token holders.

Accordingly, it would be beneficial to provide a method and system that provide for making payments (interest, dividends, royalties, to name a few) on digital assets that avoid one or more of the problems discussed above.

Accordingly, it would also be beneficial to provide for a method, system and program product that provide for modifying a supply of stable value digital assets and/or fiat-backed digital assets in the context of directly printing such digital asset to one or more customers, or security token holders, using blockchain technology (or other peer-to-peer technology) and thus avoid the problems discussed above.

SUMMARY

An object of embodiments of the present invention is to address technological challenges that currently exist in making payments (such as interest, dividends, royalties or other payments) on digital assets tied to a blockchain technology or other peer-to-peer networks.

An object of the present invention is to address technological challenges that currently exist in modifying a supply of stable value digital asset tokens tied to underlying blockchain technology associated with another digital asset.

This and other objects shall be addressed by embodiments of the present invention as set forth herein.

The present invention generally relates to a system, method and program product for modifying a supply stable value digital asset tokens tied to an underlying blockchain.

In embodiments, the present invention generally relates to the use of stable value digital assets and/or fiat-backed digital assets as cryptocurrencies that can be linked to other digital assets using blockchain technology and/or through a peer-to-peer network. In embodiments, the present invention relates to specific applications of fiat-backed digital assets and/or stable value digital asset tokens tied to a peer-to-peer network, such as a blockchain network.

A stable value digital asset token (e.g., SVCoin) is provided which may be pegged to a fiat currency such as USD, Euro, Yen, to name a few. For example, 1 SVCoin will have a net asset value ("NAV") of $1 USD. In embodiments, 100 SVCoins may have a NAV of $1 USD, so that 1 SVCoin has a NAV of 1 penny. Unlike Bitcoin and many other crypto protocols, the SVCoin will not have a natural cap (e.g., 22 million bitcoins) and, because it is pegged to a fiat currency, it will not fluctuate in value against such fiat currency as is typical of many crypto currencies.

In embodiments, the SVCoin can be issued by a trusted entity, like a digital asset exchange, bank, or other trusted entity using a token on an established blockchain, like ether or bitcoin, and smart contract technology. Thus, for example, a buyer can provide the trusted entity (e.g., digital asset exchange, bank, etc.) with a fixed sum of fiat (e.g., 50 USD) and in return be issued a corresponding fixed sum of SVCoin (e.g., 50 SVCoin). In embodiments, the digital asset exchange can be a regulated trust, such as Gemini Trust Company LLC ("Gemini"). In embodiments, other types of trusted entities (e.g., banks, trusts, etc.) may also be used to issue, administer, redeem, and/or otherwise manage the SVCoin. In embodiments, the trusted entity (digital asset exchange, bank, etc.) can charge a processing fee for issuing the SVCoin either in fiat or in a digital asset, such as the SVCoin. In embodiments, fiat deposited to the trusted entity (e.g., digital asset exchange) is maintained by the trusted entity on par with the amounts deposited. Thus, in embodiments, SVCoin is collateralized by fiat. SVCoin holders can also exchange SVCoin for fiat on the same notional basis with the trusted entity.

A fiat-backed digital asset is a digital asset which is collateralized by fiat. Examples of such collateralization may be by a trusted entity, like a digital asset exchange, bank, association, or other trusted entity, holding one or more forms of fiat (e.g., U.S. Dollars, Euros, Yen, Pounds, and/or Chinese Yuan, to name a few), in bank accounts (preferably insured such as through the use of FDIC insurance) or with securities (such as treasury bonds) or certificates of deposit, to name a few. In embodiments, a fiat-backed digital asset may be a digital asset which is collateralized fiat held in other types of financial instruments such as securities; stocks; bonds; and/or certificates of deposit, to name a few.

In embodiments, a method comprises: (a) providing, by a non-fungible token platform, a first designated key pair comprising a first designated public key and a corresponding first designated private key, wherein the non-fungible token platform comprises one or more computer systems operatively connected to a memory device, wherein the first designated private key is stored on the memory device, wherein the non-fungible token platform is associated with a first designated key pair comprising the first designated public key and the first designated private key, wherein the first designated public key corresponds to a first designated public address associated with an underlying digital asset, and wherein the underlying digital asset is maintained on a distributed public transaction ledger maintained in the form of a blockchain by a plurality of geographically distributed computer systems in a peer-to-peer network in the form of a blockchain; (b) authenticating, by the non-fungible token platform, a first user associated with a first user device by performing the following steps: (i) receiving, by the non-fungible token platform from the first user device, a user login request comprising user login credential information associated with a first user associated with the first user device; (ii) obtaining, by the non-fungible token platform, verified credential information associated with the first user; and (iii) verifying, by the non-fungible token platform, that the user login credential information is associated with a registered user account based at least on the received user login credential information and the verified credential information associated with the first user; (c) receiving a first order to purchase an amount of a first non-fungible token, wherein receiving the first order comprises the following: (i) receiving, by the non-fungible token platform from the first user device, the first order, wherein the first order comprises: (1) an identifier associated with the first non-fungible token, the identifier indicating a first type of non-fungible token; (2) the amount of the first non-fungible token; (3) a first retail price of the first non-fungible token; and (4) user destination information associated with the first user, wherein the user destination information comprises a first user public address associated with the underlying digital asset, wherein the first user public address is associated with the first user, and wherein the user destination information is stored on the memory operatively connected to the non-fungible token platform; (ii) obtaining, by the non-fungible token platform, a first smart contract address associated with a first smart contract, wherein the first smart contract is associated with first smart contract instructions that are saved as part of the blockchain and includes: (1) printing instructions indicating conditions under which the first non-fungible token is created; (2) modification instructions indicating conditions under which the first non-fungible token is modified; and (3) transfer instructions indicating conditions under which the non-fungible token is transferred; (iii) receiving, by the non-fungible token platform, a first payment of the first retail price from the first user; and (iv) verifying, by the non-fungible token platform, the first order by verifying: (1) the identifier associated with the first non-fungible token; (2) the type of non-fungible token (3) the amount of the first non-fungible token; (4) the first retail price of the first non-fungible token; and (5) the user destination information associated with the first user; (d) obtaining, by the non-fungible token platform at the first designated public address, at least a second amount of the underlying digital asset, wherein the second amount of the underlying digital asset corresponds to a first manufacturers price indicating a cost of creating the amount of the first non-fungible token; (e) obtaining, by the non-fungible token platform at the first designated public address, the amount of the first non-fungible token, wherein obtaining the amount of the first non-fungible token comprises the following steps: (i) generating, by the non-fungible token platform, a first message from the first public address to the first smart contract address, comprising: (1) transfer instructions including a first transfer of the second amount of the underlying digital asset from the first designated public address to the first smart contract address; and (2) first generation instructions to generate the amount of the first non-fungible token to the first designated public address wherein the first message includes a first digital signature based at least on the first designated private key; and (ii) publishing, by the non-fungible token platform to the blockchain via the Internet, the first message, wherein, upon receipt of the first message, the first smart contract executes the transfer instructions in accordance with the first smart contract instructions and the first generating instructions in accordance with the first smart contract instructions to generate the amount of the first non-fungible token in the first designated public address; (f) transferring, by the non-fungible token platform from the first designated public address to the first user public address, the amount of the first non-fungible token, wherein transferring the amount comprises the following steps: (i) generating, by the non-fungible token platform, a second transaction request including a second transfer of the amount of non-fungible token from the first designated public address to the first user public address, wherein the second transaction request includes a second digital signature based at least on first designated private key; (ii) publishing, by the non-fungible token platform via the blockchain, the second transaction request to the plurality of geographically distributed computer systems, wherein the second transaction request is executed by the plurality of geographically distributed computer systems, and wherein the execution of the second transaction request results in the amount of non-fungible tokens being transferred from the first designated public address to the first user public address; and (iii) confirming, by the non-fungible token platform, that the amount of non-fungible tokens is present at the first user public address based on reference to the blockchain.

In embodiments, receiving the first payment comprises: (1) generating, by the non-fungible token platform, first machine-readable instructions including a first graphical user interface comprising a first prompt requesting payment information from the first user; (2) sending, by the non-fungible token platform to the first user device, the first machine-readable instructions, wherein, upon receipt of the first machine-readable instructions, the first user device executes the first machine-readable instructions causing the first user device to display the first graphical user interface; and (3) receiving, by the non-fungible token platform from the first user device, user payment information associated with the first user, wherein the user payment information is stored on the memory device, and wherein the first payment is received by the non-fungible token platform using the user payment information. In embodiments, the user payment information comprises: (A) a credit card number associated with the first user; and (B) a billing address associated with the first user. In embodiments, the user payment information comprises a bank account number associated with the first user. In embodiments, the user payment information comprises automated clearing house payment information associated with the first user. In embodiments, the user payment information comprises a second user public address associated with the first user. In embodiments, the second user public address is the first user public address.

In embodiments, receiving the first payment comprises: (1) providing a user payment database operatively connected to the non-fungible token platform, wherein the user payment database comprises: (A) user payment information associated with the first user; (2) accessing, by the non-fungible token platform, the user payment database; and (3) retrieving, by the non-fungible token platform from the user payment database, the user payment information.

In embodiments, obtaining the second amount of the underlying digital asset comprises: (i) generating, by the non-fungible token platform, a third transaction request including: (1) a third transfer of a third amount of digital asset from a public address associated with the non-fungible token platform and the underlying digital asset to a second public address associated with the underlying digital asset; and (2) a fourth transfer of the second amount of the underlying digital asset from the second public address to the public address associated with the non-fungible token platform, wherein the third transaction request includes a third digital signature based at least on first designated private key; (ii) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the third transfer being executed and the fourth transfer being executed; and (iii) receiving, by the non-fungible token platform at the public address associated with the non-fungible token platform, the second amount of the underlying digital asset. In embodiments, obtaining the second amount of the underlying digital asset further comprises: (i) generating, by the non-fungible token platform, a fourth transaction request including: (1) a fifth transfer of the third amount of digital asset from the public address associated with the non-fungible token platform to the first designated public address, wherein the fourth transaction request includes a fourth digital signature based at least on first designated private key; (ii) publishing, by the non-fungible token platform via the blockchain, the fourth transaction request to the plurality of geographically distributed computer systems, wherein the fourth transaction request is executed by the plurality of geographically distributed computer systems, and wherein the execution of the fourth transaction request results in the fifth transfer being executed; and (iii) receiving, by the non-fungible token platform at the first designated public address, the second amount of the underlying digital asset. In embodiments, the public address associated with the non-fungible token platform is the first designated public address.

In embodiments, obtaining the second amount of the underlying digital asset comprises: (i) generating, by the non-fungible token platform, a third transaction request including: (1) a third transfer of a third amount of digital asset from the first designated public address to a second public address associated with the underlying digital asset; and (2) a fourth transfer of the second amount of the underlying digital asset from the second public address to the first designated public address, wherein the third transaction request includes a third digital signature based at least on first designated private key; (ii) publishing, by the non-fungible token platform via the blockchain, the third transaction request to the plurality of geographically distributed computer systems, wherein the fourth transaction request is executed by the plurality of geographically distributed computer systems, and wherein the execution of the third transaction request results in the third transfer being executed and the fourth transfer being executed; and (iii) receiving, by the non-fungible token platform at the first designated public address, the second amount of the underlying digital asset.

In embodiments, receiving the first order further comprises: (iv) generating, by the non-fungible token platform, a third transaction request including a request to generate a public address, wherein the third transaction request includes a third digital signature based at least on first designated private key; (v) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the first user public address being returned to the first designated public address, wherein, the execution of the third transaction request results in a second key pair being returned to the first designated public address, wherein the second key pair comprises a first user public key and a corresponding first user private key, wherein the first user private key is stored on the memory device, and wherein the first user public key corresponds to the first user public address; and (vi) sending, by the non-fungible token platform to the first user device, the first user public address and the first user public key. In embodiments, receiving the first order further comprises sending the first user private key, by the non-fungible token platform, to the first user device.

In embodiments, receiving the first order further comprises: (iv) receiving, by the non-fungible token platform from the first user device, the first user public address; and (v) storing, by the non-fungible token platform using the memory device, the first user public address.

In embodiments, receiving the first order further comprises: (1) providing a user destination database operatively connected to the non-fungible token platform, wherein the user payment database comprises: (A) the first user public address; (2) accessing, by the non-fungible token platform, the user destination database; and (3) retrieving, by the non-fungible token platform from the user destination database, the first user public address.

In embodiments, the first smart contract instructions further include: (4) combination instructions indicating conditions under which two or more first non-fungible tokens are combined to generate a new first non-fungible token.

In embodiments, the first retail price is a price of one of the first non-fungible token.

In embodiments, the first retail price is a price of the amount of the first non-fungible token.

In embodiments, the user login credential information comprises: (i) a username associated with the first user; and (ii) a password associated with the first user.

In embodiments, the user login credential information comprises: (i) biometric data associated with the first user.

In embodiments, the user login credential information comprises: (i) a phone number associated with the first user.

In embodiments, the user login credential information comprises: (i) a social security number associated with the first user.

In embodiments, the user login credential information comprises: (i) an e-mail address associated with the first user.

In embodiments, the first digital signature and the second digital are the same.

In embodiments, the first digital signature and the second digital are different.

In embodiments, the first transaction request includes a fee that is transferred from a public address associated with the non-fungible token platform to at least one miner of the blockchain.

In embodiments, the second transaction request includes a fee that is transferred from a public address associated with the non-fungible token platform to at least one miner of the blockchain.

In embodiments, the first non-fungible token is a cryptokitty.

In embodiments, the first non-fungible token is an everdragon.

In embodiments, the first non-fungible token is crypto baseball.

In embodiments, the first non-fungible token is mycryptoheroes.

In embodiments, the first non-fungible token is a marblecard.

In embodiments, a method comprises (a) providing, by a non-fungible token platform, a first designated key pair comprising a first designated public key and a corresponding first designated private key, wherein the non-fungible token platform comprises one or more computer systems operatively connected to a memory device, wherein the first designated private key is stored on the memory device, wherein the non-fungible token platform is associated with a first designated key pair comprising the first designated public key and the first designated private key, wherein the first designated public key corresponds to a first designated public address associated with an underlying digital asset, and wherein the underlying digital asset is maintained on a distributed public transaction ledger maintained in the form of a blockchain by a plurality of geographically distributed computer systems in a peer-to-peer network in the form of a blockchain; (b) authenticating, by the non-fungible token platform, a first user associated with a first user device by performing the following steps: (i) receiving, by the non-fungible token platform from the first user device, a user login request comprising user login credential information associated with a first user associated with the first user device; (ii) obtaining, by the non-fungible token platform, verified credential information associated with the first user; and (iii) verifying, by the non-fungible token platform, that the user login credential information is associated with a registered user account based at least on the received user login credential information and the verified credential information associated with the first user; (c) receiving a first order to purchase an amount of a first non-fungible token, wherein receiving the first order comprises the following: (i) receiving, by the non-fungible token platform from the first user device, the first order, wherein the first order comprises: (1) an identifier associated with the first non-fungible token, the identifier indicating a first type of non-fungible token; (2) the amount of the first non-fungible token; (3) a first retail price of the first non-fungible token; and (4) user destination information associated with the first user, wherein the user destination information comprises a first user public address associated with the underlying digital asset, wherein the first user public address is associated with the first user, and wherein the user destination information is stored on the memory operatively connected to the non-fungible token platform; (ii) obtaining, by the non-fungible token platform, a first smart contract address associated with a first smart contract, wherein the first smart contract is associated with first smart contract instructions that are saved as part of the blockchain and includes: (1) printing instructions indicating conditions under which the first non-fungible token is created; (2) modification instructions indicating conditions under which the first non-fungible token is modified; and (3) transfer instructions indicating conditions under which the non-fungible token is transferred; (iii) receiving, by the non-fungible token platform, a first payment of the first retail price from the first user; and (iv) verifying, by the non-fungible token platform, the first order by verifying: (1) the identifier associated with the first non-fungible token; (2) the type of non-fungible token (3) the amount of the first non-fungible token; (4) the first retail price of the first non-fungible token; and (5) the user destination information associated with the first user; (d) obtaining, by the non-fungible token platform at the first designated public address, at least a second amount of a first digital asset, wherein the second amount of the first digital asset corresponds to a first manufacturers price indicating a cost of creating the amount of the first non-fungible token; (e) obtaining, by the non-fungible token platform at the first designated public address, the amount of the first non-fungible token, wherein obtaining the amount of the first non-fungible token comprises the following steps: (i) generating, by the non-fungible token platform, a first message from the first public address to the first smart contract address, comprising: (1) transfer instructions including a first transfer of the second amount of the first digital asset from the first designated public address to the first smart contract address; and (2) first generation instructions to generate the amount of the first non-fungible token to the first designated public address wherein the first message includes a first digital signature based at least on the first designated private key; and (ii) publishing, by the non-fungible token platform to the blockchain via the Internet, the first message, wherein, upon receipt of the first message, the first smart contract executes the transfer instructions in accordance with the first smart contract instructions and the first generating instructions in accordance with the first smart contract instructions to generate the amount of the first non-fungible token in the first designated public address; (f) transferring, by the non-fungible token platform from the first designated public address to the first user public address, the amount of the first non-fungible token, wherein transferring the amount comprises the following steps: (i) generating, by the non-fungible token platform, a second transaction request including a second transfer of the amount of non-fungible token from the first designated public address to the first user public address, wherein the second transaction request includes a second digital signature based at least on first designated private key; (ii) publishing, by the non-fungible token platform via the blockchain, the second transaction request to the plurality of geographically distributed computer systems, wherein the second transaction request is executed by the plurality of geographically distributed computer systems, and wherein the execution of the second transaction request results in the amount of non-fungible tokens being transferred from the first designated public address to the first user public address; and (iii) confirming, by the non-fungible token platform, that the amount of non-fungible tokens is present at the first user public address based on reference to the blockchain.

[In embodiments, receiving the first payment comprises: (1) generating, by the non-fungible token platform, first machine-readable instructions including a first graphical user interface comprising a first prompt requesting payment information from the first user; (2) sending, by the non-fungible token platform to the first user device, the first machine-readable instructions, wherein, upon receipt of the first machine-readable instructions, the first user device executes the first machine-readable instructions causing the first user device to display the first graphical user interface; and (3) receiving, by the non-fungible token platform from the first user device, user payment information associated with the first user, wherein the user payment information is stored on the memory device, and wherein the first payment is received by the non-fungible token platform using the user payment information. In embodiments, the user payment information comprises: (A) a credit card number associated with the first user; and (B) a billing address associated with the first user. In embodiments, the user payment information comprises a bank account number associated with the first user. In embodiments, the user payment information comprises automated clearing house payment information associated with the first user. In embodiments, the user payment information comprises a second user public address associated with the first user. In embodiments, the second user public address is the first user public address.

In embodiments, receiving the first payment comprises: (1) providing a user payment database operatively connected to the non-fungible token platform, wherein the user payment database comprises: (A) user payment information associated with the first user; (2) accessing, by the non-fungible token platform, the user payment database; and (3) retrieving, by the non-fungible token platform from the user payment database, the user payment information.

In embodiments, obtaining the second amount of the first digital asset comprises: (i) generating, by the non-fungible token platform, a third transaction request including: (1) a third transfer of a third amount of a second digital asset from a public address associated with the non-fungible token platform and the underlying digital asset to a second public address associated with the underlying digital asset; and (2) a fourth transfer of the second amount of the first digital asset from the second public address to the public address associated with the non-fungible token platform, wherein the third transaction request includes a third digital signature based at least on first designated private key; (ii) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the third transfer being executed and the fourth transfer being executed; and (iii) receiving, by the non-fungible token platform at the public address associated with the non-fungible token platform, the second amount of the first digital asset. In embodiments, obtaining the second amount of the first digital asset further comprises: (i) generating, by the non-fungible token platform, a fourth transaction request including: (1) a fifth transfer of the third amount of the second digital asset from the public address associated with the non-fungible token platform to the first designated public address, wherein the fourth transaction request includes a fourth digital signature based at least on first designated private key; (ii) publishing, by the non-fungible token platform via the blockchain, the fourth transaction request to the plurality of geographically distributed computer systems, wherein the fourth transaction request is executed by the plurality of geographically distributed computer systems, and wherein the execution of the fourth transaction request results in the fifth transfer being executed; and (iii) receiving, by the non-fungible token platform at the first designated public address, the third amount of the first digital asset. In embodiments, the public address associated with the non-fungible token platform is the first designated public address.

In embodiments, obtaining the second amount of the first digital asset comprises: (i) generating, by the non-fungible token platform, a third transaction request including: (1) a third transfer of a third amount of a second digital asset from the first designated public address to a second public address associated with the underlying digital asset; and (2) a fourth transfer of the second amount of the first digital asset from the second public address to the first designated public address, wherein the third transaction request includes a third digital signature based at least on first designated private key; (ii) publishing, by the non-fungible token platform via the blockchain, the third transaction request to the plurality of geographically distributed computer systems, wherein the fourth transaction request is executed by the plurality of geographically distributed computer systems, and wherein the execution of the third transaction request results in the third transfer being executed and the fourth transfer being executed; and (iii) receiving, by the non-fungible token platform at the first designated public address, the second amount of the first digital asset.

In embodiments, receiving the first order further comprises: (iv) generating, by the non-fungible token platform, a third transaction request including a request to generate a public address, wherein the third transaction request includes a third digital signature based at least on first designated private key; (v) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the first user public address being returned to the first designated public address, wherein, the execution of the third transaction request results in a second key pair being returned to the first designated public address, wherein the second key pair comprises a first user public key and a corresponding first user private key, wherein the first user private key is stored on the memory device, and wherein the first user public key corresponds to the first user public address; and (vi) sending, by the non-fungible token platform to the first user device, the first user public address and the first user public key. In embodiments, receiving the first order further comprises sending the first user private key, by the non-fungible token platform, to the first user device.

In embodiments, receiving the first order further comprises: (iv) receiving, by the non-fungible token platform from the first user device, the first user public address; and (v) storing, by the non-fungible token platform using the memory device, the first user public address.

In embodiments, receiving the first order further comprises: (1) providing a user destination database operatively connected to the non-fungible token platform, wherein the user payment database comprises: (A) the first user public address; (2) accessing, by the non-fungible token platform, the user destination database; and (3) retrieving, by the non-fungible token platform from the user destination database, the first user public address.

In embodiments, the first smart contract instructions further include: (4) combination instructions indicating conditions under which two or more first non-fungible tokens are combined to generate a new first non-fungible token.

In embodiments, the first retail price is a price of one of the first non-fungible token.

In embodiments, the first retail price is a price of the amount of the first non-fungible token.

In embodiments, the user login credential information comprises: (i) a username associated with the first user; and (ii) a password associated with the first user.

In embodiments, the user login credential information comprises: (i) biometric data associated with the first user.

In embodiments, the user login credential information comprises: (i) a phone number associated with the first user.

In embodiments, the user login credential information comprises: (i) a social security number associated with the first user.

In embodiments, the user login credential information comprises: (i) an e-mail address associated with the first user.

In embodiments, the first digital signature and the second digital are the same.

In embodiments, the first digital signature and the second digital are different.

In embodiments, the first transaction request includes a fee that is transferred from a public address associated with the non-fungible token platform to at least one miner of the blockchain.

In embodiments, the second transaction request includes a fee that is transferred from a public address associated with the non-fungible token platform to at least one miner of the blockchain.

In embodiments, the first non-fungible token is a crypto-kitty.

In embodiments, the first non-fungible token is an ever-dragon.

In embodiments, the first non-fungible token is crypto baseball.

In embodiments, the first non-fungible token is mycryptoheroes.

In embodiments, the first non-fungible token is a marble-card.

In embodiments, the first digital asset is bitcoin.
In embodiments, the first digital asset is ether.
In embodiments, the first digital asset is litecoin.
In embodiments, the first digital asset is bitcoin cash.
In embodiments, the first digital asset is zcash.
In embodiments, the first digital asset is a digital asset token. In embodiments, the digital asset token is Gemini dollar

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing digital addresses in accordance with exemplary embodiments of the present invention;

FIG. 2A is an exemplary screen shot of a Security Token ledger in accordance with exemplary embodiments of the present invention;

FIGS. 11A-1-11A-4 illustrate an exemplary embodiment of a dashboard fiat interface which allows registered users to deposit and/or withdraw fiat with the digital asset exchange in accordance with exemplary embodiments of the present invention;

FIGS. 11B-1-11B-4 illustrate an exemplary dashboard digital asset interface which allows registered users to deposit and/or withdrawal digital assets with the digital asset exchange system in accordance with exemplary embodiments of the present invention;

FIGS. 11C-1-11C-2 illustrate an exemplary dashboard SVCoin interface which allows registered users to purchase and/or redeem SVCoins for fiat or digital with the digital asset exchange system in accordance with exemplary embodiments of the present invention;

FIG. 12 illustrates an exemplary flow reflecting an exemplary embodiment where a Security Token issuer initiates a transfer of SVCoins to Security Token holders in accordance with exemplary embodiments of the present invention;

FIGS. 14A-14G illustrate an exemplary process flow chart of a process reflecting an exemplary embodiment of a method of issuing a stable value digital asset token in accordance with exemplary embodiments of the present invention;

FIG. 16B is an exemplary flowchart of a process for authenticating an access request by a user device in accordance with exemplary embodiments in the present invention;

FIG. 16C is an exemplary flowchart of a process for obtaining a withdraw request in accordance with exemplary embodiments in the present invention;

FIGS. 16D-16E are exemplary flowcharts of a process for processing a withdraw request in accordance with exemplary embodiments in the present invention;

FIG. 17B is an exemplary flowchart of a process for authenticating an access request by a user device in accordance with exemplary embodiments in the present invention;

FIG. 17C is an exemplary flowchart of a process for obtaining a deposit request in accordance with exemplary embodiments in the present invention;

FIGS. 17D-17E are exemplary flowcharts of a process for processing a deposit request in accordance with exemplary embodiments in the present invention;

FIG. 18B is a schematic drawing of an exemplary proxy smart contract in accordance with exemplary embodiments of the present invention;

FIG. 18C is a schematic drawing of an exemplary print limiter contract in accordance with exemplary embodiments of the present invention;

FIG. 18D is a schematic drawing of an exemplary custodian smart contract in accordance with exemplary embodiments of the present invention;

FIG. 20A-1 is a flowchart of an exemplary process of increasing the total supply of tokens of a digital asset token using off-line keys in accordance with exemplary embodiments of the present invention;

FIG. 20C is another flowchart of an exemplary process of increasing the total supply of tokens of a digital asset token in accordance with exemplary embodiments of the present invention;

FIG. 21A is a flowchart of an exemplary process of increasing the total supply of tokens of a digital asset token in accordance with exemplary embodiments of the present invention;

FIG. 25B is a schematic drawing of data structures associated with an exemplary security token on an underlying blockchain including smart contract instruction modules in accordance with exemplary embodiments of the present invention;

FIG. 25C is a schematic drawing of data structures associated with an exemplary stable value token (SVCoin Token) including smart contract instruction modules in accordance with exemplary embodiments of the present invention;

FIG. 26A is a flow chart of a processes for holding collateral for a security token in the form of a stable value token in a smart contract on an underlying blockchain in accordance with exemplary embodiments of the present invention;

FIGS. 26B-26C are flowcharts of an exemplary sub-process of setting up a trade between a first user and a second user in accordance with exemplary embodiments of the present invention;

FIG. 26D is a flowchart of another exemplary sub-process of setting up a trade between a first user and a second user in accordance with another exemplary embodiment of the present invention;

FIG. 26F is a flowchart of another exemplary sub-process of collecting excess collateral from a first user and a second user in a trade in accordance with exemplary embodiments;

FIGS. 27A-27B are exemplary graphical user interfaces (GUIs) showing exemplary published contracts in accordance with exemplary embodiments;

FIGS. 27C-27D are exemplary GUIs showing exemplary first indications of interest from user Alice in accordance with exemplary embodiments;

FIGS. 27E-27F are exemplary GUIs showing exemplary second indications of interest from user Bob in accordance with exemplary embodiments;

FIG. 28 is a flow chart of a processes for generating a smart contract on an underlying blockchain in accordance with exemplary embodiments of the present invention;

FIGS. 39A-39E are flow charts of processes for increasing a total supply of digital asset tokens in accordance with exemplary embodiments of the present invention;

FIGS. 40A-40C are flow charts of processes for withdrawing digital asset tokens in accordance with exemplary embodiments of the present invention;

FIG. 41 is a flow chart of a process for providing a plurality of designated key pairs in accordance with exemplary embodiments of the present invention;

FIG. 42 is a flow chart of a process for providing a plurality of smart contract instructions in accordance with exemplary embodiments of the present invention;

FIGS. 43A-43B are flow charts of processes for increasing a total supply of digital asset tokens in accordance with exemplary embodiments of the present invention;

FIG. 45 is a flow chart of a process for verifying a designated public address in accordance with exemplary embodiments of the present invention;

FIG. 46 is a flow chart of a process for issuing electronic payments using a fiat-backed digital asset on a digital asset security token in accordance with exemplary embodiments of the present invention;

FIG. 47 is a flow chart of a process for issuing electronic payments using a fiat-backed digital asset on a digital asset security token in accordance with exemplary embodiments of the present invention;

FIGS. 48A-48D are flow charts of a process for withdrawing fiat-backed digital asset on a digital asset security token in accordance with exemplary embodiments of the present invention;

FIGS. 49A-49C are flow charts of a process for depositing fiat-backed digital asset on a digital asset security token in accordance with exemplary embodiments of the present invention;

FIG. 50B is an exemplary flow chart of a process for receiving an order to purchase an amount of non-fungible token in accordance with exemplary embodiments of the present invention;

DETAILED DESCRIPTION

Figure 1:
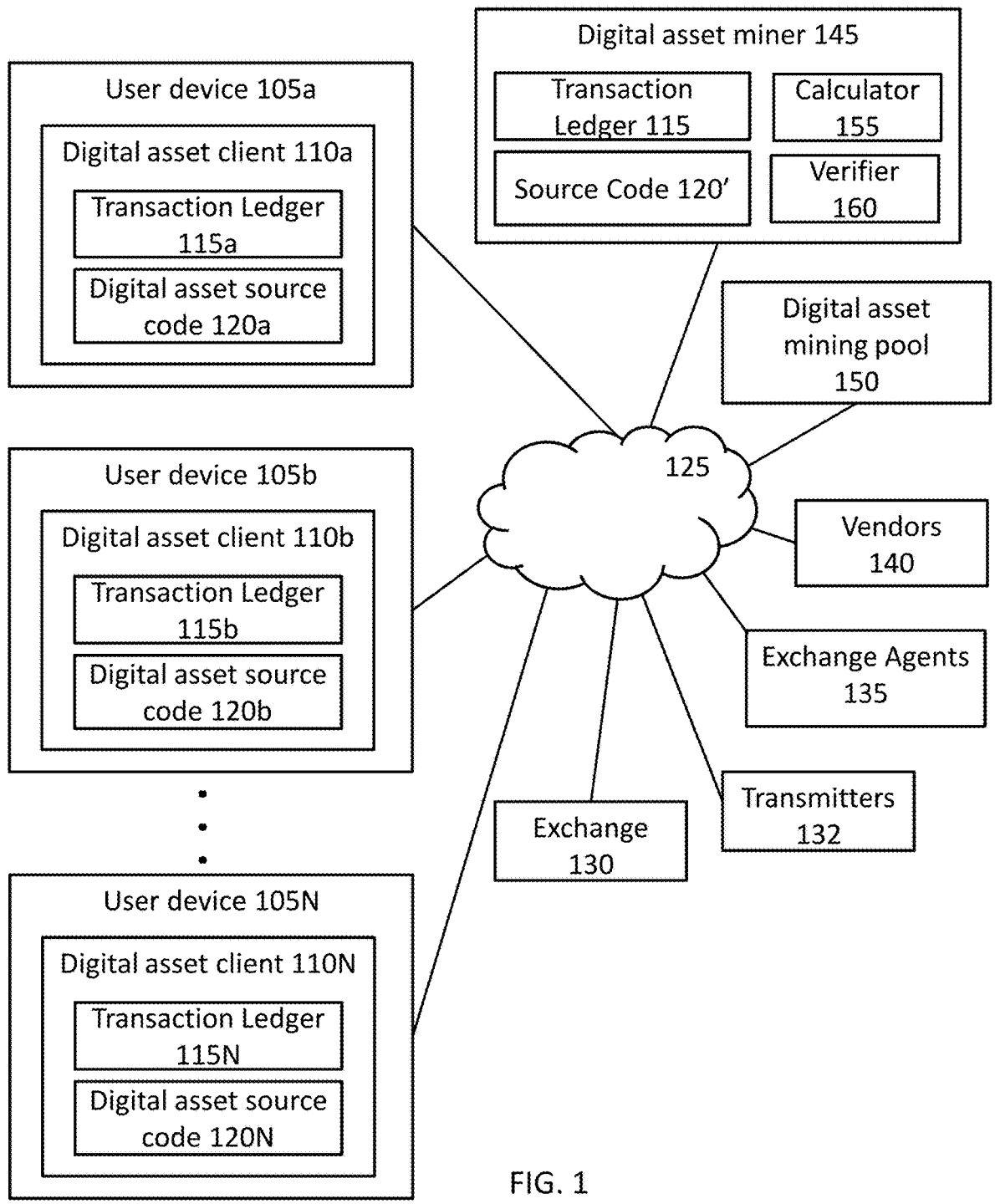
FIG. 1 is a schematic diagram of a digital asset network in accordance with exemplary embodiments of the present invention.

The present invention generally relates to a system, method and program product for the generating and distribution of a stable value digital asset token tied to an underlying blockchain or other peer-to-peer network.

Digital Math-Based Assets and Bitcoin

A digital math-based asset is a kind of digital asset based upon a computer generated mathematical and/or cryptographic protocol that may, among other things, be exchanged for value and/or be used to buy and sell goods or services. A digital math-based asset may be a non-tangible asset that is not based upon a governmental rule, law, regulation, and/or backing. The Bitcoin system represents one form of digital math-based asset. The Ethereum system represents another form of digital math-based asset, which allows for smart contracts, as discussed below. The Libra Blockchain system represents another form of digital math-based asset, which also allows for smart contracts.

A bitcoin may be a unit of the Bitcoin digital math-based asset. An ether may be a unit of the Ethereum digital math-based asset. A libra may be a unit of the Libra digital math-based asset.

Other examples of digital assets, including digital math-based assets, include Bitcoin, Ethereum, Ripple, Cardano, Litecoin, NEO, Stellar, IOTA, NEM, Dash, Monero, Lisk, Qtum, Zcash, Nano, Steem, EOS, TRON, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, *Nexus*, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, *Pura*, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether, Libra, Ether Classic and PhenixCoin, to name a few. In embodiments, digital assets, such as bitcoin, ether, or libra, (to name a few) may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, the NEO Blockchain, the Stellar Blockchain, the Libra Blockchain, to name a few). As such, it is a set of code with an associated database. In embodiments, the database may be maintained by an issuer. The code describes the behavior of the token, and the database is may be a table with rows and columns or the like tracking who owns how many tokens. In embodiments, digital asset tokens, such as Gemini Dollars, or Gas to name a few, may be accepted in trade or commerce by merchants, other businesses, and/or individuals in many parts of the world.

Examples of blockchain networks include the Bitcoin Network, the Ethereum Network, the NEO Network, Hyperledger Fabric Network, IBM Blockchain Network, Multichain Network, Hydrachain Network, Ripple Network, R3 Corda Network, BigChain DB Network, Open-Chain Network, IOTA Network, the Libra Network, AIBlockchain Network, to name a few.

Examples of digital asset tokens include Gemini Dollars, Tether, UNUS SED LEO, Maker, Chainlink, Crypto.com, Basic Atten, USD Coin, OmiseGo, BitTorrent, Holo, TrueUSD, Pundi X, Ox, Augur, Huobi Token, Auroa, Zilliqa, Dent, Quibitica, KuCoin Shares, Paxos, IOST, HedgeTrade, ThoreCoin, Insight Chain, Egretia, Nash Exchange, Mixin, Enjin Coin, aelf, Status, VestChain, Solve, MidSafeCoin, Golem, WAX, Dai, Santiment Network Token, Maximine Coin, Waltonchain, ODEM, EDUCare, Lambda, Loom Network, NEXT, DigixDAO, Loopring, Decentraland, Quant, Clipper Coin, Orbs, Nexo, Ignis, Revain, Fusion, Japan Content Token, QASH, Power Ledger, *Celer* Network, Poopulous, Enigma, Buggyra Coin Zero, Bancor, LATOKEN, Matic Network, Fantom, Cortex, Kyber Network, Digitex Futures, Ren, Ecoreal Estate, Polymath, QuarkChain, Arcblock, Storj, Statis Eurs, Bread, FunFair, Sythetix Network Token, IoTeX, CRYPTO20, Gas, IOT Chain, Centrality, Veritaseum, Iconomi, RIF Toekn, Eidoo, Bibox Token, LINA, Hyperion, UGAS, XMax, Cred, Civic, iExecRLC, Mithril, Metal, TenX, JPM Coin, to name a few.

In embodiments, a smart contract may be a computer protocol intended to digitally facilitate, verify, or enforce the negotiation or performance of credible transactions without third parties. In embodiments, smart contracts may also allow for the creation and/or destruction of tokens.

In embodiments, a digital math-based asset may be based on an open source mathematical and/or cryptographic protocol, which may exist on a digital asset network, such as a Bitcoin network, an Ethereum network, a NEO network, or a Libra network, to name a few. The network may be centralized (e.g., run by one or more central servers) or decentralized (e.g., run through a peer-to-peer network). The network may be an open network or a closed network. In embodiments, where the network is a closed network, the network may include administrative nodes (e.g. maintained by one or more validators) which may be access points for other systems to interact with the network. In embodiments, the network may be a semi-private and/or semi-public network. In embodiments, the network may be a closed network that transitions into an open network. Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network (e.g., via a peer-to-peer sharing). Ledger updates may be broadcast to the users and/or nodes across the network. Each user and/or node may maintain an electronic copy of all or part of the ledger, as described herein. In embodiments, a digital asset system may employ a ledger that tracks transactions (e.g., transfers of assets from one address to another) without necessarily identifying the assets themselves. In embodiments, the digital asset system may use other forms of peer-to-peer electronic ledger system.

In embodiments the ledger may include a plurality of states, where the state is updated, for example, when one or more transactions are executed and/or committed to the ledger. For example, in the Ethereum Network, a state may use a Merkel Tree data format. A ledger state, in embodiments, may be structured as a key-value store which maps public addresses to account values. In embodiments, when a new ledger state is generated, unchanged portions of the previous ledger state(s) may be reused. Each state of the ledger, in embodiments, may be maintained by one or more nodes, such as systems run by miners or trusted entities (e.g. a validator or an association of validators). Each node may maintain some or all the states of the ledger. In embodiments, each node maintains an electronic copy of the most recent ledger state to execute and/or commit a new transaction. In embodiments, other client devices (e.g. customer systems) may request, receive, and/or maintain a copy of the ledger from a node.

In embodiments, a digital asset ledger, such as the Bitcoin blockchain or the Ethereum blockchain, a NEO blockchain, a Libra blockchain, to name a few, can be used to achieve consensus and to solve double-spending problems where users attempt to spend the same digital assets in more than one transaction. In embodiments, before a transaction may be cleared, the transaction participants may need to wait for some period of time, e.g., a set confirmation wait (typically one hour in the context of the Bitcoin network, 15 minutes in the context of the Litecoin network, to name a few) before feeling confident that the transaction is valid (e.g., not a double count). Each update to the decentralized electronic ledger (e.g., each addition of a block to the Bitcoin blockchain or the Ethereum blockchain) following execution of a transaction may provide a transaction confirmation. After a plurality of updates to the ledger (e.g., 6 updates) the transaction may be confirmed with certainty or high certainty.

In embodiments, a blockchain may include status information for each block within the blockchain. For example, the Ethereum blockchain has status information stored in a Merkel Tree data structure. A Merkel Tree may also be utilized as the decentralized or peer-to-peer electronic ledger, where each transaction or a majority of the transactions, associated with the decentralized or peer-to-peer electronic ledger is recorded, published, and/or stored. A Merkel Tree, in embodiments, may include a root hash of the ledger history structure (e.g. the authenticator to the complete state of the ledger that is signed by a quorum of trusted entities). As transactions are added to the ledger, the root hash of the ledger history structure grows. In embodiments, such as the Libra Network, as the ledger grows in size, one or more nodes may "prune" the Merkel Tree by eliminating old states that are not necessary for the processing of new transactions. In embodiments, the states that are "pruned" may store a representation (e.g. a hash) of the "pruned" states, allowing one or more nodes and/or users (e.g., clients) to access the old states if the ledger is queried. In the context of one or more the Merkel Tree embodiments, each transaction (or batch of transactions) that are executed and/or committed, may result in a new "leaf" being added to the Merkel Tree. Each new "leaf" of the Merkel Tree may also include data that is generated as a result of the execution of the new transaction(s). The aforementioned data, in embodiments, may be stored in its own "leaf" which may be separate from the "leaf" associated with the executed and/or committed transaction. For example, the data generated may enable a user to confirm that the transaction was executed.

In embodiments, a blockchain or peer-to-peer network can be a public transaction ledger of the digital math-based asset that is maintained by a distributed network, such as the Bitcoin network, the Ethereum network, the NEO network or the Libra network to name a few. For example, one or more computer systems (e.g., miners or nodes) or pools of computer systems (e.g., mining pools or node pools) can solve algorithmic equations allowing them to add records of recent transactions (e.g., blocks), to a chain of transactions. In embodiments, miners (or nodes) or pools of miners (or nodes pools) may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

In embodiments, such as when used in conjunction with the Libra Network (and the like), one or more computer systems and/or administrative nodes (e.g. validators or a trusted entity) or pools of computer systems and/or pools of administrative nodes (e.g. an association of validators or a group of trusted entities) can execute one or more transactions (e.g. blocks of transactions) causing records to be added to a transaction ledger (for example, adding another block to a blockchain, or leaf (or leaves) to a Merkel Tree). As previously mentioned, in embodiments, validators or associations of validators may perform such services in exchange for some consideration such as an upfront fee (e.g., a set amount of digital math-based assets), a payment of transaction fees (e.g., a fixed amount or set percentage of the transaction) from users whose transactions are recorded in the block being added, and/or from a return based off interest earned off of the fiat backing a fiat backed digital asset. In embodiments, digital assets in the form of a digital asset token, such as Gas, may be used to pay such fees.

The digital asset network (e.g., Bitcoin network, Ethereum network, Neo network, Libra network, to name a few) may timestamp transactions by including them in blocks that form an ongoing chain called a blockchain or other status updates like in the Libra network. In embodiments, the addition of a block (or status update) may occur periodically, e.g., approximately every 15 seconds, every minute, every 2.5 minutes or every 10 minutes, to name a few. Such blocks (or status updates) cannot be changed without redoing the work that was required to create each block since the modified block. The longest blockchain may serve not only as proof of the sequence of events but also records that this sequence of events was verified by a majority of the digital asset network's computing power. In embodiments, the blockchain recognized by the nodes corresponding to the majority of computing power, or some other consensus mechanism, will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042 filed Mar. 13, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of which is hereby incorporated by reference herein.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept short (e.g., 3 seconds for EOS) and producers may be punished for not participating by being removed from consideration. In embodiments, a producer may have to produce a minimal number of block, e.g., at least one block every 24 hours to be in consideration. In embodiments, all of the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated *byzantine* fault tolerance protocol (or *Byzantine* Fault model) ("BFT") may be used as a consensus mechanism. In embodiments, the BFT may allow one or more trusted entities (or validators) to arbitrarily deviate from the protocol. In embodiments, deviating from the protocol may be limited by computational boundaries (e.g. cryptographic assumptions). The BFT, in embodiments, may enable a system to continue to function, even if one or more entities of a set of trusted entities are no longer trusted. An entity may not be a trusted entity if the entity, for example, is colluding and/or behaving maliciously to try to sabotage the system. An example of a BFT protocol is used in connection with NEO. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e. for the block to be added. If a sufficient majority is not obtained (e.g., less than 66% approval), a new speaker is chosen, and the process starts again. As another example, a BFT (e.g. the LibraBFT) may require 3*X+1 votes to be cast and distributed among a set of trusted entities. X, in this example, may refer to an integer pre-selected that is determined to have a correct balance of honesty, safety, and/or efficiency. In embodiments, X may refer to a variable that fluctuates. Continuing the example, if the number of votes equals and/or drops below X, the trusted entities may fork.

In embodiments, a consensus protocol (e.g. BFT) may allow a set of nodes to create a logical appearance of a single database. The consensus protocol, in embodiments, may replicate submitted transactions among a set of trusted entities, provide a mechanism for executing transactions against a ledger (e.g. database), and then provide a mechanism for a set of trusted entities to agree on one or more transactions to execute. A consensus protocol, in embodiments, may also mitigate one or more hardware and/or software failures. In embodiments, a consensus protocol may maintain the integrity of a system in the event that trusted entities crash and/or restart, even if all of a set of trust entities restart at the same time. In embodiments, a consensus protocol may be implemented by one or more entities (e.g. a trusted entity or pool of trusted entities). In the case where only one entity is implementing a consensus protocol (e.g. god mode), a quorum may be one vote (e.g. to execute one or more transactions). In the case where more than one entity is implementing a consensus protocol, a quorum may be a majority (or another percentage of the total number of entities) of the more than one entities.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

In embodiments, other consensus mechanisms may be used such a proof of capacity, proof of elapsed time, to name a few.

Proof of capacity is a consensus mechanism that uses a process called plotting. Proof of capacity uses pre-stored solutions in digital storage (such as non-volatile memory like hard disks). After a storage has been "plotted" (e.g., been filled with solutions), it can be part of the block creation process. The node that has the fastest solution to the puzzle of a (new) block, gets to create the new block. The more storage capacity the node has, the more solution it can store, the higher the odds of creating a new block.

Proof of elapsed time is a consensus mechanism that aims to randomly and fairly decide who gets to produce a block based on the time that a note has waited. To decide who gets to produce a block, the process assigns a random wait time to each node. The node whose wait time finishes first gets to produce the next block. In embodiments, proof of elapsed time consensus mechanism works best if there is a system in place that nobody can run multiple nodes and that assigned waiting is actually random.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks (or other forms of status updates) from other nodes to complete its local copy of the blockchain.

In the exemplary Bitcoin system, a bitcoin is defined by a chain of digitally signed transactions that began with its creation as a block reward through bitcoin mining. Each owner transfers bitcoin to the next owner by digitally signing them over to the next owner in a bitcoin transaction which is published to and added on to a block on the blockchain. A payee can then verify each previous transaction, e.g., by analyzing the blockchain to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, in Monero, ring signatures mix the spender's address with a group of others, making it more difficult to establish a link between each subsequent transaction. In addition, Monero provides "stealth addresses" generated for each transaction which make it difficult, if not impossible, to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin. However, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users—a feature it calls Darksend—so that it will be more difficult to analyze the blockchain to determine where a particular user's money ended up.

Yet another example of a modified blockchain consistent with exemplary embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain—the amount transferred into and out of a z-address is private if between two z-addresses—but may be public if between a z-address and a t-address.

In embodiments, a digital asset based on a blockchain, may, in turn, include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, the programming language may be the Move programming language. In embodiments, the blockchain may be a permission blockchain. In embodiments, the blockchain may be a permissionless blockchain. In embodiments, smart contracts may be written on other smart contracts to provide for increased functionality. One non-limiting example of this type of structure is the open source Cryptokitties game in which digital kittens are provided as ERC-721 tokens with a series of smart contracts provided to define how the kittens will interact with each other and with users. Cryptokitty is a non-fungible token. A non-fungible token may be stored on a peer-to-peer distributed network in the form of a blockchain network (or other distributed networks, e.g. a peer-to-peer network). Examples of non-fungible tokens include one or more of the following: Cryptokitties, Cryptofighters, Decentraland, Etherbots, Ethermon, Rare peppes, Spells of Genesis, Crafty. Superarre, Terra0, Unico, to name a few. In embodiments, non-fungible tokens, (e.g. 5 Crytpokitties) may be transferable and accounted for as a digital asset token on an underlying blockchain network (e.g., Ethereum Network). In embodiments, a first non-fungible token (e.g.

a First CryptoKitty) may have attributes (e.g. characteristics of a non-fungible token) that are different from a second non-fungible token (e.g. a Second CryptoKitty), even if both are the same type of non-fungible token (e.g., a Crypto-Kitty). For example, the First CryptoKitty may be a striped CryptoKitty, while the Second CryptoKitty may be a droopy-eyed CryptoKitty. In embodiments, the attributes of each non-fungible tokens may be customizable. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding SVCoins, or a right to request SVCoins from another account as discussed below. If the first token is transferred, the second token would transfer with the ownership of the first token. A more detailed description of the process of purchasing and/or obtaining a non-fungible token is located below in connection with FIGS. 50A-52D, the description of which applying herein.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network or peer-to-peer network (such as the Ethereum Blockchain, the Bitcoin Blockchain, the Neo Blockchain, the Libra Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database may be a table with rows and columns tracking who owns how many tokens.

If a user or another smart contract within the blockchain network (such as the Ethereum Network) sends a message to that token's contract in the form of a "transaction," the code updates its database.

Figure 10:
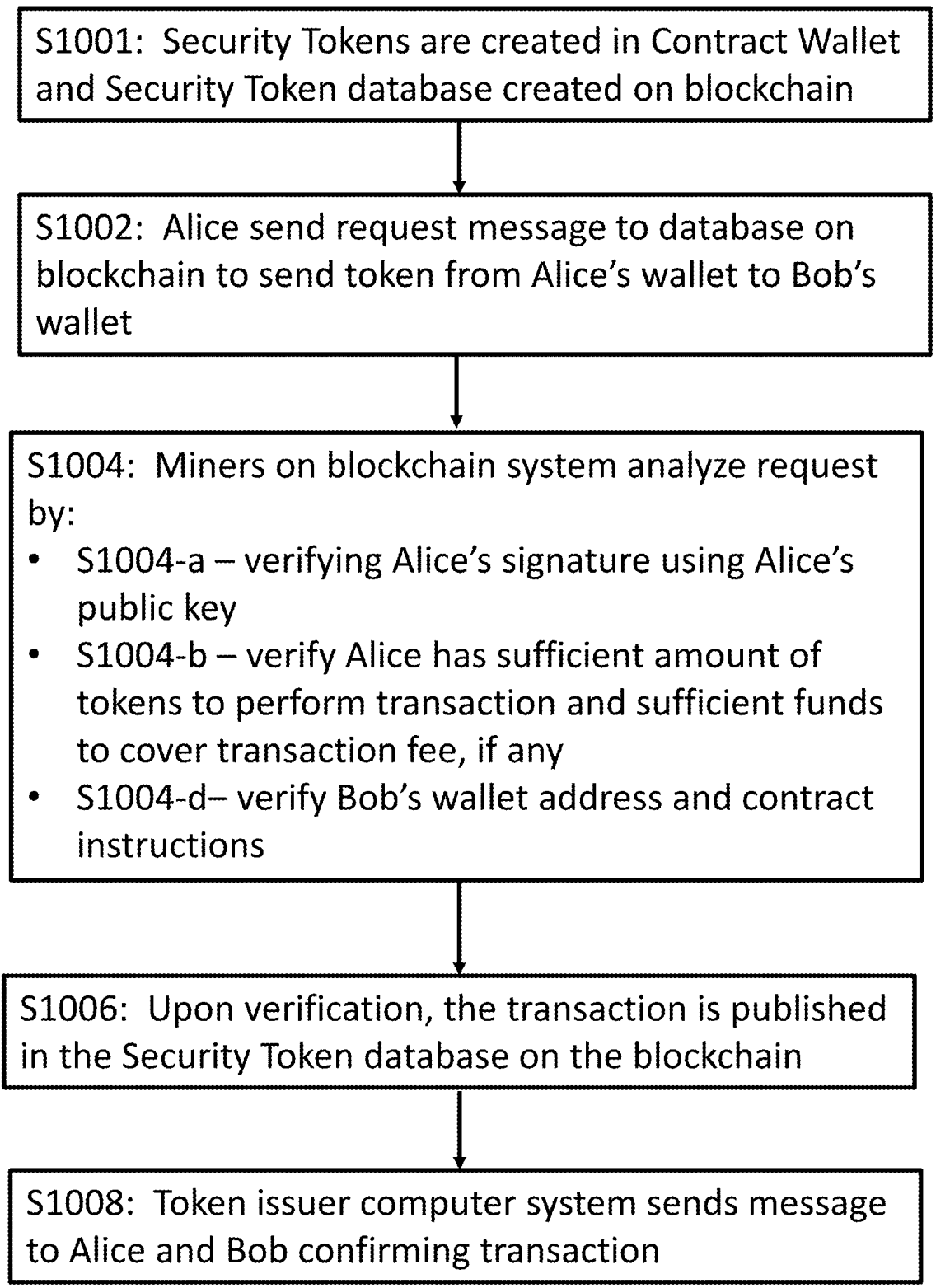
FIG. 10 is an exemplary flow chart of the process of sending tokens from Alice to Bob on the Ethereum blockchain in accordance with exemplary embodiments of the present invention.

So, for instance, as illustrated in FIG. 10, using a token based on the Ethereum Network for illustration purposes, when a wallet app sends a message to a token's contract address to transfer funds from Alice to Bob, the following process occurs.

In embodiments, an underlying blockchain, like the Bitcoin Blockchain, may have limited or no smart contract capabilities.

In such embodiments, an overlying protocol, such as Omni Layer (https://www.omnilayer.org/) may also be used to create custom digital assets on such an underlying blockchain, like the Bitcoin blockchain, as described in https://github.com/OmniLayer/spec. In embodiments, a smart contract may be used for transactions involving Bitcoin through the use of a two-way peg with side chain. The side chain can share miners with the Bitcoin blockchain and allows smart contracts to be run, such as contracts using the Ethereum virtual machine. When Bitcoin is to be used in the smart contract side chain, the Bitcoin is locked and an equal amount of side chain currency, an example of which is Super Bitcoin (SBTC), is assigned to the corresponding address. After the smart contract transaction is completed, the side chain currency is locked and the Bitcoin is unlocked. An example of such a side chain is Rootstock.

In embodiments, where the blockchain is the Bitcoin blockchain, and another protocol is used as a layer over the Bitcoin blockchain to provide for smart contract functionality. For example, the other protocol may be a two-way peg of stable value digital asset tokens to bitcoin and a sidechain that shares miners with the Bitcoin blockchain. In embodiments, the other protocol is an omni layer protocol.

For illustration purposes, FIG. 10 shall be described with respect to a token on a blockchain with ERC20 smart contract capabilities, such as the Ethereum Blockchain and the NEO Blockchain, to name a few.

In step S1001, at the token issuer computer system, a token, such as a Stable Value Token by way of illustration, is created. In embodiments, the token can be other forms of tokens, such as a Security Token, or other form of tokens. In embodiments, each token may have a "ERC20 Contract Wallet Address" ("Contract Address") which is an address on the blockchain at which the code for the smart contract is stored. In embodiments, the smart contract may include instructions to perform at least: (1) token creation, (2) token transfer, (3) token destruction; and (4) updating smart contract coding, to name a few. In addition, the smart contract may include additional instructions related to authority to conduct operations and/or transactions associated with the smart contract or token.

In embodiments, of the present invention, the minimal specification for a Token, such as a Stable Value Token, may include instructions to perform at least: (1) a "total Supply" function, which when called, will respond with a count of the number of tokens in existence; (2) a "balanceOf" function, which when called with a specific account (address) as a parameter, responds with the count of the number of tokens owned by that account; and (3) a "transfer" function, which is an example of a state modifying function, that, when called, given one or more target accounts and corresponding transferred amounts as parameters, the transfer function will decrease the balance of the caller account by the corresponding transfer amounts, and increase the target accounts by the target amounts (or fail if the caller account has insufficient amounts or if there are other errors in the parameters).

In embodiments, a Stable Value Token may be created with a fixed supply of tokens at the time of its creation. For example, a Stable Value Token may be created with a supply of 21 million tokens and set Address 1 (mathematically associated with a private key 1) as the owner of all 21 million tokens. Thereafter, private key 1 will be required to generate a call to the transfer function in order to assign some portion of the 21 million tokens with a second address 2 (mathematically associated with a private key 2) or any other address (also mathematically associated with a corresponding private key).

In embodiments, a Stable Value Token may be created with a variable supply of tokens which can be set to increase or decrease after original creation. In such embodiments, the minimum functions required will also include: (4) a "print" function, which is another example of a state modifying function, that when called allows for the creation of additional Stable Value Tokens into the total Supply of Stable Value Tokens; and (5) a "burn" function, which is also another example of a state modifying function, that when called allows for the destruction of previously created Stable Value Token from the total Supply of the Stable Value Tokens. As discussed below in greater detail, in embodiments, the print and burn function may include limits on the Addresses that are allowed to call those functions.

Currently, due to the immutable nature of the Ethereum blockchain, once a smart contract is written to a specific Contract Address it cannot be changed. However, in embodiments, the various functions called for in the Contract Address may be associated with specific authorized key pairs of public keys (or "addresses") and corresponding private keys (which are mathematically associated with public keys). In embodiments, one or more private keys may be stored off-line in, what is sometimes referred to as, a designated cold storage wallet associated with the token issuer. In such embodiments, keys may be generated, stored, and managed on board hardware security modules (HSMs). For example, HSMs, e.g., each a "signer," should have achieved a rating of FIPS PUB 140-2 Level 3 (or higher). In embodiments, one or more private keys may be stored on-line in, what is sometimes referred to as a designated hot storage wallet associated with the token issuer. In embodiments, the Contract Address may include instructions which are associated with authorizing one or more designated key pairs stored off-line in, e g., one or more cold storage wallets on one or more air-gapped computer systems associated with the token issuer, but may also give at least some permission to perform operations by one or more designated key pairs stored on-line, in, e.g., one or more hot wallets associated with the token issuer and/or a token administrator on behalf of the token issuer on one or more computer systems connected to the digital asset computer system. In embodiments, the on-line computer systems would be co-located with the digital asset computer systems. In embodiments, the Stable Value Tokens may be created in batches (for example, 100,000 SVCoins worth $100,000 U.S. dollars) by a designated key pair (such as an off-line designated key pair) authorized by smart contract and assigned by such a key pair to a designated address associated with on on-line public key for transactions as necessary.

In embodiments, a Stable Value Token database is maintained in a blockchain, such as the Ethereum blockchain, for example. In embodiments, the ledger may be maintained, in the first instance, as a database in a sidechain by the issuer or agent and subsequently published and stored as part of a blockchain.

In embodiments, a Stable Value Token database is maintained in a blockchain, such as the Ethereum blockchain, for example. In embodiments, the ledger may be maintained in the first instance as a database in a sidechain by the issuer or agent and subsequently published and stored as part of a blockchain.

In embodiments, Stable Value Tokens may be generated on the fly, however, in this case, the contract code, which is the executable code that is stored at the Contract Address location on the blockchain, may designate one or more public addresses corresponding to one or more on-line private keys held in, e.g., a hot wallet(s), or one or more public addresses corresponding on one or more off-line public keys held in, e.g., a cold wallet(s), or some combination thereof, as the authorized caller of some functionality. A more detailed discussion of exemplary structures for hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated by herein by reference. In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

In embodiments, a subset of two or more corresponding key pairs from a larger collection of key pairs may be required to engage in certain transaction. For example, 2 of 3, 2 of 5, or 3 of 5, keys may be required to engage in certain transactions. Certain transactions requiring more than one signature may be controlled by instructions of a smart contract (e.g. one or more scripting limitations). The one or more scripting limitations, in embodiments, may specify instances that require multiple signatures to authorize a transaction. In embodiments, the one or more scripting limitations may specify instances that do not require multiple signatures to authorize a transaction. In embodiments, transactions requiring more than one signature may be a pay-to-script-hash (P2SH) account. In embodiments, such transactions may include sensitive or relatively high risk transactions.

In embodiments, such as in the Libra Network, a public key may be associated with two or more private keys. The two or more private keys, in embodiments, may be variants of the same private key. For example, a first public key may be associated with a first private key. The first private key may be "rotated" such that a second private key is generated. The first private key may be "rotated" by applying one or more hash algorithms to the first private key. The rotation of the private key, in embodiments, may serve a security purpose, allowing a user to change its private key to prevent a security incident and/or in response to a security incident.

In embodiments, the smart contract(s) and associated authorized private keys may be maintained by the SVCoin issuer and which would hold the authorized private key(s) associated with the token on an associated device.

By way of illustration, an ERC-20 Contract can include the following representative type of functions as shown in Table 1 in its programming of a Smart Contract associated with a particular token, such as a security token or a stable value token:

In embodiments, a more elaborate smart contract can be set up to allow token issuers to have hybrid control over which key pairs have authority to affect the token supply and distribution. In embodiments, a hybrid combination of on-line and off-line key pairs can be used to control the supply and distribution of tokens.

For example, in embodiments, a smart contract may include a state-changing function such as limitedPrint, where the authorized caller of such function would be authorized only to print (or issue) a specific limited amount of tokens. In embodiments, the limitedPrint function may authorize printing or issuing of tokens for a set period of time. In embodiments, the limitedPrint function may authorize printing or issuing of only a certain number of tokens over a set period of time. In embodiments, the limitedPrint function may be used with an on-line key pair (e.g., hot wallet), to allow for fast and efficient token creation, but limit risk of unauthorized takeover of the on-line key pair to the set limit.

In conjunction with a limitedPrint command, a separate state-changing function of raiseCeiling can be used to increase the authority for the on-line key pair using a different key pair, such as an off-line key pair (e.g., cold wallet), which is considered to be more secure.

In embodiments, using a limitedPrint function with a set limit that can be implemented by one or more designated on-line key pairs (e.g., hot wallets), and a raiseCeiling function which may change that limit under the authority of a different set of one or more designated off-line key pairs (e.g., cold wallets), the automated increases in the token supply through on-line control will only continue up until the ceiling is reached, at which point further intervention through off-line control is required. In embodiments, a subset of two or more corresponding key pairs from a larger collection of key pairs may be required to engage in certain transaction. For example, 2 of 3, 2 of 5, or 3 of 5, to name a few, keys may be required to engage in certain transactions. In embodiments, as noted above, such transactions may include sensitive or relatively high-risk transactions.

TABLE 1

```
1  // -------------------------------------------------------------------------
2  // ERC Token Standard #20 Interface
3  // https://github.com/ethereum/EIPs/blob/master/EIPS/eip-20-token-standard.md
4  // -------------------------------------------------------------------------
5  contract ERC20Interface {
6     function total Supply( ) public constant returns (uint);
7     function balanceOf(address tokenOwner) public constant returns (uint balance);
8     function allowance(address tokenOwner, address spender) public constant returns (uint
remaining);
9     function transfer(address to, uint tokens) public returns (bool success);
10    function approve(address spender, uint tokens) public returns (bool success);
11    function transferFrom(address from, address to, uint tokens) public returns (bool success);
12
13    event Transfer(address indexed from, address indexed to, uint tokens);
14    event Approval(address indexed tokenOwner, address indexed spender, uint tokens);
```

Some of the tokens may include further information describing the token contract such as shown Table 2:

TABLE 2

```
1  string public constant name = "Token Name";
2  string public constant symbol = "SYM";
3  uint8 public constant decimals = 18; // 18 is the most common
   number of decimal places
```

One should consider the difference between the current token supply and the supply ceiling as part of the tokens at risk. If the current token supply has decreased through the use of burn, then the effective funds at risk could have increased without a corresponding decrease in the supply ceiling. The ceiling can be lowered by on-line control, through a function called lowerCeiling. This allows for relinquishing some portion of what has been granted through off-line control to limit the effective funds at risk through compromise of on-line key management systems. In embodiments, a limit on number of tokens that can be burned may also be included.

Figure 13A:
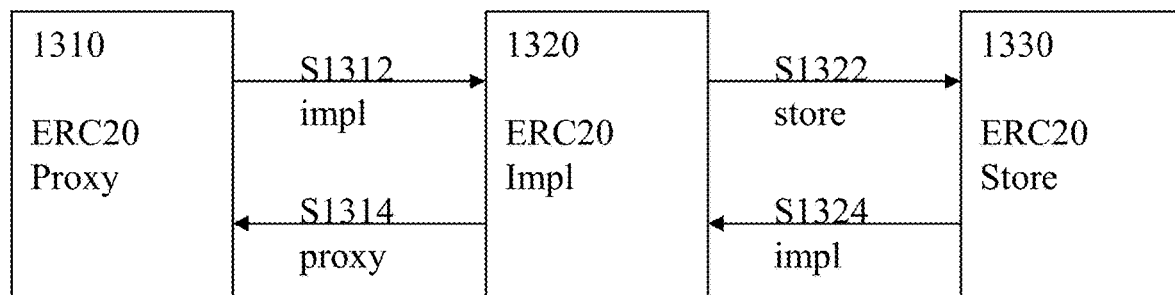
FIGS. 13A-13H illustrate exemplary embodiments of a token that utilizes smart contracts in accordance with exemplary embodiments of the present invention.

In embodiments, as illustrated in FIG. 13A, the token may be set up using at least three core smart contracts, e.g., ERC20Proxy 1310, ERC20Impl 1320, and ERC20Store 1330 that cooperatively implement an ERC20 compliant token.

In the context of a ERC20 compliant token on the Ethereum blockchain, there is one, and will only ever be one instance of ERC20Proxy 1310. This is the smart contract that users of the token treat as the token contract. Thus, ERC20Proxy 1310 can be considered the permanent face of interacting with the token on the Ethereum blockchain.

However, in embodiments, ERC20Proxy 1310 may have almost no code and does not keep any state information itself. Instead, in embodiments, ERC20Proxy 1310 has one or more implementations (e.g., ERC20 Impl 1320, ERC20 Impl (1) 1340, ERC20 Impl (2), to name a few) that executes the logic of the token. S1312 "impl" represents a delegation from ERC20 Proxy 1310 to ERC20Impl 1320. Thus, the instance of ERC20Impl 1320 executes the specific delegated functions. ERC20Impl 1320 may further limit the authority to implement to the specific delegated functions to only specified trusted callers (e.g., as shown in FIGS. 13C, 13G and 13H, one or more off-line key set 1362, one or more on-line key set 1364, to name a few). S1314 proxy illustrates the authorization of ERC20Impl 1320 executing logic on behalf of ERC20Proxy 1310, through call functions from one or more authorized addresses.

In embodiments, state information, such as token balances, may be maintained in a separate instance, e.g., ERC20Store 1330, a "backing store." In such embodiments, ERC20Store 1330 would own the delegated state of the token. S1322 "store" illustrates the delegation of state information from ERC20Impl 1320 to ERC20Store 1330. In embodiments, the instance of ERC20Store 1330 may execute updates to the state of the token, such as updates to token balances that occur during a token transfer to one or more designated key sets. S1324 "impl" represents the address that the ERC20Store 1330 will permit to invoke the update functions. In embodiments, that address is the "Contract Address" of the active version of ERC20Impl 1320.

This separation of duties—public face, logic, and storage, for ERC20Proxy 1310, ERC20Impl 1320, and ERC20Store 1330, respectively—provides the ability for token issuer to replace the logic of the system at a later date. In embodiments, the logic may be replaced by changing the impl arrows (e.g., S1312 "impl" and S1324 "impl").

Figure 13B:
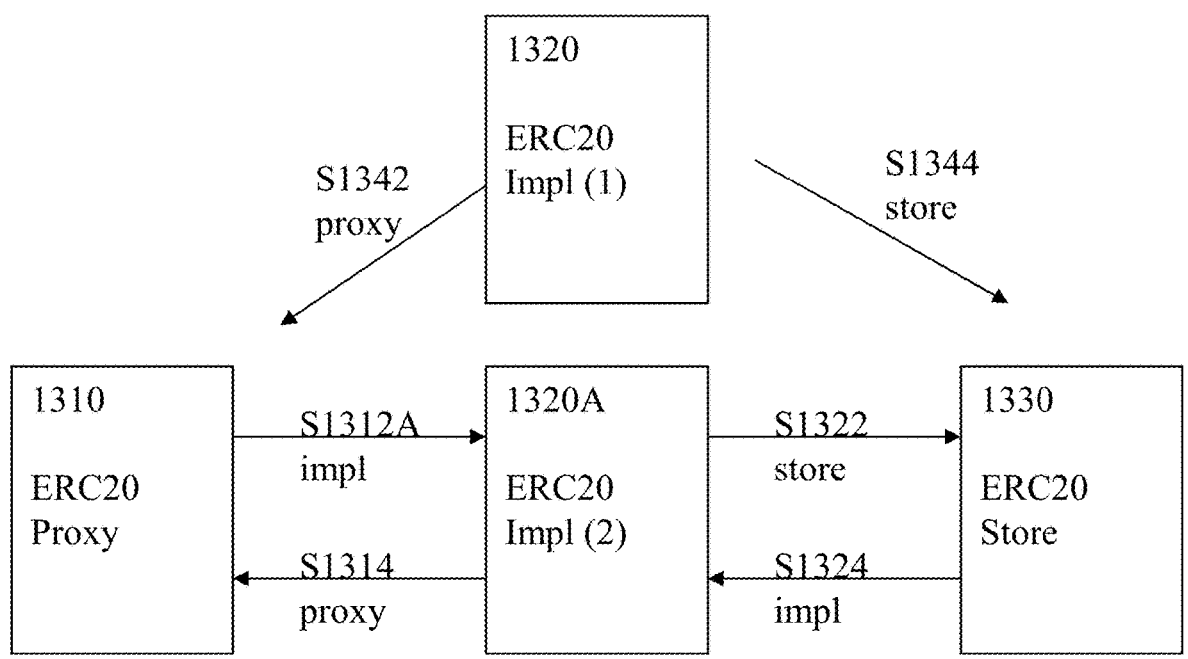
Figure 13C:
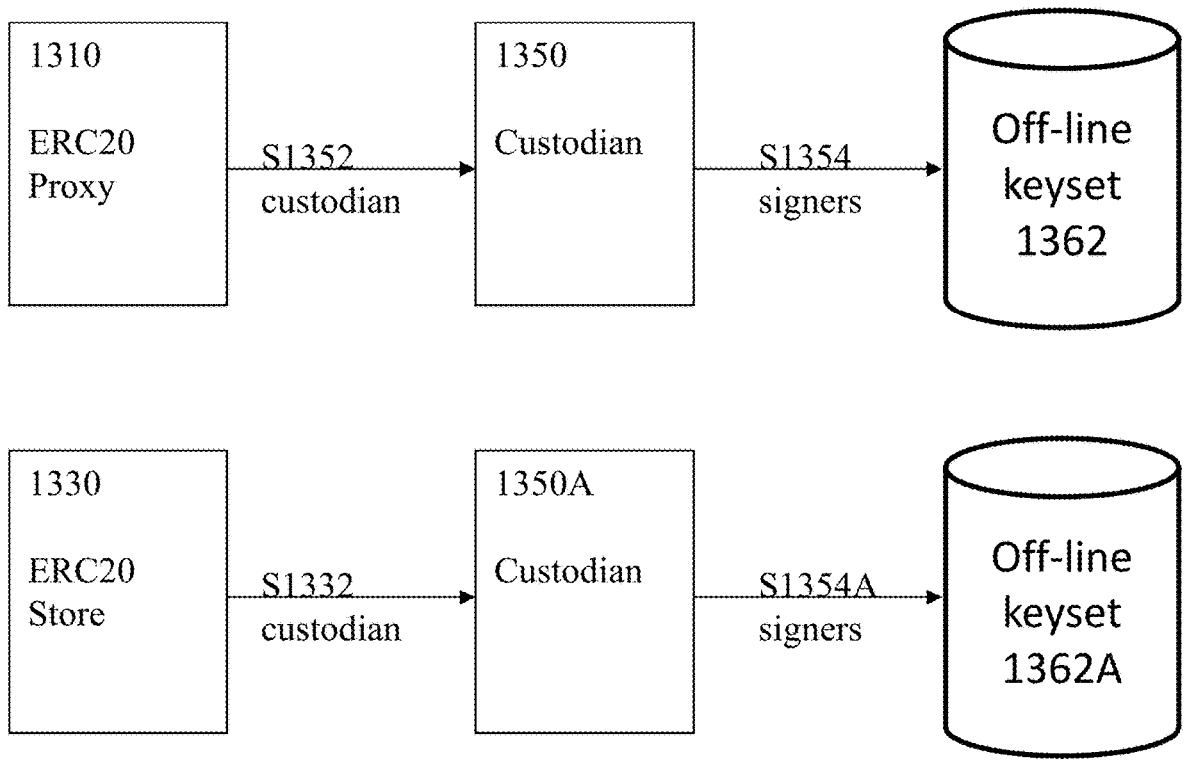

FIG. 13B illustrates an embodiment where a token has been upgraded, by creating a new instance of ERC20Impl (ERC20Impl (2) 1320A) with a second version of the code previously implemented through ERC20Impl 1320. The instance of ERC20Proxy 1310 now delegates its implementation in S1312A "impl" to ERC20Impl (2) 1320A (version 2 of the code) instead of the previous ERC20Impl 1320 (version 1), and the instance of ERC20Store 1330 will now only accept calls from ERC20Impl 1320A (version 2). The original ERC20Impl 1320 (version 1) remains but has become inert as it is unlinked from the system.

Turning to FIGS. 13C-13F, custodianship will be discussed.

In embodiments, a fourth type of contract, Custodian 1350, may also be implemented. A Custodian 1350 is logic which designates which key pair (e.g., an Off-Line Keyset 1362), is authorized to control other contracts in the system (e.g., ERC20Proxy 1310). Contracts cooperate with Custodian 1350 by awaiting an approval from Custodian 1350 before executing certain actions. In turn, such approval will require a message from an authorized key pair (e.g., Off-Line Keyset 1362) authorizing the action (e.g., print tokens, limit tokens, transfer tokens, to name a few).

In embodiments, Custodian 1350 may include a range of control coding. In embodiments, control coding may include the requirement that at least two designated keysets authorize a specific action (e.g., print token). In embodiments, at the least two keysets may be a subset of a larger group of keysets (e.g., two of three designated keysets, or two of six designated keysets, or three of five designated keysets, to name a few). In embodiments, when a higher degree of security is desired, the keysets may be maintained off-line. In embodiments, when a higher degree of automation or speed to access is required, the keysets may be maintained on-line, such as in a co-located, but separate computer system that is operatively connected to a customer facing digital asset system.

In embodiments, Custodian 1350 may also exercise control over various security operations of ERC20Proxy 1310 (e.g., time locking and revocation, to name a few).

In embodiments, Custodian 1350 may have custodianship of the proxy which grants exclusive power to replace the implementation for ERC20Proxy 1310 from its current implementation (e.g., ERC20Impl 1320 (version 1)) to a new implementation (e.g., ERC20Impl 1320A (version 2)), as illustrated in FIG. 13B, discussed above. As discussed, in embodiments, only authorized and designated key sets (e.g., off-line key set 1362) will have the authority in step S1354 signers to authorize the Custodian 1350 to modify an implementation of ERC20Proxy 1310.

In embodiments, Custodian contracts with their own respective authorized designated keysets can be set up for other contracts, such as ERC20Store 1330 as also shown in FIG. 13C. Thus, by way of example, ERC20Store 1330 may designate in S1332 Custodian 1350A as a custodian for certain operations of ERC20Store. Those operations will only be executed by ERC20Store 1330 when designated keyset (such as Off-Line keyset 1362A) sends a message through the blockchain to Custodian 1350A authorizing the Custodian 1350A to authorize the ERC20Store 1330 to perform the designated function. In embodiments, the off-line keyset 1362A may be the same as, overlap with, or be different from the Off-Line Key Set 1362A which may authorize Custodian 1350 with respect to ERC20Proxy 1310.

In embodiments, custodianship of the proxy and store also grants exclusive power to pass custodianship to a new instance of Custodian. Thus, one of the technical computer problems associated with the immutability of ERC20 smart contracts on the Ethereum blockchain has been solved, thus allowing for a self-upgrade of custodianship. In embodiments, since a set of signers for a given instance of a Custodian is fixed, a change to the off-line keyset may be implemented instead having a current Custodian authorize itself to be replaced by a new instance of Custodian with a new set of signers.

Figure 13D:
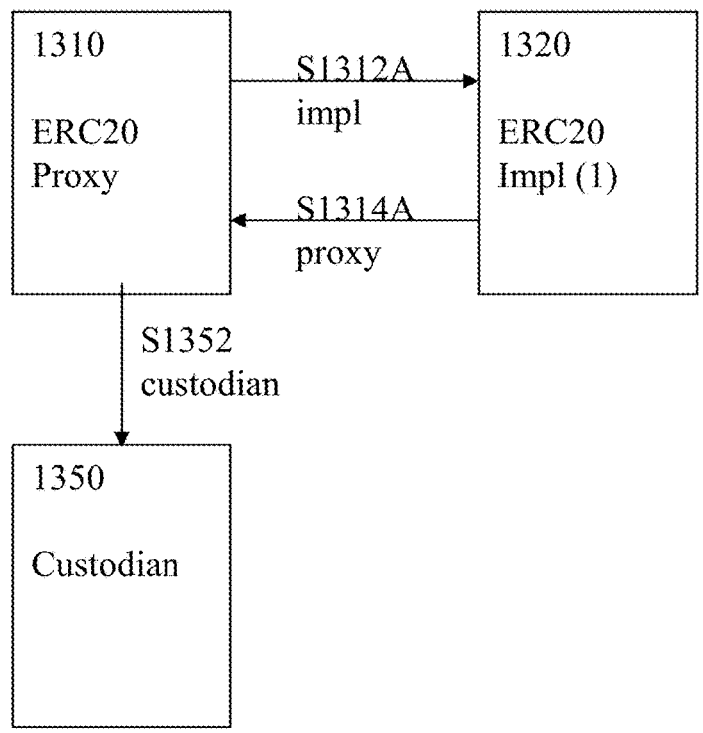
Figure 13E:
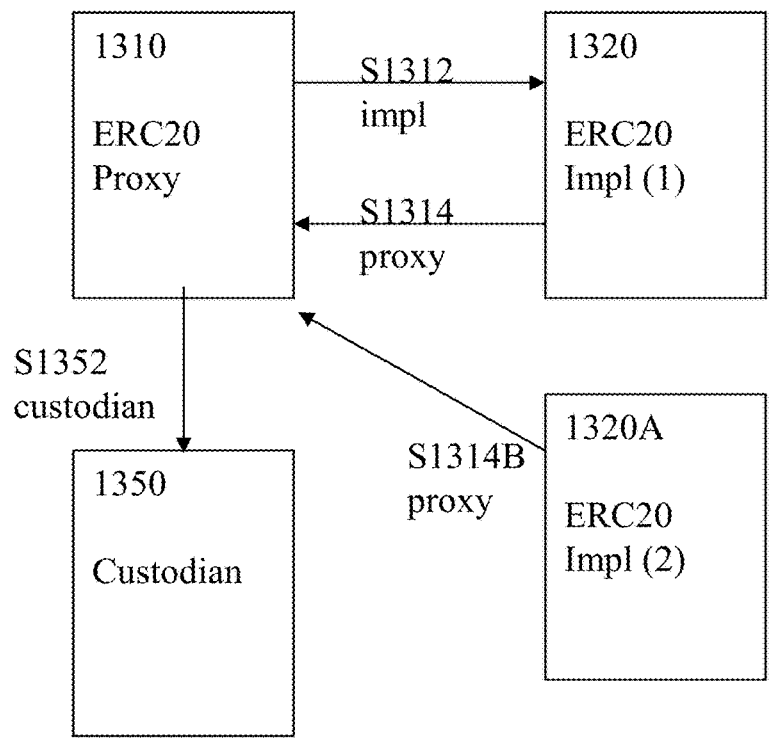
Figure 13F:
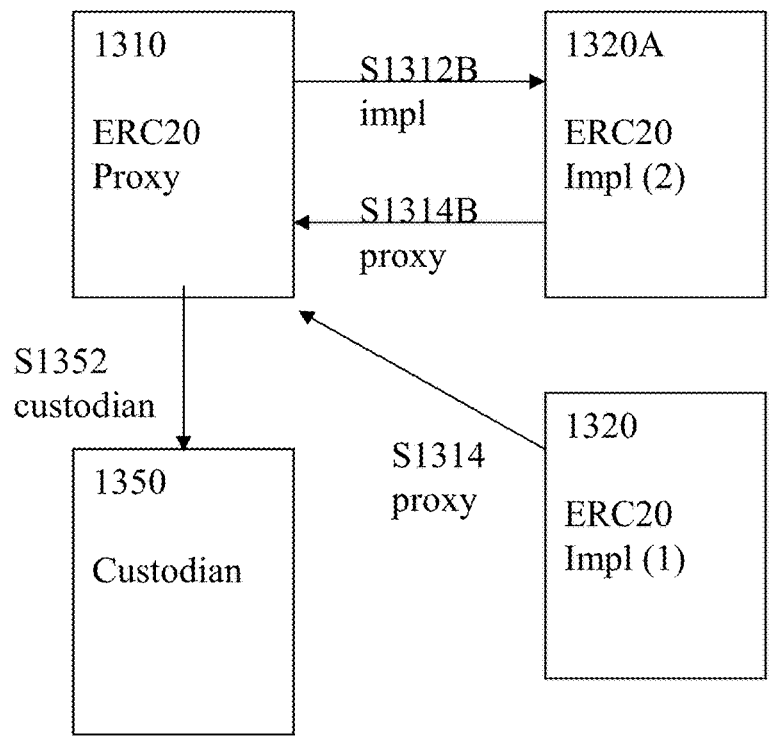
Figure 13G:
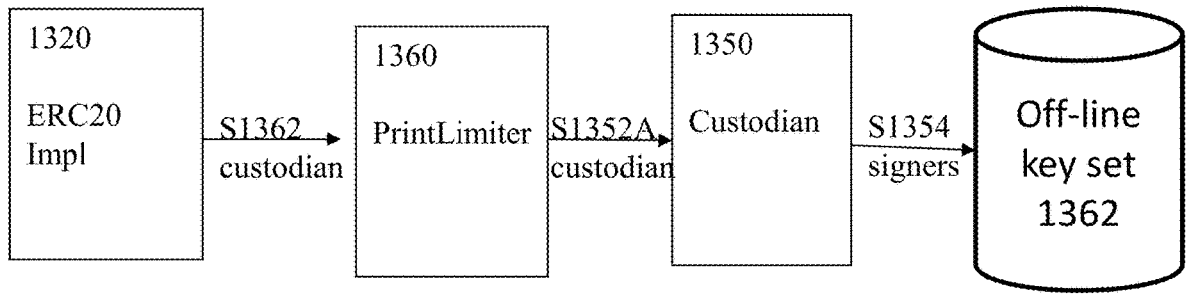
Figure 13H:
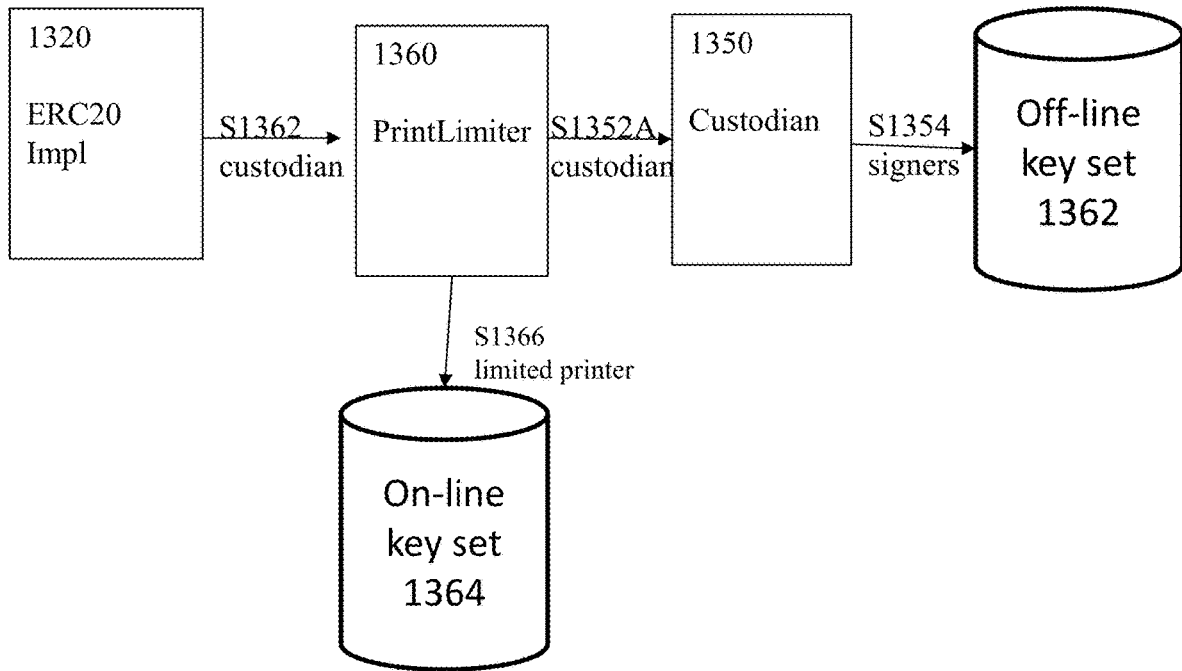

Referring now to FIGS. 13D-13F, an exemplary process of upgrading active implementation of the pointer relationship of ERCProxy 1310 from ERC20Impl 1320 (version 1) to ERC20Impl 1320A (version 2) will now be discussed.

FIG. 13D reflects the initial state in which ERC20Proxy 1310 has Custodian 1350 and in S1312A implemented ERC20 Impl 1320 (version 1) to act as a proxy in S1314A for certain functions of ERC20Proxy 1310.

To swap out the current ERC20Impl 1320 (version 1) with an updated ERC20Impl 1320 (version 2), as shown in FIG.

13E, the coding for ERC20 Impl 1320 (version 2) needs to be deployed on the blockchain and set its proxy point (S1314B proxy) to the same ERC20Proxy 1310.

Next, the implementation pointer from ERC20Proxy 1310 which is currently set at S1312 (impl) to point to ERC20Impl 1320 (Version 1), needs to be reset to be S1312B "impl" to point to ERC20Impl 1320A (version 2) instead. This change requires the authorization of Custodian 1350, which in turn requires two signatures from keys in its designated keyset (e.g., Off-Line Keyset 1362) sent to it on the blockchain.

Table 3 represents an exemplary embodiment of the steps used to implement this process:

TABLE 3

1. lockID = proxy.requestImplChange(imp_2)
2. request= custodian.requestUnlock(lockId,proxy.confirmImpl.Change)
3. Off-line signing of request
4. custodian.completeUnlock (request, signature_1, signature 2)
    a. proxy.confirmImplChange(lockID)

Referring to Table 3, in step 1, a request must be made to ERC20Proxy to change its instance of ERC20Impl. This request may come from any address, and when the request is made, the function returns a unique lockId that anyone can use to look up that request.

Next, in step 2, to confirm the pending request, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In step 3, to complete the unlocking of Custodian and therefore propagate the change to ERC20Proxy 1310, the digital asset system operated by the token issuer uses its off-line key storage infrastructure to sign the request with the previously approved designated key sets. In this example, two signatures are required (signature 1 and signature 2), but other combinations of signatures may be used consistent with embodiments of the present invention.

In step 4, those signatures are passed into the Custodian's completeUnlock function along with the initial request. Once the request is validated against the signatures, completeUnlock parses the content of the request and issues the command. In this case, it calls ERC20Proxy's confirmImplChange using the lockId generated in the initial ERC20Impl change request.

As shown in FIG. 13F, ERC20Proxy 1310 now points with S1312B to the updated ERC20Impl 1320A (version 2) contract, thus delegating all future calls from ERC20Proxy 1310 to the updated contract ERC20 Impl (version 2) 1320A. This process can be repeated in the future to upgrade the ERC20 Impl (version 2) 1320A to new versions as authorized by the Custodian 1350.

In embodiments, a similar process may also be used to upgrade the active Custodian 1350. Instead of the pair of functions requestImplChange and confirmImplChange, the pair of functions requestCustodianChange and confirmCustodianChange are used instead.

Referring to FIGS. 13G and 13H, a PrinterLimiter 1360 contract may also be used as an upgradeable limit on the token supply available.

In the context of FIG. 13G, ERC20Impl 1320 allows printing an unbounded amount of tokens to any arbitrary address. This printing can only be done by PrintLimiter 1360 contract, which serves as ERC20Impl's custodian. However, PrintLimiter 1360 can only call this unbounded printing if it receives a call from its custodian, a separate contract named Custodian 1350, which is in turned controlled by signatures from designated keysets (e.g., Off-Line Key Set 1362).

Thus, to print an unbounded amount of tokens, signatures from keys in Off-Line Key Set 1362 need to be sent through the blockchain, to Custodian 1350, which, in turn, then calls through the blockchain, PrintLimiter 1360, which then, in turn, calls through the blockchain ERC20Impl 1320 to confirm the print request.

Referring to FIG. 13H, a limited printing option may also be implemented. Thus, In embodiments, consistent with FIG. 13H, ERC20Impl 1320 allows either printing an unbounded amount (which originates from Off-Line Key Set 1362 as described earlier), or a limited amount which does not require the Off-Line Key Set 1362 to enact. Within PrintLimiter 1360 is a "total supply ceiling" variable: a maximum total supply of tokens that any "limited print" operation cannot exceed. This value is set by Off-Line Key Set 1362. PrintLimiter 1360 allows printing new tokens while remaining under that ceiling from a special hot wallet address. That hot wallet address can call PrintLimiter 1360 directly, which then calls ERC20Impl 1320 to confirm the "limited" print operation. In embodiments, limits may also be expressed in units of tokens to be issued, time periods or units of tokens per unit of time. In embodiments, for higher risk activities, a time delay may be implemented even where the activity is authorized. For example, where a large number of tokens are to be printed, a time delay of, e.g. 15 minutes, may be implemented even after authorization is confirmed.

The total supply ceiling can only be raised by Off-Line Key Set 1362. In embodiments, it can be lowered, however, by On-Line Key Set 1364 or Off-Line Key Set 1362.

Table 4 illustrates exemplary embodiments of code used in smart contracts on the Ethereum blockchain which implement a cooperative relationship with an external account or contract that exerts custodianship over the contract following the pattern.

A contract following this type of pattern is capable of carrying out some action—a portion of the desired operations; however, rather than executing the action directly, the action is first requested, with a unique 'lock identifier' returned as the result of the request. The pending action is stored in the contract state, storing the data necessary to execute the action in the future, and with the lock identifier as the lookup key to retrieve the pending action. If the contract is called by its custodian, receiving a lock identifier as an argument, then the associated pending action, if any, is retrieved and executed.

In embodiments, as illustrated in Table 4, the contracts may include multiple inheritances, so for the purposes of code reuse, a function for generating unique lock identifiers is implemented in the contract LockRequestable.

TABLE 4

```
contract LockRequestable {
  uint256 public lockRequestCount;
  function LockRequestable( ) public {
    lockRequestCount = 0;
  }
  function generateLockId( ) internal returns (bytes32 lockId) {
    return keccak256(block.blockhash(block.number − 1), address(this),
    ++lockRequestCount);
  }
}
```

In embodiments, the function generateLockId returns a 32-byte value to be used as a lock identifier, which is a hash of the following three components: (1) The blockhash of the Ethereum block prior to the block that included the Ethereum transaction that executed this function; (2) The deployed address of the instance of the contract that inherits from LockRequestable; and (3) The current value of the count of all invocations of generateLockId (within 'this' contract).

Component three plays the role of a nonce (in cryptography, a nonce is an arbitrary number that can be used just once) ensuring that a unique lock identifier is generating no matter how many invocations of generateLockId there are within a single Ethereum transaction or a single Ethereum block.

Component two ensures that the lock identifier is unique among the set of cooperating contracts that use this identifier generation scheme. A noncooperative contract authored by a third party may choose to generate identifiers that overlap, but that is expected not to impact operation.

Finally, component one uses the relative previous blockhash to make future lock identifiers unpredictable.

Table 5 illustrates embodiments of code which uses LockRequestable in a template consistent with embodiments of the present invention.

TABLE 5

```
contract C is ..., LockRequestable {
  struct PendingAction {
    t v;
    ...
  }
  address public custodian;
  mapping (bytes32 => PendingAction) public pendingActionMap;
  function C(address _custodian, ...) public {
    custodian = _custodian;
    ...
  }
  modifier onlyCustodian {
    require(msg.sender == custodian);
    _;
  }
  function requestAction(t _v, ...) public returns (bytes32 lockId) {
    require(_v != 0);
    lockId = generateLockId( );
    pendingActionMap[lockId] = PendingAction({
      v: _v,
      ...
    });
    emit ActionLocked(lockId, _v, ...);
  }
  function confirmAction(bytes32 _lockId) public onlyCustodian {
    PendingAction storage pendingAction = pendingActionMap[_lockId];
    t v = pendingAction.v;
    require(v != 0);
    ... // copy any other data from pendingAction
    delete pendingActionMap[_lockId];
    ... // execute the action
    emit ActionConfirmed(_lockId, v, ...);
  }
  event ActionLocked(bytes32 _lockId, t _v, ...);
  event ActionConfirmed(bytes32 _lockId, t _v, ...);
}
```

The function requestAction generates a fresh lock identifier and captures the request parameters as a pending action, storing it in a mapping associated with the lock identifier.

The function confirmAction is callable only by the designated custodian. The given lock identifier is used to retrieve the associated pending action from the contract storage, if it exists, otherwise the function reverts. The pending action is deleted from storage, which ensures that the action will be executed at most once. Finally, the logic of the action is executed.

In embodiments, there are two requirements to the confirmAction callback function: (1) The function does not have a return value; and (2) The function must only revert if there is no pending action associated with the lock identifier.

In these embodiments, the custodian receives a failure signal only when it called with an invalid lock identifier. Any failure cases that may occur in the execution of the action logic must be signaled by means other than return values or reversions (including abortive statements such as throw).

Programming consistent with Tables 4 and 5 may be used to implement a wide variety of functions in the context of a token including, by way of example:

Contracts that inherit from the ERC20ImplUpgradeable contract (e.g., ERC20Proxy and ERC20Store) control updates to the address that references an instance of the ERC20Impl contract;

The ERC20Impl contract to control increases to the token supply;

The ERC20Holder contract to control 'withdrawal' transfers out of its balance;

The PrintLimiter contract to control increases to its token supply ceiling state; and Contracts that inherit from the CustodianUpgradeable contract (e.g., ERC20Proxy, ERC20Impl, and ERC20Store) to control the passing of custodianship itself from the current custodian to a new custodian, to name a few.

In embodiments, other limits or controls may also be built into the smart contract functionality of the token. For example, in embodiments, it may be necessary for the token issuer to adjust the token ledger to account for regulatory activity. For example, there may be a court ordered seizure of funds, or a security issue that may require reversing transactions during a compromised period, to name a few.

In embodiments, as discussed below, an exchange system may include fraud management computer system 5160. In embodiments, the administrator system and/or stable value token issuer system may include, or be operably connected to, fraud management computer system 5160 or a comparable fraud management computer system. In embodiments, the fraud management computer system may be operated by the exchange, the administrator, the stable value token issuer or a third party, to name a few.

In embodiments, the fraud management computer system may monitor the blockchain to identify public addresses to and/or from which Stable Value Tokens may be transferred. In embodiments, the fraud management computer system may compare the identified public addresses to one or more lists of suspicious public addresses. In embodiments, where one of the identified public addresses corresponds to a suspicious public address, a report may be issued to reflect possible suspicious activity. In embodiments, the report may be provided to the exchange, administrator or stable value token issuer and/or regulatory or law enforcement authorities. In embodiments, the exchange system, administrator system and/or stable value token issuer system may block a transaction to and/or from a suspicious public address. In embodiments, the exchange system, administrator system and/or stable value token issuer system may freeze any Stable Value Tokens associated with the suspicious public address. In embodiments, the exchange system, administrator system and/or stable value token issuer system may reverse a transfer of Stable Value Tokens to and/or from the suspicious address.

In embodiments, the fraud management computer system may be operably connected to ledger information and/or other relevant data to monitor the creation, destruction and/or transfer of the Stable Value Tokens to identify suspicious and/or potentially fraudulent and/or criminal activity. In embodiments, the fraud management computer system will monitor activity and compare it to a suspicious activity database. In embodiments, in the event that suspicious, possibly fraudulent and/or possibly criminal activity is identified, the fraud management computer system may generate a report identifying such activity. In embodiments, the report may be provided to the exchange, the administrator and/or the stable value token issuer and/or may be sent to regulatory or law enforcement authorities. In embodiments, depending on the nature of the activity identified in the report, action may be taken which may include, but is not limited to, freezing an account, blocking a transaction involving the Stable Value Token on the blockchain and/or modifying account information, to name a few.

In embodiments, the fraud management computer system may: (1) identify and assess the full range of fraud-related and similar risk areas, including market manipulation; (2) provide procedures and/or controls to protect against identified risks; (3) allocate responsibility for monitoring risks; and/or (4) periodically or aperiodically evaluate and/or revise these procedures, controls and/or monitoring processes, to name a few.

In embodiments, as noted above, upon discovery of any wrongdoing or suspected wrongdoing, the fraud management computer system may generate reports to the appropriate regulatory agency or agencies, including but not limited to: (1) a report stating all pertinent details known; (2) a supplemental report of any material developments relating to the originally reported events; (3) a statement of the actions taken (or proposed to be taken) with respect to such developments; and (4) a statement of changes, if any, in the entities' operations that have been put in place, or are planned, in order to avoid repetition of similar events, to name a few.

In embodiments, the fraud management computer system may freeze, temporarily and permanently, the use of and/or access to Stable Value Tokens (SVCoins) and/or fiat currency held or controlled by the exchange, administrator and/or stable value token issuer. In embodiments, a Stable Value Token and/or fiat currency available on redemption of the Stable Value Token may be forfeited if the Stable Value Token is being used for or has been used for illegal activity. In embodiments, in the event that a legal order or other legal process requires the exchange, administrator and/or stable value token issuer to do so, any Stable Value Token and/or the fiat currency available upon exchange of the Stable Value Token may be subject to forfeiture to, or seizure by, a law enforcement agency. In embodiments, any Stable Value Token and/or fiat currency available upon exchange of Stable Value Token that has been subject to freezing, forfeiture to or seizure by a law enforcement agency, and/or subject to any similar limitation on its use, may be wholly and permanently unrecoverable and unusable and may, in appropriate circumstances, be destroyed.

In embodiments, the administrator may send instructions to modify the token supply for one or more particular accounts. For example, the smart contract may include instructions to pause a transfer. The pause function may be a permanent pause, e.g., for a compromised account, a time limited pause, e.g., for 24 hours or 2 days, or a temporary pause which requires another instruction to reactivate the account, to name a few. Such a function could be included as an upgrade feature in a new Impl contract, or built into the smart contract to be activated when an authorized account, e.g., one or more off-line keys call upon the smart contract to implement the pause functionality, with appropriate parameters.

In embodiments, the administrator may send instructions to rebalance the token supply of one or more particular accounts. For example, the smart contract may include instructions to adjust a token balance in a designated account, e.g., by raising the balance in the designated account, lowering the balance in the designated account, or transferring some or all of the tokens in one designated account to one or more other designated accounts. Such a function could be included as an upgrade feature in a new Impl contract, or built into the smart contract to be activated when an authorized account, e.g., one or more off-line keys, call upon the smart contract to implement the pause functionality, with appropriate parameters.

Figure 15A:
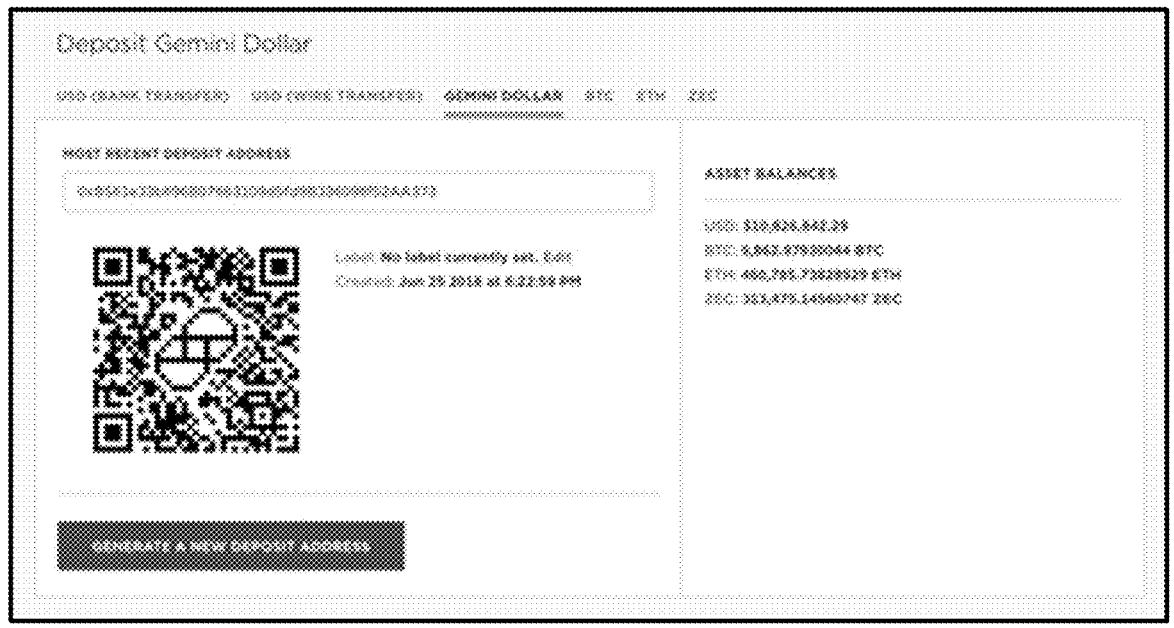
FIGS. 15A-15C illustrate an exemplary dashboard of a user interface which allows registered users of a digital asset exchange to deposit and/or withdraw SVCoins (referred to as Gemini Dollars) with the digital asset exchange system in accordance with exemplary embodiments of the present invention.
Figure 15B:
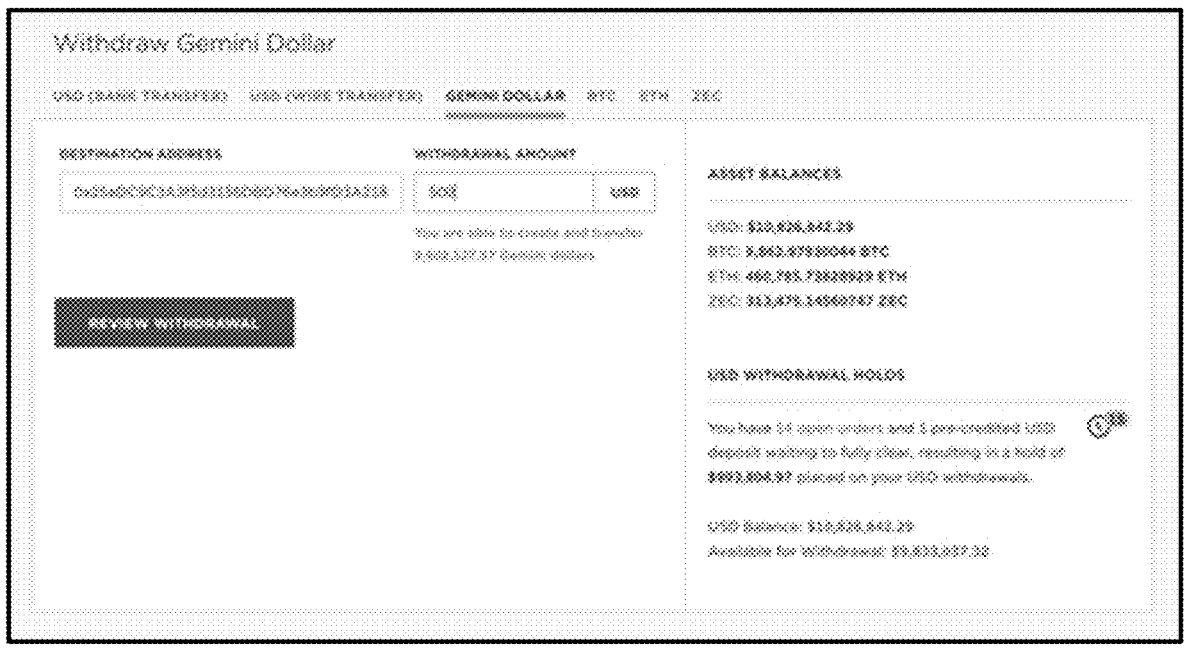
Figure 15C:
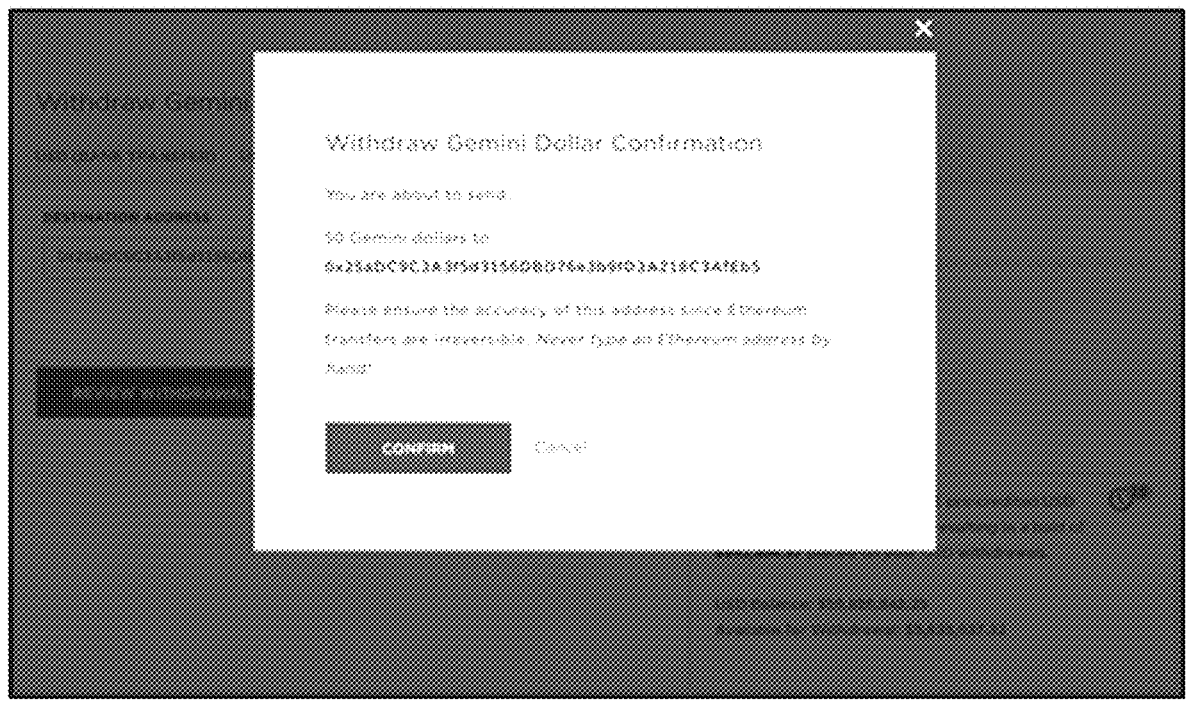

In embodiments, the Stable Value Token may be embodied in the form of a token on the Ethereum Blockchain, referred to as a Gemini Dollar token, as illustrated in the exemplary dashboard of FIGS. 15A-15C.

FIG. 15A illustrates an exemplary GUI for an interface with the digital asset exchange in which a user can deposit/redeem Gemini Dollar tokens into an public address associated with the digital asset exchange, in exchange for an corresponding amount of fiat in the user's account at the digital asset exchange. In embodiments, after the registered user of the exchange deposits the stable value token into the exchange's public address, the exchange will transfer from the bank account or other account associated with the stable value token, a corresponding amount of fiat, to the bank account associated with the fiat holdings of the user. In embodiments, the deposited token will then be burnt from circulation. In embodiments, the deposited token may instead of being burnt be redistributed to another customer, but in such case, an appropriate amount of fiat will need to be redeposited into the bank account or other stable investment vehicle associated with the stable value token.

In embodiments, creation and redemption of the Gemini Dollar tokens may be made simple to promote usability and encourage adoption. In embodiments, Gemini Dollar tokens are redeemed or "destroyed" at the time of deposit into a digital asset exchange. Exchange customers may exchange Gemini Dollar tokens for U.S. dollars at a 1:1 exchange rate by depositing Gemini Dollar tokens into their exchange account. The U.S. dollar amount of Gemini Dollar tokens will be credited to the customer's exchange account balance at the time of deposit.

The process described in FIGS. 17A-17E illustrates an embodiment of depositing/redeeming stable value digital asset tokens (i.e. Gemini Dollar tokens) in exchange for fiat.

Figure 17A:
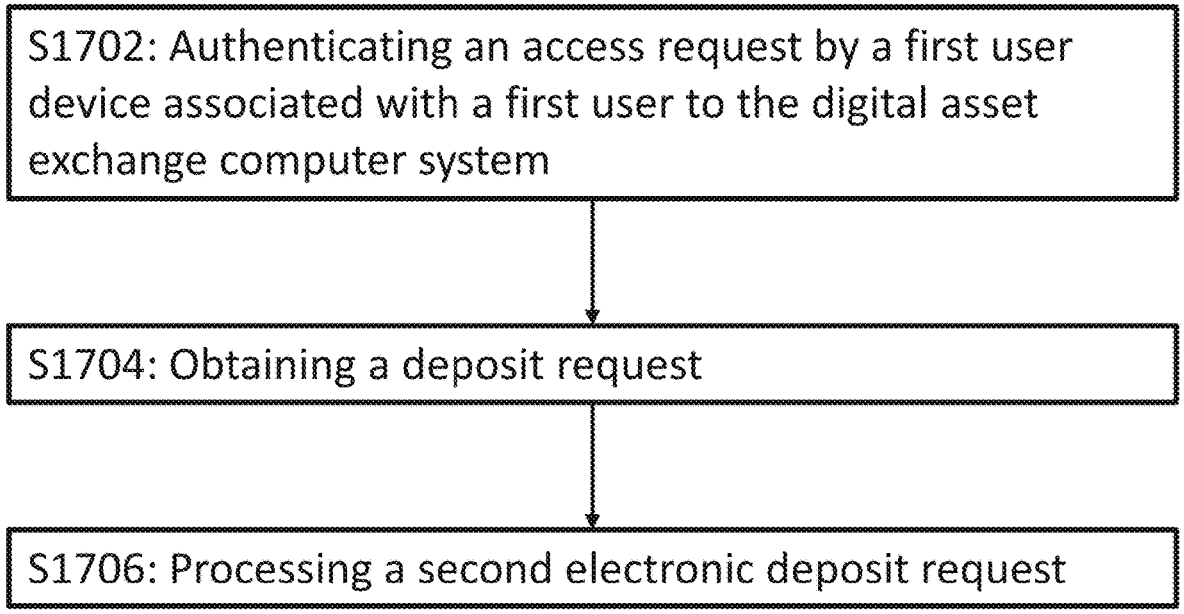
FIG. 17A is an exemplary flowchart of a process for depositing stable value digital asset tokens in accordance with exemplary embodiments in the present invention.

In step S1702 of FIG. 17A, a digital asset exchange computer system associated with a digital asset exchange receives and authenticates an access request from a first user device associated with a first user. FIG. 17B provides a detailed illustration of an exemplary process for authenticating the first user that may be used in accordance with exemplary embodiments of step 1702. In embodiments, in step S1702A, the digital asset exchange computer system receives an authentication request from the first user device. In embodiments, the authentication request includes first user credential information associated with the first user.

At step S1702B, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority.

At step S1702C, the digital asset exchange computer system generates first graphical user interface (GUI) information for displaying a first graphical user interface on the first user device. FIG. 15A illustrates an example of such a first graphical user interface. In step S1702D, the digital asset exchange computer system transmits the first graphical user interface information to the first user device.

Referring back to FIG. 17A, in step S1704, the digital asset computer system obtains a deposit request from the first user device. FIG. 17C provides a detailed illustration of an exemplary embodiment of obtaining a deposit request that may be used in accordance with exemplary embodiments of step 1704. At step S1704A, the digital asset exchange computer system receives a first electronic request from the first user device. The first electronic request may be to deposit stable value digital asset tokens. In embodiments, each stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ether, and the blockchain is the Ethereum Blockchain. In embodiments, the underlying digital asset is neo and the blockchain is the Neo Blockchain. In embodiments, the underlying digital asset may be based on other blockchains that provide smart contract functionality.

In step S1704B, in response to receiving the first electronic deposit request, the digital asset exchange computer system obtains first account balance information of the first user indicating a first amount of available fiat for the first user held by the digital asset exchange on behalf of the first user. In embodiments, the digital asset exchange computer system obtains the first amount of available fiat from a fiat account ledger database stored on a computer readable member accessible by the digital asset exchange computer system.

In step S1704C, the digital asset exchange computer system obtains a user specific destination address. The user specific destination address may be uniquely associated with the first user. In step S1704D, the digital asset exchange computer system generates second graphical user interface information including at least the first account balance information and the user specific destination address. In embodiments, the graphical user interface described in step S1704C may be the graphical user interface shown in connection with FIG. 15A.

At step 1704E, the digital asset exchange computer system may transmit the second graphical user interface information to the first user device. In embodiments, this may cause the first user device to display the graphical user interface shown in connection with FIG. 15A.

In step 1704F, the digital asset exchange computer system may receive a second electronic deposit request form the first user device. In embodiments, the second electronic deposit request may comprise at least: (1) a first amount of stable value digital asset tokens to be deposited; (2) a designated public address of the first user on the underlying blockchain from which the first amount of stable value digital asset tokens will be transferred; and (3) a digital signature based on a designated private key of the first user. In embodiments, the designated private key of the first user is mathematically related to the designated public address of the first user.

In embodiments, the designated private key of the first user may be stored in a custodial system, the custodial system may be part of digital asset exchange computer system, the administrator system, the stable value token issuer system or a third party system and may be accessed to provide the digital signature based on authorization of the first user. In embodiments, the first user may authorize transactions based on authentication information. In embodiments, the authentication information may include a user name and password associated with the first user. In embodiments, multi-fact verification may be necessary in order for the first user to authorize the custodial system to access the designated private key and provide a digital signature to authorize a transaction. In embodiments, the multi-fact verification may include the use of an authorization code that is sent to a predetermined user device, e-mail address, or mobile phone number, to name a few, associated with the first user, for example, as used in AUTHY® (AUTHY® is a registered trademark of Twilio, Inc.). In embodiments, other multi-factor verifications may be used, such as identification of a user device associated with the first user based on phone number or mobile network, location information and shared secret verification, to name a few.

Figure 17E:
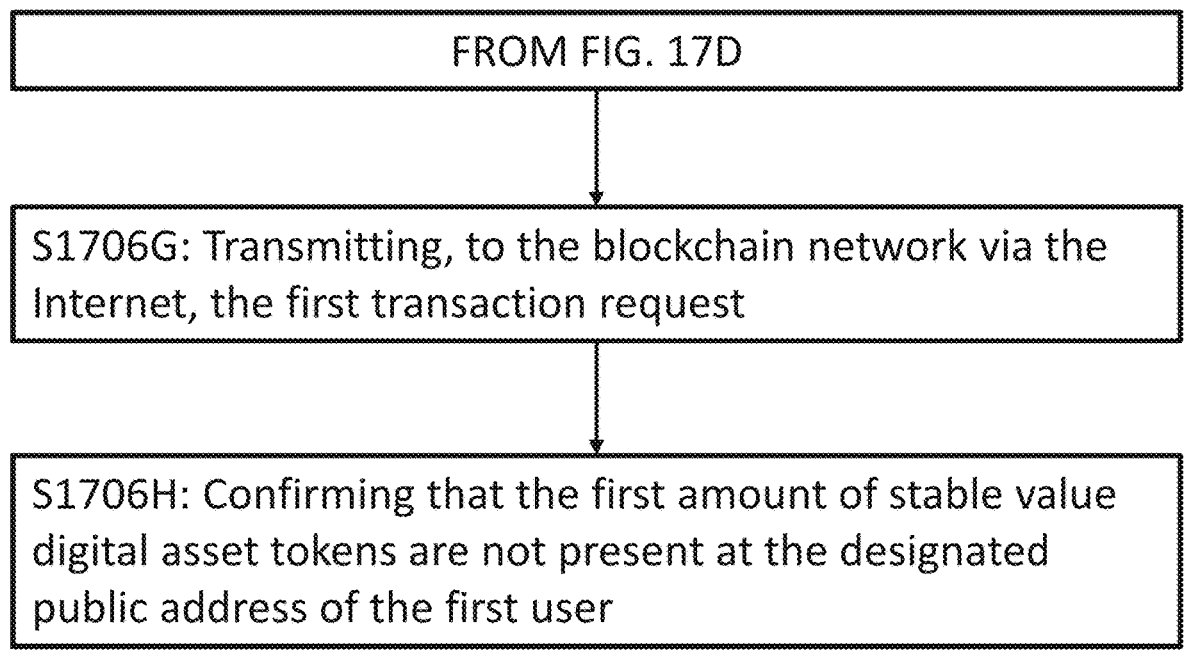

Referring back to FIG. 17A, in step S1706, the digital asset exchange computer system processes the second electronic deposit request. FIGS. 17D-17E provide a detailed illustration of an exemplary embodiment of processing the second electronic deposit request that may be used in accordance with exemplary embodiments of step 1706. Referring to FIG. 17D, in step S1706A, the digital asset exchange computer system calculates a second amount of fiat based on the first amount of stable value digital asset tokens. In embodiments, the second amount of fiat is determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the fixed predetermined ratio may be one hundred stable value digital asset tokes is equal to one U.S. Dollar.

In step S1706B, the digital asset exchange computer system determines that the first amount of stable value digital asset tokens is present at the designated public address of the first user. In the case where the first amount of stable value digital asset tokens is present at the designated public address of the first user, as indicated in step S1706C, the digital asset exchange computer system determines a third amount of fiat associated with an updated amount of available fiat of the first user. In embodiments, the third amount of fiat equals the first amount of available fiat of the first user plus the second amount of fiat.

At step 1706D, the digital asset computer system updates the fiat account ledger to reflect that the updated amount of available fiat of the first user is the third amount of fiat. At a step 1706E, the digital asset exchange computer system generates a first transaction request for the blockchain from a first digital asset exchange public key address on the blockchain to a first contract address associated with a stable value token issuer. In embodiments, the first digital asset exchange public key address is mathematically related to a first digital asset exchange private key which is stored in the computer readable member accessible by the digital asset exchange computer system.

In embodiments, the first transaction request includes: (1) a request to obtain the first amount of stable value digital asset tokens from the designated public address of the first user; and (2) a request to destroy the first amount of stable value digital asset tokens. In alternative embodiments, the first transaction request may include: (1) a request to obtain the first amount of stable value digital asset tokens from the designated public address of the first user; and (2) a request to provide the first amount of stable value digital asset tokens to a specific destination address. In embodiments, the first transaction request is signed with a generated digital signature based on the digital asset exchange private key of the digital asset exchange.

In step 1706F, the digital asset exchange computer system may update a stable value digital asset token issuer fiat ledger. The update may decrease the balance of fiat by the second amount of fiat. In embodiments, the digital asset exchange computer system may transfer the second amount of fiat from a stable value digital asset token issuer to a digital asset exchange fiat account. In embodiments, the digital asset exchange computer system may periodically transfer fiat between a stable value digital asset token issuer fiat account and a digital asset exchange fiat account based on net transactions over a predetermined period of time.

At step S1706G, the digital asset exchange computer system may transmit the first transaction request to the blockchain network via the Internet. In step, S1706H, the digital asset exchange system confirms, via reference to the blockchain, that the first amount of stable value digital asset tokens is not present at the designated public address of the first user.

FIG. 15B illustrates an exemplary GUI for an interface with the digital asset exchange in which a user can withdraw/purchase stable value tokens in the form of Gemini Dollar tokens from their digital asset exchange account. In this exemplary embodiment, the amount of the withdrawal is expressed in U.S. Dollars, and a corresponding amount of U.S. Dollars is debited from the user's fiat account with the exchange. As part of the withdrawal process, the digital asset exchange may arrange to issue new stable value tokens to the customer at the specified digital asset exchange in accordance with embodiments elsewhere described. In embodiments, the digital asset exchange may instead transfer pre-existing stable value tokens instead. As noted above, since the stable value token is pegged to a predetermine ratio of fiat, (e.g., 1 Gemini Dollar=USD 1, or 100 Gemini Dollar=USD 1), expressing the withdrawal amount in dollars is sufficient to allow the user and the digital asset system to determine the amount of Gemini Dollars tokens being withdrawn/purchased.

FIGS. 16A-16E illustrate an embodiment of withdrawing/purchasing stable value digital asset tokens (i.e. Gemini Dollar tokens) in exchange for fiat.

Figure 16A:
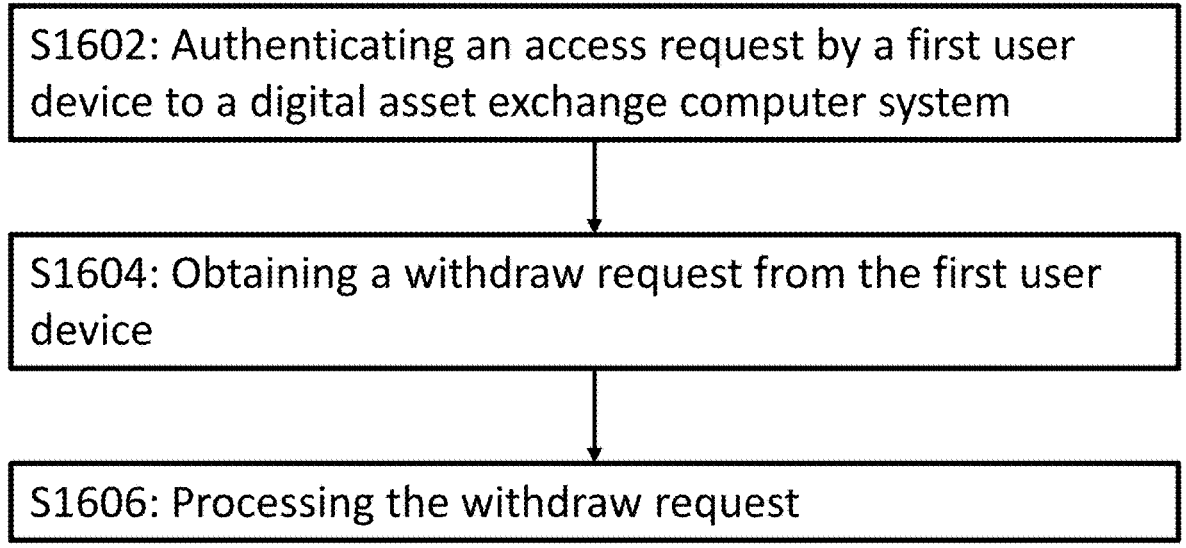
FIG. 16A is an exemplary flowchart of a process for withdrawing stable value digital asset tokens from a digital asset exchange computer system in accordance with exemplary embodiments in the present invention.

In step S1602 of FIG. 16A, a digital asset exchange computer system associated with a digital asset exchange receives and authenticates an access request from a first user device associated with a first user. FIG. 16B provides a more detailed illustration of an exemplary embodiment of receiving and authenticating an access request from a first user device associated with a first user that may be used in accordance with exemplary embodiments of step 1602. At step S1602A, the digital asset exchange computer system receives an authentication request from the first user device. In embodiments, the authentication request includes first user credential information associated with the first user.

At step S1602B, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority.

At step S1602C, the digital asset exchange computer system generates first graphical user interface (GUI) information for displaying a first graphical user interface on the first user device. In step S1602D, the digital asset exchange computer system transmits the first graphical user interface information to the first user device.

Referring back to FIG. 16A, in step S1604, the digital asset computer system obtains a withdraw request from the first user device. FIG. 16C provides a detailed illustration of an exemplary process of obtaining the withdraw request that may be used in accordance with exemplary embodiments of step 1604. In step S1604A, the digital asset exchange computer system receives a first electronic request to withdraw stable value digital asset tokens from the first user device. In embodiments, the stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ether and the blockchain is the Ethereum Blockchain. In embodiments, the underlying digital asset is neo and the blockchain is the Neo Blockchain.

In step S1604B, the digital asset exchange computer system obtains first account balance information of the first user indicating a first amount of available fiat for the first user held by the digital asset exchange on behalf of the user. The digital asset exchange computer system may obtain the first account balance from a fiat account ledger database stored on computer readable member accessible by the digital asset exchange computer system.

In step S1604C, the digital asset exchange computer system generates second graphical user interface information including at least the first account balance information. In embodiments, the second graphical user interface may be similar to the graphical user interface shown in connection with FIG. 15B. In step S1604D, the digital asset exchange computer system transmits the second graphical user interface information to the first user device. In embodiments, the first user device may display the second graphical user interface in response to this transmission. For example, the first user device may display the graphical user interface shown in connection with FIG. 15B.

In step S1604E, the digital asset exchange computer system receives a second electronic withdrawal request from the first user device. The second electronic withdrawal request may comprise at least: (1) a first amount of stable value digital asset tokens to be withdrawn; and (2) a destination public address on the underlying blockchain to transfer the first amount of stable value digital asset tokens.

Figure 16E:
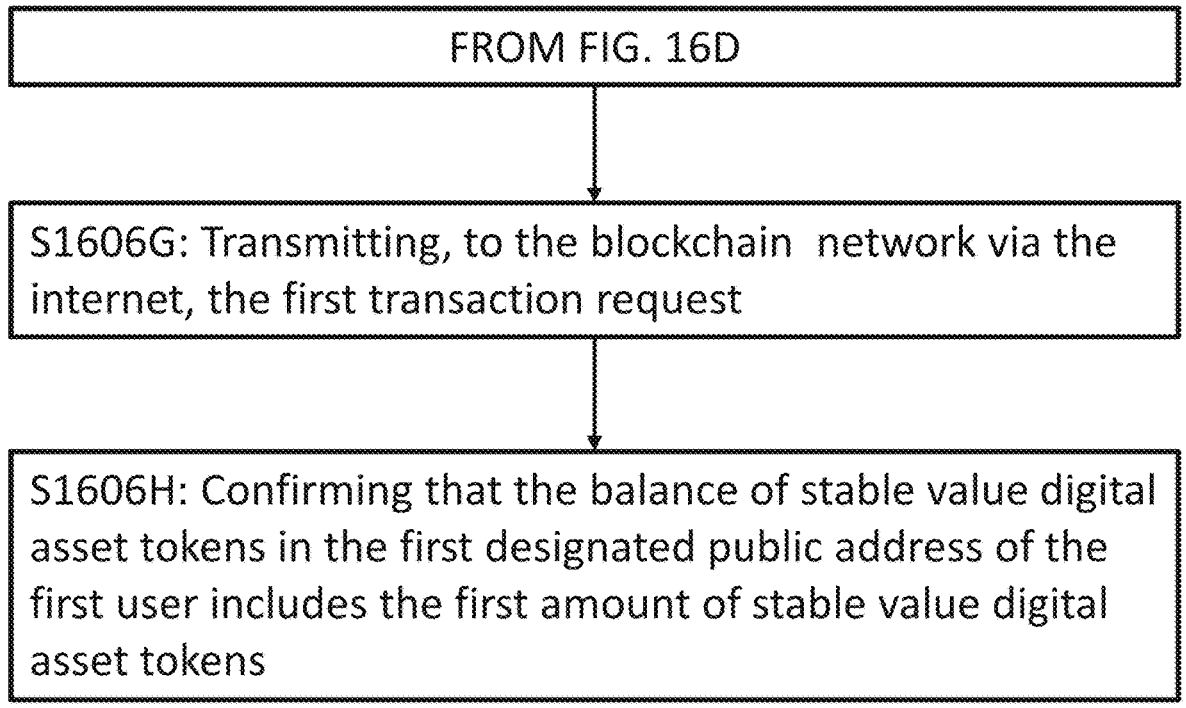

Referring back to FIG. 16A, in step S1606, the digital asset exchange computer system processes the second withdrawal request. FIGS. 16D-16E provide a detailed illustration of an exemplary process of processing the second withdrawal request that may be used In embodiments, of step S1606. In step S1606A, the digital asset exchange computer system calculates a second amount of fiat based on the first amount of stable value digital asset tokens. The second amount of fiat may be determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the ratio may be one hundred stable value digital asset tokes is equal to one U.S. Dollar.

At step S1606B, the digital asset exchange computer system determines that the second amount of fiat is less than the first amount of available fiat of the first user. In step 1606C, where the second amount of fiat is less than the first amount of available fiat of the first user, the digital asset exchange computer system determines a third amount of fiat associated with an updated amount of available fiat of the first user. In embodiments, the third amount of fiat equals the first amount of available fiat of the first user less the second amount of fiat.

In step S1606D, the digital asset exchange computer system updates the fiat ledger database to reflect the updated amount of available fiat. In step S1606E, the digital asset exchange computer system updates a stable value digital asset token issuer fiat ledger, increasing the balance of fiat by the second amount of fiat. In embodiments, the digital asset exchange computer system may transfer the second amount of fiat from a digital asset exchange fiat account to a stable value digital asset token issuer fiat account. In embodiments, the digital asset exchange computer system may periodically transfer fiat between the digital asset exchange fiat account and the stable value digital asset token issuer fiat account.

In step S1606F, the digital asset exchange computer system generates a first transaction request for the blockchain network from a first digital asset exchange public key address on the blockchain to a first contract address associated with a stable value digital asset token issuer. In embodiments, the first digital asset exchange public key is mathematically related to a first digital asset exchange private key which is stored in the computer readable member accessible by the digital asset exchange computer system. The first transaction request may comprise a first message including a request to obtain in the first designated public address the first amount of stable value digital asset tokens. In embodiments, the first transaction request is signed with a digital signature generated using at least the digital asset exchange private key. In embodiments, the request to obtain may further include a request to generate the first amount of stable value digital asset tokens at the first designated public address of the first user. In embodiments, the request to obtain may include a request to transfer the first amount of stable value digital asset tokens from a stable value digital asset token issuer public address to the first designated public address of the first user.

In step S1606G of FIG. 16E, the digital asset exchange computer system transmits the first transaction request to the blockchain network via the Internet. In step S1606H, the digital asset exchange computer system confirms, via reference to the blockchain, that the balance of stable value digital asset tokens in the first designated public address of the first user includes the first amount of stable value digital asset tokens.

In embodiments, as noted above, customers may exchange U.S. dollars for Gemini Dollar tokens at a 1:1 exchange rate, for example, by initiating a withdrawal of Gemini Dollar tokens from their digital asset exchange account to any Ethereum address they specify, as indicated in FIG. 15B. The U.S. dollar amount of Gemini Dollar tokens will be debited from the customer's exchange account balance at the time of withdrawal. In embodiments, as noted above, customers may exchange U.S. dollars for a fiat-backed digital asset at an exchange rate based on the value of the fiat-backed digital asset, for example, by initiating a withdrawal of Libra Tokens from their account to any public address associated with an account on a peer-to-peer network.

FIGS. 48A-48D are flow charts of a process for withdrawing fiat-backed digital assets from a digital asset exchange in accordance with exemplary embodiments of the present invention. In embodiments, the fiat-backed digital asset may be: a fiat-backed digital asset token (e.g. a Gemini Dollar), a stable value digital asset token, and/or Libra, to name a few. In embodiments, the fiat-backed digital asset may be backed by one or more amounts of one or more types of the following assets: one or more types of fiats (e.g., U.S. Dollars, Euro, Yen, Brittish Pound, Swiss Franc, Canadian Dollar, Australian Dollar, New Zealand Dollar, Kuaiti Dinar, Bahrain Dinar, Oman Rial, Jordan Dinar, Cayman Island Dollar, South African Rand, Mexican Pesos, Renmembi, to name a few); bank accounts in such fiat; one or more government securities denominated in such fiats (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate; gold; diamonds; and/or a combination thereof, to name a few. In embodiments may be only one kind of asset (e.g., dollars held in a bank or government security or CD, to name a few) or a basket of assets (e.g., multiple fiats, e.g., dollars, euros, yet, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

The process of withdrawing fiat-backed digital assets from a digital asset exchange may be similar to the process discussed above in connection with FIGS. 16A-16E, the description of which applying herein. The process of FIGS. 48A-48D may begin at step S4802. At step S4802, the digital asset exchange computer system authenticates an access request by a first user device (which may be similar to the process described in FIGS. 16B and 17B, the descriptions of which applying herein). The first user device, in embodiments, may be associated with a first user of the digital asset exchange computer system. In embodiments, the first user may be a user of the digital asset exchange associated with the digital asset exchange computer system. The digital asset exchange and digital asset exchange computer system may be operatively connected to each other via a network (e.g. Network 15).

In embodiments, first user device, as used herein, may, in embodiments, correspond to one or more suitable types of electronic devices including, but not limited to, desktop computers, mobile computers (e.g., laptops, ultrabooks), servers, mobile phones, portable computing devices, such as smart phones, tablets and phablets, televisions, set top boxes, smart televisions, personal display devices, personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few. In some embodiments, first user device 6104 may be relatively simple or basic in structure such that no, or a minimal number of, mechanical input option(s) (e.g., keyboard, mouse, track pad) or touch input(s) (e.g., touch screen, buttons) are included. For example, first user device 6104 may be able to receive and output audio, and may include power, processing capabilities, storage/memory capabilities, and communication capabilities. However, in other embodiments, first user device 6104 may include one or more components for receiving mechanical inputs or touch inputs, such as a touch screen and/or one or more buttons.

The First user device may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

In embodiments, first user device may include one or more processor(s), memory, and a communication portal. One or more processor(s), may include any suitable processing circuitry capable of controlling operations and functionality of first user device, as well as facilitating communications between various components within first user device. In some embodiments, processor(s) may include a central processing unit ("CPU"), a graphic processing unit ("GPU"), one or more microprocessors, a digital signal processor, or any other type of processor, or any combination thereof. In some embodiments, the functionality of processor(s) 6104 A may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 6104 A may include its own local memory, which may store program systems, program data, and/or one or more operating systems. However, processor(s) may run an operating system ("OS") for the first user device, and/or one or more firmware applications, media applications, and/or applications resident thereon. In some embodiments, processor(s) may run a local client script for reading and rendering content received from one or more websites. For example, processor may run a local JavaScript client for rendering HTML or XHTML content received from a particular URL accessed by the first user device.

In embodiments, as mentioned above, the first user device may also include memory. Memory may include one or more types of storage mediums such as any volatile or non-volatile memory, or any removable or non-removable memory implemented in any suitable manner to store data for the first user device. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 6104-B may be implemented as computer-readable storage media ("CRSM"), which may be any available physical media accessible by processor(s) to execute one or more instructions stored within memory. In some embodiments, one or more applications (e.g., mobile application software, gaming, music, video, calendars, lists, banking, social media etc.) may be run by processor(s) and may be stored in memory.

In embodiments, as mentioned above, the first user device may also include a communications portal. The communications portal may include any circuitry allowing or enabling one or more components of the first user device to communicate with one another, with the digital asset exchange computer system, and/or with one or more additional devices, servers, and/or systems. As an illustrative example, data retrieved from memory of the first user device may be transmitted via a network, to the digital asset exchange computer system using any number of communications protocols. For example, the network may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the first user device and the digital asset exchange computer system. In some embodiments, the first user device and the digital asset exchange computer system may communicate with one another via a web browser using HTTP. Various additional communication protocols may be used to facilitate communications between the first user device and/or the digital asset exchange computer system, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications portal may use any communications protocol, such as any of the previously mentioned exemplary communications protocols. In some embodiments, the first user device may include one or more antennas to facilitate wireless communications with a network using various wireless technologies (e.g., Wi-Fi, Bluetooth, radiofrequency, etc.). In yet another embodiment, the first user device may include one or more universal serial bus ("USB") ports, one or more Ethernet or broadband ports, and/or any other type of hardwire access port so that the communications portal allows the first user device to communicate with one or more communications networks.

The digital asset exchange computer system and/or the digital asset exchange, in embodiments, may also each include one or more processor(s), network connection interface, and memory. The one or more processor of the digital asset exchange computer system and/or the digital asset exchange, as used herein, may be similar to the one or more processor(s) described above, the description of which applying herein. The network connection interface of the digital asset exchange computer system and/or the digital asset exchange may be similar to the communication portal described above, the description of which applying herein. Memory of the digital asset exchange computer system and/or the digital asset exchange may be similar to the memory described above, the description of which applying herein. In embodiments, the digital asset exchange computer system may be similar to exchange computer system 3230 described in connection with FIG. 5A and/or exchange computer system 3210, described in connection with FIG. 3, the descriptions of which applying herein.

The process of authenticating an access request in embodiments, may be performed via the steps illustrated in FIG. 48B. Referring to FIG. 48B, the process of authenticating an access request may begin at step S4808. At step S4808, the digital asset exchange computer system receives an authentication request from a first user device. In embodiments, the authentication request may include first user credential information that is associated with the first user. First user credential information, in embodiments, may be a user name and corresponding password associated with the first user. For example, the first user device may try to log into the first user's respective account by entering its username and password. The username and password combination, continuing the example, may be sent by the first user device to the digital asset exchange computer system via a network. In embodiments, the first user credential information may further include one or more of the following: a name, email address, address, date of birth, and/or social security number, to name a few. In embodiments, the first user credential information may be similar to the authentication data 5112 described in connection with FIG. 5A, the description of which applying herein.

The process of authenticating an access request may continue with step S4810. At step S4810, the digital asset exchange computer system determines that the first user device is authorized to access the digital asset exchange computer system. In embodiments, the digital asset exchange computer system may authorize the first user device based on the first user credentials. For example, the digital asset exchange computer system may obtain verified first user credentials (e.g. credentials associated with the first user that are already verified) by accessing (via e.g. authenticator module 5124) one or more user identification databases (e.g. user identification data 5110, user authentication data 5112) that store the verified first user credentials. Once obtained, the verified first user credentials may be compared to the received first user credentials by the digital asset exchange computer system. If the received first user credentials do not match the verified first user credentials, the digital asset exchange computer system may determine that the first user is not authorized to access the digital asset exchange computer system. If the received first user credentials are not authorized the process of FIGS. 48A-48D may stop here and/or, in embodiments, the digital asset exchange computer system may generate and send a notification to the first user device, indicating the failed log in attempt. In embodiments, a notification may be sent to a second user device associated with the first user, the notification indicating a failed log in attempt.

In embodiments, the digital asset exchange computer system may further verify the first user credentials. The digital asset exchange computer system may determine whether the first user is a registered user of the digital asset exchange associated with the digital asset exchange computer system. The verification process may be similar, with verified registered user credentials being compared to the first user credentials. In embodiments, the first user may be authorized to access the digital asset exchange computer system, but not a registered user. In embodiments, the digital asset exchange may be a government regulated authority.

The process of authenticating an access request may continue with step S4812. At step S4812 the digital asset exchange computer system may generate first graphical user interface information. In embodiments, the first graphical user interface information may be for displaying a graphical user interface on the first user device. For example, the first graphical user interface information may include first machine-readable instructions representing one or more of the following: (1) a home page of a website or mobile application associated with the digital asset exchange computer system; and/or (2) a log-in success message and/or home page, to name a few.

The process of authenticating an access request may continue with step S4814. At step S4814, the digital asset exchange computer system may transmit the first graphical user interface information to the first user device via a network. In embodiments, upon receipt of the first graphical user interface information, the first user device displays the graphical user interface associated with the graphical user interface information on a display of the first user device. For example, the digital asset exchange computer system may send the first machine-readable instructions to the first user device, and, upon receiving the first machine-readable instructions, the first user device executes the first machine-readable instructions which may cause the first GUI to be displayed on a display screen of the first user device.

Figure 48A:
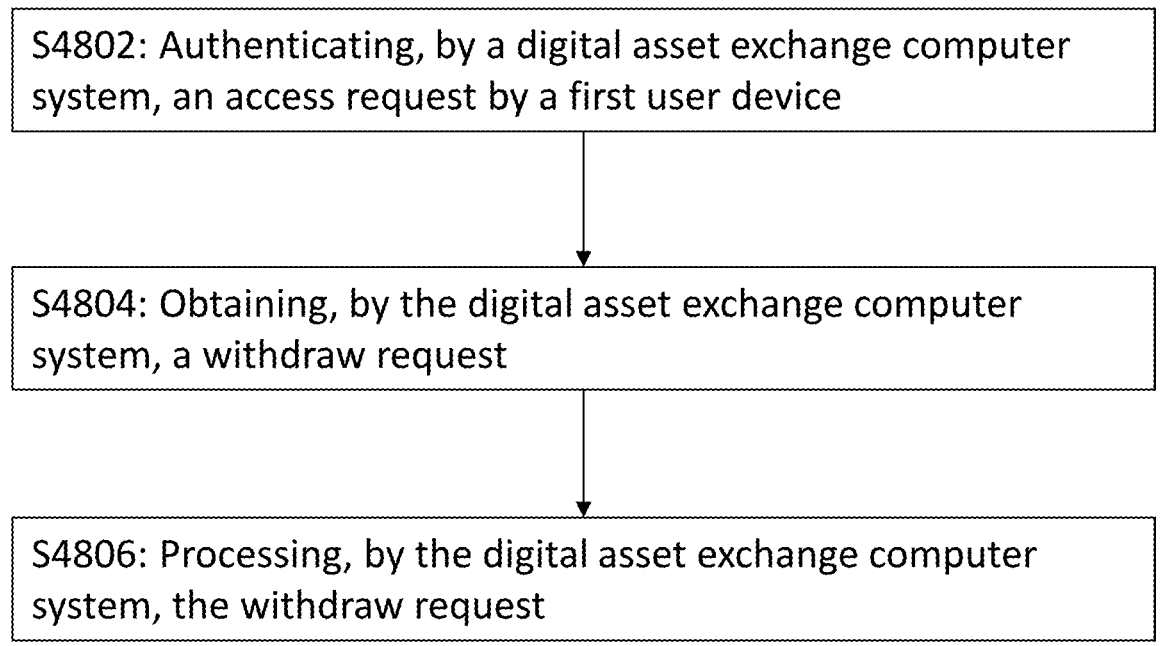

Referring back to FIG. 48A, the process of withdrawing fiat-backed digital assets from a digital asset exchange may continue with step S4804. At step S4804, the digital asset exchange computer system obtains a withdraw request. In embodiments, the digital asset exchange computer system may obtain the withdraw request by receiving a withdraw request from the first user device via a network. The process of obtaining a withdraw request may be performed via the steps illustrated in FIG. 48C. Referring to FIG. 48C, the process of obtaining a withdraw request may begin at step S4816. At step S4816, the digital asset exchange computer system may receive a first request to withdraw fiat-backed digital assets from the first user device.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g. twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a *byzantine* fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

The process for obtaining a withdrawal request may continue with step S4818. At step S4818, in response to receiving the first request to withdraw fiat-backed digital assets, the digital asset computer system may obtain first account balance information of the first user. The first account balance may, in embodiments, indicate a first amount of available fiat. The first amount of available fiat may be fiat owned by the first user that is located in an account associated with the first user and the digital asset exchange computer system. In embodiments, the first amount of available fiat may be owned by the first user and in the custody of the digital asset exchange computer system and/or the digital asset exchange. In embodiments, the first account balance information may be stored on a fiat ledger associated with the digital asset exchange computer system (e.g. fiat account balance data 5118, electronic ledger data 5116, fiat account module 5134). Obtaining an account balance may be similar to the descriptions of obtaining an account balance described throughout, the description of which applying herein.

The process for obtaining a withdrawal request may continue with step S4820. At step S4820, the digital asset exchange computer system may generate second graphical user interface information. In embodiments, the second graphical user interface information may be for displaying a graphical user interface on the first user device. For example, the second graphical user interface information may include second machine-readable instructions representing one or more of the following: (1) a display that includes the first account balance information; (2) a display that includes user identification information; and/or (3) a display that includes the first user's past transactions (all of the past transactions and/or a portion of the past transactions), to name a few.

The process of obtaining a withdrawal request may continue with step S4822. At step S4822, the digital asset exchange computer system may transmit the second graphical user interface information to the first user device via a network. In embodiments, upon receipt of the second graphical user interface information, the first user device displays the graphical user interface associated with the graphical user interface information on a display of the first user device. For example, the digital asset exchange computer system may send the second machine-readable instructions to the first user device, and, upon receiving the second machine-readable instructions, the first user device executes the second machine-readable instructions which may cause the second GUI to be displayed on a display screen of the first user device.

The process for obtaining a withdrawal request may continue with step S4824. At step S4824, the digital asset exchange computer system receives a second electronic withdrawal request of a first amount of fiat-backed digital assets. The second electronic withdrawal request may include one or more of the following: an amount of fiat-backed digital assets to withdraw (e.g. the first amount of fiat-backed digital assets); a designated public address on the disturbed transaction ledger of which the withdrawal of fiat-backed digital assets is directed towards; and/or a timestamp, to name a few. The timestamp, in embodiments, may be one or more timestamps indicating one or more of the following: the time and/or date at which the second withdrawal request was sent, the time and/or date at which the second withdrawal request was received, and/or the time and/or date the first user wishes to withdraw the first amount of fiat-backed digital assets, to name a few. In embodiments, the second withdraw request may be digitally signed by a private key associated with the first user. The private key associated with the first user may, in embodiments, have a corresponding public key. The public key and private key, in embodiments, may be mathematically related. The public key may be associated with one or more private keys. The one or more private keys may be mathematically related to one another. In embodiments, the public key associated with the first user may be used to generate a first user public address associated with the first user. The first user public address, in embodiments, may be generated by applying a hash algorithm to the public key associated with the first user. The result of the application of the hash algorithm may, in embodiments, be the first user public address.

In embodiments, the designated public address may be associated with a public key which may have been used to generate the designated public address. For example, the digital asset address associated with the designated public address may be generated by applying a hash algorithm to the public key associated with the user associated with the designated public address. The result of the application of the hash on the public key may be the designated public address.

In embodiments, the second withdraw request may further include a request to transfer the first amount of fiat-backed digital assets from a fiat-backed digital asset issuer (e.g. an administrator) public address to the first designated public address. In embodiments, the second withdraw request may further include a request to generate the first amount of fiat-backed digital assets and, after printing the first amount of fiat backed digital assets, assigning the new fiat-backed digital assets to the first designated public address. In embodiments, the second withdraw request may further include a request to generate the first amount of fiat-backed digital assets and, after printing the first amount of fiat backed digital assets, assigning the new fiat-backed digital assets to the first designated public address. The process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein. In embodiments, the fiat-backed digital asset issuer may issue fiat-backed digital assets in response to fluctuations in demand of the fiat-backed digital asset. For example, if the demand of the fiat-backed digital asset increases, the fiat-backed digital asset issuer may print fiat-backed digital assets. Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn fiat-backed digital assets. Continuing the example, the fiat-backed digital asset issuer may burn fiat-backed digital assets in proportion to the decrease in demand. Alternatively, the fiat-backed digital asset issuer may burn fiat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, after receiving the second withdrawal request, the digital asset exchange computer system may verify the second withdrawal request. Verifying the second withdrawal request may include confirming one or more of the following: the validity of the first user public address, the amount of fiat owned by the first user, that the first user owns at least the second amount of fiat, and/or the designated public address is not prohibited from receiving a fiat-backed digital assets on behalf of the first user, to name a few. For example, to confirm the first user public address, the digital asset exchange computer system may compare the first user public address to a verified first user public address stored by the digital asset exchange computer system. Continuing the example, if the first user public address is the same as the verified first user public address, the first user public address may be verified. If the first user public address is not the same as the verified first user public address, the second withdraw request may be denied and/or a notification may be generated and sent by the digital asset exchange computer system to the first user device. The notification may indicate that the first user public address was not verified and the withdrawal request is denied. As another example, if the second withdrawal request includes a designated public address, the digital asset exchange computer system may verify whether the designated address is on a whitelist associated with the first user. Continuing the example, if the first user is associated with a whitelist, the digital asset exchange computer system may compare the designated public address to the whitelist. If the designated public address is on the whitelist, the designated public address may be verified. If the designated public address is not on the whitelist and thus is not verified, the second withdrawal request may be denied and/or a notification may be generated and sent by the digital asset exchange computer system to the first user device and/or a second user device associated with the first user. The notification may indicate that the designated public address is not authorized to receive fiat-backed digital assets on behalf of the first user and the withdraw request has been denied. The process of verifying designated addresses in the context of a whitelist may be similar to the process described in connection with FIG. 45, the description of which applying herein.

Referring back to FIG. 48A, the process of withdrawing fiat-backed digital assets from a digital asset exchange may continue with step S4806. At step S4806, the digital asset exchange computer system may process the withdraw request—in the context of this embodiment—the second electronic withdraw request (or the second withdraw request). In embodiments, the digital asset exchange computer system may process the second withdraw request by performing the steps illustrated in FIG. 48D.

Referring to FIG. 48D, processing the second withdraw request may begin at step S4826. At step S4826, the digital asset exchange computer system may calculate a second amount of fiat based on the first amount of fiat-backed digital assets. In embodiments, the second amount of fiat may equal the fiat value of the fiat-backed digital assets, which, in embodiments, may be calculated based on an exchange rate of fiat-backed digital assets to fiat. In embodiments, the digital asset exchange computer system may utilize an exchange module (which may be operatively connected to the digital asset exchange computer system) to calculate the conversion between fiat and the fiat-backed digital asset. The exchange rate may be based on the value of the asset or assets that back the fiat-backed digital asset, which may be updated periodically, aperiodically, in real-time, in substantially real-time, and/or on predetermined intervals, to name a few. In embodiments an exchange module may display and/or otherwise communicate one or more exchange rates and/or the value of the fiat-backed digital asset in fiat. In embodiments, the exchange rate may be based on the type of fiat the user wishes to pay for fiat-backed digital assets and/or the type of digital asset located in the account associated with the user. In embodiments the exchange rate may be a fixed exchange rate. For example, the exchange rate may be one fiat-backed digital asset equals one U.S. Dollar. As another example, the exchange rate may be 100 fiat-backed digital assets is equal to one U.S. Dollar. In embodiments, the exchange rate may be a fluctuating exchange rate. For example, the fluctuation exchange rate (e.g. variable exchange rate) may be based on market conditions.

Processing the second withdraw request may continue at step S4828. At step S4828, the digital asset exchange computer system determines that the second amount of fiat is either less than the first amount of available fiat or equal to the first amount of available fiat. In embodiments, the digital asset exchanged computer system may compare the second amount of fiat to the first amount of available fiat to make the determination regarding whether the first user has sufficient funds to withdraw the first amount of fiat-backed digital asset.

If, in embodiments, the first amount of available fiat is less than the second amount of fiat, the digital asset exchange computer system may determine that the first user has insufficient funds to complete the withdrawal. If the first user has insufficient funds, the process of FIGS. 48A-48D may stop here and/or, in embodiments, the digital asset exchange computer system may generate and send a notification to the first user device, indicating insufficient funds. In embodiments, a notification may be sent to a second user device associated with the first user, the notification indicating a insufficient funds.

Processing the second withdraw request may continue at step S4830. At step S4830, the digital asset exchange computer system may determine a third amount of fiat associated with an updated amount of available fiat of the first user. The third amount of fiat, in embodiments, may correspond to an amount of fiat the first user may own after the withdraw request is executed and/or committed. To determine the third amount, the digital asset exchange computer system may subtract the second amount of fiat from the first amount of available fiat. For example, if the first amount of available fiat is 100 Dollars and the second amount of fiat is 75 Dollars, the third amount of fiat, in this example, would be 25 Dollars. In embodiments, the withdrawal request may have one or more fees associated with executing and/or committing the withdrawal request. These fees (e.g. transaction fees), may be represented as an amount of fiat-backed digital asset or an amount of fiat, or both. For example, if the first amount of available fiat is 100 Dollars, the second amount of fiat is 75 Dollars, and the transaction fee is 1 Dollar, the third amount of fiat, in this example, would be 24 Dollars.

Processing the second withdraw request may continue at step S4832. At step S4832, the digital asset exchange computer system may update a fiat account ledger database. In embodiments, the update to the fiat account ledger database may be to account for the second amount of fiat associated with the second withdraw request. The fiat account ledger, in embodiments, may be stored on computer readable member accessible by the digital asset exchange computer system. The fiat account ledger, in embodiments, may include one or more of the following: the amount of fiat each user owns in the custody of the digital asset exchange computer system; the total amount of fiat in the custody of the digital asset exchange computer system; the total amount of fiat that the digital asset exchange and/or digital asset exchange computer system owns; transactions associated with each user and/or fiat; and/or transactions associated with the digital asset exchange and/or digital asset exchange computer system and/or fiat, to name a few.

Processing the second withdraw request may continue at step S4834. At step S4834, the digital asset exchange computer system may update a fiat-backed digital asset issuer fiat ledger. In embodiments, the update to the fiat-backed digital asset issuer fiat ledger may be to account for the second amount of fiat associated with the second withdraw request. In embodiments, the fiat-backed digital asset issuer fiat ledger may be associated with a fiat-backed digital asset issuer (e.g. the issuer of the fiat-backed digital asset associated with the process described herein). In embodiments, the fiat-backed digital asset issuer fiat ledger may be updated by the digital asset exchange computer system sending a request to the fiat-backed digital asset issuer. The request, in embodiments, may include a request to update the fiat-backed digital asset issuer fiat ledger. In response to receiving the request, the fiat-backed digital asset issuer may update their fiat-backed digital asset issuer fiat ledger.

In embodiments, the digital asset exchange computer system may also transfer the second amount of fiat to the fiat-backed digital asset issuer (e.g. from an account on the peer-to-peer network associated with the digital asset exchange to an account on the peer-to-peer network associated with the fiat-backed digital asset issuer). In embodiments, the digital asset exchange computer system may transfer the second amount of fiat before, with, or after the request to update the fiat-backed digital asset issuer fiat ledger is sent to the fiat-backed digital asset issuer. In embodiments, the digital asset exchange computer system may periodically transfer fiat from an account on the peer-to-peer network associated with the digital asset exchange to an account on the peer-to-peer network associated with the fiat-backed digital asset issuer. The periodic transfers may be made at defined time intervals. The defined time intervals may be defined based on: the amount of fiat that is due to be transferred from the digital asset exchange computer system to the fiat-backed digital asset issuer; the amount of transactions including fiat; the processing capabilities of the fiat-backed digital asset issuer and/or the digital asset exchange computer system; and/or one or more government regulations, to name a few. For example, the digital asset exchange computer system may transfer fiat to the fiat-backed digital asset issuer once the digital asset exchange computer system is in custody of $50,000 owned by the fiat-backed digital asset issuer. In embodiments, the defined time intervals may be predetermined times throughout each day, week, month, and/or year, to name a few. For example, the digital asset exchange computer system may periodically transfer fiat from an account on the peer-to-peer network associated with the digital asset exchange to an account on the peer-to-peer network associated with the fiat-backed digital asset issuer every day at 2:00 PM EST.

Processing the second withdraw request may continue at step S4836. At step S4836, the digital asset exchange computer system may generate a first transaction request. The first transaction request, in embodiments, may include a first message that includes a request to obtain the first amount of fiat-backed digital assets. The first message may also include instructions to transfer the obtained first amount of fiat-backed digital assets to the first designated public address. In embodiments, the transaction request may be for the distributed transaction ledger and addressed to a contract address associated with the fiat-backed digital asset issuer. for the distributed transaction ledger In embodiments, the transaction request may include instructions to update the fiat-backed digital asset database and to reserve enough fiat-backed digital assets to cover the first amount of fiat-backed digital assets. In embodiments, the transaction request may include a digital signature associated with the digital asset exchange computer system. In embodiments, the transaction request may include a digital signature associated with a trusted entity system. The digital signature associated with the trusted entity system may be a combined digital signature based on of one or more private keys associated with one or more trusted entities of the trusted entity system. The digital signature, in embodiments, may further include one or more private keys associated with the first user.

Processing the second withdraw request may continue at step S4838. At step S4838, the digital asset exchange computer system transmits the transaction request to the peer-to-peer network via a network (e.g. network 15). In embodiments, transmitting the first transaction request to the peer-to-peer network may cause the first transaction request to be published by a trusted entity system. In embodiments, the trusted entity system may publish the transaction request to the peer-to-peer network via a network (e.g. Network 15).

In embodiments, publishing the transaction request may cause the peer-to-peer network to go through a process of executing and/or committing the transaction request (e.g. a consensus protocol) which may result in the transfer of the first amount of fiat-backed digital assets from the fiat-backed digital asset issuer to the first designated public address.

Processing the second withdraw request may continue at step S4840. At step S4840, the balance of the first user (e.g. the first designated public address and/or the first user public address) includes the first amount of fiat-backed digital assets. The confirmation, in embodiments, may be based on reference to the distributed transaction ledger. In embodiments, the first user public address in embodiments, may be the first designated public address. In embodiments, the digital asset exchange computer system may confirm that the first user received the fiat-backed digital assets (or the first designated public address received the first amount, in the case where the first designated public address is not associated with the first user) received the correct amount of fiat-backed digital assets. The confirmation process may be a call/return to and from the designated public address and/or the first user public address. In embodiments, the confirmation process may be a query to the peer-to-peer network for a status of the distributed transaction ledger, which may result in a receipt of the status of the distributed transaction ledger which may include the transfer of the first amount of fiat-backed digital assets.

The steps of the processes described in connection with FIGS. 48A-48D may be rearranged or omitted.

Figure 49A:
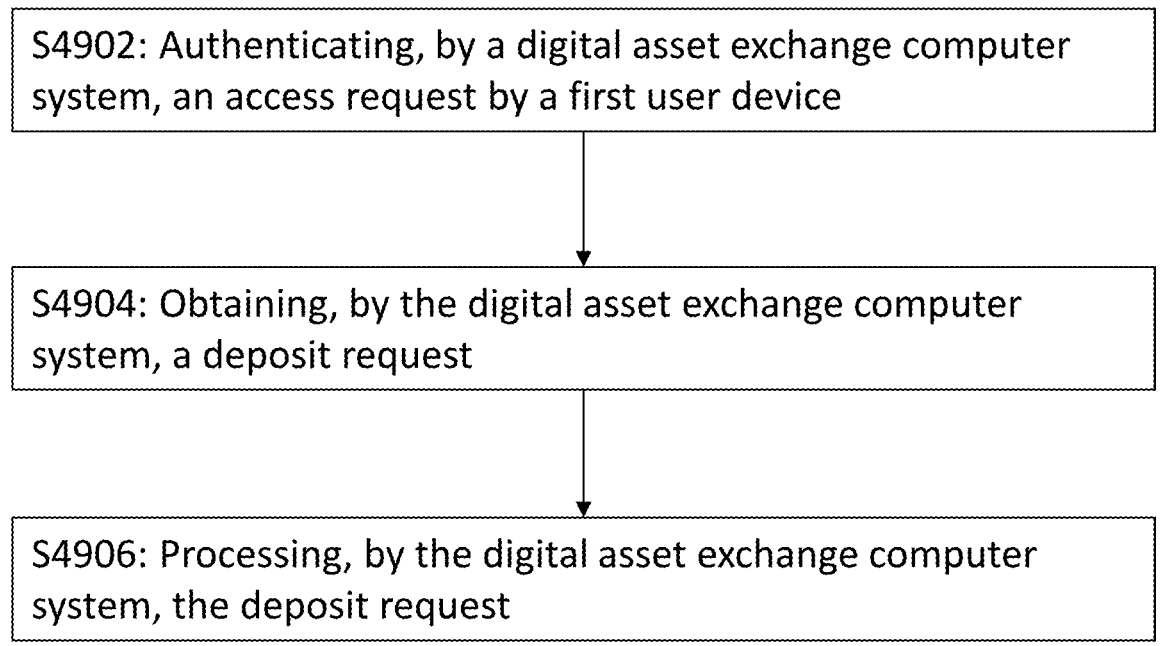

FIGS. 49A-49C are flow charts of a process for depositing fiat-backed digital assets from a digital asset exchange in accordance with exemplary embodiments of the present invention. In embodiments, the fiat-backed digital assets may be similar to the fiat-backed digital assets described above in connection with FIGS. 48A-48D, the description of which applying herein. The process of depositing fiat-backed digital assets may be similar to the process described in connection with FIGS. 17A-17E, the description of which applying herein.

Referring to FIG. 49A, a process for depositing fiat-backed digital assets may begin at step S4902. At step S4902 the digital asset exchange computer system authenticates an access request by a first user device. In embodiments, the first user device may be associated with a first user. In embodiments the digital asset exchange computer system may be associated with a digital asset exchange. In embodiments the digital asset exchange computer system may be operably connected with the digital asset exchange. In embodiments the first user device, digital asset exchange computer system, and the digital asset exchange may be similar to the first user device, digital asset exchange computer system, the digital asset exchange discussed above with respect to FIGS. 48A-48D, the descriptions of which respectively applying herein. The process for authenticating an access request by a first user device may be similar to the process described above in connection with FIG. 48B, the description of which applying herein. In embodiments, the digital asset exchange computer system may determine whether the first user is a registered user of the digital asset exchange. The process for determining whether the first user is a registered user may be similar to the process for determining whether the first user is a registered user, discussed above with respect to FIGS. 48A-48D, the description of which applying herein. In embodiments, the digital asset exchange may be licensed by a government regulatory authority.

The process for depositing an amount of fiat-backed digital asset into a digital asset exchange computer system may continue with step S4904. At step S4904, the digital asset exchange computer system obtains a deposit request. In embodiments, a process for obtaining a deposit request may be performed by the steps illustrated in FIG. 49B. Referring to FIG. 49B, FIG. 49B provides a detailed illustration of an exemplary process for obtaining such a deposit request that may be used in accordance with exemplary embodiments of step S4904. The process of FIG. 49B may begin at step S4908. At step S4908 the digital asset exchange computer system receives a first request to deposit a first amount of fiat-backed digital assets.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g. twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a *byzantine* fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

The process of obtaining a deposit request may continue with step S4910. At step S4910, in response to the first request, the digital asset exchange computer system obtains account balance information for a first user where the account balance information indicates an amount of available fiat of the first user. In embodiments, the account balance information may be obtained from a fiat account ledger database and/or the distributed transaction ledger. The fiat account ledger database, in embodiments, may indicate how much fiat (e.g. U.S. Dollars) the first user has available for use and/or owns. For example, the fiat-account ledger database may indicate the first user has a first amount of available fiat. In embodiments the account balance information may include first fiat-backed digital asset account balance information of the first user. The first fiat-backed digital asset account balance information may indicate a balance of fiat-backed digital assets that are owned by the first user and/or available for use by the first user. For example, the first fiat-backed digital asset account information may indicate that the first user has a second amount of fiat-backed digital assets available for use. In embodiments, the first amount of available fiat and/or the second amount of fiat-backed digital assets may be in the custody of the digital asset exchange computer system and/or the digital asset exchange. In embodiments, the fiat account ledger database may be stored on computer readable memory accessible by the digital asset exchange computer system. In embodiments, the digital asset exchange computer system may obtain and/or store a copy of the distributed transaction ledger on computer readable memory accessible by the digital asset exchange computer system.

The process of obtaining a deposit request, in embodiments, may continue with step S4912. At step S4912, the digital asset exchange computer system obtains a destination address. A destination address may be the public address associated with the entity the first user intends to deposit the first amount of fiat-backed digital assets. For example, the destination address may be a public address associated with the digital asset exchange computer system.

The process for obtaining a deposit request may continue with step S4914. At step S4820, the digital asset exchange computer system may generate second graphical user interface information. In embodiments, the second graphical user interface information may be for displaying a graphical user interface on the first user device. For example, the second graphical user interface information may include second machine-readable instructions representing one or more of the following: (1) a display that includes the first fiat-backed digital asset account balance information; (2) a display that includes the first account balance information; (3) a display that includes user identification information; and/or (4) a display that includes the first user's past transactions (all of the past transactions and/or a portion of the past transactions), to name a few.

The process of obtaining a deposit request may continue with step S4916. At step S4822, the digital asset exchange computer system may transmit the second graphical user interface information to the first user device via a network. In embodiments, upon receipt of the second graphical user interface information, the first user device displays the graphical user interface associated with the graphical user interface information on a display of the first user device. For example, the digital asset exchange computer system may send the second machine-readable instructions to the first user device, and, upon receiving the second machine-readable instructions, the first user device executes the second machine-readable instructions which may cause the second GUI to be displayed on a display screen of the first user device.

The process for obtaining a deposit request may continue with step S4918. At step S4918, the digital asset exchange computer system receives a second electronic deposit request of a first amount of fiat-backed digital assets. The second electronic deposit request may include one or more of the following: an amount of fiat-backed digital assets to deposit (e.g. the first amount of fiat-backed digital assets); a designated public address on the disturbed transaction ledger of which the deposit of fiat-backed digital assets is being transferred from (e.g. the first user public address); and/or a timestamp, to name a few. The timestamp, in embodiments, may be one or more timestamps indicating one or more of the following: the time and/or date at which the second deposit request was sent, the time and/or date at which the second deposit request was received, and/or the time and/or date the first user wishes to deposit the first amount of fiat-backed digital assets, to name a few. In embodiments, the second deposit request may be digitally signed by a private key associated with the first user. The private key associated with the first user may, in embodiments, have a corresponding public key. The public key and private key, in embodiments, may be mathematically related. The public key may be associated with one or more private keys. The one or more private keys may be mathematically related to one another. In embodiments, the public key associated with the first user may be used to generate a first user public address associated with the first user. The first user public address, in embodiments, may be generated by applying a hash algorithm to the public key associated with the first user. The result of the application of the hash algorithm may, in embodiments, be the first user public address.

In embodiments, the destination public address may be associated with a public key which may have been used to generate the destination public address. For example, the digital asset address associated with the destination public address may be generated by applying a hash algorithm to the public key associated with the user associated with the destination public address. The result of the application of the hash on the public key may be the destination public address.

In embodiments, the second deposit request may further include a request to transfer the first amount of fiat-backed digital assets from the destination public address to a fiat-backed digital asset issuer (e.g. an administrator) public address. In embodiments, the second deposit request may further include a request to burn the first amount of fiat-backed digital assets. The process of burning a fiat-backed digital asset may be similar to the process described in connection with FIG. 19E, the description of which applying herein. In embodiments, the fiat-backed digital asset issuer may issue and/or burn fiat-backed digital assets in response to fluctuations in demand of the fiat-backed digital asset. For example, if the demand of the fiat-backed digital asset increases, the fiat-backed digital asset issuer may print fiat-backed digital assets. Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn fiat-backed digital assets. Continuing the example, the fiat-backed digital asset issuer may burn fiat-backed digital assets in proportion to the decrease in demand. Alternatively, the fiat-backed digital asset issuer may burn fiat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, after receiving the second deposit request, the digital asset exchange computer system may verify the second deposit request. Verifying the second withdrawal request may include confirming one or more of the following: the validity of the first user public address, the amount of fiat-backed digital assets owned by the first user, that the first user owns at least the first amount of fiat-backed digital assets, the validity of the designated public address, and/or the destination public address is not prohibited from receiving a fiat-backed digital assets on behalf of the first user, to name a few. For example, to confirm the first user public address, the digital asset exchange computer system may compare the first user public address to a verified first user public address stored by the digital asset exchange computer system. Continuing the example, if the first user public address is the same as the verified first user public address, the first user public address may be verified. If the first user public address is not the same as the verified first user public address, the second withdraw request may be denied and/or a notification may be generated and sent by the digital asset exchange computer system to the first user device. The notification may indicate that the first user public address was not verified and the withdrawal request is denied. As another example, if the second deposit request includes a destination public address, the digital asset exchange computer system may verify whether the destination public address is on a whitelist associated with the first user. Continuing the example, if the first user is associated with a whitelist, the digital asset exchange computer system may compare the destination public address to the whitelist. If the destination public address is on the whitelist, the destination public address may be verified. If the destination public address is not on the whitelist and thus is not verified, the second deposit request may be denied and/or a notification may be generated and sent by the digital asset exchange computer system to the first user device and/or a second user device associated with the first user. The notification may indicate that the destination public address is not authorized to receive fiat-backed digital assets on from the first user and the deposit request has been denied. The process of verifying destination addresses in the context of a whitelist may be similar to the process described in connection with FIG. 45, the description of which applying herein.

Referring back to FIG. 49A, the process for depositing an amount of fiat-backed digital asset into a digital asset exchange computer system may continue with step S4906. At step S4906, the digital asset exchange computer system processes the deposit request. The digital asset exchange computer system, in embodiments, may process the deposit request by performing the steps illustrated in FIG. 49C. Referring to FIG. 49C, processing the deposit request may begin at step S4920. At step S4920, the digital asset exchange computer system may calculate a second amount of fiat based on the first amount of fiat-backed digital assets. In embodiments, the second amount of fiat may equal the fiat value of the fiat-backed digital assets, which, in embodiments, may be calculated based on an exchange rate of fiat-backed digital assets to fiat. In embodiments, the digital asset exchange computer system may utilize an exchange module (which may be operatively connected to the digital asset exchange computer system) to calculate the conversion between fiat and the fiat-backed digital asset. The exchange rate may be based on the value of the asset or assets that back the fiat-backed digital asset, which may be updated periodically, aperiodically, in real-time, in substantially real-time, and/or on predetermined intervals, to name a few. In embodiments an exchange module may display and/or otherwise communicate one or more exchange rates and/or the value of the fiat-backed digital asset in fiat. In embodiments, the exchange rate may be based on the type of fiat the user wishes to pay for fiat-backed digital assets and/or the type of digital asset located in the account associated with the user. In embodiments the exchange rate may be a fixed exchange rate. For example, the exchange rate may be one fiat-backed digital asset equals one U.S. Dollar. As another example, the exchange rate may be 100 fiat-backed digital assets is equal to one U.S. Dollar. In embodiments, the exchange rate may be a fluctuating exchange rate. For example, the fluctuation exchange rate (e.g. variable exchange rate) may be based on market conditions.

In embodiments, processing the deposit request may continue at step S4922. At step S4922, the digital asset exchange computer system determines that the first amount of fiat-backed digital assets is present in the designated public address. In embodiments, the digital asset exchange computer system may determine whether the first amount of fiat-backed digital assets is less than or equal to the second amount of fiat-based digital assets available to the user. In embodiments, the digital asset exchanged computer system may compare the second amount fiat-backed digital assets to the first amount of fiat-backed digital assets to make the determination regarding whether the first user has sufficient funds to deposit the first amount of fiat-backed digital asset.

If, in embodiments, the second amount of available fiat is less than the first amount of fiat-backed digital assets, the digital asset exchange computer system may determine that the first user has insufficient funds to complete the deposit. If the first user has insufficient funds, the process of FIGS. 49A-49C may stop here and/or, in embodiments, the digital asset exchange computer system may generate and send a notification to the first user device, indicating insufficient funds. In embodiments, a notification may be sent to a second user device associated with the first user, the notification indicating a insufficient funds.

Processing the second deposit request may continue at step S4924. At step S4924, the digital asset exchange computer system may determine a third amount of fiat associated with an updated amount of available fiat of the first user. The third amount of fiat, in embodiments, may correspond to an amount of fiat the first user may own after the deposit request is executed and/or committed. To determine the third amount, the digital asset exchange computer system may subtract the second amount of fiat from the first amount of available fiat. For example, if the first amount of available fiat is 100 Dollars and the second amount of fiat is 75 Dollars, the third amount of fiat, in this example, would be 175 Dollars. In embodiments, the deposit request may have one or more fees associated with executing and/or committing the deposit request. These fees (e.g. transaction fees), may be represented as an amount of fiat-backed digital asset or an amount of fiat, or both. For example, if the first amount of available fiat is 100 Dollars, the second amount of fiat is 75 Dollars, and the transaction fee is 1 Dollar, the third amount of fiat, in this example, would be 174 Dollars.

Processing the second deposit request may continue at step S4926. At step S4926, the digital asset exchange computer system may update a fiat account ledger database. In embodiments, the update to the fiat account ledger database may be to account for the second amount of fiat associated with the second deposit request. The fiat account ledger, in embodiments, may be stored on computer readable member accessible by the digital asset exchange computer system. The fiat account ledger, in embodiments, may include one or more of the following: the amount of fiat each user owns in the custody of the digital asset exchange computer system; the total amount of fiat in the custody of the digital asset exchange computer system; the total amount of fiat that the digital asset exchange and/or digital asset exchange computer system owns; transactions associated with each user and/or fiat; and/or transactions associated with the digital asset exchange and/or digital asset exchange computer system and/or fiat, to name a few.

Processing the second deposit request may continue at step S4928. At step S4928, the digital asset exchange computer system may update a fiat-backed digital asset issuer fiat ledger. In embodiments, the update to the fiat-backed digital asset issuer fiat ledger may be to account for the second amount of fiat associated with the second withdraw request, updating the first user's available fiat to the third amount. In embodiments, the fiat-backed digital asset issuer fiat ledger may be associated with a fiat-backed digital asset issuer (e.g. the issuer of the fiat-backed digital asset associated with the process described herein). In embodiments, the fiat-backed digital asset issuer fiat ledger may be updated by the digital asset exchange computer system sending a request to the fiat-backed digital asset issuer. The request, in embodiments, may include a request to update the fiat-backed digital asset issuer fiat ledger. In response to receiving the request, the fiat-backed digital asset issuer may update their fiat-backed digital asset issuer fiat ledger.

In embodiments, the digital asset exchange computer system may also receive the second amount of fiat to the fiat-backed digital asset issuer (e.g. from an account on the peer-to-peer network associated with the digital asset exchange to an account on the peer-to-peer network associated with the fiat-backed digital asset issuer). In embodiments, the digital asset exchange computer system may receive the second amount of fiat before, with, or after the request to update the fiat-backed digital asset issuer fiat ledger is sent to the fiat-backed digital asset issuer. In embodiments, the digital asset exchange computer system may periodically receive fiat at an account on the peer-to-peer network associated with the digital asset exchange from an account on the peer-to-peer network associated with the fiat-backed digital asset issuer. The periodic transfers may be made at defined time intervals. The defined time intervals may be defined based on: the amount of fiat that is due to be transferred from the digital asset exchange computer system to the fiat-backed digital asset issuer; the amount of transactions including fiat; the processing capabilities of the fiat-backed digital asset issuer and/or the digital asset exchange computer system; and/or one or more government regulations, to name a few. For example, the digital asset exchange computer system may receive fiat from the fiat-backed digital asset issuer once the digital asset exchange computer system has transferred $50,000 as a result of deposits of fiat-backed digital assets. In embodiments, the defined time intervals may be predetermined times throughout each day, week, month, and/or year, to name a few. For example, the digital asset exchange computer system may periodically receive fiat from an account on the peer-to-peer network associated with the fiat-backed digital asset issuer every day at 5:00 PM EST.

Processing the second deposit request may continue at step S4930. At step S4930, the digital asset exchange computer system may generate a first transaction request. The first transaction request, in embodiments, may include a first message that includes a request to obtain from the first designated public address, the first amount of fiat-backed digital assets and to provide the fiat-backed digital assets to the destination address. The first message may also include a request to burn the first amount of fiat-backed digital assets. Alternatively, in embodiments, the first message may also include a request to store the first amount of fiat-backed digital assets at the destination address. In embodiments, the transaction request may be addressed to a public address associated with the fiat-backed digital asset issuer from a public address associated with the digital asset exchange computer system. In embodiments, the transaction request may include instructions to update the fiat account ledger database and to reserve enough fiat to cover the second deposit request. In embodiments, the transaction request may include a digital signature associated with the digital asset exchange computer system. In embodiments, the transaction request may include a digital signature associated with a trusted entity system. The digital signature associated with the trusted entity system may be a combined digital signature based on of one or more private keys associated with one or more trusted entities of the trusted entity system. The digital signature, in embodiments, may further include one or more private keys associated with the first user.

In embodiments, processing the deposit request may continue, optionally, at step S4932. At step S4932, the digital asset exchange computer system may update the fiat-backed digital asset issuer fiat ledger to account for the generated transaction request. In embodiments, the update to the fiat-backed digital asset issuer fiat ledger may be to decrease a balance of fiat by the second amount of fiat (e.g. the amount of fiat the digital asset exchange computer system exchanged for the first amount of fiat-backed digital assets).

Processing the second deposit request may continue at step S4934. At step S4838, the digital asset exchange computer system transmits the transaction request to the peer-to-peer network via a network (e.g. network 15). In embodiments, transmitting the first transaction request to the peer-to-peer network may cause the first transaction request to be published by a trusted entity system. In embodiments, the trusted entity system may publish the transaction request to the peer-to-peer network via a network (e.g. Network 15). In embodiments, publishing the transaction request may cause the peer-to-peer network to go through a process of executing and/or committing the transaction request (e.g. a consensus protocol) which may result in the deposit of the first amount of fiat-backed digital assets from the designated public address to the destination public address.

Processing the second deposit request may continue at step S4936. At step S4936, the first amount of fiat-backed digital assets are confirmed as not present at the designated public address of the first user. The confirmation, in embodiments, may be based on reference to the distributed transaction ledger. In embodiments, the first user public address in embodiments, may be the first designated public address. In embodiments, the digital asset exchange computer system may confirm that the first amount of fiat-backed digital assets are not present at the designated public address (or the first destination public address received the first amount of fiat-backed digital assets). The confirmation process may be a call/return to and from the designated public address and/or the first user public address. In embodiments, the confirmation process may be a query to the peer-to-peer network for a status of the distributed transaction ledger, which may result in a receipt of the status of the distributed transaction ledger which may include the deposit of the first amount of fiat-backed digital assets.

In embodiments, the steps of the processes of FIGS. 49A-49C may be rearranged or omitted.

In embodiments, as illustrated in FIG. 15C, for example, the exemplary dashboard may also allow the user an opportunity to cancel a transaction before final execution by the blockchain network and inclusion on the underlying blockchain.

In Step S1002 of FIG. 10, for example, Alice's wallet, or associated digital asset address, may send a request message to the database maintained by the blockchain including: (a) Alice's digital signature, which is based on Alice's private key which corresponds to her public key which is associated with her ethereum digital asset address (her public address), which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

In Step S1004, when miners on the blockchain network receive the transaction request directed to the contract wallet or associated digital asset address, with the request message, miners on the blockchain network will confirm the transaction, including verifying that the message was properly signed by Alice's digital signature. In Step S1004-b, the miners may verify that Alice has sufficient amount of tokens to perform the requested transaction, for example, by comparing Alice's balance against Alice's token balance as indicated on the blockchain. In Step S1004-c, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S1006, if the request is verified the transaction is published in the Security Token database of the blockchain reflecting a debit against Alice's token holdings and a corresponding credit to Bob's token holdings (less any applicable fees).

In Step S1008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Figures 1, 11A:
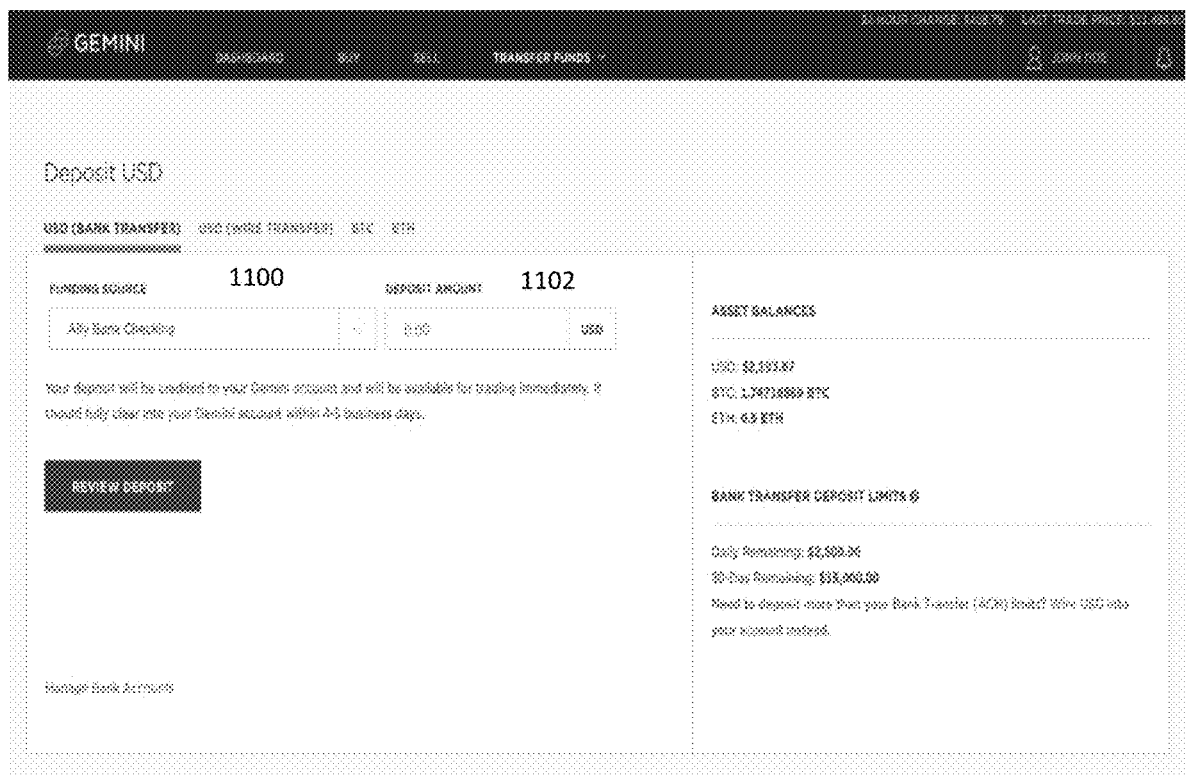
Figures 2, 11A:
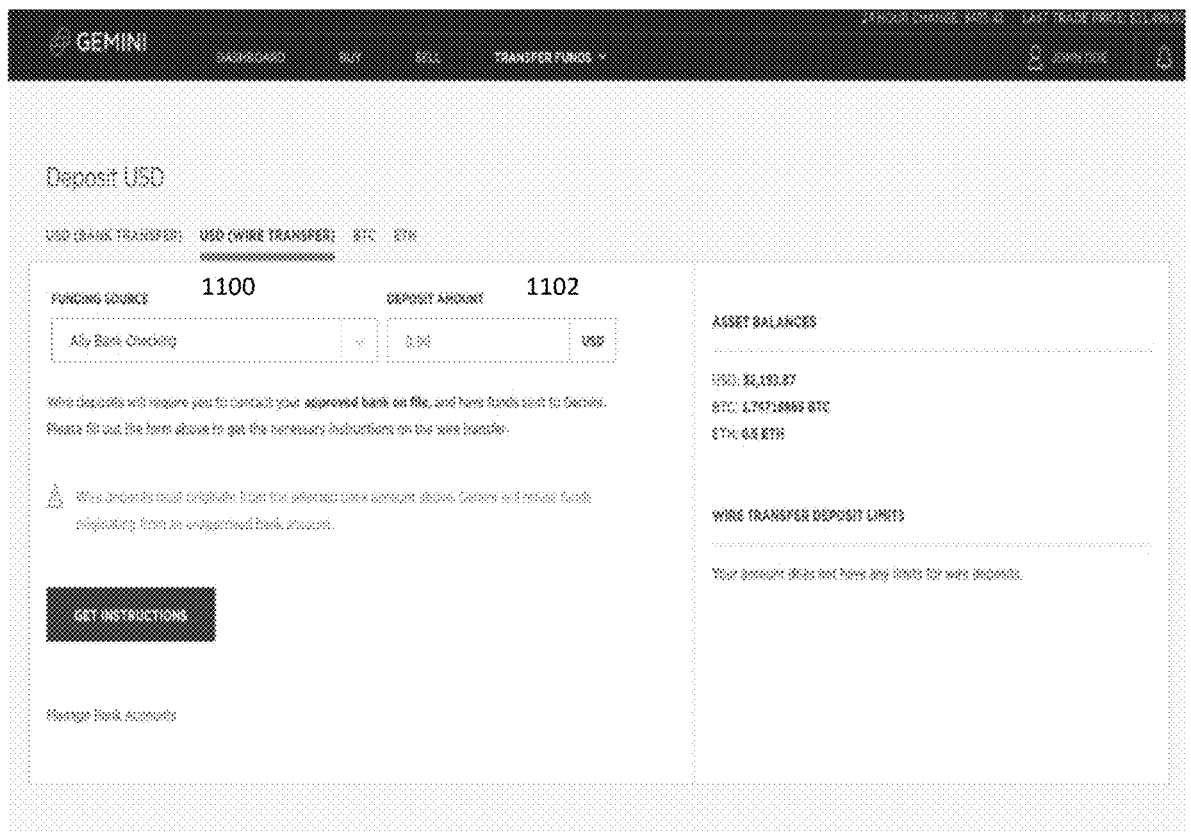
Figures 3, 11A:
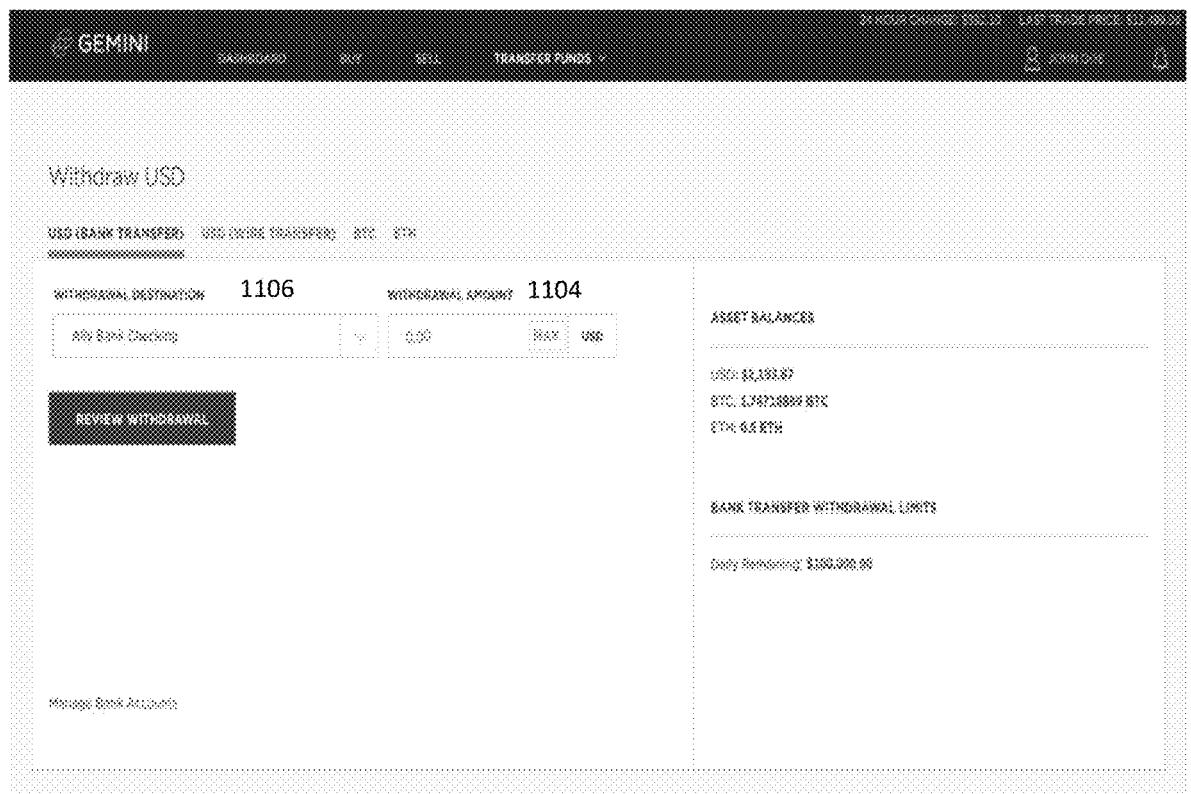

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information, to name a few. Other forms of transaction logs can be used consistent with exemplary embodiments of the present invention. In an exemplary embodiment, the description information may be included as a message in a request for a transaction. The description information discussed above thus may also be used to confirm control of over a particular account.

As can be seen in FIG. 2, digital asset transfers may begin from a single origin and be sent to a single destination or multiple destinations. Similarly, digital assets may be transferred from multiple origins to one or more destinations.

FIG. 2A illustrates a screenshot showing an exemplary embodiment of a token ledger for a Gas token. This particular screenshot shows a specific example the token ledger for the Gas token provided by etherscan.io. As illustrated the ledger illustrates, in chronological order, a series of transactions identifying the source address 2202 and destination address 2204 along with the quantity of tokens 2206 transferred in each transaction. In embodiments, the Security Token ledger of the present application may be similar to that illustrated in FIG. 2A. In embodiments, as illustrated in FIG. 2A, the Security Token ledger may also include the option to identify all Token holders 2208 as well as options to view token details 2210 and to view the contract details 2012. Similarly, in embodiments, an SVCoin Token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network can be used with embodiments of the present invention. A digital math-based asset network, such as a Bitcoin network, may be an on-line, end-user to end-user network hosting a public transaction ledger 115 and governed by source code 120' comprising cryptologic and/or algorithmic protocols. A digital asset network can comprise a plurality of end users, a . . . N, each of which may access the network using one or more corresponding user device 105a, 105b, . . . 105N. In embodiments, user devices 105a, 105b, . . . 105N may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, user devices 105a, 105b, . . . 105N can each run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115a (contained on a user device 105a) should correspond with the electronic transaction ledgers 115b . . . 115N (contained on user devices 105b . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few.

In embodiments, some of the transactions on the public ledger may be encrypted or otherwise shielded so that only authorized users may access ledger information about such transactions or wallets.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoin, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoin, subunits, such as a Satoshi, as discussed herein, or larger units, such as blocks of bitcoin, may be used in exemplary embodiments. Each digital asset, e.g., bitcoin, may be sub-divided, such as down to eight decimal places, forming 100 million smaller units. For at least bitcoin, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoin, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or scrypt, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoin) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like scrypt, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoin. In embodiments, new digital math-based assets may be created through a mining process, as described herein. In embodiments, the number of new digital assets created can be limited. For example, in embodiments, the number of digital assets (e.g., bitcoin) minted each year is halved every four years until a specified year, e.g., 2140, when this number will round down to zero. At that time no more digital assets will be added into circulation. In the exemplary embodiment of bitcoin, the total number of digital assets will have reached a maximum of 21 million assets in denomination of bitcoin. Other algorithms for limiting the total number of units of a digital math-based asset can be used consistent with exemplary embodiments of the present invention. For example, the Litecoin network is anticipated to produce 84 million Litecoin. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

Proof or work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets unspendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities may include mining, proof of work, proof of stake protocols, to name a few.

Stable Value Digital Asset Token

In embodiments, a stable value digital asset token, or Stable Value Token ("SVCoin") may operate on a blockchain based network, such as the Ethereum network, a decentralized virtual currency and blockchain network with a programming language that can automatically facilitate, verify, and enforce the terms of a digital contract entered into by human or computer counterparties. In embodiments, the SVCoin may conform with the ERC-223 token standard, making it available for a variety of uses within the Ethereum Network. In embodiments, the SVCoin may conform to the ERC-721 token standard. However, unlike other types of cryptocurrencies currently available on the Ethereum Network or the virtual currency ecosystem generally, the SVCoin will be strictly pegged to a fiat currency, such as the U.S. Dollar, and a custodian, such as a trusted entity like a digital asset exchange or bank, to name a few, will hold an equal value in fiat (e.g., one (1) SVCoin is pegged to be equal to one (1) USD or one hundred (100) SVCoin is pegged to equal one (1) USD, to name a few). In embodiments, periodic or aperiodic reconciliations may be performed to confirm that the amount of fiat currency held by the trusted entity corresponds to the number of SVCoins (Stable Value Tokens) held on the public ledger. In embodiments, the reconciliation may account for the fact that SVCoins (Stable Value Tokens) may have been created but not yet distributed to third parties.

In embodiments, a digital asset exchange, such as a regulated digital asset exchange, like Gemini, may be the sole issuer of the SVCoin. In embodiments, especially in the context of a regulated digital asset exchange, in order to obtain freshly minted SVCoin, customers must first register with the digital asset exchange and create an exchange account to allow access to the digital asset exchange platform. Customers may deposit fiat (e.g., USD) with the digital asset exchange, via, e.g., Fedwire, ACH, Swift, to name a few, into the customers respective exchange account, or convert into fiat some or all of existing digital assets held at the digital asset exchange. SVCoin may be held in the customer's exchange account or may be transferred via the blockchain, such as via the Ethereum Network. In embodiments, the SVCoin issuer may be a digital asset exchange, a bank, a trust or some other trusted entity, to name a few.

In embodiments, regardless of whether the SVCoin is stored in the customer's exchange account or transferred via the blockchain such as the Ethereum Network, the digital exchange will continue to hold sufficient fiat to maintain the total value of SVCoin based on a notional pegged rate (e.g., one USD for every one SVCoin issued). In embodiments, the value of the SVCoin is pegged to the fiat in a fixed proportion, for example 1:1. In embodiments, fiat will be held in a segregated, omnibus bank account at one or more federally insured depository institution. In embodiments, the fiat may be held in other secure and non-volatile financial instruments, such as invested in treasury bills or other liquid, interest bearing financial instruments.

In embodiments, a fiat-backed digital asset may be used in which may be a digital asset that is backed by one or more types of assets such as fiats (e.g., U.S. Dollars, Euro, Yen, Brittish Pound, Swiss Franc, Canadian Dollar, Australian Dollar, New Zealand Dollar, Kuaiti Dinar, Bahrain Dinar, Oman Rial, Jordan Dinar, Cayman Island Dollar, South African Rand, Mexican Pesos, Renmembi, to name a few); bank accounts in such fiat; government securities denominated in such fiats (e.g., U.S. treasury certificates); municipal bonds or other government issued bonds, shares in exchange trade funds holding currencies or currency future contracts, certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few). In embodiments may be only one kind of asset (e.g., dollars held in a bank or government security or CD, to name a few) or a basket of assets (e.g., multiple fiats, e.g., dollars, euros, yet, to name a few).

In embodiments, customers wishing to redeem their SVCoin for fiat may do so through the digital asset platform or a trusted entity. Customers of a digital asset platform (such as a digital asset exchange like Gemini) that have transferred their SVCoin to the blockchain will be able to transfer their SVCoin back to their exchange account, and subsequently redeem them for fiat through the digital exchange platform, such as via Fedwire, ACH or SWIFT to the customer's registered bank account, to name a few. For each fiat redeemed with the digital exchange, a corresponding SVCoin will be removed from circulation. As mentioned above, exemplary embodiments of such transactions are discussed below in connection with the description of FIGS. 11A-1-4, 11B-1-4, and 11C-1-2.

In embodiments, the Stable Value Token may be implemented as a token on the Ethereum blockchain, following the open standard known as ERC20 adopted by the Ethereum community. In embodiments, the Stable Value Token may be a system of smart contracts. In embodiments, the Stable Value Token may be a triplet of smart contracts on the Ethereum blockchain, which may be referred to as 'Proxy', 'Impl', and 'Store'.

In embodiments, the smart contract known as 'Proxy' is the permanent and public face of the Stable Value Token and provides the interface to interact with the token to allow token holders transfer their tokens and view token balances. In embodiments, however, this contract contains neither the code nor the data that comprises the behavior and state of the Stable Value Token.

In embodiments, the 'Proxy' contract delegates to the contract known as 'Impl' authority to execute the logic that governs token transfers, issuance, and other core features. In embodiments, 'Impl' does not directly own the data that is the ledger of the Stable Value Token, the mapping of token holders to their balances, but instead delegates this to the smart contract known as 'Store'.

In embodiments, the arrangement of 'Proxy', 'Impl', and 'Store' provides for future change and flexibility. While 'Proxy' may be the permanent address of the Stable Value Token on the Ethereum blockchain, and 'Store' is the external storage of the token ledger, the 'Impl' contract is designed to be replaced, if need be. Utilizing this architecture to implement the Stable Value Token provides for the following advantages:
1. allows for responding to security incidents and resolving vulnerabilities;
2. allows for extending the system with new features;
3. allows for adding later optimizations to improve the operational efficiency of the token; and
4. In extreme cases and when compelled to do so, allows for pause, block, or reverse token transfers.

In embodiments, each of these three contracts may be a custodian: an actor in the system that has the sole authority to authorize important actions. In embodiments, the custodianship role varies for each of 'Proxy', 'Impl', and 'Store'. In embodiments, the custodian of 'Proxy' can redirect the delegation to the active token implementation, the specific 'Impl' contract. In embodiments, matching this arrangement, the 'Store' contract may only accept updates to its ledger from a single trusted source, the active token implementation, the specific 'Impl' contract. In embodiments, these two custodial actions on 'Proxy' and 'Store' provide the upgrade feature where a new 'Impl' displaces the prior version by the custodian of 'Proxy' redirecting the delegation in 'Proxy', and a new 'Impl' displaces the prior version by the custodian of 'Store' updating the trusted caller of 'Store'. In embodiments, the custodians of 'Proxy' and 'Store' can also pass custodianship to new custodians.

In embodiments, the primary custodial action on the 'Impl' contract is different. In embodiments, an important aspect of the Stable Value Tokens is governing the increase to the token supply since at all times the system must ensure that there are at least as many U.S. Dollars as there are Stable Value Tokens in circulation. In embodiments, the 'Impl' contract contains the logic to increase the token supply, and the custodian of 'Impl' has the sole authority to invoke it. In embodiments, custodianship can also be passed.

In embodiments, an auxiliary contract is a contract to fulfill the custodian role, which we will refer to here as 'Custodian'. In embodiments, this contract is designed around several security principles:
1. Dual Control: actions by the 'Custodian' contract are initially locked, and pending actions will only proceed once two out of a set of designated signers approve the action. (Approval is a digital signature linked to the action instructions, e.g. the amount and destination of new tokens.)
2. Offline Control: the 'Custodian' contract is designed with the expectation that the set of designated signers are keys managed by offline ("air gapped") computer systems.
3. Time Locks: actions by the 'Custodian' contract are locked not only pending approval from two signers, but also require the passage of a minimum period of time before they can be executed. This enables the effective use of intrusion detection systems and a window of opportunity to respond to security breaches.
4. Revocation: pending actions can be revoked; thus erroneous or malicious actions can be nullified while they are still pending.

This provides strong security control on custodianship, which is appropriate for the critical and infrequent system actions of replacing the 'Impl' contract ("the upgrade feature") and passing custodianship. In embodiments, however, for the action of increasing the token supply, an action expected to occur frequently, using 'Custodian' as the custodian of 'Impl' introduces an undue operational burden.

In embodiments, a second auxiliary contract, is referred to as 'PrintLimiter'. In embodiments, the purpose of the 'PrintLimiter' smart contract is to govern the increases to the supply of Stable Value Tokens, specifically by a hybrid of online and offline control. While 'Custodian' is the custodian of the contracts 'Proxy' and 'Store', the 'PrintLimiter' contract is the custodian of 'Impl', and in turn, 'Custodian' is the custodian of 'PrintLimiter'. In embodiments, this doubly-layered custodianship relationship still reserves ultimate control to 'Custodian', however, the 'PrintLimiter' contract grants limited permission to increase the token supply ("print" new tokens) to a key in online control (an automated, networked computer system), which we will refer to as 'printer'. In embodiments, the 'printer' key can increase the token supply in response to user demand to withdraw U.S. dollars as Stable Value Tokens, but only up until a ceiling. In embodiments, further expansion of the supply is disallowed by 'PrintLimiter' once the ceiling is reached. In embodiments, increasing the ceiling is an action reserved for the custodian, and the custodian of 'PrintLimiter' is 'Custodian.' In embodiments, the 'printer' can reduce the ceiling thus reducing its own grant. In embodiments, offline control can increase the grant to online control; online control can decrease its own grant. In embodiments, the 'Print Limiter' smart contract may include instructions requiring authorization of multiple keys to increase the supply of Stable Value Tokens. In embodiments, the multiple keys may require at least two signers. This could include using a M of N model, where M is at least 2 and N is equal to or greater than M (e.g., 2 or more, when M is 2). Thus, in embodiments, multiple keys may include a set number of keys of a set number of possible keys, for example, two keys of a possible three keys. In embodiments, the multiple keys may require all keys of possible keys, for example, three keys of a possible three keys. In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without backing U.S. Dollars is bounded.

In embodiments, as noted above, multiple signatures may be required for certain transactions such as those requiring intervention of the Custodian 1350. In embodiments, as noted above, changing the implementation pointer from ERC20Proxy 1310 which is currently set at S1312 (impl) to point to ERC20Impl 1320 (Version 1), requires resetting S1312B "impl" to point to ERC20Impl 1320A (version 2). In embodiments, a request is made to ERC20Proxy to change its instance of ERC20Impl. When the request is made, a unique lockId is generated. In embodiments, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In embodiments, to complete the unlocking of Custodian and therefore propagate the change to ERC20Proxy 1310, the digital asset system operated by the token issuer uses its off-line key storage infrastructure to sign the request with the previously approved designated key sets. This may require the use of two or more key sets.

In embodiments, those signatures are passed into the Custodian's completeUnlock function along with the initial request. Once the request is validated against the signatures, completeUnlock parses the content of the request and issues the command. In this exemplary case, ERC20Proxy's confirmImplChange is called using the lockId generated in the initial ERC20Impl change request.

In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without the backing of U.S. Dollars is bounded. In embodiments, pending actions may be revoked, allowing for the nullification of erroneous or malicious actions before being executed.

A method of withdrawing stable value digital asset tokens based on an underlying digital asset from a digital asset exchange computer system in exchange for fiat, in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request comprising the steps of: (1) receiving, by the digital asset exchange computer system from the first user device, a first electronic request to withdraw stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) generating, by the digital asset exchange computer system, second graphical user interface information including at least the first account balance information; (4) transmitting, by the digital asset exchange computer system to the first user device, the second graphical user interface information; (5) receiving, by the digital asset exchange computer system from the first user device, a second electronic withdrawal request comprising at least: (A) a first amount of stable value digital asset tokens to be withdrawn; and (B) a destination public address on the underlying blockchain to transfer the first amount of stable value digital asset tokens; (c) processing, by the digital asset exchange computer system, the withdraw request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the second amount of fiat is less than the first amount of available fiat of the first user; (3) in the case where the second amount of fiat is less than the first amount of available fiat of the first user, determining a third amount of fiat associated with an updated amount of available fiat of the first user, wherein the third amount of fiat equals the first amount of available fiat of the first user less the second amount of fiat; (4) updating, by the digital asset exchange computer system, the fiat account ledger database to reflect that the updated amount of available fiat of the first user is the third amount of fiat; (5) updating, by the digital asset exchange computer system, a stable value digital asset token issuer fiat ledger, to increase a balance of fiat by the second amount of fiat; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain in the first designated public address of the first user the first amount of stable value digital asset tokens; and wherein the first transaction request is signed with a digital signature generated using the digital asset exchange private key; (7) transmitting, by the digital asset exchange computer system to the blockchain network via the Internet, the first transaction request; (8) confirming, by the digital asset exchange computer system by reference to the blockchain, that the balance of stable value digital asset tokens in the first designated public address of the first user includes the first amount of stable value digital asset tokens.

In embodiments, the determining step (a)(c) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the underlying digital asset is stellar and the blockchain is the Stellar Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fixed predetermined ratio is one stable value digital asset token is equal to a basked for fiat currencies at a fixed or defined ratio. For example, one stable value digital asset token is equal to one U.S. dollar and one Euro. Other ratios may be employed consistent with embodiments of the present invention.

In embodiments, the updating step (c)(5) further comprises transferring the second amount of fiat from a digital asset exchange fiat account to a stable value digital asset token issuer fiat account.

In embodiments, the updating step (c)(5) further comprises periodically transferring fiat between the digital asset exchange fiat account and the stable value digital asset token issuer fiat account.

In embodiments, the instructions to obtain in the first designated public address of the first user the first amount of stable value digital asset tokens include instructions to generate the first amount of stable value digital asset tokens at the first designated public address of the first user.

In embodiments, the instructions to obtain in the first designated public address of the first user the first amount of stable value digital asset tokens include instructions to transfer the first amount of stable value digital asset tokens from a stable value digital asset token issuer public address to the first designated public address of the first user.

A method of depositing stable value digital asset tokens based on an underlying digital asset into a digital asset exchange computer system in exchange for fiat in accordance with another embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain, from the first designated public address of the first user, the first amount of stable value digital asset tokens from the designated public address of the first user and provide the first amount of stable value digital asset tokens to the user specific destination address; and ii. a request to destroy the first amount of stable value digital asset tokens; wherein the first transaction request is signed with a digital signature generated based on the digital asset exchange private key of the user digital asset exchange; (6) updating, by the digital asset exchange computer system, a stable value digital asset token issuer fiat ledger, to decrease a balance of fiat by the second amount of fiat; (7) transmitting, by the digital asset exchange computer system to the blockchain network via the Internet, the first transaction request; (8) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the updating step (c)(6) further comprises transferring the second amount of fiat from a digital asset exchange fiat account to a stable value digital asset token issuer fiat account.

In embodiments, the updating step (c)(6) further comprises periodically transferring fiat between the digital asset exchange fiat account and the stable value digital asset token issuer fiat account.

A method of depositing stable value digital asset tokens based on an underlying digital asset into a digital asset exchange computer system in exchange for fiat in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain from the first designated public address of the first user the first amount of stable value digital asset tokens from the designated public address of the first user and provide them to the user specific destination address; ii. a request to store the first amount of stable value digital asset tokens at the user specific destination address; and wherein the first transaction request is signed with a digital signature generated based on the digital asset exchange private key of the user digital asset exchange; (6) transmitting, by the digital asset exchange computer system to the blockchain network via the Internet, the first transaction request; (7) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

Increasing the Total Supply of Digital Asset Tokens

Figure 18A:
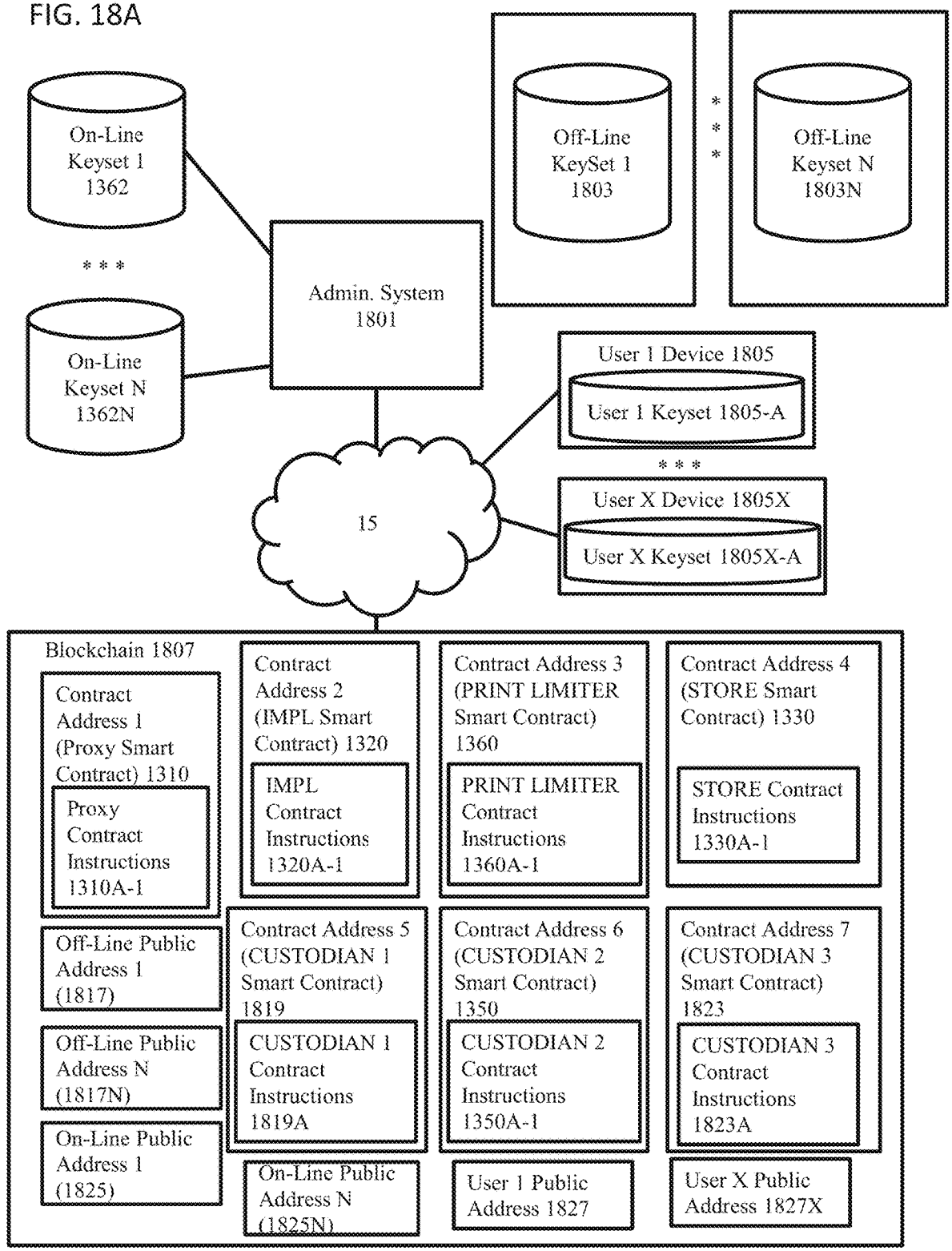
FIG. 18A is a schematic drawing of an exemplary collection of systems for increasing the total supply of digital asset tokens on an underlying blockchain in accordance with exemplary embodiments of the present invention.

FIG. 18A is a schematic drawing of an exemplary system for increasing the total supply of digital asset tokens on an underlying blockchain in accordance with exemplary embodiments of the present invention. The system shown in FIG. 18A may include an administrator system 1801 which may communicate with a plurality of end users, each of which may access the network 15 using one or more corresponding user device 1805, . . . 1805X, a blockchain 1807, and one or more on-line keysets 1362, . . . 1362N.

In embodiments, network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections. In embodiments, network 15 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between administrator system 1801 and user devices 1805, . . . 1805X. In some embodiments, el administrator system 1801 and/or user devices 1805, . . . 1805X may communicate with one another via a web browser using HTTP. Various additional communication protocols may be used to facilitate communications between administrator system 1801 and/or user devices 1805, . . . 1805X, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

As illustrated in FIG. 18A, the administrator system 1801 and/or user devices 1805, . . . 1805X may communicate with a blockchain network to access and/or add blocks to blockchain 1807. User devices 1805, . . . 1805X may for instance, may correspond to a suitable electronic device, such as, desktop computers, mobile computers (e.g., laptops, ultrabooks), mobile phones, smart phones, tablets, personal display devices, large scale display devices (e.g., billboards, street signs, etc.), personal digital assistants ("PDAs"), gaming consoles and/or devices, smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few.

The blockchain 1807 may include one more contract addresses, such as contract address for, e.g., a proxy smart contract 1310 (contract address 1), IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), as illustrated in FIG. 18A. Each contract address may include one or more contract addresses. Additionally, in embodiments, one or more contract addresses shown in connection with FIG. 18A may be associated with one or more contract addresses. For example, in embodiments, contract address 1 may be the same contract address as contract address 2. The blockchain 1807 may also include public addresses, such as off-line public address 1 1817, off-line public address N 1817N, on-line public address 1 1825, on-line public address N 1825N, user 1 public address 1827, and User X public address 1827X, as illustrated in FIG. 18A.

In embodiments, the blockchain 1807 may be a plurality of geographically distributed computer systems in a peer-to-peer network. Wireless communication may be provided using any of a variety of communication protocols and/or wireless communication networks, including e.g. GSM, GSM-R, UMTS, TD-LTE, LTE, LTE-Advanced Pro, LTE Advanced, Gigabit LTE, CDMA, iDEN, MVNO, MVNE, Satellite, TETRA, WiMAX, AMPS TDMA, Roaming SIM, DC-HSPA, HSPA, HSPA+, HSDPA, G, 2G, 3.5G, 4G, 4.5G, 5G, 5.5G, 6G, 6.5G, VoLTE, EDGE, GPRS, GNSS, EV-DO, 1×RTT, WCDMA, TDS-CDMA, CDMA2000, CSFB, FDMA, OFDMA, PDMA, AMPS, EV-DO, DECT, IS-95, NMT, UMTS, MPLS, MOCA, Broadband over Power Lines, NB-IoT, enhanced MTC (eMTC), LTE-WLAN, ISDN, Microwave, Long Range Wifi, Point to Point Wifi, EC-GSM-IoT, LTE-M, NB-IoT, Evolved Multicast Broadcast Multimedia Service (eMBMS) and LTE-Broadcast (LTE-B), to name a few.

The system described in connection with FIG. 18A may include one or more on-line keysets 1362, . . . 1362N. Each keyset includes a private key and a corresponding public key (or public address on the blockchain). For example, on-line keyset 1362 may be associated with on-line public address 1 1825. Similarly, by way of example, on-line keyset N 1362N may be associated with on-line public address N 1825N. In embodiments, each private key will typically be mathematically related to the corresponding public key, such as used with cryptocurrency Security Standard. In embodiments, the one or more on-line keysets 1362, . . . 1362N may be stored on non-volatile computer readable memory of one or more computer systems that are connected to the network, such as a first computer system.

The system described in connection with FIG. 18A may also include one or more off-line keyset 1803, . . . 1803N. Each keyset includes a private key and a corresponding public key (or public address on the blockchain). The offline keyset 1803 may be stored in on non-volatile computer readable memory of one or more computer systems that are physically separated from network 15, blockchain 1807, administrator system 1801, and the one or more computer systems that store the on-line keysets, such as a second computer system. In embodiments, the second computer system that is physically separated and/or electronically may be a hardware storage module (HSM 1900—as described more fully in connection with FIG. 19B). The physical and/or electronic separation may serve as an additional security measure(s), protecting the one or more off-line keyset 1803, . . . 1803N from unauthorized access. In embodiments, the one or more off-line keyset 1803, . . . 1803N may be associated with address on the blockchain 1807. In embodiments, off-line keyset 1 1803 may be associated with off-line public address 1 1817. Off-line keyset 1803N may be associated with off-line public address N 1817.

In embodiments, proxy smart contract 1310 may have a contract address (e.g., contract address 1) associated therewith on the blockchain 1807 proxy smart contract 1310. Proxy smart contract 1310, as seen in FIG. 18B, by way of illustration and as discussed in greater detail with respect to FIGS. 20A-20A-1, 20B-20C and 21A-21B, may include one or more modules of instructions 1310A-1 such as: (1) PROXY delegation instructions module 1829 (i.e. first delegation instructions module) and (2) PROXY authorization instructions module 1831 (i.e. first authorization instructions module), to name a few.

In embodiments, PROXY delegation instructions module 1829 (i.e. first delegation instructions module) may include one or more instructions to delegate received requests to other smart contracts on the blockchain, such as, for example, IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), to name a few. Additionally, in embodiments, PROXY delegation instructions module 1829 (i.e. first delegation instructions module) may include one or more instructions to delegate received requests to public addresses such as off-line public address 1 1817, off-line public address N 1817N, on-line public address 1 1825, on-line public address N 1825N, user 1 public address 1827, and/or User X public address 1827X, to name a few.

In embodiments, the first authorization instruction module 1831 may include instructions to authorize request received, the requests, in embodiments, being transaction requests from administrators, user public addresses, or other smart contracts, to name a few.

In embodiments, PRINT LIMITER smart contract 1360 may have a contract address (e.g. contract address 3) associated therewith on the blockchain 1807. PRINT LIMITER smart contract 1360, as seen in FIG. 18C, by way of illustration and as discussed in greater detail with respect to FIGS. 20 and 21, may include one or more modules of instructions 1360A-1 such as: (1) PRINT LIMITER token creation instructions module 1833, (2), PRINT LIMITER first authorization instructions module 1839 (i.e. second authorization instructions module), (3) PRINT LIMITER second authorization instructions module 1841 (i.e. third authorization instructions module), (4) token transfer instructions module 1843, (5) token destruction instructions module 1845, and (6) token balance modification instructions module 1847.

In embodiments, PRINT LIMITER token creation instructions module 1833 may include one or more instructions that indicate conditions under which tokens of a digital asset token are created. In embodiments, the PRINT LIMITER token creation instructions module 1833 may include instructions that limit the conditions under which tokens may be created. For example, the PRINT LIMITER token creation instructions module 1833 may include instructions that limit the production of tokens to 1,000,000 tokens. In embodiments, the instructions may also include a temporal component. For example, the PRINT LIMITER token creation instructions module 1833 may include instructions that only allow 1,000 tokens to be created within a 24 hour period. Or, as another example, the PRINT LIMITER token creation instructions module 1833 may include instructions that only allow tokens to be created during business hours. In embodiments, the PRINT LIMITER may also include authorization instructions related to the first key pair.

In embodiments, custodian instructions module 1835 may include one or more instructions that limit the PRINT LIMITER smart contract 1360A authority. For example, if a request is received by the PRINT LIMITER smart contract 1360 to create digital asset tokens beyond a pre-approved token supply limit, the custodian instructions module 1835 may require authorization from a print limiter custodian (i.e. CUSTODIAN 2 smart contract 1350 (contract address 6)).

In embodiments, the second authorization instruction module 1839 and the PRINT LIMITER second authorization instructions module 1841 (i.e. third authorization instructions module) may each include instructions to authorize request received, the requests, in embodiments, being transaction requests from administrators, user public addresses, or other smart contracts, to name a few. Second authorization instruction module 1839 may include instructions for the first designated key pair (on-line keyset 1 1362, . . . 1362N), with respect to token creation of the digital asset token. In embodiments, the second authorization instructions with respect to token creation may be below a first threshold over a first period of time. PRINT LIMITER second authorization instructions module 1841 (i.e. third authorization instructions module) may include instructions for the second designated key pair (i.e. off-line keyset 1803, . . . 1803N) with respect to token creation of the digital asset token. In embodiments, PRINT LIMITER first authorization instructions module 1839 and PRINT LIMITER second authorization instructions module 1841 may be the same module.

In embodiments, the PRINT LIMITER Third Authorization Instructions Module 1835 may include instructions to modify the token supply. For example, the PRINT LIMITER Third Authorization Instructions Module 1835 may include instructions that, when called to execute, may create and/or burn tokens of the digital asset token. In embodiments, instructions that modify the token supply may cause the STORE Smart Contract 1330 to alter an electronic ledger that tracks the token supply.

In embodiments, the token transfer instructions module 1843, in embodiments, may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. A more detailed description of the transfer of digital asset tokens is located in connection with the description of FIG. 19D, the same description applying herein.

In embodiments, the token destruction instructions module 1845 may include instructions on when, and with whose authority, security tokens associated with one or more specified addresses shall be destroyed or "burned", and thus removed from the security token supply. A more detailed description of token destruction is described in connection with FIG. 19E, the same description applying herein In embodiments, token balance modification instructions module 1847 may include instructions that may alter, edit, and/or update a transaction ledger in accordance with token creation, token transfer, and/or token destruction instructions (or modules), to name a few.

In embodiments, CUSTODIAN 2 smart contract may have a contract address (e.g. contract address 6) associated therewith on the blockchain 1807. CUSTODIAN 2 smart contract 1350, as seen in FIG. 18D, by way of illustration and as discussed in greater detail with respect to FIGS. 20 and 21, may include one or more modules of instructions 1350A-1 such as: (1) CUSTODIAN 2 first authorization instructions module 1849 (i.e. fourth authorization instructions module) and (2) CUSTODIAN 2 second authorization instructions module 1851 (i.e. fifth authorization instructions module). In embodiments, CUSTODIAN 2 first authorization instructions module 1849 and CUSTODIAN 2 second authorization instructions module 1851 may be the same module.

In embodiments, the CUSTODIAN 2 first authorization instructions module 1849 (i.e. fourth authorization instructions module) and the CUSTODIAN 2 second authorization instructions module 1851 (i.e. fifth authorization instructions module) may each include instructions to authorize request received, the requests, in embodiments, being transaction requests from administrators, user public addresses, or other smart contracts, to name a few CUSTODIAN 2 first authorization instructions module 1849 (i.e. fourth authorization instructions module) may include instructions for the off-line keyset 1803, . . . 1803N to authorize the issuance of instructions to the PRINT LIMITER smart contract 1360 with respect to token creation, above a first threshold during a first period of time. CUSTODIAN 2 second authorization instructions module 1851 (i.e. fifth authorization instructions module) may include instructions to raise a ceiling of token creation. A more detailed description of raising the ceiling of token creation is located below in the descriptions in connection with FIGS. 19A-B and 20A.

Figure 18E:
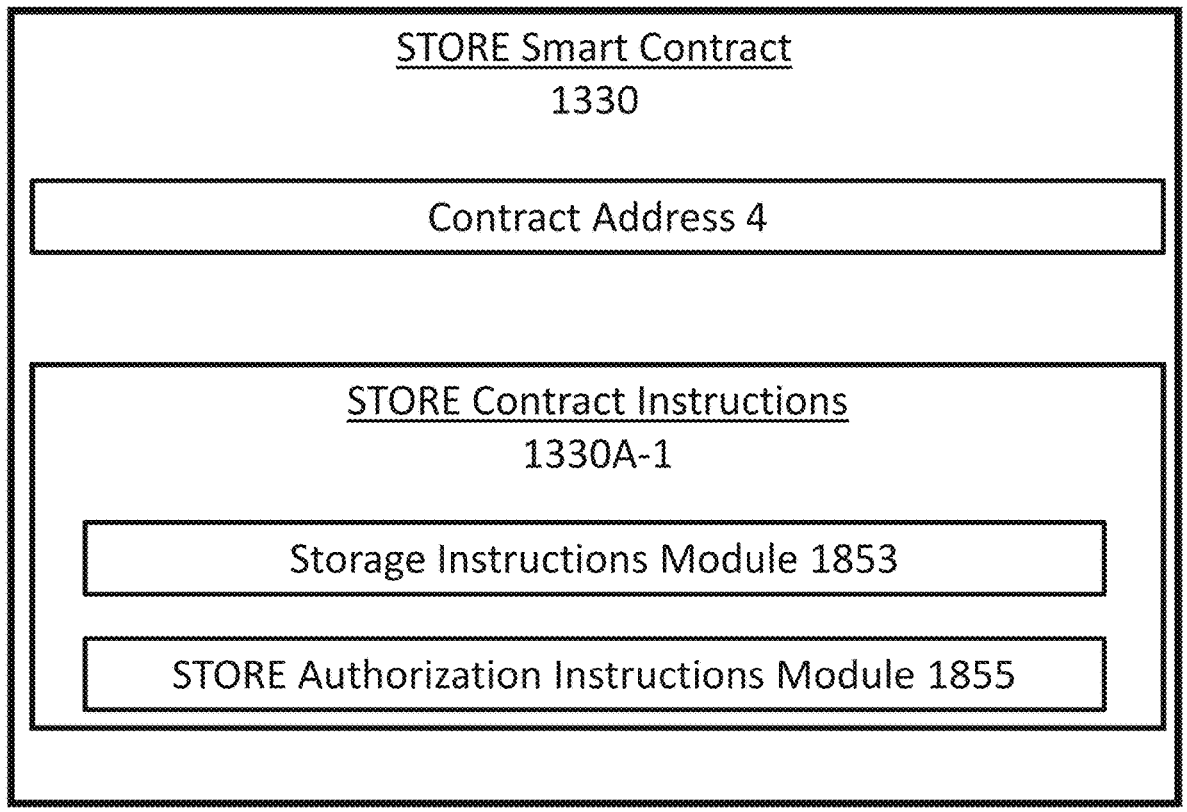
FIG. 18E is a schematic drawing of a store smart contract in accordance with exemplary embodiments of the present invention.

In embodiments, STORE smart contract 1330 may have a contract address (e.g. contract address 4) associated therewith on the blockchain 1807. STORE smart contract 1330, as seen in FIG. 18E, by way of illustration as discussed in greater detail with respect to FIGS. 20 and 21, may include one or more modules of instructions 1330A-1 such as: (1) storage instructions module 1853 and (2) STORE authorization instructions module 1855 (i.e. sixth authorization instructions module).

In embodiments, storage instructions module 1853, may include instructions to store any alterations, edits, or updates to a transaction ledger in accordance with token creation, token transfer, and/or token destruction. In embodiments, the storage instructions module 1853 may be called through a transaction request received from one or more smart contracts. For example, as shown in FIG. 19C, the IMPL smart contract 1320 may call the store smart contract 1330, authorizing the change of a transaction ledger to include an earlier transaction. In embodiments, the transaction ledger may be updated immediately after each token creation, transfer, and/or destruction. In embodiments, the storage instructions module 1853 may execute instructions to update a transaction ledger at certain times and/or dates. For example, the storage instructions module 1853 may only update a transaction ledger at the close of business. As another example, the storage instructions module 1853 may only update a transaction ledger at every second, minute, hour, or multiple hours, to name a few. A more detailed description of instructions related to the storage instructions module 1853 is located in connection with the descriptions of FIGS. 19-21, the same descriptions applying herein.

In embodiments, the STORE authorization instructions module 1855 may include instructions to authorize request received, the requests, in embodiments, being transaction requests from administrators, user public addresses, or other smart contracts, to name a few.

Figure 18F:
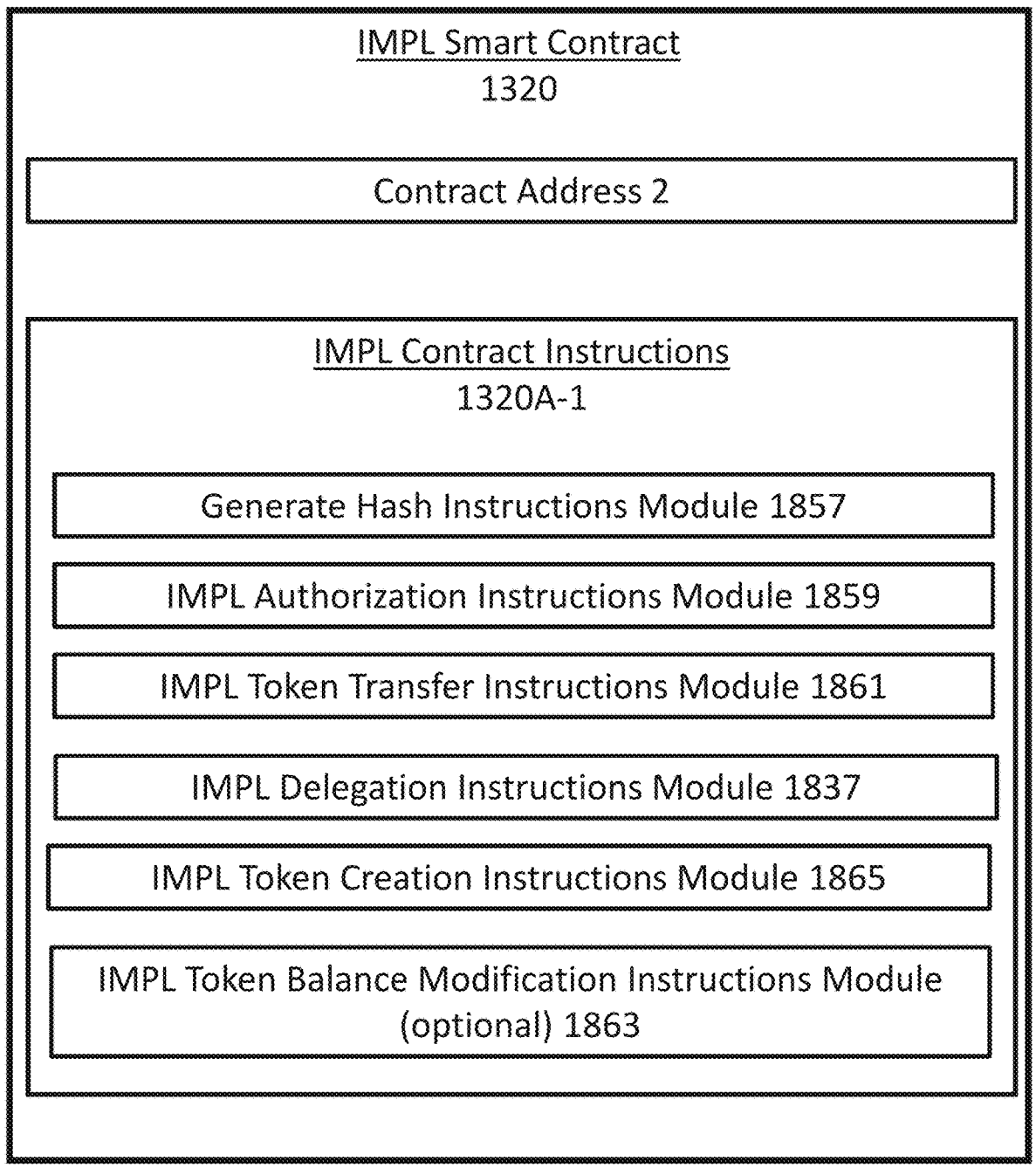
FIG. 18F is a schematic drawing of an imply smart contract in accordance with exemplary embodiments of the present invention.

In embodiments, IMPL smart contract 1320 may have a contract address (e.g. contract address 2) associated therewith on the blockchain 1807. The IMPL smart contract 1320, as seen in FIG. 18F, by way of illustration and discussed in greater detail with respect to FIGS. 19-21, may include one or more modules of instructions 1320A-1 such as: (1) Generate Hash Instructions Module 1857; (2) IMPL Authorization Instructions Module 1859; (3) IMPL Token Transfer Instructions Module 1861; (4) IMPL Token Balance Modification Instructions Module 1863; (5) IMPL delegation instructions module 1837 (i.e. second delegation instructions module); and (6) IMPL Token Creation Instructions Module 1865.

In embodiments, the generate hash instructions module 1857 may include instructions to generate a unique hash. A unique hash may be generated by the generate hash instructions module 1857 by applying a hash algorithm. Examples of hash algorithms include MD 5, SHA 1, SHA 256, RIPEMD, and Keccak-256, to name a few. Hash algorithms take an input of any length and create an output of fixed length, allowing the trade instructions to be detectable and usable by administrators and users on the underlying blockchain.

In embodiments, the IMPL authorization instructions module 1859 may include instructions to authorize request received, the requests, in embodiments, being transaction requests from administrators, user public addresses, or other smart contracts, to name a few. In embodiments, the requests may include requests to generate digital asset tokens from administrators, user public addresses, and/or other smart contracts, to name a few.

In embodiments, the IMPL token transfer instructions module 1861 may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. In embodiments, the IMPL token transfer instructions module 1861 may be similar to the token transfer instructions module 1843, described in connection with FIG. 18C. In embodiments, a transfer of digital asset tokens using the blockchain 1807 may be accomplished using either the IMPL token transfer instructions module 1861 or the token transfer instructions module 1843. In embodiments, a transfer of digital asset tokens using the blockchain 1807 may be accomplished using both the IMPL token transfer instructions module 1861 and the token transfer instructions module 1843. In embodiments, the IMPL smart contract 1320 and the PRINT LIMITER smart contract 1360 may be the same smart contract. A more detailed description of the transfer of digital asset tokens is located in connection with the description of FIG. 19D, the same description applying herein.

In embodiments, IMPL token balance modification instructions module 1863 may include instructions that may alter, edit, and/or update a transaction ledger in accordance with token creation, token transfer, and/or token destruction instructions (or modules), to name a few. In embodiments, the IMPL token balance modification instructions module 1863 may be similar to the token balance modification module 1847 described in connection with FIG. 18C. In embodiments, a token balance modification may be accomplished using either the token balance modification module 1847 or the IMPL token balance modification module 1863. In embodiments, a token balance modification may be accomplished using both the token balance modification module 1847 and the IMPL token balance modification module 1863. A more detailed description of a token balance modification is located in connection with the description of FIGS. 19-21, the same descriptions applying herein.

In embodiments, IMPL delegation instructions module 1837 (i.e. second delegation instructions module) may include one or more instructions to delegate received requests to other smart contracts, such as, for example, contract address 1 (proxy smart contract) 1809, PRINT LIMITER smart contract 1360 (contract address 2), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), off-line public address 1 1817, off-line public address N 1817N, on-line public address 1 1825, on-line public address N 1825N, user 1 public address 1827, and/or User X public address 1827X. PRINT LIMITER delegation instructions module 1837 (i.e. second delegation instructions module) may include instructions for delegating to one or more designated store contract addresses data storage operations or other functions for the digital asset token as authorized by the first designated custodian contract address.

In embodiments, the IMPL token creation module 1865 may include one or more instructions to create digital asset tokens, and thus add to the token supply. Such instructions may specify one or more authorized key pairs or contract addresses that may be authorized to request creation of security tokens under specified conditions (such as one or more on-line keysets 1362, . . . 1362N). In embodiments, the token creation instructions module 1833 may include instructions related to increasing the token supply. In embodiments, the token creation instructions module 1865 may include instructions on how to create new digital asset tokens within pre-approved token supply limits and how to assign newly created or "minted" tokens to specific designated public addresses or contract addresses on the underlying blockchain. In embodiments, the IMPL token creation module 1865 may cause the IMPL Smart Contract 1320 to communicate with STORE Smart contract 1330, the IMPL Smart Contract 1320 sending a transaction request to the Store Smart Contract 1330, causing the Store Smart Contract 1330 to alter a ledger, or otherwise record an increase or decrease in the token supply of a digital asset token.

Figures 1, 20A:
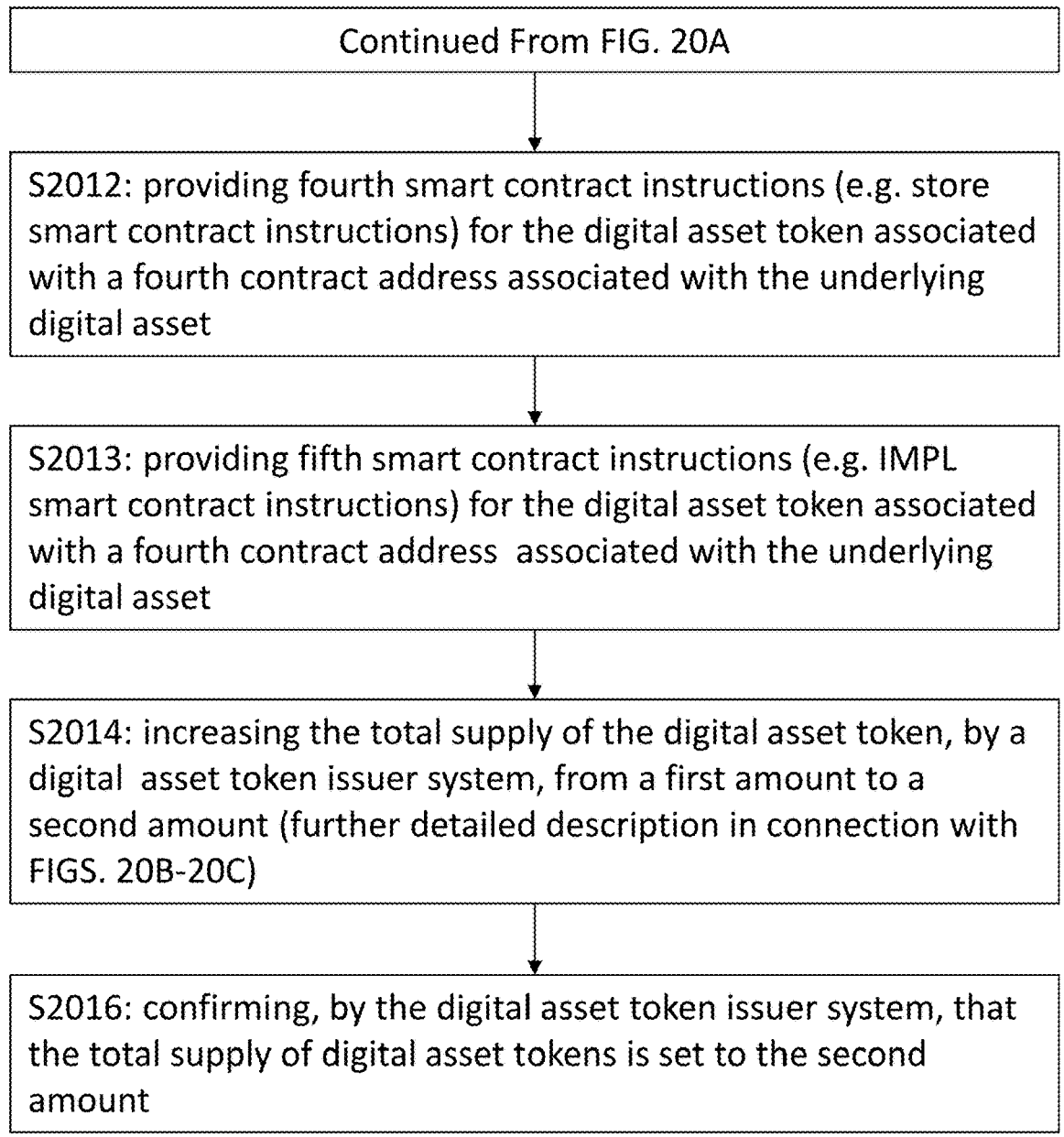
FIG. 20A is a flowchart of an exemplary process of increasing a supply of tokens of a digital asset token using off-line keys in accordance with exemplary embodiments of the present invention.

Referring to FIG. 20A, In step S2002, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger 15). In embodiments, the first designated key pair may be multiple on-line keys with multiple electronic signatures.

In step S2004, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2006, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2006 are the proxy contract instructions 1310A-1, both described in connection with FIG. 18B. The first smart contract instructions may be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address. In embodiments, the first delegation instructions may be located with first delegation instruction module 1829 described in connection with FIG. 18B. In embodiments, the first smart contract instructions, may also include first authorization instructions for the second designated key pair. In embodiments, the first authorization instructions may be located with first authorization instructions module 1830 described in connection with FIG. 18B.

In step S2008, second smart contract instructions for the digital asset token associated with a second contract address associated with the blockchain associated with the underlying digital asset may be provided. In embodiments, the second smart contract address is at contract address 3 (print limiter smart contact) 1813 and the second smart contract instructions are the print limiter contract instructions 1360A-1, both described in connection with FIG. 18C. In embodiments, the second contract address is different from the first contract address. In embodiments, the second smart contract instructions may be saved in the blockchain 1807 and, as described in connection with the print limiter contract instructions 1360A-1 of FIG. 18C (the descriptions of which applying herein), include: (1) token creation instructions; (2) custodian instructions; (3) second delegation instructions; (4) second authorization instructions; and (5) third authorization instructions. In embodiments, as described above in connection with print limiter contract instructions 1360A-1 of FIG. 18C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 18C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 18C (the description of which applying herein), the second smart contract instructions may also include: (8) token balance modification instructions of token balance modification instructions module 1847 to modify a total number of tokens of the digital asset token assigned to a third designated address.

In step S2010, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 18D. The third smart contract instructions may be saved in the blockchain 1807 and, as described in connection with the custodian 2 smart contract instructions 1350A-1 of FIG. 18D (the descriptions of which applying herein), include: (1) fourth authorization instructions and (2) fifth authorization instructions. The fourth authorization instructions of CUSTODIAN 2 first authorization instructions module 1849 (i.e. fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e. a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e. fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

Figure 19A:
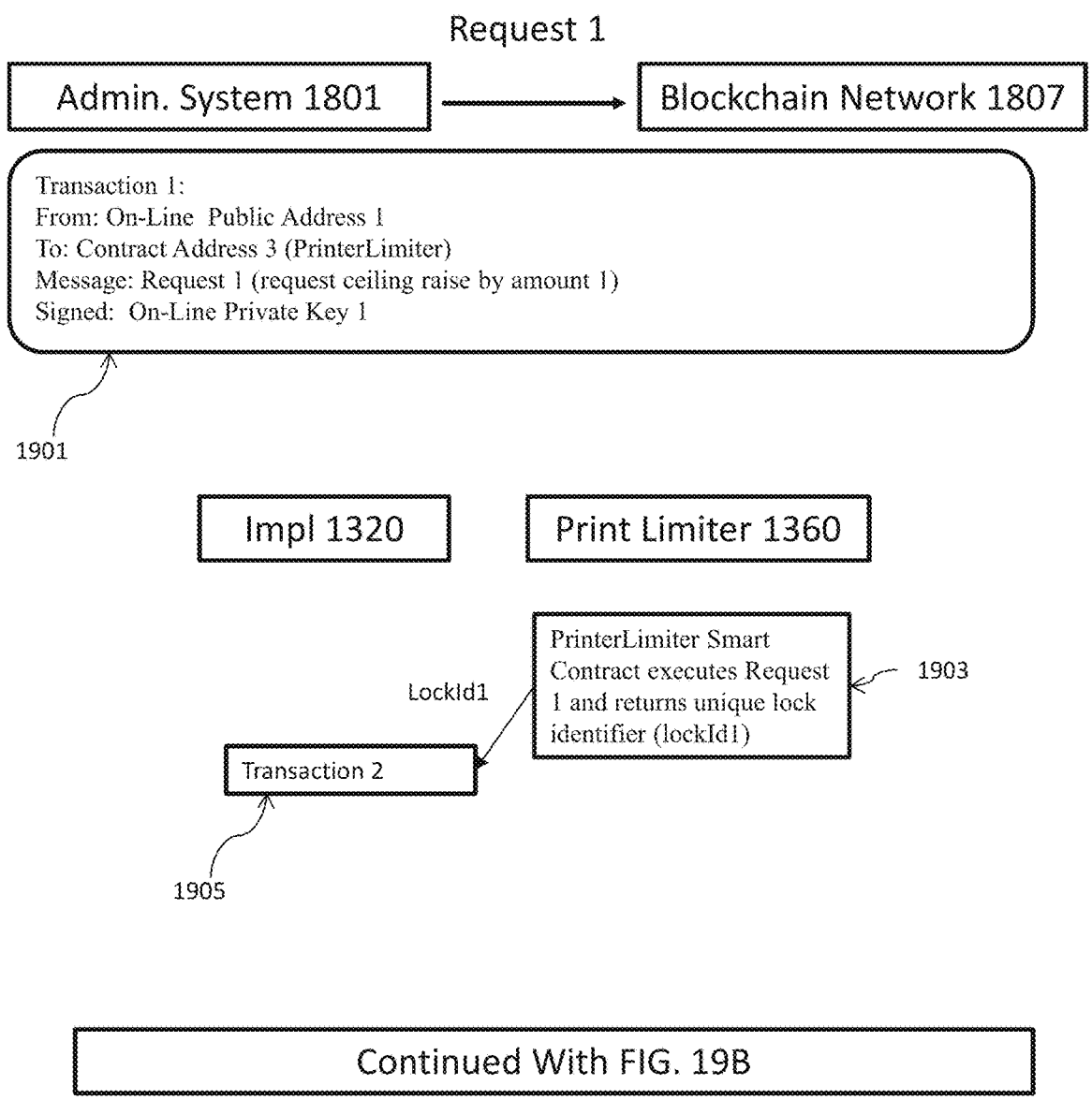
FIG. 19A is a schematic drawing of an exemplary process for increasing the ceiling of a print limiter in accordance with exemplary embodiments of the present invention.
Figure 19B:
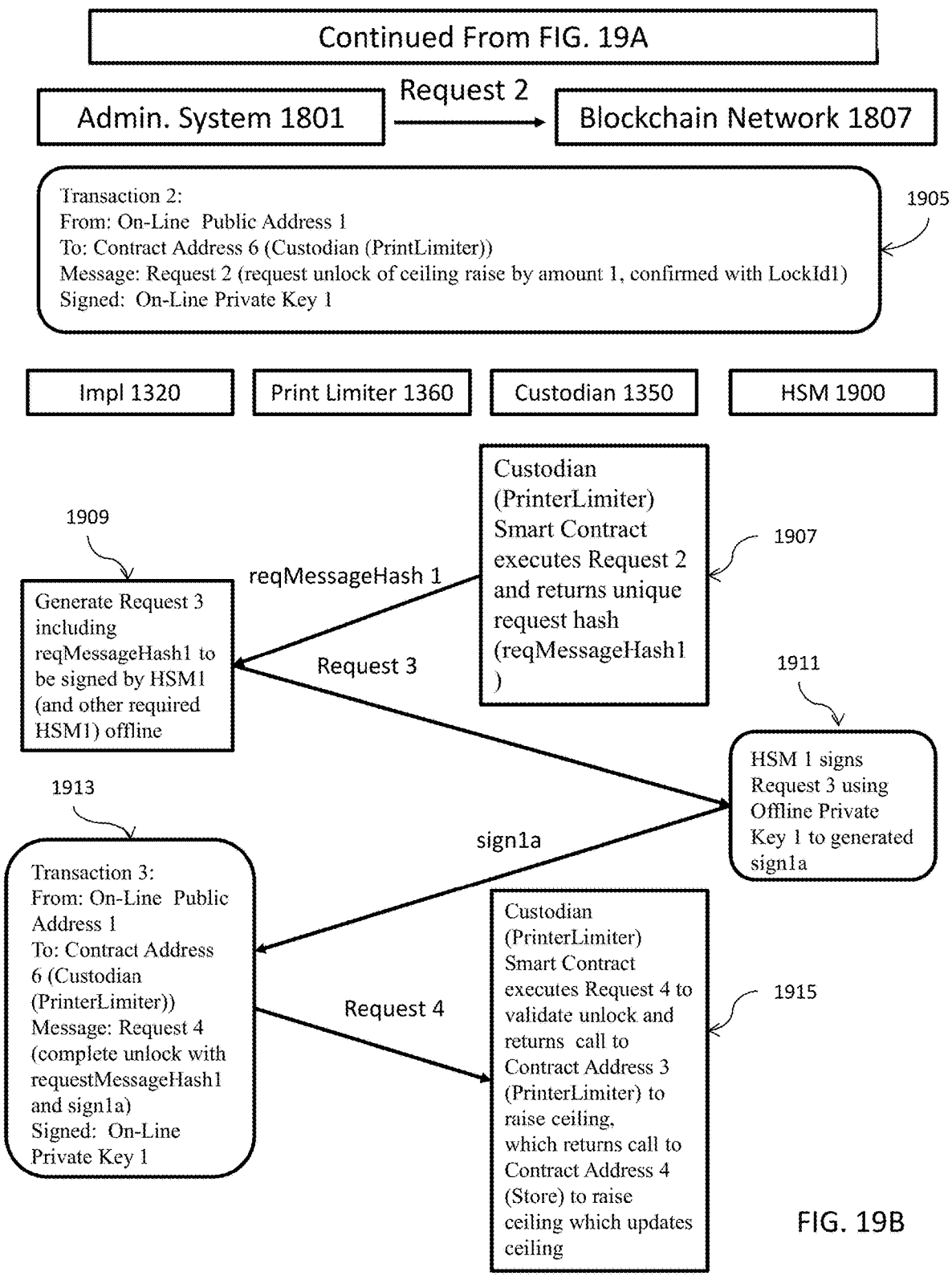
FIG. 19B is a schematic drawing of an exemplary process for increasing the ceiling of a print limiter in accordance with exemplary embodiments of the present invention.
Figure 19C:
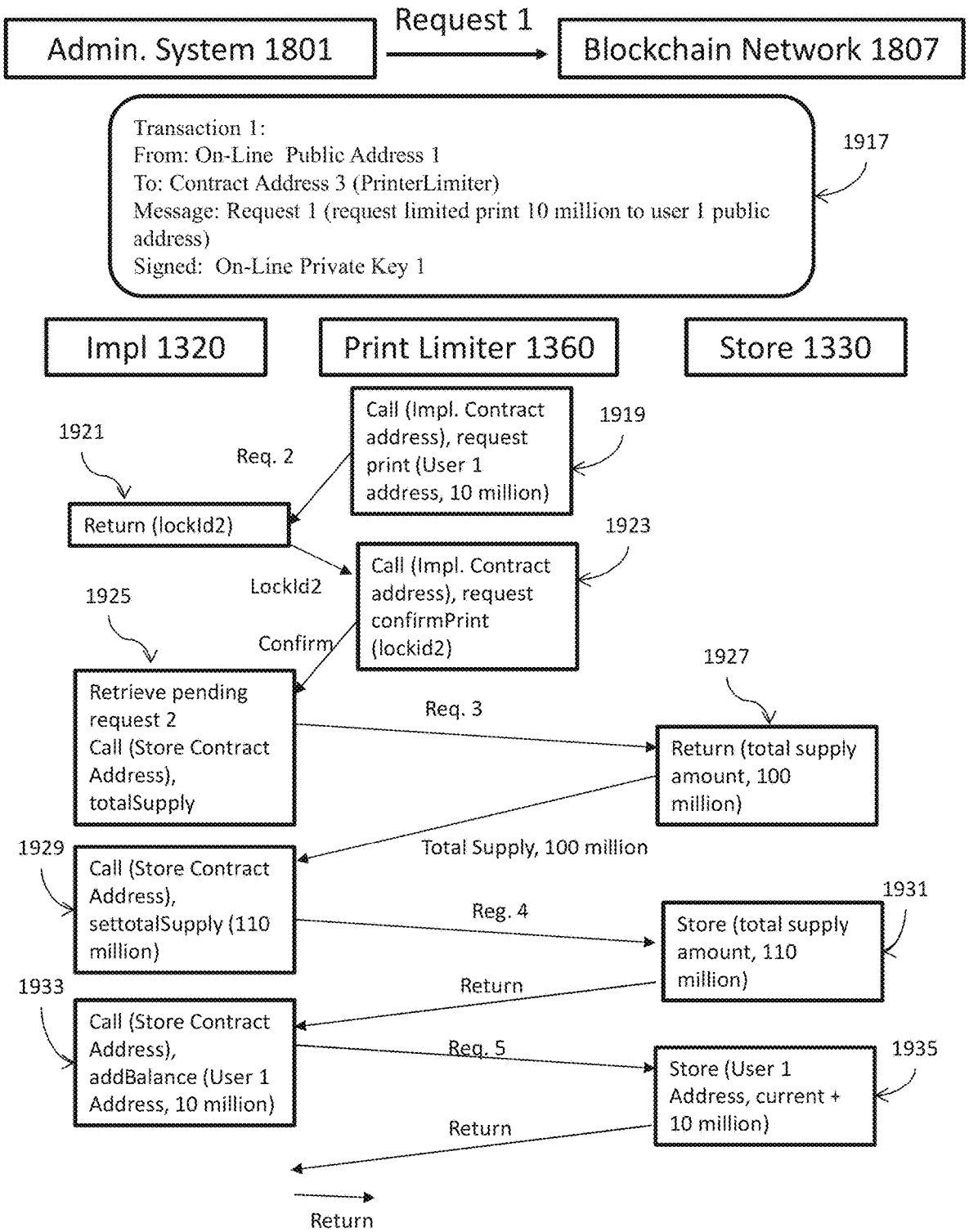
FIG. 19C is a schematic drawing of an exemplary process of limiting the print limiter with respect to a public address in accordance with exemplary embodiments of the present invention.

A more detailed description of the process of raising the token creation ceiling is located in connection with FIGS. 19A-B. FIGS. 19A-B are schematic drawings of an exemplary process for increasing the ceiling of a print limiter in accordance with exemplary embodiments of the present invention. The exemplary process starts with administrator system 1801 sending a first transaction request 1901 from on-line public address 1 1825 to PRINT LIMITER smart contract 1360 (contract address 3). In embodiments, the transaction request 1901 includes a request to raise the ceiling by amount 1. In embodiments, the first transaction request 1901 is signed by on-line private key 1. In embodiments, on-line private key 1 is mathematically related to on-line public address 1 1825.

In response to receiving the first transaction request, the print limiter 1813 executes the first transaction request 1903 and returns a unique lock identifier (LockId1) to IMPL smart contract 1320 (contract address 2).

Next, referring to FIG. 19B, a second transaction request 1905 may be sent from the on-line public address 1825 to contract address 6 (custodian (print limiter)) 1821. In embodiments, the second transaction request 1905 includes a request to unlock ceiling raise by amount 1, the request being confirmed with the lockID received in step 1903. In embodiments, the second transaction request 1905 is signed by on-line private key 1.

In response to receiving the second transaction request, custodian 1821 executes the second transaction request 1907 and returns a unique hash (reqMessageHash1). The unique hash may be generated by applying a hash algorithm. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time.

In response to the returned unique hash, a third transaction request is generated 1909. The third transaction request may include a request that the reqMessageHash1 to be signed by HSM 1900 offline.

The third request then may be sent 1911 to HSM 1900 and signed using offline private keyset 1803. The signed request may be returned to administrator system 1801.

After returning the signed transaction request, the third transaction request is may be sent 1913 from the on-line public address 1825 to contract address 6 (custodian (print limiter)) 1821. The third transaction request may include a fourth request to complete the unlock with requestMessage-Hash1 with the HSM signature. In embodiments, the fourth request is signed by on-line private key 1.

After receiving the fourth request, custodian 1821 may execute the request to validate the unlock and return call to contract address 3 (print limiter) 1813 to raise the ceiling, which returns call to contract address 4 (store) 1815 to raise ceiling which updates ceiling.

The process of FIG. 20A may continue with step S2012 of FIG. 20A-1. In step S2012, fourth smart contract instructions for the digital asset token associated with a fourth contract address associated with the blockchain associated with the underlying digital asset are provided. In embodiments, the fourth contract address is STORE smart contract 1330 (contract address 4) and fourth smart contract instructions of step S2012 are the store contract instructions 1330A-1, both described in connection with FIG. 18E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

The process may continue with step S2013. At step S2013, fifth smart contract instructions for the digital asset token for the digital asset token associated with the blockchain associated with the underlying digital asset are provided. In embodiments, the fifth contract address is the IMPL smart contract 1320 (contract address 2) and the fifth smart contract instructions of step S2013 are the IMPL Contract instructions 1320A-1, both described in connection with FIG. 18F. In embodiments, the fifth smart contract instructions may be saved in the blockchain for the underlying digital assets and may include (1) token creation instructions to create tokens of the digital asset tokens under conditions set forth by the print limiter token creation instructions; and (2) second delegation instructions for delegating to another contract address, data storage operations. In embodiments, instructions from the PRINT LIMITER Token Creation Instructions Module 1833 may set conditions for the token creation instructions included with the fourth smart contract instructions (i.e. instructions included in the IMPL Token Creation Instructions Module 1865).

The process described in FIG. 20A-1 may continue with step S2014. At step S2014, a digital asset token issuer system increases the total supply of the digital asset token from a first amount to a second amount. Step S2014 is described in more detail in connection with FIGS. 20B-C. Increasing the total supply of the digital asset token may being with step S2018. At step S2018, a first transaction request may be generated by the digital asset token issuer system. The generated transaction request may include a first message including a first request to increase the total supply of the digital asset token to a second amount of digital asset tokens. The first transaction request being from the on-line public key address 1825 to the fifth contract address (IMPL 1320). In embodiments, the first transaction request may be signed by the first on-line private key.

In step S2020 the first transaction request is sent by the digital asset token issuer system, from the on-line public key address 1825 to the fifth contract address (IMPL 1320).

Next, In step S2021, the first transaction request is sent by the digital asset token issuer system via the underlying blockhain from the fifth contract address (IMPL 1320) to the second contract address (PRINT LIMITER 1360). In embodiments, the second contract address (PRINT LIMITER 1360) executes, via the blockchain 1807, the first transaction request to return a first unique lock identifier associated with the first transaction request. In embodiments, the first transaction request may include first transaction fee information for miners in the blockchain network to process the first transaction request.

Next, In step S2022, the first unique lock identifier may be obtained by the digital asset token issuer system, based on reference to the blockchain 1807.

In step S2024, a second transaction request may be generated by the digital asset token issuer system. The generated transaction request may include a second message including a second request to unlock the total supply of the digital asset token in accordance with the first request including the first unique lock identifier. The second transaction request being from the on-line public key address 1825 to the third contract address (custodian (print limiter) 1350). In embodiments, the second transaction request may be signed by the first on-line private key.

In step S2026 the second transaction request is sent by the digital asset token issuer system, from the on-line public key address 1825 to the third contract address (custodian (print limiter) 1350). In embodiments, the third contract address (custodian (print limiter) 1350) executes, via the blockchain 1807, the first transaction request to return a first unique lock identifier associated with the second transaction request to return a first unique request hash associated with the second transaction request. In embodiments, the first transaction request may include second transaction fee information for miners in the blockchain network to process the second transaction request.

Next, In step S2028, the first unique request hash is obtained, by the digital asset token issuer system, based on reference to the blockchain 1807.

Figure 20B:
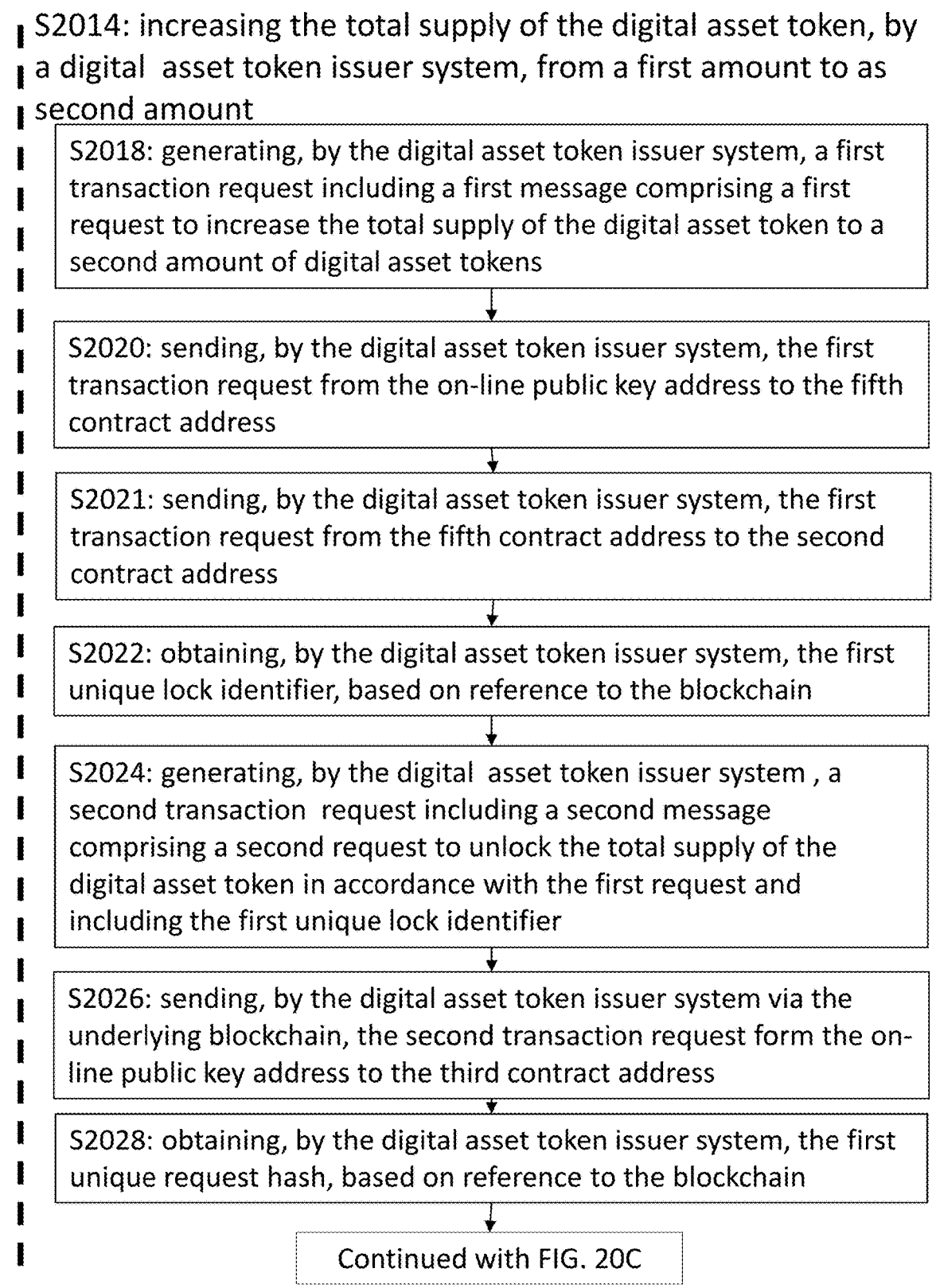
FIG. 20B is another flowchart of an exemplary process of increasing the total supply of tokens of a digital asset token in accordance with exemplary embodiments of the present invention.

The process described in FIG. 20B may continue with step S2030 of FIG. 20C. At step S2030, a third transaction request is generated by the digital asset token issuer system. The third transaction request may be digitally signed by at least the second designated private key (off-line keyset 1803) including the first unique request hash.

Next, at step S2032, the third transaction request is transferred from the digital asset token issuer system to a first portable memory device. A portable memory device may, in embodiments, be a flash drive, USB drives, external hard drives, and/or portable CD/DVD-ROM drives, to name a few.

At step 2034, the third transaction request is transferred from the first portable memory device to the second computer system. Next, at a step S2036, the third transaction request is digitally signed using the second designated private key (off-line keyset 1803) to generate a third digitally signed transaction request.

The process of FIGS. 20B and 20C may continue with step S2038. At step S2038, the third digitally signed transaction request is sent from a second portable memory device using the digital asset token issuer system to the third contract address (custodian (print limiter) 1350).

In embodiments, the first portable memory device is the second portable memory device. In embodiments, the first portable memory device is not the second portable memory device. In embodiments, the third digitally signed transaction request is returned to the STORE smart contract 1330. Once returned to the STORE smart contract 1330, the third digitally signed transaction request is returned to the print limiter 1813.

Referring back to FIG. 20A-1, the process may continue with step S2016. At step S2016, the digital asset token issuer system confirms that the total supply of digital asset tokens is set to the second amount. In embodiments, the third smart contract (custodian (print limiter) 1350) executes, via the blockchain network, the third digitally signed transaction request to validate the second request to unlock based on the third digitally signed transaction request and the first unique request hash and executes a first call to the second contract address (PRINT LIMITER 1360), to increase the total supply of the digital asset token to the second amount of digital asset tokens. In embodiments, the second contract address (PRINT LIMITER 1360) may return the first call to the fifth contract address (IMPL 1320). In embodiments, the fifth smart contract (IMPL 1320) executes, via the blockchain network, a second call to the fourth smart contract address (STORE 1330) to set the total supply of the digital asset tokens to the second amount of digital asset tokens. In embodiments, the fourth smart contract (STORE 1330)

executes, via the blockhain, the second call to set the total supply of the digital asset tokens to the second amount of digital asset tokens.

In embodiments, the steps of FIGS. 20A and 20B may be rearranged and/or omitted.

Merely for the purposes of description, the following example is provided.

Example 1

Increase the Supply Ceiling by 100 Million Cents

Tx 1.
TO = address of PrintLimiter
DATA = 'requestCeilingRaise(100,000,000)'
(Tx would be signed by Adminstrator's 'primary' key, although there are no restrictions on who can call this function.)
Execution produces a unique lock identifier, say 'lockId1'.

Tx 2.
TO = address of (Print)Custodian (instance of the Custodian contract, with cold tier keys, intended to be the offline custodian of printing operations)
DATA = 'requestUnlock(lockId1, address of PrintLimiter, selector for functionconfirmCeilingRaise, ...and a detail I'm going to omit...)'
(Tx would be signed by Adminstrator's 'primary' key, although there are no restrictions on who can call this function. If it's a not the primary key there is an anti-spam mechanism.)
Execution produces a unique request hash, say 'reqMsgHash1'.
2 of the offline keys set up with (Print)Custodian sign 'reqMsgHash1'; we'll name the signatures 'sig1_a' and 'sig1_b'.

Tx 3.
TO = address of (Print)Custodian
DATA = 'completeUnlock(requestMsgHash1, sig1_a, sig1_b)'
(Tx would be signed by Adminstrator's 'primary' key, although there are no restrictions on who can call this function.)
Execution validates the signatures (and enforces other details around time locks and revocation).
Next, it executes a call to PrintLimiter and its confirmCeilingRaise
(NOTE that those two detailed were fixed in Tx2 as parameters to the call to requestUnlock).
CALL '(address of PrintLimiter).confirmCeilingRaise(lockId1)'
Execution continues in PrintLimiter in the function 'confirmCeilingRaise'. Storage for the contract is updated:
STORE supply ceiling = current supply ceiling + 100,000,000

FIG. 21A is a flowchart of an exemplary process of increasing the total supply of digital asset tokens in accordance with exemplary embodiments of the present invention. The process of FIG. 21A may begin with step S2102. In step S2102, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger through the internet (network 15). In embodiments, the first designated key pair may be multiple on-line keys with multiple electronic signatures.

In step S2104, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2106, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2106 are the proxy contract instructions 1310A-1, both described in connection with FIG. 18B. The first smart contract instructions, may, be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address. The first delegation instructions may be located with first delectation instructions module 1829 described in connection with FIG. 18B. The first smart contract instructions, may also include first authorization instructions for the second designated key pair. The first authorization instructions may be located with first authorization instructions module 1830 described in connection with FIG. 18B.

In step S2108, second contract instructions for the digital asset token associated with a second contract address associated with the blockchain associated with the underlying digital asset is provided. In embodiments, the second smart contract address is contract address 3 (print limiter smart contact) 1813 and the second smart contract instructions are the print limiter contract instructions 1360A-1, both described in connection with FIG. 18C. In embodiments, the second contract address is not the first contract address. The second smart contract instructions may be saved in the blockchain 1807 and, as described in connection with the print limiter contract instructions 1360A-1 of FIG. 18C (the descriptions of which applying herein), include: (1) token creation instructions; (2) custodian instructions; (3) second delegation instructions; (4) second authorization instructions; and (5) third authorization instructions. In embodiments, as described above in connection with print limiter contract instructions 1360A-1 of FIG. 18C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 18C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 18C (the description of which applying herein), the second smart contract instructions may also include: (8) token balance modification instructions of token balance modification instructions module 1847 to modify a total number of tokens of the digital asset token assigned to a third designated address.

In step S2110, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 18D. The third smart contract instructions may be saved in the blockchain 1807 and, as described in connection with the custodian 2 smart contract instructions 1350A-1 of FIG. 18D (the descriptions of which applying herein), include: (1) fourth authorization instructions and (2) fifth authorization instructions. The fourth authorization instructions of CUSTODIAN 2 first authorization instructions module 1849 (i.e. fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e. a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e. fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

A more detailed description of the process of raising the token creation ceiling is located above in connection with FIGS. 19A-B, the description of which applying herein.

The process of FIG. 21A may continue with step S2112. At step 2112, fourth smart contract instructions are provided for the digital asset token associated with a fourth contract address associated with the blockchain associated with the underlying digital asset. In embodiments, the fourth contract address is STORE smart contract 1330 (contract address 4) and fourth smart contract instructions of step S2112 are the store contract instructions 1330A-1, both described in connection with FIG. 18E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

At a step S2114, fifth smart contract instructions are provided for the digital asset token associated with a fifth contract address associated with the blockchain associated with the underlying digital asset. In embodiments, the fifth smart contract address is IMPL smart contract 1320 (contract address 2) and the fifth smart contract instructions are impl contract instructions 1320A-1.

Figure 21B:
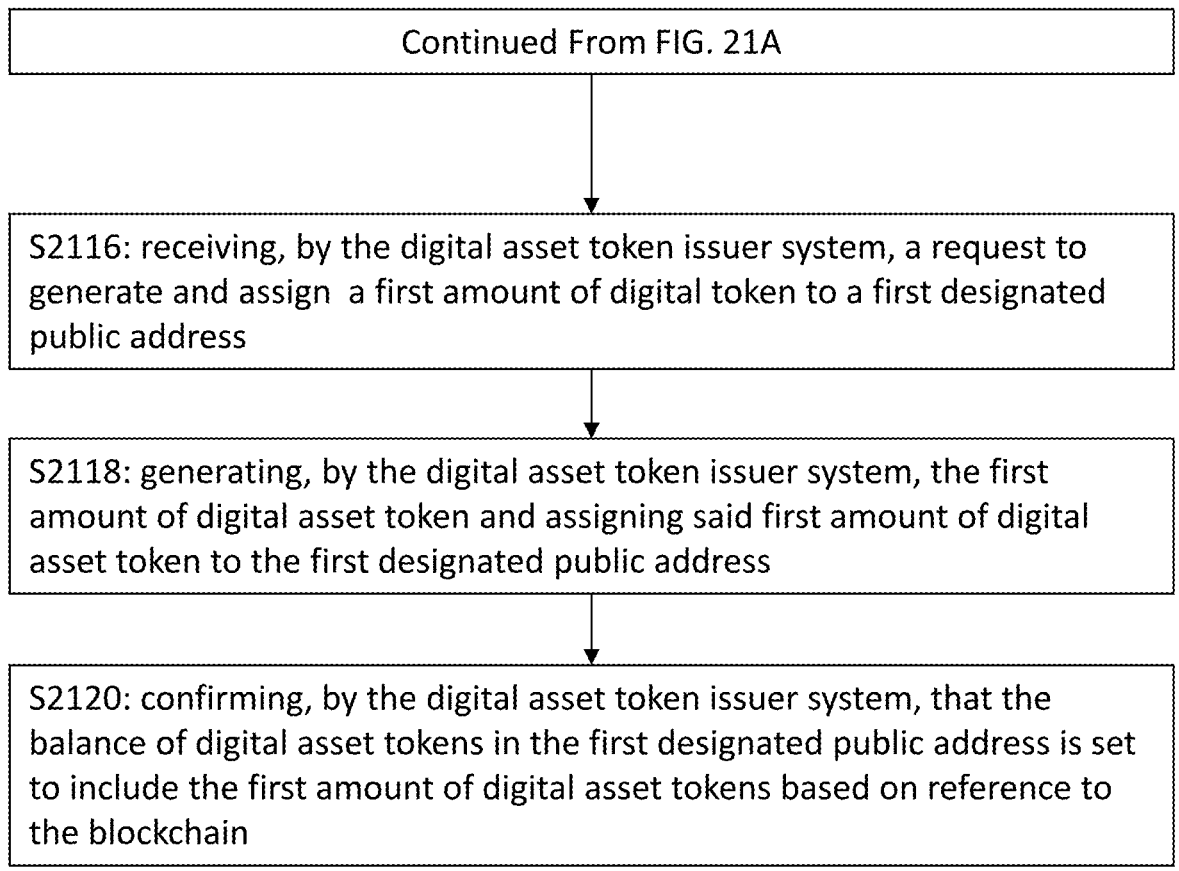
FIG. 21B is a flowchart of an exemplary process of increasing the total supply of tokens of a digital asset token in accordance with exemplary embodiments of the present invention.

The process of FIG. 21A may continue with step S2116 of FIG. 21B. At step S2116, a request to generate and assign a first amount of digital token to a first designated public address is received by the digital asset token issuer system. In embodiments, the first designated public address may be User 1 public address 1827, User 1 public address 1827 being associated with User 1 Device 1805. In embodiments, a validation request may be sent to the on-line key public address 1 1825. The validation request may determine whether the first amount of digital token is available to be generated and assigned. In embodiments, the digital asset token issuer system may determine whether the on-line key has the authority to process the request to generate and assign the first amount of digital token. This determination may be made based on a variety of factors, including whether the first amount of digital token is actually available and/or the ceiling of digital asset tokens for a specific time period, to name a few.

At step, S2118, the digital asset token issuer system generates the first amount of digital asset token and assigns the first amount of digital asset tokens to the first designated public address. In embodiments, step S2118 may include the digital asset token issuer system generating a first transaction request. The first transaction request, in embodiments, may be address from the online public key address (On-line public address 1 1825) to the fifth contract address (IMPL Smart Contract (Contract Address 2) 1320). The first transaction request may include a first message including a first request to generate the first amount of digital asset token and assign said first amount of digital asset token to the first designated public address. In embodiments, the first transaction request is digitally signed by the first on-line private key (on-line keyset 1362). After the transaction request is generated, the first transaction request may be sent from the online public key address (On-line public address 1 1825) to the fifth contract address (IMPL smart contract 1320 (contract address 2)). In embodiments, the first transaction request includes first transaction fee information for miners in the blockchain network to process the first transaction request.

After the first transaction request is received by the fifth contract address, in embodiments, the fifth smart contract (IMPL 1320) may execute, via the blockchain 1807, the first transaction request to validate the first request and the authority of the first on-line private key (on-line keyset 1 1362) to call the second smart contract (print limiter 1813) to execute the first transaction request. The second smart contract (print limiter 1360) may also send a first call request to the fifth contract address (IMPL smart contract 1320 (contract address 2)) to generate and assign to the first designated public address (user 1 public address 1827) the first amount of digital asset tokens.

In response to the return call, in embodiments, the fifth smart contract (IMPL smart contract 1320) may execute via the blockchain 1807 the first call request to generate a first unique lock identifier. The fifth smart contract (IMPL smart contract 1320) may return to the second smart contract address (print limiter 1813) the first unique lock identifier.

In embodiments, in response to the return of the first unique lock identifier, the second smart contract (print limiter 1360) may execute, via the blockchain 1807, a second call request to the fifth smart contract address (IMPL smart contract 1320 (contract address 2)) to confirm the first call request with the first lock identifier.

In response to the second call request, in embodiments, the fifth smart contract (IMPL smart contract 1320) executes, via the blockchain 1807, the pending first call request to execute a third call request to the fourth contract address (STORE smart contract 1330 (contract address 4)) to obtain the total supply of digital asset tokens in circulation.

In embodiments, the fifth smart contract (IMPL 1320) executes, via the blockchain network 1807, the call to execute the first call to execute a second call to the fourth smart contract (STORE smart contract 1330) to obtain the total supply of digital asset tokens in circulation. After executing the third call request, the fourth smart contract (STORE smart contract 1330) returns, to the fifth contract address (IMPL smart contract 1320 (contract address 2)), a second amount of digital asset tokens corresponding to the total supply of digital asset tokens in circulation.

In response to the return of the second amount, in embodiments, the fifth smart contract (IMPL smart contract 1320 (contract address 2)) executes via the blockchain 1807 a fourth call request to the fourth contract address (STORE smart contract 1330 (contract address 4)) to set a new total supply of digital asset tokens in circulation to a third amount. The third amount, in embodiments, may be the total of the first amount and the second amount.

In embodiments, in response to the fourth call request, the fourth smart contract (STORE smart contract 1330) executes via the blockchain 1807 the fourth call request and sets a new total supply of digital asset tokens in circulation at the third amount. Once the total supply is set to the third amount, the fourth smart contract (STORE smart contract 1330) returns to the fifth contract address (IMPL smart contract 1320 (contract address 2)).

The fifth smart contract executes, in embodiments, in response to the return, via the blockchain 1807, a fifth call request to the fourth contract address (STORE smart contract 1330 (contract address 4)) to add the first amount of digital asset tokens to the balance associated with the first designated public address.

In embodiments, in response to the fifth call request, the fourth smart contract (STORE smart contract 1330) executes, via the blockchain 1807, the fifth call request to set the balance of digital asset tokens in the first designated public address (user 1 public address 1827) at a fourth amount which includes the addition of the first amount to the previous balance.

In embodiments, the fourth smart contract (STORE smart contract 1330) returns to the fifth contract address (IMPL smart contract 1320 (contract address 2)). Once the fifth contract address receives the return, in embodiments, the fifth contract address returns to the second contract address (PRINT LIMITER smart contract 1360 (contract address 3)).

The process of FIGS. 21A-B may continue with step S2120. At step S2120, the digital asset token issuer system confirms the balance of digital asset tokens in the first designated public address (user 1 public address 1827) is set to include the first mount of digital asset tokens based on reference to the blockchain.

In embodiments, the steps of FIGS. 21A and 21B may be rearranged and/or omitted.

Example 2

Increase the Token Supply by 10 Million Cents Using an _Online_Key (Assumes the Amount to be Printed would not Exceed the Ceiling Limit)

---

Tx 1.
TO = address of PrintLimiter
DATA = 'limitedPrint(address of User 1, 10,000,000)'
(Tx signed by Administrator... analogous to above)
Execution validates that the new supply including 10 million cents would not exceed the ceiling.
Next,
CALL '(address of Impl.).requestPrint(address of User 1, 10,000,000)'
Execution continues in Impl. in function 'requestPrint'.
This function produces a unique lock identifier, say 'lockId2'.
Execution returns from Impl. to PrintLimiter, passing 'lockId2'.
Next, in PrintLimiter
CALL '(address of Impl).confirmPrint(lockId2)'.
Execution continues in Impl. in function 'confirmPrint'.
The pending print associated with 'lockId2' (address of User 1, 10,000,000) is retrieved.
Next,
CALL '(address of Store).totalSupply( )' (Execution continues in Store, in function totalSupply, which returns with the value of the total supply)
let new supply = current supply + 10,000,000
Next,
CALL '(address of Store).setTotalSupply(new supply)'
Execution continues in Store in function 'setTotalSupply'.
STORE total supply = new supply
Execution returns to Impl.
Next,
CALL '(address of Store).addBalance(address of User 1, 10,000,000)'
Execution continues in Store in function 'addBalance'.
STORE balance of User 1 = balance of User 1 + 10,000,000
Execution returns to Impl. (some logging occurs, but let's skip over this)
Execution returns to PrintLimiter and terminates.

---

Figure 19D:
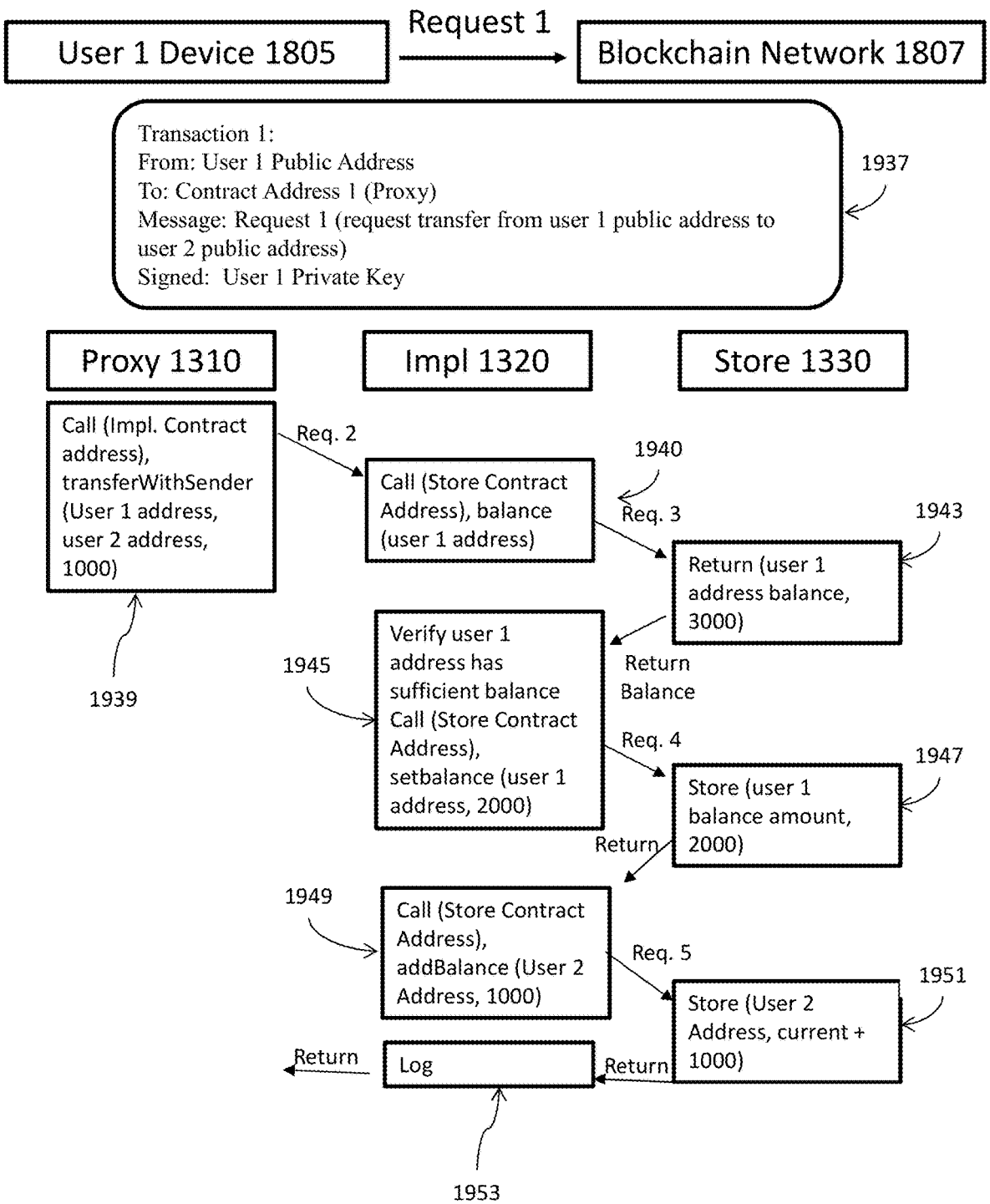
FIG. 19D is a schematic drawing of an exemplary process of a transfer request in accordance with exemplary embodiments of the present invention.

In embodiments, the process of FIGS. 21A-B may further include the process described in connection with FIG. 19D. The process starts with the blockchain 1807 receiving, from a first user device associated with the first designated public address via the blockchain, a second transaction request 1937. The first user device, may be user device 1 1805. The first designated public address may be user 1 public address 1827. The second transaction request may be addressed from the first designated public address to the first contract address (contract address 1 (proxy smart contract) 1809). In embodiments, the second transaction request may include a second message including a second request to transfer a fifth amount of digital assets from the first designated public address to a second designated public address. The second transaction request may be digitally signed by a first user private key. In embodiments, the first user private key may be mathematically related to first designated public address (user 1 public address 1827). In embodiments, the first user device 1805 has access to the first user private key prior to sending the second transaction request. In embodiments, the second transaction request includes second transaction fee information for miners in the blockchain network to process the second transaction request.

Once the second transaction request is sent, the first smart contract address (contract address 1 (proxy smart contract) 1809) executes, via the blockchain 1807, the second transaction request to execute 1939, via the blockchain 107 a sixth call request to the fifth contract address (IMPL smart contract 1320 (contract address 2)) to transfer a fifth amount of digital assets form the first designated public address (User 1 public address 1827) to the second designated public address (User X public address 1827X). As shown in FIG.

19D, the proxy smart contract 1310 calls the IMPL smart contract 1320 to perform a function—transferWithSender (user 1 address, user 2 address, 1000).

In response to the sixth call request, the fifth smart contract (IMPL smart contract 1320 (contract address 2)) executes, via the blockchain 1807, authorization instructions to verify the sixth call came from an authorized contract address, and, upon verification, executes a seventh call request 1941 to the fourth contract address (STORE smart contract 1330 (contract address 4)) to obtain a sixth amount of digital asset tokens which reflect a current balance of digital asset tokens associated with the first designated public address. As shown in FIG. 19D, the IMPL smart contract 1320 calls the STORE smart contract 1330 to determine the balance associated with the user 1 public address.

In response to receiving the seventh call request, the fourth smart contract address (STORE smart contract 1330 (contract address 4)) executes 1943, via the blockchain 1807, the seventh call request to return the sixth amount of digital asset tokens. As shown in FIG. 19D, the store smart contract returns the balance associated with the user 1 address, which, in the case of the example shown in connection with FIG. 19D, is 3000.

In response to the return of the sixth amount of digital asset, the fifth smart contract (IMPL smart contract 1320 (contract address 2)) executes 1945, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract executes, via the blockchain network 1807, a seventh call request to the fourth contract address (STORE smart contract 1330 (contract address 4)) to set a new balance for the digital asset tokens in the first designated public address to a seventh amount which equals the sixth amount less the fifth amount. As shown in FIG. 19D, the IMPL smart contract 1320 verifies that user 1 has a sufficient balance. The user balance in this example is 3000. The transfer request is for 1000. Thus, user 1 has a sufficient balance to transfer. Once verified, the IMPL smart contract 1320 sets the user 1 balance at 2000 (the original user balance 3000 less the transfer request amount 1000).

In response to the seventh call, the fourth smart contract (STORE smart contract 1330) executes 1947, via the blockchain 1807, the seventh call to set and store the new balance for the first designated public address as the seventh amount and returns the new balance for the first designated public address as the seventh amount. As shown in FIG. 19D, the store smart contract sets the user 1 balance as the seventh amount (2000).

In response to the return of the new balance, the fifth smart contract (IMPL smart contract 1320) executes 1949, via the blockchain 1807, an eighth call to add the second amount of digital asset tokens to the balance associated with the second designated public address (User X public address 1827X) at a seventh amount which includes the addition of the second amount to a previous balance associated with the second designated public address. As shown in FIG. 19D, the IMPL smart contract 1320 calls the store smart contract to add the transfer amount (1000) to the balance associated with the second user address.

In response to receiving the either call, the store smart contract executes the eighth call and sets the balance associated with the second user to the balance before the transfer and the transfer amount 1951.

In embodiments, the STORE smart contract 1330 returns to the IMPL smart contract 1320. In response to the return, the IMPL smart contract 1320 may log the new balance associated with the second user 1953. In embodiments, the IMPL smart contract 1320 may then return to the proxy smart contract 1310.

In embodiments, once the transfer has been completed, the first user device (user 1 device 1805) may confirm that the balance of digital asset tokens in the first designated public address is the sixth amount of digital asset tokens based on reference to the blockchain 1807. Similarly, the second user device (user X device 1805X) may also confirm that the balance of digital asset tokens in the second designated public address is the seventh amount of digital asset tokens based on reference to the blockchain 1807.

Example

User 1 Transfers 1,000 Cents to User 2

```
Tx 1.
TO = address of Proxy
DATA = 'transfer(address of User 2, 1,000)'
Tx signed by User 1 private key, therefore FROM = address of User 1 public key
Execution immediately jumps to Impl.
CALL '(address of Impl.).transferWithSender(address of User 1, address of User 2, 1,000)'
Execution continues in Impl. in function 'transferWithSender'.
This function validates that it was called by the sender it trusts, so it checks that sender is address
of Proxy.
Next,
CALL '(address of Store).balances(address of User 1)' (Execution continues in Store, in function
'balances', which returns the balance associated with the address of User 1)
Execution returns and continues in Impl where the retrieved balance value is compared to 1,000
to check that User 1 has at least 1,000 tokens.
let new balance of User 1 = balance of User 1 – 1,000
Next,
CALL '(address of Store).setBalance(address of User 1, new balance of User 1)'
Execution continues in Store in function 'setBalance'. (function checks that it was called by the
sender it trusts, the active Impl.)
STORE balance of User 1 = new balance of User 1
Execution returns to Impl.
Next,
CALL '(address of Store).addBalance(address of User 2, 1,000)'
Execution continues in Store in function 'addBalance'. (function checks that it was called by the
sender it trusts...)
STORE balance of User 2 = balance of User 2 + 1,000
Execution returns to Impl. (some logging occurs, but let's skip over this)
Execution returns to Proxy and terminates.
```

Figure 19E:
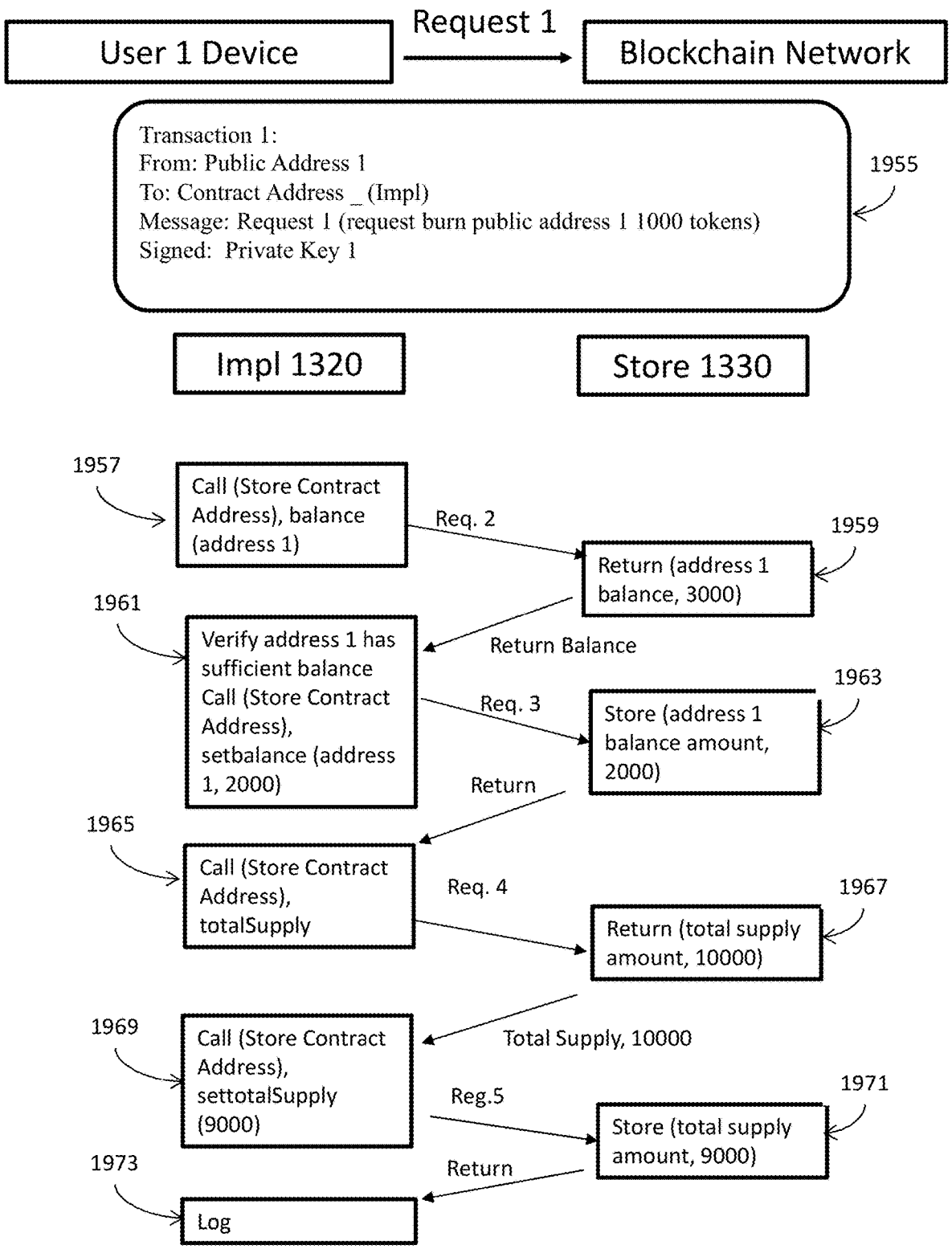
FIG. 19E is a schematic drawing of an exemplary process of a burn request in accordance with exemplary embodiments of the present invention.

In embodiments, the process of FIGS. 21A-B may further include the process described in connection with FIG. 19E. In embodiments, the process may begin with providing a third designated key pair. The third designated key pair, in embodiments, may include a third designated public key of the underlying digital asset and a corresponding third designated private key. The third designated private key may be stored on a third computer system which is connected to the distributed public transaction ledger through the internet (network 15). In embodiments, the third designated key pair may be the first designated key pair. In embodiments, the third designated key pair may be the second designated key pair. In embodiments, the third computer system may be the first computer system. In embodiments, the third computer system is not the first computer system. In embodiments, the administrator system 1801 includes the first computer system and the third computer system.

The blockchain 1807 may receive a second transaction request 1955 by the blockchain 1807 from the third computer system (i.e. user device 1). The second transaction request may include a second message including a second request to burn a fifth amount of digital asset tokens from a balance associated with the third designated public key address. The second transaction request may be sent from the third designated public key address to the fifth contract address (IMPL smart contract 1320 (contract address 2)). The second transaction request, in embodiments, is digitally signed by a third designated private key.

In response to receiving the second transaction request, the fifth smart contract (IMPL smart contract 1320) executes 1957, via the blockchain 1807, the second transaction request to execute, via the blockchain 1807, a sixth call request to the fourth contract address (STORE smart contract 1330 (contract address 4)) to obtain a sixth amount of digital asset tokens which reflect a current balance of digital asset tokens associated with the third designated public key address. As shown in FIG. 19E, the IMPL smart contract 1320 calls the store contract address 1815 to request a balance of digital asset tokens associated with the third designated public address (address 1).

In response to the sixth call request, the fourth smart contract (STORE smart contract 1330), executes 1959 via the blockchain 1807, the seventh call request to return the sixth amount of digital asset tokens. As shown in FIG. 19E, the STORE smart contract 1330 determines that the balance associated with the third designated public address is 3000. The STORE smart contract 1330 returns the amount (3000) to the IMPL smart contract 1320.

In response to the return of the sixth amount of digital asset, the fifth smart contract (IMPL smart contract 1320) executes 1961, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract (IMPL smart contract 1320) executes, via the blockchain 1807, a seventh call request to the fourth contract address (STORE smart contract 1330 (contract address 4)) to set a new balance for the digital asset tokens in the third designated public key address to a seventh amount which equals the sixth amount less the fifth amount. As shown in FIG. 19E, the IMPL smart contract 1320 verifies that the third designated public address (address 1) has as sufficient balance because 1000 is less than the current balance of 3000. The IMPL smart contract 1320 then executes a call to set the balance of associated with the third designated public address (address 1) to 2000 (3000 less 1000 equals 2000).

In response to the seventh call, the fourth smart contract (STORE smart contract 1330) executes 1963, via the blockchain 1807, the seventh call to set and store the new balance for the third designated public key address as the seventh amount and returns the new balance for the third designated public key address as the seventh amount. As shown in FIG. 19E, the STORE smart contract 1330 stores the new balance as 2000 and returns to the IMPL smart contract 1320.

In response to the return of the new balance, the fifth smart contract (IMPL smart contract 1320) executes 1965, via the blockchain 1807, an eighth call request to the fourth contract address (STORE smart contract 1330 (contract address 4)) to obtain a total supply of digital asset tokens in circulation. As shown in FIG. 19E, the IMPL smart contract 1320 calls the STORE smart contract 1330, requesting a total supply of digital asset tokens.

In response to the eighth call request, the fourth smart contract (STORE smart contract 1330) executes 1967, via the blockchain 1807 the eight call request and returns, to the fifth contract address (IMPL smart contract 1320 (contract address 2)), an eighth amount of digital asset tokens corresponding to the total supply of digital asset tokens in circulation. As shown in FIG. 19E, the STORE smart contract 1330 determines that the total supply of tokens is 10,000 and returns that value to the IMPL smart contract 1320.

In response to the return of the eighth amount, the fifth smart contract (IMPL smart contract 1320) executes 1969, via the blockchain, a ninth call request to the fourth contract address (STORE smart contract 1330 (contract address 4)) to set a new total supply of digital asset tokens in circulation to a ninth amount, which is the eighth amount less the fifth amount. As shown in FIG. 19E, the IMPL smart contract 1320 calls the STORE smart contract 1330 to set the total supply of the digital asset tokens to 9,000 (10,000 less 1,000).

In response to the ninth call request, the fourth smart contract (STORE smart contract 1330) executes 1971, via the blockchain 1807, the ninth call request and sets a new total supply of digital asset tokens in circulation at the ninth amount and returns to the fifth contract address (IMPL smart contract 1320 (contract address 2)). In embodiments, the token balance modification instructions module 1847 balances the deposits and withdrawals at a predetermined time (i.e. end of the day or close of business).

In response to receiving a return from the STORE smart contract 1330, the IMPL smart contract 1320 logs 1973 the new total supply of digital asset tokens in circulation.

Example

Reduce the Token Supply by 1,000,000 Cents

Tx 1.
TO = address of Impl.
DATA = 'burn(1,000,000)'
(Tx is signed by the key of the address that is going to sacrifice some of its balance.)
let address of sender = address of key that signed Tx 1.

-continued

```
Execution immediately jumps to Store
CALL '(address of Store).balances(address of sender)' (Execution continues in Store, in function
'balances', which returns the balance associated with the sender)
Execution returns and continues in Impl where the retrieved balance value is compared to the
burn amount of 1,000,000 to check that the sender has at least 1,000,000 tokens.
let new balance of sender = balance of sender – 1,000,000
Next,
CALL '(address of Store).setBalance(address of sender, new balance of sender)'
Execution continues in Store in function 'setBalance'. (function checks that it was called by the
sender it trusts, the active Impl.)
STORE balance of sender = new balance of sender
Execution returns to Impl.
Next,
Call '(address of Store).totalSupply( )' (Execution continues in Store, in function
'totalSupply', which returns with the value of the total supply)
let new supply = current supply + 1,000,000
Next,
CALL '(address of Store).setTotalSupply(new supply)'
Execution continues in Store in function 'setTotalSupply'.
STORE total supply = new supply
Execution returns to Impl. (some logging occurs, but let's skip over this) And execution
terminates.
```

Example

Change the Impl that Proxy Delegates to

```
Tx 1.
TO = address of Proxy
DATA = 'requestImplChange( address of Impl_V2)'
(Tx would be signed by Adminstrator's 'primary' key, although there are
no restrictions on who can call this function.)
Execution produces a unique lock identifier, say 'lockId3'.
```

```
Tx 2.
TO = address of (Upgrade)Custodian (instance of the Custodian contract, with cryo tier keys,
intended to be the offline custodian of upgrade operations)
DATA = 'requestUnlock(lockId3, address of Proxy, selector for function confirmImplChange,
...and a detail I'm going to omit...)'
(Tx would be signed by Adminstrator's 'primary' key, although there are no restrictions on who
can call this function. If it's a not the primary key there is an anti-spam mechanism.)
Execution produces a unique request hash, say 'reqMsgHash2'.
2 of the offline keys set up with (Upgrade)Custodian sign 'reqMsgHash2'; we'll name the
signatures 'sig2_a' and 'sig2_b'.
Tx 3.
TO = address of (Upgrade)Custodian
DATA = 'completeUnlock(requestMsgHash2, sig2_a, sig2_b)'
(Tx would be signed by Adminstrator's 'primary' key, although there are no restrictions on who
can call this function.)
Execution validates the signatures (and enforces other details around time locks and revocation).
Next, it executes a call to Proxy and its confirmImplChange (NOTE that those two detailed were
fixed in Tx2 as parameters to the call to requestUnlock).
CALL '(address of Proxy).confirmImplChange(lockId3)'
Execution continues in PrintLimiter in the function 'confirmImplChange'.
Storage for the active implementation address is updated:
STORE impl = address of Impl_V2
(some logging occurs, but let's skip over this)
Execution returns to (Upgrade)Custodian
(some logging occurs, but let's skip over this)
Execution terminates.
```

FIG. 19C is a schematic drawing of an exemplary process of limiting the print limiter with respect to a public address in accordance with exemplary embodiments of the present invention. The process at FIG. 19C may begin with a first transaction request 1917 by an administrator system 1801 to blockchain 1807. The first transaction request may be from on-line key public address 1825 to PRINT LIMITER smart contract 1360 (contract address 3). In embodiments, the first transaction request may include a message requesting the limited print of 10 million digital asset tokens to user 1 public address 1827.

In response to receiving the first transaction request, the PRINT LIMITER smart contract 1360 executes 1919 a first call request, via the blockchain 1807, to the impl smart contract address 1811 to print 10 million digital asset tokens to user 1 public address 1827. In response to receiving the first call request, the impl returns a lockID 1921 to the print limiter smart contract address 1813.

In response to receiving the lockID, the print limiter smart contract executes 1923 a second call request, via the blockchain 1807, to the impl smart contract address 1811 to confirm the print of 10 million digital asset tokens using the lockID.

In response to receiving the second call, the IMPL smart contract 1320 retrieves the pending request to print 10 million digital asset tokens and executes 1925, via the blockchain 1807, a third call request to the store smart contract address 1815 to determine the total supply of digital asset tokens.

In response to receiving the third call, the STORE smart contract 1330 determines 1927 the total supply of digital asset tokens to be 100 million digital asset tokens. The total supply amount determined by the STORE smart contract 1330 is then returned by the STORE smart contract 1330 to the impl smart contract address 1811.

In response to receiving the return from the store smart contract address 1815, the impl smart contract address executes 1929, via the blockchain, a fourth call request to set the total supply of digital asset tokens to 110 million, the original total supply 100 million plus the requested print amount of 10 million. The fourth call request may be sent to the store smart contract address 1815.

In response to receiving the fourth call request, the STORE smart contract 1330 sets 1931 the total supply of digital asset tokens to 110 million digital asset tokens and returns to the impl smart contract address 1811.

In response to receiving the return from the store smart contract address 1815, the impl smart contract may execute 1933 a fifth call to add the newly printed 10 million digital asset tokens to user 1 public address 1827. The call may be sent to the store smart contract address 1815.

In response to receiving the fifth call to add the 10 million digital asset tokens to user 1 public address 1827, the STORE smart contract 1330 may store 1935 a new balance associated with the user 1 public address 1827, the new balance being the original balance plus the 10 million digital asset tokens. The STORE smart contract 1330 may then return to the impl smart contract address 1811. In response to receiving the return from the STORE smart contract 1330, the impl smart contract may return to the print limiter smart contract public address 1813.

In embodiments, the steps of FIGS. 19A through 19E may be rearranged and/or omitted. In embodiments, any of the smart contracts may be provided at any of the contract addresses, for example, the fourth contract address may correspond to the IMPL smart contract while fifth contract address may correspond to the STORE smart contract. In embodiments, one or more smart contract may be combined with one of more other smart contract.

Blockchain Based Financial Instrument

In embodiments, a digital asset in the form of a token ("Security Token") may be issued to represent inventory, equity interests in a venture, real estate, rights in intellectual property such music, videos, pictures, to name a few. When used as a security, appropriate filings with a regulatory authority may be necessary to comply with local law. In the case of a security, investors may exchange fiat or other digital assets (such as bitcoin or ether, to name a few) in exchange for Security Tokens. Typically, Security Tokens may issue using a smart contract written on another digital asset (such as ether or bitcoin, to name a few), and tracked in a separate database stored in a distributed peer to peer network in the form of a blockchain. In an example, the blockchain is the Ethereum Blockchain and includes all Security Tokens, the respective address associated therewith, wherein maintenance of the blockchain is controlled by contract instructions stored in the form of a smart contract at the Contract Address. In embodiments, the Secure Token database maintained on the blockchain may be viewed via etherscan.io. In embodiments, the Security Token ledger may be maintained as a sidechain in a separate database off chain and published periodically or aperiodically to the blockchain. Each Security Token may also be associated with a specific digital asset address on the network associated with the underlying digital asset (e.g., the Ethereum Network when ether is the underlying digital asset, or the Bitcoin Network, when bitcoin is the digital asset, to name a few). Generally, the same blockchain will be used for the SVCoin and the Security Token.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset. A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoin, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7NmH4Zx6rewF9WQrcZv245 W. The matching private key may be stored in a digital wallet or mobile device and protected by a password or other techniques and/or devices for providing authentication.

In embodiments, other cryptographic algorithms may be used such as:
  (1) The elliptic curve Diffie-Hellman (ECDH) key agreement scheme;
  (2) The Elliptic Curve Integrated Encryption Scheme (ECIES), also known as Elliptic Curve Augmented Encryption Scheme or simply the Elliptic Curve Encryption Scheme;
  (3) The Elliptic Curve Digital Signature Algorithm (ECDSA) which is based on the Digital Signature Algorithm;
  (4) The deformation scheme using Harrison's p-adic Manhattan metric;
  (5) The Edwards-curve Digital Signature Algorithm (EdDSA) which is based on Schnorr signature and uses twisted Edwards curves;
  (6) The ECMQV key agreement scheme which is based on the MQV key agreement scheme; and
  (7) The ECQV implicit certificate scheme.

In other digital asset networks, other nomenclature mechanisms may be used, such as a human-readable string of numbers and letters around 34 characters in length, beginning with the letter L for Litecoin or M or N for Namecoin or around 44 characters in length, beginning with the letter P for PPCoin, to name a few.

Private Keys

A private key in the context of a digital math-based asset, such as bitcoin, may be a sequence such as a number that allows the digital math-based asset, e.g., bitcoin, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse. In the event that a transaction is sent to a Bitcoin public address and signed by a private key that does not match, such transaction will not be processed by the Bitcoin blockchain.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoin, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:
  E9 87 3D 79 C6 D8 7D C0 FB 6A 57 78 63 33 89 F4 45 32 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:
  5Kb8kLf9zgWQnogidDA76MzPL6TsZZY36hWXMss-SzNydYXYB9KF In embodiments, private keys associated with compressed public keys may be 52 characters and start with a capital L or K.

In embodiments, when a private key is imported, each private key may always correspond to exactly one Bitcoin public address. In embodiments, a utility that performs the conversion can display the matching Bitcoin public address.

The Bitcoin public address corresponding to the sample above is:
  1CC3X2gu58d6wXUWMffpuzN9JAfTUWu4Kj In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoin. The above example has a mini key, which is:
  SzavMBLoXU6kDrqtUVmffv In embodiments, any bitcoin sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoin presently at the address, as well as any bitcoin that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital cryptocurrency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoin). Alternatively, or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

Figure 3:
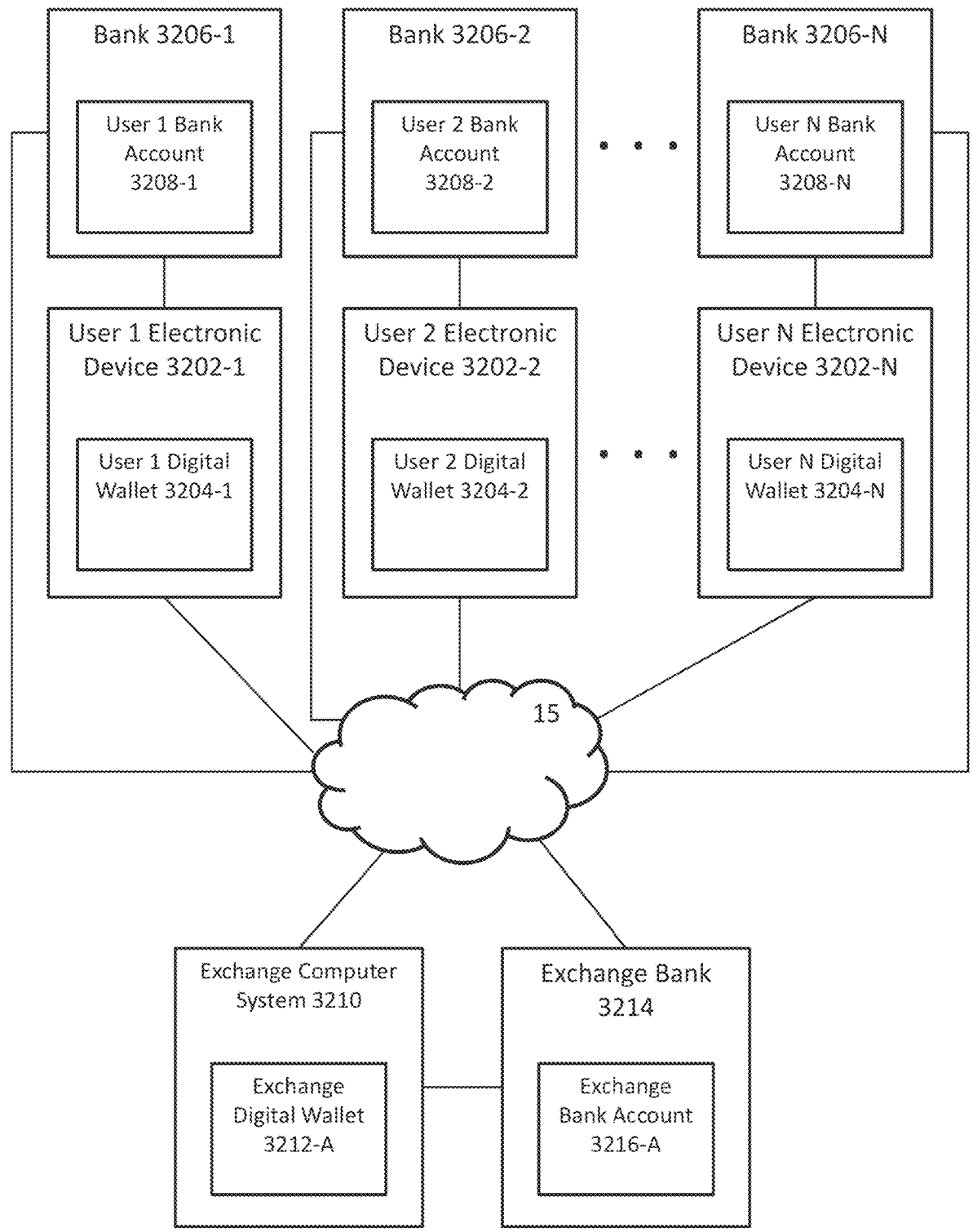
FIG. 3 is an exemplary exchange agent interface in accordance with exemplary embodiments of the present invention.

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoin) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as Bitcoin and Ether in exchange for fiat such as U.S. dollars or other digital assets, such as Ether and Bitcoin, respectively. A Bitcoin exchange agent 135 can be a service that acts as an agent for exchanges, accelerating the buying and selling of bitcoin as well as the transfer of funds to be used in the buying and/or selling of bitcoin. Coinbase is an example of a company that performs the role of a Bitcoin exchange agent 135. Coinbase engages in the retail sale of bitcoin, which it obtains, at least in part, from one or more exchanges. FIG. 3 illustrates an exemplary Coinbase website interface for buying bitcoin. Other Coinbase options include "Sell Bitcoin," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in bitcoin; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Digital Asset Exchange

In embodiments, one form of trusted entity that may be an issuer of SVCoin or an agent of the issuer is a digital asset exchange or bank. In embodiments, the trusted entity may maintain an SVCoin database on a blockchain. In embodiments, the trusted entity may maintain the SVCoin database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the SVCoin may be a digital asset exchange, a bank, a trust, or other trusted entity. In the context where a digital asset exchange may act as an issuer for SVCoin, or as an agent of the issuer, a digital asset exchange computer system may maintain a ledger as one or more databases associated with the SVCoin. Such a database may include an electronic log of all transactions, including the source wallet, the destination wallet, the timestamp of the transaction, the amount of the transaction (e.g., the number of SVCoin), and/or the balance in each wallet before and/or after the transaction. In embodiments, the database may include a list of wallet addresses and balances in each wallet of the SV Coin. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

FIG. 3 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., USD, Euro, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., USD, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to a buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 4A:
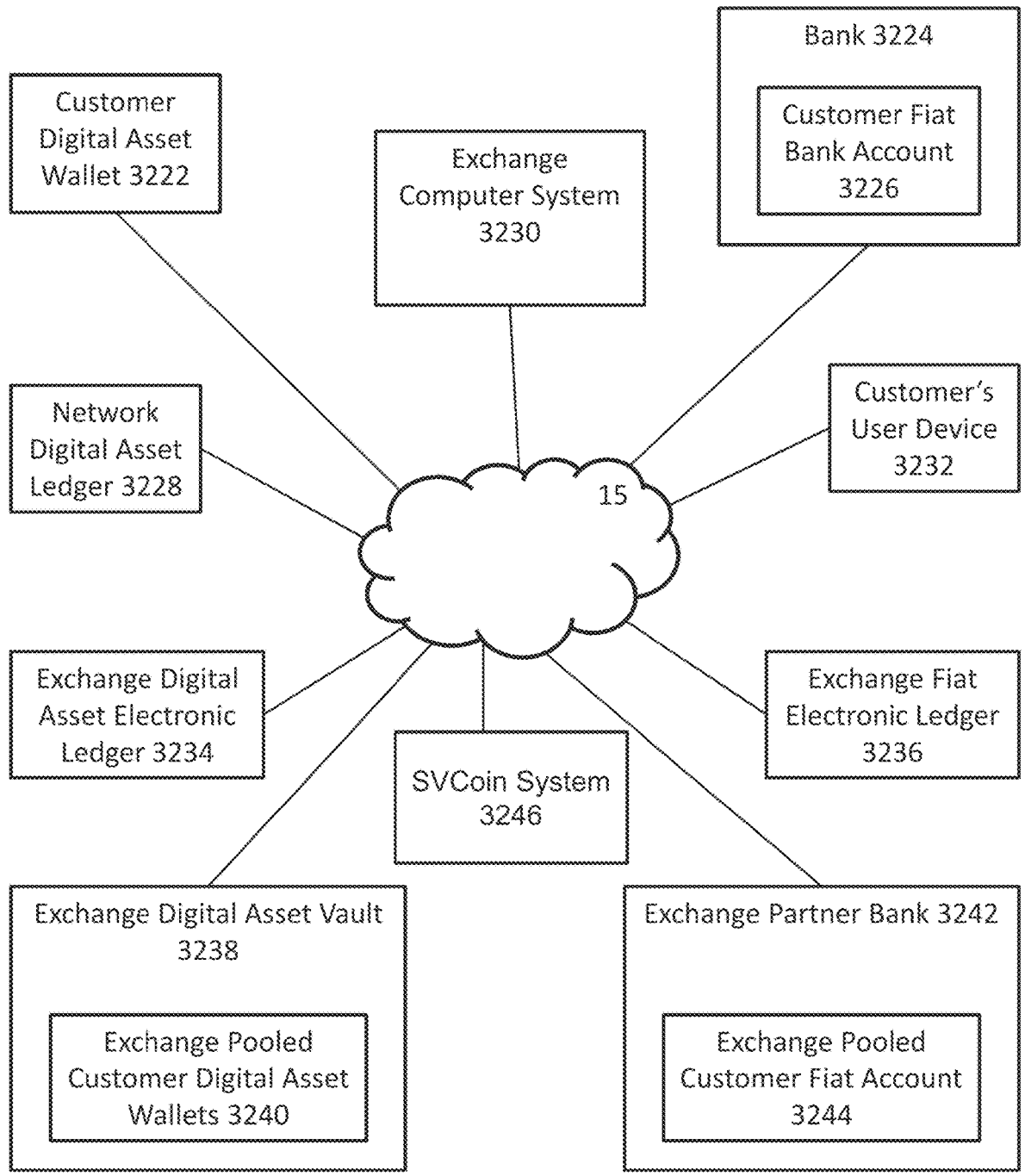
FIGS. 4A-4B are exemplary schematic diagrams illustrating participants in a digital asset exchange in accordance with exemplary embodiments of the present invention.
Figure 4B:
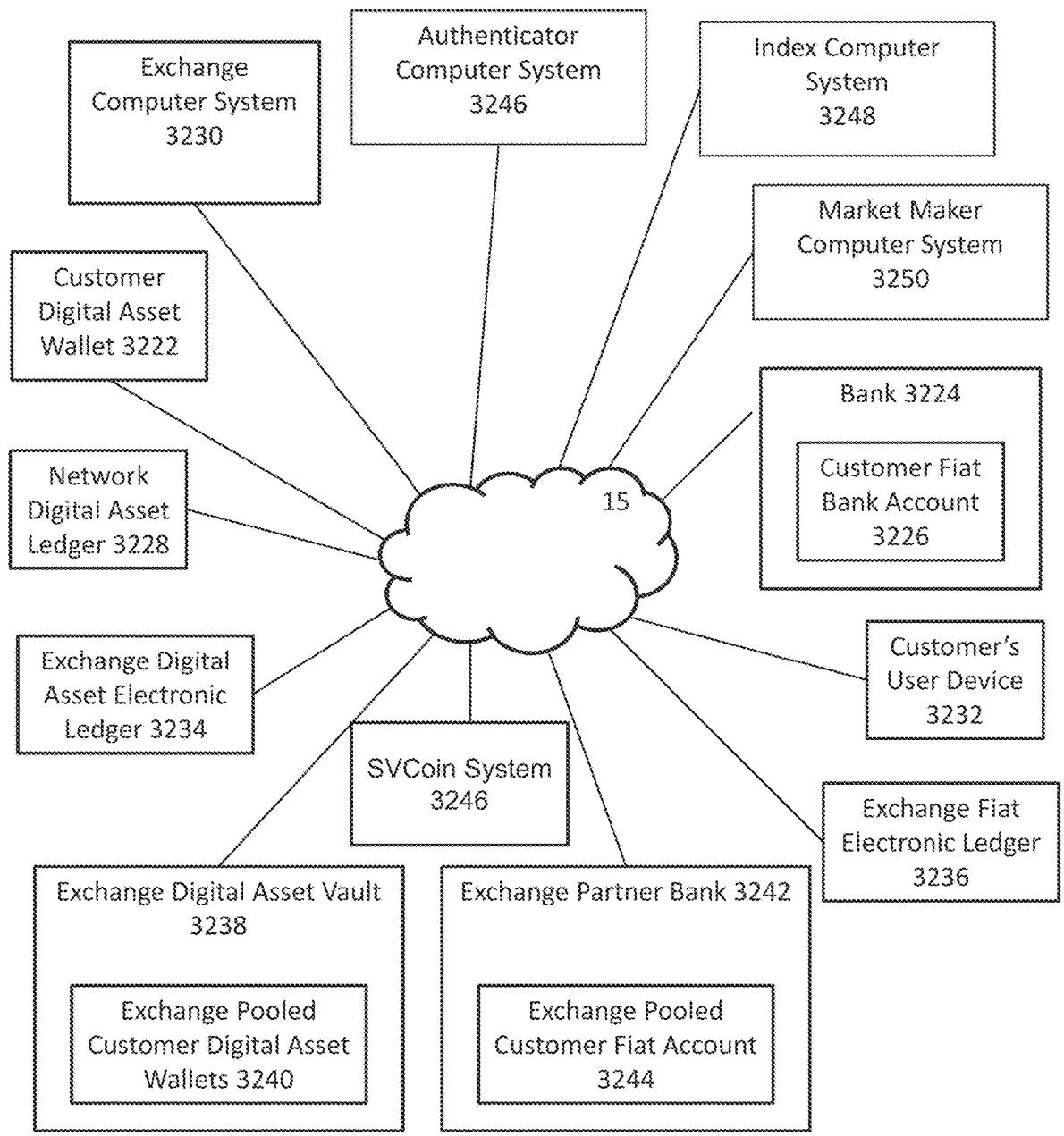

FIG. 4A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets, ether wallets, to name a few), customer bank(s) 3224 having a customer fiat bank account(s) 3226, a digital asset network ledger 3228 (e.g., the Bitcoin blockchain, the Ethereum blockchain, to name a few), a digital asset network (e.g., the Bitcoin Network, the Ethereum Network, to name a few), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection. In embodiments, the exchange may have a SVCoin system 3246. Such a system may allow users to purchase SVCoin tokens using fiat currency and/or digital assets and/or to redeem digital assets in the form of SVCoin tokens, and/or to redeem SVCoin tokens for fiat currency. SVCoin system 3246 may also be used to generate new SVCoin tokens, and cancel redeem SVCoin tokens. SVCoin system 3246 is operatively connected to an SVCoin database that maintains a log of SVCoin tokens. In embodiments, the SVCoin database may be maintained as part of the digital asset network (e.g., the Bitcoin Network, the Ethereum Network, to name a few).

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known.

Figure 22A:
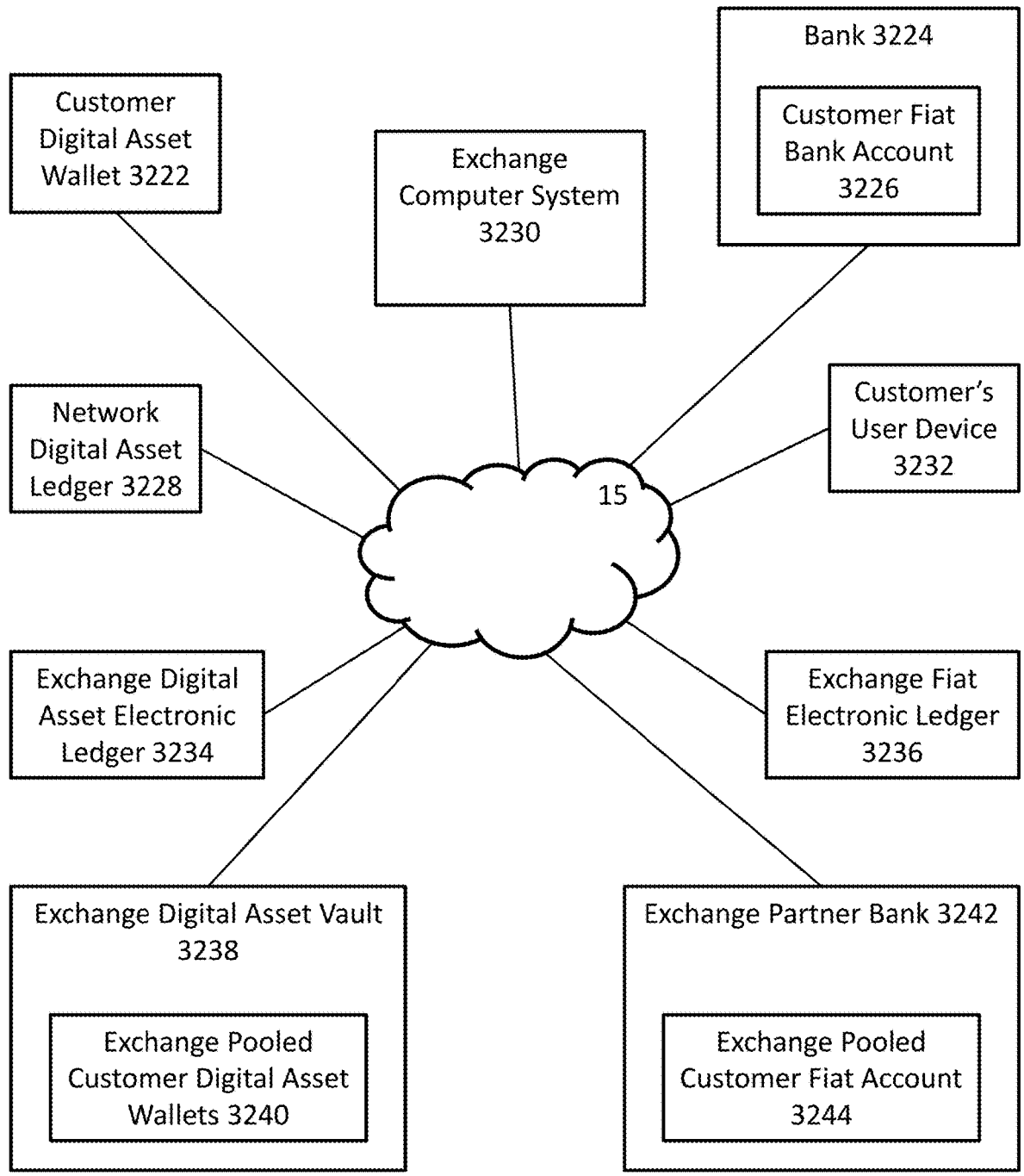
FIGS. 22A-22B are schematic diagrams illustrating participants in a digital asset exchange in accordance with exemplary embodiments of the present invention.

FIG. 22A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets, ether wallets, to name a few), customer bank(s) 3224 having customer fiat bank account(s) 3226, a digital asset network ledger 3228 (e.g., the Bitcoin blockchain, the Ethereum blockchain, to name a few), a digital asset network (e.g., the Bitcoin network), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 22B:
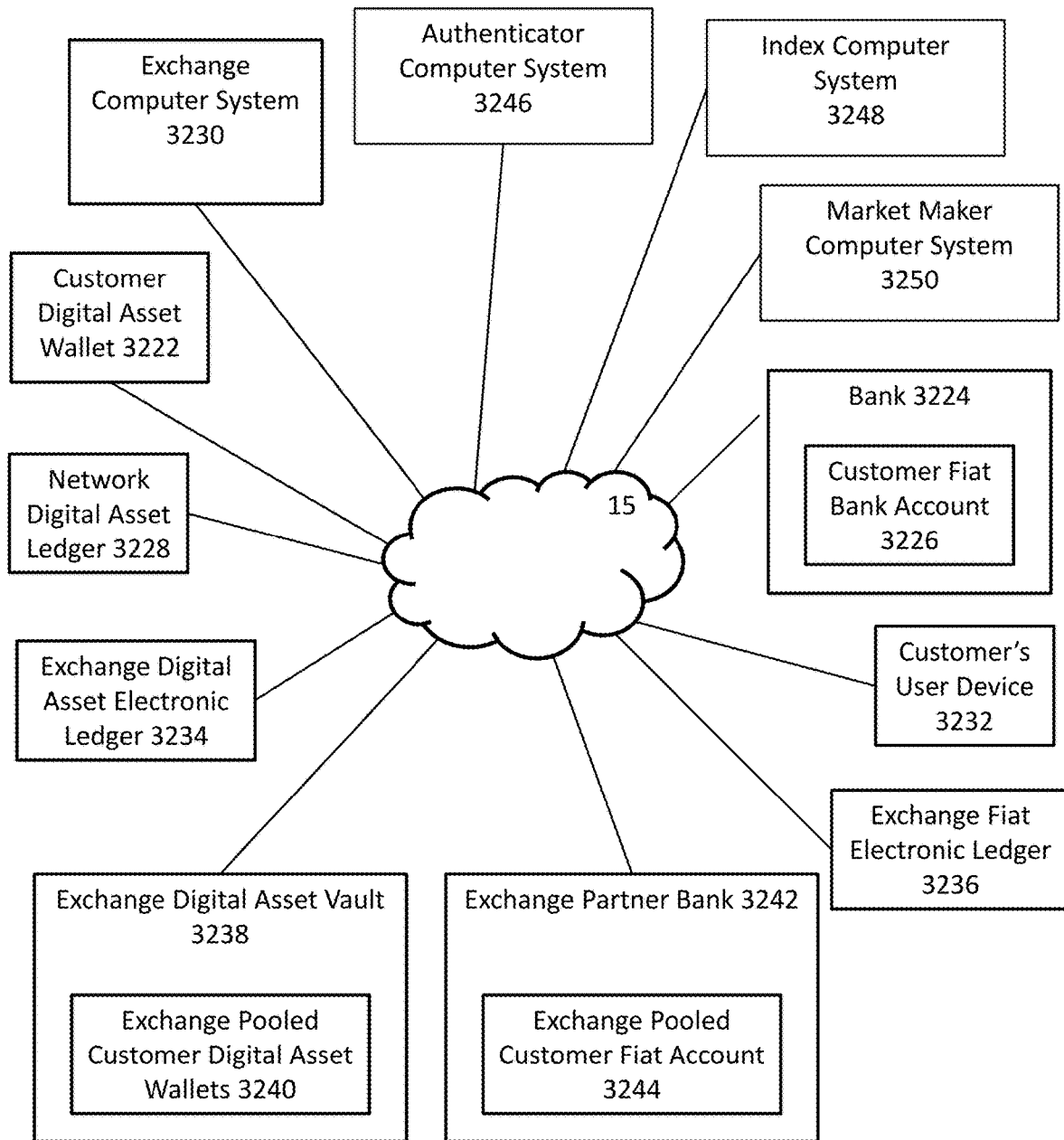

FIG. 22B shows another schematic diagram illustrating entities associated with a digital asset exchange in an exemplary embodiment of the present invention. In addition to the participants described with respect to FIG. 22A, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or fiat currency associated with a user account, a rate schedule associated with a particular account or account type (e.g., there could be different rates for institutional or foreign users), time of day, and/or whether the user is operating as a market maker or a market taker for a given transaction, to name a few.

Figure 5A:
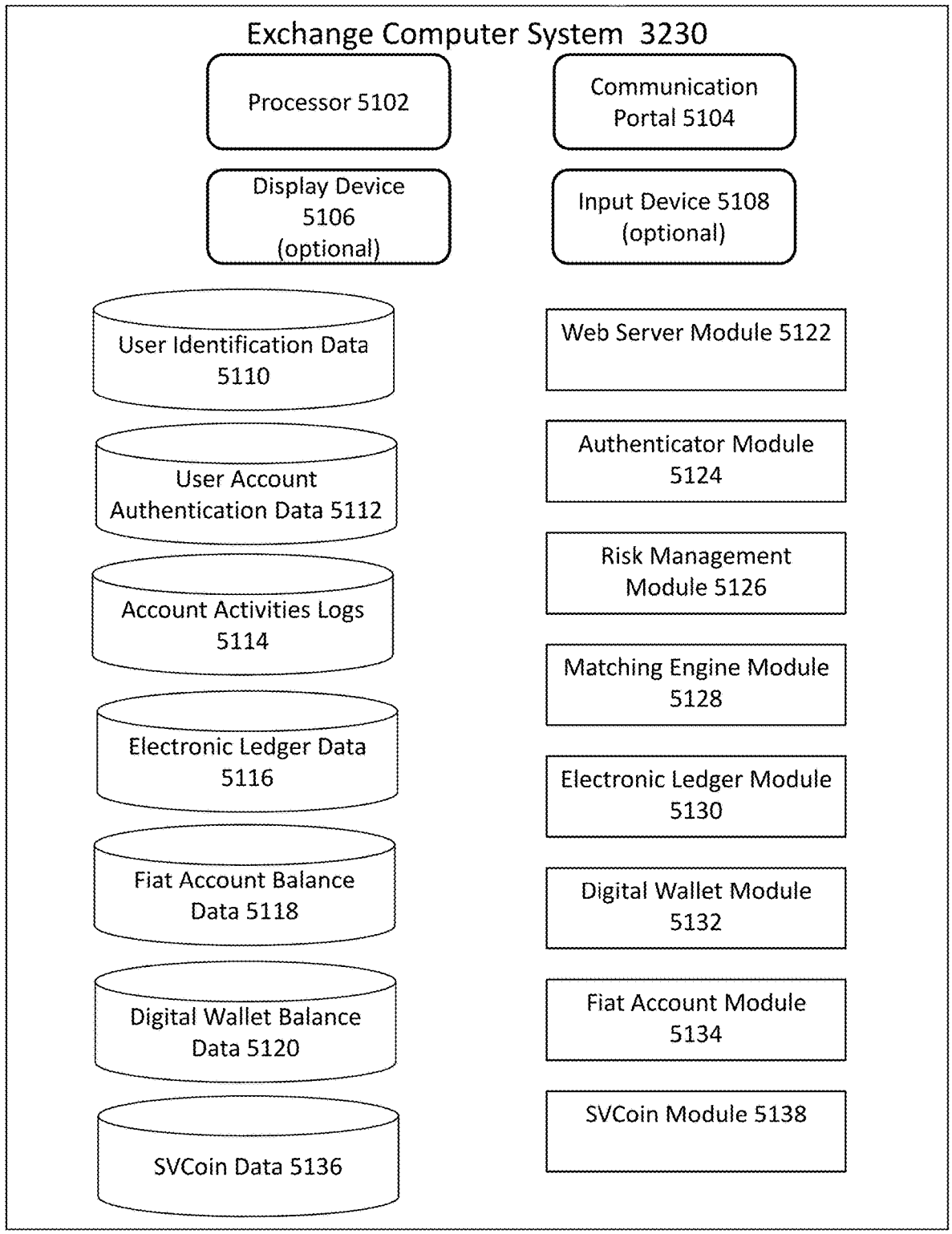
FIGS. 5A-5B are schematic diagrams of exemplary exchange computer systems in accordance with exemplary embodiments of the present invention.
Figure 5B:
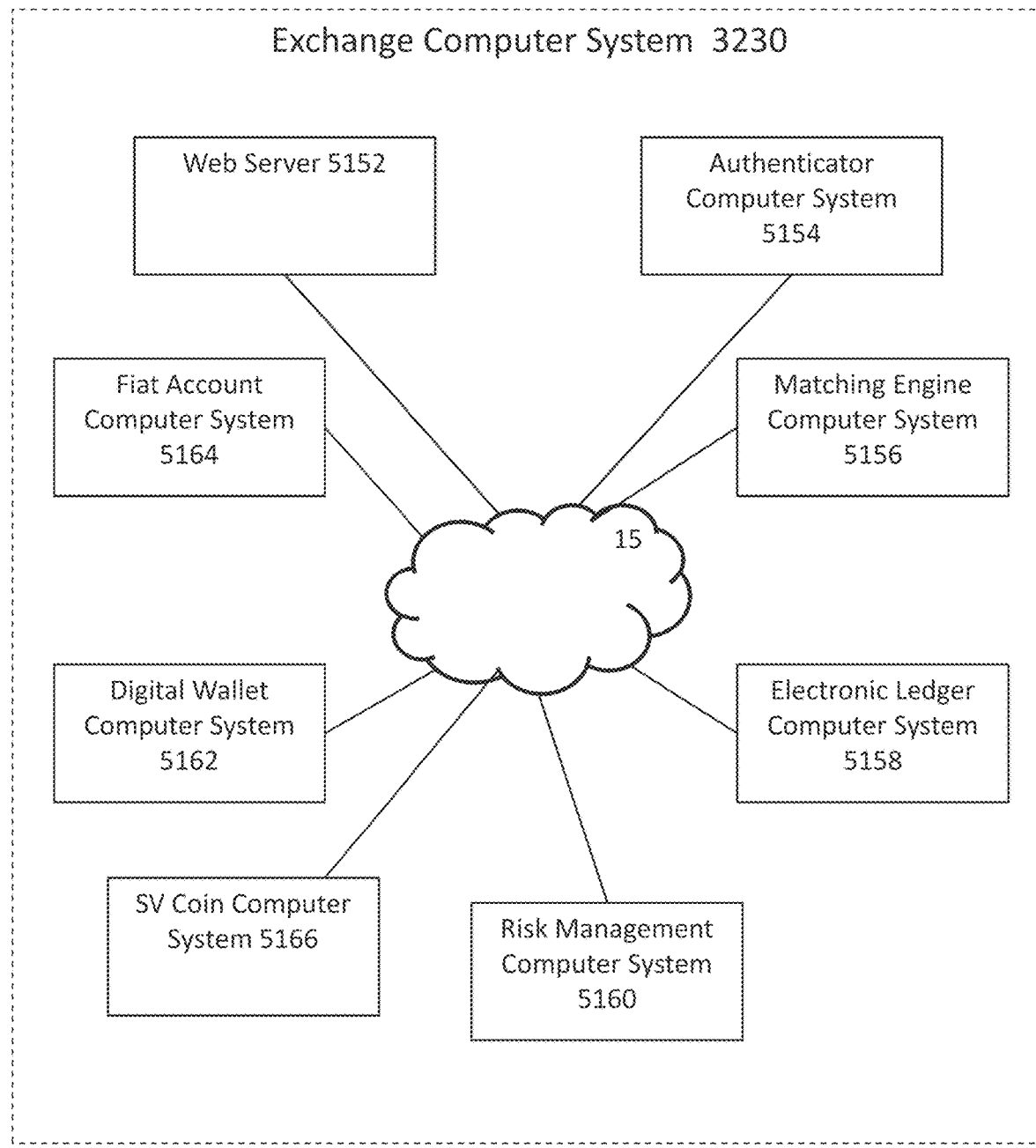

FIGS. 5A-B are schematic diagrams of exemplary exchange computer systems in accordance with exemplary embodiments of the present invention. FIG. 5A shows hardware, data, and software modules, which may run on one or more computers. FIG. 5B shows an exemplary distributed architecture for the exchange computer system.

As shown in FIG. 5A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, digital wallet balance data 5120, and/or SVCoin data 5136, to name a few. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, fiat account module 5134 and/or SVCoin module 5138, to name a few. The processes performed by such modules, the data produced thereby and/or the data accessed thereby are described herein.

A matching engine 5128 may apply a continuous order book price time priority matching algorithm. In embodiments, matching engine 5128 may apply option points at low and/or high frequencies. In embodiments, other matching engines may be included, such as a block trade matching engine (not shown), an auction matching engine (not shown), to name a few.

As shown in FIG. 5B an exchange computer system can include a web server 5152, an authenticator computer system 5154, a matching engine computer system 5156, an electronic ledger computer system 5158, a risk management computer system 5160, a digital wallet computer system 5162, a fiat account computer system 5164, and/or a SV Coin Computer System 5166. The exchange computer system 3230 may communicate with one or more external computer systems, such as bank computer systems, index computer systems, user computer system (e.g., institutional or individual users), and/or user electronic devices, to name a few. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination. In embodiments, other authentication processes may also be used.

An authenticator computer system 5154 may perform authentication of user login credentials, multi-factor authentication, and/or compare users against databases, such as government databases, for compliance with anti-money laundering laws and/or regulations, to name a few.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches, to name a few. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified. In such embodiments, SVCoin holders may be required to provide the identification information discussed above prior to purchasing SVCoins. Further, the SVCoin issuer will maintain a database including this information for each SVCoin holder. In embodiments, the fiat may be invested in federally insured interest bearing bank accounts, treasure bills, bonds (such as high quality bonds), CD's, money market mutual funds, repos or other financial instruments which offer a return and provide sufficient stability, to name a few.

A SVCoin computer system 5166 may manage purchases of SVCoin tokens using fiat currency and/or digital assets and/or redemption of digital assets in the form of SVCoin tokens, and/or redemption of SVCoin tokens for fiat currency. SVCoin computer system 5166 may also generate new SVCoin tokens and cancel redeem SVCoin tokens. SVCoin computer system 5166 is operatively connected to an SVCoin database 5136 that maintains a log of SVCoin tokens. In embodiments, the SVCoin database 5136 is maintained by the use of smart contract code associated with a Contract Address on the digital asset blockchain though the digital asset network.

Figure 6:
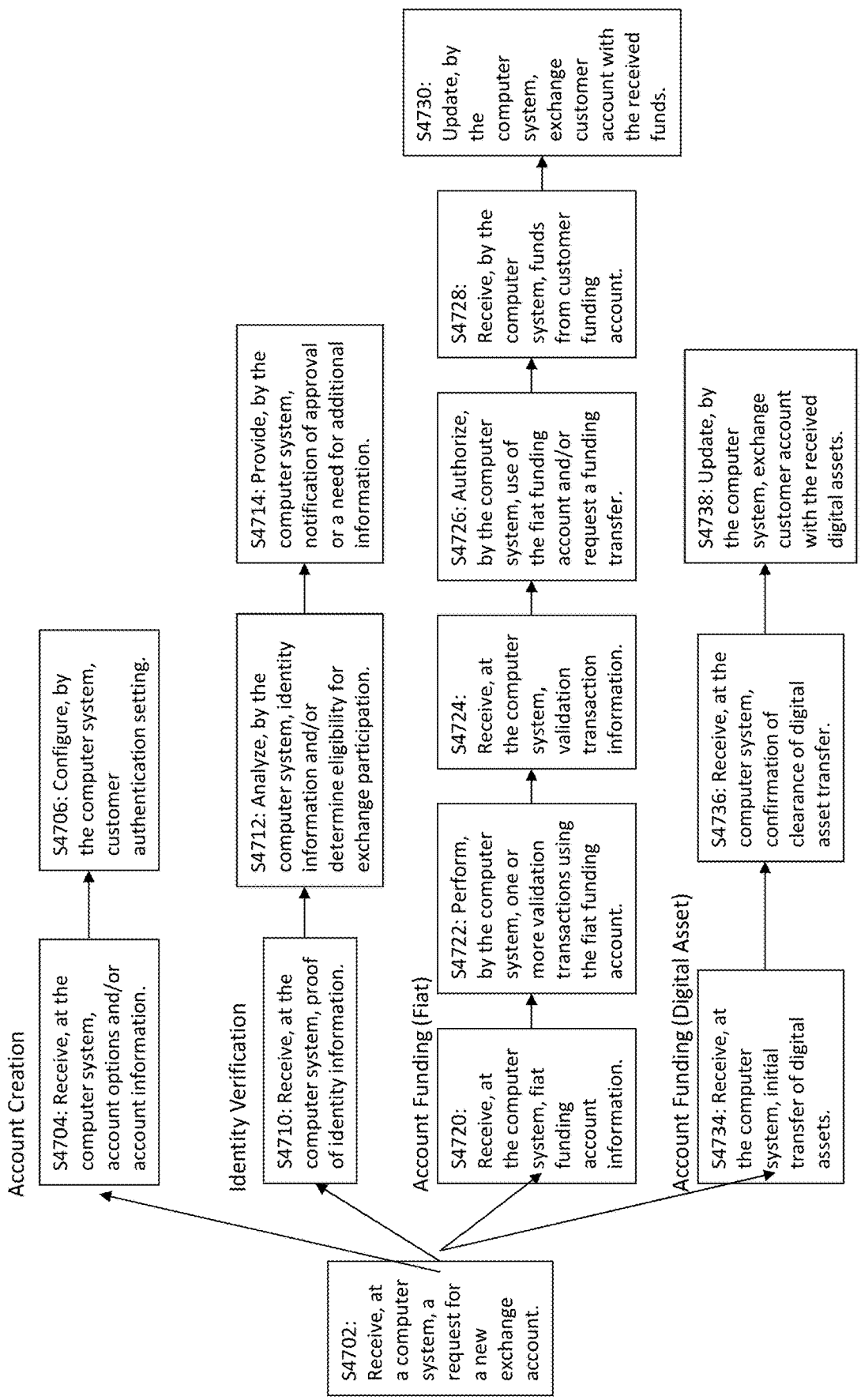
FIG. 6 is an exemplary flow chart for processes for digital asset exchange account creation and account funding in accordance with exemplary embodiments of the present invention.

Referring to the fiat account funding process shown in FIG. 6, In step S4720 the exchange computer system may receive fiat funding account information. Such information can include a bank account number (e.g., a routing number), a bank name, an account type, and/or an account holder's name, to name a few. In step S4722, the exchange computer system may perform one or more validation transactions using the fiat funding account. Such transactions may comprise small deposits into the fiat funding account. In step S4724, the exchange computer system may receive validation transaction information, which may include a transaction amount, date, and/or time. In step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange or an application programming interface (API), to name a few, to transfer funds to the exchange. In step S4728, the exchange computer system may receive an electronic notification indicating that funds were received, e.g., in an exchange bank account at a partner bank, from the customer fiat funding account. In step S4730, the exchange computer system can update an exchange customer account with the received funds. Updating an exchange customer account can comprise electronically updating a fiat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 6, In step S4734, the exchange computer system can receive an initial transfer of digital assets. In step S4736, the exchange computer system can receive a confirmation of clearance of the digital asset transfer. In step S4738, the exchange computer system can update an exchange customer account with the received digital assets. Updating an exchange customer account can include making an electronic entry in an exchange digital asset electronic ledger and/or providing a notification that the digital assets are received.

Figure 7A:
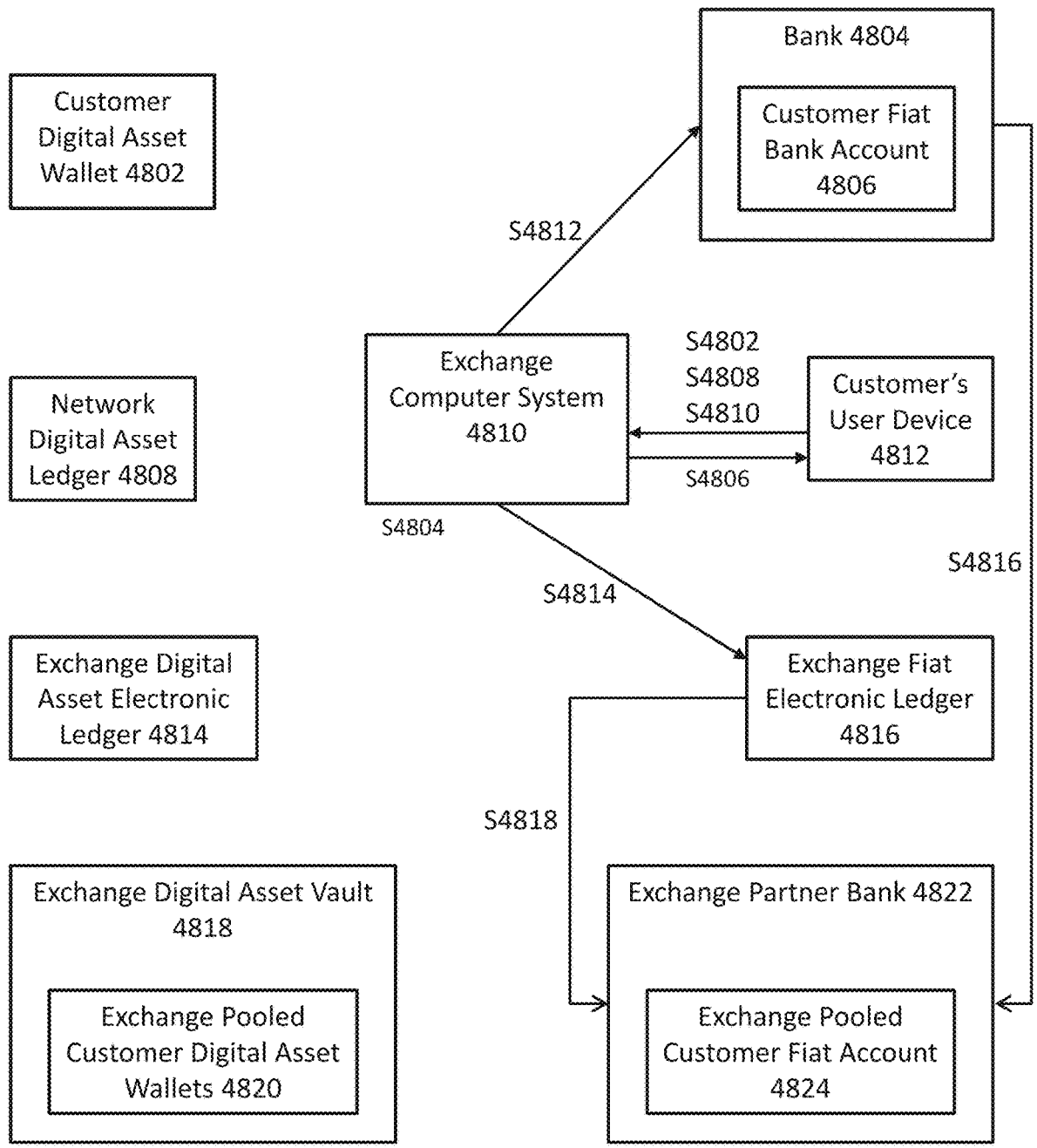
FIGS. 7A-7B are an exemplary schematic diagram and a corresponding flow chart of a process for digital asset exchange customer account fiat funding via an exchange-initiated request in accordance with exemplary embodiments of the present invention.
Figure 7B:
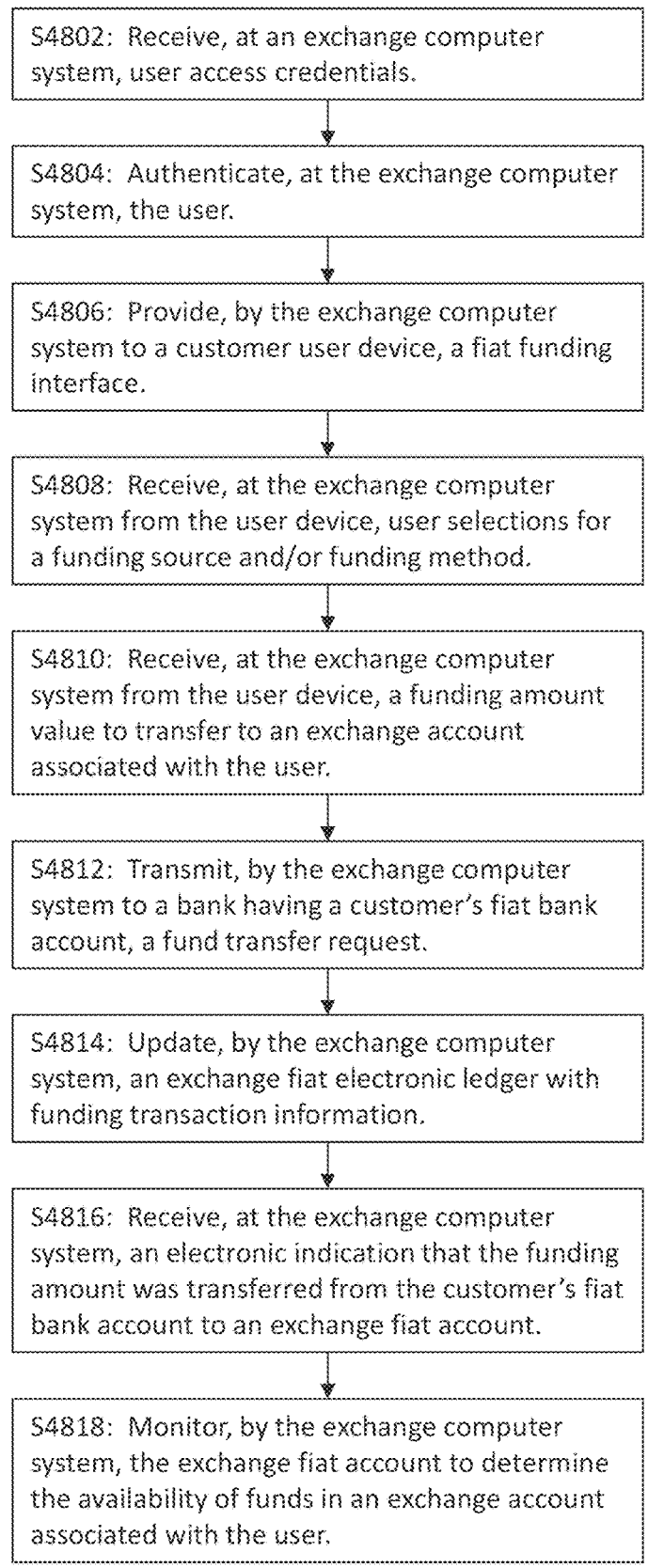

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 4A.

Referring to FIG. 7B, In step S4802 the exchange computer system can receive, e.g., from a user device, user access credentials. In step S4804, the exchange computer system can authenticate the user, such as by verifying the received access credentials. In step S4806, the exchange computer system may provide to a customer user device a fiat funding interface. In step S4808, the exchange computer system may receive from the user device user selections for a funding source and/or funding method. The funding source may identify a bank account or other fiat account. The funding method may identify ACH transfer or wire transfer, to name a few. In step S4810, the exchange computer system can receive from the user device a funding amount value to transfer to an exchange account associated with the user. In some embodiments, step S4808 and step S4810 may be a single step or may occur substantially simultaneously. Accordingly, the exchange computer system may receive from a user electronic device a user electronic request comprising a funding amount and a funding method. In embodiments, the funding method may be an ACH transfer and the request further identifies a verified user bank account.

In step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In step S4814, the exchange computer system can update an exchange fiat electronic ledger with the funding transaction information. In step S4816, the exchange computer system can receive an electronic indication that the funding amount was transferred from the customer's fiat bank account to an exchange fiat account, e.g., at a partner bank. In step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 7C:
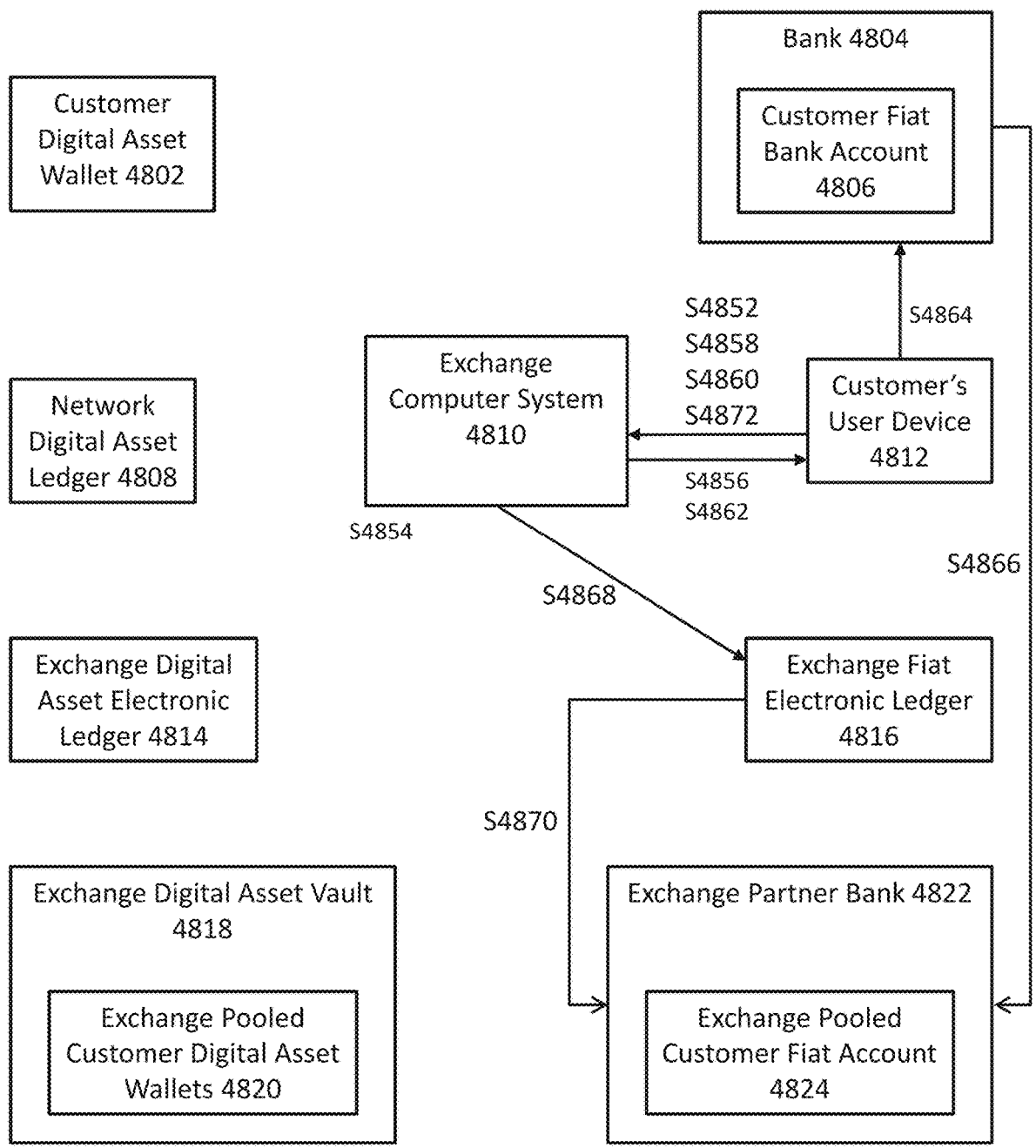
FIGS. 7C-7E are an exemplary schematic diagram and a corresponding flow chart of a process for digital asset exchange customer account fiat funding via a customer-initiated request in accordance with exemplary embodiments of the present invention.
Figure 7D:
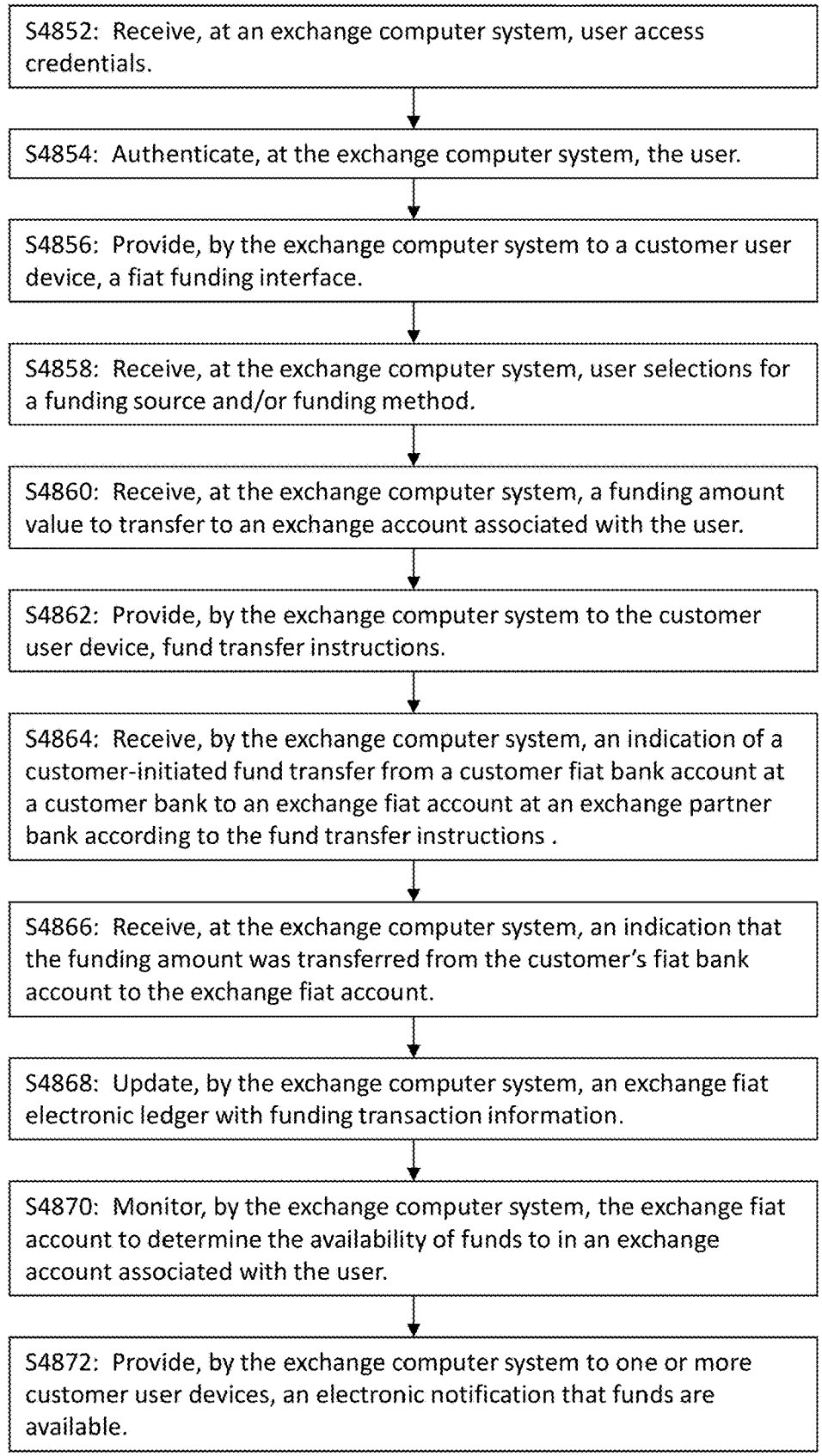

FIG. 7C is an exemplary schematic diagram of an exchange, and FIG. 7D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 7C may be similar to the components and entities associate with an exchange described above with respect to FIG. 4A, the description of which applying herein.

FIG. 7D is a flow chart showing an exemplary process for digital asset exchange customer account fiat funding. In step S4852, an exchange computer system can receive user access credentials. In step S4854, the exchange computer system can authenticate the user by verifying the received access credentials. Verifying the access credentials can comprise comparing the credentials to a secure credentials database. In step S4856, the exchange computer system can provide to a customer user device a fiat funding interface. In step S4858, the exchange computer system can receive from the customer user device, user selections for a funding source and/or funding method. The funding method may be a customer-initiated method, such as a wire transfer. In step S4860, the exchange computer system can receive a funding amount value to transfer to an exchange account associated with the user. In step S4862, the exchange computer system can provide to the customer user device fund transfer instruction, e.g., wire instructions. In step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In step S4866, the exchange computer system may receive an indication that the funding amount was transferred from the customer's fiat bank account to the exchange fiat account. In step S4868, the exchange computer system can update an exchange fiat electronic ledger with the funding transaction information, which may include an amount value, customer account ID, transaction date and/or time, to name a few. In step S4870, the exchange computer system can monitor the exchange fiat account to determine the availability of funds in an exchange account associated with the user. In step S4872, the exchange computer system can provide an electronic notification to one or more customer user devices that funds are available for use on the exchange.

Figure 7E:
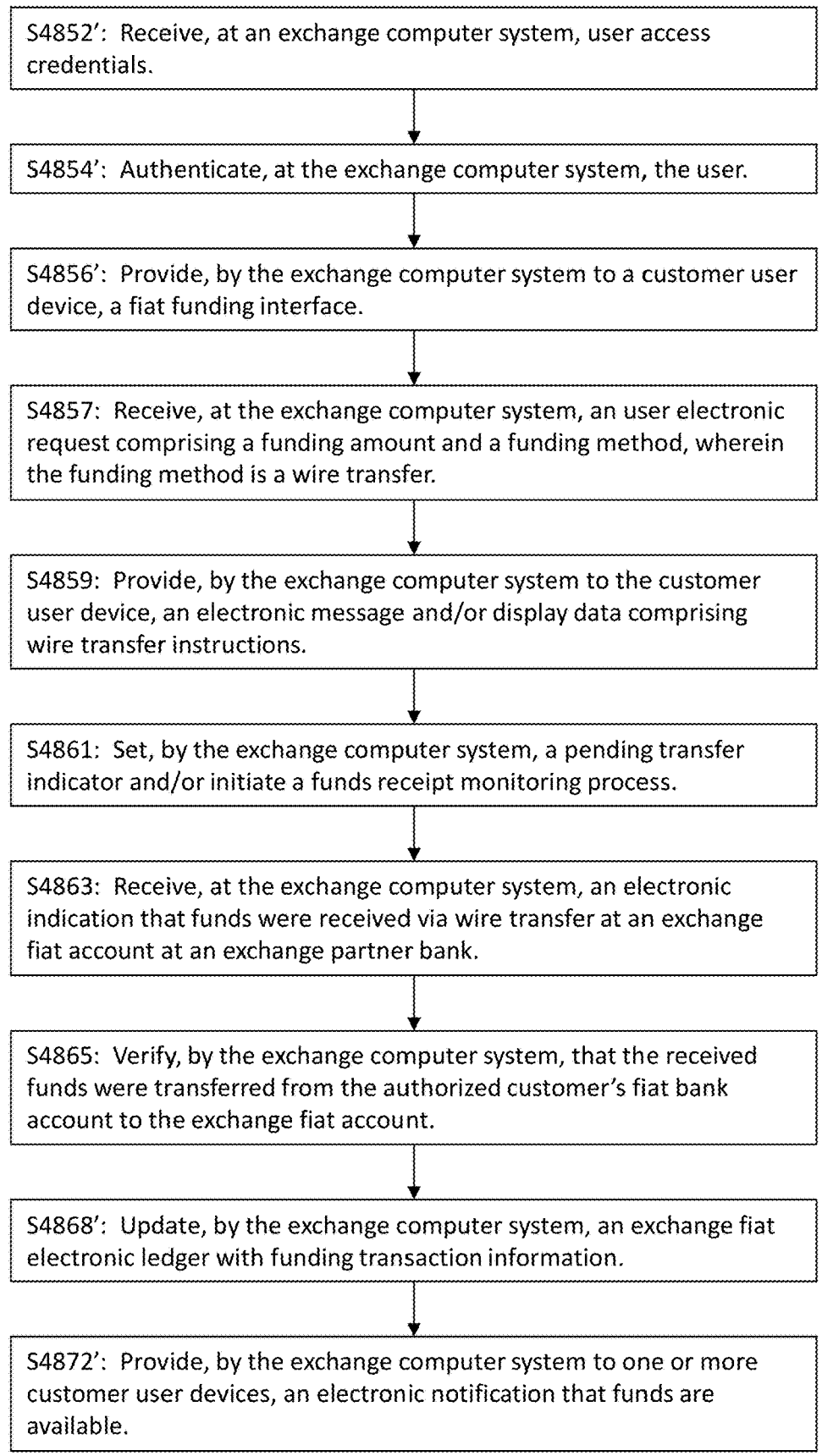

FIG. 7E is a flow chart showing another exemplary process for digital asset exchange customer account fiat funding. In step S4852', an exchange computer system can receive user access credentials. In step S4854', the exchange computer system can authenticate the user by verifying the received access credentials. Verifying the access credentials can comprise comparing the credentials to a secure credentials database. In step S4856', the exchange computer system can provide to a customer user device a fiat funding interface. In step S4857, the exchange computer system can receive a user electronic request comprising a funding amount and a funding method (e.g., a wire transfer). In step S4859, the exchange computer system can provide to the customer user device, an electronic message and/or display data comprising wire transfer instructions. In step S4861, the exchange computer system can set a pending transfer indicator and/or initiate a funds receipt monitoring process. In step S4863, the exchange computer system can receive an electronic indication that funds were received via wire transfer at an exchange fiat account at an exchange partner bank. In step S4865, the exchange computer system can verify that the received funds were transferred from the authorized customer's fiat bank account to the exchange fiat account. In step S4868', the exchange computer system can update an exchange fiat electronic ledger with the funding transaction information, which may include an amount value, customer account ID, transaction date and/or time, to name a few. In step S4870', the exchange computer system can monitor the exchange fiat account to determine the availability of funds in an exchange account associated with the user. In step S4872', the exchange computer system can provide an electronic notification to one or more customer user devices that funds are available for use on the exchange.

Figure 8A:
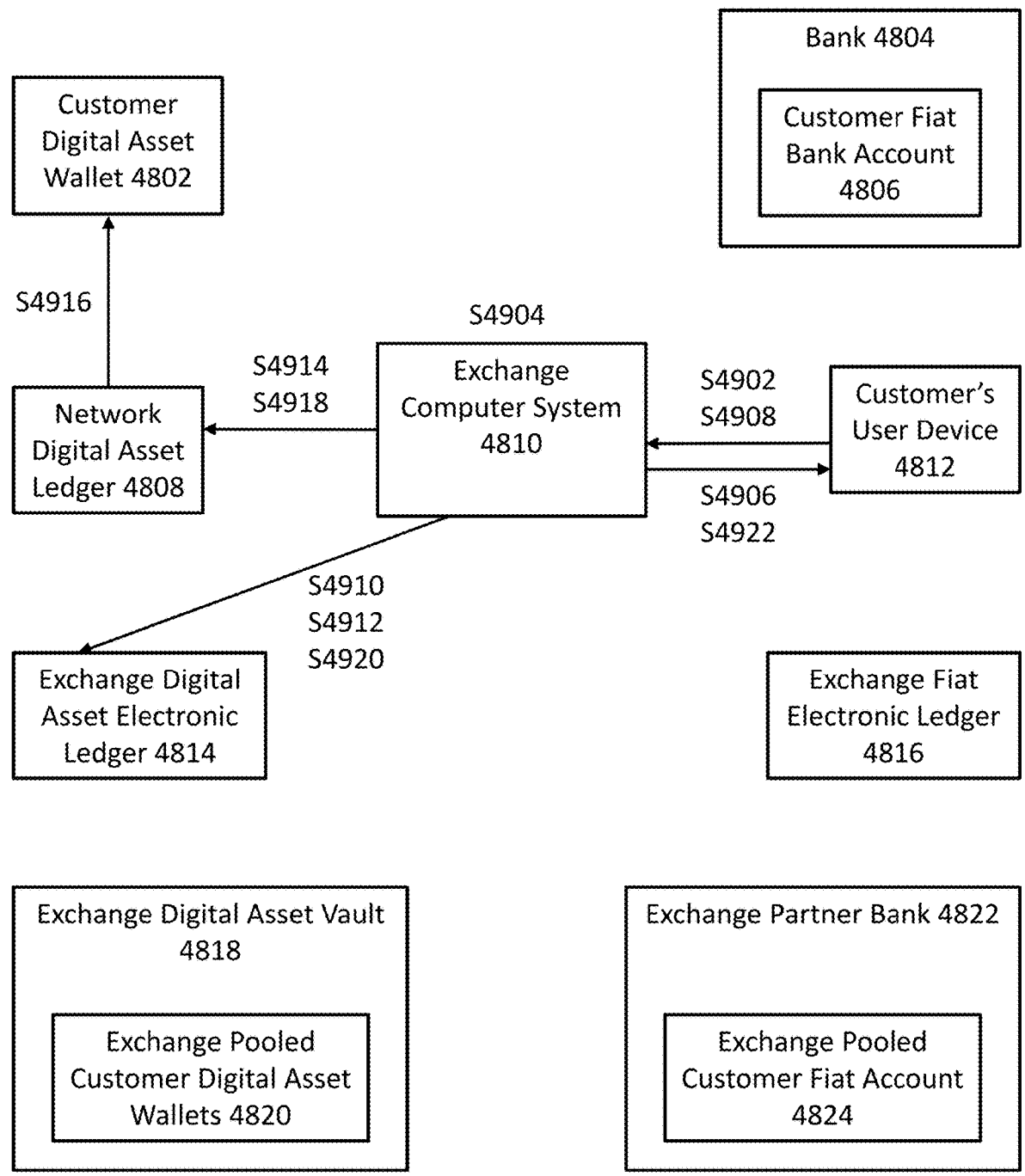
FIGS. 8A-8B are an exemplary schematic diagram and a corresponding flow chart of a process for digital asset exchange account digital asset withdrawal in accordance with exemplary embodiments of the present invention.
Figure 8B:
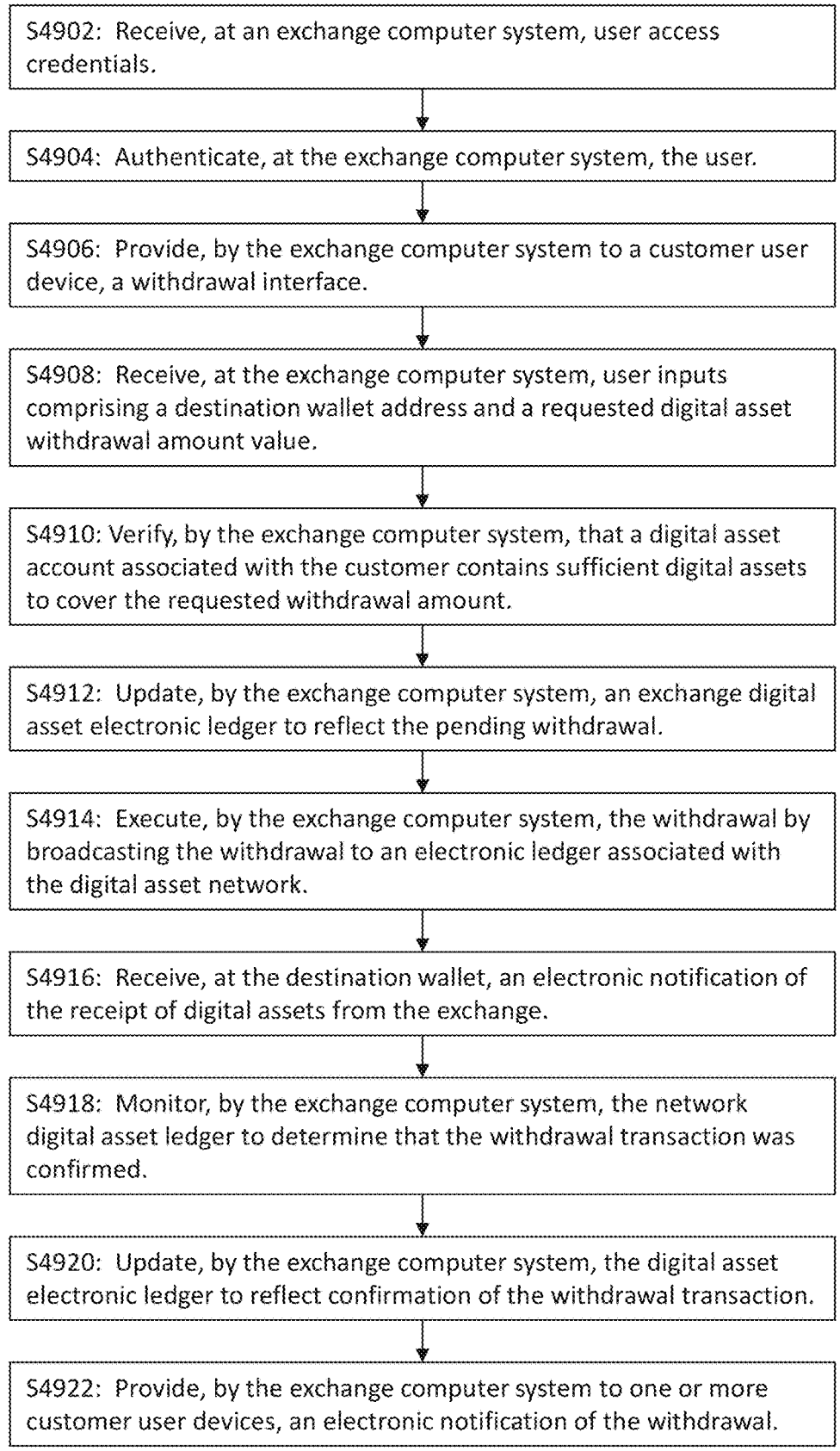

FIG. 8A is an exemplary schematic diagram of an exchange, and FIG. 8B is a corresponding flow chart of a process for digital asset exchange account digital asset withdrawal in accordance with exemplary embodiments of the present invention. The components and entities associated with an exchange that are shown in FIG. 8A are described herein with respect to FIG. 4A.

Referring to FIG. 8B, In step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In step S4904, the exchange computer system can authenticate the user based upon the received user access credentials. In step S4906, the exchange computer system may provide to a customer user device a withdrawal interface. In step S4908, the exchange computer system may receive from the customer user device user inputs comprising at least a destination digital asset address, typically associated with a destination digital wallet and a requested digital asset withdrawal amount value. In step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In step S4914, the exchange computer system may execute the withdrawal, e.g., by broadcasting the withdrawal to a digital asset network electronic ledger, e.g., the Bitcoin Blockchain, the Ethereum Blockchain, to name a few. In step S4916, the destination wallet may receive an electronic notification of the receipt of digital assets from the exchange. In step S4918, the exchange computer system may monitor the network digital asset ledger to determine whether and/or when the withdrawal transaction is confirmed. In step S4920, the exchange computer system may update the digital asset electronic ledger, e.g., by debiting the withdrawal amount from the customer's exchange account, to reflect confirmation of the withdrawal transaction. In step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain an loss reporting system and a transaction history system. A fraud analysis system can monitor transactions to detect fraudulent and/or unauthorized transactions. The exchange can also include a SVCoin system, which may comprise a purchase system, redemption system, and a dividend payment system. In a preferred embodiment, a SVCoin system is included to allow users to purchase and redeem stable value coins using fiat currency and/or other digital assets.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated off-line with transactions generated off-line, e.g., on an isolated computer, and transferred to a networked computer via a temporary physical connection or manual transfer. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network, the Ethereum network, to name a few. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key or private keys/key segments to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. The exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counterparty to the transaction. Transaction amount limits may be placed on such transactions and/or additional fees may be charged. In addition, in embodiments, the exchange may provide a dashboard interface for users (such as registered users) to purchase SVCoins using fiat currency and/or digital assets and/or to redeem digital assets in the form of SVCoins. In embodiments, the dashboard interface for the exchange may also allow users to redeem SVCoins for fiat currency. Since SVCoins are pegged to a fixed notional value of fiat currency, when SVCoins are purchased an equal amount of fiat will be set aside by the exchange as a reserve for when the SVCoins are redeemed. Similarly, when SVCoins are redeemed, payment for such redemption shall come from reserves set aside for such redemption.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars ("USD") held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, a digital asset exchange may hold digital math-based assets and/or fiat currency in trust for users. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities. In embodiments, a digital asset exchange may comply with rules and regulations promulgated by a self-regulatory organization. In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction. In embodiments, the exchange may permit trading twenty-four hours a day, seven days a week. In embodiments, the exchange may shut down for scheduled and/or unscheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

Exchange-Based Stable Value Coin to Fiat Portal

In embodiments, a digital asset exchange (such as a regulated exchange) can be used to exchange SVCoin for fiat and fiat for SVCoin. Since SVCoin is a stable value token, each token will be pegged to a stable value of fiat (e.g., 1 SVCoin=1 USD or 1 SVCoin=1 EUR, to name a few). In embodiments, when fiat is provided to a digital asset exchange to purchase SVCoin, a sufficient amount of fiat to cover the notional value of the SVCoin will be set aside and held until the SVCoin is redeemed. Similarly, when SVCoin is redeemed the corresponding amount of fiat associated with the notional value of the SVCoin will be taken from such reserves to cover the redemption. In embodiments, each time SVCoins are purchased, redeemed and/or traded, transaction fees may be charged by the SVCoin issuer, and/or others involved in the transaction, such as miners on the digital asset network. Such transaction fees may be charged in fiat, SVCoin and/or other digital assets (e.g., Gas, bitcoin, ether, to name a few).

An example of a SVCoin could be Gemini Dollar. In embodiments, when fiat is provided to a digital asset exchange to purchase SVCoin, a sufficient amount of fiat to cover the notional value of the SVCoin will be set aside and held until the SVCoin is redeemed. Similarly, when SVCoin is redeemed the corresponding amount of fiat associated with the notional value of the SVCoin will be taken from such reserves to cover the redemption.

In embodiments, each time SVCoins are purchased, redeemed and/or traded, transaction fees may be charged by the SVCoin issuer, and/or others involved in the transaction, such as miners on the digital asset network. Such transaction fees may be charged in fiat, SVCoin and/or other digital assets (e.g, Gas, bitcoin, ether, to name a few). For example, a purchaser may pay $1.01 USD for 1 SVcoin (that has a redemption value of $1.00 USD).

In embodiments, the SVCoin issuer may provide a discount to a purchaser of SVCoin, which may be reflected in fiat, SVCoin and/or other digital assets (e.g., Gas, bitcoin, ether, to name a few). For example, a purchaser may pay $0.99 USD for 1 SVCoin (that has a redemption value of $1.00 USD).

In embodiments, transaction fees and/or discounts can be incurred and/or paid at the time of transfer or at another time.

In embodiments, the SVCoin may be pegged to another stable value token. In embodiments, the SVCoin may be pegged to the value of another asset, other than fiat. In embodiments, the SVCoin may be pegged to the value of a security, for example, a certificate of stock in a particular company. In embodiments, a purchaser of the SVCoin may deposit or otherwise provide to the digital asset exchange, a share of stock and will receive an SVCoin token in return. In embodiments, the digital asset exchange will hold the share of stock, in a custodial account, for example, until it is redeemed. In embodiments, rather than deposit a share of stock, a purchaser of SVCoin may deposit a sum of fiat, or other assets, sufficient to purchase a share of stock. In embodiments, the digital asset exchange may acquire a share of stock on the market using the assets deposited by the purchaser and then hold the share of stock until the SVCoin is redeemed.

In embodiments, the SVCoin may be pegged to the value of a commodity. In embodiments, a purchaser of SVCoin may deposit a sum of fiat, or other assets, sufficient to purchase a quantity of a commodity. In embodiments, the digital asset exchange may hold an amount of the commodity, in a custodial account, for example, until the SVCoin is redeemed. In embodiments, the digital asset exchange may acquire the quantity of the commodity on the market using the assets deposited by the purchaser and then hold the commodity until the SVCoin is redeemed.

In embodiments, the SVCoin may be pegged to a derivative product of a stock, commodity and/or another digital asset to name a few.

In embodiments, when a user (such as a registered user of a regulated digital asset exchange) commences a purchase order to acquire SVCoin for fiat, the user may have fiat currency in an associated user account. Alternatively, the user may send fiat currency to the exchange's account, such as an omnibus account, at the applicable bank. In embodiments, when a seller sells SVCoin, the seller may have the SVCoin in an associated user account or may send SVCoin to a digital asset account. Specifically, the seller may send SVCoin to one or more of digital asset addressed, typically associated with digital wallets held by the exchange. In embodiments, exchange transactions may only be completed after the verification that the digital asset accounts and fiat accounts associated with the users involved in the transaction at least equal the quantities of each required by the transaction.

In embodiments, registered users of a digital asset exchange system, such as Gemini, may purchase and/or redeem SVCoins for fiat and/or other digital assets though one or more digital asset dashboard interfaces. In embodiments, the one or more digital asset dashboard interfaces may include: (i) a dashboard fiat interface which allows registered users to deposit and/or withdrawal fiat with the digital asset exchange; (ii) a dashboard digital asset interface which allows registered users to deposit and/or withdrawal digital assets with the digital asset exchange system; (iii) a dashboard SVCoin interface which allows registered users to purchase and/or redeem SVCoins with the digital asset exchange system; and (iv) a dashboard Security Token interface which allow Security Token issuers to provide instructions to transfer SVCoins to Security Token holders. Each of these dashboard interfaces will now be described in turn.

Figures 4, 11A:
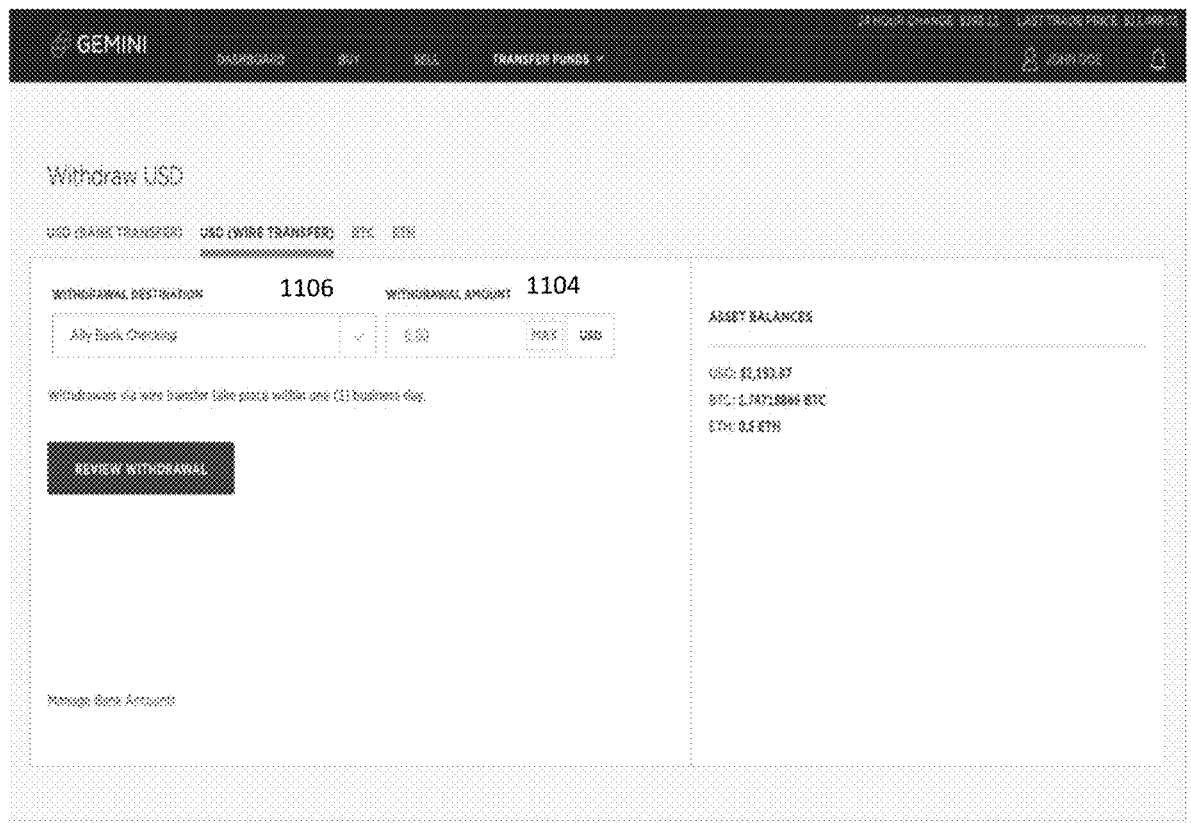

FIGS. 11A-1-4 illustrates an exemplary embodiment of a dashboard fiat interface which allows registered users to deposit and/or withdraw fiat with the digital asset exchange.

FIG. 11A-1 illustrates an exemplary embodiment of the dashboard fiat interface as used for deposit of fiat. As illustrated, the user has the option to make a transfer from a bank to the exchange by indicating an amount of fiat 1102 (e.g., US dollars) to be transferred from a funding source 1100 (e.g., a bank account).

FIG. 11A-2 illustrates an exemplary embodiment of the dashboard fiat interface providing an option of a wire transfer. As in FIG. 11A-1, the user indicates an amount of fiat 1102 to be transferred from a funding source 1100, such as a bank, to be wired to the exchange.

FIG. 11A-3 illustrates the dashboard fiat interface as used to withdraw fiat from the exchange and deposit it into a destination (e.g., a bank). In this case, the user provides a withdrawal amount of fiat 1104 and a destination 1106, such as a bank account, for the specific fiat.

Similarly, FIG. 11A-4 illustrates the dashboard fiat interface as used to withdraw fiat via a wire transfer where the user enters the withdrawal amount of fiat 1104 and a destination 1106, such as a bank account.

Figures 1, 11B:
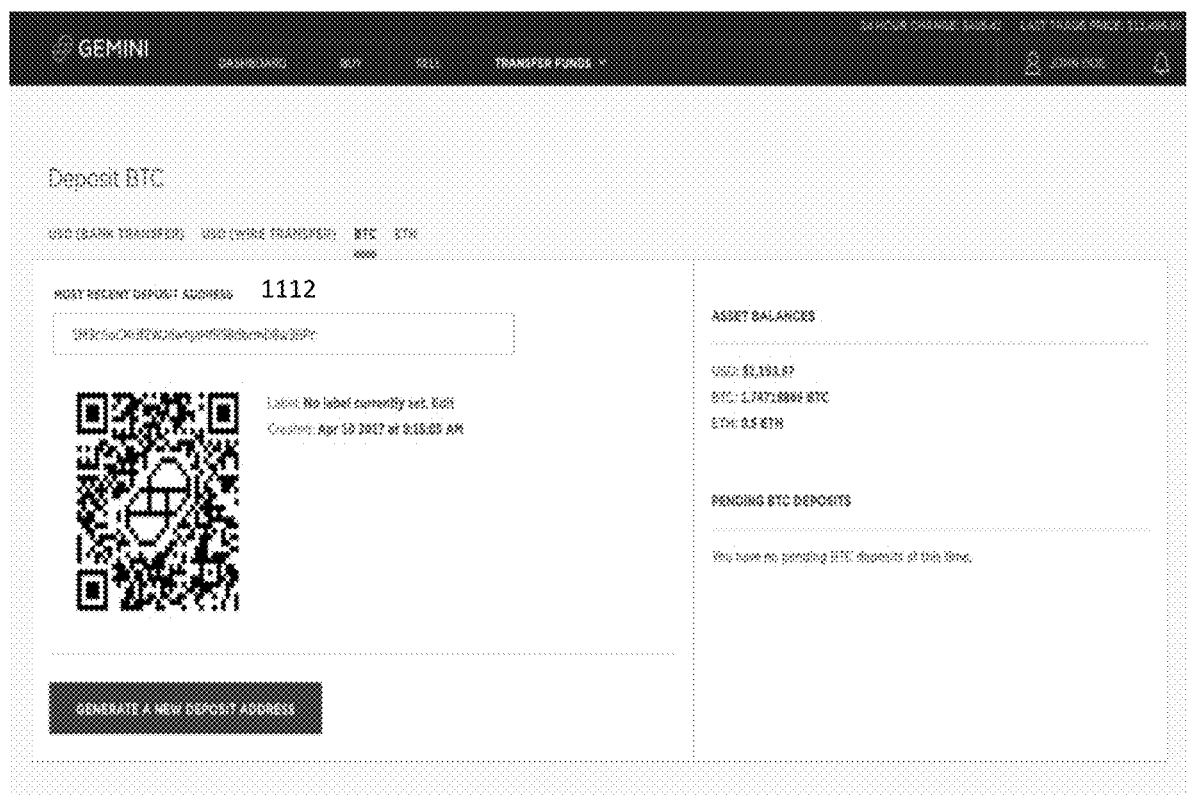
Figures 2, 11B:
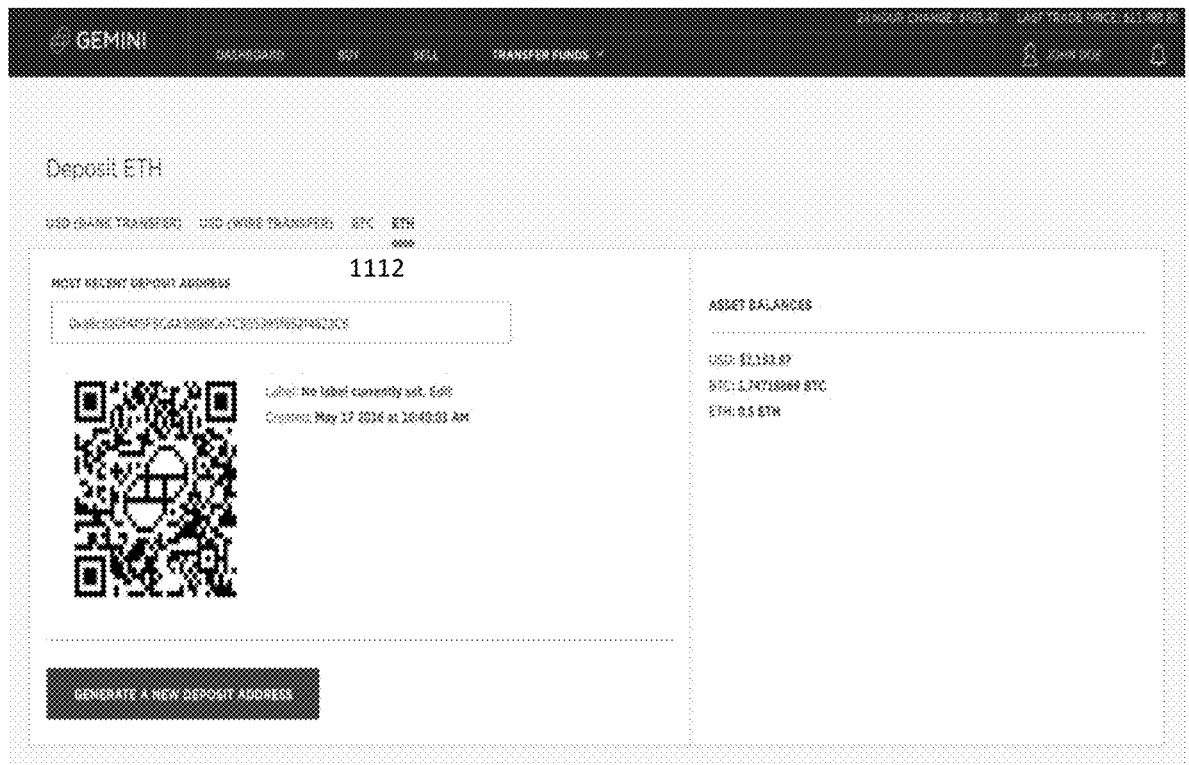
Figures 3, 11B:
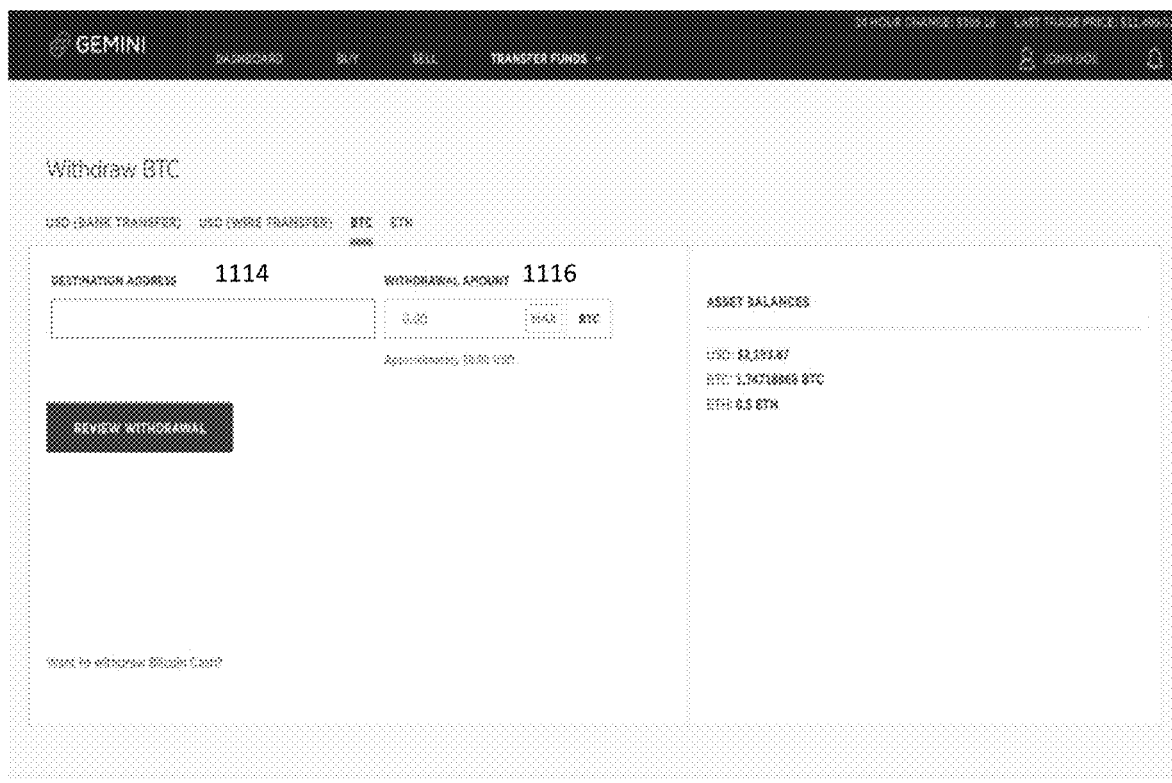
Figures 4, 11B:
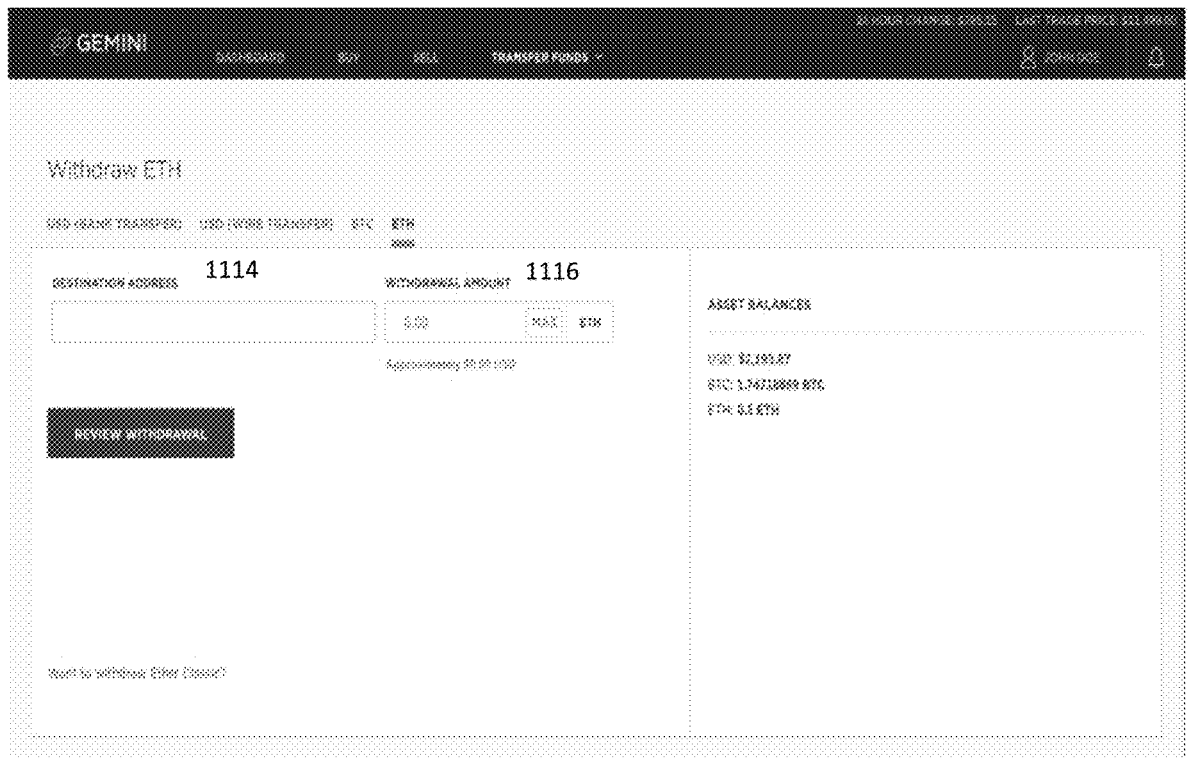

FIGS. 11B-1-4 illustrates an exemplary embodiment of a dashboard digital asset interface which allows registered users to deposit and/or withdrawal digital assets with the digital asset exchange system.

FIG. 11B-1 illustrates an exemplary embodiment of the dashboard fiat interface as used for deposit of digital assets, specifically bitcoin in this nonlimiting example. As illustrated, the user enters the current address 1112 of the digital asset (e.g., bitcoin, ether, etc.).

FIG. 11B-2 illustrates another exemplary embodiment of the dashboard fiat interface as used for deposit of digital assets, specifically ether this nonlimiting example. As illustrated, the user enters the current address 1112 of the digital asset (ether in this example.

FIG. 11B-3 illustrates an exemplary embodiment of the dashboard fiat interface as used for withdrawal of digital assets, specifically bitcoin in this nonlimiting example. As illustrated, the user enters the destination address 1114 for the digital asset (bitcoin) as well as amount of digital assets 1116 to be withdrawn.

FIG. 11B-4 illustrates an exemplary embodiment of the dashboard fiat interface as used for withdrawal of digital assets, specifically ether this example. As illustrated, the user enters the destination address 1114 of the digital asset (ether) as well as amount of digital assets 1116 to be withdrawn.

Figures 1, 11C:
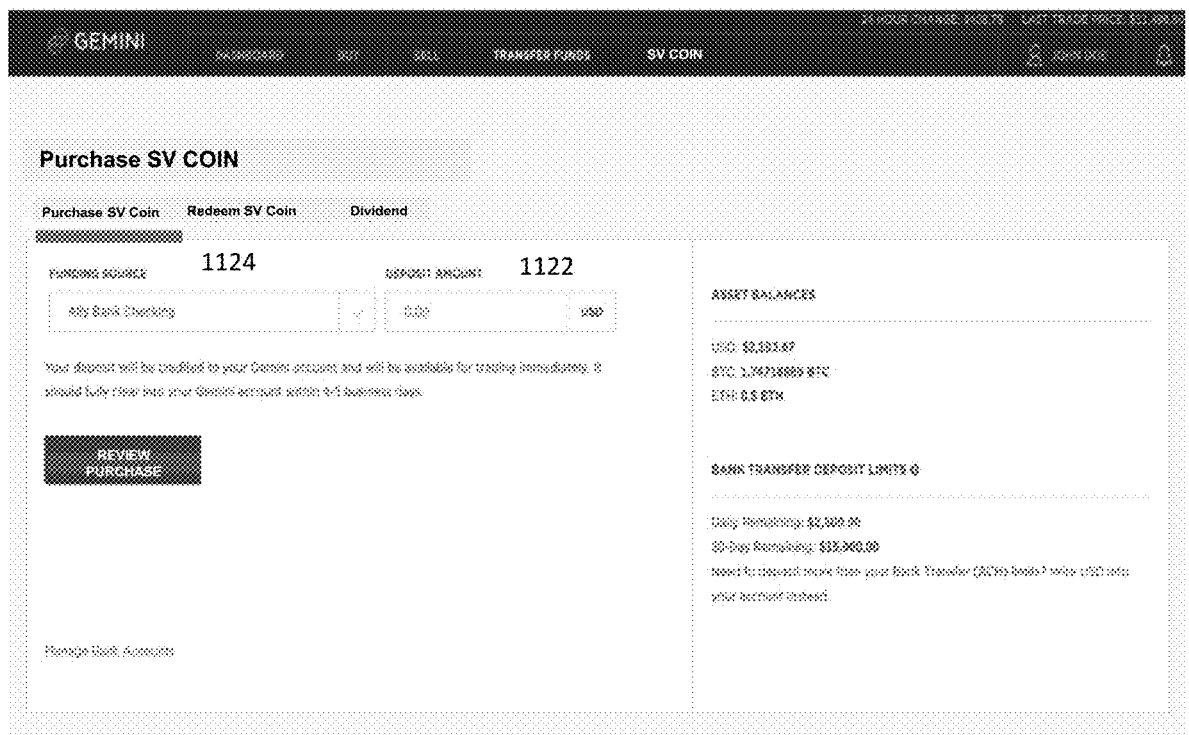
Figures 2, 11C:
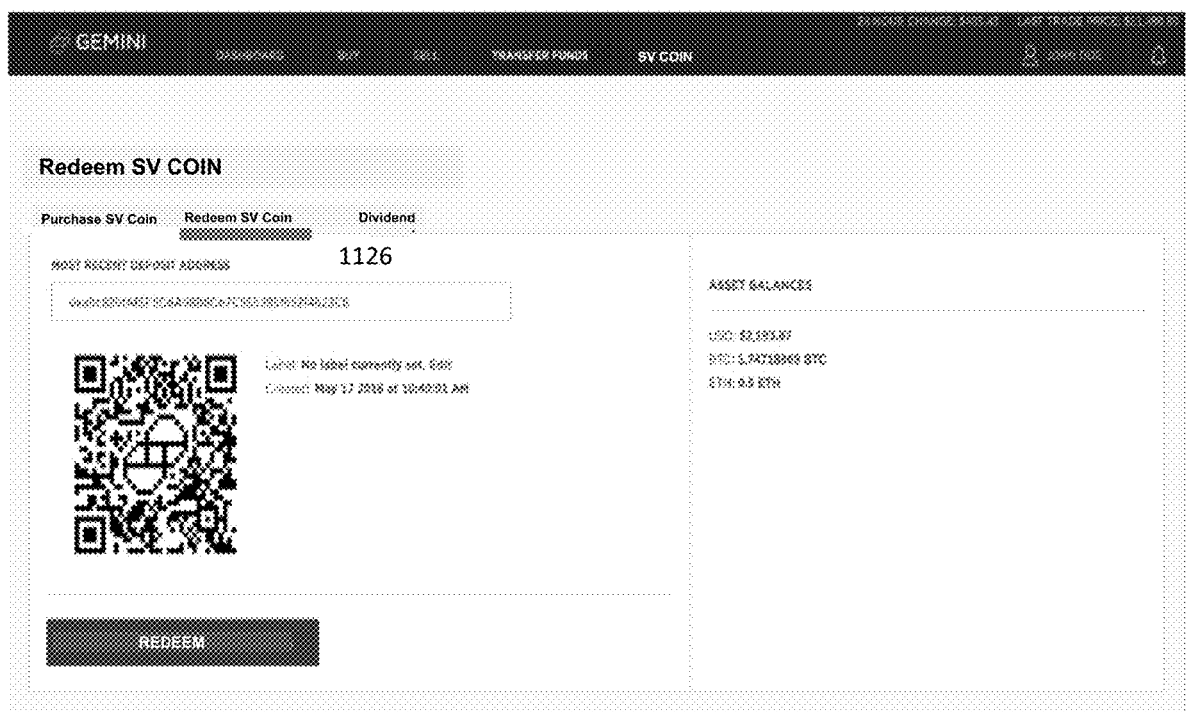

FIGS. 11C-1-2 illustrates an exemplary embodiment of a dashboard SVCoin interface which allows registered users to purchase and/or redeem SVCoins with the digital asset exchange system.

FIG. 11C-1 illustrates an exemplary embodiment of the dashboard fiat interface as used to purchase SVCoins using fiat. As illustrated, the user may enter an amount of fiat (U.S. dollars, in this example) 1122 to be provided from a source 1124 (e.g., a bank account) to purchase the SVCoins.

FIG. 11C-2 illustrates an exemplary embodiment of the dashboard fiat interface as used to purchase SVCoins using digital assets (bitcoin in this example). As illustrated, the user may enter the current address of the digital asset 1126.

Figure 9A:
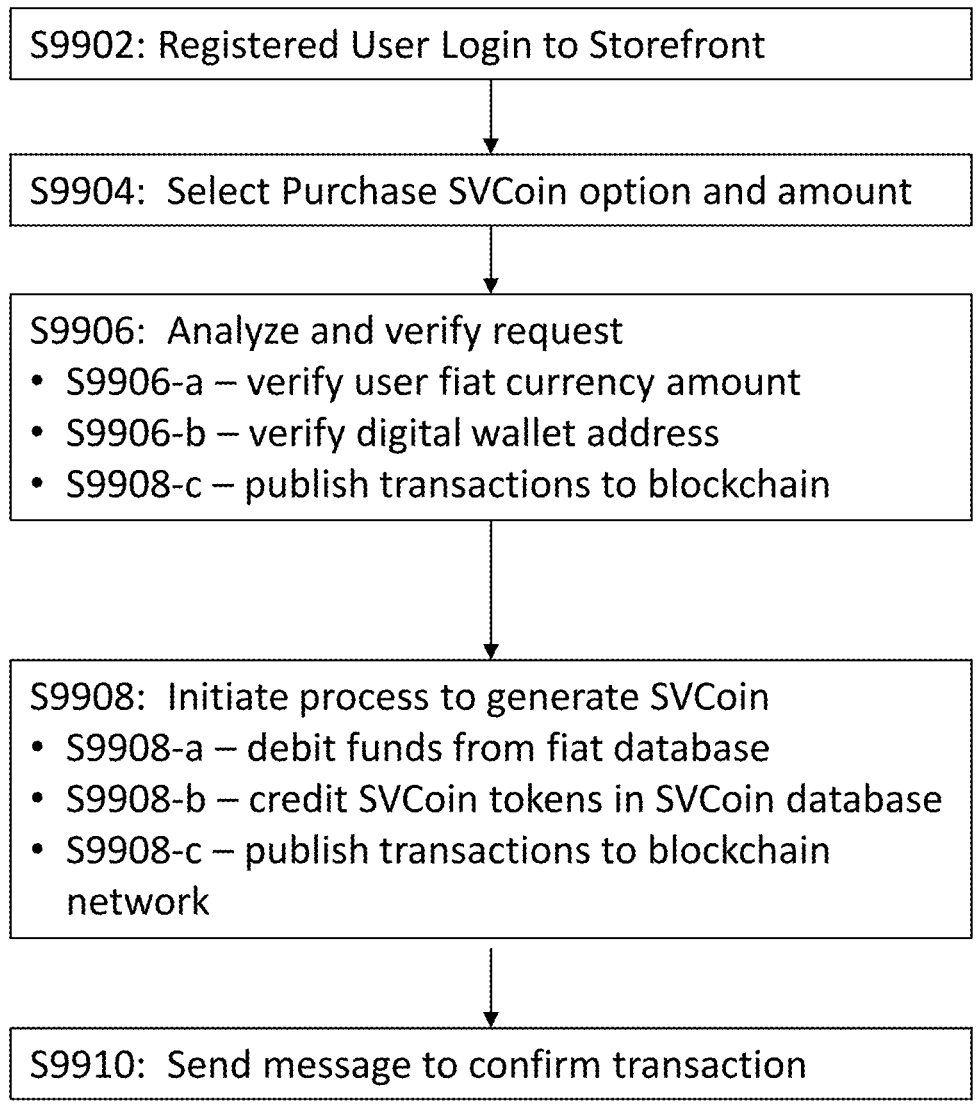
FIG. 9A is an exemplary flow chart of the process for purchasing SVCoin for fiat on a digital asset exchange in accordance with exemplary embodiments of the present invention.

In embodiments, a registered user may purchase SVCoins in exchange for fiat. Referring to FIG. 9A, in S9902, a registered user may log in to the dashboard SVCoin interface, such as illustrated in FIGS. 11C1-2.

In S9904, the user selects the purchase SVCoin option, and specifies the amount of SVCoins the user seeks to obtain. In embodiments, the user may be requested to provide a digital asset address, typically associated with a digital wallet, such as a digital asset address associated with a blockchain digital asset, like ether. In embodiments, the amount of SVCoins to be purchased may be specified by number of SVCoins, or by an amount of fiat. Since the SVCoins are pegged to the fiat in a stable amount (e.g., 1 SVCoin=1 USD), the system can automatically convert and display the requested amount of SVCoin into fiat or requested amount of fiat into SVCoin.

In S9906, the digital asset exchange system will analyze and verify that the request can be properly processed. In step S9906-a, the digital asset exchange system, as the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S9906-*b*, the digital asset exchange system, may also verify that the digital asset address provided is a valid digital asset address. In step S9908-*c*, the digital asset exchange system, may also publish transactions to blockchain.

In S9908, after the digital asset exchange system has confirmed that the user has sufficient fiat to cover the transaction, the digital asset exchange system may initiate the process of generating the requested SVCoin. In embodiments, where SVCoins were previously generated, then S9908 may be replaced with an alternative process S9908' as discussed below.

Returning to S9908, in S9908-*a*, the digital asset exchange system may debit the designated fiat funds from a fiat ledger associated with the user account, and credit a corresponding amount of fiat to the SVCoin fiat ledger to be held in trust by the Exchange.

In S9908-*b*, the digital asset exchange system shall generate the requested SVCoin tokens. As part of this step, or as an additional step, the digital asset exchange system will update the SVCoin ledger to reflect the creation of the newly generated SVCoins and to indicate the digital asset address associated with these newly generated SVCoins.

In S9908-*c*, the digital asset exchange system shall publish to the blockchain network (e.g., the Ethereum Network) the transaction to be recorded by the blockchain network. In embodiments, a transaction fee may be required by, e.g., a miner, to process and add the requested transaction on the blockchain.

As noted, when a reserve of SVCoin had been previously created but not yet distributed by the digital asset exchange system, S9908' may be implemented instead of S9908. At step S9908-*a*', digital asset exchange computer system may debit the designated fiat funds from a fiat ledger associated with the user account, and credit a corresponding amount of fiat to the SVCoin fiat ledger to be held in trust by the Exchange.

In step S9908-*b*', the digital asset exchange computer system may determines an appropriate amount of SVCoin from the reserve to satisfy the request.

In step S9908-*c*', the digital asset exchange computer system updates the SVCoin ledger to change the address associated with the portion of the reserve determined in step S9908*b*' to the address associated with the user.

In S9910, the digital asset exchange computer system may send a message to the registered user, and/or the designated digital asset address to reflect that the transaction was successfully processed. In embodiments, such messages may include information including: (i) digital asset address; (ii) the amount of tokens generated; and/or (iii) the new balances for the digital asset address.

Figure 9B:
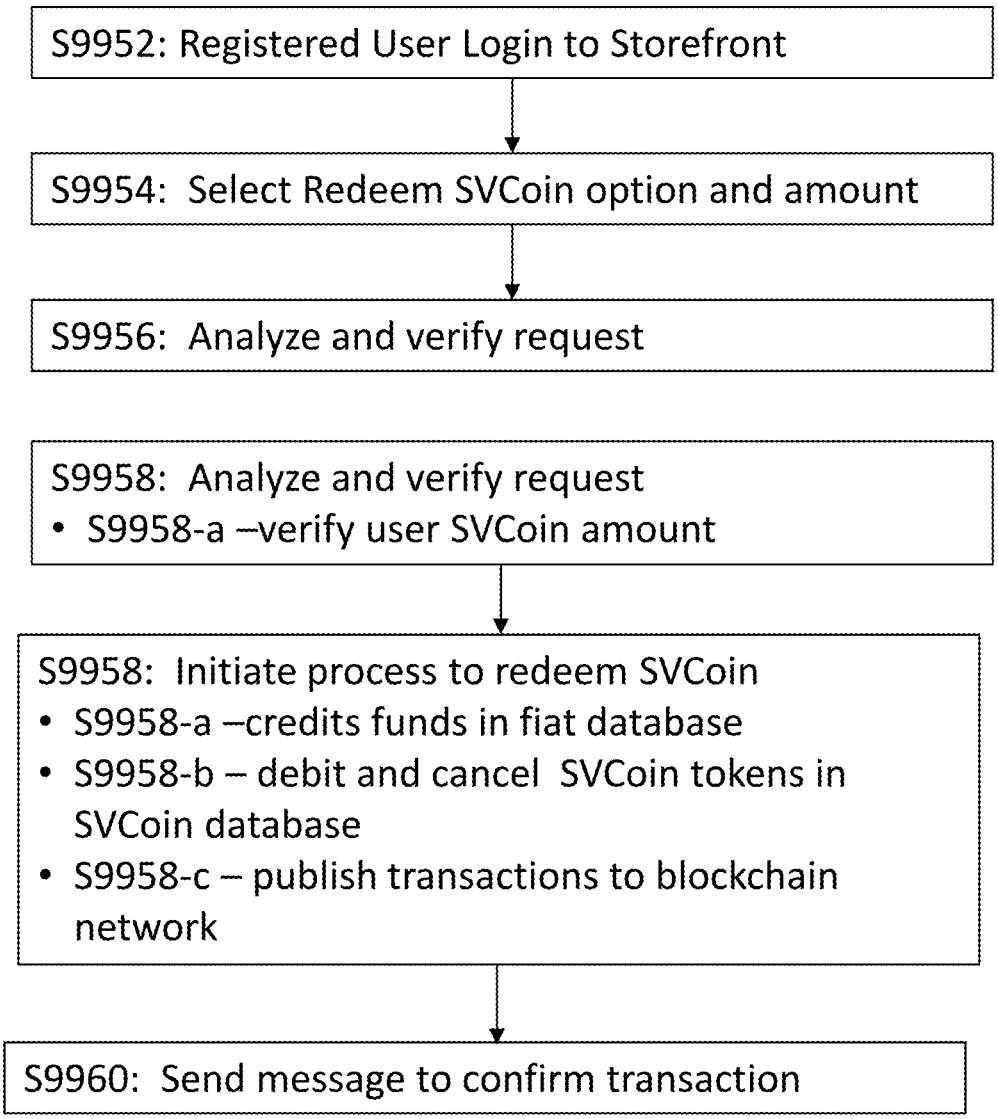
FIG. 9B is an exemplary flow chart of the process for redeeming SVCoin for fiat on a digital asset exchange in accordance with exemplary embodiments of the present invention.

In embodiments, a registered user may redeem SVCoins in exchange for fiat. Referring to FIG. 9B, in S9952, a registered user may log in to the dashboard SVCoin interface, such as illustrated in FIGS. 11C-1 and 11C-2.

In S9954, the user selects the redeem SVCoin option, and specifies the amount of SVCoins the user seeks to redeem. In embodiments, the user may be requested to provide a digital wallet address, such as a digital wallet address associated with a blockchain digital asset, like ether. In embodiments, the amount of SVCoins may be specified by number of SVCoins, or by an amount of fiat. Since the SVCoins are pegged to the fiat in a stable amount (e.g., 1 SVCoin=1 USD, or 100 SVCoin=1 USD, to name a few), the system can automatically convert the requested amount of SVCoin to fiat, or requested amount of fiat into SVCoin.

In S9956, the digital asset exchange system will analyze and verify that the request can be properly processed. In step S9956-*a*, the digital asset exchange system, as the SVCoin issuer, may verify that the user has sufficient SVCoin to cover the transaction as well as any transaction fees that may be charged. In embodiments, the digital asset exchange system may perform verification of the SVCoin balance by checking the token balance of the digital asset address against the SVCoin Token ledger as maintained by the digital asset blockchain. For example, a balance for a token issued based on the Ethereum Network may be checked at www.etherscan.io. If the user does not have sufficient SVCoin and/or an insufficient amount for transaction fees and/or provided an invalid digital asset address, to name a few, the transaction may be terminated.

In embodiments, SVCoin transactions may be published and recorded in a SVCoin token side ledger that is separate from an underlying blockchain (e.g., the Ethereum Blockchain). Such a side ledger may be provided using a sidechain, for example, a plasma chain, which is separate from the underlying digital asset blockchain that is maintained on the distributed network. In embodiments, this sidechain is used to record all transactions involving the SVCoin token and is maintained by the token issuer or another trusted entity on behalf of the token issuer. These transactions may then be subsequently published to the underlying digital asset blockchain periodically or aperiodically such that all transactions are publicly viewable and confirmable. In embodiments, with a blockchain supporting shielded transactions, the transactions in the SVCoin token may potentially be shielded and only viewable by authorized token holders. In embodiments, transactions on the sidechain may be consolidated prior to publication on the digital asset blockchain to increase speed of processing and reduce transaction costs.

The use of a sidechain in conjunction with a blockchain can provide certain technical advantages not otherwise available by either alone. For example, since all transactions on the sidechain are inevitably published to the digital asset blockchain, these transaction records enjoy the same benefit of immutability provided to all other transactions on the digital asset blockchain. However, use of a sidechain reduces both transaction costs and transaction times overall. Recording the transactions on the sidechain first can be accomplished more rapidly than transactions that are published directly to the digital asset blockchain, which must be confirmed prior to being added to the digital asset blockchain. In embodiments, the sidechain may simply be a database that records all transactions such that there is no need for miners to verify each transaction, and thus, no need to pay miners for this service. In this case, transaction costs are only incurred for the periodic or aperiodic publication of transfers from the sidechain to the underlying digital asset blockchain.

In embodiments, the database for the SVCoin tokens may be maintained as a separate side chain from the database for each Security token. In embodiments, one or more security tokens may be maintained in the same side chain as the SVCoin tokens, and/or by the same trusted entity system as used to maintain the SVCoin token database.

In S9958, after the digital asset exchange system may confirm that the user has sufficient SVCoin to cover the transaction, as well as any other designated criteria, the digital asset exchange system may initiate the process of redeeming the designated SVCoin.

In S9958-*a*, the digital asset exchange system redeems the designated SVCoin tokens, including updating the SVCoin token ledger database to reflect the debiting and cancelling of the designated tokens and debiting the corresponding digital wallet address associated with such redeemed SVCoin tokens. In embodiments, this process may be performed by generating a transaction on the digital asset exchange network from a contract digital wallet address or other authorized digital wallet address under the relevant SVCoin smart contract programming, to be sent in S9958-*c*, discussed below.

In S9958-*b*, the digital asset exchange system credits the designated fiat funds to a fiat ledger associated with the user account, and debit a corresponding amount of fiat from the SVCoin fiat ledger being held in trust by the exchange.

In S9958-*c*, the digital assert exchange system publishes to the blockchain network (e.g., the Ethereum Network) the transaction to be recorded by the blockchain network. In embodiments, a transaction fee (such as Gas) may be required by, e.g., a miner, to process and add the requested transaction on the blockchain. In embodiments, the transaction fee may be specified as an amount and/or an amount limit to facilitate the transaction being processed by a miner.

In S9960, the digital asset exchange computer system may send a message to the registered user, and/or the designated digital asset addresses to reflect that the transaction was successfully processed. In embodiments, such messages may include information including: (i) digital asset address; (ii) the amount of tokens redeemed; and/or (iii) the new balances for the digital asset address or digital wallet associated therewith.

Variable Permission Stable Value Tokens

FIGS. 14A-14H illustrate a method of issuing stable value digital asset tokens. In embodiments, this method can control the risk associated with loss of control of an on-line key pair by using variable permission custodians.

In Step S1402, a first designated key pair, including a first designated public key of an underlying digital asset and a corresponding first designated private key, which is mathematically related, is provided. The underlying digital asset may be maintained on a distributed public transaction ledger maintained by a plurality of geographically distributed computer systems in a peer-to-peer network in the form of the blockchain (such as the Ethereum blockchain or NEO blockchain). The first designated private key may be stored on a first computer system which is connected to the distributed public transaction ledger through the Internet (e.g., in a hot wallet).

In Step S1404, a second designated key pair, including a second designated public key of the underlying digital asset and a corresponding second designated private key, which is mathematically related, is provided. The second designated private key is stored on a second computer system which is physically separated from the first computer system and is not operatively or physically connected to the distributed public transaction ledger or the Internet (e.g., a cold wallet).

In embodiments, additional off-line designated key pairs may also be provided.

In Step S1406, first smart contract instructions for a stable value digital asset token associated with a first contract address associated with the underlying digital asset are also provided. The smart contract instructions are saved in the blockchain for the underlying digital assets and include instructions for: (1) token creation; (2) token transfer; (3) token destruction; (4) authorization instructions for the first designated key pair; and (5) authorization instructions for the second designated key pair. In embodiments, these smart contract instructions may be contained in one or a plurality of contract addresses, as discussed above.

Referring to FIG. 14B, in Step S1408, a digital asset token issuer system receives a request from a first requesting user to obtain a first sum of stable value digital asset tokens in exchange for a second sum of fiat. The first sum corresponds to the second sum based on a fixed ratio of stable value digital asset token to fiat (e.g., 1 SVCoin Token=1 USD). The first requesting user is associated with an associated first requester key pair, including a first request public key of the underlying asset and a corresponding first request private key, which are mathematically related to each other.

In Step S1410, the digital asset token issuer system confirms receipt of the second sum of fiat.

In Step S1412, digital asset token issuer system determines whether the first designated key pair has authority to obtain the first sum of stable value digital asset tokens.

Referring to FIG. 14B, in the case where the digital asset token issuer system determines in Step S1412 that the first designated key pair has authority to obtain the first sum, in embodiments, in Step S1414, the system may perform the steps S1414 A(1)-A(5). In Step S1414A(1), the digital asset token issuer system, generates first instructions from the first designated address to the contract address to obtain the first sum of stable value digital asset tokens and transfer said first sum to the first request public key. In Step S1414A(2), the digital asset token issuer system sends to the first computer, the first instructions. In Step S1414A(3), the first computer digitally signs the first instructions using the first designated private key to generate first digitally signed instructions. In Step S1414A(4), the first computer sends to the digital asset token system, the first digitally signed instructions. In Step S1414A(5), the digital asset token system sends to the plurality of geographically distributed computer systems, the first digitally signed instructions.

Referring to FIG. 14C, in the case where the digital asset token issuer system determines in Step S1412 that the first designated key pair has authority to obtain the first sum, in other embodiments, in Step S1414' the system may perform the following steps S1414 B(1)-B(3). In Step S1414B(1), a request is sent from the digital asset token issuer system to the first computer, to obtain the first sum of stable value digital asset tokens and transfer said first sum to the first request public key. In Step S1414B(2), the first computer generates first instructions addressed from the first designated public key to the contract address including a message to obtain the first sum of stable value digital assets tokens and to assign the obtained first sum to the first request public key, the first instructions including a digital signature based on the first designated private key. In Step 1414B(3), the first computer system sends to the plurality of geographically distributed computer systems, the first instructions. In embodiments, the first computer may send the first instructions indirectly through another computer system.

Referring to FIG. 14D, in Step S1415, the digital asset token issuer system confirms that the first sum of stable value digital asset tokens has been obtained and transferred to the first request public key based on reference to the blockchain.

In embodiments, in Step S1416, the digital asset token issuer system may receive a second request to obtain a third sum of stable value digital asset tokens in exchange for a fourth sum of fiat. The third sum corresponds to the fourth sum based on the fixed ratio of stable value digital asset token to fiat (e.g., 1 SV Coin Token=1 USD). The second request may come from a second requesting user with an associated second requester key pair, including a second request public key of the underlying asset and a corresponding second request private key, which are mathematically related.

In Step S1418, the digital asset token issuer system confirms receipt of the fourth sum of fiat.

In Step S1420, the digital asset token issuer system, determines whether the first designated key pair has authority to obtain the third sum.

In the case where the digital asset token issuer system determines in Step S1420 that the first designated key pair does not have authority to obtain the third sum, in Step S1422, the digital asset token issuer system determines whether the second designated key pair has authority to obtain the third sum.

Referring to FIG. 14E, in the case where the digital asset token issuer system determines in Step S1422 that the second designated key pair has authority to obtain the third sum, in embodiments, the digital asset token issuer system perform the Steps S1422A(1)-A(6). In Step S1422A(1), the digital asset token issuer system generates second instructions from the second designated address to the contract address to obtain the third sum of stable value digital asset tokens and transfer said third sum to the second request public key. In Step S1422A(2), the digital asset token issuer system transfers to a portable memory device, the second instructions. In Step S1422A(3), the second instructions are transferred from the portable memory device to the second computer. In Step S1422A(4), the second computer digitally signs the second instructions using the second designated private key to generate the second digitally signed instructions. In Step S1422A(5), the second computer transfers to a second portable memory device, the second digitally signed instructions. In Step S1422A(6), the second digitally signed instructions are sent from the second portable memory device to the plurality of geographically distributed computer systems. In embodiments, the second digitally signed instructions may be sent indirectly through another computer system.

Figure 14A:
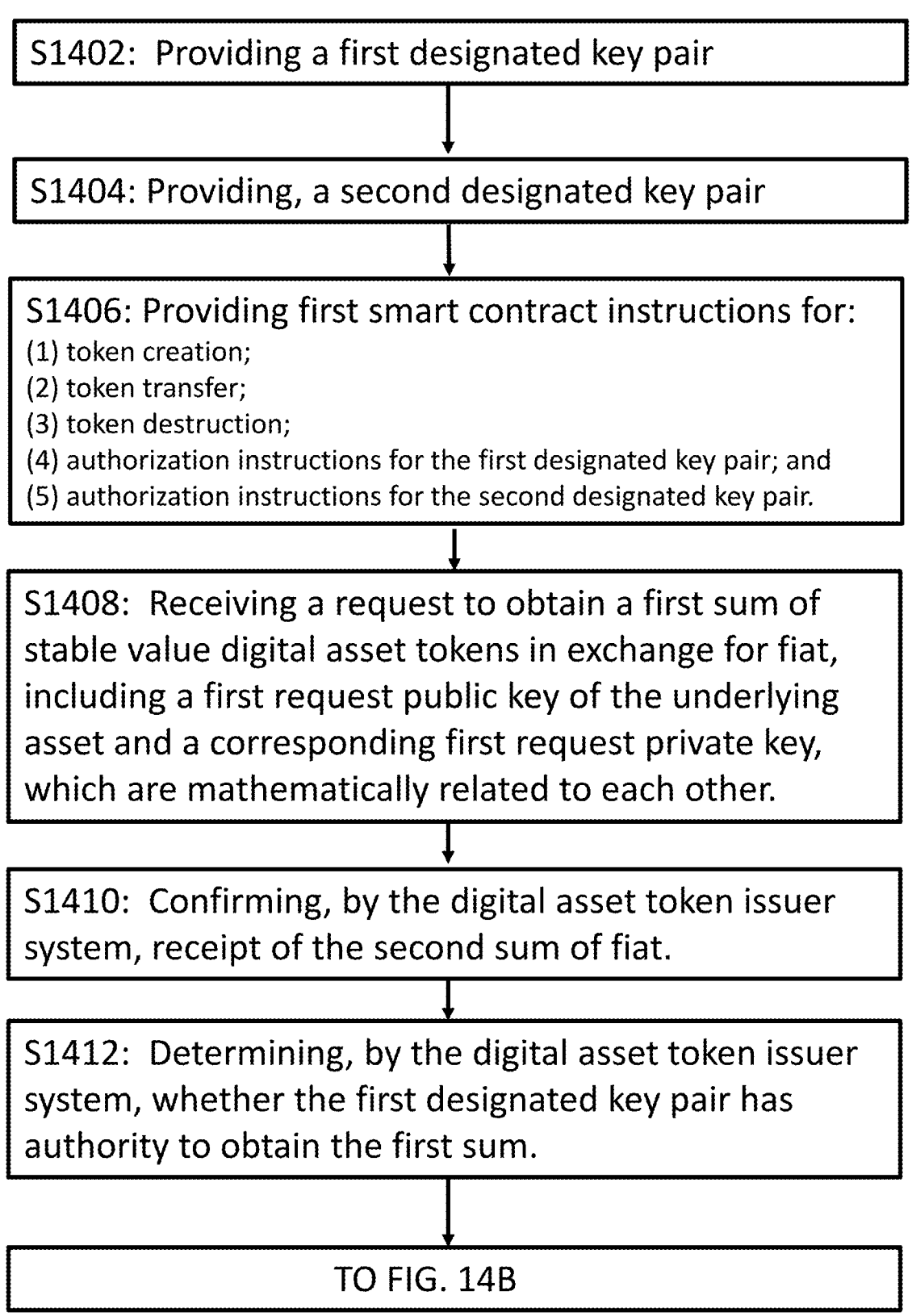
Figure 14F:
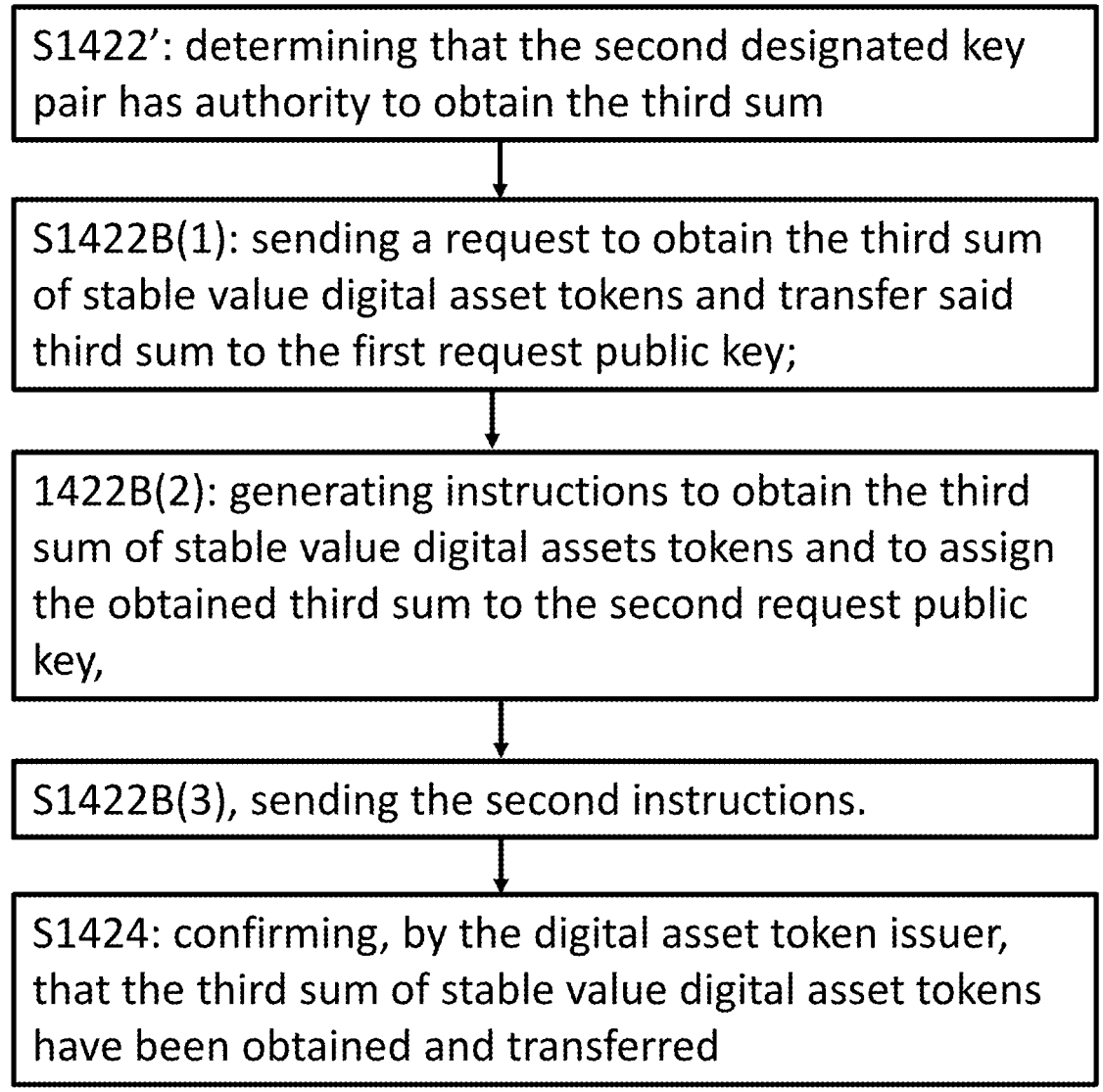

Referring to FIG. 14F, in the case where the digital asset token issuer system determines in Step S1422' that the second designated key pair has authority to obtain the third sum, in other embodiments, in Step S1422', the system may perform the following steps S1422B(1)-B(3). In Step S1422B(1), a request is sent from the digital asset token issuer system to the second computer, to obtain the third sum of stable value digital asset tokens and transfer said third sum to the first request public key. In Step S1422B(2), the second computer generates second instructions addressed from the second designated public key to the contract address including a message to obtain the third sum of stable value digital assets tokens and to assign the obtained third sum to the second request public key, the second instructions including a digital signature based on the second designated private key. In Step 1422B(3), the second computer system sends to the plurality of geographically distributed computer systems, the second instructions. In embodiments, the second computer may send the second instructions indirectly through another computer system.

In Step S1424, the digital asset token issuer system confirms that the third sum of stable value digital asset tokens have been obtained and transferred to the second request public key based on reference to the blockchain.

In embodiments, the step of sending, from the second portable memory device to the plurality of geographically distributed computer systems, the second digitally signed instructions comprises the further steps of transferring, form the second portable memory device to the digital asset computer system, the second digitally signed instructions; and transferring, from the digital asset computer system to the plurality of geographically distributed computer systems, the second digitally signed instructions.

Referring to FIG. 14G, in embodiments, a third designated key pair, comprising a third designated public key of the underlying digital asset and a corresponding third designated private key that are mathematically related may be provided. The third designated private key may be stored on a third computer system which is physically separated from the first computer system and from the second computer system and is not operatively or physically connected to the distributed public transaction ledger or the Internet. In such embodiments, the first smart contract instructions further comprise authorization instructions for the third key pair. Further, in such embodiments, in the case where the digital asset token issuer system determines that the first designated key pair does not have authority to obtain the third sum, the method further comprises determining, by the digital asset token issuer system, whether the third designated key pair in addition to the second designated key pair have authority to obtain the third sum; and in the case where the digital asset token issuer system determines that the third designated key pair in addition to the second designated key pair have authority to obtain the third sum, perform the Steps S1422C (1)-C(6) as part of step S1422. In Step S1422C(1), the digital asset token issuer system may generate third instructions from the third designated address to the contract address to obtain the third sum of stable value digital asset tokens and transfer said third sum to the third request public key. In Step S1422 C(2), the digital asset token issuer system may transfer to a third portable memory device, the third instructions. In Step S1422C(3), the third instructions may be transferred from the third portable memory device to the third computer. In Step S1422C(4), the third computer may digitally sign the third instructions using the third designated private key to generate the third digitally signed instructions. In Step S1422C(5), the third computer may transfer to a fourth portable memory device, the third digitally signed instructions. In Step S1422C(6), the third digitally signed instructions may be sent from the fourth portable memory device to the plurality of geographically distributed computer systems. In embodiments, the step of sending, from the fourth portable memory device to the plurality of geographically distributed computer systems, the third digitally signed instructions comprises the further steps of (i) transferring, form the fourth portable memory device to the digital asset computer system, the third digitally signed instructions; and (ii) transferring, from the digital asset computer system to the plurality of geographically distributed computer systems, the third digitally signed instructions. In embodiments, the first portable memory device and second portable memory device are the same portable memory device. In embodiments, the first portable memory device and second portable memory device are the different portable memory devices. In embodiments, the third portable memory device and fourth portable memory device are the same portable memory device. In embodiments, the third portable memory device and fourth portable memory device are the different portable memory devices.

Blockchain Based Dividend Using Stable Value Coin

Figure 11D:
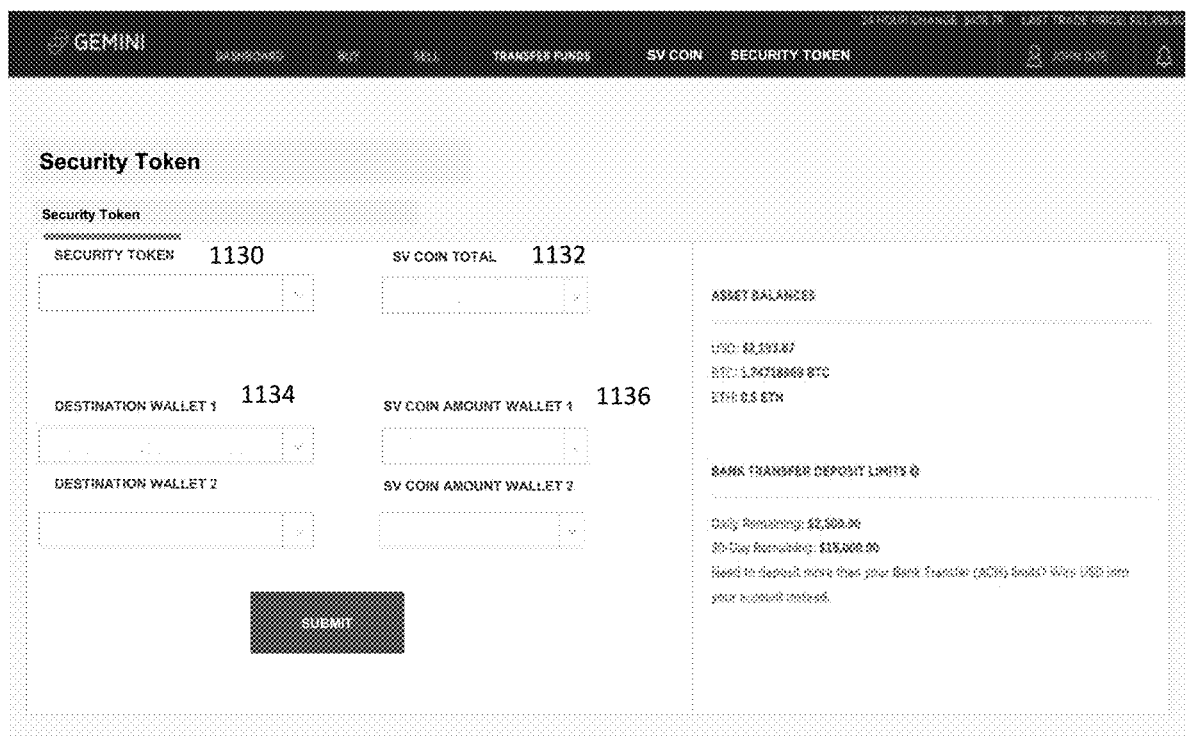
FIG. 11D illustrates an exemplary dashboard Security Token interface which allow Security Token issuers to provide instructions to transfer SVCoins to Security Token holders in accordance with exemplary embodiments of the present invention.

FIG. 11D illustrates an exemplary embodiment of a dashboard Security Token interface which allow Security Token issuers to provide instructions to transfer SVCoins to Security Token holders.

Referring to FIG. 12, an exemplary process flow reflecting an exemplary embodiment is shown where a Security Token issuer initiates a transfer of SVCoins to Security Token holders. It will be appreciated by those skilled in the art that the order of this process may be modified consistent with embodiments of the present invention.

In Step S1202, the Security Token issuer (who will generally by a registered user with the digital asset exchange) will log into the digital asset exchange. In embodiments, the SVCoin issuer is any trusted entity, including a digital asset exchange, bank, trust or other trusted entity. In embodiments, the Security Token issuer will be an authorized user, or otherwise qualified with respect to the trusted entity. In embodiments, the trusted entity may act as agent of the Security Token issuer to generate, distribute and maintain a ledger of SVCoins on behalf of the Security Token issuer.

In Step S1204, the Security Token issuer system, or any trusted entity system acting as agent, will navigate to the dashboard Security Token interface (see, e.g., FIG. 11D) to initiate a request for transfer of SVCoins to Security Token holders. While for purposes of illustration, the request is made via the dashboard Security Token interface, those of skill in the art will appreciate that the request may be made via API calls, submitted by electronic mail, and/or other electronic interactions, consistent with embodiments of the invention. In embodiments, the request shall identify: (i) the Security Token 1130; (ii) the total amount of SVCoins to be distributed 1132; (iii) the Security Token holder's digital asset addresses 1134; (iii) the amount of SVCoins to be distributed to each digital asset address 1136; and/or (iv) other information sufficient to calculate or otherwise determine this information. In embodiments, this information may be provided by providing the digital asset exchange, or other trusted entity system acting on behalf of the SVCoin issuer, with the access to the Security Token database, which would include the list of all current Security Token holders and their respective digital asset address and Security Token balances. In embodiments, the Security Token database may include a list of all current Security Token holders and digital asset addresses associated with each. In such embodiments, the Security Token issuer, may still need to provide the digital asset exchange system, or other trusted entity system, with the amount of SVCoins to be distributed, either individually and/or in total and how to prorate the distribution among Security Token holders.

In Step S1206, the digital asset exchange system, or other trusted entity system, may analyze and verify that the request can be properly processed. In step S1206-*a*, the digital asset exchange system, as the SVCoin issuer or on behalf of the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S1206-*b*, the digital asset exchange system, may also verify that the digital asset addresses, provided are each a valid digital asset addresses. To the extent any digital asset addresses are not verified, the transaction may be rejected, and/or the digital asset exchange system may enter into a reconciliation process with the Security Token issuer system or trusted entity system.

At step 1206-*c*, the digital asset exchange system, or other trusted entity system, may determine an amount of SVCoins to be distributed to each of the digital addresses of the Security Token holders. In embodiments, this determination may be made based on the total number of Security Token holders and the total amount of SVCoins requested by the Security Token issuer. In embodiments, the Security Token issuer may designate a specific sum of SVCoins per Security token. In embodiments, a total amount of SVCoins to be purchased may be designated in the request of the Security Token issue with directions to equally or proportionally divide the total sum between the Security Token holders.

In S1208, after the digital asset exchange system, or other trusted entity system, has confirmed that the user has sufficient fiat to cover the transaction, the digital asset exchange system may initiate the process of generating the requested SVCoin.

In S1208-*a*, the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange. In embodiments, this fiat is held in a custodial account of the exchange or an agent of the exchange.

In S1208-*b*, the digital asset exchange system, or other trusted entity system, shall generate instructions to generate the requested SVCoin tokens, including instructions to update the SVCoin token ledger database to reflect the addition of the new tokens and the corresponding digital asset addresses associated with such new SVCoin tokens.

In S1208-*c*, the digital asset exchange system, or other trusted entity system, shall publish to the blockchain network (e.g., the Ethereum Network) the transaction with instructions to be recorded by the blockchain network. In embodiments, a transaction fee may be required by, e.g., a miner, to process and add the requested transaction on the blockchain.

In embodiments, where SVCoin tokens have already been created and are maintained by the digital asset exchange system on reserve, S1208 may be replaced with S1208' as follows. In step 1208-*a*', the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange, or otherwise reserved by the trusted entity.

At step S1208-*b*', the digital asset exchange computer system, or other trusted entity system may then determine a portion of the reserve for transfer based on the requested amount of SVCoin identified by the Security Token issuer for transfer to the Security Token holder(s).

At step 1208-*c*', the digital asset exchange computer system, or other trusted entity system may update the SVCoin token ledger to change the address associated with the determined portion of the reserve SVCoin tokens to the address, or addresses, associated with the Security Token holder.

In S1210, the digital asset exchange computer system may send a message to the Security Token issuer registered user, and/or each of the designated digital asset addresses to reflect that the transaction was successfully processed. In embodiments, such messages may include information including: (i) digital asset address; (ii) the amount of tokens generated/or determined for transfer; and/or (iii) the new balances for the digital asset address or digital wallet associated therewith. In embodiments, the message may include additional information related to the Security Token, including: (iv) the amount of the Security Token held; (v) the dividend issued; and/or (vi) instructions on how to redeem the SVCoin.

Examples

The following examples illustrate embodiments of the present invention. They are not intended to be limiting. It will be appreciated by those of skill in the art that embodiments may be applied to other use cases not specifically called out herein, without departing from the present invention.

Example 1: Real Estate Investment Trust (REIT) Token

In embodiments, shares in a real estate investment trust ("REIT Trust") may be issued using a digital asset, such as a token on the Ether Network ("REIT Token"). The REIT Trust may hold income generating property such as real estate which is leased. As the income generating property generates fiat profits which are intended to be distributed to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the REIT Trust) to REIT Token holders at the respective REIT Token holder's digital asset addresses associated with the Ether Wallet holding the REIT Token.

In embodiments, the income generating property may generate profits in the form of digital assets. For example, one or more individuals may pay rent in one or more of: an SVCoin, a fiat-backed digital asset, a digital math-based asset, a digital asset, and/or a combination thereof, to name a few. The profits generated, which may be intended to be distributed to shareholders, may be deposited with a digital asset exchange and/or a digital asset exchange computer system, such as a regulated digital asset exchange like Gemini. In the case where profits are collected in SVCoin, the SVCoin may be distributed on a pro-rata basis (or as otherwise instructed by the REIT Trust) to REIT Token holders at the respective REIT Token holder's digital asset addresses associated with the Ether Wallet holding the REIT Token. In the case where profits are not collected in SVCoin, the digital assets may be converted into a SVCoin by the digital asset exchange. The SVCoin may then be distributed on a pro-rata basis (or as otherwise instructed by the REIT Trust) to REIT Token holders at the respective REIT Token holder's digital asset addresses associated with the Ether Wallet holding the REIT Token.

REIT Token holders may then use the SVCoin as a digital asset to conduct other transactions. Eventually, the SVCoin can be exchanged for fiat at the exchange based on the notional value (e.g., 1 SVCoin=1 dollar).

Example 2: Energy Master Limited Partnership (Energy MLP) Tokens

In embodiments, shares in an Energy Master Limited Partnership ("Energy MLP") may be issued using a digital asset, such as a token on the Ether Network ("Energy MLP Token"). The Energy MLP may offer shares (otherwise known as "units") in the form of a digital asset, such as Energy MLP Tokens that are publicly traded and which generate dividends to the shareholders. As the dividends are distributed on a periodic basis in the form of fiat currency, a corresponding amount of fiat is deposited with a digital asset exchange, such as a regulated digital asset exchange like Gemini. The fiat is then converted into a SVCoin by the Exchange. The SVCoin may then be distributed on a pro-rata basis (or as otherwise instructed by the Energy MLP) to Energy MLP Token holders at the respective Energy MLP Token holder's digital asset addresses associated with the Ether Wallet holding the Energy MLP Token.

Energy MLP Token holders may then use the SVCoin as a digital asset to conduct other transactions. Eventually, the SVCoin can be exchanged for fiat at the exchange based on the notional value (e.g., 1 SVCoin=1 dollar).

Example 3: Equity Security Tokens

In embodiments, equity shares corresponding to a stock certificate in an entity may be issued using a digital asset, such as a token on the Ether Network ("Equity Token"). As dividends based on the Equity Token are generated for distribution to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the entity distributing the shares) to Equity Token holders at the respective Equity Token holder's digital asset addresses associated with the Ether Wallet holding the Equity Token.

Equity Token holders may then use the SVCoin as a digital asset to conduct other transactions. Eventually, the SVCoin can be exchanged for fiat at the exchange based on the notional value (e.g., 1 SVCoin=1 dollar).

Example 4: Venture Capital (VC) Tokens

In embodiments, shares in a Venture Capital fund ("VC Fund") may be issued using a digital asset, such as a token on the Ether Network ("VC Token"). As the VC Fund generates returns to be distributed to investors in the VC Fund, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the VC Fund) to VC Token holders at the respective VC Token holder's digital asset addresses associated with the Ether Wallet holding the VC Token.

VC Token holders may then use the SVCoin as a digital asset to conduct other transactions. Eventually, the SVCoin can be exchanged for fiat at the exchange based on the notional value (e.g., 1 SVCoin=1 dollar).

Example 5: Private Equity (PE) Tokens

In embodiments, shares in a Private Equity fund ("PE Fund") may be issued using a digital asset, such as a token on the Ether Network ("PE Token"). As the PE Fund generates returns to be distributed to investors in the PE Fund, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the PE Fund) to PE Token holders at the respective PE Token holder's digital asset addresses associated with the Ether Wallet holding the PE Token.

PE Token holders may then use the SVCoin as a digital asset to conduct other transactions. Eventually, the SVCoin can be exchanged for fiat at the exchange based on the notional value (e.g., 1 SVCoin=1 dollar).

Example 6: Digital Certificate of Deposit (CD) Tokens

In embodiments, digital certificate of deposits ("Digital CD") may be issued using a digital asset, such as a token on the Ether Network ("CD Token"). As interest amounts are generated based on the terms of the certificate of deposits, a corresponding amount of fiat is to be deposited with a digital asset exchange, such as a regulated digital asset exchange like Gemini. The fiat is then converted into a SVCoin by the Exchange. Upon maturity of the Digital CD (or before maturity), the SVCoin may then be distributed on a pro-rata basis (or as otherwise instructed by the Digital CD issuer and/or less any premature withdrawal penalty) to CD Token holders at the respective CD Token holder's digital asset addresses associated with the Ether Wallet holding the CD Token.

CD Token holders may then use the SVCoin as a digital asset to conduct other transactions. Eventually, the SVCoin can be exchanged for fiat at the exchange based on the notional value (e.g., 1 SVCoin=1 dollar).

Example 7: Digital Bond Tokens

In embodiments, digital bonds may be issued using a digital asset, such as a token on the Ether Network ("Bond Token"). As interest amounts are generated based on the coupon rates of the digital bonds, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the digital bond issuer) to Bond Token holders at the respective Bond Token holder's digital asset addresses associated with the Ether Wallet holding the Bond Token.

Bond Token holders may then use the SVCoin as a digital asset to conduct other transactions. Eventually, the SVCoin can be exchanged for fiat at the exchange based on the notional value (e.g., 1 SVCoin=1 dollar).

Example 8: Peer-to-Peer Lending (P2P) Tokens

In embodiments, a peer-to-peer lending service ("P2P Service") may issue a digital asset, such as a token on the Ether Network ("P2P Loan Token"). As lending amounts and interest payments are distributed, corresponding amounts of fiat is deposited with a digital asset exchange, such as a regulated digital asset exchange like Gemini. The fiat is then converted into SVCoin by the Exchange. The SVCoin may then be distributed on a pro-rata basis (or as otherwise instructed by the lender/borrower) to P2P Loan Token holders at the respective P2P Loan Token holder's digital asset addresses associated with the Ether Wallet holding the P2P Loan Token.

P2P Loan Token holders may then use the SVCoin as a digital asset to conduct other transactions. Eventually, the SVCoin can be exchanged for fiat at the exchange based on the notional value (e.g., 1 SVCoin=1 dollar).

Example 9: Crowdfunding (CF) Tokens

In embodiments, a Crowdfunding service may issue a digital asset, such as a token on the Ether Network ("CF Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Crowdfunding service) to CF Token holders at the respective CF Token holder's digital asset addresses associated with the Ether Wallet holding the CF Token.

CF Token holders may then use the SVCoin as a digital asset to conduct other transactions. Eventually, the SVCoin can be exchanged for fiat at the exchange based on the notional value (e.g., 1 SVCoin=1 dollar).

Example 10: Real Estate Crowdsourcing Tokens

In embodiments, a Real Estate Crowdsourcing services may issue a digital asset, such as a token on the Ether Network ("RE Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Real Estate Crowdsourcing service) to RE Token holders at the respective RE Token holder's digital asset addresses associated with the Ether Wallet holding the RE Token. RE Token holders may then use the SVCoin as a digital asset to conduct other transactions. Eventually, the SVCoin can be exchanged for fiat at the exchange based on the notional value (e.g., 1 SVCoin=1 dollar).

Example 11: Artistic/Digital Rights Payment Tokens

In embodiments, tokens may be issued against an artistic work, such as a song or movie (DR Token), for example, as a token on the Ethereum network. As royalties are collected for use of the song or movie, a corresponding amount of fiat may be deposited with a digital asset exchange. The fiat may be converted into SVCoin and distributed on a pro-rata basis to the rights holders who are DR Token holders. More specifically, the SVCoin may be transferred the digital asset address associated with a wallet of a DR Token holder as a payment of royalties.

In embodiments, of the examples discussed above, the token holders may instigate payment of SVCoin by sending a request for payment. In this case, any transaction fees will be the responsibility of the token holder. In embodiments, the token issuer, or an agent thereof, may implement or instruct distribution of payments in which case transaction fees are the responsibility of the token issuer.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 29A-29D, the administrative portal may comprise an accounting computer 25 and a secure location 10, as described herein.

Figure 29A:
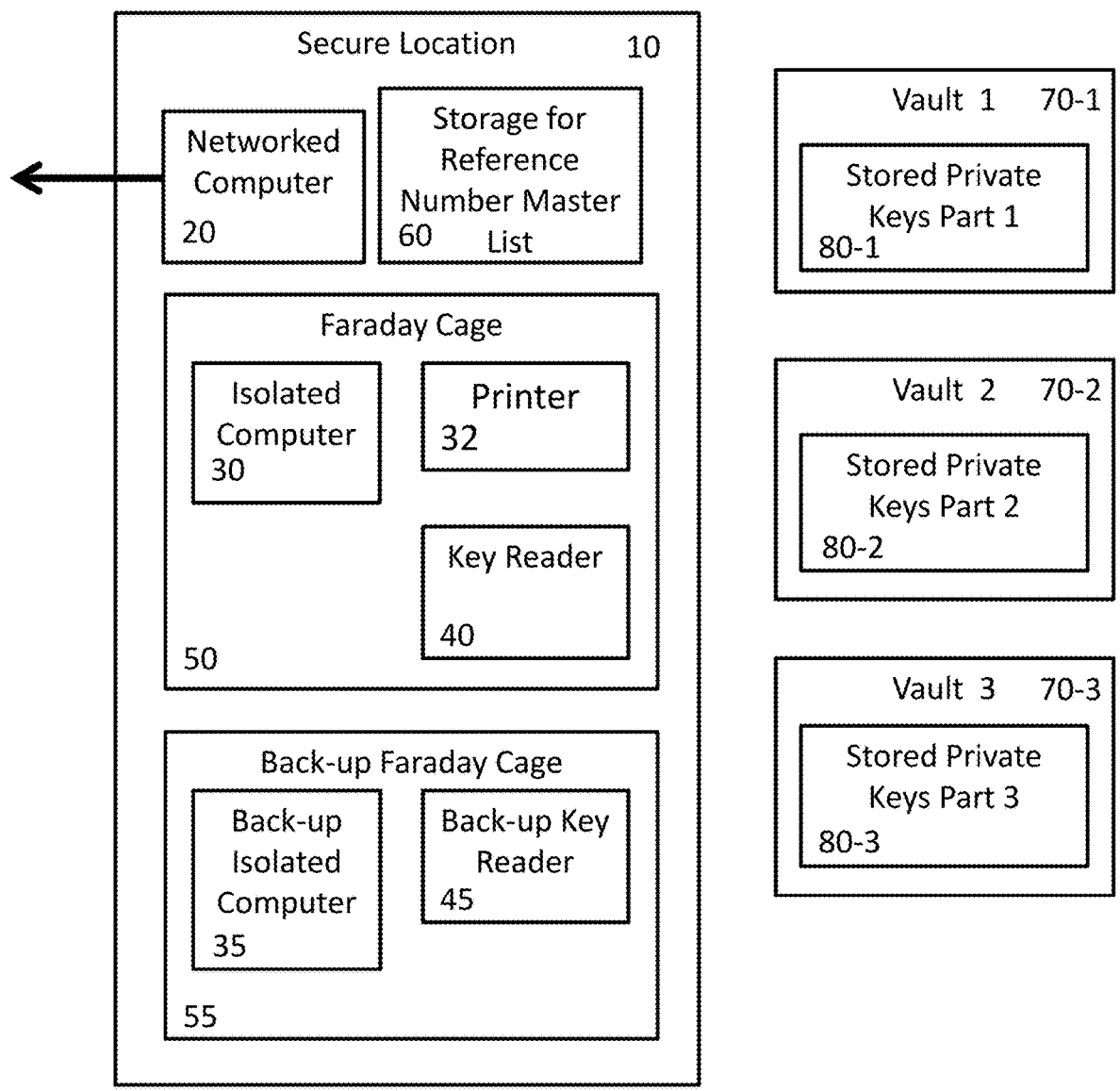
FIGS. 29A-29D are exemplary block diagrams of components of security systems for an ETP holding digital math-based assets in accordance with various exemplary embodiments of the present invention.

Referring to the exemplary embodiment illustrated in FIG. 29A, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIG. 29A, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIG. 29A, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIG. 29A, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that In embodiments, it may be desirable to limit the number or printers or other writing devices to as few as possible to reduce risk of exposure of private keys, while In embodiments, it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber. If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD-ROM, and/or DVD, to name a few. In embodiments, the keys and/or key segments may be printed on any substrate, including paper, *papyrus*, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scannable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, The Codebreakers: The Story of Secret Writing, 1967, ISBN 0-684-83130-9. See also, Bruce Schneier, Applied Cryptography, John Wiley & Sons, 1994, ISBN: 0-471-59756-2. The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authority may be required to initiated a retrieval of stored private keys.

Figure 29B:
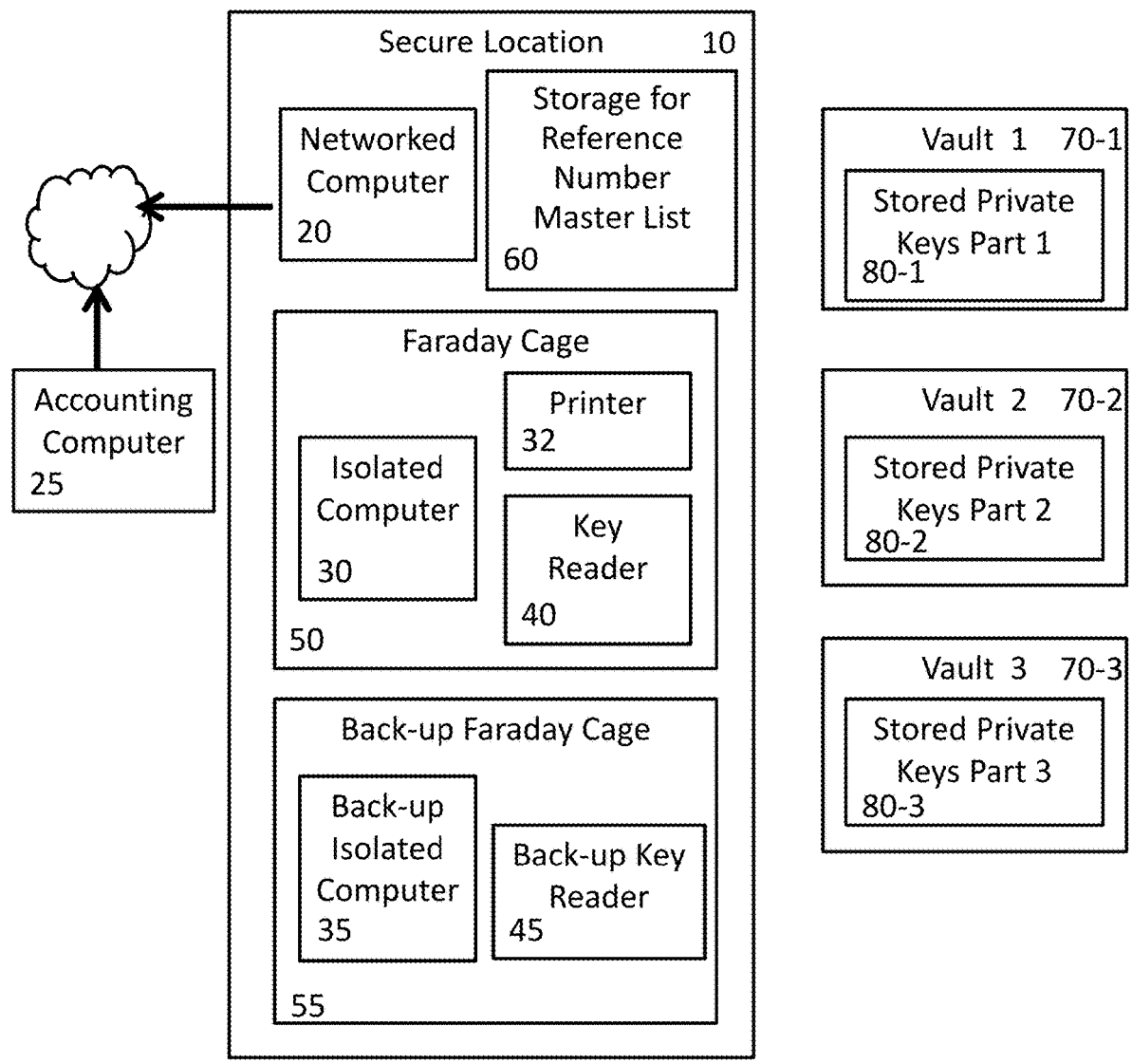
Figure 29C:
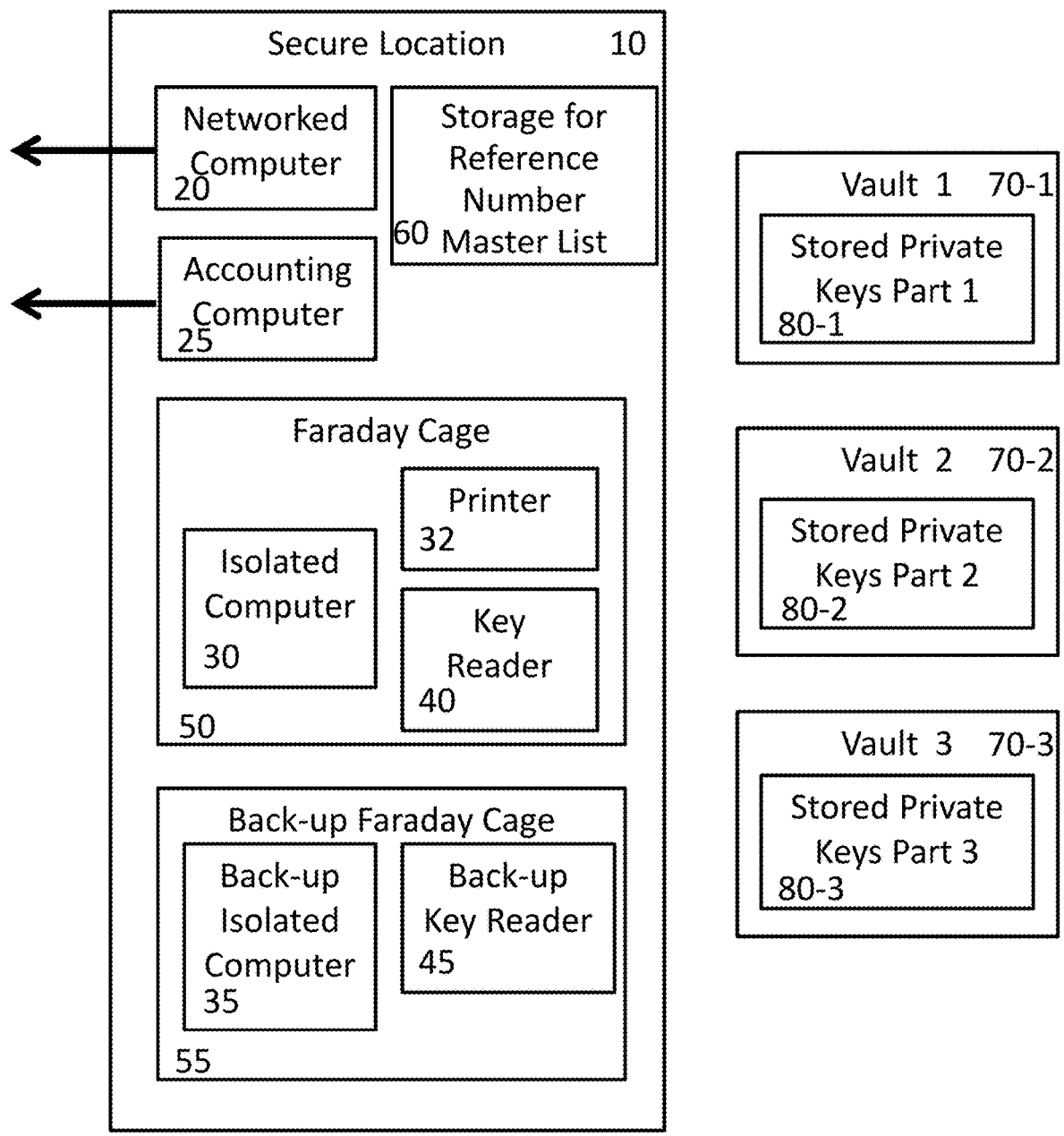

In embodiments, a back-up isolated computer 35 and/or a back-up key reader 45 may be provided at secure location 10, as illustrated in FIGS. 29A-29C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a bitcoin miner, may be located at or within the administrative portal. The miner may be one or more computers. In embodiments, the miner may be operationally connected to any of the computers and/or devices at the administrative portal described above.

Figure 29D:
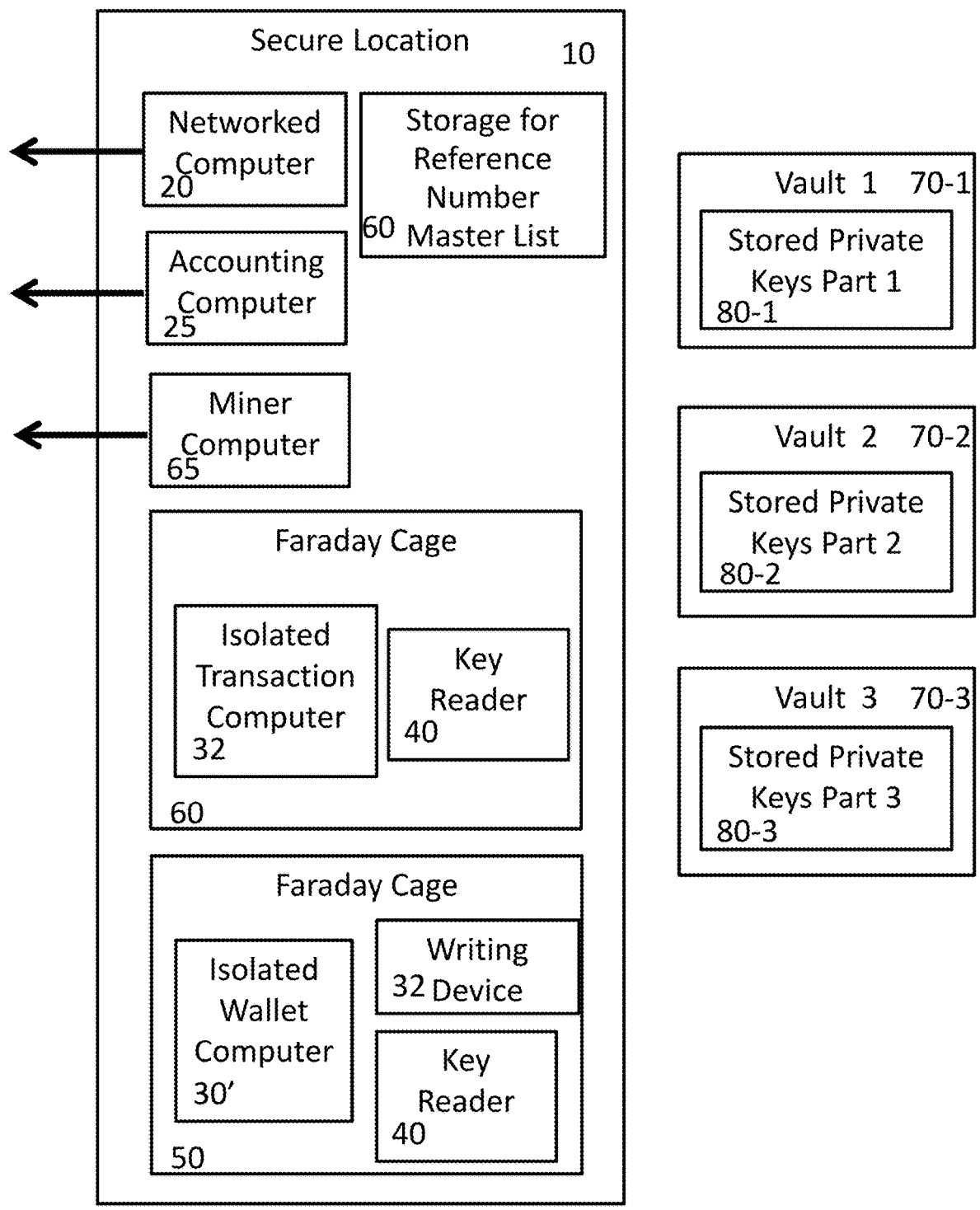

In embodiments, referring to FIG. 29D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3, 70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 29A-29D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 29A-29D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

Figure 30A:
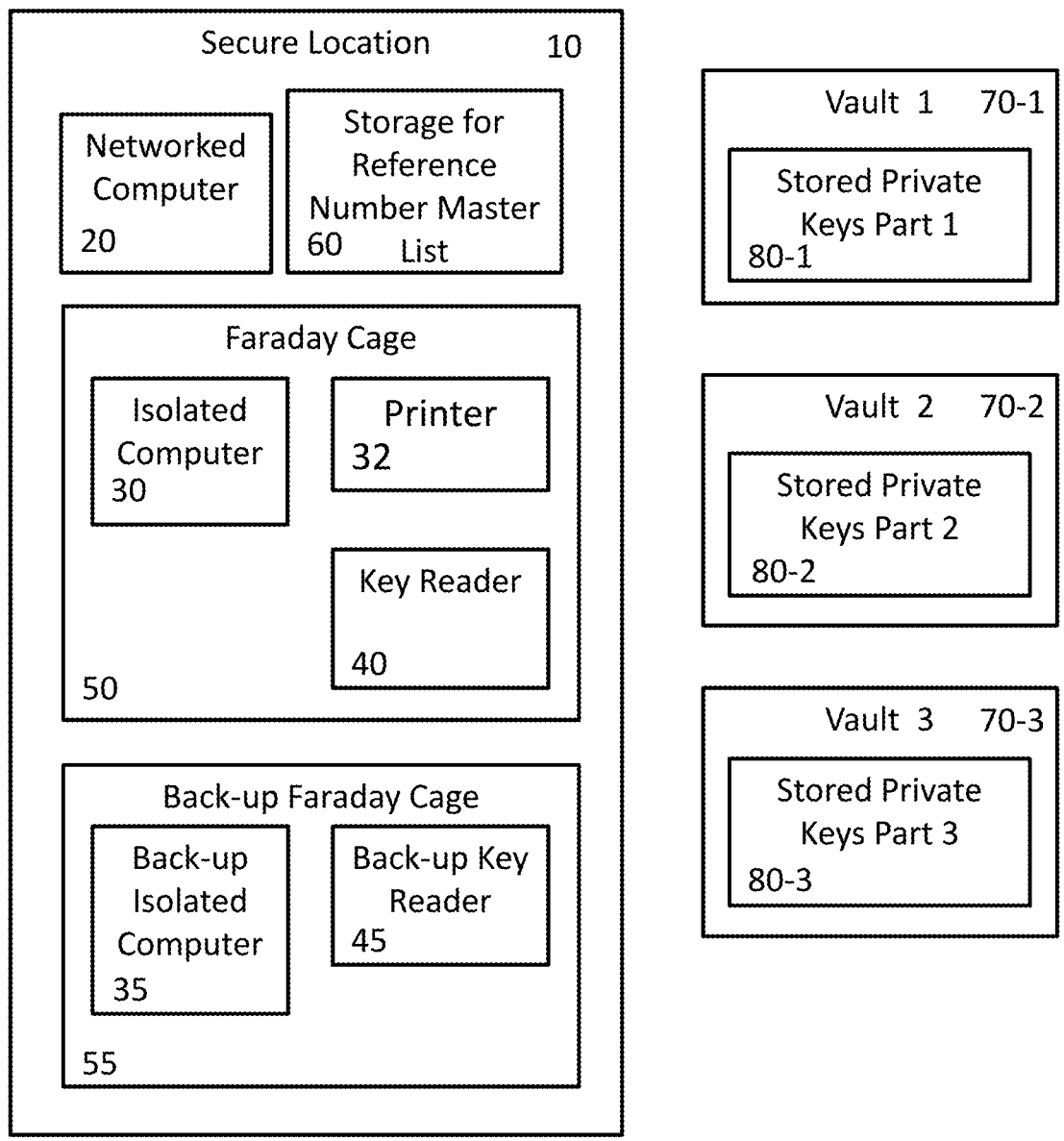
FIGS. 30A-30D are exemplary block diagrams of components of security systems for an exchange holding digital math-based assets in accordance with various exemplary embodiments of the present invention.
Figure 30B:
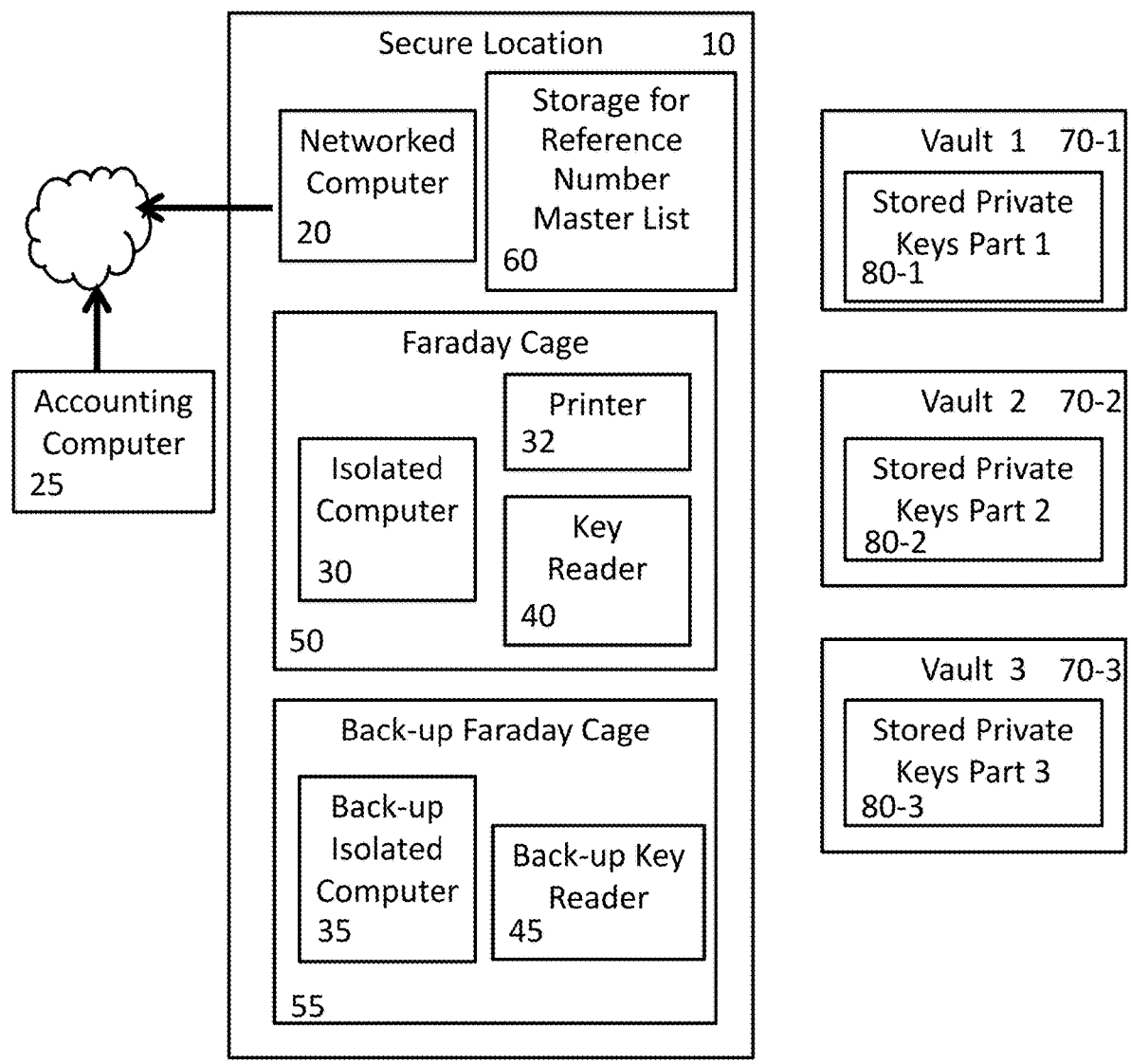
Figure 30C:
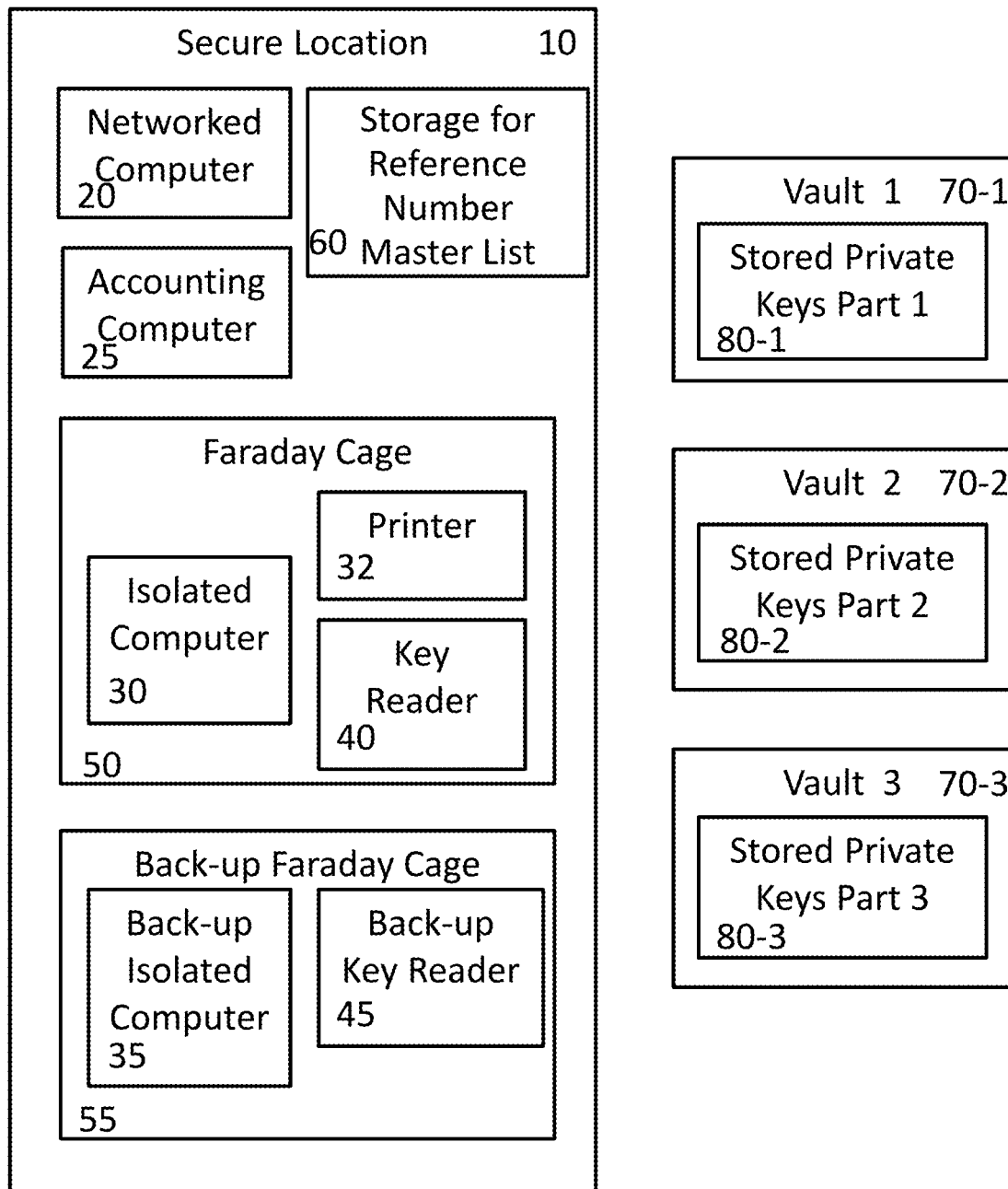
Figure 30D:
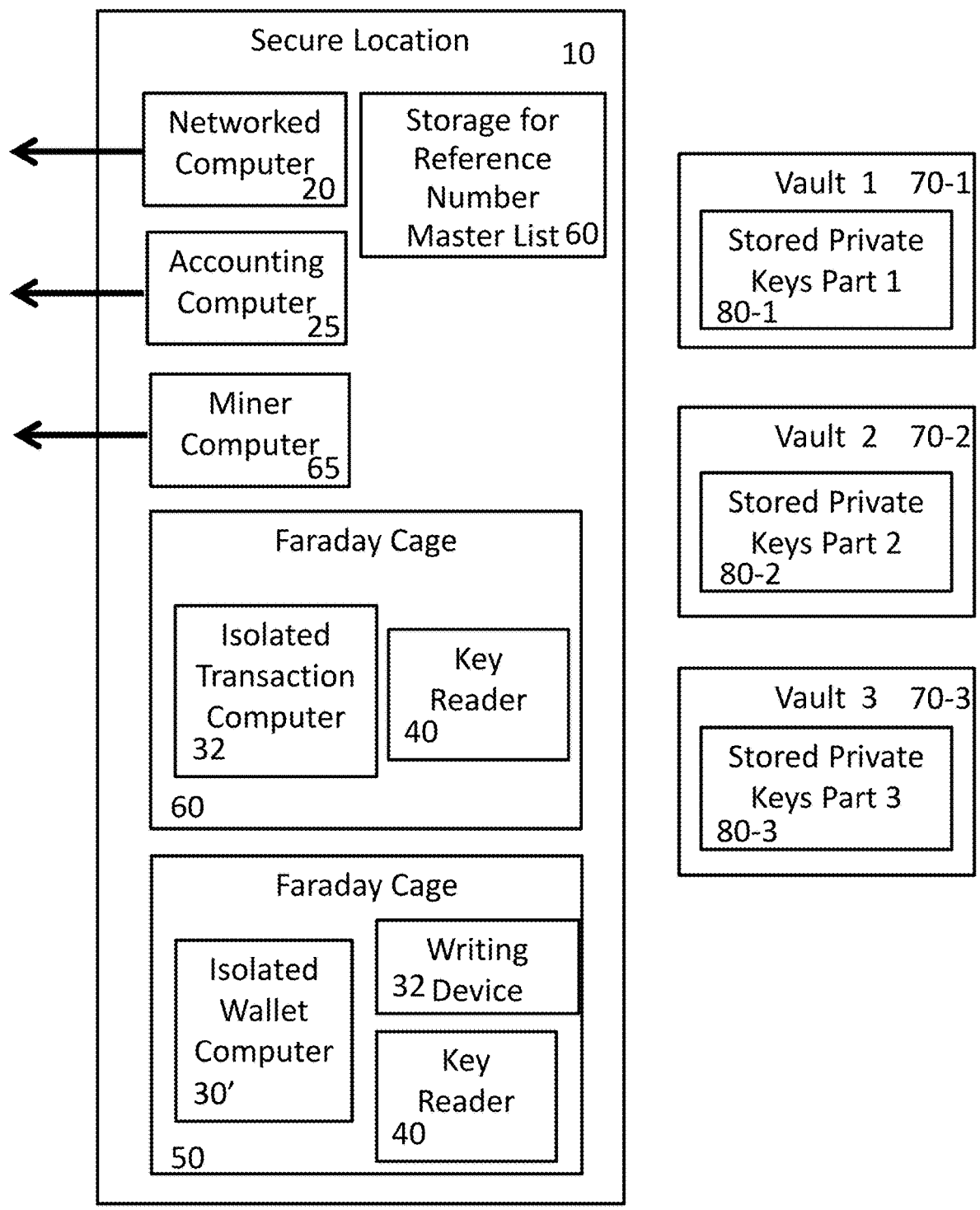

FIGS. 30A-30D illustrate exemplary embodiments of the present invention where one or more computers 25 running accounting software to account for the assets and/or expenses of an account holder can be located either within the secure location 10 (e.g., FIG. 30B) or outside of the secure location 10 (e.g., FIG. 30C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital cryptocurrency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Figure 23:
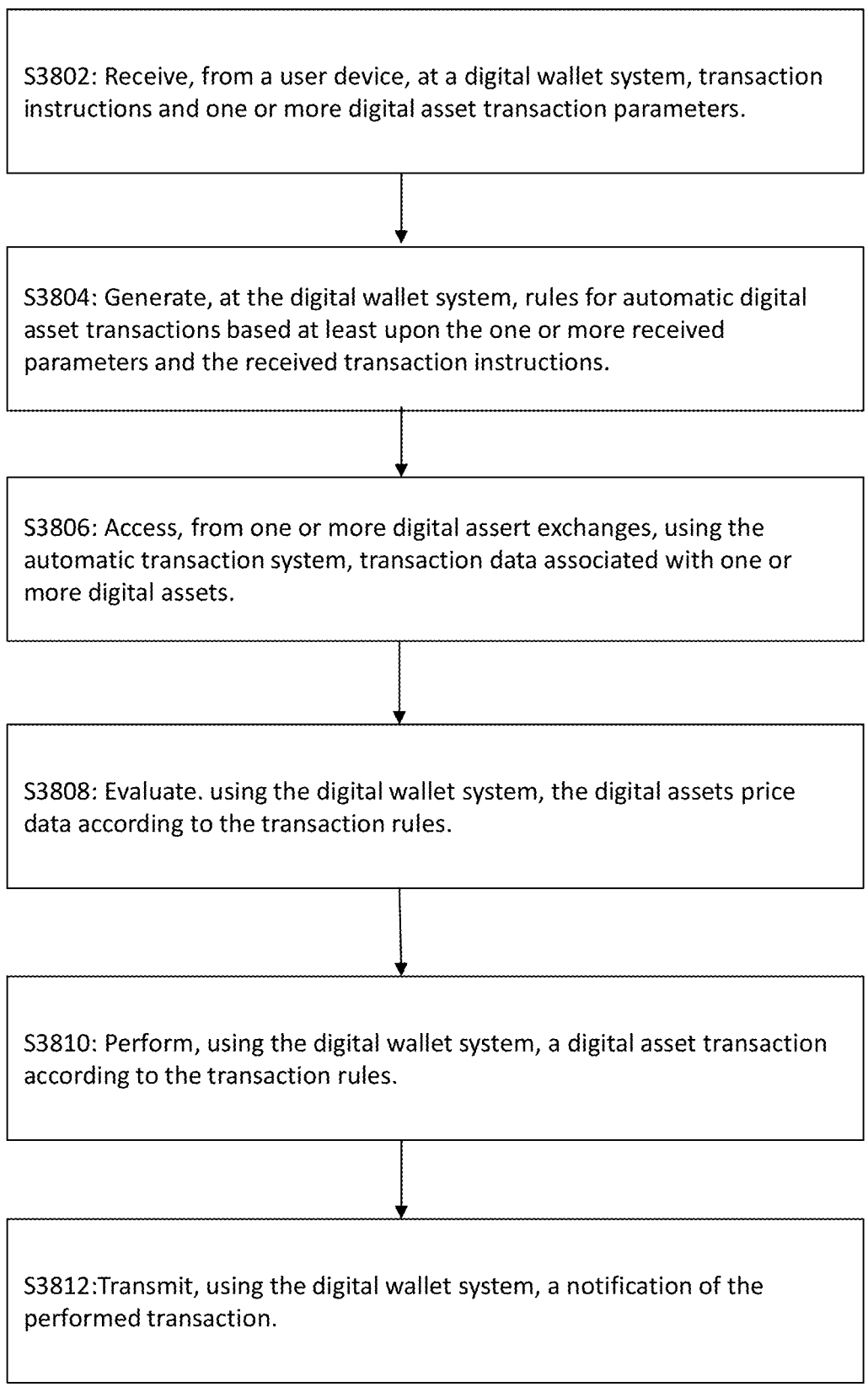
FIG. 23 is an exemplary flow chart for a process for converting from, to or between digital assets in accordance with exemplary embodiments of the present invention.

The digital asset exchange computer system 3230 may be used to convert digital assets into fiat or other digital assets as well as to exchange fiat for digital assets. In embodiments, a digital asset exchange computer system 3230 may include one or more databases that are used to store user account authentication data, fiat account data, digital wallet data, digital asset customer account data and transaction data, including transaction parameters and transaction instructions. A digital wallet system is operatively connected to a decentralized digital asset network that uses a decentralized electronic ledger in the form of a blockchain maintained by a plurality of physically remote computer systems to track at least one of asset ownership or transactions in a digital asset exchange system. The digital wallet system includes one or more digital wallet modules. FIG. 23 illustrates an exemplary process by which the digital exchange computer system including the digital wallet system conducts transactions. The digital wallet system receives, from a user device, transaction instructions and one or more transaction parameters associated with a transaction as indicated in step S3802. In embodiments, the transactions parameters include on or more of (1) a digital asset strike price as a threshold for sale of a specified amount of digital assets when the price equals, rises above or falls below a predefined threshold, wherein the amount of digital assets to transact may be specified in a different denomination; (2) digital asset denominations; (3) digital asset amounts; (4) time periods; (5) rates of change; or (6) absolute amounts of change. The transaction instructions include at least one of the following (1) buy; (2) sell; (3) hold; or (4) convert to a different denomination of digital asset or fiat currency.

In embodiments, the digital wallet system generates transaction rules for automatic digital asset transactions based at least the one or more received transaction parameters and the received transaction instructions as indicated at step S3804. The transaction rule include computer code running on the one or more computers to perform a transaction when one or more specified conditions are met or not met, based on the rules.

In embodiments, the digital wallet system accesses transaction data including price data associated with the specified amount of digital assets and stores the transaction data in the one or more databases as indicated in step S3806. In an embodiment the digital wallet system may access the transaction data using an application programming interface of an exchange agent. At step S3808, the digital wallet system evaluates the price data according to the transaction rules and, at step S3810, performs automated transactions when pre-defined conditions are met or not met in accordance with the transaction rules and the price data. This evaluation may include testing the transaction data against one or more logical conditions embodied in the transaction rules. In embodiments, these logical conditions include determining at least one of whether the digital asset price has reached or crossed a threshold value; or whether a rate of change in price has reached or crossed a threshold value. The digital wallet system may format the transaction data to be compatible with the digital wallet system.

In embodiments, at step S3812, the digital wallet system may generate one or more notifications to one or more user devices, with the notices includes at least one of a status update on transactions; notification of at least one of incomplete, pending or failed transactions; a log of all transactions as performed by at least one of the digital wallet system or by a user and a log of all transaction opportunities, including transactions declined or not otherwise authorized and transmits the one or more notifications to the user devices.

The digital asset exchange computer system may also include a fund transfer system including a fiat account funding and redemption system, a digital asset account funding and redemption system operatively connected to the digital wallet system and operatively connected to the decentralized digital asset network and a settlement engine operatively connected to the decentralized digital asset network and configured to carry out transactions. The settlement engine may be configured to process specified customer transactions to purchase or sell digital assets according to a user's instructions, if certain user specified factors are met. The user specified factors include that at least one of digital assets are: (a) within a given price, (b) quantity, or (c) period of time. In embodiments, the settlement engine may perform steps of holding, by the digital asset exchange computer system, funds in escrow until a buyer's payment of fiat is received into a bank account; receiving, by the digital asset exchange computer system from a digital asset buyer device, a notification of received digital assets from a digital asset seller; and providing, by the digital asset exchange computer system to a bank computer system associated with a digital asset exchange bank, an instruction to release the digital asset buyer's funds to the digital asset seller. The settlement engine may include pre-program instructions to transfer an amount of digital assets from a seller wallet to at least one buyer wallet upon the occurrence of user specified conditions.

In embodiments, the transaction may be at least one of formation, buying and selling of derivative products, including call options and put options. In embodiments, the transaction may be at least one or more of digital asset lending, delayed settlements, derivative swaps, futures and forwards, to name a few.

In embodiments, the digital asset account funding and redemption system is configured to process funding of a digital asset account held by the exchange from an exchange customer by receiving, by the digital asset exchange computer system, an initial transfer of digital assets; receiving, by the digital asset exchange computer system, a confirmation of clearance of the digital asset transfer; and updating, by the digital asset exchange computer system, an existing customer account in the one more or more databases with the received digital assets including making an electronic entry in an exchange digital asset electronic ledger and providing a notification that digital assets are received.

In embodiments, the digital asset account funding and redemption system is configured to process withdrawing a digital asset account held by the exchange from an exchange customer. For example, the digital asset account funding and redemption system may provide a withdrawal interface to a first customer user device associated with a first customer, receive user first withdrawal data including at least a first destination wallet address and a first request digital wallet asset withdrawal amount value from the first customer user device, verify that the first digital asset account associated with the first customer contains sufficient digital assets to cover the requested withdrawal amount by reading a digital asset electronic ledger to determine a first digital asset account balance; update the exchange digital asset electronic ledger to reflect the first withdrawal data as pending, execute a first withdrawal based on the first withdrawal data by broadcasting the first withdrawal to a digital asset network electronic ledger, monitor the network digital asset ledger to determine that a transaction based on the first withdrawal is confirmed and update the digital asset ledger to reflect confirmation of the first withdrawal. In embodiments, the digital wallet system may request authority from a user to proceed with the automated transactions before executing the automated transactions. In embodiments, the digital wallet system may require receipt of a user's authorization before performing a transaction by at least one of telephone dialing a number and entering specified digits, text message, email, or via a computer application or a user's mobile wallet. In embodiments, the digital wallet system will automatically perform the transaction if no response is received within a predetermined amount of time set by a user in advance or by default.

The digital asset exchange computer system may also include a fraud analysis system configured to detect fraudulent and/or unauthorized transactions.

In embodiments, the digital math-based asset is bitcoin. In embodiments, the digital math-based asset is based on a mathematical protocol for proof of work. The mathematical protocol may be open source. In embodiments, the mathematical protocol includes a one-way cryptographic algorithm. In embodiments, the mathematical protocol includes a sequential hard memory function. The digital math-based asset may be based on a mathematical protocol for proof of stake and is open source. In embodiments, the digital math-based asset is based on a cryptographic mathematical protocol. The digital math-based asset may be based on a mathematical protocol for a hybrid of proof of work and proof of stake. The digital math-based asset may be based on a mathematical protocol for proof of stake velocity. The mathematical protocol may rely upon ownership of respective digital math-based asset as a function of duration of ownership. The digital math-based asset may be based on a mathematical protocol for proof of burn.

In embodiments, a number of digital math-based assets in the decentralized digital assert network is limited. In embodiments, a number of digital math-based assets in the decentralized digital assert network is not limited. A specified number of digital math-based assets in the decentralized digital asset network may be added into circulation during a defined time period.

In embodiments, the digital wallet is activated by a private key, which is mathematically related to a public address in a one-way function. In embodiments, the digital wallet includes a multi-signature account which requires a plurality of private keys to access the digital assets held by the multi-signature account. In embodiments, more keys are generated for the multi-signature account than are required to access and/or use an account.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of exchange withdrawals, deposits, exchange transactions (e.g., purchases and sales), purchase order receipts, and/or sell order receipts, to name a few) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 36D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer. "Air gap, air wall or air gapping" is a network security measure employed on one or more computers to ensure that a secure computer network is physically isolated from unsecured networks, such as the public Internet or an unsecured local area network. The name arises from the technique of creating a network that is physically separated (with a conceptual air gap) from all other networks. To prevent unauthorized data extrusion through electromagnetic or electronic exploits, there is often a specified amount of space between the air gapped system and outside walls and between its wires and the wires for other technical equipment. For a system with extremely sensitive data (such as a private key of a digital asset account), as explained previously, a Faraday cage can be used to prevent electromagnetic radiation (EMR) escaping from the air-gapped equipment.

Figure 32A:
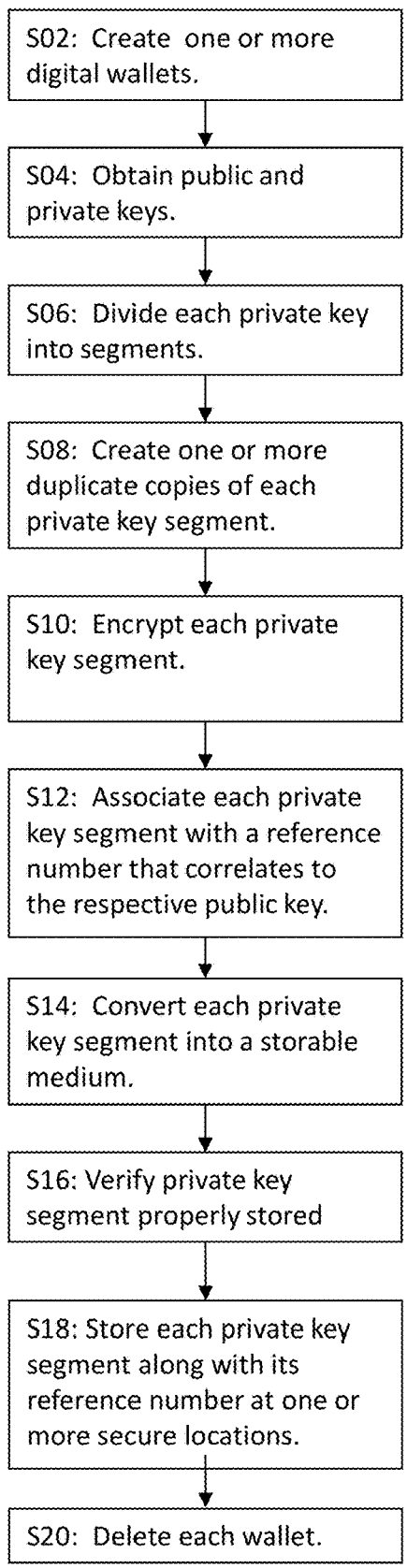
FIGS. 32A-32B are flow charts of exemplary processes for creating and securing digital wallets in accordance with exemplary embodiments of the present invention.
Figure 32B:
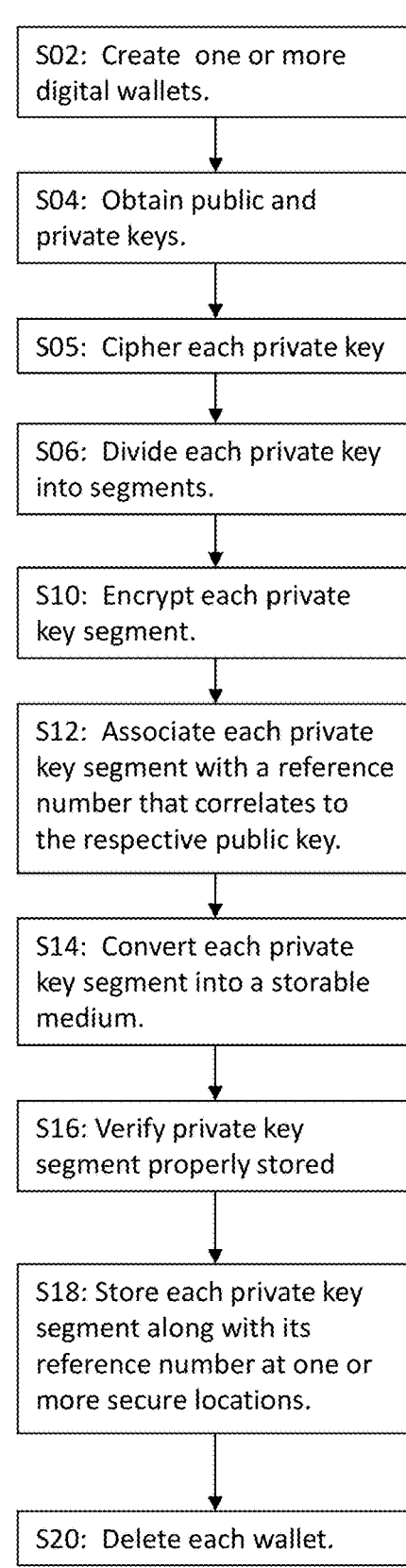

FIG. 32A illustrates an exemplary embodiment of a process for creating digital wallets and storing their keys. In step S02 one or more digital wallets may be created using one or more isolated wallet computers 30'. In step S04, the public and private keys associated with the created digital wallets may be obtained using one or more isolated wallet computers 30'. In embodiments, referring to FIG. 32B, In step S05 each private key may be ciphered. In step S06, each private key, which may be a ciphered private key following step S05, may be divided into segments. In step S08, one or more duplicate copies of each private key segment may be created. In some embodiments, the private key may be divided into 2, 3, 4 or more segments. In embodiments, each private key segment may be encrypted or otherwise encoded In step S10. In embodiments, steps S08 and/or S10 may be skipped. In step S12, each private key segment may be associated with a reference number, correlating the private key segment to the respective public key and/or indicating the order of the private key segment within the complete key. In step S14, each encrypted private key segment may be converted to a storable medium, such as by printing each private key segment on paper. In step S16, the private key segment as converted in the storable medium (e.g., printed) is verified to confirm it was properly and retrievable stored. In embodiments, this step may be skipped. In step S18, each private key segment is stored along with its reference number at one or more secure locations. In step S20, each digital wallet is deleted, leaving the stored keys as a means to regenerate the wallets.

Figures 33A, 33B:
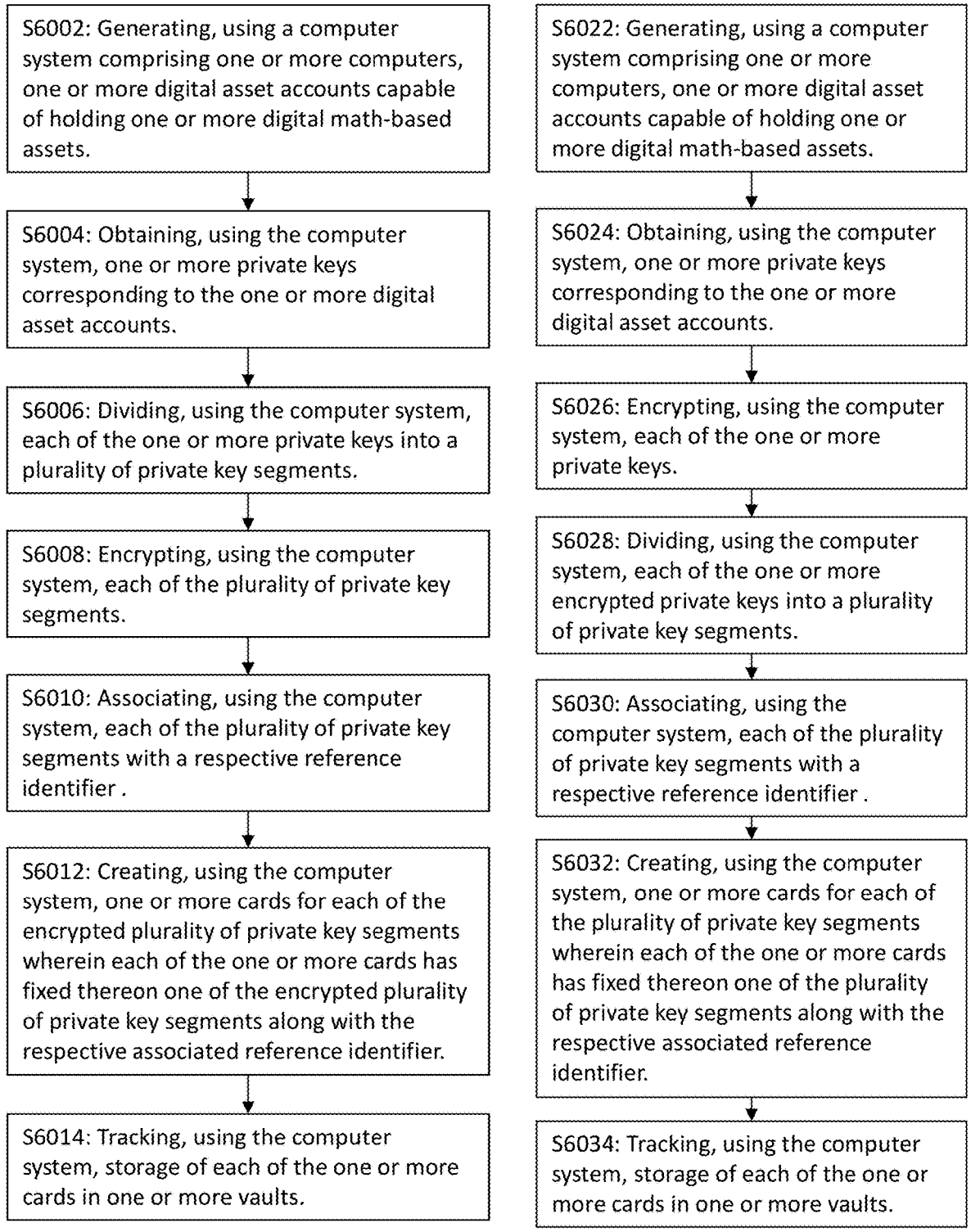
FIGS. 33A-33D are flow charts of exemplary processes for generating digital asset accounts and securely storing the keys corresponding to each account in accordance with exemplary embodiments of the present invention.

FIG. 33A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In step S6004, the computer system may be used to obtain one or more private keys corresponding to the one or more digital asset accounts. In embodiments, the private keys may be generated as part of the digital asset account creation process.

In step S6006, the computer system may be used to divide each of the one or more private keys into a plurality of private key segments. In embodiments, such as with a multi-signature wallet, at least one private key for each digital asset account may be divided into private key segments.

In step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scannable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets, and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

FIG. 33B is a flow chart of another exemplary process for generating digital asset accounts and securely storing the keys corresponding to each account.

In step S6022, a computer system comprising one or more computers may be used to generate one or more digital asset accounts capable of holding one or more digital math-based assets, as described with respect to step S6002 of FIG. 6A.

In step S6024, the computer system may be used to obtain one or more private keys corresponding to the one or more digital asset accounts, as described with respect to step S6004 of FIG. 6A.

In step S6026, the computer system may be used to encrypt each of the one or more private keys.

After encryption, In step S6028, the computer system may be used to divide each of the encrypted private keys into a plurality of key segments.

In step S6030, the one or more computers may be used to generate and/or associate each of the plurality of private key segments with a respective reference identifier.

In step S6032, the one or more computers may be used to create one or more cards for each of the plurality of private key segments.

In step S6034, the one or more computers may be used to track storage of each of the one or more cards in one or more vaults.

Figure 33C:
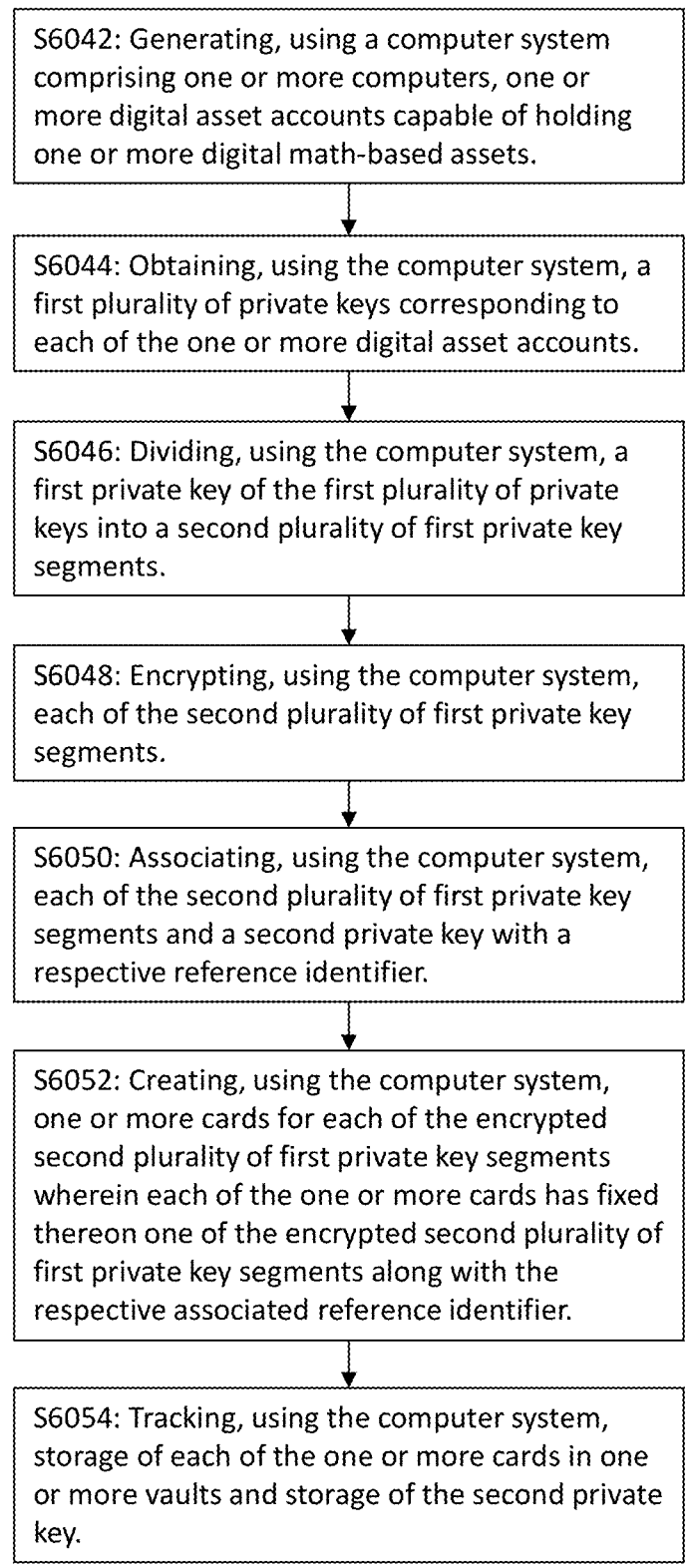

FIG. 33C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In step S6042, a computer system comprising one or more computers may be used to generate one or more digital asset accounts capable of holding one or more digital math-based assets.

In step S6044, the computer system may be used to obtain a first plurality of private keys corresponding to each of the one or more digital asset accounts. Each first plurality of private keys can comprise the private keys of a multi-signature account.

In step 6046, the computer system may be used to divide a first private key of the first plurality of private keys into a second plurality of first private key segments. For a multi-signature digital asset account at least one of the private keys may be divided into private key segments.

In step S6048, the computer system may be used to encrypt each of the second plurality of first private key segments. In embodiments, the second key may be encrypted.

In step S6050, the computer system may be used to generate and/or associate each of the second plurality of first private key segments with a respective reference identifier.

In step S6052, the computer system may be used to create one or more cards for each of the encrypted second plurality of first private key segments wherein each of the one or more cards has fixed thereon one of the encrypted second plurality of first private key segments along with the respective associated reference identifier. In embodiments, the second key may be written, e.g. using the writing device, to one or more physical substrates, such as paper, plastic, and/or metal. In other embodiments, the second key may be stored electronically.

In step S6054, the computer system may be used to track storage of each of the cards in one or more vaults, as well as to track storage of the second private key. A reference identifier master list may identify the storage locations of each key and key segment.

Figure 33D:
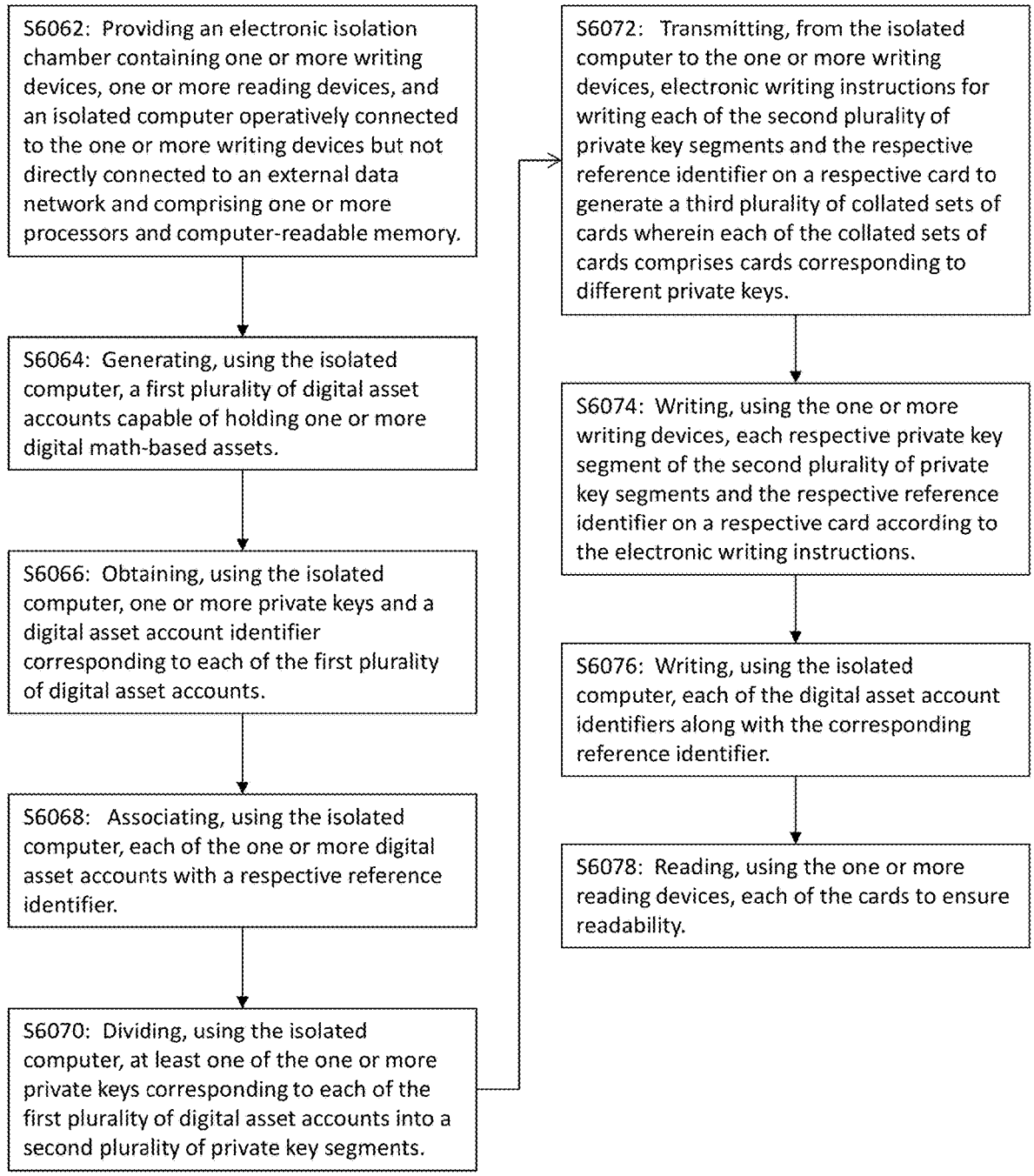

FIG. 33D is a flow chart of an exemplary process for securely generating digital asset accounts and storing associated keys using a secure portal.

In step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In step S6064, the isolated computer may be used to generate a first plurality of digital asset accounts capable of holding one or more digital math-based assets. In embodiments, the first plurality of digital asset accounts may comprise multi-signature digital asset accounts.

In step S6066, the isolated computer may be used to obtain one or more private keys and a digital asset account identifier corresponding to each of the first plurality of digital asset accounts.

In step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scannable code, such as a bar code and/or a QR code.

In step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, the electronic storage medium could include a hardware storage module ("HSM"). In embodiments, writing according to the second writing instructions can comprise writing to a physical storage medium, such as paper.

In step S6078, the one or more reading devices may be used to read each of the cards to ensure readability. In embodiments, step S6078 may be performed after step S6076. In embodiments, step S6078 may be performed before step S6076.

In embodiments, the process illustrated by FIG. 33D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 29B and 29C illustrate exemplary embodiments of the present invention where one or more computers 25 running accounting software to account for the assets and/or expenses of an account holder can be located either within the secure location 10 (e.g., FIG. 29B) or outside of the secure location 10 (e.g., FIG. 29C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 29D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

Figure 34:
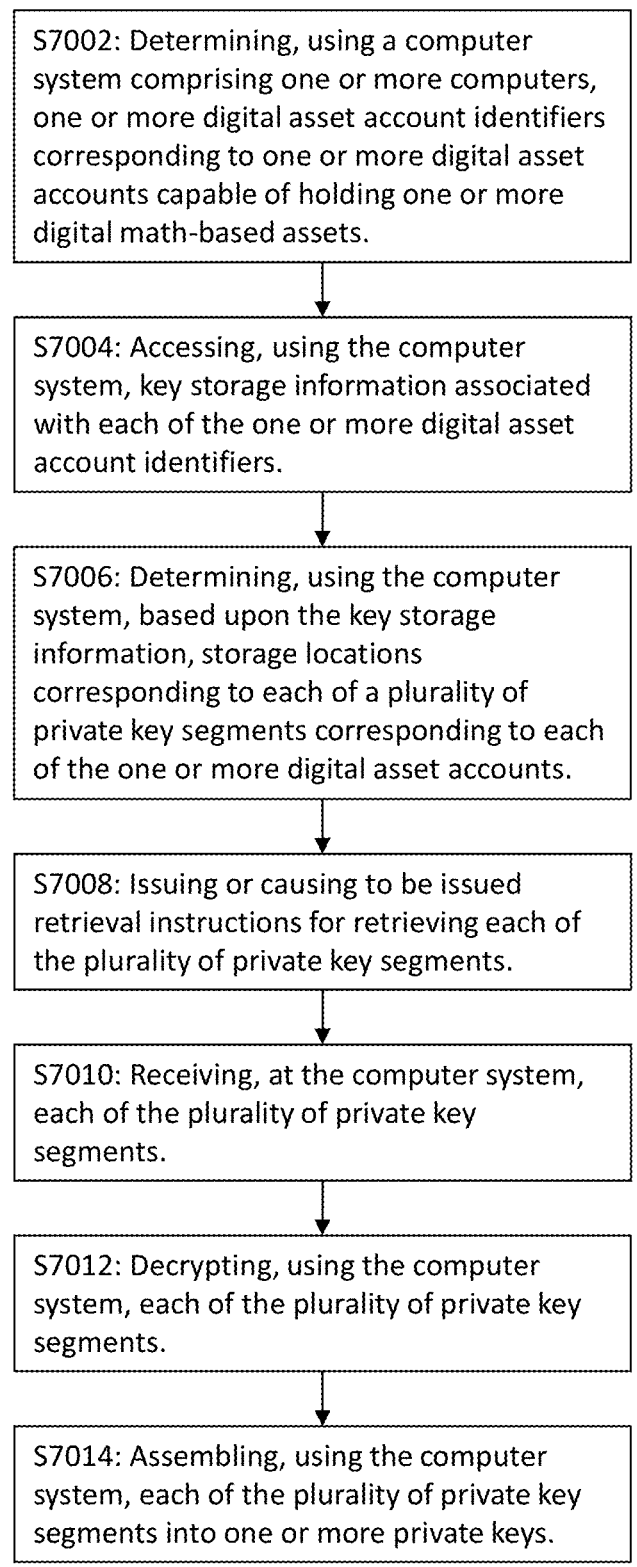
FIG. 34 is a flow chart of an exemplary process for retrieving securely stored keys associated with a digital asset account in accordance with exemplary embodiments of the present invention.

FIG. 34 is a flow chart of a process for retrieving securely stored private keys in accordance with exemplary embodiments of the present invention.

In exemplary embodiments, in step S702, a computer system comprising one or more computers may be used to determine one or more digital asset account identifiers corresponding to one or more digital asset accounts capable of holding one or more digital math-based assets.

In step S704, the computer system may be used to access key storage information associated with each of the one or more digital asset account identifiers. In embodiments, the key storage information may comprise a reference identifier associated with one or more stored private key segments.

In step 706, the computer system may be used to determine, based upon the key storage information, storage locations corresponding to each of a plurality of private key segments corresponding to each of the one or more digital asset accounts.

In step 708, retrieval instructions for retrieving each of the plurality of private key segments may be issued or caused to be issued.

In step 710, each of the plurality of private key segments may be received at the computer system.

In step 712, the computer system may be used to decrypt each of the plurality of private key segments.

In step 714, the computer system may be used to assemble each of the plurality of private key segments into one or more private keys.

In embodiments, the process depicted in FIG. 34 may further comprise the step of accessing, using the computer system, the one or more digital asset accounts associated with the one or more private keys. In further embodiments, the process depicted in FIG. 34 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

Figure 35:
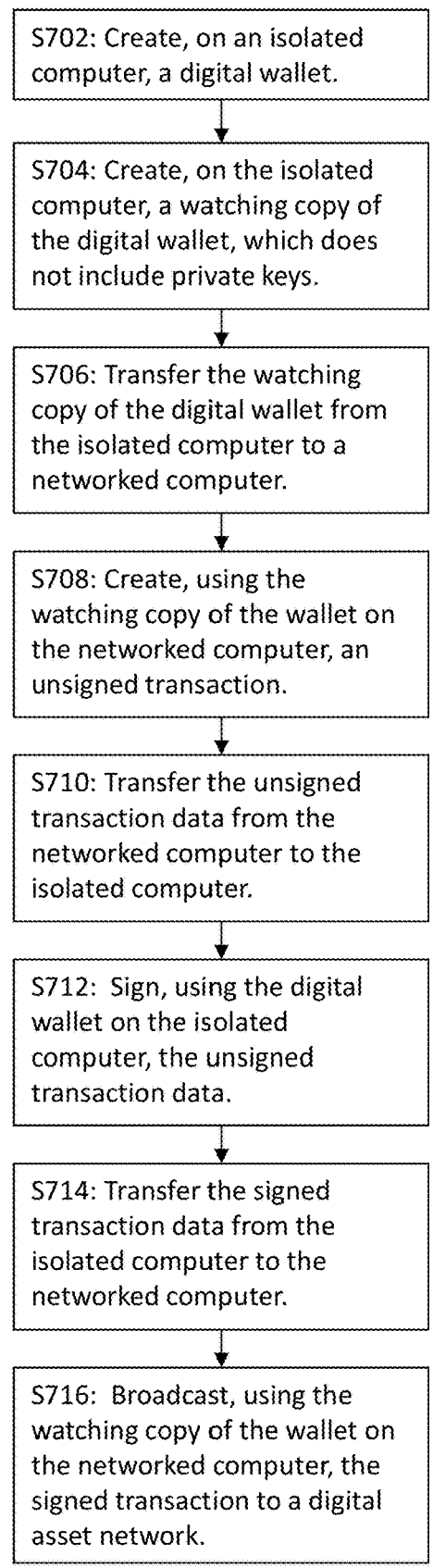
FIG. 35 is a flow chart of a method of performing a secure transaction in accordance with exemplary embodiments of the present invention.

FIG. 35 describes an exemplary method of performing secure transactions. In step S702, a digital wallet may be created on an isolated computer. In step S704, a watching copy of the digital wallet, which may not include any private keys, may be created on the isolated computer. In step S706, the watching copy of the digital wallet may be transferred from the isolated computer to a networked computer. In step S708, an unsigned transaction may be created using the watching copy of the wallet on the networked computer. In step S710, data associated with the unsigned transaction may be transferred from the networked computer to the isolated computer. In step S712, the unsigned transaction data may be signed using the digital wallet on the isolated computer. In step S714, the signed transaction data may be transferred from the isolated computer to the networked computer. In step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 31A:
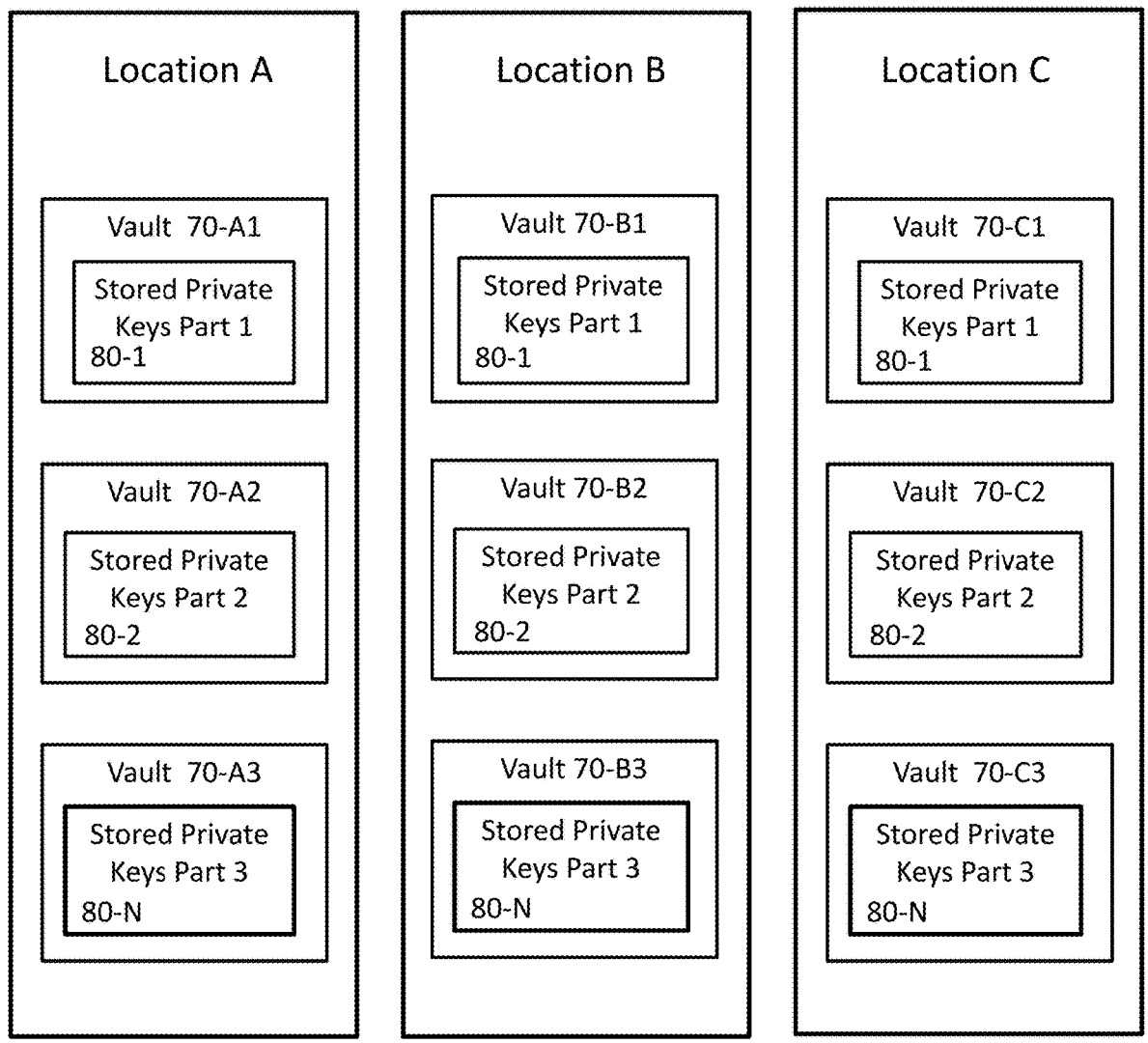
FIGS. 31A-31D are schematic diagrams of cold storage vault systems in accordance with exemplary embodiments of the present invention.

FIG. 31A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia, Pa. and Location C may be Indianapolis, Ind.). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 31B:
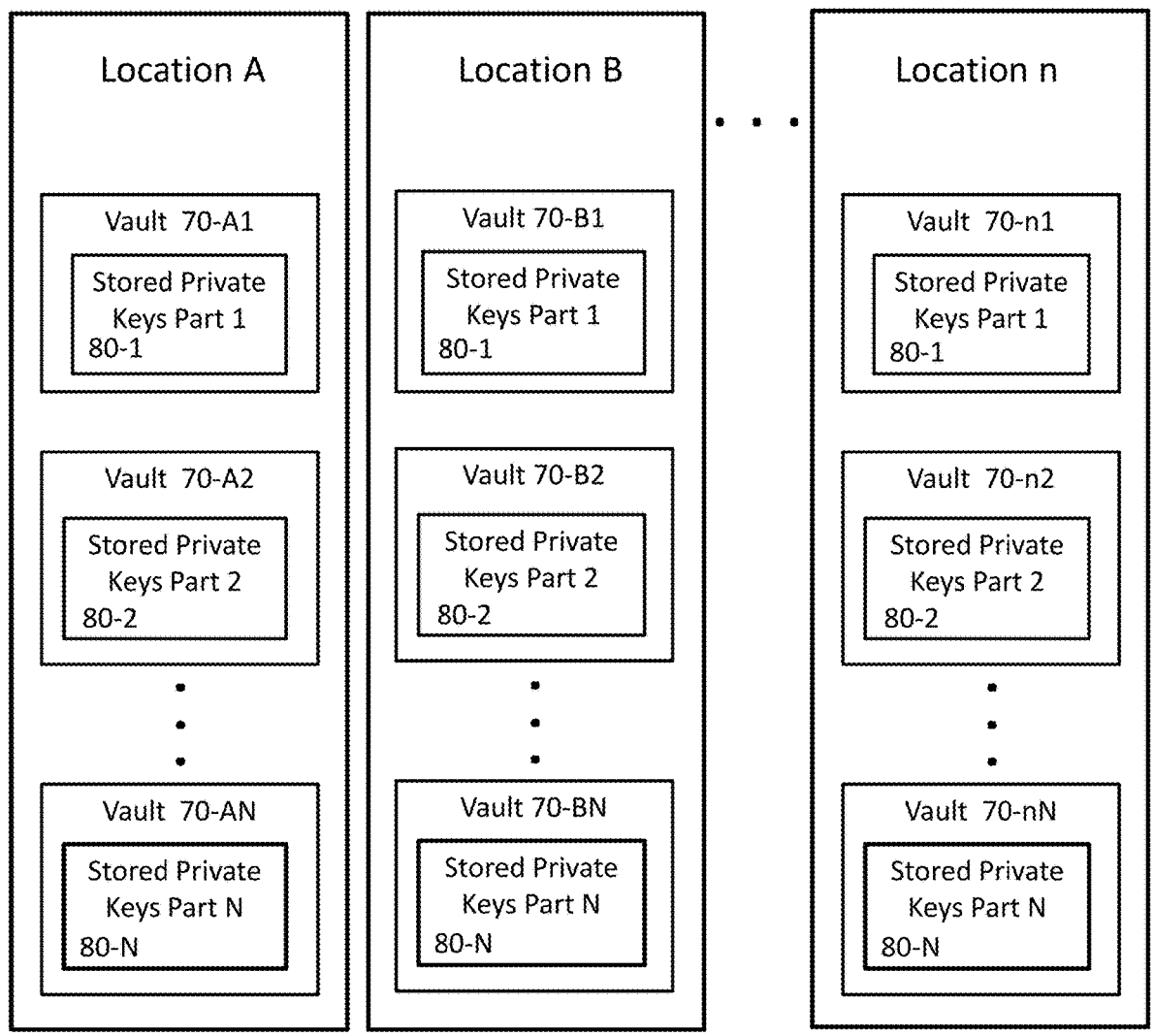

In FIG. 31A, three segments have been used, but other numbers of segments can also be used consistent with embodiments of the present inventions. FIG. 31B illustrates that any number of vault general locations (e.g., A-N) may be used, which may entail N number of complete key sets. In embodiments, the keys may be broken into any number of key segments, 1-N. In embodiments, in order to reassemble one complete key, all N segments may have to be reassembled together.

Figure 31C:
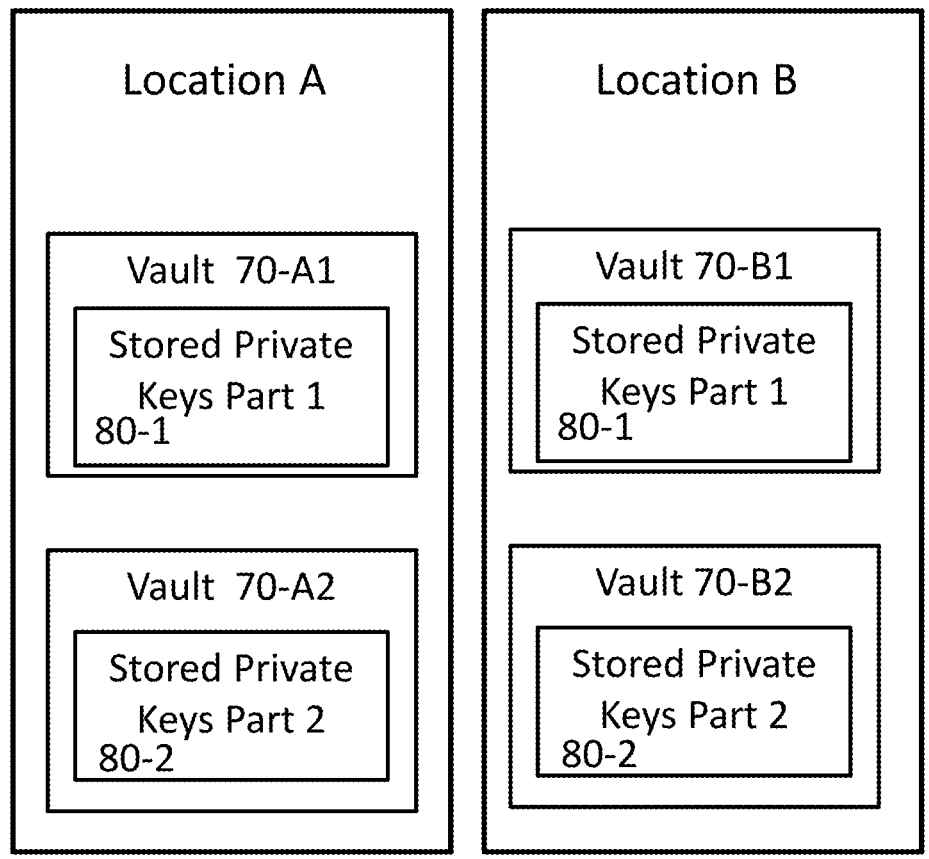

In embodiments, there may be two sets of segmented keys, as illustrated in FIG. 31C, which may be located in two general locations (e.g., A and B). In embodiments, the keys may be parsed into two segments (e.g., 80-1 and 80-2), as illustrated in FIG. 31C.

Figure 31D:
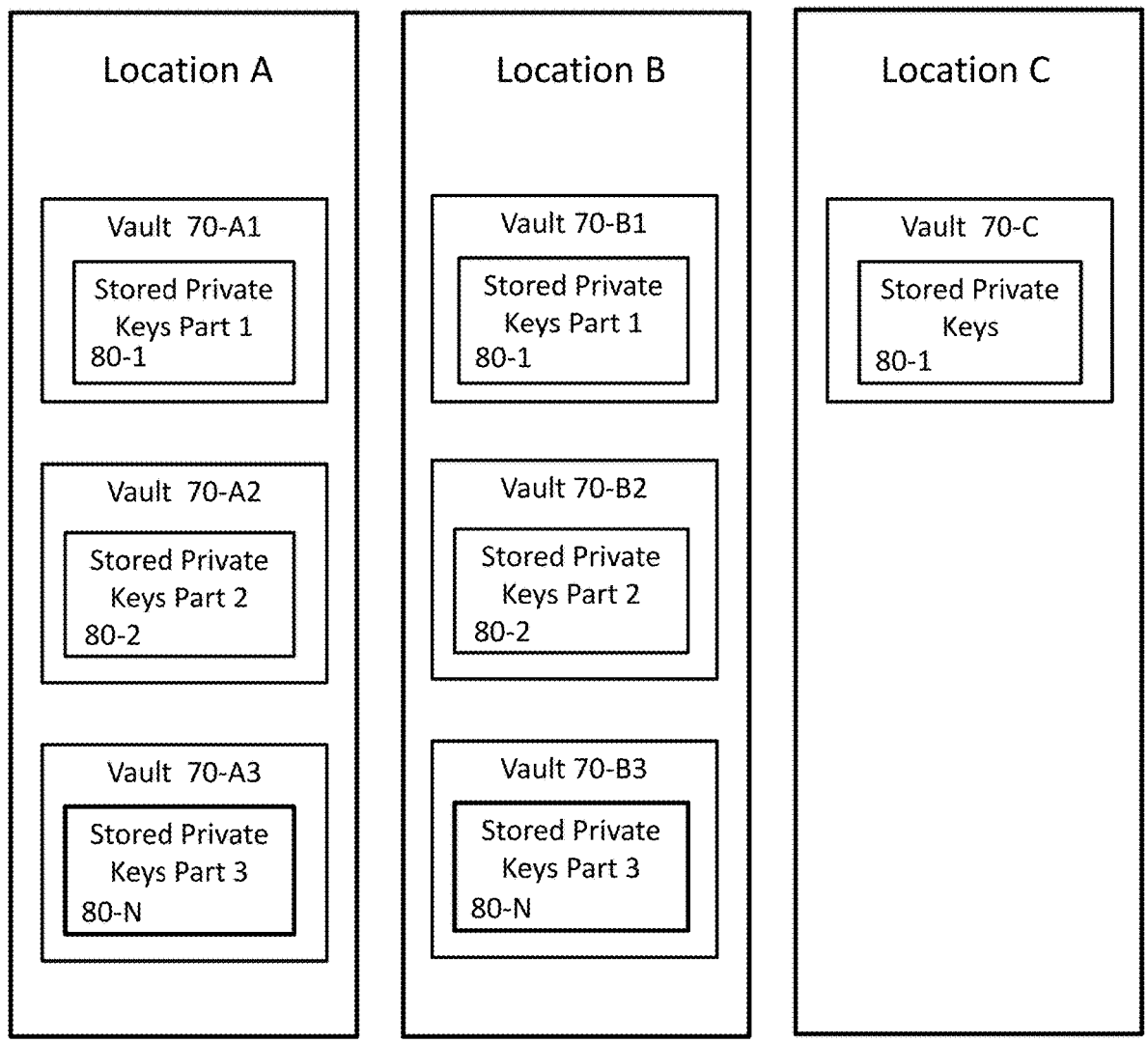

In embodiments, duplicate sets may not be embodied in same form as the original set and/or other duplicate sets. For example, two sets may be stored on paper, and a third set is stored on *papyrus*. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 31D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein. In embodiments, a digital asset storage service may be provided to other entities (e.g., a trust, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 36A:
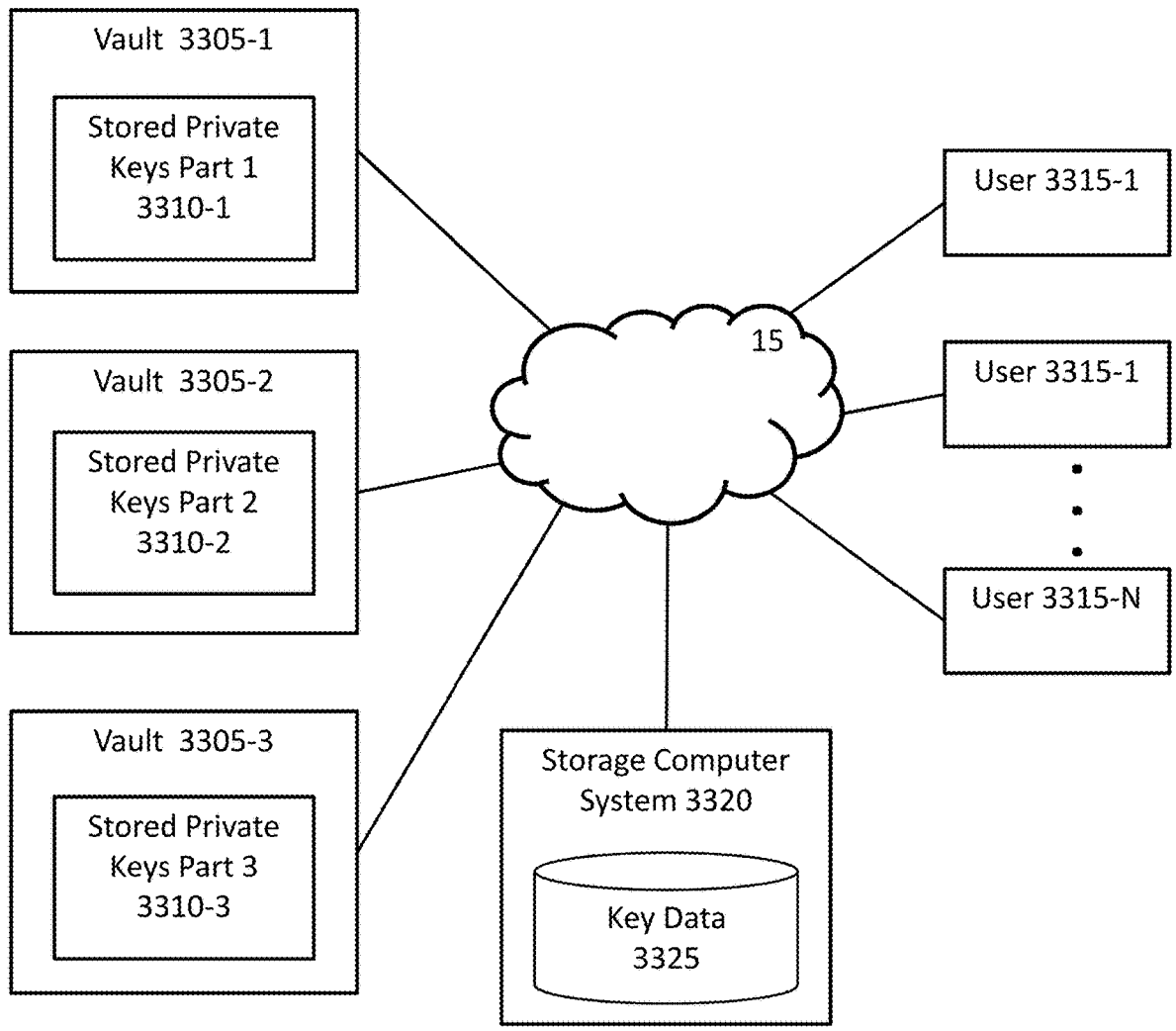
FIGS. 36A-36B are schematic diagrams of vault arrangements for a digital asset network in accordance with exemplary embodiments of the present invention.

FIG. 36A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 36A can include a plurality of secure storage locations, such as vaults 3305-1, 3305-2, and 3305-3. Private keys or key segments 3310-1, 3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 36B:
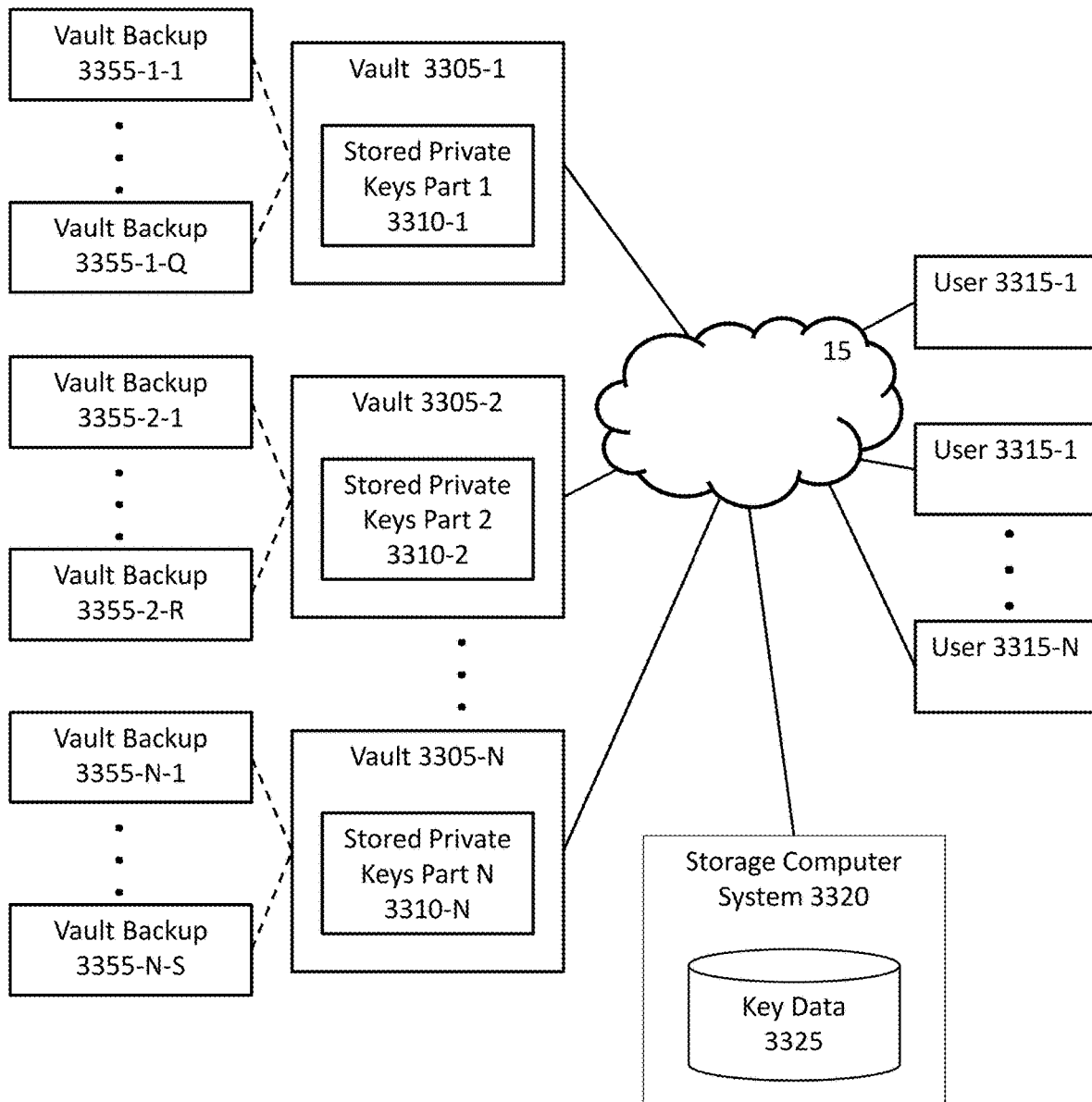

FIG. 36B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 37A:
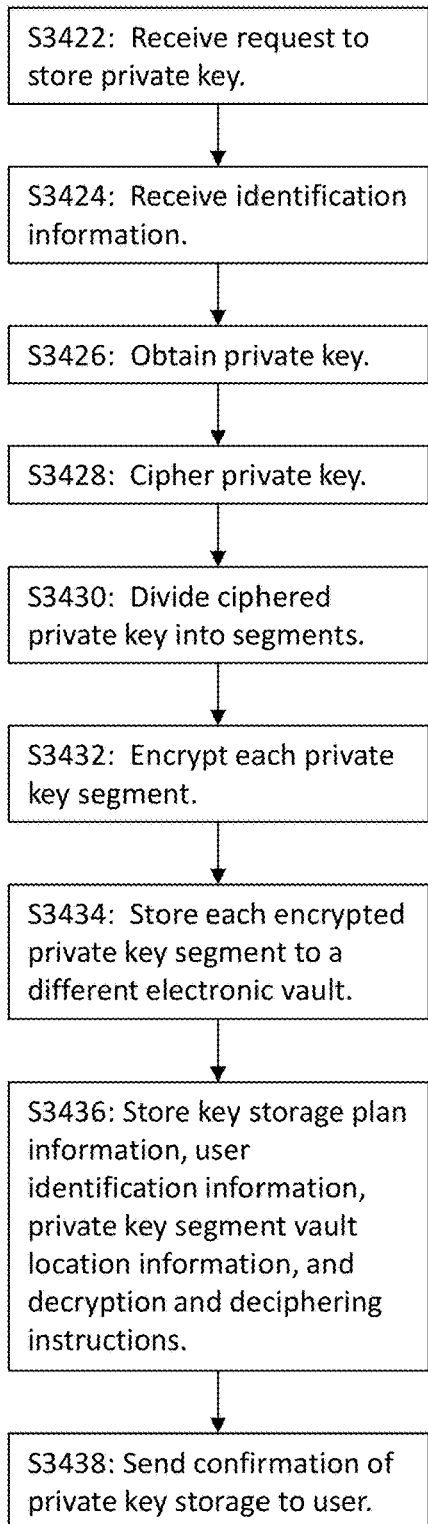
FIGS. 37A-37B are flow charts of processes for generating key storage and insurance in accordance with exemplary embodiments of the present invention.
Figure 37B:
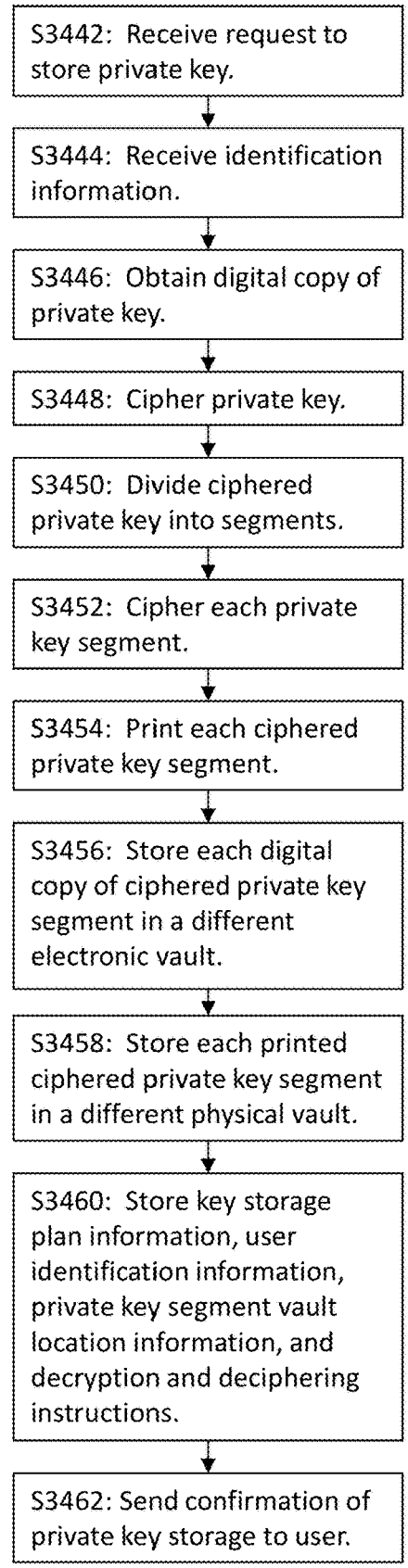

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 37A-37B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 37A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 37A refers to the storage of private keys, but the process may apply to the storage of both private and public keys.

FIG. 37A is a flow chart of an exemplary process for securely storing private key information, which may be performed by a secure digital asset storage system. In step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In step S3424, a user may provide identification information, which may be received at the storage system. Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In step S3426, the storage system may obtain a private key to be stored. The storage system may receive the key or fetch it, e.g., from a user electronic device, such as a mobile phone. In embodiments, the storage system may also obtain a public key to be stored.

In step S3428, the storage system may cipher the private key, as described herein. In embodiments, the private key may not be ciphered before dividing it into segments. In other embodiments, the private key may be encrypted.

In step S3430, the digital asset storage system may divide the ciphered private key into any number of segments. In the case of a multi-key wallet, the keys may not be divided into segments. However, keys to a multi-key wallet may be encrypted and/or ciphered.

In step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or a storage system administrative coordinator, which may be a computer that can handle retrieval of stored keys.

In step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 37B illustrates that physical back-ups of the secured private key may be employed by a secure digital asset storage system. In step S3442, a request to store a private key may be received at the storage system.

In step S3444, the storage system may receive user or digital wallet owner account identification information.

In step S3446, the storage system may obtain (e.g., receive or fetch) a private key.

In step S3448, the storage system may cipher the private key. In embodiments, no ciphering may occur before dividing the key into segments.

In step S3450, the storage system may divide the private key (or ciphered private key) into segments.

In step S3452, the storage system may cipher each private key segment.

In step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In step S3458, the storage system may store each printed key segment in a physical vault, which may be separate vaults for each key segment.

In step S3460, the storage system may store, in one or more databases, key storage plan information, user identification information, private key segment vault location information, deciphering instructions, and decryption instructions, where applicable.

In step S3462, the storage system may send confirmation of private key storage to the user.

Recovering Stored Keys from a Digital Asset Key Storage Service

A user of a secure storage service or system may request access to a stored key, which may be a means of recovering a lost key.

Figure 38A:
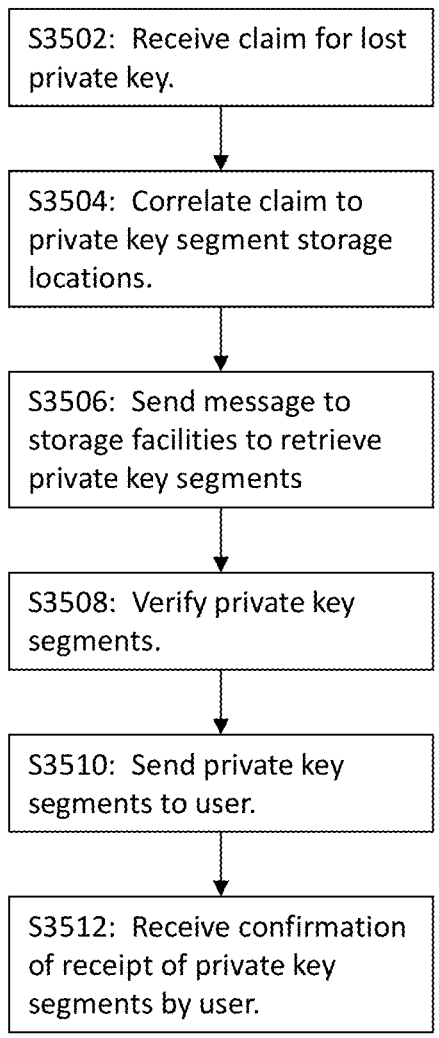
FIGS. 38A-38C are flow charts of processes for recovering key segments in accordance with exemplary embodiments of the present invention.

FIG. 38A is a flow chart describing an exemplary process for recovering a key, which may be performed by one or more computers. In embodiments, the process may entail recovering (e.g., retrieving from storage) a plurality of keys or key segments.

In step S3502, a user may submit a claim for a lost private key, which may be received by a computer system of a secure storage service storing a copy of the user's private key. A claim may be a request for retrieval of one or more stored keys.

In step S3504, the storage system, using the computer system, may correlate the received claim to one or more locations where private key segments are stored. For example, the computer system may access a database of policy information to determine where (e.g., in which vaults) a claimant's keys or key segments are stored.

In step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

Figure 38B:
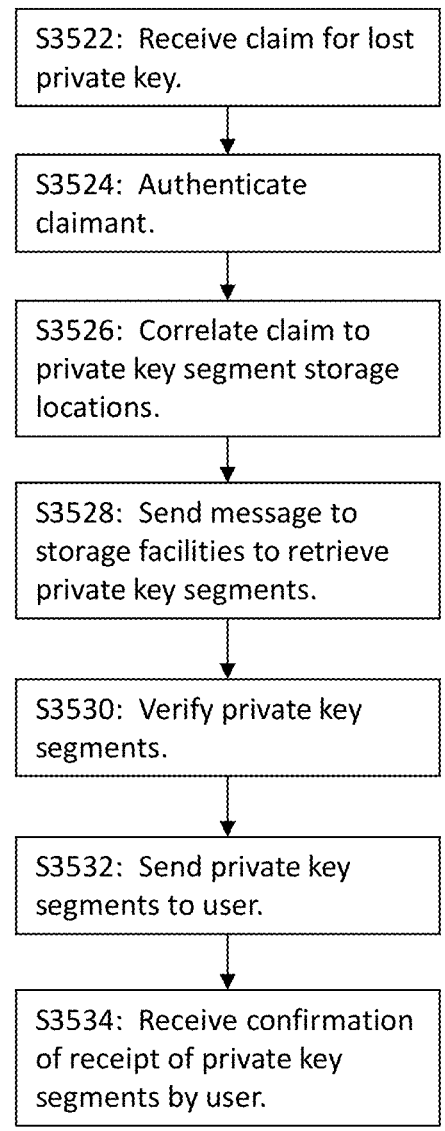

FIG. 38B illustrates another exemplary process for recovering a key. Such process may be performed by one or more computers. The process may be considered the same as the process of FIG. 38A, except with the addition of a user authentication step S3524.

Thus, In step S3522, a user may submit a claim for a lost private key, which may be received by a secure storage service storing a copy of the user's private key.

In step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In step S3526, the system may correlate the received claim to one or more locations where private key segments may be stored.

In step S3528, a message, which may constitute instructions, may be transmitted to one or more storage facilities to retrieve the private key segments.

In step S3530, the private key segments may be verified.

In step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In step S3534, the system may receive confirmation that the user received the private key segments.

Figure 38C:
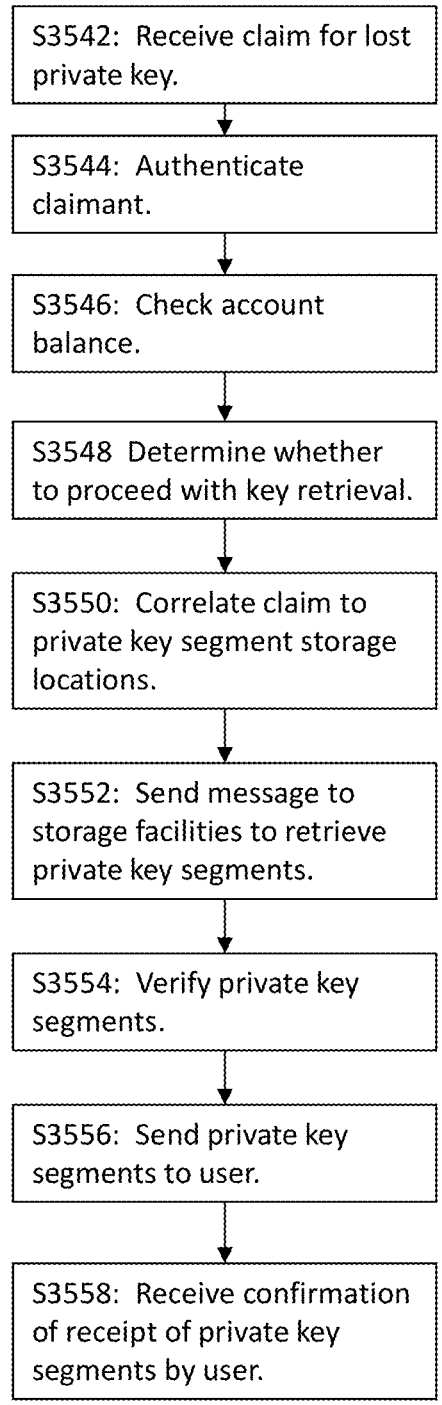

Another exemplary process for recovering a key is provided in FIG. 38C. Such process may be performed by one or more computers. The process may be considered the same as the process of FIG. 38B, except with the addition of steps to check the account balance of the account and a determination step of whether to proceed with the key retrieval.

Thus, in step S3542, a user may submit a claim for a lost private key, which may be received by a secure storage service storing a copy of the user's private key.

In step S3544, the secure storage system may authenticate the identity of the claimant, in manners described for step S3524 of FIG. 38B.

In step S3546, the system may check the account balance of the account.

In step S3548, the system may determine whether to proceed with the requested key retrieval. In embodiments, retrieval may be halted if an account balance is above a threshold or below a threshold.

In step S3550, the system may correlate the received claim to one or more locations where private key segments may be stored.

In step S3552, a message, which may constitute instructions, may be transmitted to one or more storage facilities to retrieve the private key segments.

In step S3554, the private key segments may be verified.

In step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In step S3558, the system may receive confirmation that the user received the private key segments.

In exemplary embodiments, a user of a secure storage service or system may be required to provide proof of control of an account before a lost key for that account may be recovered and provided to the user. Exemplary systems and methods for implementing such proof of control are described in further detail below.

Increasing the Total Supply of Digital Asset Tokens

Figure 39A:
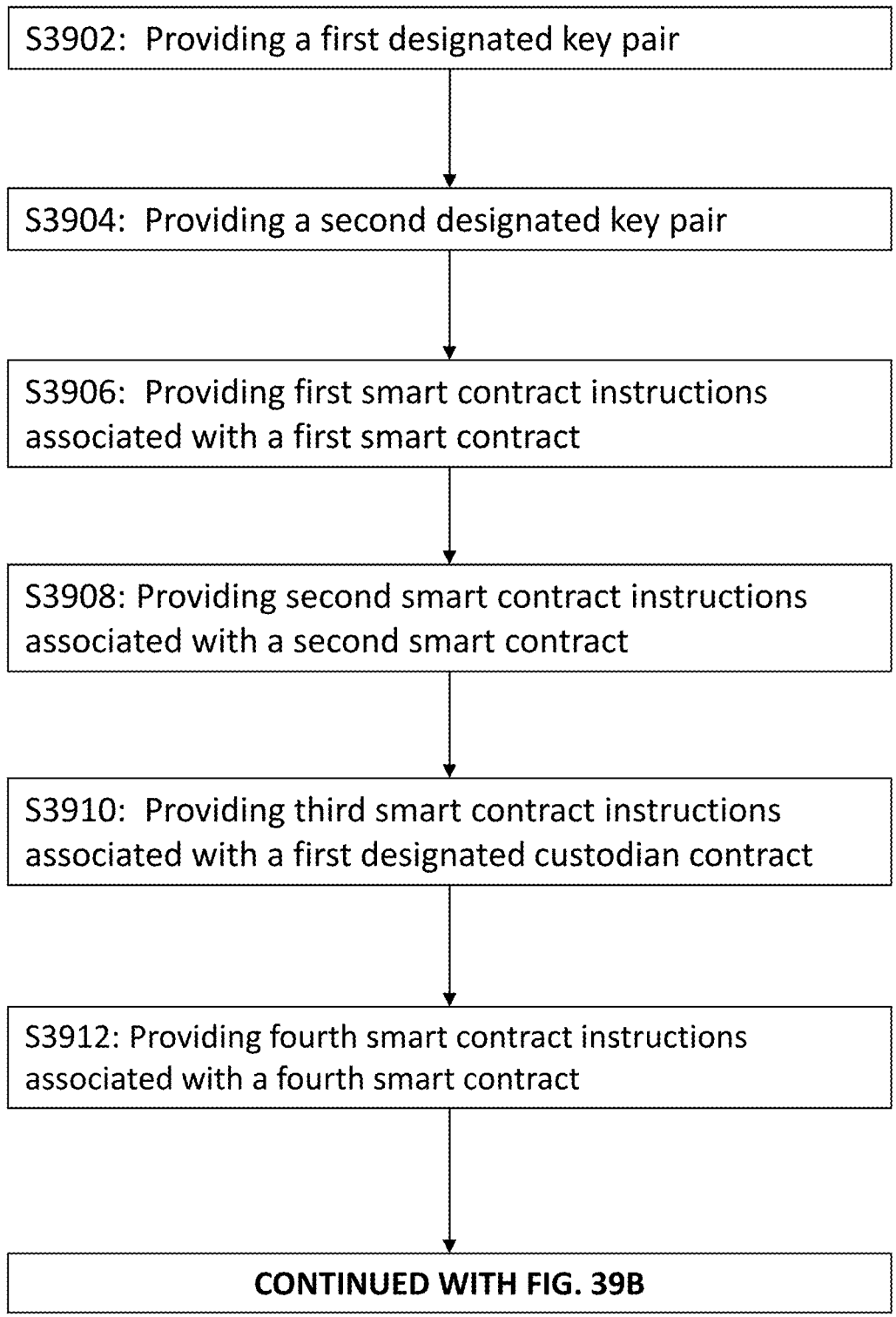
Figure 39B:
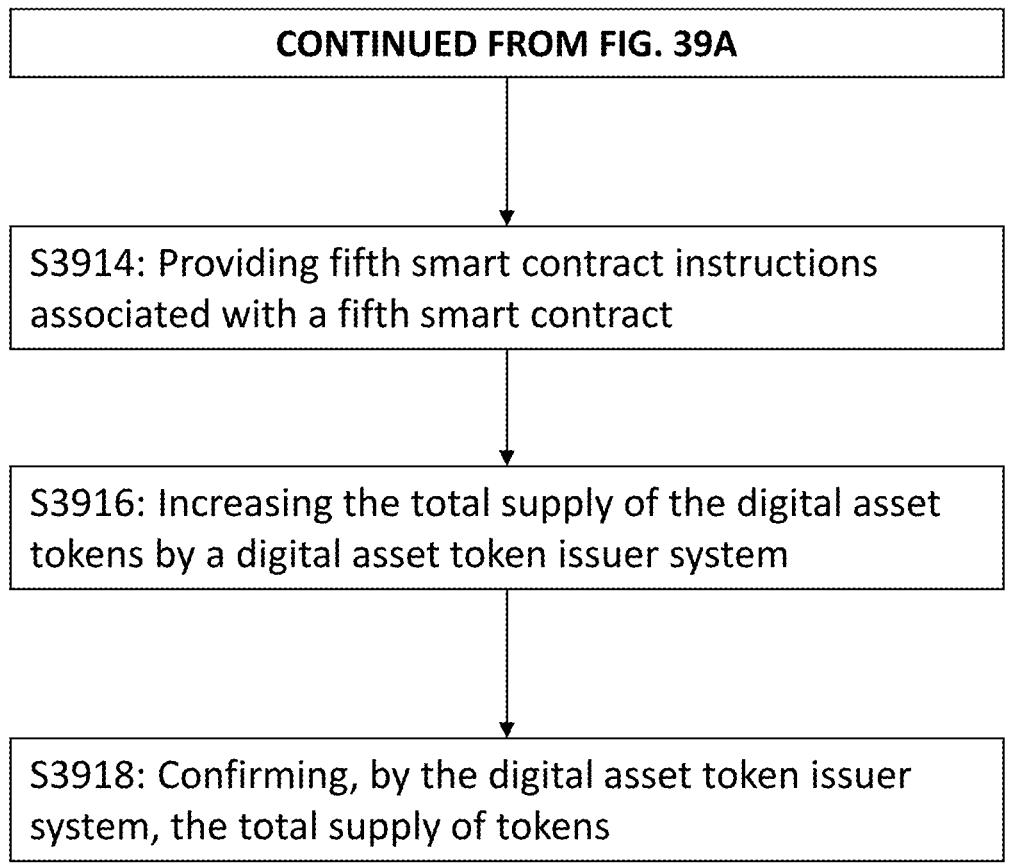

FIGS. 39A-39B illustrates a process for increasing a total supply of digital asset tokens in accordance with exemplary embodiments of the present invention. The process of FIGS. 39A through 39B may begin at a step S3902. At step S3902, a first designated key pair (e.g. on-line keyset 1 1362) may be provided. In embodiments, the first designated key pair may include, at least, a first designated public key and a corresponding first designated private key. The first designated public key, in embodiments, may be used to provide a first designated public address, which may be associated with an underlying digital asset. The underlying digital asset (e.g. Neo, ether, to name a few) may be maintained on a distributed public transaction ledger maintained in the form of a blockchain. In embodiments, a first computer system may store the first designated private key, similarly to on-line keyset 1 1362. The first computer system may have access to, or be connected with, the distributed public transaction ledger through a network, such as the internet (e.g. network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g. on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g. a hash). In embodiments, the cryptographic hash function may be designed to be a one-way function (e.g. a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few.

The process of FIGS. 39A through 39B may continue at a step S3904. At step S3904, a second designated key pair (e.g. off-line keyset 1 1803) is provided. The second designated key pair, similar to the first designated key pair, may include a second designated public key and a corresponding second designated private key. The second designated public key may be mathematically related to the corresponding second designated private key. In embodiments, the second designated key pair may correspond to the same public address as the first designated key pair (e.g. the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g. not connected to) from the distributed public transaction ledger and/or the internet (e.g. network 15). This separation, as described above in connection with FIG. 18A, may be for security purposes, adding an additional layer of security by ensuring that unwanted access is not granted via network 15.

In embodiments, the second computer system may be a hardware storage module. The hardware storage module may be located in a vault (e.g. Vault 70-A1) Location A, Location B, Location C . . . Location N described above in connection with FIGS. 31A-31D. Additionally, a more detailed description of storage, and particularly cold storage, is located above under the "Cold Storage" heading.

In embodiments, the hardware storage module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g. off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

In embodiments, the process of FIG. 39A may continue with step S3906 where first smart contract instructions (e.g. PROXY Contract Instructions 1310A-1) associated with a first smart contract (e.g. PROXY Smart Contract 1310) are provided. The first smart contract may have a corresponding first contract address (e.g. Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 18A and 18B, the description of which applying herein.

The process or FIG. 39A may continue with step S3908 where second smart contract instructions (e.g. PRINT LIMITER Contract Instructions 1360A-1) associated with a second smart contract (e.g. PRINT LIMITER Smart Contract 1360) is provided. The second smart contract may be associated with a second contract address (e.g. Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g. a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g. instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third authorization Instructions Module 1835.

In embodiments, the second smart contract may be PRINT LIMITER Smart Contract 1360 described above in connection with FIGS. 18A and 18C, the description of which applying herein.

In embodiments, the process of FIG. 39A may continue with step S3910 where third smart contract instructions (e.g. CUSTODIAN 2 Contract Instructions 1350A-1) associated with a first designated custodian contract (e.g. CUSTODIAN 2 Smart Contract 1350). In embodiments, the first designated custodian contract is associated with a third contract address (e.g. Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g. authorization instructions described in connection with CUSTODIAN 2 First Authorization Instructions Module 1849), and/or (2) sixth authorization instructions (e.g. authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 18A and 18D, the description of which applying herein.

In embodiments, the process of FIG. 39A may continue with step S3912 where fourth smart contract instructions (e.g. IMPL Smart Contract Instructions 1320A-1) associated with a fourth smart contract (e.g. IMPL Smart Contract 1320). In embodiments, the fourth smart contract is associated with a fourth contract address (e.g. Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address. The fourth smart contract instructions may be saved as part of the blockchain and/or include one or more of the following instructions: (1) token creation instructions (e.g. instructions of IMPL Token Creation Instructions Module 1865), (2) second delegation instructions (e.g. instructions of IMPL Delegation Instructions Module 1837), (3) token transfer instructions (e.g. instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 18A and 18F, the description of which applying herein.

In embodiments, the process of FIG. 39A may continue with the process of FIG. 39B. The process of FIG. 39B may continue with step S3914 where fifth smart contract instructions (e.g. STORE Contract Instructions 1330A-1) associated with a fifth smart contract (e.g. STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g. instructions of Storage Instructions Module 1853) and/or (2) fifth authorization instructions (e.g. instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information, may include at least one of: (1) respective public address information associated with the blockchain of the underlying digital asset, and/or (2) corresponding respective token balance information which may be associated with the aforementioned respective public address information. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 18A and 18E, the description of which applying herein.

In embodiments, the process of FIG. 39B may continue with step S3916 where the total supply of digital asset tokens may be increased by a digital asset token issuer system. In embodiments, the total supply of digital asset tokens may be increased from a first amount to a second amount. A more detailed description of the process of step S3916 is located in the flow charts of FIGS. 39C-39E.

Referring to FIG. 39C, the process of increasing the total supply of digital asset tokens may begin with step S3920 where a first transaction request may be generated. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key. In embodiments, the first transaction request may be signed by the second designated private key. In embodiments, the first transaction request may include first transaction fee information for minors associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 39C-39E, with the third amount of digital asset tokens being less than the first amount of digital asset tokens.

The process may continue with a step S3922. In embodiments, at step S3922, the first transaction request may be sent by the digital asset token issuer system, from the first designated public address to the fourth contract address. In embodiments, the first transaction request may be sent via the blockchain of the underlying digital asset. In embodiments, the first transaction request may be sent via network 15.

The process may continue with step S3924 where the first transaction request may be sent from the fourth contract address to the second contract address via the blockchain for the underlying digital asset. In embodiments, once the first transaction request is received by the second contract address, the second smart contract may execute the first transaction request. The execution of the first transaction request may, in embodiments, be to return a first unique lock identifier associated with the first transaction request. In embodiments, the first transaction request is executed via the plurality of geographically distributed computer systems in the peer-to-peer network with reference to the blockchain for the underlying digital asset.

In embodiments, the process may continue with step S3926, where the digital asset token issuer system may obtain the first unique lock identifier. In embodiments, the first unique lock identifier may be obtained based on reference to the blockchain for the underlying digital asset.

In embodiments, the process may continue with step S3928 where a second transaction request may be generated by the digital asset token issuer system. In embodiments, the second transaction request may be generated in response to the first unique lock identifier being obtained. The second transaction request may, in embodiments, include a second message which may include a second request to unlock the total supply of the digital asset tokens. The second request may be in accordance with the first request. Moreover, in embodiments, the second request may include the first unique lock identifier. In embodiments, the second transaction request may be digitally signed by the first designated private key. In embodiments, the second transaction request may be digitally signed by the second designated private key. In embodiments, the second transaction request may include second transaction fee information for minors associated with the plurality of geographically distributed computer systems in the peer-to-peer network. The second transaction fee information may be a predetermined amount of currency which may be related to the cost of processing the second transaction request.

Figure 39D:
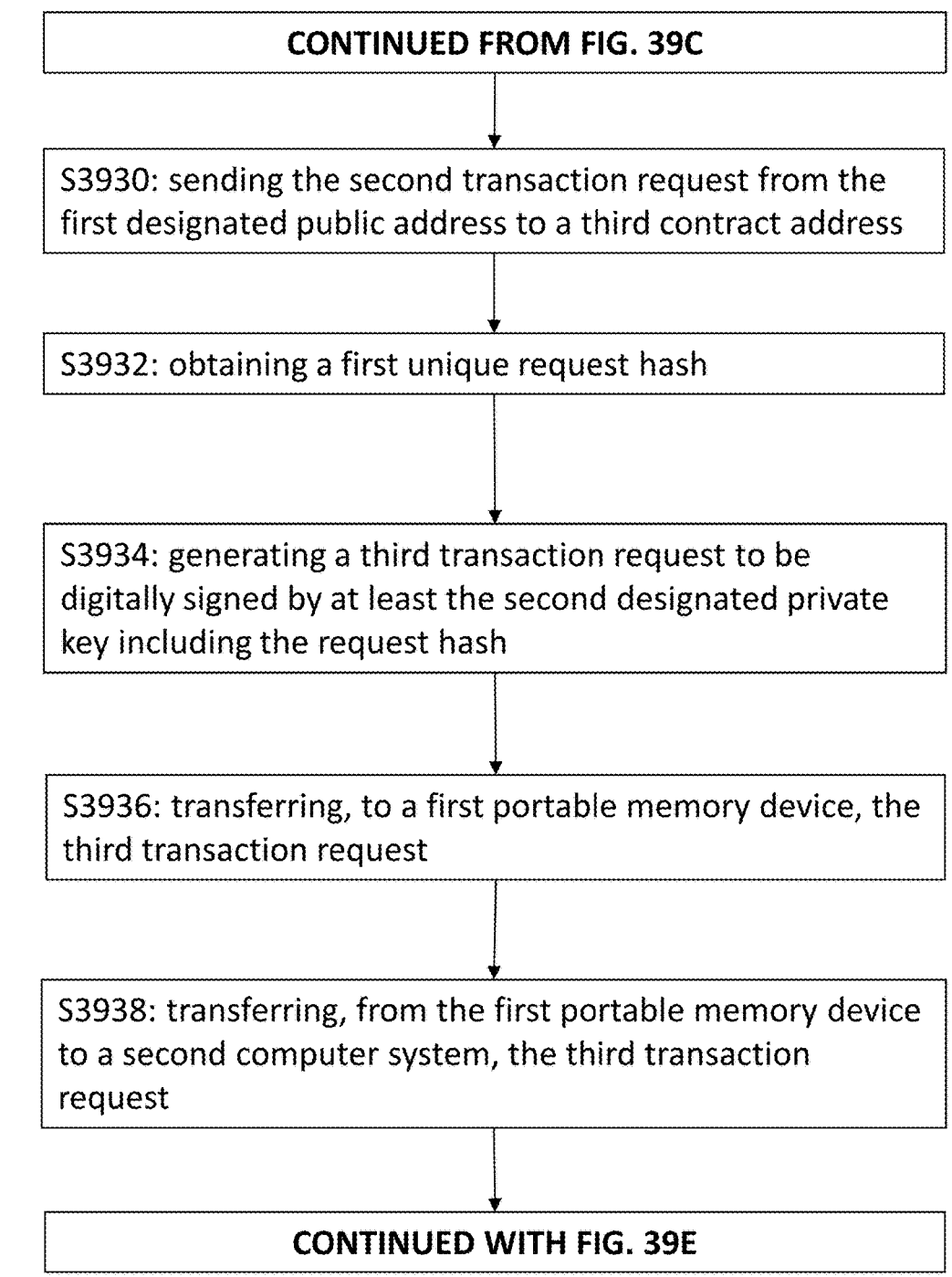

The process of FIG. 39C may continue with the process of FIG. 39D. Referring to FIG. 39D, the process may continue with step S3930 where the second transaction request may be sent from the first designated public address to the third contract address. In embodiments, the second transaction request is sent by the digital asset token issuer system via the blockchain for the underlying digital asset. In embodiments, in response to receiving the second transaction request, the third smart contract may execute the second transaction request. Executing the second transaction request, in embodiments, may include returning a first unique request hash associated with the second transaction request. In embodiments, the second transaction request is executed via the plurality of geographically distributed computer systems in the peer-to-peer network with reference to the blockchain associated with the underlying digital asset.

The process may continue with step S3932 where, in embodiments, the first unique request hash may be obtained by the digital asset token issuer system. In embodiments, the first unique request hash may be obtained based on reference to the blockchain for the underlying digital asset.

At a step S3934, in embodiments, a third transaction request may be generated. The third transaction request may, in embodiments, be generated to be digitally signed by at least the second designated private key. In embodiments, the third transaction request may include the first unique request hash. The third transaction request, in embodiments, may be generated in response to the digital asset token issuer system obtaining the first unique request hash.

In embodiments, at a step S3936, the third transaction request may be transferred to a first portable memory device. In embodiments, the third transaction request may be transferred to the first portable memory device by an administrator (e.g. an administrator of administrator system 1801). In embodiments, the third transaction request may be transferred from the digital asset token issuer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3938 where the third transaction request may be transferred from the first portable memory device to the second computer system. In embodiments, the third transaction request may be transferred to the second computer system by an administrator (e.g. an administrator of administrator system 1801).

In embodiments, the process of FIG. 39D may continue with FIG. 39E. Referring to FIG. 39E, at a step S3940, the second computer system digitally may sign the third transaction request using the second designated private key. By digitally signing the third transaction request, the second computer system may generate a third digitally signed transaction request.

In embodiments, once the third digitally signed transaction request is generated, the third digitally signed transaction request may be transferred from the second computer system to a second portable memory device. The second portable memory device may, in embodiments, be the first portable memory device (e.g. the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3942 where the third digitally signed transaction request may be sent from the portable memory device to the third contract address using the digital asset token issuer system, via the blockchain for the underlying digital asset. In embodiments, the portable memory device may be the second portable memory device. To send the third digitally signed transaction request, in embodiments, the third digitally signed transaction request may be first transferred from the second portable memory device to the digital asset token issuer system. Once transferred, in embodiments, the third digitally signed transaction request may be sent by the digital asset token issuer system to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the steps of the process described in connection with FIGS. 39C-39E may be rearranged or omitted.

Referring back to FIG. 39B, the process may continue with step S3918, where the digital asset token issuer system may confirm the total supply of digital asset tokens. The total supply, in embodiments, may be confirmed by the digital asset token issuer system as set to the second amount of digital asset tokens based on reference to the blockchain of the underlying digital asset.

In embodiments, the digital asset token issuer system may determine that the total supply of digital asset tokens is not the second amount of digital asset tokens. For example, the digital asset token issuer system may determine that the total supply of digital asset tokens is set to a third amount, the third amount being different than the second amount of digital asset tokens. In these embodiments, the digital asset token issuer system may generate and/or send a warning message for an administrator (e.g. an administrator of administrator system 1801). In embodiments, the administrator system may be the token issuer system. In embodiments, the administrator system may not be the token issuer system. The warning message may include a notification stating that the amount of tokens is incorrect and/or needs to be fixed. Additionally, the warning message may include a transaction ledger (e.g. Network Digital Asset Transaction Ledger 3228). Moreover, the warning message may include the third amount of digital asset tokens. Furthermore, the warning message may include the intended amount of digital asset tokens (e.g. the second amount of digital asset tokens). In embodiments, if the digital asset token issuer system determines the total supply of tokens is incorrect, the digital asset token issuer system may repeat one or more of the steps of the processes described above in connection with FIGS. 39A-39E in order to set the amount of digital asset tokens from the third amount to the second amount.

In embodiments, the steps of the process described in connection with FIGS. 39A-39B may be rearranged or omitted.

In embodiments, a process for increasing a total supply of digital asset tokens including may begin with providing a first designated key pair. The first designated key pair, In embodiments, may include a first designated public key and a corresponding first designated private key. The first designated private key may also correspond to a first designated public address associated with an underlying digital asset. In embodiments, the underlying digital asset is maintained on a distributed public transaction ledger maintained in the form of a blockchain by a plurality of geographically distributed computer systems in a peer-to-peer network in the form of a blockchain network. In embodiments, the first designated private key is stored on a first computer system which is connected to the distributed public transaction ledger through the Internet (e.g. network 15).

In embodiments, the process may continue with providing a second designated key pair. In embodiments, the second designated key pair includes a second designated public key and a corresponding second designated private key. In embodiments, the second designated public key also corresponds to a second designated public address associated with the underlying digital asset. In embodiments, the second designated private key is stored on a second computer system which is physically separated from the first computer system and is not operatively and/or physically connected to the distributed public transaction ledger or the Internet.

In embodiments, the process may continue with providing first smart contract instructions associated with a first smart contract associated with a digital asset token associated with a first contract address associated with the blockchain associated with the underlying digital asset. In embodiments, the first smart contract instructions are saved as part of the blockchain for the underlying digital assets. In embodiments, the first smart contract instructions include first delegation instructions to delegate one or more first functions associated with the digital asset token to one or more delegated contract addresses associated with the blockchain associated with the underlying digital asset. The one or more delegated contract addresses, in embodiments, is different from the first contract address. In embodiments, a second contract address is designated as one of the one or more delegated contract addresses. In embodiments, the first smart contract instructions include first authorization instructions for the second designated key pair.

The process may continue, in embodiments, with providing second smart contract instructions associated with a second smart contract associated with the digital asset token associated with the second smart contract address associated with the blockchain associated with the underlying digital asset. In embodiments, the second smart contract instructions are saved as part of the blockchain for the underlying digital asset. In embodiments, the second smart contract instructions may include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token, to name a few.

In embodiments, the process may continue with providing third smart contract instructions associated with a first designated custodian smart contract associated with the digital asset token associated with a third contract address associated with the blockchain associated with the underlying digital asset. In embodiments, the third contract address is the first designated custodian contract address. In embodiments, the third smart contract instructions are saved as part of the blockchain associated with the underlying digital asset. In embodiments, the third smart contract instructions include fourth authorization instructions to authorize issuance of instructions to the second smart contract regarding token creation. In embodiments, the fourth authorization instructions designate the second designated key pair to authorize the fourth authorization instructions.

In embodiments, the process may continue with providing fourth smart contract instructions associated with a fourth smart contract associated with the digital asset token associated with a fourth contract address associated with the blockchain associated with the underlying digital asset. In embodiments, the fourth contract address is one of the one or more delegated contract addresses and not: (i) the first contract address, (ii) the second contract address, and/or (iii) the third contract address. In embodiments, the fourth smart contract instructions are saved as part of the blockchain associated with the underlying digital assets. In embodiments, the fourth smart contract instructions include: (1) token creation instructions to create tokens of the digital asset token in accordance with conditions set forth by the print limiter token creation instructions; and/or (2) second delegation instructions delegating data storage operations to at least a fifth contract address, to name a few.

In embodiments, the process may continue with providing fifth smart contract instructions associated with a fifth smart contract associated with the digital asset token associated with the fifth contract address associated with the blockchain associated with the underlying digital asset. In embodiments, the fifth smart contract address is one of the one or more designated store contract addresses. In embodiments, the fifth smart contract instructions are saved as part of the blockchain for the underlying digital assets. In embodiments, the fifth smart contract instructions include: (1) data storage instructions for transaction data related to the digital asset token, said transaction data includes for all issued tokens of the digital asset token: (A) respective public address information associated with the blockchain associated with the underlying digital asset; and (B) corresponding respective token balance information associated with said respective public address information; and/or (2) fifth authorization instructions to modify the transaction data in response to requests from the fourth contract address;

In embodiments, the process may continue with receiving, by a digital asset token issuer system, a request to generate and assign to the first designated public address a first amount of digital asset tokens;

In embodiments, the process may continue with generating, by the digital asset token issuer system, the first amount of digital asset tokens and assigning said first amount of digital asset tokens to the first designated public address increasing the total supply of the digital asset tokens. In embodiments, generating the first amount of digital asset tokens and assigning said first amount of digital asset tokens to the first designated public address may include a sub-process.

The sub-process may begin with the step of generating, by the digital asset token issuer system, and sending, using the digital asset token issuer system via the blockchain network, a first transaction request: (A) to the fourth contract address; and (B) including a first message including a first request to generate the first amount of digital asset tokens and assign said first amount of digital asset tokens to the first designated public address. In embodiments; the first transaction request is digitally signed by the first designated private key. In embodiments, the fourth smart contract executes, via the plurality of geographically distributed computer systems in the peer-to-peer network with reference to the blockchain, the first transaction request to: (i) validate the first request and the authority of the first designated private key to call the second smart contract to execute the first request; and (ii) send a first call to the fourth contract address to generate and assign to the first designated public address the first amount of digital asset tokens. In embodiments, the fourth smart contract executes, via the plurality of geographically distributed computer systems in the peer-to-peer network with reference to the blockchain, the first call to generate a first unique lock identifier, and return to the second smart contract address, the first unique lock identifier. In embodiments, in response to the return of the first unique lock identifier, the second smart contract executes, via the plurality of geographically distributed computer systems in the peer-to-peer network with reference to the blockchain, a call to the fourth smart contract address to confirm the first call with the first lock identifier. In embodiments, in response, the fourth smart contract executes, via the plurality of geographically distributed computer systems in the peer-to-peer network with reference to the blockchain, the first call to execute a second call to the fifth contract address to obtain the total supply of digital asset tokens in circulation. In embodiments, in response, the fifth smart contract executes, via the plurality of geographically distributed computer systems in the peer-to-peer network with reference to the blockchain, the second call and returns, to the fourth contract address, a second amount of digital asset tokens corresponding to the total supply of digital asset tokens in circulation. In embodiments, in response to the return of the second amount, the fourth smart contract, executes via the plurality of geographically distributed computer systems in the peer-to-peer network with reference to the blockchain, a third call request to the fifth contract address to set a new total supply of digital asset tokens in circulation to a third amount, which is the total of the first amount and the second amount. In embodiments, in response to the third call, the fifth smart contract, executes via the plurality of geographically distributed computer systems in the peer-to-peer network with reference to the blockchain, the third call and sets a new total supply of digital asset tokens in circulation at the third amount. In embodiments, the fourth smart contract executes, via the plurality of geographically distributed computer systems in the peer-to-peer network with reference to the blockchain, a fourth call to the fifth contract address to add the first amount of digital asset tokens to a respective balance associated with the first designated public address. In embodiments, in response, the fifth smart contract executes, via the plurality of geographically distributed computer systems in the peer-to-peer network with reference to the blockchain, the fourth call to set the balance of digital asset tokens in the first designated public address at a fourth amount which includes the addition of the first amount to the previous balance.

The process for increasing the total supply of digital asset tokens may continue with confirming, by the digital asset token issuer system, that the balance of digital asset tokens associated with the first designated public address is set to include the first amount of digital asset tokens based on reference to the blockchain.

In embodiments, the second computer system is a hardware storage module.

In embodiments, the second designated key set includes an additional designated key set including an additional designated public address and an additional designated private key.

In embodiments, the second authorization instructions for the first designated key set with respect to token creation of the digital asset token include instruction limiting token creation above a first threshold over a first period of time.

In embodiments, the fourth authorization instructions for the second designated key set to authorize the issuance of instructions to the second smart contract instructions with respect to token creation include instructions to allow for creation of digital asset tokens above the first threshold during the first period of time.

In embodiments, the third smart contract instructions further include: (2) sixth authorization instructions to designate a seventh contract address as one of the one or more delegated contract addresses. In embodiments, the seventh contract address is not the second contract address. In embodiments, the second designated key set is designated to authorize the sixth authorization instructions. In embodiments, the fourth smart contract instructions further include: (3) token transfer instructions related to transferring tokens of the digital asset token from a first designated contract address to a second designated contract address. In embodiments, the fourth smart contract instructions further include: (3) token destruction instructions related to destroying one or more digital asset token. In embodiments, the fourth smart contract instructions further include: (3) token balance modification instructions related to modifying a total number of tokens of the digital asset token assigned to a third designated public address. In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the process further includes receiving, prior to generating the first amount of digital asset tokens, a validating request. In embodiments, the process further includes determining the first designated key set has authority to process the request to generate the first amount of digital tokens.

In embodiments, the first transaction request includes first transaction fee information for miners in the plurality of geographically distributed computer systems in the peer-to-peer network to process the first transaction request.

In embodiments, the fifth contract returns the balance of digital asset tokens to the fourth smart contract address. In embodiments, the fifth contract returns the balance of digital asset tokens to the second smart contract address.

In embodiments, the process further for increasing the total supply of digital asset tokens continues with receiving, by the plurality of geographically distributed computer systems in the peer-to-peer network, from a first user device associated with the first designated public address, via the underlying blockchain, a second transaction request: (A) from the first designated public address; (B) to the first contract address; and (C) including a second message including a second request to transfer a fifth amount of digital assets from the first designated public address to a third designated public address. In embodiments, the first transaction request is digitally signed by the first designated private key, which is mathematically related to the first designated public address. In embodiments, the first user device had access to the first designated private key prior to sending the second transaction request. In embodiments, the first smart contract executes, via the plurality of geographically distributed computer systems in the peer-to-peer network, the second transaction request to execute, via the plurality of geographically distributed computer systems in the peer-to-peer network, a sixth call request to the fourth contract address to transfer a fifth amount of digital assets from the first designated public address to the third designated public address. In embodiments, in response to the sixth call request, the fourth smart contract, executes via the plurality of geographically distributed computer systems in the peer-to-peer network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address. In embodiments, in response to the seventh call request, the fifth smart contract, executes via the plurality of geographically distributed computer systems in the peer-to-peer network, the seventh call request to return the sixth amount of digital asset tokens In embodiments, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens in the first designated public address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the first designated public address as the seventh amount and returns a new balance for the first designated public address as the seventh amount. In embodiments, in response to the return of the new balance, the fourth smart contract executes, via the plurality of geographically distributed computer systems in the peer-to-peer network, an eighth call to add the second amount of digital asset tokens to the balance associated with the third designated public address. In embodiments, in response to the eighth call request, the fifth smart contract executes, via the blockchain network, the eighth call request to set the balance of digital asset tokens associated with the third designated public address at a seventh amount which includes the addition of the second amount to a previous balance associated with the third designated public address; and wherein the first user device confirms that the balance of digital asset tokens associated with the first designated public address is the sixth amount of digital asset tokens based on reference to the blockchain.

In embodiments, the second transaction request includes second transaction fee information for miners in the plurality of geographically distributed computer systems in the peerto-peer network to process the second transaction request. In embodiments, the balance of digital asset tokens associated with the third designated public address is returned to the fourth contract address. In embodiments, the balance of digital asset tokens associated with the third public address is returned to the first smart contract address. In embodiments, a second user device confirms that the balance of the digital asset tokens associated with the third designated public address is the seventh amount of digital asset tokens based on reference to the blockchain.

In embodiments, the process of increasing the total supply of digital asset tokens further includes providing a third designated key set, including a third designated public address associated with the underlying digital asset and a corresponding third designated private key, and wherein the third designated private key is stored on a third computer system which is connected to the distributed public transaction ledger through the Internet.

In embodiments, the process continues with receiving, by the plurality of geographically distributed computer systems in the peer-to-peer network, from the third computer system, via the blockchain, a second transaction request: (A) from the third designated public key address; (B) to the fifth contract address; and (C) including a second message including a request to burn a fifth amount of digital asset tokens from a balance associated with the third designated public address. In embodiments, the second transaction request is digitally signed by the third designated private key. In embodiments, the fourth smart contract executes, via the plurality of geographically distributed computer systems in the peer-to-peer network, the second transaction request to execute, via the plurality of geographically distributed computer systems in the peer-to-peer network, a sixth call request to the fifth contract address to obtain a sixth amount of digital asset tokens which reflect a current balance of digital asset tokens associated with the third designated public address. In embodiments, in response to the sixth call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens associated with the third designated public key address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the third designated public key address as the seventh amount and returns the new balance for the third designated public key address as the seventh amount. In embodiments, in response to the return of the new balance, the fourth smart contract executes, via the blockchain network, an eighth call request to the fifth contract address to obtain a total supply of digital asset tokens in circulation. In embodiments, in response to the eighth call request, the fifth smart contract executes, via the plurality of geographically distributed computer systems in the peer-to-peer network, the eighth call request and returns, to the fourth contract address, an eighth amount of digital asset tokens corresponding to the total supply of digital asset tokens in circulation. In embodiments, in response to the return of the eighth amount, the fourth smart contract, executes via the plurality of geographically distributed computer systems in the peer-to-peer network, a ninth call request to the fifth contract address to set a new total supply of digital asset tokens in circulation to a ninth amount, which is the eighth amount less the fifth amount. In embodiments, in response to the ninth call request, the fifth smart contract, executes via the blockchain network, the ninth call request and sets a new total supply of digital asset tokens in circulation at the ninth amount, and returns to the fourth contract address.

In embodiments, the third designated key set is the first designated key set. In embodiments, the third designated key set is not the second designated key set. In embodiments, the third designated key set is the second designated key set. In embodiments, the third designated key set is not the first designated key set. In embodiments, the third computer system is the first computer system. In embodiments, the third computer system is not the first computer system. In embodiments, the administrator computer system (e.g. Administrator 1801) includes the first computer system and the third computer system. In embodiments, the administrator computer system includes the first computer system and the second computer system.

In embodiments, the underlying digital asset is a stable value token. In embodiments, the underlying digital asset is Neo. In embodiments, the underlying digital asset is Ether. In embodiments, the underlying digital asset is Bitcoin.

In embodiments, the first designated private key is mathematically related to the first designated public key.

In embodiments, wherein the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, the second smart contract instructions include sixth authorization instructions related to modifying a token supply of the digital asset token.

Withdrawing funds, including in the context of digital assets, is associated with many security concerns. For example, security concerns may include: hacking, fraudulent transactions, to name a few. The aforementioned security concerns, in embodiments, are addressed (either completely or partially) in the context of withdrawing funds by customer and/or administrator created whitelists. A whitelist, in embodiments, may be a list which may include a list of addresses that a customer has pre-authorized to withdraw digital assets. For example, a whitelist associated with a first customer may include a first user public address associated with the first user and a second user public address associated with the first user's family member. As another example, a whitelist may only contain a user's public address which may limit all withdrawals to the user's public address. As another example, a whitelist may not be submitted by the user, and, instead, may be generated by an administrator (e.g. exchange computer system 3230, administrator system 6801, and/or SVCoin administrator 6809, to name a few). The generated whitelist, in embodiments, may be a default security measure implemented by the administrator, which may limit withdrawals to a public address associated with the customer's account. Alternatively, in embodiments, a whitelist may be a list which may include a list of public addresses that a user may not want digital asset tokens withdrawn to. For example, a whitelist may contain a user's old business partner's public address, limiting withdrawals to public addresses that are not the user's old business partner's public address.

Figure 40A:
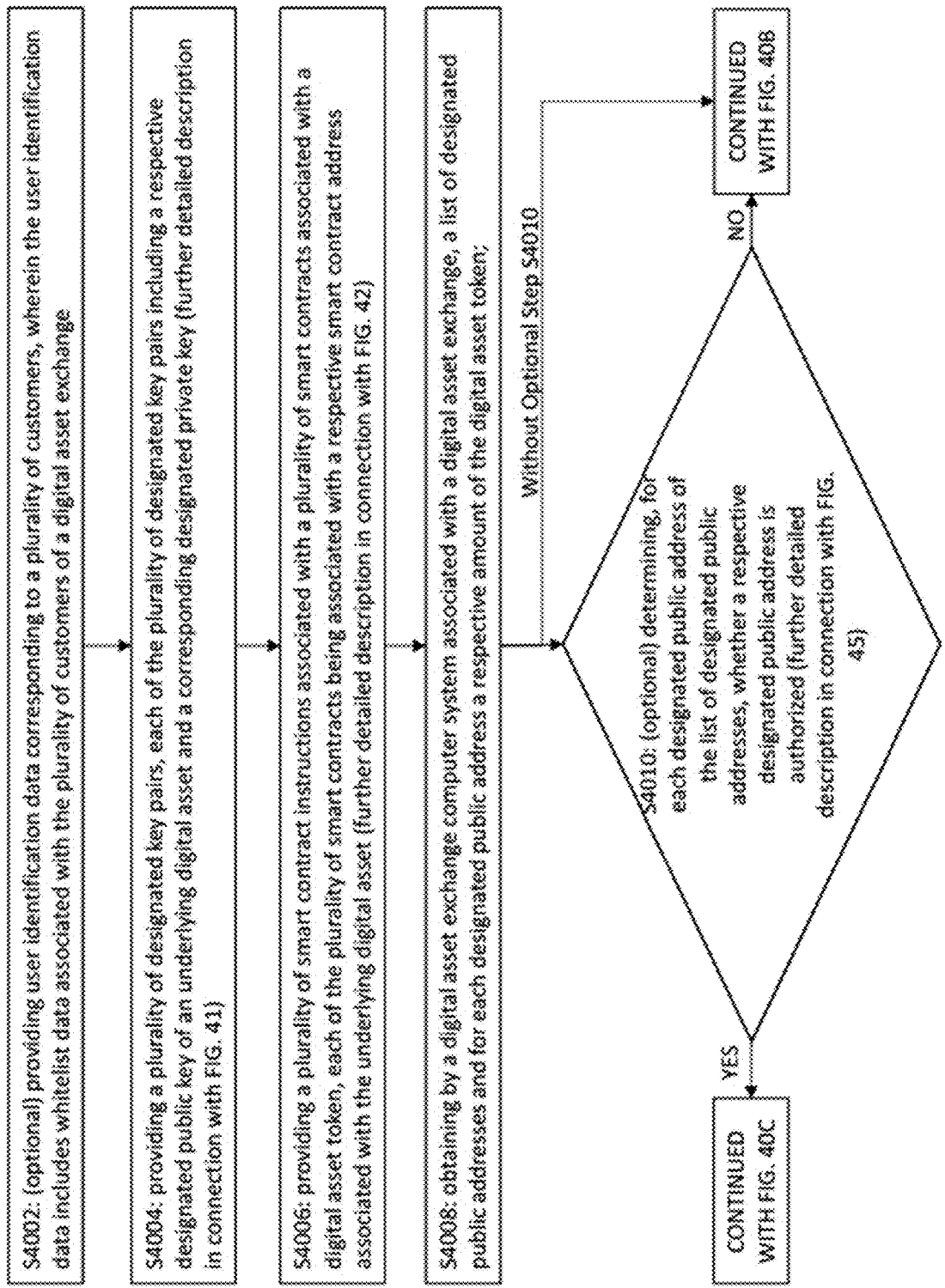

A whitelist may be implemented in the process described in connection with FIGS. 40A-40C. FIGS. 40A-40C are flow charts of processes for withdrawing digital asset tokens in accordance with exemplary embodiments of the present invention. The process of FIGS. 40A through 40C may begin at step S4002, shown in connection with FIG. 40A. Optionally, in embodiments, at step S4002, user identification data corresponding to a plurality of customers may be provided. In embodiments, the user identification data may include whitelist data associated with the plurality of customers (e.g. customers associated with one or more customer devices— e.g. customer's device 3232, customers of a digital asset exchange, to name a few). Whitelist data may, in embodiments, represent one or more whitelists which were: provided by one or more customers, generated by an administrator, and/or provided by a third party associated with the one or more customers, to name a few. For example, at step S4002, a first customer may transmit first whitelist data associated with the first customer. The first whitelist data may include a whitelist that authorizes withdrawals to a first user public address. The first user public address, in embodiments, may be associated with a first user public key which may be associated with the first customer.

In embodiments, a digital asset exchange computer system (e.g. exchange computer system 3230, administrator system 6801, and/or SVCoin administrator 6809, to name a few) may store a plurality of whitelists for a plurality of customers on memory operably connected to the digital asset exchange computer system. Additionally, in embodiments, the digital asset exchange computer system may store a plurality of whitelists for a plurality of customers on a whitelist database on memory operably connected to the digital asset exchange computer system.

In embodiments, a whitelist may be used by the digital asset exchange computer system to verify a public address associated with a withdrawal request in accordance with the process of FIG. 45, which is described below—the description of which applying herein The process may continue at step S4004. At step S4004, a plurality of designated key pairs is provided. The plurality of key pairs, in embodiments, may each include a respective designated public key of an underlying digital asset and a corresponding designated private key. In embodiments, each respective designated public key is mathematically related to a respective corresponding designated private key. The underlying digital asset, in embodiments, may be a digital math-based asset, such as bitcoins, Namecoins, Litecoins, PPCoins, Tonal bitcoins, bitcoin cash, zcash, IxCoins, Devcoins, Freicoins, I0coins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliqa; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf; WAX; DigixDAO; Loom Network; Nash Exchange; LATOKEN; HedgeTrade; Loopring; Revain; Decentraland; Orbs; NEXT; Santiment Network Token; Populous; Nexo; *Celer* Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; and/or DEW, to name a few. In embodiments, the underlying digital asset may be a digital asset that is supported by its own digital asset network (like ether supported by the Ethereum Network). The digital asset token, in embodiments, may be a stable value or fiat-backed token (such as Gemini Dollar), security tokens, and/or non-fungible token (such as Cryptokitties), to name a few. The digital asset, in embodiments, may be a fiat-backed digital asset, for example, a Libra or Gemini Dollar.

In embodiments, the plurality of designated key pairs may be provided with the process described in connection with FIG. 41. Referring to FIG. 41, a process of providing a plurality of designated key pairs may begin at step S4102. At step S4102, a first designated key pair (e.g. on-line keyset 1 1362) may be provided. In embodiments, the first designated key pair may include, a first designated public key and a corresponding first designated private key. The first designated public key may be mathematically related to the first designated private key. The first designated public key, in embodiments, may be associated with a first designated public address, which, in embodiments, may be associated with an underlying digital asset. The underlying digital asset (e.g. Neo, ether, to name a few) may be maintained on a distributed public transaction ledger maintained in the form of a blockchain. In embodiments, a first computer system may store the first designated private key, similarly with on-line keyset 1 1362. The first computer system may have access to, or be connected with, the distributed public transaction ledger through a network, such as the internet (e.g. network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g. on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. Continuing the example, an additional key pair of the plurality of key pairs may correspond to an additional designated public address associated with the underlying digital asset. In embodiments, each key pair of the aforementioned plurality of key pairs may correspond to the same designated public address. For example, the first and additional key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g. a hash). In embodiments, the cryptographic hash function may be designed to be a one-way function (e.g. a function that is infeasible to invert). The cryptographic hash function, may include one or more of the following properties: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few. In embodiments, and as used herein, algorithm, hash algorithm, hash function, and/or cryptographic hash function may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few.

The process of FIG. 41 may continue at step S4104. At step S4104, a second designated key pair (e.g. off-line keyset 1 1803) is provided. The second designated key pair, similar to the first designated key pair, may also include a second designated public key and a corresponding second designated private key. The second designated public key may be mathematically related to the corresponding second designated private key. In embodiments, the second designated key pair may correspond to the same public address as the first designated key pair (e.g. the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g. not connected to) from the distributed public transaction ledger and/or the internet (e.g. network 15). This separation, as described above in connection with FIG. 18A, may be for security purposes, adding an additional layer of security by ensuring that unwanted access is not granted via network 15.

In embodiments, the second computer system may be a hardware security module. The hardware security module may be located in a vault (e.g. Vault 70-A1) Location A, Location B, Location C . . . Location N described above in connection with FIGS. 31A-31D. Additionally, a more detailed description of storage, and particularly cold storage, is located above under the "Cold Storage" heading.

In embodiments, the hardware security module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g. off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

Referring back to FIG. 40A, the process for withdrawing digital assets may continue at step S4006. At step S4006, a plurality of smart contract instructions is provided. Each of the plurality of smart contract instructions, in embodiments, may be associated with a respective smart contract address associated with the underlying digital asset. In embodiments, the plurality of smart contract instructions may be provided with the process described in connection with FIG. 42.

Referring to FIG. 42, a process of providing a plurality of smart contract instructions may begin at step S4202. At step S4202, first smart contract instructions (e.g. PROXY Contract Instructions 1310A-1) associated with a first smart contract (e.g. PROXY Smart Contract 1310) are provided. The first smart contract may have a corresponding first contract address (e.g. Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example, the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 18A and 18B, the description of which applying herein.

The process or FIG. 42 may continue with step S4204 where second smart contract instructions (e.g. PRINT LIMITER Contract Instructions 1360A-1) associated with a second smart contract (e.g. PRINT LIMITER Smart Contract 1360) is provided. The second smart contract may be associated with a second contract address (e.g. Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g. a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g. instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third Authorization Instructions Module 1835.

In embodiments, the second smart contract may be PRINT LIMITER Smart Contract 1360 described above in connection with FIGS. 18A and 18C, the description of which applying herein.

In embodiments, the process of FIG. 42 may continue with step S4206 where third smart contract instructions (e.g. CUSTODIAN 2 Contract Instructions 1350A-1) associated with a first designated custodian contract (e.g. CUSTODIAN 2 Smart Contract 1350). In embodiments, the first designated custodian contract is associated with a third contract address (e.g. Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g. authorization instructions described in connection with CUSTODIAN 2 First Authorization Instructions Module 1849), and/or (2) sixth authorization instructions (e.g. authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 18A and 18D, the description of which applying herein.

In embodiments, the process of FIG. 42 may continue with step S4208 where fourth smart contract instructions (e.g. IMPL Smart Contract Instructions 1320A-1) associated with a fourth smart contract (e.g. IMPL Smart Contract 1320). In embodiments, the fourth smart contract is associated with a fourth contract address (e.g. Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address (and the below mentioned fifth contract address). The fourth smart contract instructions may be saved as part of the blockchain and/or include one or more of the following instructions: (1) token creation instructions (e.g. instructions of IMPL Token Creation Instructions Module 1865), (2) second delegation instructions (e.g. instructions of IMPL Delegation Instructions Module 1837), (3) token transfer instructions (e.g. instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 18A and 18F, the description of which applying herein.

In embodiments, the process of FIG. 42 may continue with step S4210 where fifth smart contract instructions (e.g. STORE Contract Instructions 1330A-1) associated with a fifth smart contract (e.g. STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g. instructions of Storage Instructions Module 1853) and/or (2) fifth authorization instructions (e.g. instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information, may include at least one of: (1) respective public address information associated with the blockchain of the underlying digital asset, and/or (2) corresponding respective token balance information which may be associated with the aforementioned respective public address information, to name a few. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 18A and 18E, the description of which applying herein.

Referring back to FIG. 40A, the process of withdrawing digital assets may continue with step S4008. At step S4008, a list of designated public addresses is obtained by the digital asset exchange computer system associated with a digital asset exchange. In embodiments, the list of designated public addresses may include one or more designated public addresses. Each of the one or more designated public addresses, in embodiments, may also include a respective amount of digital assets. The respective amount of digital assets may refer to an amount of digital assets that the respective designated public address is requesting to withdraw. A simplified, exemplary list of designated public addresses is shown below as Table 1.

TABLE 1

| Designated Public Address | Digital Asset Type | Digital Asset Amount | Timestamp |
|---|---|---|---|
| 123456 | Gemini Dollar | 45 | T1 |
| 543456 | Gemini Dollar | 65 | T1 |
| 654692 | Gemini Dollar | 24 | T2 |
| 687128 | Gemini Dollar | 17 | T2 |
| 357981 | Gemini Dollar | 8 | T1 |
| 354651 | Gemini Dollar | 104 | T3 |

In embodiments, the list of designated public addresses may include one or more of the following: a designated public address, a digital asset type, a digital asset amount, and/or a timestamp, to name a few. The digital asset type may refer to the type of digital asset the customer is seeking to withdraw. While only one type of digital asset is shown in Table 1 (Gemini Dollar), one or more types of digital assets may be included in a list of designated public addresses. The timestamp, in embodiments, may refer to the time at which: (1) the customer sent the request for withdrawal; (2) the customer's request was received; (3) the customer would like to receive their withdrawal; and/or (4) a combination thereof, to name a few.

In embodiments, the process of obtaining a list of designated public addresses may be accomplished in one or more manners. For example, the digital asset exchange computer system may receive a plurality of requests to withdraw an amount of digital asset tokens. In embodiments, each request may include a designated public address, a digital asset type, a digital asset amount, and/or a timestamp, to name a few. Once the plurality of requests is received, the digital asset exchange computer system may generate and store the list of designated public addresses.

As another example, to obtain the list of designated public addresses, the digital asset exchange computer system may first receive a request to distribute a payment amount to one or more designated public addresses in exchange for an asset. The asset, having a corresponding value, as described herein, may not be the digital asset token and/or may be one or more of the following: stocks, bonds, equities, fixed-income securities, fiat, commodities, and/or marketable securities, to name a few. For example, the request to withdraw may be in the form of a request to pay stockholders a dividend based on the amount of stocks the stockholder owns. The request to distribute a payment amount may be received from a digital asset issuer (e.g. the digital asset token issuer system described above in connection with FIGS. 20A-20C, the description of which applying herein). In embodiments, the request to distribute a payment amount may include one or more of: payment information, one or more designated public addresses, a digital asset type associated with a respective designated public address, a digital asset amount associated with a respective designated public address, and/or a timestamp associated with a respective designated public address, to name a few.

In embodiments, continuing the example, the digital asset exchange computer system may access a digital asset security token database for the purposes of determining each respective designated public address of the one or more designated public addresses and/or a respective digital asset security token amount associated with each respective designated public address. In embodiments, the digital asset security token may be a digital asset that represents the asset. For example, if a user associated with a designated public address owns 50 stocks of Corporation A, the user may also own a corresponding 50 Security Tokens representing the ownership of 50 stocks.

Continuing the example, the digital asset exchange computer system may determine the amount of the digital asset that corresponds to the amount of digital asset security tokens. In embodiments, to determine the amount of digital asset, the digital asset exchange computer system may determine the values of the digital asset and the digital asset security token. After determining the values of the digital asset and the digital asset security token, the digital asset exchange computer system may determine a difference between the two values. The difference between the two values, along with the two values, may be used to determine a respective amount of digital assets that each designated public address is requesting. The respective amount, in embodiments, may be assigned to the respective designated public address, creating the list of designated public addresses. The list of designated public addresses may be stored by the digital asset exchange computer system on memory operably connected to the digital asset exchange computer system.

Continuing the process of withdrawing digital assets, optionally, in embodiments, at step S4010, the digital asset exchange computer system may verify the list of designated public addresses. The verification process, in embodiments, may be based on one or more whitelists associated with one or more of the designated public addresses. The digital asset exchange computer system, in embodiments, may verify that each designated public address is verified. In embodiments, the digital asset exchange computer system may verify only the designated public addresses that have one or more whitelists associated therewith.

In embodiments, the one or more designated public addresses may be verified by the process described in connection with FIG. 45. Referring to FIG. 45, the process of verification may begin at step S4502. At step S4502, the digital asset exchange computer system accesses the user identification data associated with each customer of the plurality of customers of the digital asset exchange. In embodiments, at step S4504, the digital asset exchange computer system may determine, for each customer, whether the user identification data includes a whitelist associated with the customer's respective account. If there are no whitelists associated with a customer, the process may continue with FIG. 40B (described below).

If one or more whitelists associated with one or more customers, the process may continue with Step S4506. At step S4506, the digital asset exchange computer system may access the one or more whitelists. The one or more whitelists may include one or more authorized public addresses, as described above. The one or more whitelists may be accessed and/or obtained to determine, at step S4508, whether each respective one or more authorized public addresses is the respective designated public address associated with the customer seeking to withdraw digital assets. In embodiments, the digital asset exchange computer system may make the aforementioned determination by comparing the one or more authorized public addresses to the designated public addresses. If the designated public addresses, in embodiments, match at least one of the one or more authorized public addresses, the designated public address may be verified as an authorized public address. In embodiments, if the designated public addresses are authorized, and therefore verified, the process for withdrawing digital assets may continue with FIG. 40B (continued and described below). If, in embodiments, the designated public addresses are not authorized (or at least one designated public address is not authorized), the process for withdrawing digital assets may continue with FIG. 40C (continued and described below).

Referring to FIG. 40B, the process for withdrawing digital assets may continue with step S4012. At step S4012, the digital asset exchange computer system may increase the total supply of the digital asset token from a first amount to a second amount. The first amount, in embodiments, may refer to the total supply of the digital asset token prior to obtaining the list of designated public addresses. The second amount, in embodiments, may refer to an increased amount of the total supply of the digital asset token. In embodiments, the difference between the second amount and the first amount is equal to or greater than the total amount of digital asset token requested by the designated public addresses of the list of designated public addresses. For example, the first amount of digital asset token may be 100 Bitcoin. Continuing the example, the designated public addresses may have requested 50 Bitcoin. Thus, in this example, the second amount, to account for the amount requested by the designated public addresses, may be at least 150 Bitcoins, making the difference (e.g. a third amount of digital asset tokens), to be at least 50 Bitcoin (e.g. the amount requested). A more detailed description of the process of step S4012 is located in the flowcharts of FIGS. 43A-43B and/or FIG. 44.

In embodiments, increasing the supply of digital asset tokens may begin with the digital asset exchange computer system determining whether the first designated private key has the authority to increase the total supply by the amount requested by the designated public addresses. As mentioned above, the plurality of smart contract instructions may limit the total amount of digital assets that the first designated key pair has the authority to generate. For example, the first designated key pair may only have the authority to generate 25 Bitcoin. Thus, continuing the example, if the third amount is 50 Bitcoin, the first designated key pair would not have the authority to generate the third amount. If the first designated key pair does not have the authority to generate the third amount, the process for withdrawing digital assets, in embodiments, may continue with FIGS. 43A-43B. As another example, if the first designated key pair has the authority to generate 100 Bitcoin, in embodiments, the first designated key pair would have the authority to generate 50 Bitcoin (e.g. the third amount). If the first designated key pair does have the authority to generate the third amount, the process for withdrawing digital assets, in embodiments, may continue with FIG. 44.

Referring to FIG. 43A, the process of increasing the total supply of digital asset tokens may begin with step S4302 where a first transaction request may be generated by the digital asset exchange computer system. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key and/or second designated private key. In embodiments, the first transaction request may include first transaction fee information for minors associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 43A-43B and/or FIG. 44, with the third amount of digital asset tokens being less than the first amount of digital asset tokens.

The process of increasing the total supply of the digital asset token may continue with step S4304. In embodiments, at step S4304, the first transaction request may be sent by the digital asset token issuer system from the first designated public address to the fifth contract address. In embodiments, the first transaction request may be sent via the blockchain of the underlying digital asset. In embodiments, the first transaction request may be sent via network 15.

The process for increasing the total supply of the digital asset token may continue with step S4306 where the first transaction request may be sent from the fifth contract address to the second contract address via the blockchain for the underlying digital asset. The first transaction request, in embodiments, may be sent to the second contract address by the fifth contract address in response to the fifth contract address receiving the first transaction request. In embodiments, the first transaction request may be sent by the fifth contract address in response to the fifth contract address determining that the first transaction request requires additional authority. The aforementioned determination, in embodiments, may be made based on the plurality of smart contract instructions.

In embodiments, once the first transaction request is received by the second contract address, the second smart contract may execute the first transaction request. The execution of the first transaction request may, in embodiments, cause the second contract address to return a first unique lock identifier associated with the first transaction request to the digital asset exchange computer system (e.g. via a public address associated with the digital asset exchange). In embodiments, the first transaction request is executed via the plurality of geographically distributed computer systems in the peer-to-peer network with reference to the blockchain for the underlying digital asset.

In embodiments, the process may continue with step S4308, where the digital asset exchange computer system may obtain the first unique lock identifier. The first lock identifier, as mentioned above, may be obtained from the second smart contract address via a public address associated with the digital asset exchange (e.g. the public address associated with the first designated public key). In embodiments, the first unique lock identifier may be obtained based on reference to the blockchain for the underlying digital asset.

In embodiments, the process for increasing the total supply of the digital asset may continue with step S4310 where a second transaction request may be generated by the digital asset exchange computer system. In embodiments, the second transaction request may be generated in response to the first unique lock identifier being obtained. In embodiments, the second transaction request may be generated at the same time and/or substantially the same time that the first transaction request is generated. The second transaction request may, in embodiments, include a second message which may include a second request to unlock the total supply of the digital asset tokens. The second request may be in accordance with the first request. In embodiments, the second request, may also include the first unique lock identifier. In embodiments, the second transaction request may be digitally signed by the first designated private key and/or the second designated private key. In embodiments, the second transaction request may include second transaction fee information for minors associated with the plurality of geographically distributed computer systems in the peer-to-peer network. The second transaction fee information may be a predetermined amount of currency which may be related to the cost of processing the second transaction request.

The process may continue with step S4312 where the second transaction request may be sent from the first designated public address (the public address associated with the first designated public key) to the third contract address by the digital asset exchange computer system via the blockchain for the underlying digital asset. In embodiments, in response to receiving the second transaction request, the third smart contract may execute the second transaction request. Executing the second transaction request, in embodiments, may include returning a first unique request hash associated with the second transaction request to the first designated public address. The first unique request hash, in embodiments, may be an algorithm as described above, the description of which applying herein. In embodiments, the second transaction request may be executed via the plurality of geographically distributed computer systems in the peer-to-peer network with reference to the blockchain associated with the underlying digital asset.

Figure 43B:
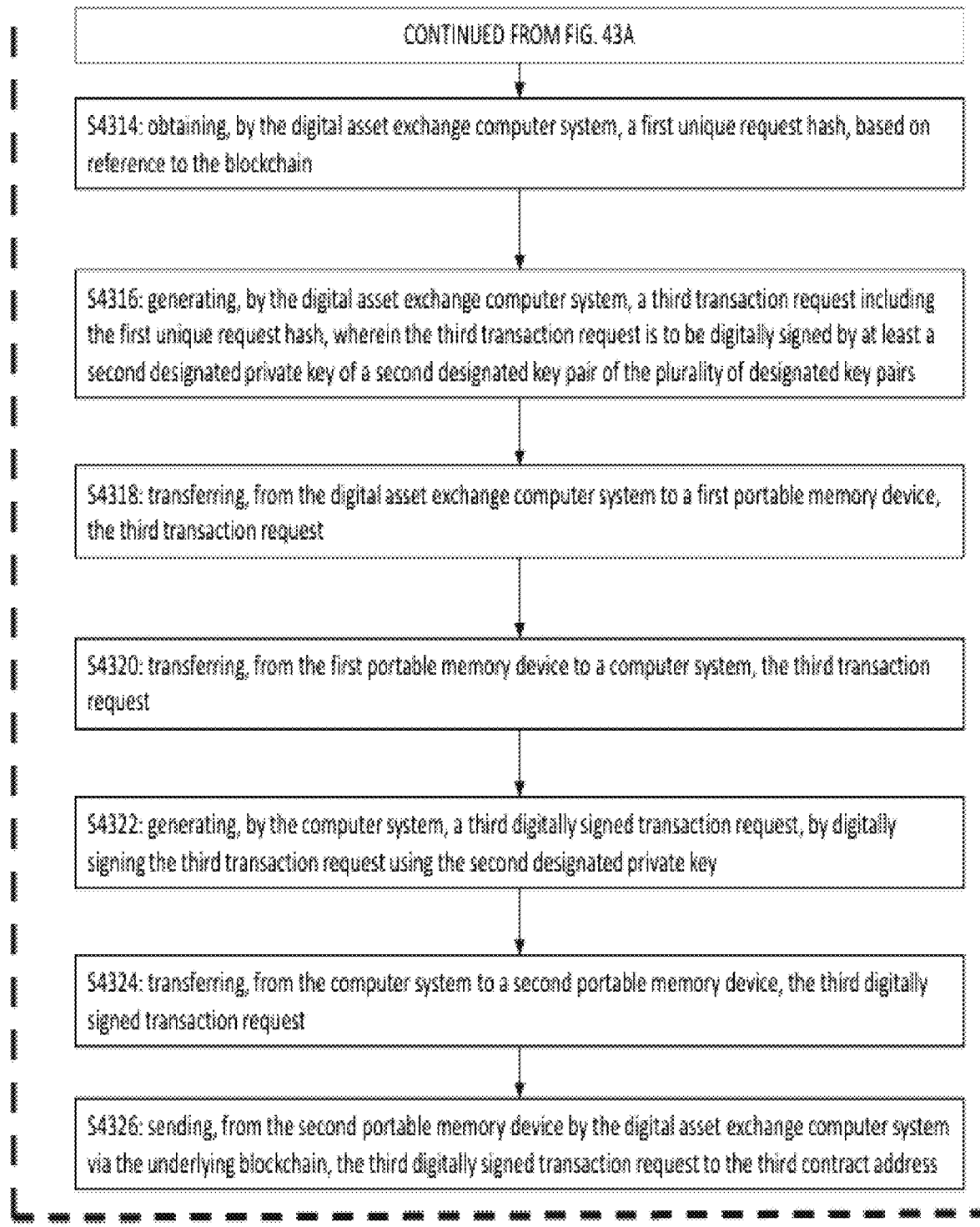

The process for increasing the total supply of the digital asset token may continue with FIG. 43B. Referring to FIG. 43B, the process may continue with step S4314 where, in embodiments, the first unique request hash may be obtained by the digital asset exchange computer system. The first unique request hash, as mentioned above, may be obtained from the third smart contract address via a public address associated with the digital asset exchange (e.g. the public address associated with the first designated public key—the first designated public address). In embodiments, the first unique request hash may be obtained based on reference to the blockchain for the underlying digital asset.

Continuing the process, at step S4316, in embodiments, a third transaction request may be generated by the digital asset exchange computer system. The third transaction request may, in embodiments, be generated to be digitally signed by the first designated private key and/or the second designated private key. In embodiments, the third transaction request may include the first unique request hash. In embodiments, the third transaction request may be generated at the same time and/or substantially the same time that the first transaction request and/or second transaction request is generated. The third transaction request, in embodiments, may be generated in response to the digital asset token issuer system obtaining the first unique request hash.

In embodiments, at step S4318, the third transaction request may be transferred to a first portable memory device. In embodiments, the third transaction request may be transferred to the first portable memory device by an administrator (e.g. an administrator of administrator system 1801, administrator of the digital asset exchange computer system, to name a few). In embodiments, the third transaction request may be transferred from the digital asset exchange computer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S4320 where the third transaction request may be transferred from the first portable memory device to a first computer system. The first computer system, as mentioned above, may be a hardware security module. In embodiments, the third transaction request may be transferred to the second computer system by an administrator (e.g. an administrator of administrator system 1801, administrator of the digital asset exchange computer system, to name a few).

At step S4322, in embodiments, the computer system may generate a third digitally signed transaction request by digitally signing the third transaction request. The digital signature used by the computer system, in embodiments, may be one or more of: the first designated private key and/or the second designated private key. In embodiments, the digital signature may be a private key of the plurality of designated key pairs provided in step S4004.

In embodiments, once the third digitally signed transaction request is generated, at step S4324, the third digitally signed transaction request may be transferred from the computer system to a second portable memory device. The second portable memory device may, in embodiments, be the first portable memory device (e.g. the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process for increasing the total supply of the digital asset may continue with step S4326 where the third digitally signed transaction request may be sent from the second portable memory device to the third contract address using the digital asset exchange computer issuer system, via the blockchain for the underlying digital asset. To send the third digitally signed transaction request, in embodiments, the third digitally signed transaction request may be first transferred from the second portable memory device to the digital asset exchange computer system. Once transferred, in embodiments, the third digitally signed transaction request may be sent by the digital asset exchange computer system, from the first designated public address (associated with the first designated key pair) to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call being sent to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the fifth contract address may also return the total balance of the digital asset token to the second contract address and/or the fourth contract address.

In embodiments, the steps of the process described in connection with FIGS. 43A-43B may be rearranged or omitted.

Figure 44:
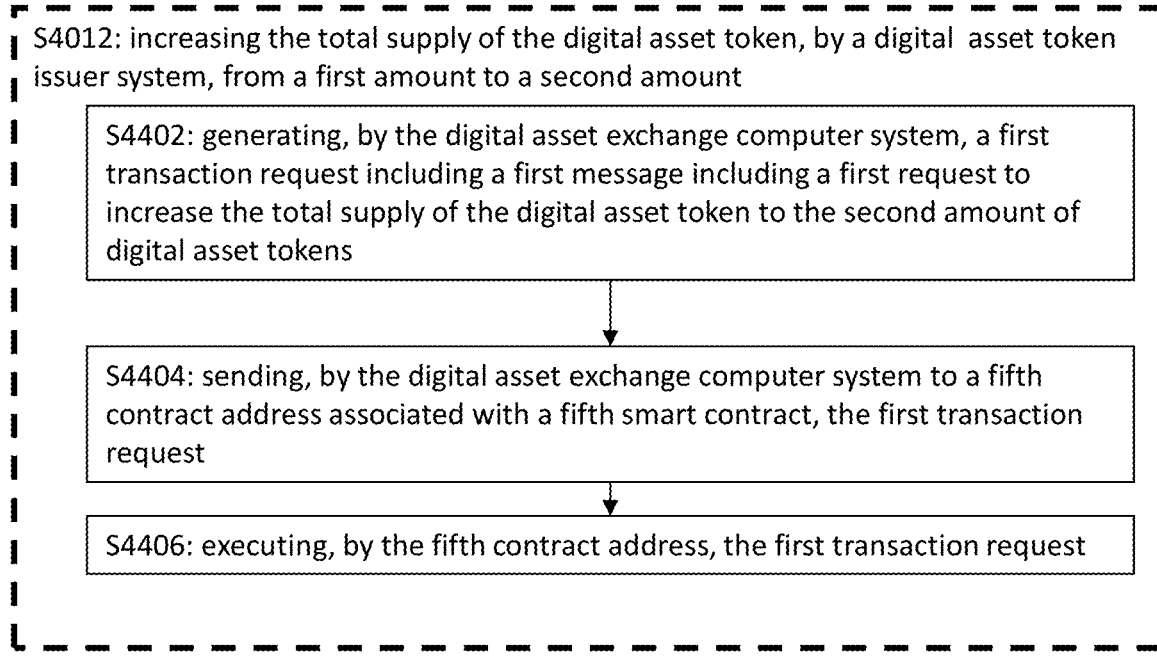
FIG. 44 is a flow chart of a process for increasing a total supply of digital asset tokens in accordance with exemplary embodiments of the present invention.

As another example, a process for increasing the total supply of the digital asset may be performed by the steps of FIG. 44. Referring to FIG. 44, in embodiments, the first designated key pair may have the authority to increase the total amount of the digital asset token to the second amount. In such embodiments, the digital asset exchange may, at step S4402, generate a first transaction request including a first request. The first request may include a request to increase the total supply of the digital asset token to the second amount of digital asset tokens. In embodiments, the first transaction request may be digitally signed by the first designated private key and/or the second designated private key.

The first request may, at step S4404, be sent by the digital asset exchange computer system to the fifth contract address associated with the fifth smart contract. The first request may be sent from a public address associated with the digital asset exchange (e.g. the first designated public address).

Once received, at step S4406, the fifth contract address may execute the first transaction request via the plurality of geographically distributed computer systems in the peer-to-peer network with reference to the blockchain. In embodiments, the execution of the first transaction request may cause the fifth smart contract to: (1) validate the authority of the first designated key pair of the plurality of designated key pairs; and/or (2) send a first call to the fourth smart contract address to generate the third amount of the digital asset. In embodiments, in response to receiving the first call, the fourth smart contract may execute, via the plurality of geographically distributed computer systems in the peer-to-peer network with reference to the blockchain, the first call to generate the first unique lock identifier. In embodiments, once generated, the fourth contract address may send a return including the first unique lock identifier to the second smart contract address.

In embodiments, the second smart contract may execute a second call to the fourth contract address in response to the return of the first unique lock identifier. In embodiments, the second call may be executed via the plurality of geographically distributed computer systems in the peer-to-peer network with reference to the blockchain. The second call, in embodiments, may be to confirm the first call with the first lock identifier. In embodiments, in response to receiving the second call, the fourth smart contract may execute, via the plurality of geographically distributed computer systems in the peer-to-peer network with reference to the blockchain, the first call to execute a third call to the fifth contract address to obtain the total supply of digital asset tokens in circulation.

In embodiments, the fifth contract address, in response, via the plurality of geographically distributed computer systems in the peer-to-peer network with reference to the blockchain, may execute the third call and return, to the fourth contract address, the second amount of digital asset tokens corresponding to the total supply of digital asset tokens in circulation. In embodiments, for example, the total supply of digital asset tokens may be the first amount of the digital asset token.

In response to the return, in embodiments, the fourth smart contract may execute, via the plurality of geographically distributed computer systems in the peer-to-peer network with reference to the blockchain, a fourth call request to the fifth contract address to set a new total supply of digital asset tokens in circulation to the second amount. In embodiments, in response to the fourth call, the fifth smart contract may execute, via the plurality of geographically distributed computer systems in the peer-to-peer network with reference to the blockchain, the fourth call and set the new total supply of digital asset tokens in circulation to the second amount.

In embodiments, the steps of the process described in connection with FIG. 44 may be rearranged or omitted.

Referring back to FIG. 40B, after increasing the total supply of the digital asset token to the second amount, the digital asset exchange computer system at step S4014 may assign each respective amount of the digital asset token to each respective designated public address of the list of designated public addresses. In embodiments, the digital asset exchange computer system may accomplish step S4014 by obtaining and/or accessing the list of designated public addresses. For example, referencing the above Table 1, Table 2 below shows the respective amount of the digital asset to be assigned.

TABLE 2

| Designated Public Address | Digital Asset Type | Digital Asset Amount |
| --- | --- | --- |
| 123456 | Gemini Dollar | 45 |
| 543456 | Gemini Dollar | 65 |
| 654692 | Gemini Dollar | 24 |
| 687128 | Gemini Dollar | 17 |

TABLE 2-continued

| Designated Public Address | Digital Asset Type | Digital Asset Amount |
|---|---|---|
| 357981 | Gemini Dollar | 8 |
| 354651 | Gemini Dollar | 104 |

Once the respective amounts of the digital asset have been assigned, the digital asset exchange computer system, at step S4016, may confirm that each designated public address was assigned the respective amount of the digital asset token. For example, referring to Table 2 above, the digital asset exchange computer system may confirm the following: designated public address 123456 received 45 Gemini Dollars; designated public address 543456 received 65 Gemini Dollars; designated public address 654692 received 24 Gemini Dollars; designated public address 687128 received 17 Gemini Dollars; designated public address 357981 received 8 Gemini Dollars; and/or designated public address 354651 received 104 Gemini Dollars. In embodiments, the digital asset exchange computer system may make the confirmation based on one or more of the following: each respective digital asset security token amount, each respective payment amount, each respective designated public address, and/or the list of designated public addresses, to name a few.

Each respective amount, in embodiments, may be confirmed by the digital asset exchange computer system by sending a call to each designated public address. The call, in embodiments, may be sent from a public address associated with the digital asset exchange. Each designated public address, in embodiments, may return the amount assigned and/or the total amount of digital assets assigned to the respective designated public address. The return may be used by the digital asset exchange computer system to confirm that each respective amount was received. In embodiments, the returns may be stored by the digital asset exchange computer system.

In embodiments, the digital asset token issuer system may determine that each respective amount is not confirmed as received and/or is unable to confirm that each amount is received. For example, the digital asset token issuer system may determine that the designated public address 123456 received 13 Gemini Dollars, instead of 45. In these embodiments, the digital asset exchange computer system may generate and/or send a warning message for an administrator (e.g. an administrator of administrator system 1801) and/or the respective designated public address. In embodiments, the administrator system may be the digital asset exchange. In embodiments, the administrator system may not be the digital asset exchange. The warning message may include a notification stating that the amount of tokens that were assigned is incorrect and/or needs to be fixed. Additionally, the warning message may include a transaction ledger (e.g. Network Digital Asset Transaction Ledger 3228). Furthermore, the warning message may include the intended amount of digital asset tokens (e.g. 45 Gemini Dollars). In embodiments, if the digital asset exchange computer system determines that each respective amount is not confirmed as received and/or is unable to confirm that each amount is received, the digital asset token issuer system may repeat one or more of the steps of the processes described above in connection with FIGS. 43A-43B, and/or FIG. 44 in order to fix the amount of the digital asset token to the correct amount.

In embodiments, as mentioned above, the digital asset exchange computer system may determine that one or more designated public addresses of the list of designated public addresses is not authorized to withdraw digital assets. If one or more designated public addresses are not authorized, the digital asset exchange computer system, in embodiments, may perform the steps of the process illustrated in FIG. 40C. Referring to FIG. 40C, the digital asset exchange computer system, at step S4018, may generate a notification. The notification, in embodiments, may indicate that the respective designated public address cannot be assigned the respective amount of the digital asset. In embodiments, the notification may also include an option to override the security measure to prevent the withdrawal of digital assets to an unverified account. The option to override, in embodiments, may require user identification information, which may include personally identifiable information.

At step S4020, the digital asset exchange computer system may send the notification to a user device associated with the request to withdraw. Additionally, in embodiments, the notification may also be sent to: a third party computer system and/or an administrator associated with the digital asset exchange. The notification, in embodiments, may also be stored by the digital asset exchange computer system.

The digital asset exchange computer system, at step S4022, may cancel the respective request to withdraw the respective amount of digital asset token. Alternatively, if the option to override is utilized, the process may continue with FIG. 40B.

In embodiments, the steps of the process described in connection with FIGS. 40A-40C may be rearranged or omitted.

FIG. 46 illustrates a process for issuing electronic payments using a fiat-backed digital asset on a digital asset security token in accordance with exemplary embodiments of the present invention. An electronic payment may be, for example, interest in a debt security, royalties associated with intellectual property, dividends associated with an equity security, stock, bond, or the like, and/or a settlement of a lawsuit (e.g. a single party, class action law suit, etc.), to name a few. In embodiments, the process for issuing electronic payments may begin at step S4602. At step S4602, a digital asset security token database is provided. The digital asset security token database may be similar to the security token databases described above in connection with FIGS. 9A-9B and 10, the description of which applying herein. The digital asset security token database may include a log of digital asset security tokens which may include a first set of digital asset addresses, and, for each address of the first set of digital addresses, a security token amount associated with the respective digital address. A simplified example of the first set of digital asset addresses and respective security token amounts is shown in the below table.

| First Set of Digital Asset Addresses and Security Token Amount | | |
|---|---|---|
| User | Digital Asset Address | Security Token Amount |
| User 1 | 1CC3X2gu58d6wXUWMffpuzN9JAfTUWu4Kj | 152 Security Tokens |
| User 2 | 1CC3Xdaegae6wXUWMffpuzN9JAasfdgve208 | 12 Security Tokens |
| User 3 | VIENLN1390dafnjas9gh98y2t3nlvasoihdne | 100 Security Tokens |
| User 4 | 0032JKLIUOINViunlalsiune82_1lkasjfh.10 | 50 Security Tokens |

First Set of Digital Asset Addresses and Security Token Amount

| User | Digital Asset Address | Security Token Amount |
|---|---|---|
| User 5 | JKSdfhuawanvawn398097125n13287un3nl | 72 Security Tokens |

As shown in the above table, each digital asset address may have a respective security token amount. Each digital asset address may be associated with one or more users. For example, digital asset address 1CC3X2gu58d6wXUWMffpuzN9JAfTUWu4Kj may be associated with User 1. Each user, in embodiments, may be associated with a public key and a mathematically related private key. A public key in embodiments may be used to generate a digital asset public address. For example, the digital asset address associated with User 3 may be generated by applying a hash algorithm to the public key associated with User 3. The result of the application of the hash on the public key may be the digital asset address.

In embodiments, the security token amount may be any number of security tokens, including zero security tokens. The security tokens, in embodiments, may represent ownership in an asset. For example, a security token may represent a user's ownership interest in: a security registered with a government authority; a security; a stock; a bond; a debt security; an equity security; intellectual property rights; and/or real estate, to name a few. As an example, the security token may represent stocks in Corporation A. Continuing the example, User 4, having a digital asset address of 0032JKLIUOINViunlalsiune82_llkasjfh.10, may own 50 stocks of Corporation A. Thus, in this example, the each of the stock holders, Users 1-5, may be receiving a dividend payment proportional to the amount of stock each User owns.

In embodiments, each respective address of the first set of digital asset addresses may be tied to a distributed transaction ledger maintained by a plurality of geographically distributed computer systems in a peer-to-peer network. The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

In embodiments, the digital asset security token database may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g. twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a *byzantine* fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

The process for issuing electronic payments using a fiat-backed digital asset may continue at step S4604. At step S4604, a fiat-backed digital asset database is provided. The fiat-backed digital asset, in embodiments, may be stored on the distributed transaction ledger and include a log of fiat backed digital assets. The log of fiat backed digital assets may include a second set of digital asset addresses, each associated with one or more users. The digital asset addresses, in embodiments, may also include a respective amount of fiat-backed digital asset amounts. A simplified example of the second set of digital asset addresses and respective fiat-backed digital asset amounts is shown in the below table.

Second Set of Digital Asset Addresses and Fiat-Backed Digital Asset Amount

| User | Digital Asset Address | Fiat-Backed Digital Asset Amount |
|---|---|---|
| User 6 | UWMffpuzN9JAfTUWu4Kj | 22 Fiat-Backed Digital Assets |
| User 7 | 1CC3Xdaegae6wXUWMffp | 51 Fiat-Backed Digital Assets |
| User 8 | LN1afnjas9gh98y2t3ndne | 3 Fiat-Backed Digital Assets |
| User 9 | basd_1lkasjfh.10bfase24s | 103 Fiat-Backed Digital Assets |
| User 10 | bq38097125n13287un3nl | 28 Fiat-Backed Digital Assets |

As shown in the above table, each digital asset address may have a respective fiat-backed digital asset amount. The fiat-backed digital asset amount may refer to the amount of fiat-backed digital assets that are owned by the digital asset address. In embodiments, each digital asset address may be associated with one or more users. For example, digital asset address LN1afnjas9gh98y2t3ndne may be associated with User 8. Each user, in embodiments, may be associated with a public key and a mathematically related private key. A public key in embodiments may be used to generate a digital asset public address. For example, the digital asset address associated with User 2 may be generated by applying a hash algorithm to the public key associated with User 2. The result of the application of the hash on the public key may be the digital asset address. In embodiments the first set of digital asset addresses may be the same as or associated with the second set of digital asset addresses.

In embodiments, the fiat-backed digital asset amount may be any number of security tokens, including zero fiat-backed digital assets. The fiat-backed digital asset tokens may be backed by one or more assets and/or types of assets that are maintained by one or more entities. The one or more entities may refer to, for example, one or more: trusted entities, administrators, token issuers, verifiers, corporations, and/or banks, to name a few.

In embodiments, the fiat-backed digital asset may be backed by one or more amounts of one or more types of the following assets: one or more types of fiats (e.g., U.S. Dollars, Euro, Yen, Brittish Pound, Swiss Franc, Canadian Dollar, Australian Dollar, New Zealand Dollar, Kuaiti Dinar, Bahrain Dinar, Oman Rial, Jordan Dinar, Cayman Island Dollar, South African Rand, Mexican Pesos, Renmembi, to name a few); bank accounts in such fiat; one or more government securities denominated in such fiats (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate; gold; diamonds; and/or a combination thereof, to name a few. In embodiments may be only one kind of asset (e.g., dollars held in a bank or government security or CD, to name a few) or a basket of assets (e.g., multiple fiats, e.g., dollars, euros, yet, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

In embodiments, the fiat-backed digital assets may be issued by a fiat-backed digital asset issuer. The process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein. In embodiments, the fiat-backed digital asset issuer may issue fiat-backed digital assets in response to fluctuations in demand of the fiat-backed digital asset. For example, if the demand of the fiat-backed digital asset increases, the fiat-backed digital asset issuer may print fiat-backed digital assets. Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn fiat-backed digital assets. Continuing the example, the fiat-backed digital asset issuer may burn fiat-backed digital assets in proportion to the decrease in demand. Alternatively, the fiat-backed digital asset issuer may burn fiat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, the digital asset security issuer system may receive one or more payment requests from one or more digital asset security token holders. For example, a stock holder may request a payment of dividends based on the amount of security tokens the stock holder owns. The payment request, in embodiments, may have rules and/or instructions that control when the one or more security token holders may receive a payment. Continuing the example, Corporation A may only pay dividends after January 2 of each year. Thus, the digital asset security token issuer system may only accept payment requests on or after January 3. As another example, Corporation A may only pay dividends in the month of January. Thus, a payment request, in this example, may only be accepted and processed during the month of January.

In embodiments, a payment request may include the digital asset address of the digital asset security token holder requesting the payment and/or a request to transfer a payment amount of fiat-backed digital assets to the digital asset address of the digital asset security token holder requesting the payment. The payment request may further include a designated address to receive the payment, the amount of security tokens the security token holder owns, and/or a timestamp indicating one or more of the following: the time and/or date at which the payment request was sent, the time and/or date at which the payment request was received, and/or the time and/or date the security token holder wishes to receive the payment.

In embodiments, after receiving the one or more payment requests, the digital asset security token issuer system may verify the one or more payment requests. Verifying the one or more payment requests may include confirming one or more of the following: the validity of the digital asset address of the digital asset security token holder, the digital asset security token amount owned by the security token holder, that the security token holder owns more than zero security token assets, the designated address is not prohibited from receiving a payment on behalf of the security token holder, and/or the security token holder is entitled to receive a payment, to name a few. For example, to confirm the digital asset address, the digital asset security token issuer system may compare the digital asset address included in the payment request to the first set of digital asset addresses. Continuing the example, if the digital asset address included in the payment request is one of the digital asset addresses of the first set of digital asset addresses, the digital asset security token issuer system may verify the digital asset address. If the digital asset address included in the payment request is not verified, the payment request may be denied and/or a notification may be generated and sent by the digital asset security token issuer system to the digital asset address included in the payment request. The notification may indicate that the digital asset address was not confirmed and the payment request has been denied. As another example, if the payment request includes a designated address, the digital asset security token issuer system may verify whether the designated address is on a whitelist associated with the digital asset address that sent the payment request. Continuing the example, if the digital asset address has a whitelist associated with it, the digital asset security token issuer system may compare the designated address to the whitelist. If the designated address is on the whitelist, the designated address may be verified. If the designated address included in the payment request is not verified, the payment request may be denied and/or a notification may be generated and sent by the digital asset security token issuer system to the digital asset address included in the payment request. The notification may indicate that the designated address is not authorized to receive payment and the payment request has been denied. The process of verifying designated addresses in the context of a whitelist may be similar to the process described in connection with FIG. 45, the description of which applying herein.

The process of issuing electronic payments using a fiat-backed digital asset may continue with step S4608. At step S4608, a trusted entity system may obtain a first sum of fiat-backed digital assets. A trusted entity, in embodiments, may be similar to the trusted entities described in this disclosure, the description of which applying herein. In embodiments the trusted entity may be a regulated digital asset exchange (e.g. Gemini). The trusted entity system may be a plurality of trusted entities of the peer-to-peer network. The trusted entity system, in embodiments, may include one or more third-parties and/or government agencies. The first sum, in embodiments, may be obtained by one or more of the following means: purchase, transfer, trade, receive and/or print, to name a few. In embodiments, the fiat-backed digital assets may be issued by a fiat-backed digital asset issuer. For example, the fiat-backed digital assets may be issued through one or more nodes associated with the fiat-backed digital asset issuer. As noted above, the process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein.

The process of FIG. 46 may continue with step S4610. At step S4610, the trusted entity system may access the digital asset security token database. The process of accessing the digital asset security token database continues, in embodiments, at FIG. 47. Referring to FIG. 47, at step S4702, the trusted entity may determine each respective digital asset address of the first set of digital asset addresses for each respective digital asset security token holder. The trusted entity may make this determination by querying the digital asset security token database via the peer-to-peer network. In embodiments, in response, the digital asset security token database may return the digital address of each respective digital asset security token holder. In embodiments, the determined digital asset addresses for each digital asset security token holder may be compared to the first set of digital asset addresses. This confirmation, in embodiments, may verify the first set of digital asset addresses. If one or more of the digital asset addresses is not confirmed, the trusted entity system may: cancel the electronic payment associated with the unconfirmed digital asset address and/or cancel the electronic payment associated with the first set of digital asset addresses. If one or more digital asset addresses included in the first set of digital asset addresses is not confirmed, a notification may be generated and sent by the trusted entity to the one or more digital asset addresses which were not confirmed and/or one or more digital asset addresses of the first set of digital asset addresses. The notification may indicate the digital asset address(es) which were not confirmed and the payment request has been denied.

The process of FIG. 47 may continue with step S4704. At step S4704, the trusted entity may determine the respective digital asset security token amount associated with each respective digital asset address. The trusted entity may make this determination by querying the digital asset security token database via the peer-to-peer network. In embodiments, in response, the digital asset security token database may return the security token amount associated with each digital address of each respective digital asset security token holder. In embodiments, the determined security token amount for each digital asset security token holder may be compared to the security token amount included in the log of digital asset security tokens. This confirmation, in embodiments, may verify the respective amounts of security tokens for the first set of digital asset addresses. If one or more of the amounts of security tokens is not confirmed, the trusted entity system may: correct the unconfirmed amount of security tokens, cancel the electronic payment associated with the unconfirmed security token amount and/or cancel the electronic payment associated with the first set of digital asset addresses. If one or more security token amounts included in the log of digital asset security tokens is not confirmed, a notification may be generated and sent by the trusted entity to the one or more digital asset addresses which are associated with the unconfirmed security token amount and/or one or more digital asset addresses of the first set of digital asset addresses. The notification may indicate: the security token amount that was not confirmed, the correct security token amount, the digital asset address(es) associated with the unconfirmed security token amount(s), the payment for the digital asset address(es) associated with the unconfirmed security token amount(s) was altered to reflect the correct security token amount, and/or the payment request has been denied, to name a few.

Referring back to FIG. 46, the process of issuing electronic payments using a fiat-backed digital asset may continue with step S4612. At step S4612, a respective payment amount may be determined. Each respective payment amount may be the amount of fiat-backed digital asset that each respective digital asset address is to be paid. Determining a respective payment amount may be similar to the description associated with FIG. 12, the description of which applying herein. The determination of respective payment amounts, in embodiments, may be based on one or more of the following: a fixed notional amount, the first sum of fiat-backed digital assets, and/or the respective digital asset security token amount associated with the respective digital asset address. For example, if the security tokens represent ownership of stock, each stock is represented by one security token, and the payment is for a dividend of 5 dollars per stock, the respective payment amount may be determined by multiplying five dollars by the respective amount of digital asset security tokens. In embodiments, the determination of a respective payment amount may be performed by one or more of the following: the trusted entity system, a trusted entity of the trusted entity system, the digital asset security token issuer, the fiat-backed digital asset token issuer system, and/or one or more security token holders, to name a few. In embodiments, more than one entity may determine the respective payment amounts. The multiple determinations of the respective payment amounts may be used to confirm each respective payment amount. In embodiments, the payment amounts may be related to one or more of the following: a dividend to be paid based on ownership of stock represented by ownership of each digital asset security token; a royalty to be paid based on ownership of intellectual property represented by ownership of each digital asset security token; and/or interested to be paid based on ownership of an asset represented by ownership of each digital asset security token, to name a few.

In embodiments, the trusted entity system may obtain the first sum of fiat-backed digital assets by printing the first sum of fiat-backed digital assets. In embodiments, the first sum may correspond to the sum of the respective payment amounts. In embodiments, the fiat-backed digital asset database may be updated to reflect the newly minted fiat-backed digital assets (and/or just the new transfer of fiat-backed digital assets) via transaction instructions sent to the peer-to-peer system which request the fiat-backed digital asset database be updated to reflect the addition of new fiat-backed digital assets in the amount of the first sum and the corresponding digital asset address associated with each new fiat-backed digital asset.

The process of issuing electronic payments using a fiat-backed digital asset may continue with step S4614. At step S6414, the trusted entity system may generate transaction instructions to transfer each respective payment amount to each respective digital asset address. The transaction request, in embodiments, may include a transfer request of each respective payment amount to be transferred from an account associated with the digital asset security token issuer system to each respective digital asset address. In embodiments, the transaction instructions may further include instructions to update the fiat-backed digital asset database to reserve enough fiat-backed digital assets to cover each respective payment amount (e.g. the first sum of fiat-backed digital assets). For example, the transfer request may include the data listed in the below table.

tion and/or commitment of the transaction instructions may not affect ownership of the digital asset security tokens. In embodiments, the execution and/or commitment of the transaction instructions may affect ownership of the digital asset security tokens. For example, if the digital asset security tokens represent ownership interest in a settlement of a lawsuit, the payment may be a one-off payment, resulting in the burning of the digital asset security tokens.

The process of issuing electronic payments using a fiat-backed digital asset may continue with step S4618. At step S4618, each digital address is notified of each respective transfer. In embodiments, the trusted entity system may generate and send a notification to each respective digital address notifying them of the transfer. In embodiments, prior to sending the notification, the trusted entity system may confirm that each digital asset address received the correct amount of fiat-backed digital assets. The confirmation process may be a call/return to and from each respective digital asset address. In embodiments, the confirmation process may be a query to the peer-to-peer system for a status of the distributed ledger, which may result in a receipt of the status of the ledger which may include each transfer.

In embodiments, the steps of the processes of FIGS. 46 and 47 may be rearranged or omitted.

Non-Fungible Tokens

In embodiments, a non-fungible token may be provided on a peer-to-peer distributed network in the form of a blockchain (or other distributed networks, e.g. a peer-to-peer network). Examples of non-fungible tokens include: Cryp-

| Transfer Request Information | | | |
| --- | --- | --- | --- |
| From | To | User Digital Asset Address | Payment Amount |
| Digital Asset Security Token Issuer System Account | User 1 | 1CC3X2gu58d6wXUWMffpuzN9JAfTUWu4Kj | 22 Fiat-Backed Digital Assets |
| | User 2 | 1CC3Xdaegae6wXUWMffpuzN9JAasfdgve208 | 51 Fiat-Backed Digital Assets |
| | User 3 | VIENLN1390dafnjas9gh98y2t3nlvasoihdne | 3 Fiat-Backed Digital Assets |
| | User 4 | 0032JKLIUOINViunlalsiune82_1lkasjfh.10 | 103 Fiat-Backed Digital Assets |
| | User 5 | JKSdfhuawanvawn398097125n13287un3nl | 28 Fiat-Backed Digital Assets |

In embodiments, the transfer request may include a digital signature of the trusted entity system. The digital signature may be a combined digital signature based on of one or more private keys associated with one or more trusted entities of the trusted entity system. The digital signature, in embodiments, may further include one or more private keys associated with the digital asset addresses.

The process of issuing electronic payments using a fiat-backed digital asset may continue with step S4616. At step S4616, the trusted entity system may publish the generated transaction instructions associated with crediting the respective payment amount. In embodiments, the trusted entity system may publish the transaction instructions to the peer-to-peer network via a network (e.g. Network 15). In embodiments, publishing the transaction instructions may cause the peer-to-peer network to go through a process of executing and/or committing the transaction instructions (e.g. a consensus protocol) which may result in the transfer of each respective amount of fiat-backed digital assets to each respective digital asset address. In embodiments, the executokitties, Cryptofighters, Decentraland, Etherbots, Ethermon, Rare peppes, Spells of Genesis, Crafty. Superarre, Terra0, Unico, everdragon, crypto baseball, mycryptoheroes, and/or marblecard, to name a few. In embodiments, non-fungible tokens, (e.g. Crytpokitties) may be transferable and accounted for as a digital asset token on an underlying blockchain network (e.g., the Ethereum Network). In embodiments, a first non-fungible token (e.g. a First CryptoKitty) may have attributes (e.g. characteristics of a non-fungible token) that are different from a second non-fungible token (e.g. a Second CryptoKitty), even if both are the same type of non-fungible token (e.g., a CryptoKitty). For example, the First CryptoKitty may be a striped CryptoKitty, while the Second CryptoKitty may be a droopy-eyed CryptoKitty. In embodiments, the attributes of each non-fungible token may be customizable. In embodiments, programming modules may be added to and/or transferred with programming modules associated with specific tokens. By way of illustration, in embodiments, a first token, e.g., a Cryptokitten Tiger, may purchase a second token, e.g., a digital "hat,"

that will then become associated with the first token to be a Tiger with a hat, and remains with the first token when transferred. In embodiments, the second token may be separately transferable, such as for example, the second token may be sold to the holder of a third token (e.g., a Black Cryptokitten) so that the second token is combined with the third token to be a Black Cryptokitten with the hat. In embodiments, when transferred, the second token will no longer be associated with the first token (e.g, the Crypokitten Tiger will no longer wear the hat). In embodiments, even when transferred, the second token may also remain associated with the first token in addition to the third token (e.g., both the Cryptokitten Tiger and the Black Cryptokitten are wearing the same hat).

In embodiments, one or more individuals who are purchasing a non-fungible token, may not have an address on, or may not be familiar with, the blockchain 6803 or would prefer not to interact directly with the blockchain 6803. In embodiments, a non-fungible token platform may provide one or more customers with the opportunity to purchase one or more non-fungible tokens without first having a public address associated with the blockchain 6803. For example, a first user operating a user device may access a non-fungible token platform. In embodiments, the non-fungible token platform may be accessed via a browser at a URL address on the Internet. In embodiments, the non-fungible token platform may be accessed via a downloadable application on a user device, such as a mobile phone, tablet, computer, to name a few. The non-fungible token platform, may, in embodiments, be accessed via a graphical user interface displayed on the user device associated with the first user. An exemplary graphical user interface is shown in connection with FIG. 52A. Once accessed, the first user may log-in and/or create an account with a digital asset exchange system associated with the platform. Once the first user has logged in and been authenticated, the first user, via the first user device, may browse one or more non-fungible tokens available.

Figure 52A:
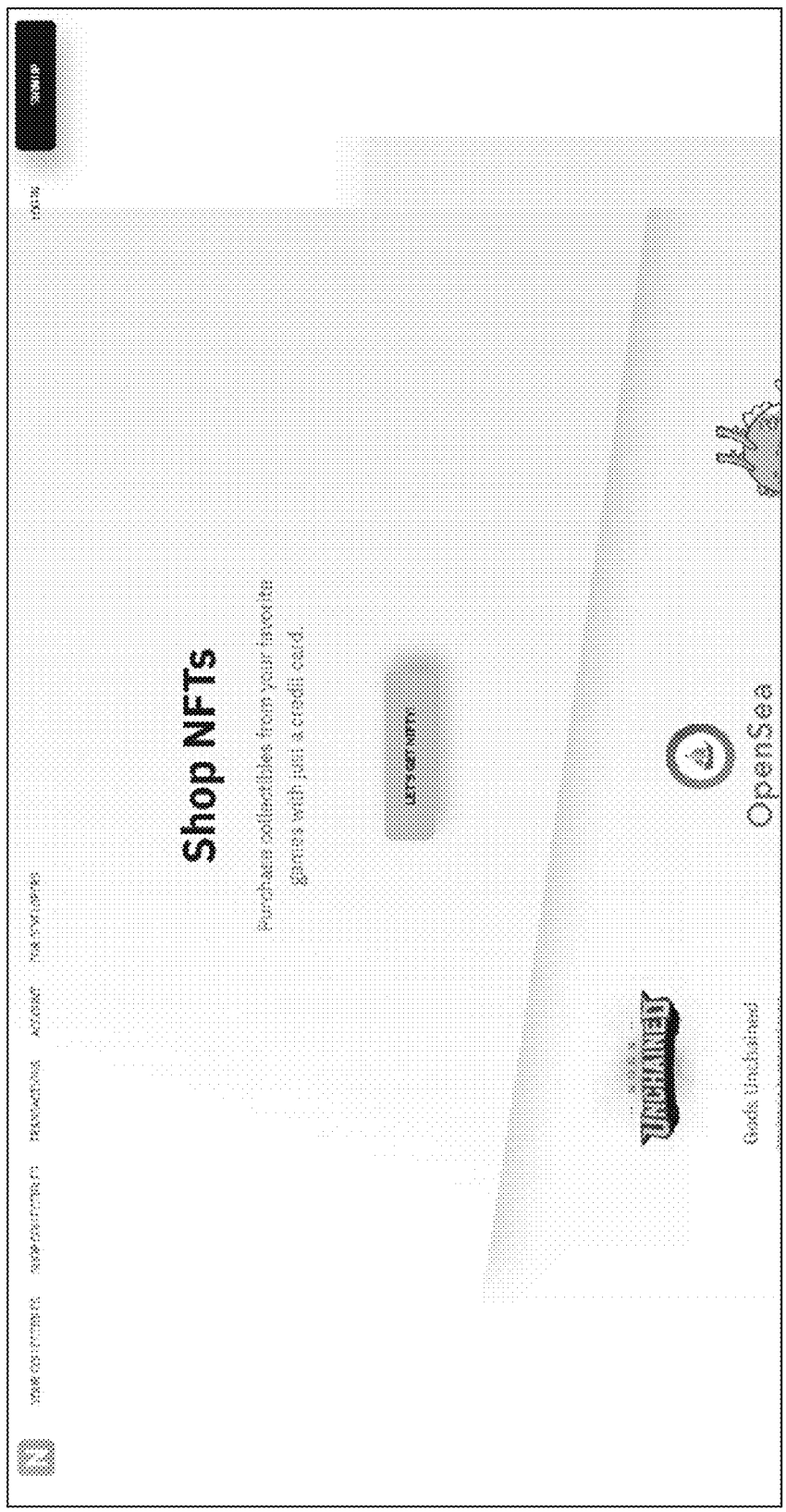
FIGS. 52A-52D illustrate screenshots showing exemplary embodiments of purchasing a non-fungible token in accordance with exemplary embodiments of the present invention.
Figure 52B:
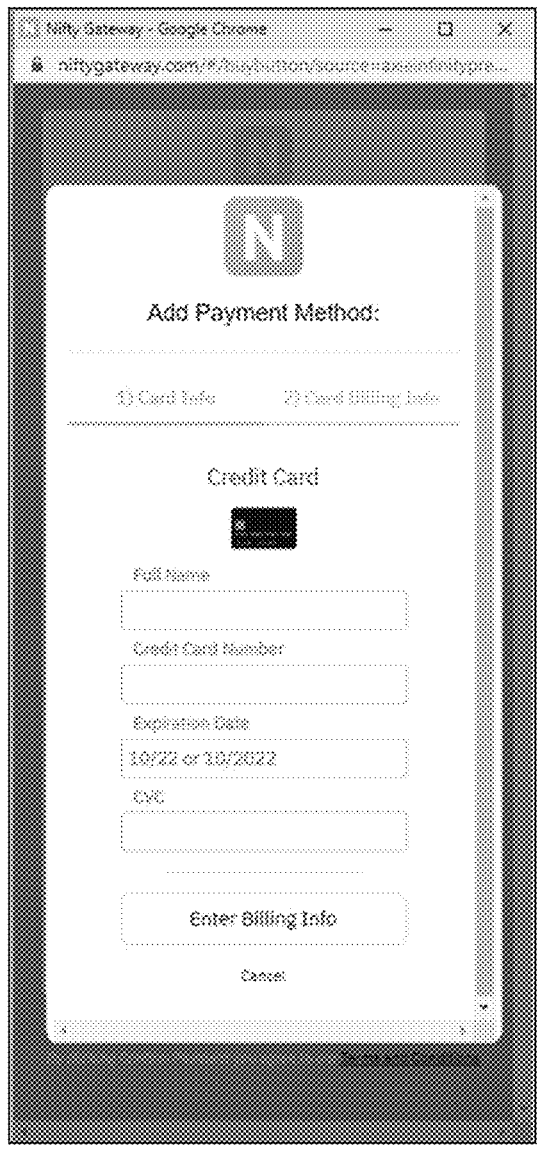
Figure 52C:
Figure 52D:
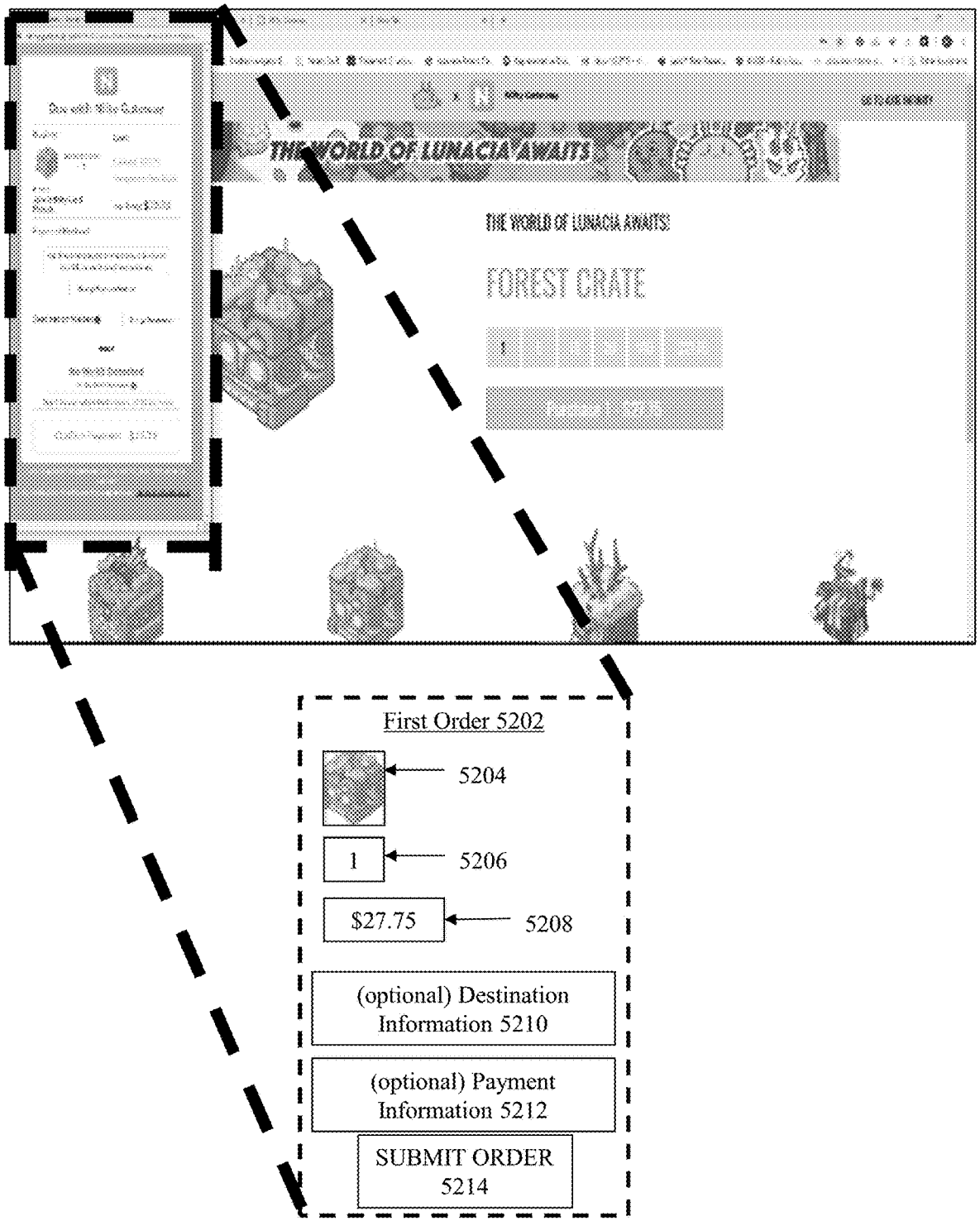

In embodiments, the first user may wish to purchase a first non-fungible token for a first retail price, as shown in connection with FIG. 52D. To purchase the first non-fungible token, the first user, via the first user device, may send a first order to the digital asset exchange system to purchase the first non-fungible token. The order, in embodiments, may include an identifier associated with the first non-fungible token, the amount of the first non-fungible token (in this example, one) and/or the retail price associated with the first non-fungible token. In embodiments, the retail price may be determined or calculated based on the amount of the non-fungible token that the user desires to purchase. For example, referring to FIG. 52D, the first order 5202, may include non-fungible token information 5204 (shown as a selected Forest Crate Non-Fungible Token), the amount of non-fungible token 5206 (shown as one), the retail price 5208 thereof (shown as $27.75), (optionally) destination information 5210, and/or (optionally) payment information 5212, to name a few. Once the first user device, in embodiments, inputs one or more of: the non-fungible token information 5204 (shown as a selected Non-Fungible Token), the amount of non-fungible token 5206 (shown as one), the retail price 5208 thereof (shown as $27.75), (optionally) destination information 5210, and/or (optionally) payment information 5212, the first user may select the submit order 5214 option, causing the first order 5202 to be sent from the first user device to the non-fungible token platform. The retail price 5208, as shown in FIG. 52D, may be a "per unit" price or a "total" price. In embodiments, as shown in FIG. 52D, the amount of non-fungible token 5206 may be 1 Forest Crate, 5 Forest Crates, 10 Forest Crates, 20 Forest Crates, and/or 100 Forest Crates, to name a few.

The first user, in embodiments, may also enter payment information, as shown in FIG. 52B. For example, the first user may enter and send, using the first user device, a credit card number and billing information associated with the first user. In embodiments, using the order and payment information, the digital asset exchange system may obtain the first non-fungible token and deliver the first non-fungible token to a public address generated by or otherwise provided by, the digital asset exchange system for the first user. A more detailed explanation of an exemplary version of this process is provided below in connection with the description of FIGS. 50A-50C, the description of which applying herein.

Figure 50A:
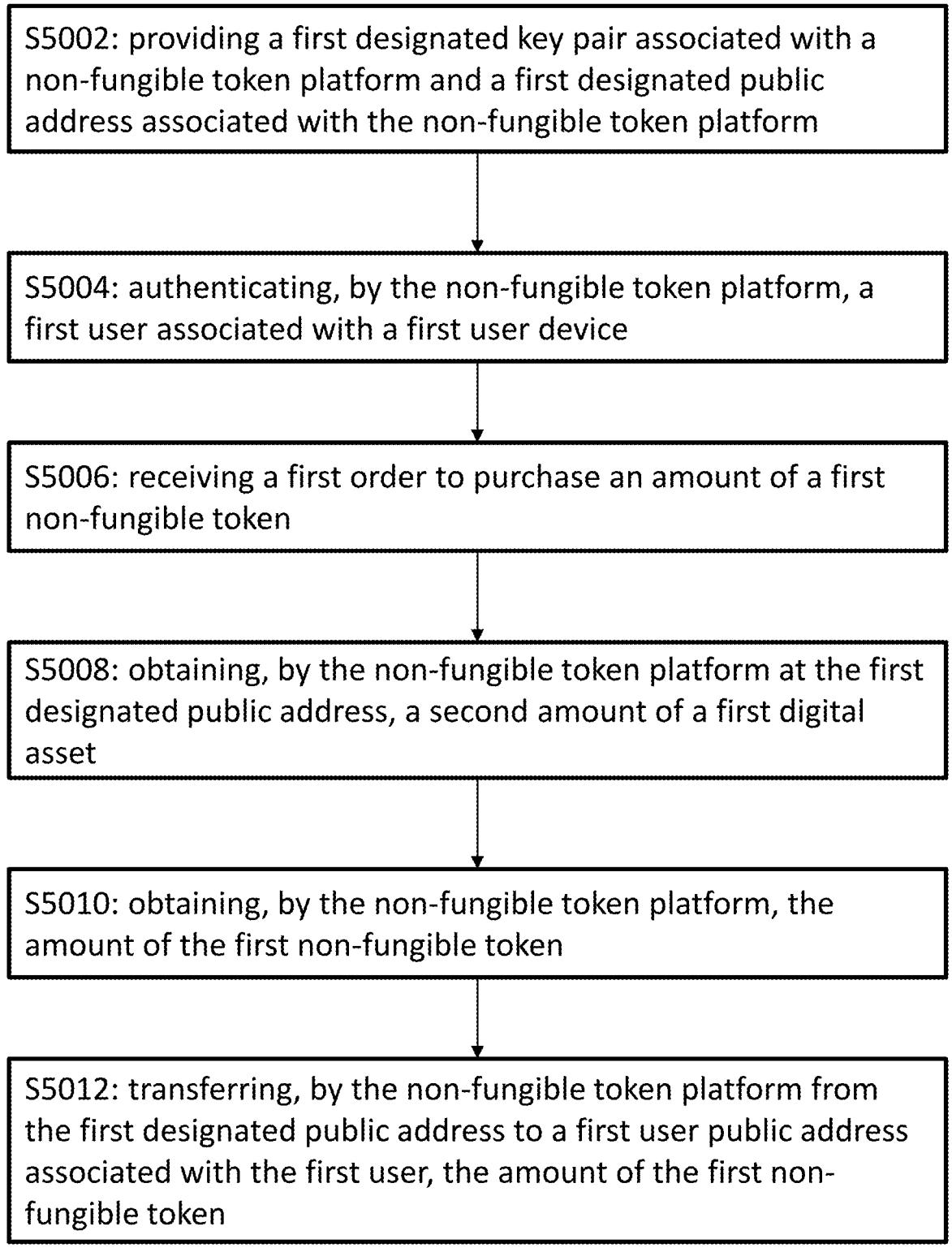
FIG. 50A is a flow chart of a process for purchasing a non-fungible token in accordance with exemplary embodiments of the present invention.

FIG. 50A is a flow chart of an exemplary process for purchasing a non-fungible token in accordance with exemplary embodiments of the present invention. Referring to FIG. 50A, in embodiments, the process for purchasing a non-fungible token may begin with step S5002. At step S5002, in embodiments, a first designated key pair associated with a non-fungible token platform and a first designated public address associated with the non-fungible token platform may be provided. In embodiments, the first designated key pair may include, a first designated public key and a corresponding first designated private key. The first designated public key may be mathematically related to the first designated private key. The first designated public key, in embodiments, may be associated with a first designated public address (e.g. the first designated public address 5102 shown in connection with FIG. 51), which, in embodiments, may be associated with an underlying digital asset. In embodiments, the underlying digital asset (e.g. Neo, ether, to name a few) may be maintained on a distributed public transaction ledger maintained in the form of a blockchain (e.g. the blockchain 6803). In embodiments, a first computer system associated with the non-fungible token platform may store the first designated private key, which may be similar to the on-line keyset 1 1362. In embodiments, the first computer system may have access to, or be connected with, the distributed public transaction ledger through a network, such as the internet (e.g. network 15). In embodiments, the first designated private key may be mathematically related to the first designated public key. In embodiments, the first designated public address may be the first designated public key. In embodiments, the first designated public address may be derived from the first designated public key.

In embodiments, the first designated key pair may include a plurality of key pairs (e.g. on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. Continuing the example, an additional key pair of the plurality of key pairs may correspond to an additional designated public address associated with the underlying digital asset. In embodiments, each key pair of the aforementioned plurality of key pairs may correspond to the same designated public address. For example, the first and additional key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g. a hash). In embodiments, the cryptographic hash function may be designed to be a one-way function (e.g. a function that is infeasible to invert). The cryptographic hash function, may include one or more of the following properties: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few. In embodiments, and as used herein, algorithm, hash algorithm, hash function, and/or cryptographic hash function may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few.

In embodiments, the non-fungible token platform may be associated with or included in a digital asset exchange computer system associated with a digital asset exchange. In embodiments, the non-fungible token platform may be licensed by a government regulatory authority. In embodiments, the non-fungible token platform may be similar to the administrator system 6801 described above in connection with FIG. 24, the description of which applying herein.

In embodiments, the process for purchasing a non-fungible token may continue with step S5004. At step S5004, in embodiments, the non-fungible token platform may authenticate a first user associated with a first user device. The non-fungible token platform, in embodiments, may authenticate an access request received from the first user device. For example, the non-fungible token platform may receive, from the first user device, a user login request. The user login request, in embodiments, may include user login credentials associated with the first user. User login credentials, in embodiments, may include one or more of the following: a username and password combination; biometric data associated with the first user (e.g., finger print, facial recognition identification, retinal scan, palm print, to name a few); personally identifiable information ("PII") associated with the first user; a phone number associated with the first user (e.g., a mobile phone associated with the user device); a social security number associated with the first user; an e-mail address associated with the first user; and/or a unique identifier associated with the first user, to name a few.

Continuing the example, in embodiments, the non-fungible token platform, may verify the user login credential by obtaining verified user login credentials associated with the first user and comparing said verified login credentials with the received login credentials.

In embodiments, the first user device may be similar to the first user device, described above with respect to FIGS. 48A-48D, the descriptions of which respectively applying herein. The process for authenticating an access request by the first user device may be similar to the process described above in connection with FIG. 48B, the description of which applying herein. In embodiments, the non-fungible token platform may determine whether the first user is a registered user of the digital asset exchange. In embodiments, the process for determining whether the first user is a registered user may be similar to the process for determining whether the first user is a registered user, discussed above with respect to FIGS. 48A-48D, the description of which applying herein.

In embodiments, the process for purchasing a non-fungible token may continue with step S5006. At step S5006, in embodiments, the non-fungible platform may receive a first order to purchase a first amount of a first non-fungible token. The order, in embodiments, may be received by the non-fungible platform from the first user device. A more detailed description of receiving the first order is described in connection with FIG. 50B which illustrates an exemplary flow chart of a process for receiving an order to purchase an amount of non-fungible token in accordance with exemplary embodiments of the present invention.

Referring to FIG. 50B, in embodiments, the process for receiving the first order may begin with step S5014. At step S5014, in embodiments, the non-fungible token platform may receive the first order to purchase the first amount of the first non-fungible token. The first order, in embodiments, may include one or more of the following: an identifier associated with the first non-fungible token; a type of non-fungible token associated with the first non-fungible token; an amount of non-fungible token; a first retail price associated with the first non-fungible token (e.g. a retail price associated with the total amount and/or a retail price associated with the unit price per non-fungible token); user destination information (e.g. a public address on the blockchain 6803 associated with or designated by the first user—illustrated in connection with FIG. 52C); and/or payment information, to name a few. The first order, and the contents thereof, may be stored by the non-fungible token platform in memory operatively connected to the non-fungible token platform. For example, the user payment information may be stored in a user payment database operatively connected to the non-fungible token platform.

In embodiments, the process for receiving the first order may continue with step S5016. At step S5016, in embodiments, the non-fungible token platform may obtain a first smart contract address associated with a first smart contract associated with the non-fungible token. In embodiments, non-fungible tokens are generated by smart contracts, each of which may generate one or more types of non-fungible tokens. The non-fungible token platform, in embodiments, may be operatively connected to a database that stores types of non-fungible tokens and their corresponding smart contract address. For example, the first non-fungible token may be generated by the first smart contract 5106. In embodiments, referring to FIG. 51, the first smart contract 5106 may include first smart contract instructions 5110 that are saved as part of the blockchain 6803.

Figure 51:
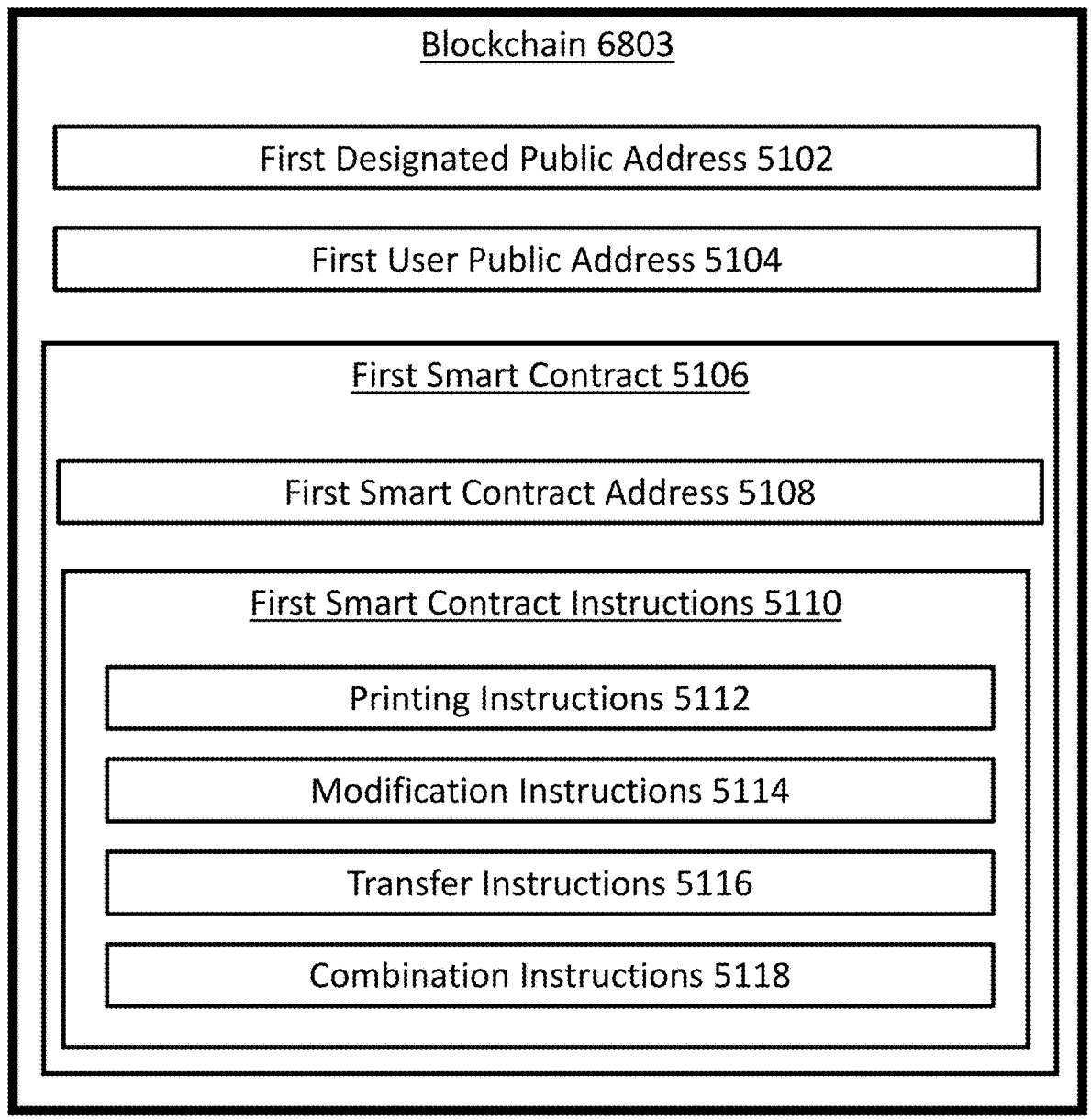
FIG. 51 is a schematic drawing of a blockchain including contract parameters of a smart contract in accordance with exemplary embodiments of the present invention.

In embodiments, as shown in connection with FIG. 51, the first smart contract 5106 may correspond to a first smart contract address 5108 associated with blockchain 6803 and include the first smart contract instructions 5110. The first smart contract instructions 5110, may include one or more modules of instructions, such as: (1) printing instructions 5112; (2) modification instructions 5114; (3) transfer instructions 5116; and/or combination instructions 5118.

In embodiments, printing instructions 5112 may include one or more instructions that indicate conditions under which non-fungible tokens associated with the first smart contract 5106 are created. For example, the printing instructions 5112 may authorize transaction requests to generate a non-fungible token if the transaction requests include one or more of the following: an identifier associated with the non-fungible token; a type associated with the non-fungible token; payment of an amount of digital asset (e.g. the manufacturer's price); the amount of the non-fungible token; and/or a destination address associated with the entity requesting the creation of a non-fungible token, to name a few. In embodiments, the printing instructions 5112 may only authorize requests to generate a non-fungible token if the transaction request comes from one or more verified digital asset exchanges (e.g. NIFTY GATEWAY and/or Gemini, to name a few). In embodiments, the printing instructions 5112 may require the transaction requests to be digitally signed by one or more digital signatures based on one or more private keys (e.g. private key associated with the first designated public address 5102 and/or private key associated with the first user public address 5104, to name a few).

In embodiments, the printing instructions 5112 may include instructions limiting the production of the non-fungible token associated with the first smart contract 5106. For example, the printing instructions 5112 may include instructions that limit the production of the non-fungible token to 1,000 tokens. In embodiments, the instructions may also include a temporal component. For example, the printing instructions 5112 may include instructions that only allow 50 non-fungible tokens to be created within a 24-hour period. Or, as another example, the printing instructions 5112 may include instructions that only allow non-fungible tokens to be created during business hours. In embodiments, the PRINT LIMITER may also include authorization instructions related to the first designated public address 5102.

The modification instructions 5114, in embodiments, may include one or more instructions that indicate conditions under which non-fungible tokens associated with the first smart contract 5106 are modified. Modification of a non-fungible digital asset, for example, may refer to adding a token (e.g. a hat) and/or subtracting a token from a non-fungible digital asset. For example, as mentioned above, a first token, e.g., a Cryptokitten Tiger, may purchase a second token, e.g., a digital "hat," that will then become associated with the first token to be a Tiger with a hat, and remain with the first token when transferred. As another example, the second token, e.g., the digital "hat", may also be subtracted from the Crytpokitten Tiger.

In embodiments, the modification instructions 5114 may authorize transaction requests to modify a non-fungible token if the transaction requests include one or more of the following: an identifier associated with the first non-fungible token; a type associated with the first non-fungible token; an identifier associated with a second non-fungible token; a type associated with a second non-fungible token; payment of an amount of digital asset (e.g. the manufacturer's price); and/or a destination address associated with the entity requesting the creation of a non-fungible token, to name a few. In embodiments, the modification instructions 5114 may only authorize requests to modify a non-fungible token if the transaction request comes from one or more verified digital asset exchanges (e.g. NIFTY GATEWAY and/or Gemini, to name a few). In embodiments, the modification instructions 5114 may require the transaction requests to be digitally signed by one or more digital signatures based on one or more private keys (e.g. private key associated with the first designated public address 5102 and/or private key associated with the first user public address 5104, to name a few).

The transfer instructions 5116, in embodiments, may include one or more instructions that indicate conditions under which non-fungible tokens associated with the first smart contract 5106 are transferred. In embodiments, the transfer instructions 5116, may include one or more instructions that indicate conditions under which digital assets are transferred from the first smart contract 5106 are transferred. In embodiments, the transfer instructions 5116 may authorize transaction requests to transfer a non-fungible token and/or a digital asset if the transaction requests include one or more of the following: an identifier associated with the first non-fungible token; a type associated with the first non-fungible token; an identifier associated with a second non-fungible token; a type associated with a second non-fungible token; payment of an amount of digital asset (e.g. the cost of the transfer); and/or a destination address associated with the entity party to the transfer, to name a few. In embodiments, the transfer instructions 5116 may only authorize requests to transfer a non-fungible token and/or digital asset if the transaction request comes from one or more verified digital asset exchanges (e.g. NIFTY GATEWAY and/or Gemini, to name a few). In embodiments, the transfer instructions 5116 may require the transaction requests to be digitally signed by one or more digital signatures based on one or more private keys (e.g. a private key associated with the first designated public address 5102 and/or private key associated with the first user public address 5104, to name a few).

The combination instructions 5118, in embodiments, may include one or more instructions that indicate conditions under which two or more non-fungible tokens associated with the first smart contract 5106 are combined to generate a new non-fungible token. Combination of two or more non-fungible digital assets, for example, may refer to "breeding" of non-fungible tokens. For example, a first Cyrptokitten (a Cryptokitten Tiger) and a second Cryptokitten (a Black Cryptokitten) may be combined (e.g. "bred") to generate a third Cryptokitten (a Black Cryptokitten Tiger). The third Cryptokitten may be based on one or more features of the first Cyrptokitten and the second Cryptokitten. In embodiments, the combination instructions 5118 may authorize transaction requests to combine two or more non-fungible tokens if the transaction requests include one or more of the following: an identifier associated with the first non-fungible token; a type associated with the first non-fungible token; an identifier associated with the second non-fungible token; a type associated with a second non-fungible token; payment of an amount of digital asset (e.g. the manufacturer's price to combine the first and second non-fungible token); and/or a destination address associated with the entity requesting the combination of the two or more non-fungible tokens, to name a few. In embodiments, the combination instructions 5118 may limit the amount of non-fungible tokens that can be combined. For example, the combination instructions 5118 may only combine up to six non-fungible tokens. In embodiments, the combination instructions 5118 may include instructions to create "twins", "triplets" . . . etc. In embodiments, the combination instructions 5118 may only authorize requests to modify a non-fungible token if the transaction request comes from one or more verified digital asset platforms1 or exchanges (e.g. NIFTY GATEWAY and/or Gemini, to name a few). In embodiments, the combination instructions 5118 may require the transaction requests to be digitally signed by one or more digital signatures based on one or more private keys (e.g. private key associated with the first designated public address 5102 and/or private key associated with the first user public address 5104, to name a few).

The process of receiving the first order, in embodiments, may continue with step S5018. At step S5018, in embodiments, the non-fungible token platform may receive a first payment for the first amount of the first non-fungible token. For example, the non-fungible token platform may run the credit card information included in the first order. However, in embodiments, the first order may not include payment information. To retrieve the payment information associated with the first user, in embodiments, the non-fungible token platform may generate and send, to the first user device, first machine-readable instructions that include a first graphical user interface. The first graphical user interface in embodiments, may include a first prompt that requests payment information from the user. Once received by the first user device, in embodiments, the first user device may execute the first machine-readable instructions, causing the first graphical user interface to be displayed by the first user device. An example of the first graphical user interface, in embodiments, is shown in connection with FIG. 52B. In response, the first user device may send payment information (e.g. bank account number, automated clearing house payment information, a credit card, and/or a public address associated with the first user and the blockchain 6803, to name a few) to the non-fungible token platform. The non-fungible token platform, in embodiments, may save the payment information in memory operatively connected to the non-fungible token platform.

Referring to FIG. 50B, the process of receiving the first order, in embodiments, may continue with step S5020. At step S5020, in embodiments, the non-fungible token platform may verify the first order. Verification of the first order may include verifying one or more of the following: the first user's payment method and whether there are sufficient funds to cover the retail price; whether the first amount of the first non-fungible token is available for purchase; whether the first non-fungible token is available for purchase; and whether the provided user destination information is associated with a public address that can receive the first amount of the first non-fungible token, to name a few.

In embodiments, the first order may not include user destination information and/or may include unverifiable user destination information. In embodiments, the non-fungible token platform may create a destination address (e.g. the first user public address 5104) for the first user, which may enable the user to receive the first amount of the first non-fungible token. For example, the non-fungible token platform may generate a transaction request including a request to generate a public address. The transaction request, in embodiments, may be digitally signed by the non-fungible token platform based on a private key associated with the non-fungible token platform (e.g. the first designated private key). The generated transaction request, in embodiments, may be published by the non-fungible token platform via the blockchain 6803 to the plurality of geographically distributed computer systems associated with the blockchain 6803. Once published, the transaction request, in embodiments, may be executed by the plurality of geographically distributed computer systems, resulting in the first user public address 5102 being returned to the first designated public address 5102. In embodiments, the execution of the transaction request may also result in a second key pair being returned to the first designated public address 5102. The second key pair, which may be associated with the first user public address 5104, in embodiments, may include a second public key and a corresponding and/or mathematically related second private key. The first public address 5102 and the second key pair may be saved on memory operatively connected to the non-fungible token platform. In embodiments, the non-fungible token platform may send a message including the first public address 5102 and the second key pair to the first user device.

Referring to FIG. 50A, in embodiments, the process for purchasing a non-fungible token may continue with step S5008. At step S5008, in embodiments, the non-fungible platform may obtain a second amount of a first digital asset at the first designated public address 5102. The second amount, in embodiments, may be the cost to generate the first amount of the first non-fungible token. The first digital asset, in embodiments, may be one or more of the following: Bitcoin, Ethereum, Ripple, Cardano, Litecoin, NEO, Stellar, IOTA, NEM, Dash, Monero, Lisk, Qtum, Zcash, Nano, Steem, EOS, TRON, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, *Nexus*, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, *Pura*, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether, Libra, Ether Classic and PhenixCoin, to name a few.

The non-fungible token platform, may, for example, obtain the second amount of the first digital asset by generating and publishing to the peer-to-peer network a transaction request to obtain the second amount of the first digital asset from a public address that is able to transfer the second amount of the first digital asset to the first designated public address. In embodiments, the transaction request may include a transfer of a third amount of a second digital asset in exchange for a transfer of the second amount of the first digital asset. The transaction request, in embodiments, may be digitally signed based on a private key associated with the non-fungible token platform. The generated transaction request, in embodiments, may be published by the non-fungible token platform via the blockchain 6803 to the plurality of geographically distributed computer systems associated with the blockchain 6803. Once published to the peer-to-peer network, the transaction request, in embodiments, may be executed by the plurality of geographically distributed computer systems in the peer-to-peer network, resulting in the third amount of the second digital asset being sent to the public address from the first designated public address 5102 and the second amount of the first digital asset being sent to the first designated public address 5102 from the public address.

Figure 50C:
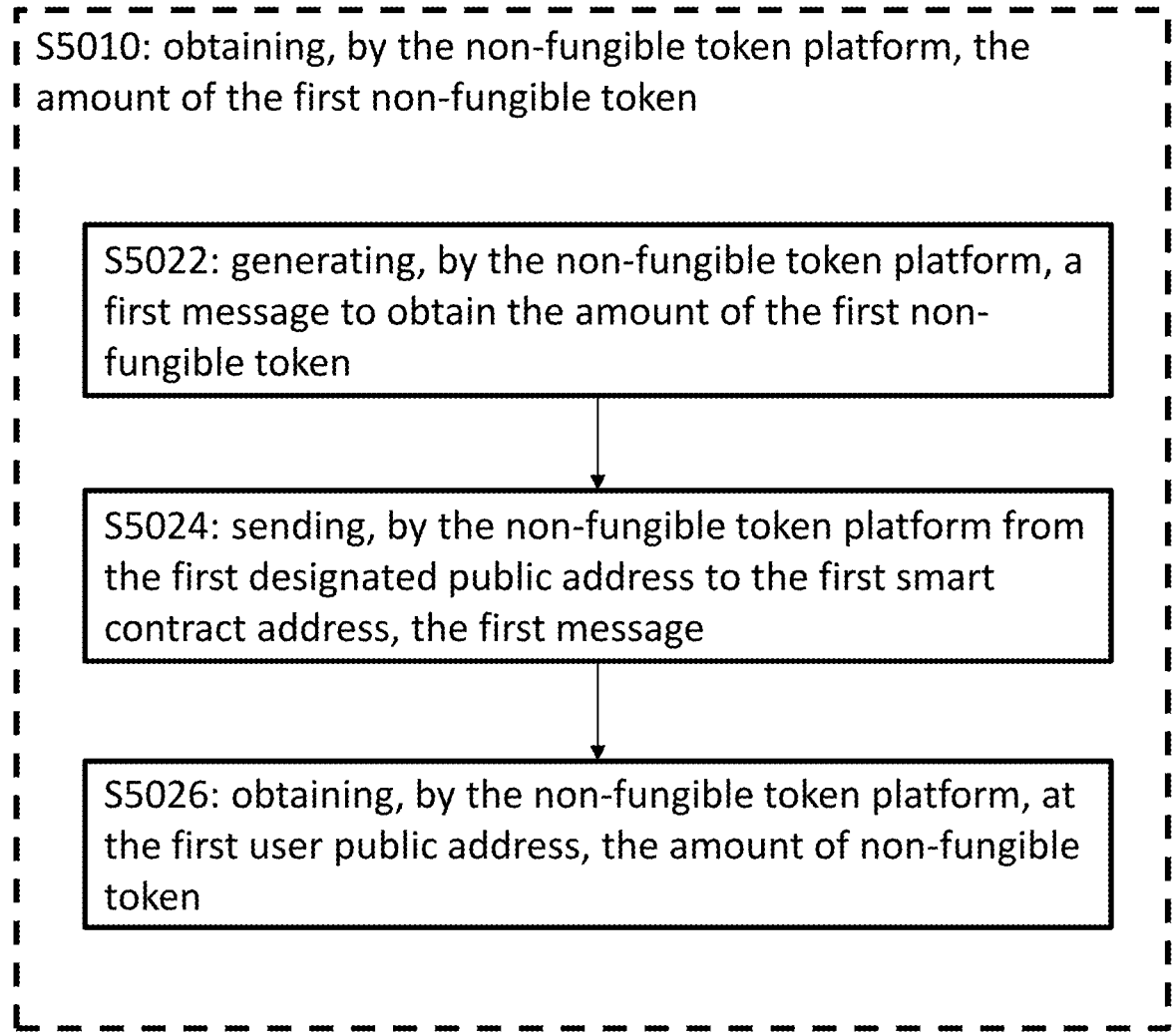
FIG. 50C is an exemplary flow chart of a process for receiving an amount of non-fungible token in accordance with exemplary embodiments of the present invention.

In embodiments, the process for purchasing a non-fungible token may continue with step S5010. At step S5010, in embodiments, the non-fungible platform may obtain the first amount of the first non-fungible token. A more detailed explanation of obtaining the first amount of the first non-fungible token is located in connection with the description of FIG. 50C. FIG. 50C is an exemplary flow chart of a process for obtaining the first amount of the first non-fungible token in accordance with exemplary embodiments of the present invention.

The process for receiving the first amount of the first non-fungible token, in embodiments, may begin with step S5022. At step S5022, in embodiments, the non-fungible token platform generates a first message to obtain the first amount of the first non-fungible token. In embodiments, the first message may include transfer instructions including a first transfer of the second amount of the first digital asset from the first designated public address 5102 to the first smart contract address 5108. In embodiments, the first message may include generation instructions to generate the first amount of the first non-fungible token. The generation instructions may include a destination address for the generated first amount of the first non-fungible token. For example, the destination address may be the first designated public address 5102. In embodiments, the destination address may be the first user public address 5104.

The process for receiving the first amount of the first non-fungible token, in embodiments, may continue with step S5024. At step S5024, in embodiments, the non-fungible token platform may send the first message from the first designated public address 5102 to the first smart contract address 5108 via the blockchain 6803. In embodiments, the non-fungible token platform may publish the first message to the blockchain 6803, resulting in the execution of the instructions within the first message. Once received, the first message may be executed by the first smart contract 5106 may execute the instructions within the first message in accordance with the first smart contract instructions 5110.

The process for receiving the first amount of the first non-fungible token, in embodiments, may continue with step S5026. At step S5026, in embodiments, the non-fungible token platform may receive the first amount of the first non-fungible token at the first designated public address 5102. Alternatively, in embodiments, the first user public address 5104 may receive the first amount of the first non-fungible token.

Referring to FIG. 50A, in embodiments, the process for purchasing a non-fungible token may continue with step S5012. At step S5012, in embodiments, the non-fungible platform may transfer, from the first designated public address 5102 to the first user public address 5104, the first amount of the first non-fungible token.

In embodiments, the steps of the process described in connection with FIGS. 50A-50C may be rearranged or omitted.

In embodiments, a method of increasing a total supply of digital asset tokens comprises the steps of: (a) providing a first designated key pair, comprising a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, comprising a second designated public key and a corresponding second designated private key, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; and (2) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (g)

providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data comprises for all issued tokens of the digital asset token: (A) respective public address information associated with the blockchain associated with the underlying digital asset; and (B) corresponding respective token balance information associated with said respective public address information; and (2) fifth authorization instructions to modify the transaction data in response to requests from the fourth contract address; (h) obtaining, by a digital asset exchange computer system associated with a digital asset exchange, a list of designated public addresses and for each designated public address, a respective amount of the digital asset token, wherein a sum of the respective amounts of the digital asset token is a first amount of the digital asset token; (i) increasing the total supply of the digital asset token, by the digital asset exchange computer system, from a second amount to a third amount, wherein the difference between the third amount and the second amount is a fourth amount of digital asset tokens, wherein the fourth amount is either greater than the first amount or equal to the first amount, wherein the digital asset exchange computer system increases the total supply of the digital asset token by performing the following steps: (1) determining, by the digital asset exchange computer system, the first designated private key does not have authority to execute the first request; and (2) increasing, by the digital asset exchange computer system, the total supply of the digital asset token by continuing to perform the following steps: (A) generating, by the digital asset exchange computer system, a first transaction request including a first message comprising a first request to increase the total supply of the digital asset token to the third amount of digital asset tokens; (B) sending, by the digital asset exchange computer system, the first transaction request from the first designated public address to the fifth contract address; (C) sending, by the digital asset exchange computer system, the first transaction request from the fifth contract address to the second contract address; (D) obtaining, by the digital asset exchange computer system, a first unique lock identifier, based on reference to the blockchain; (E) generating, by the digital asset exchange computer system, a second transaction request including a second message comprising a second request to unlock the total supply of the digital asset token in accordance with the first request, wherein the second transaction request further comprises the first unique lock identifier; (F) sending by the digital asset exchange computer system via the underlying blockchain, the second transaction request from the first designated public address to the third contract address associated; (G) obtaining, by the digital asset exchange computer system, a first unique request hash, based on reference to the blockchain; (H) generating, by the digital asset exchange computer system, a third transaction request comprising the first unique request hash, wherein the third transaction request is to be digitally signed by at least the second designated private key; (I) transferring, from the digital asset exchange computer system to a first portable memory device, the third transaction request, wherein the third transaction request is transferred from the first portable memory device to the second computer system, wherein the second computer system generates a third digitally signed transaction request by digitally signing the third transaction request using the second designated private key, and wherein the third digitally signed transaction request is transferred from the second computer system to a second portable memory device; and (J) sending, from the second portable memory device by the digital asset exchange computer system via the underlying blockchain, the third digitally signed transaction request to the third contract address; (j) assigning, by the digital asset exchange computer system in accordance with the list of designated public addresses and respective amount of digital asset token, each respective amount of digital asset token to each respective designated public address; and (k) confirming, by the digital asset exchange computer system, that each respective designated public address received the respective amount of digital asset token.

In embodiments, the list of designated public addresses further comprises: (1) receiving, by the digital asset exchange computer system, a plurality of requests, wherein each request of the plurality of requests comprises: (A) an amount of digital asset token; and (B) a designated public address to receive the amount of digital asset token, wherein the sum of each amount of digital asset token is the first amount of digital asset token; (2) generating, by the digital asset exchange computer system, the list of designated public addresses; and (3) storing, by the digital asset exchange computer system, the list of designated public addresses.

In embodiments, obtaining the list of designated public addresses further comprises: (1) receiving, by the digital asset exchange computer system from a digital asset issuer, a request to distribute a payment amount to a plurality of designated public addresses in exchange for an asset, wherein the request to distribute a payment amount comprises: (A) payment information; (B) a plurality of designated public addresses; (C) a respective amount of the asset associated with each designated public address of the plurality of designated public addresses, wherein the asset is not the digital asset token, wherein the asset has a corresponding first value, and wherein the digital asset token has a corresponding second value, wherein the payment information indicates that the payment amount is the first amount of digital asset; (2) accessing, by the digital asset exchange computer system, a digital asset security token database to determine: (A) each respective designated public address of the plurality of designated public addresses; and (B) a respective digital asset security token amount associated with each respective designated public address; (2) determining a respective payment amount in the digital asset token to be made to each respective designated public address based at least in part on: (A) the first value; and (B) the second value; (3) generating, by the digital asset exchange computer system, the list of designated public addresses based at least on: (A) each respective payment amount; and (B) each respective designated public address; and (3) storing, by the digital asset exchange computer system, the list of designated public addresses, wherein confirming that each designated public address received the respective amount of digital asset tokens is determined based at least in part on: (1) each respective digital asset security token amount; (2) each respective payment amount; and (3) each respective designated public address. In embodiments, the payment information comprises: (1) a respective amount of digital asset token for each designated public address of the plurality of designated public addresses, wherein a first sum of each respective amount of digital asset token is the first amount of digital asset token. In embodiments, determining a respective payment amount in the digital asset token further comprises: (A) determining, by the digital asset exchange computer system, the first value; (B) determining, by the digital asset exchange computer system, a difference between the first value and the second value; (C) determining, by the digital asset exchange computer system, a second respective amount of the digital asset token for each designated public address of the plurality of designated public addresses based on at least: (i) the first value; (ii) the second value; and (iii) the difference between the first value and the second value; and (D) associating, by the digital asset exchange computer system for each designated public address, the second respective amount.

In embodiments, the method further comprises the steps of: (1) providing user identification data corresponding to a plurality of customers of the digital asset exchange, wherein the user identification data comprises whitelist data comprising a pre-approved designated address list associated with a first customer of the plurality of customers of the digital asset exchange, wherein the pre-approved designated address list comprises one or more pre-approved public address, and wherein the first customer is associated with a first customer public address of the plurality of customer public addresses; (k) determining, prior to increasing the total supply of the digital asset token, by the digital asset exchange computer system, whether the respective designated public address associated with the respective request received from the first customer public address is included on the pre-approved designated address list; (m) in the case where the respective designated public address is not included on the pre-approved designated address list, generating, by the digital asset exchange computer system, a notification indicating that the respective designated public address associated with the respective request received from the first customer public address is not approved for receiving digital assets associated with the first customer; (n) sending, by the digital asset exchange computer system to a customer device associated with the first customer, the notification; and (o) cancelling, by the digital asset exchange computer system, the respective request received from the first customer public address.

In embodiments, the second computer system is a hardware security module.

In embodiments, the second smart contract instructions include sixth authorization instructions related to modifying a token supply of the digital asset token.

In embodiments, the second authorization instructions for the first designated key pair with respect to token creation of the digital asset token include instructions limiting token creation above a first threshold over a first period of time. In embodiments, the fourth authorization instructions for the second designated key set to authorize the issuance of instructions to the second smart contract with respect to token creation include instructions to allow for creation of digital asset tokens above the first threshold during the first period of time.

In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring tokens of the digital asset token from a first designated contract address to a second designated contract address associated with the underlying digital asset.

In embodiments, the fourth smart contract instructions further include: (3) token destruction instructions related to destroying a fifth amount of digital asset tokens.

In embodiments, the fourth smart contract instructions further include: (3) token balance modification instructions related to modifying a total number of tokens of the digital asset token assigned to a third designated public address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the fourth amount of digital asset tokens, a validating request.

In embodiments, the first transaction request includes first transaction fee information for miners in the blockchain network to process the first transaction request.

In embodiments, fifth contract returns the balance of digital asset tokens to the fourth smart contract address.

In embodiments, the fifth contract returns the balance of digital asset tokens to the second smart contract address.

In embodiments, the underlying digital asset is Neo.

In embodiments, the underlying digital asset is Ether.

In embodiments, the first designated private key is mathematically related to a first designated public key, In embodiments, the first designated public address is the first designated public key.

In embodiments, the first designated public address is derived using a cryptographic hash function of the first designated public key. In embodiments, the first designated public address is a result of the cryptographic hash function. In embodiments, the first designated public address is at least part of a result of the cryptographic hash function.

In embodiments, the second designated private key is mathematically related to a second designated public key.

In embodiments, a method of increasing a total supply of digital asset tokens comprising the steps of: (a) providing a first designated key pair, comprising a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, comprising a second designated public key and a corresponding second designated private key, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; and (2) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (g) providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data comprises for all issued tokens of the digital asset token: (A) respective public address information associated with the blockchain associated with the underlying digital asset; and (B) corresponding respective token balance information associated with said respective public address information; and (1) fifth authorization instructions to modify the transaction data in response to requests from the fourth contract address; (h) obtaining, by a digital asset exchange computer system associated with a digital asset exchange, a list of designated public addresses and for each designated public address, a respective amount of the digital asset token, wherein a sum of each respective amount of the digital asset token is a first amount of the digital asset token; (i) increasing the total supply of the digital asset token, by the digital asset exchange computer system, from a second amount to a third amount, wherein the difference between the third amount and the second amount is a fourth amount of digital asset tokens, wherein the fourth amount is either greater than the first amount or equal to the first amount, wherein the digital asset exchange computer system increases the total supply of the digital asset token by performing the following steps: (1) determining, by the digital asset exchange computer system, the first designated private key has the authority to execute the first request; and (2) increasing, by the digital asset exchange computer system, the total supply of the digital asset token by continuing to perform the following steps: (A) generating and sending, by the digital asset exchange computer system via the blockchain, a first transaction request: (i) to the fifth contract address; and (ii) including a first message comprising a first request to generate the fourth amount of digital asset tokens; wherein the first transaction request is digitally signed by the first designated private key, wherein the fifth smart contract executes, via the plurality of geographically distributed computer systems in the peer-to-peer network with reference to the blockchain, the first transaction request to: validate the authority of the first designated private key to call the second smart contract to execute the plurality of requests; and (iii) send a first call to the fourth contract address to generate the fourth amount of digital asset tokens, wherein the fourth smart contract executes, via the plurality of geographically distributed computer systems in the peer-to-peer network with reference to the blockchain, the first call to generate the first unique lock identifier, and return to the second smart contract address, the first unique lock identifier, wherein, in response to the return of the first unique lock identifier, the second smart contract executes, via the plurality of geographically distributed computer systems in the peer-to-peer network with reference to the blockchain, a second call to the fourth smart contract address to confirm the first call with the first lock identifier, wherein, in response, the fourth smart contract executes, via the plurality of geographically distributed computer systems in the peer-to-peer network with reference to the blockchain, the first call to execute a third call to the fifth contract address to obtain the total supply of digital asset tokens in circulation, wherein, in response, the fifth smart contract executes, via the plurality of geographically distributed computer systems in the peer-to-peer network with reference to the blockchain, the third call and returns, to the fourth contract address, the second amount of digital asset tokens corresponding to the total supply of digital asset tokens in circulation, wherein, in response to the return of the second amount, the fourth smart contract, executes via the plurality of geographically distributed computer systems in the peer-to-peer network with reference to the blockchain, a fourth call request to the fifth contract address to set a new total supply of digital asset tokens in circulation to the third amount, wherein, in response to the fourth call, the fifth smart contract, executes via the plurality of geographically distributed computer systems in the peer-to-peer network with reference to the blockchain, the fourth call and sets the new total supply of digital asset tokens in circulation to the third amount; (j) assigning, by the digital asset exchange computer system in accordance with the list of designated public addresses and respective amount of digital asset token, each respective amount of digital asset token to each respective designated public address; and (k) confirming, by the digital asset exchange computer system, that each designated public address received the respective amount of digital asset token.

In embodiments, obtaining the list of designated public addresses further comprises: (I) receiving, by the digital asset exchange computer system, a plurality of requests, wherein each request of the plurality of requests comprises: (A) an amount of digital asset token; and (B) a designated public address to receive the amount of digital asset token, wherein the sum of each amount of digital asset token is the first amount of digital asset token; (1) generating, by the digital asset exchange computer system, the list of designated public addresses; and (2) storing, by the digital asset exchange computer system, the list of designated public addresses.

In embodiments, obtaining the list of designated public addresses further comprises: (I) receiving, by the digital asset exchange computer system from a digital asset issuer, a request to distribute a payment amount to a plurality of designated public addresses in exchange for an asset, wherein the request to distribute a payment amount comprises: (A) payment information; (B) a plurality of designated public addresses; (C) a respective amount of the asset associated with each designated public address of the plurality of designated public addresses, wherein the asset is not the digital asset token, wherein the asset has a corresponding first value, and wherein the digital asset token has a corresponding second value, wherein the payment information indicates that the payment amount is the first amount of digital asset; (m) accessing, by the digital asset exchange computer system, a digital asset security token database to determine: (A) each respective designated public address of the plurality of designated public addresses; and (B) a respective digital asset security token amount associated with each respective designated public address; (n) determining a respective payment amount in the digital asset token to be made to each respective designated public address based at least in part on: (A) the first value; and (B) the second value; (o) generating, by the digital asset exchange computer system, the list of designated public addresses based at least on: (A) each respective payment amount; and (1) each respective designated public address; and (2) storing, by the digital asset exchange computer system, the list of designated public addresses, wherein confirming that each designated public address received the respective amount of digital asset tokens is determined based at least in part on: (1) each respective digital asset security token amount; (2) each respective payment amount; and (3) each respective designated public address. In embodiments, the payment information comprises: (i) a respective amount of digital asset token for each designated public address of the plurality of designated public addresses, wherein a first sum of each respective amount of digital asset token is the first amount of digital asset token. In embodiments, determining a respective payment amount in the digital asset token further comprises: (A) determining, by the digital asset exchange computer system, the first value; (B) determining, by the digital asset exchange computer system, a difference between the first value and the second value; (C) determining, by the digital asset exchange computer system, a second respective amount of the digital asset token for each designated public address of the plurality of designated public addresses based on at least: (i) the first value; (ii) the second value; and (iii) the difference between the first value and the second value; and (D) associating, by the digital asset exchange computer system for each designated public address, the second respective amount.

In embodiments, the method further comprises the steps of: (1) providing user identification data corresponding to a plurality of customers of the digital asset exchange, wherein the user identification data comprises a pre-approved designated address list associated with a first customer of the plurality of customers of the digital asset exchange, wherein the pre-approved designated address list comprises a pre-approved public address, and wherein the first customer is associated with a first customer public address of the plurality of customer public addresses; (m) determining, prior to increasing the total supply of the digital asset token, by the digital asset exchange computer system, whether the respective designated public address associated with the respective request received from the first customer public address in included in the pre-approved designated address list; (n) in the case where the first designated address is included in the pre-approved designated address list, generating, by the digital asset exchange computer system, a notification indicating that the respective designated public address associated with the respective request received from the first customer public address is not approved for receiving digital assets associated with the first customer; (o) sending, by the digital asset exchange computer system to a customer device associated with the first customer, the notification; and (p) cancelling, by the digital asset exchange computer system, the respective request received from the first customer public address.

In embodiments, the second computer system is a hardware security module.

In embodiments, the second smart contract instructions include sixth authorization instructions related to modifying a token supply of the digital asset token.

In embodiments, the second authorization instructions for the first designated key pair with respect to token creation of the digital asset token include instructions limiting token creation above a first threshold over a first period of time. In embodiments, the fourth authorization instructions for the second designated key set to authorize the issuance of instructions to the second smart contract with respect to token creation include instructions to allow for creation of digital asset tokens above the first threshold during the first period of time. In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring tokens of the digital asset token from a first designated contract address to a second designated contract address associated with the underlying digital asset.

In embodiments, the fourth smart contract instructions further include: (3) token destruction instructions related to destroying a fifth amount of digital asset tokens.

In embodiments, the fourth smart contract instructions further include: (3) token balance modification instructions related to modifying a total number of tokens of the digital asset token assigned to a third designated public address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the fourth amount of digital asset tokens, a validating request.

In embodiments, the first transaction request includes first transaction fee information for miners in the blockchain network to process the first transaction request.

In embodiments, the fifth contract returns the balance of digital asset tokens to the fourth smart contract address.

In embodiments, the fifth contract returns the balance of digital asset tokens to the second smart contract address.

In embodiments, the underlying digital asset is Neo. In embodiments, the underlying digital asset is Ether.

In embodiments, the first designated private key is mathematically related to a first designated public key, In embodiments, the first designated public address is the first designated public key.

In embodiments, the first designated public address is derived using a cryptographic hash function of the first designated public key.

In embodiments, the first designated public address is a result of the cryptographic hash function. In embodiments, the first designated public address is at least part of a result of the cryptographic hash function.

In embodiments, the second designated private key is mathematically related to a second designated public key.

In embodiments, a method for increasing the total supply of a digital asset token comprises: (a) providing a first designated key pair, including a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, including a second designated public key and a corresponding second designated private key, wherein the second designated public key also corresponds to a first designated public address associated with the underlying digital asset; wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital asset and include: (1) first delegation instructions to delegate one or more first functions associated with the digital asset token to one or more delegated contract addresses associated with the blockchain associated with the underlying digital asset, wherein the one or more delegated contract addresses are different from the first contract address, and wherein a second contract address is designated as one of the one or more delegated contract addresses; (2) first authorization instructions associated with the second designated key pair; (d) providing second smart contract instructions associated with a second smart contract associated with the digital asset token associated with the second contract address associated with the blockchain associated with the underlying digital asset, wherein the second smart contract instructions are saved as part of the blockchain for the underlying digital assets and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; (3) third authorization instructions with respect to token creation of the digital asset token; wherein the third authorization instructions designate a first designated custodian address with respect to token creation of the digital asset token; (e) providing third smart contract instructions associated with a first designated custodian contract associated with the digital asset token associated with a third contract address associated with the blockchain associated with the underlying digital asset, wherein the third contract address is the first designated custodian contract address, and wherein the third smart contract instructions are saved as part of the blockchain for the underlying digital assets and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset tokens in accordance with conditions set forth by the print limiter token creation instructions; (2) second delegation instructions delegating data storage operations to at least a fifth contract address; (g) providing fifth smart contract instructions associated with a fifth smart contract associated with the digital asset token associated with the fifth contract address associated with the blockchain associated with the underlying digital asset, wherein the fifth contract address is one of one or more designated store contract addresses, and wherein the fifth smart contract instructions are saved as part of the blockchain for the underlying digital assets and include: (1) data storage instructions for transaction data related to the digital asset token, wherein the transaction data includes for all issued tokens of the digital asset token: (A) respective public address information associated with the blockchain associated with the underlying digital asset; and (B) corresponding respective token balance information associated with said respective public address information; (2) fifth authorization instructions to modify the transaction data in response to a request from the fourth contract address; (h) increasing the total supply of the digital asset tokens, by a digital asset token issuer system, from a first amount of the digital asset tokens to a second amount of the digital asset tokens, including the steps of: (1) generating, by the digital asset token issuer system, a first transaction request including a first message including a first request to increase the total supply of the digital asset tokens to the second amount of digital asset tokens, to the fourth contract address, wherein the first transaction request is digitally signed by the first designated private key; (2) sending, by the digital asset token issuer system via the blockchain network, the first transaction request from the first designated public address to the fourth contract address; (3) sending, by the digital asset token issuer system via the blockchain network, the first transaction request from the fourth contract address to the second contract address; wherein the second smart contract executes, via the plurality of geographically distributed computer systems in the peer-to-peer network with reference to the blockchain, the first transaction request to return a first unique lock identifier associated with the first transaction request; (4) obtaining, by the digital asset token issuer system, the first unique lock identifier, based on reference to the blockchain; (5) generating, by the digital asset token issuer system, a second transaction request including a second message including a second request to unlock the total supply of the digital asset tokens in accordance with the first request and including the first unique lock identifier, wherein the second transaction request being to the third contract address, and digitally signed by the first designated private key; (6) sending, by the digital asset token issuer system via the blockchain network, the second transaction request from the first designated public address to the third contract address, wherein the third smart contract executes, via the plurality of geographically distributed computer systems in the peer-to-peer network with reference to the blockchain, the second transaction request to return a first unique request hash associated with the second transaction request; (7) obtaining, by the digital asset token issuer system, the first unique request hash, based on reference to the blockchain; (8) generating, by the digital asset token issuer system, a third transaction request to be digitally signed by at least the second designated private key including the first unique request hash; (9) transferring, from the digital asset token issuer system to a first portable memory device, the third transaction request; (10) transferring, from the first portable memory device to the second computer system, the third transaction request; (11) digitally signing, by the second computer system, the third transaction request using the second designated private key to generate a third digitally signed transaction request; (12) sending, from the second portable memory device using the digital asset token issuer system, via the blockchain network, the third digitally signed transaction request to the third contract address; wherein the third smart contract, executes, via the plurality of geographically distributed computer systems in the peer-to-peer network with reference to the blockchain, the third digitally signed transaction request to validate the second request to unlock based on the third digitally signed transaction request and the first unique request hash and executes a first call to the second contract address, to increase the total supply of the digital asset tokens to the second amount of digital asset tokens, wherein the second contract address returns the first call to the fourth contract address and the fourth smart contract executes, via the plurality of geographically distributed computer systems in the peer-to-peer network with reference to the blockchain, a second call to the fifth contract address to set the total supply of the digital asset tokens to the second amount of digital asset tokens, wherein the fifth smart contract executes, via the plurality of geographically distributed computer systems in the peer-to-peer network with reference to the blockchain, the second call to set the total supply of the digital asset tokens to the second amount of digital asset tokens; and (i) confirming, by the digital asset token issuer system, the total supply of digital asset tokens is set to the second amount of digital asset tokens based on reference to the blockchain.

In embodiments, the first designated key pair includes an additional designated key pair including a first additional designated public key and a corresponding first additional designated private key, wherein the first additional designated public key also corresponds to a first additional designated public address associated with the underlying digital asset.

In embodiments, the second computer system is a hardware storage module.

In embodiments, the second designated key set includes an additional designated key set including a second additional designated public address and a second additional designated private key.

In embodiments, the second authorization instructions for the first designated key set with respect to token creation of the digital asset token includes instructions limiting creation of digital asset tokens above a first threshold amount over a first period of time.

In embodiments, the fourth authorization instructions include instructions to permit creation of digital asset tokens above the first threshold during the first period of time, wherein the fourth authorization instructions designate the second designated key pair to authorize the instructions to permit creation of digital asset tokens above the first threshold.

In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring issued tokens of the digital asset token from a first designated contract address to a second designated contract address. In embodiments, the fourth smart contract instructions further include: (3) token destruction instructions related to destroying one or more issued token of the digital asset token. In embodiments, the fourth smart contract instructions further include: (3) token transfer instructions related to transferring issued tokens of the digital asset token from a first designated contract address to a second designated contract address; and (4) token destruction instructions related to destroying one or more issued tokens of the digital asset token.

In embodiments, the second smart contract instructions further include: (4) token balance modification instructions related to modifying the total balance of tokens of the digital asset token assigned to a third designated address.

In embodiments, the first transaction request includes first transaction fee information for miners associated with the plurality of geographically distributed computer systems in the peer-to-peer network to process the first transaction request. In embodiments, the second transaction request includes second transaction fee information for miners associated with the plurality of geographically distributed computer systems in the peer-to-peer network to process the second transaction request.

In embodiments, the first portable memory device includes the second portable memory device.

In embodiments, the second smart contract instructions include sixth authorization instructions to modify the total token supply amount of the digital asset tokens.

In embodiments, the underlying digital asset is a stable value token. In embodiments, the underlying digital asset is Neo. In embodiments, the underlying digital asset is Ether. In embodiments, the underlying digital asset is Bitcoin.

In embodiments, the first designated private key is mathematically related to a first designated public key.

In embodiments, the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, a method of increasing a total supply of digital asset tokens including the steps of: (a) providing a first designated key pair, including a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, including a second designated public key and a corresponding second designated private key wherein the second designated public key also corresponds to a second designated public address associated with the underlying digital asset, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; (1) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: fourth authorization instructions to authorize issuance of instructions to the second smart contract regarding token creation; wherein the fourth authorization instructions designate the second designated key pair to authorize the fourth authorization instructions; providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (f) providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data includes for all issued tokens of the digital asset token: (A) respective public address information associated with the blockchain associated with the underlying digital asset; and (B) corresponding respective token balance information associated with said respective public address information; (1) fifth authorization instructions to modify the transaction data in response to requests from the fourth contract address; (g) receiving, by a digital asset token issuer system, a request to generate and assign to the first designated public address a first amount of digital asset tokens; (h) generating, by the digital asset token issuer system, the first amount of digital asset tokens and assigning said first amount of digital asset tokens to the first designated public address increasing the total supply of the digital asset tokens, including the steps of: (1) generating, by the digital asset token issuer system, and sending, using the digital asset token issuer system via the blockchain network, a first transaction request: (A) to the fourth contract address; and (B) including a first message including a first request to generate the first amount of digital asset tokens and assign said first amount of digital asset tokens to the first designated public address; wherein the first transaction request is digitally signed by the first designated private key; wherein the fourth smart contract executes, via the plurality of geographically distributed computer systems in the peer-to-peer network with reference to the blockchain, the first transaction request to: (i) validate the first request and the authority of the first designated private key to call the second smart contract to execute the first request; and (ii) send a first call to the fourth contract address to generate and assign to the first designated public address the first amount of digital asset tokens; wherein the fourth smart contract executes, via the plurality of geographically distributed computer systems in the peer-to-peer network with reference to the blockchain, the first call to generate a first unique lock identifier, and return to the second smart contract address, the first unique lock identifier; wherein, in response to the return of the first unique lock identifier, the second smart contract executes, via the plurality of geographically distributed computer systems in the peer-to-peer network with reference to the blockchain, a call to the fourth smart contract address to confirm the first call with the first lock identifier; wherein, in response, the fourth smart contract executes, via the plurality of geographically distributed computer systems in the peer-to-peer network with reference to the blockchain, the first call to execute a second call to the fifth contract address to obtain the total supply of digital asset tokens in circulation; wherein, in response, the fifth smart contract executes, via the plurality of geographically distributed computer systems in the peer-to-peer network with reference to the blockchain, the second call and returns, to the fourth contract address, a second amount of digital asset tokens corresponding to the total supply of digital asset tokens in circulation; wherein, in response to the return of the second amount, the fourth smart contract, executes via the plurality of geographically distributed computer systems in the peer-to-peer network with reference to the blockchain, a third call request to the fifth contract address to set a new total supply of digital asset tokens in circulation to a third amount, which is the total of the first amount and the second amount; wherein, in response to the third call, the fifth smart contract, executes via the plurality of geographically distributed computer systems in the peer-to-peer network with reference to the blockchain, the third call and sets a new total supply of digital asset tokens in circulation at the third amount; wherein, the fourth smart contract executes, via the plurality of geographically distributed computer systems in the peer-to-peer network with reference to the blockchain, a fourth call to the fifth contract address to add the first amount of digital asset tokens to a respective balance associated with the first designated public address; wherein, in response, the fifth smart contract executes, via the plurality of geographically distributed computer systems in the peer-to-peer network with reference to the blockchain, the fourth call to set the balance of digital asset tokens in the first designated public address at a fourth amount which includes the addition of the first amount to the previous balance; and (i) confirming, by the digital asset token issuer system, that the balance of digital asset tokens associated with the first designated public address is set to include the first amount of digital asset tokens based on reference to the blockchain.

In embodiments, the second computer system is a hardware storage module.

In embodiments, the second designated key set includes an additional designated key set including an additional designated public address and an additional designated private key.

In embodiments, the second authorization instructions for the first designated key set with respect to token creation of the digital asset token include instruction limiting token creation above a first threshold over a first period of time. In embodiments, the fourth authorization instructions for the second designated key set to authorize the issuance of instructions to the second smart contract instructions with respect to token creation include instructions to allow for creation of digital asset tokens above the first threshold during the first period of time. In embodiments, the third smart contract instructions further include: (2) sixth authorization instructions to designate a seventh contract address as one of the one or more delegated contract addresses, wherein the seventh contract address is not the second contract address, and wherein the second designated key set is designated to authorize the sixth authorization instructions.

In embodiments, the fourth smart contract instructions further include: (3) token transfer instructions related to transferring tokens of the digital asset token from a first designated contract address to a second designated contract address. In embodiments, the fourth smart contract instructions further include: (3) token destruction instructions related to destroying one or more digital asset token. In embodiments, the fourth smart contract instructions further include: (3) token balance modification instructions related to modifying a total number of tokens of the digital asset token assigned to a third designated public address. In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further includes receiving, prior to generating the first amount of digital asset tokens, a validating request. In embodiments, the method further includes determining the first designated key set has authority to process the request to generate the first amount of digital tokens.

In embodiments, the first transaction request includes first transaction fee information for miners in the plurality of geographically distributed computer systems in the peer-to-peer network to process the first transaction request.

In embodiments, the fifth contract returns the balance of digital asset tokens to the fourth smart contract address. In embodiments, the fifth contract returns the balance of digital asset tokens to the second smart contract address.

In embodiments, the method further includes the steps of: (k) receiving, by the plurality of geographically distributed computer systems in the peer-to-peer network, from a first user device associated with the first designated public address, via the underlying blockchain, a second transaction request: (A) from the first designated public address; (B) to the first contract address; and (C) including a second message including a second request to transfer a fifth amount of digital assets from the first designated public address to a third designated public address; wherein the first transaction request is digitally signed by the first designated private key, which is mathematically related to the first designated public address; wherein the first user device had access to the first designated private key prior to sending the second transaction request; wherein the first smart contract executes, via the plurality of geographically distributed computer systems in the peer-to-peer network, the second transaction request to execute, via the plurality of geographically distributed computer systems in the peer-to-peer network, a sixth call request to the fourth contract address to transfer a fifth amount of digital assets from the first designated public address to the third designated public address; wherein, in response to the sixth call request, the fourth smart contract, executes via the plurality of geographically distributed computer systems in the peer-to-peer network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address; wherein, in response to the seventh call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens in the first designated public address to a seventh amount which equals the sixth amount less the fifth amount; wherein, in response to the seventh call, the fifth smart contract executes, via the plurality of geographically distributed computer systems in the peer-to-peer network, the seventh call to set and store the new balance for the first designated public address as the seventh amount and returns a new balance for the first designated public address as the seventh amount; wherein, in response to the return of the new balance, the fourth smart contract executes, via the plurality of geographically distributed computer systems in the peer-to-peer network, an eighth call to add the second amount of digital asset tokens to the balance associated with the third designated public address; wherein, in response to the eighth call request, the fifth smart contract executes, via the blockchain network, the eighth call request to set the balance of digital asset tokens associated with the third designated public address at a seventh amount which includes the addition of the second amount to a previous balance associated with the third designated public address; and wherein the first user device confirms that the balance of digital asset tokens associated with the first designated public address is the sixth amount of digital asset tokens based on reference to the blockchain.

In embodiments, the second transaction request includes second transaction fee information for miners in the plurality of geographically distributed computer systems in the peer-to-peer network to process the second transaction request. In embodiments, the balance of digital asset tokens associated with the third designated public address is returned to the fourth contract address. In embodiments, the balance of digital asset tokens associated with the third public address is returned to the first smart contract address. In embodiments, a second user device confirms that the balance of the digital asset tokens associated with the third designated public address is the seventh amount of digital asset tokens based on reference to the blockchain.

In embodiments, the method further includes the steps of: (k) providing a third designated key set, including a third designated public address associated with the underlying digital asset and a corresponding third designated private key, and wherein the third designated private key is stored on a third computer system which is connected to the distributed public transaction ledger through the Internet; and (1) receiving, by the plurality of geographically distributed computer systems in the peer-to-peer network, from the third computer system, via the blockchain, a second transaction request: (A) from the third designated public key address; (B) to the fifth contract address; and (C) including a second message including a request to burn a fifth amount of digital asset tokens from a balance associated with the third designated public address; wherein the second transaction request is digitally signed by the third designated private key; wherein the fourth smart contract executes, via the plurality of geographically distributed computer systems in the peer-to-peer network, the second transaction request to execute, via the plurality of geographically distributed computer systems in the peer-to-peer network, a sixth call request to the fifth contract address to obtain a sixth amount of digital asset tokens which reflect a current balance of digital asset tokens associated with the third designated public address; wherein, in response to the sixth call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens associated with the third designated public key address to a seventh amount which equals the sixth amount less the fifth amount; wherein, in response to the seventh call, the fifth smart contract executes, via the plurality of geographically distributed computer systems in the peer-to-peer network, the seventh call to set and store the new balance for the third designated public key address as the seventh amount and returns the new balance for the third designated public key address as the seventh amount; wherein, in response to the return of the new balance, the fourth smart contract executes, via the blockchain network, an eighth call request to the fifth contract address to obtain a total supply of digital asset tokens in circulation; wherein, in response to the eighth call request, the fifth smart contract executes, via the plurality of geographically distributed computer systems in the peer-to-peer network, the eighth call request and returns, to the fourth contract address, an eighth amount of digital asset tokens corresponding to the total supply of digital asset tokens in circulation; wherein, in response to the return of the eighth amount, the fourth smart contract, executes via the plurality of geographically distributed computer systems in the peer-to-peer network, a ninth call request to the fifth contract address to set a new total supply of digital asset tokens in circulation to a ninth amount, which is the eighth amount less the fifth amount; and wherein, in response to the ninth call request, the fifth smart contract, executes via the blockchain network, the ninth call request and sets a new total supply of digital asset tokens in circulation at the ninth amount, and returns to the fourth contract address.

In embodiments, the third designated key set is the first designated key set. In embodiments, the third designated key set is not the second designated key set. In embodiments, the third designated key set is the second designated key set. In embodiments, the third designated key set is not the first designated key set. In embodiments, the third computer system is the first computer system. In embodiments, the third computer system is not the first computer system. In embodiments, the administrator computer system includes the first computer system and the third computer system. In embodiments, the administrator computer system includes the first computer system and the second computer system.

In embodiments, the underlying digital asset is a stable value token. In embodiments, the underlying digital asset is Neo. In embodiments, the underlying digital asset is Ether. In embodiments, the underlying digital asset is Bitcoin.

In embodiments, the first designated private key is mathematically related to a first designated public key.

In embodiments, wherein the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, the second smart contract instructions include sixth authorization instructions related to modifying a token supply of the digital asset token.

A method of increasing a total supply of digital asset tokens includes in accordance with an embodiment of the present application includes the steps of: (a) providing a first designated key pair, comprising a first designated public key of an underlying digital asset and a corresponding first designated private key, wherein the underlying digital asset is maintained on a distributed public transaction ledger maintained by a plurality of geographically distributed computer systems in a peer-to-peer network in the form of a blockchain, and wherein the first designated private key is stored on a first computer system which is connected to the distributed public transaction ledger through the Internet; (b) providing a second designated key pair, comprising a second designated public key of the underlying digital asset and a corresponding second designated private key, wherein the second designated private key is stored on a second computer system which is physically separated from the first computer system and is not operatively or physically connected to the distributed public transaction ledger or the Internet; (c) providing first smart contract instructions for a digital asset token associated with a first contract address associated with the blockchain associated with the underlying digital asset, wherein the first smart contract instructions are saved in the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address; (2) first authorization instructions for the second designated key pair; (d) providing second smart contract instructions for the digital asset token associated with a second contract address associated with the blockchain associated with the underlying digital asset, which is one of the one or more delegated contract addresses and not the first contract address, wherein the second smart contract instructions are saved in the blockchain for the underlying digital assets and include: (1) print limiter token creation instructions indicating conditions under which tokens of the digital asset token are created; (2) second authorization instructions for the first designated key pair with respect to token creation of the digital asset token; (3) third authorization instructions for a first designated custodian address with respect to token creation of the digital asset token; (e) providing third smart contract instructions for the digital asset token associated with a third contract address associated with the blockchain associated with the underlying digital asset, which is the first designated custodian contract address, wherein the third smart contract instructions are saved in the blockchain for the underlying digital assets and include: (1) fourth authorization instructions for the second designated key pair with respect to authorizing the issuance of instructions to the second smart contract regarding token creation; (f) providing fourth smart contract instructions for the digital asset token associated with a fourth contract address associated with the blockchain associated with the underlying digital asset, which is one of the one or more delegated contract addresses and not the first contract address, second contract address or third contract address, wherein the fourth smart contract instructions are saved in the blockchain for the underlying digital assets and include: (1) token creation instructions to create tokens of the digital asset tokens under conditions set forth by the print limiter token creation instructions; (2) second delegation instructions for delegating to another contract address, data storage operations; (g) providing fifth smart contract instructions for the digital asset token associated with a fifth contract address associated with the blockchain associated with the underlying digital asset, which is one of the one or more designated store contract addresses, wherein the fifth smart contract instructions are saved in the blockchain for the underlying digital assets and include: (1) data storage instructions for transaction data related to the digital asset token, wherein said transaction data comprises for all issued tokens of the digital asset token: (A) public address information associated with the underlying digital asset; and (B) corresponding token balance information associated with said public address information; (2) fifth authorization instructions for modifying the transaction data in response to a request from the fourth contract address; (h) increasing the total supply of the digital asset token, by a digital asset token issuer system, from a first amount of the digital asset tokens to a second amount of the digital asset tokens, comprising the steps of: (1) generating, by the digital asset token issuer system, a first transaction request including a first message comprising a first request to increase the total supply of the digital asset token to a second amount of digital asset tokens, from the on-line public key address to the fourth contract address, wherein the first transaction request is digitally signed by the first on-line private key; (2) sending, by the digital asset token issuer system via the underlying blockchain, the first transaction request from the on-line public key address to the fourth contract address; (3) sending, by the digital asset token issuer system via the underlying blockchain, the first transaction request from the fourth contract address to the second contract address; wherein the second smart contract executes, via the blockchain network, the first transaction request to return a first unique lock identifier associated with the first transaction request; (4) obtaining, by the digital asset token issuer system, the first unique lock identifier, based on reference to the blockchain; (5) generating, by the digital asset token issuer system, a second transaction request including a second message comprising a second request to unlock the total supply of the digital asset token in accordance with the first request and including the first unique lock identifier, the second transaction request being from the on-line public key address to the third contract address, wherein the second transaction request is digitally signed by the first on-line private key; (6) sending, by the digital asset token issuer system via the underlying blockchain, the second transaction request from the on-line public key address to the third contract address; wherein the third smart contract executes, via the blockchain network, the second transaction request to return a first unique request hash associated with the second transaction request; (7) obtaining, by the digital asset token issuer system, the first unique request hash, based on reference to the blockchain; (8) generating, by the digital asset token issuer system, a third transaction request to be digitally signed by at least the second designated private key including the first unique request hash; (9) transferring, from the digital asset token issuer system to a first portable memory device, the third transaction request; (10) transferring, from the first portable memory device to the second computer system, the third transaction request; (11) digitally signing, by the second computer system, the third transaction request using the second designated private key to generate a third digitally signed transaction request; (12) sending, from the second portable memory device using the digital asset token issuer system, via the underlying blockchain, the third digitally signed transaction request to the third contract address; and (i) confirming, by the digital asset token issuer system, that the total supply of digital asset tokens is set to the second amount of digital asset tokens based on reference to the blockchain; wherein the third smart contract, executes, via the blockchain network, the third digitally signed transaction request to validate the second request to unlock based on the third digitally signed transaction request and the first unique request hash and executes a first call to the second contract address, to increase the total supply of the digital asset token to the second amount of digital asset tokens, wherein the second contract address returns the first call to the fourth contract address and the fourth smart contract executes, via the blockchain network, a second call to the fifth contract address to set the total supply of the digital asset tokens to the second amount of digital asset tokens, wherein the fifth smart contract executes, via the blockchain, the second call to set the total supply of the digital asset tokens to the second amount of digital asset tokens.

In embodiments, the first designated key pair includes an additional designated key pair comprising an additional designated public key and an additional designated private key.

In embodiments, the second computer system is a hardware storage module.

In embodiments, the second designated key pair comprises an additional designated key pair comprising an additional designated public key and an additional designated private key.

In embodiments, the second authorization instructions for the first designated key pair with respect to token creation of the digital asset token includes instructions limiting creation of digital asset tokens above a first threshold amount over a first period of time.

In embodiments, the fourth authorization instructions for the second designated key pair to authorize the issuance of instructions to the second smart contract instructions with respect to token creation includes instructions to permit creation of digital asset tokens above the first threshold during the first period of time.

In embodiments, the third smart contract instructions further include: (2) sixth authorization instructions for the second designated key pair to authorize the issuance of instructions, to the first smart contract, to change the one or more designated contract addresses from the second contract address to a different designated contract address.

In embodiments, the fourth smart contract instructions further include: (3) token transfer instructions related to transferring tokens of the digital asset token from a first designated contract address to a second designated contract address.

In embodiments, the fourth smart contract instructions further include: (3) token destruction instructions related to destroying one or more tokens of the digital asset token.

In embodiments, the second smart contract instructions further include: (4) token balance modification instructions related to modifying a total number of tokens of the digital asset token assigned to a third designated address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the first transaction request includes first transaction fee information for miners in the blockchain network to process the first transaction request.

In embodiments, the second transaction request includes second transaction fee information for miners in the blockchain network to process the second transaction request.

In embodiments, the first portable memory device includes the second portable memory device.

In embodiments, the second smart contract instructions include sixth authorization instructions related to modifying a token supply amount of the digital asset token.

A method of increasing a total supply of digital asset tokens in accordance with an embodiment of the present application includes the steps of: (a) providing a first designated key pair, comprising a first designated public key of an underlying digital asset and a corresponding first designated private key, wherein the underlying digital asset is maintained on a distributed public transaction ledger maintained by a plurality of geographically distributed computer systems in a peer-to-peer network in the form of the blockchain, and wherein the first designated private key is stored on a first computer system which is connected to the distributed public transaction ledger through the Internet; (b) providing a second designated key pair, comprising a second designated public key of the underlying digital asset and a corresponding second designated private key, wherein the second designated private key is stored on a second computer system which is physically separated from the first computer system and is not operatively or physically connected to the distributed public transaction ledger or the Internet; (c) providing first smart contract instructions for a digital asset token associated with a first contract address associated with the blockchain associated with the underlying digital asset, wherein the first smart contract instructions are saved in the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address; and (2) first authorization instructions for the second designated key pair; (d) providing second smart contract instructions for the digital asset token associated with a second contract address associated with the blockchain associated with the underlying digital asset, which is one of the one or more delegated contract addresses and not the first contract address, wherein the second smart contract instructions are saved in the blockchain for the underlying digital assets and include: (1) print limiter token creation instructions indicating conditions under which tokens of the digital asset token are created; (2) first custodian address information instructions associated with a first designated custodian; and (3) second authorization instructions for the first designated key pair with respect to token creation of the digital asset token; (e) providing third smart contract instructions for the digital asset token associated with a third contract address associated with the blockchain associated with the underlying digital asset, which is the first designated custodian contract address, wherein the third smart contract instructions are saved in the blockchain for the underlying digital assets and include: (1) fourth authorization instructions for the second designated key pair with respect to issuance of instructions to the second smart contract regarding token creation; (f) providing fourth smart contract instructions for the digital asset token associated with a fourth contract address associated with the blockchain associated with the underlying digital asset, wherein the fourth smart contract instructions are saved in the blockchain for the underlying digital assets and include: (1) token creation instructions related to creating tokens of the digital asset token under the conditions set forth by the print limiter token creation instructions; and (2) second delegation instructions for delegating to one or more designated store contract addresses data storage functions; (g) providing fifth smart contract instructions for the digital asset token associated with a fifth contract address associated with the blockchain associated with the underlying digital asset, which is one of the one or more designated stored contract addresses, wherein the fifth smart contract instructions are saved in the blockchain for the underlying digital assets and include: (1) data storage instructions for transaction data related to the digital asset token, wherein said transaction data comprises for all issued tokens of the digital asset token: (A) public address information associated with the underlying digital asset; and (B) corresponding token balance information associated with said public address information; (2) third custodian instructions associated with a third designated custodian address corresponding to the fourth contracts address; and (3) fifth authorization instruction for modifying the transaction data in response to requests from the fourth contract address; (h) receiving, by the digital asset token issuer system, a request to generate and assign to a first designated public address a first amount of digital tokens; (i) generating, by a digital asset token issuer system, the first amount of digital asset tokens and assigning said first amount of digital asset token to the first designated public address increasing the total supply of the digital asset token, comprising the steps of: (1) generating, by the digital asset token issuer system, and sending, from the digital asset token issuer system via the underlying blockchain, a first transaction request: (A) from the on-line public key address; (B) to the fourth contract address; and (C) including a first message comprising a first request to generate the first amount of digital asset token and assign said first amount of digital asset tokens to the first designated public address; wherein the first transaction request is digitally signed by the first on-line private key; wherein the fourth smart contract executes, via the blockchain network, the first transaction request to: (i) validate the first request and the authority of the first on-line private key to call the second smart contract to execute the first request; and (ii) send a first call to the fourth contract address to generate and assign to the first designated public address the first amount of digital asset tokens; wherein the fourth smart contract executes, via the blockchain network, the first call request to generate a first unique lock identifier, and return to the second smart contract address the first unique lock identifier; wherein, in response to the return of the first unique lock identifier, the second smart contract executes, via the blockchain network, a call to the fourth smart contract address to confirm the first call request with the first lock identifier; wherein, in response, the fourth smart contract executes, via the blockchain network, the first call to execute a second call to the fifth contract address to obtain the total supply of digital asset tokens in circulation; wherein, in response, the fifth smart contract executes, via the blockchain network, the second call and returns, to the fourth contract address, a second amount of digital asset tokens corresponding to the total supply of digital asset tokens in circulation; wherein, in response to the return of the second amount, the fourth smart contract, executes via the blockchain network, a third call request to the fifth contract address to set a new total supply of digital asset tokens in circulation to a third amount, which is the total of the first amount and the second amount; wherein, in response to the third call, the fifth smart contract, executes via the blockchain network, the third call and sets a new total supply of digital asset tokens in circulation at the third amount; wherein, the fourth smart contract executes, via the blockchain network, a fourth call to the fifth contract address to add the first amount of digital asset tokens to the balance associated with the first designated public address; wherein, in response the fifth smart contract executes, via the blockchain network, the fourth call to set the balance of digital asset tokens in the first designated public address at a fourth amount which includes the addition of the first amount to the previous balance; and (j) confirming, by the digital asset token issuer system, that the balance of digital asset tokens in the first designated public address is set to include the first amount of digital asset tokens based on reference to the blockchain.

In embodiments, the second computer system is a hardware storage module.

In embodiments, the second designated key pair comprises an additional designated key pair comprising an additional designated public key and an additional designated private key.

In embodiments, the second authorization instructions for the first designated key pair with respect to token creation of the digital asset token include instruction limiting token creation above a first threshold over a first period of time.

In embodiments, the fourth authorization instructions for the second designated key pair to authorize the issuance of instructions to the second smart contract instructions with respect to token creation include instructions to allow for creation of digital asset tokens above the first threshold during the first period of time.

In embodiments, the third smart contract instructions further include: (2) sixth authorization instructions for the second designated key pair to authorize the issuance of instructions to the first smart contract to change the one or more designated contract addresses from the second contract address to a different designated contract address.

In embodiments, the fourth smart contract instructions further include: (3) token transfer instructions related to transferring tokens of the digital asset token from a first designated contract address to a second designated contract address.

In embodiments, the fourth smart contract instructions further include: (3) token destruction instructions related to destroying one or more digital asset token.

In embodiments, the fourth smart contract instructions further include: (3) token balance modification instructions related to modifying a total number of tokens of the digital asset token assigned to a third designated address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the first amount of digital asset tokens, a validating request.

In embodiments, the method further comprises determining the first designated key pair has authority to process the request to generate the first amount of digital tokens.

In embodiments, the first transaction request includes first transaction fee information for miners in the blockchain network to process the first transaction request.

In embodiments, the fifth contract returns the balance of digital asset tokens to the fourth smart contract address.

In embodiments, the fifth contract returns the balance of digital asset tokens to the second smart contract address.

In embodiments, the method further comprises the steps of: (k) receiving, by the blockchain network, from a first user device associated with the first designated public address, via the underlying blockchain, a second transaction request: (A) from the first designated public address; (B) to the first contract address; and (C) including a second message comprising a second request to transfer a fifth amount of digital assets from the first designated public address to a second designated public address; wherein the first transaction request is digitally signed by a first private key, which is mathematically related to the first designated public address, and wherein the first user device had access to the first private key prior to sending the second transaction request; and wherein the first smart contract executes, via the blockchain network, the second transaction request to execute, via the blockchain network, a sixth call request to fourth contract address to transfer a fifth amount of digital assets from the first designated public address to the second designated public address; wherein, in response to the sixth call request, the fourth smart contract, executes via the blockchain network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address; wherein, in response to the seventh call request, the fifth smart contract, executes via the blockchain network, the seventh call request to return the sixth amount of digital asset tokens; wherein, in response to the return of the sixth amount of digital asset, the fourth smart contract executes, via the blockchain network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the blockchain network, a seventh call request to the fifth contract address to set a new balance for the digital asset tokens in the first designated public address to a seventh amount which equals the sixth amount less the fifth amount; wherein, in response to the seventh call, the fifth smart contract executes, via the blockchain network, the seventh call to set and store the new balance for the first designated public address as the seventh amount and returns a new balance for the first designated public address as the seventh amount; wherein, in response to the return of the new balance, the fourth smart contract executes, via the blockchain network, an eighth call to add the second amount of digital asset tokens to the balance associated with the second designated public address; wherein, in response to the eighth call request, the fifth smart contract executes, via the blockchain network, the eighth call request to set the balance of digital asset tokens in the second designated public address at a seventh amount which includes the addition of the second amount to a previous balance associated with the second designated public address; and wherein the first user device confirms that the balance of digital asset tokens in the first designated public address is the sixth amount of digital asset tokens based on reference to the blockchain.

In embodiments, the second transaction request includes second transaction fee information for miners in the blockchain network to process the second transaction request.

In embodiments, the balance of digital asset tokens in the second designated public address is returned to the fourth contract address.

In embodiments, the balance of digital asset tokens in the second public address is returned to the first smart contract address.

In embodiments, a second user device confirms that the balance of the digital asset tokens in the second designated public address is the seventh amount of digital asset tokens based on reference to the blockchain.

In embodiments, the method further includes the steps of: (k) providing a third designated key pair, comprising a third designated public key of the underlying digital asset and a corresponding third designated private key, and wherein the third designated private key is stored on a third computer system which is connected to the distributed public transaction ledger through the Internet; (1) receiving, by the blockchain network, from the third computer system, via the underlying blockchain, a second transaction request: (A) from the third designated public key address; (B) to the fifth contract address; and (C) including a second message comprising a request to burn a fifth amount of digital asset tokens from a balance associated with the third designated public key address; wherein the second transaction request is digitally signed by a third designated private key; wherein the fourth smart contract executes, via the blockchain network, the second transaction request to execute, via the blockchain network, a sixth call request to the fifth contract address to obtain a sixth amount of digital asset tokens which reflect a current balance of digital asset tokens associated with the third designated public key address; wherein, in response to the sixth call request, the fifth smart contract, executes via the blockchain network, the seventh call request to return the sixth amount of digital asset tokens; wherein, in response to the return of the sixth amount of digital asset, the fourth smart contract executes, via the blockchain network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the blockchain network, a seventh call request to the fifth contract address to set a new balance for the digital asset tokens in the third designated public key address to a seventh amount which equals the sixth amount less the fifth amount; wherein, in response to the seventh call, the fifth smart contract executes, via the blockchain network, the seventh call to set and store the new balance for the third designated public key address as the seventh amount and returns the new balance for the third designated public key address as the seventh amount; wherein, in response to the return of the new balance, the fourth smart contract executes, via the blockchain network, an eighth call request to the fifth contract address to obtain a total supply of digital asset tokens in circulation; wherein, in response to the eighth call request, the fifth smart contract executes, via the blockchain network, the eighth call request and returns, to the fourth contract address, an eighth amount of digital asset tokens corresponding to the total supply of digital asset tokens in circulation; wherein, in response to the return of the eighth amount, the fourth smart contract, executes via the blockchain network, a ninth call request to the fifth contract address to set a new total supply of digital asset tokens in circulation to a ninth amount, which is the eighth amount less the fifth amount; and wherein, in response to the ninth call request, the fifth smart contract, executes via the blockchain network, the ninth call request and sets a new total supply of digital asset tokens in circulation at the ninth amount, and returns to the fourth contract address.

In embodiments, the third designated key pair is the first designated key pair.

In embodiments, the third designated key pair is not the second designated key pair.

In embodiments, the third designated key pair is the second designated key pair.

In embodiments, the third designated key pair is not the first designated key pair.

In embodiments, the third computer system is the first computer system.

In embodiments, the third computer system is not the first computer system.

In embodiments, the administrator computer system comprises the first computer system and the third computer system.

In embodiments, the administrator computer system comprises the first computer system and the second computer system.

In embodiments, the second smart contract instructions include sixth authorization instructions related to modifying a token supply of the digital asset token.

Holding Collateral in a Smart Contract on an Underlying Blockchain

Figure 24:
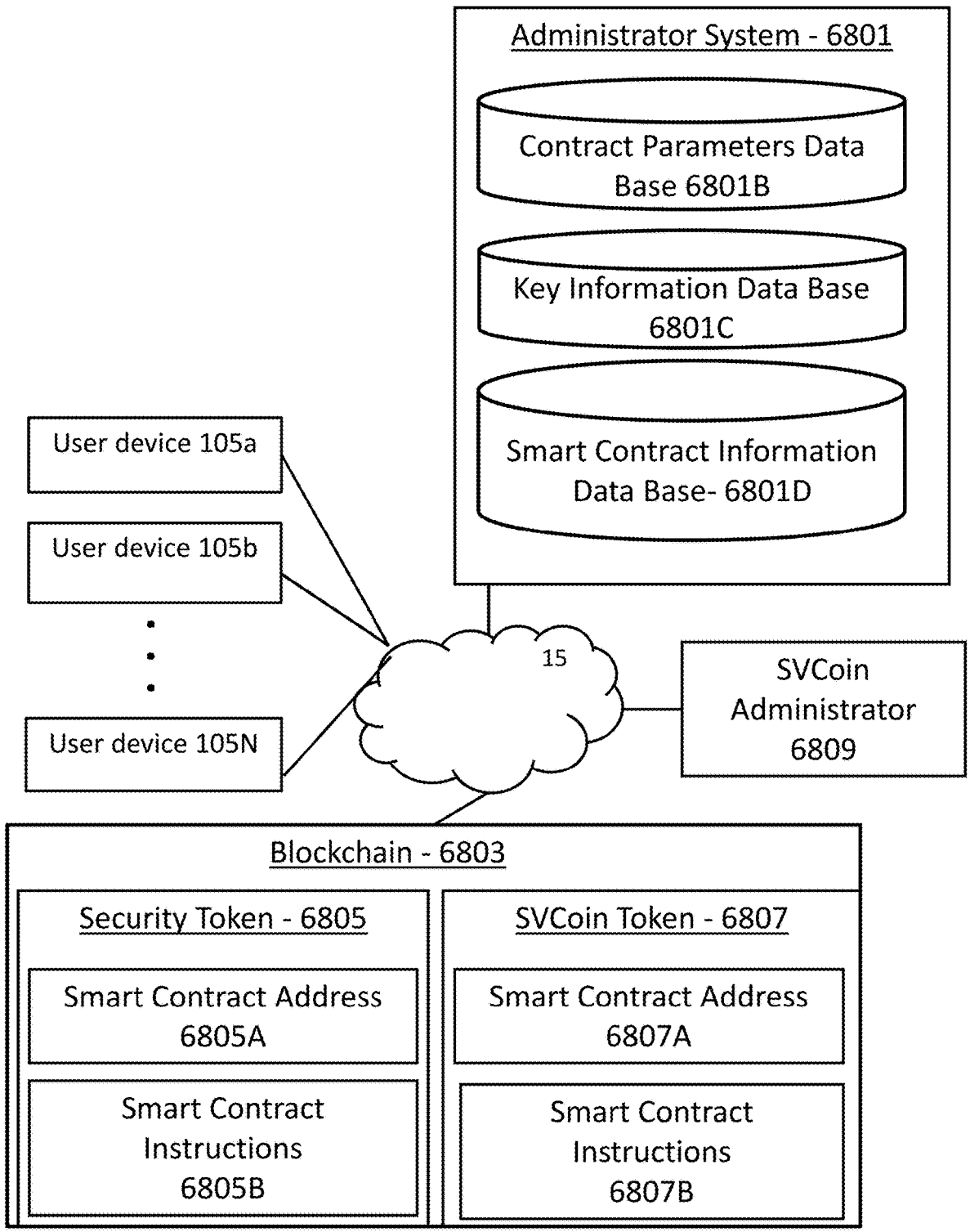
FIG. 24 is a schematic drawing of an exemplary network for holding collateral in a smart contract on an underlying blockchain in accordance with exemplary embodiments of the present invention.

FIG. 24 illustrates a schematic drawing of an exemplary network for holding collateral in a smart contract on an underlying blockchain in accordance with exemplary embodiments of the present invention. The network shown in FIG. 24 may include a security token administrator system 6801 associated with an issuer of a security token 6805 (Security Token), a stable value token administrator system 6809 associated with an issuer of a stable value token 6807 (SV Coin Token), and a plurality of end user devices 105a, 105b, . . . 105N, each associated one or more corresponding end users. In embodiments, more than one end user device may be associated with the same end user.

In embodiments, each of systems 6801, 8609 and user devices 105a, 105b . . . 105N may communicated with and/or among each other directly and/or indirectly, e.g., through a data network 15, such as the Internet. In embodiments, encryption and/or other security protocols may be used. In embodiments, data network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections.

In embodiments, issuer of the security token may be one or more entities. In embodiments, the issuer of the stable value token may be one or more entities. In embodiments, the issuer of the security token and the issuer of the stable value token may be the same or different entity. In embodiments, one or more administrators may operate the security token administrator system 6801 on behalf of the issuer of the stable value token. In embodiments, the same or different administrators may operate the stable value token administrator system 6809. In embodiments, the issuers and/or administrators may be a trust company, a regulated trust company, a bank, a broker dealer, or some other form of entity, to name a few.

In embodiments, the administrator system 6801 may access one or more databases stored on non-volatile computer readable memory including contract parameters data base 6801B, key information data 6801C and smart contract information 6801D. As further illustrated in FIG. 25A, in embodiments, contract parameters database 6801B may include at least the following smart contract terms or attributes: (1) inception date data 6902; (2) inception value data 6904; (3) benchmark data 6906; (4) contract duration data 6908; (5) collateral requirements data 6910; and (6) notional value data 6912, to name a few. In embodiments, other contract parameters may be stored in the contract parameters database. Additional databases, to name a few, are discussed above. Moreover, additional databases may include the databases discussed above in connection with the descriptions of Blockchain Financial Instruments, Digital Asset Exchanges, and Digital Wallets, to name a few. In embodiments, inception date data 6902 may refer to data that indicates dates at which smart contracts begin. In embodiments, inception value data 6904 may refer to data that indicates a value of smart contracts at a corresponding inception date. Benchmark data 6906 may refer to data that indicates benchmark information of which smart contracts are based off. In embodiments, contract duration data 6908 may refer to durations of smart contracts. In embodiments, collateral requirements data 6910 may refer to specific collateral requirements for smart contracts. In embodiments, notional value data 6912 may refer to the total amount of a security's underlying asset at its spot price in reference to smart contract values.

As illustrated in FIG. 24, the administrator system 6801, stable value administrator 6809, and/or user devices 105a, 105b and/or 105N may communicate with a blockchain network to access and/or add blocks to blockchain 6803. The blockchain 6803 may include one or more tokens, such as Security Token 6805 and SVCoin Token 6807 as illustrated. Each token will have at least one corresponding smart contract address (e.g., smart contract address 6805A for Security Token 6805, and smart contract address 6807A for SVCoin Token 6807, to name a few) by which instructions for each token may be accessed. In embodiments, the smart contract address may be associated with a proxy smart contract which may then issue calls to one or more other smart contracts having their own smart contract addresses.

As illustrated in FIG. 25B, a security token smart contract 6805B is provided on the underlying blockchain 6803. Security token 6805 may also include a plurality of instruction modules that collectively make up the smart contract associated with the security token. By way of illustration, in embodiments, such modules may include modules of instructions such as: (1) a create security tokens module 6918; (2) a transfer tokens module 6920; (3) a destroy security tokens module 6922; (4) an access data module 6924; (5) an authorize instructions module; (6) a calculate excess collateral module 6928; (7) a generate collateral information message module 6930; and (8) a send collateral information message module, to name a few.

In embodiments, the create security token module 6918 may include one or more authorization instructions related to creating security tokens. Such instructions may specify one or more authorized key pairs or contract addresses that may be authorized to create security tokens under specified conditions. In embodiments, the create security module 6918 may include instructions on increasing the token supply. In embodiments, the create security token module 6918 may include instructions on how to create new tokens within pre-approved token supply limits and how to assign newly created or "minted" tokens to specific designated public addresses or contract addresses on the underlying blockchain.

In embodiments, the transfer tokens module 6920, in embodiments, may include authorization instructions related to transferring security tokens. In embodiments, such transfer instructions may include rules by which certain transfer are allowed or blocked and may specify one or more key pair or contract addresses that may be authorized to perform one or more types of transfer operations. In embodiments, the transfer tokens module 6920 may include authorization instructions related to transferring stable value tokens to smart contract address 6805A. In embodiments, the transfer tokens module 6920 may include authorization instructions related to transferring stable value tokens from smart contract address 6805A.

In embodiments, the destroy security tokens module 6922 may include authorization instructions related to destroying security tokens, including, in embodiments, instructions on when, and with whose authority, security tokens associated with one or more specified addresses shall be destroyed or "burned", and thus removed from the security token supply.

The access data module 6924, in embodiments, may include authorization instructions related to accessing data supplied by a first authorized third party database (i.e. administrator system 6801), as discussed in further detail elsewhere.

The authorize instructions module 6926 may further include instructions to authorize the transfer of stable value tokens from the second contract address 6805B.

The generate collateral information message module 6930, in embodiments, may include instructions to generate a collateral confirmation message to the administrator system 6801 confirming receipt of at least one of a first amount of collateral and a second amount of collateral when at least one of the first amount of collateral and the second amount of collateral is received.

In embodiments, the send collateral information message module 6932 may include instructions to send the collateral confirmation message to the administrator system 6801 confirming receipt of at least one of a first amount of collateral and a second amount of collateral when at least one of the first amount of collateral and the second amount of collateral is received.

As illustrated in FIG. 25C, a stable value token smart contract 6807B is provided on the underlying blockchain 6803. Stable value token 6807 may also include a plurality of instruction modules that collectively make up the smart contract associated with the stable value token. By way of illustration, in embodiments, such modules may include modules of instructions such as: (1) a create stable value token module 6934; (2) a transfer stable value token module 6936; (3) a destroy stable value token module 6938; and (4) authorization instruction module.

In embodiments, the create stable value token module 6934 may include authorization instructions related to creating stable value tokens.

The transfer stable value token module 6936, in embodiments, may include authorization instructions related to transferring stable value tokens.

In embodiments, the destroy stable value token module 6938 may include authorization instructions related to destroying stable value tokens.

In embodiments, the authorization instruction module 6940 may include authorization instructions related to functions associated with the stable value tokens. In embodiments, authorization instructions module 6940 may also include instructions to authorize request received, the requests, in embodiments, being transaction requests from administrators, user public addresses, or other smart contracts.

While security token 6805 is described as a security token, in embodiments, the security token may reflect other types of tokens, such as tokens associated with a security, a bond, a financial instrument, a contract, and stock, to name a few. Similarly, while the SVCoin token 6807 is describe a stable value token, in embodiments, the SVCoin token 6807, may reflect other kinds of token which may not necessarily reflect a stable value, e.g., Gas tokens, and/or some other kind of token which the parties to the transaction reflect as an appropriate collateral.

Referring to FIG. 28, an exemplary process for generating a smart contract in accordance with an embodiment of the present application is provided. In embodiments, the process shown in FIG. 28 may begin at a step S7302. In step S7302, an administrator system (i.e. administrator system 6801) may receive a contract request. In embodiments, the contract request may be received from a first user, and includes user identification information and a request to generate a smart contract. In embodiments, the first user may be an individual, associated with a first user device. In embodiments, the user identification information may be associated with the first user. In embodiments, the user identification information may be associated with a first user device. In embodiments, the first user may not be an individual, but may be an organization or entity such as a financial institution, exchange or brokerage house, to name a few. In embodiments, the first user device may be associated with a financial institution, exchange or brokerage house, to name a few. In embodiments, the first user device may be User device 105*a*. The contract request, in embodiments, may also include a smart contract generation request. The smart contract generation request, in embodiments, is a request from a user device, associated with a first user, to an administrator system to generate a smart contract.

In embodiments, a contract request may be from more than one user. In embodiments, a first user and second user may agree in advance, as to contract parameters, and one or the other may send a contract request that includes first user identification information associated with a first user device that is associated with a first user as well as second used identification information associated with a second user device that is associated with a second user. The first user device, in embodiments, may be User device 105*a*. In embodiments, the second user device may be User device 105*b*. The contract request, in embodiments, may include a smart contract generation request. The smart contract generation request, in embodiments, is a request from a user device to an administrator system to generate a smart contract.

In embodiments, the contract request may be for a contract where the parameters are already agreed upon by more than two users (i.e. User device 105*a*, User device 105*b*, . . . User device 105*n*). For example, where the contract parameters are already agreed upon by more than two users, the contract request may include user information for each of the users of which have already agreed upon the parameters of the requested contract. The contract request, in embodiments, may also include a smart contract generation request.

Once a contract request is received by the administrator system, at step S7304, the administrator system may generate graphical user interface (GUI) information including at least one prompt for the first user to provide contract parameters related to the smart contract to be generated. In embodiments, the administrator system may also generate GUI information that prompts a user to input information corresponding to the contract parameters similar to or the same as the published contracts parameters described in connection with FIGS. 71A-71B (i.e. inception date 7104, inception value 7106, benchmark data 7108, contract duration data 7110, collateral requirement 7112, notional value 7114, early termination rules 7130, and second benchmark data 7132, to name a few) and the contract parameters of contract parameters data base 6801B described in connection with FIG. 25A, the descriptions of which applying herein. In embodiments, the administrator system may generate graphical user interface (GUI) information including at least one prompt for the second user to provide contract parameters related to the smart contract to be generated.

Once the GUI information is generated, at step S7306, the administrator system may send the GUI information to the first user device. In embodiments, once received by the first user device, the first user device may use the GUI information to display a GUI. In embodiments, such as embodiments where the contract parameters are already agreed upon by more than one user, the administrator system may send the GUI information to the first user device and the second user device. In embodiments, once received, the first and second user devices may each use the GUI information to display a GUI. In embodiments, such as embodiments where the parameters are already agreed upon by more than two users, the administrator system may send the GUI information to more than two user devices. In embodiments, once received, the more than two user devices may each use the GUI information to display a GUI.

In embodiments, once the GUI information is received by the first user device, the first user device may receive one or more inputs which may include contract information including the contract parameters. For example, the user device may receive inputs that indicate an inception date 7104, inception value 7106, benchmark data 7108, contract duration data 7110, collateral requirement 7112, notional value 7114, early termination rules 7130, and second benchmark data 7132, to name a few. In embodiments, where the GUI information is sent to more than one device, for example, where the GUI information is sent to a first user device and a second user device, at least one of the user devices may receive inputs which may include contract information including the contract parameters. The contract information including the contract parameters may, in embodiments, be sent from the first and or second user devices to the administrator system.

At a step S7308, the administrator system may receive, from the first user device, in response to the at least one prompt included in the graphical user interface information, contract information including the contract parameters of the contract to be generated. In embodiments, such as embodiments where the contract parameters are already agreed upon by more than one user, the administrator system may receive contract information including the contract parameters of the contract to be generated from at least one of the first user device and the second user device. In embodiments, such as embodiments where the parameters are already agreed upon by more than two users, the administrator system may receive contract information including the contract parameters of the contract to be generated from at least one of the user devices associated with the users that have already agreed upon the contract parameters.

Once the contract information is received by the administrator system, at a step S7310, the administrator system may store the contract information including the contract parameters in memory operably connected to the administrator system. In embodiments, the contract information may be stored in smart contract information database 6801D.

In embodiments, the contract parameters provided in the process described in connection with FIG. 28 may be used in arranging for multiple transactions based on the contract parameters. In embodiments, the contract parameters that are provided by the first user device, for example, may published to a plurality of user devices, in the same manner as is described below with respect to step S7002. In this case, users may indicate their desire to participate in the contract consistent with step S7004 discussed below.

The steps of the process described in connection with FIG. 28 may be rearranged or omitted.

Figure 25A:
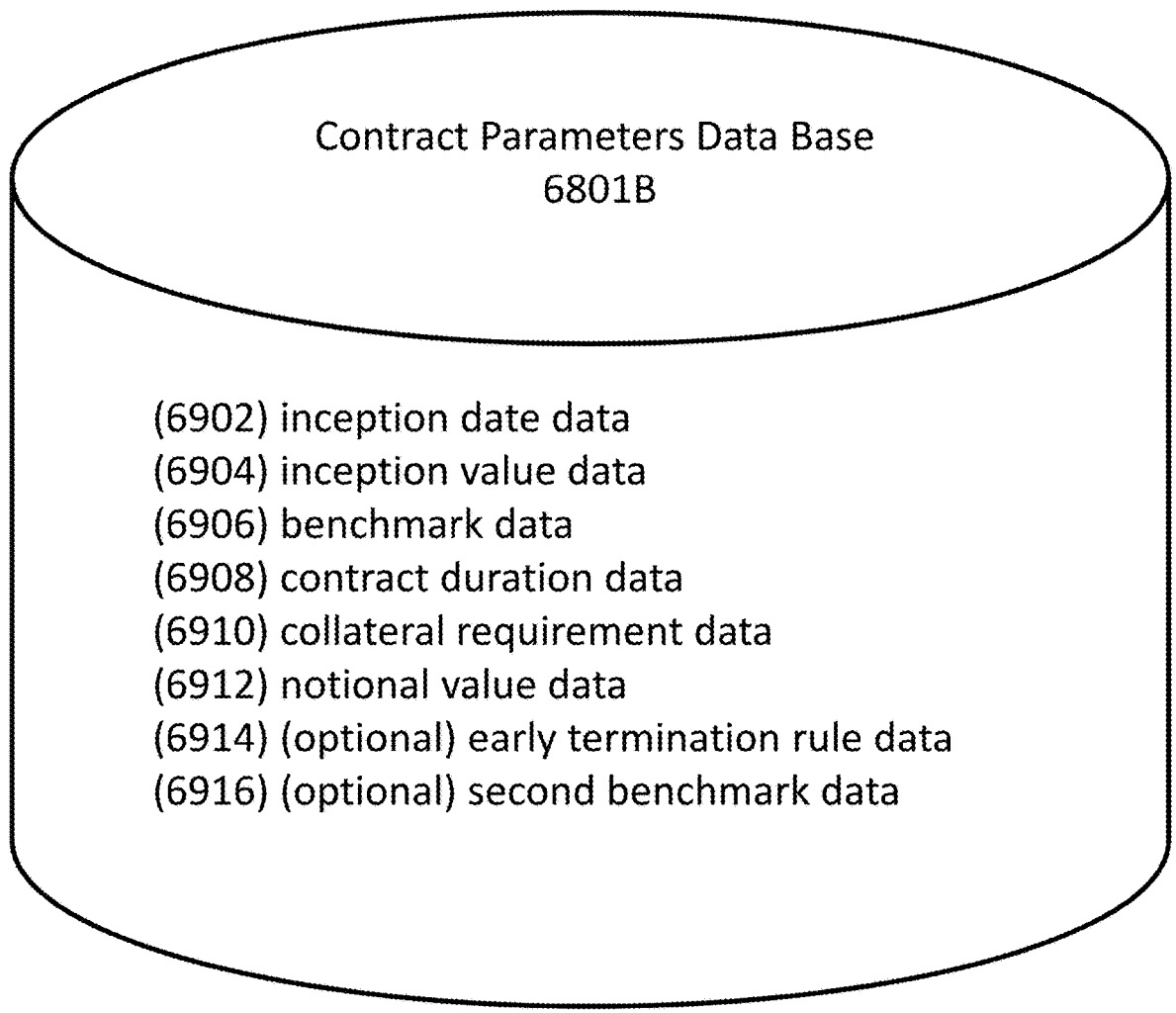
FIG. 25A is a schematic drawing of a contract parameters database of a smart contract in accordance with exemplary embodiments of the present invention.

In embodiments, the process of FIG. 28 may continue with the process in FIG. 26A. In alternative embodiments, FIG. 26A may be its own process, beginning with step S7002. Referring to FIG. 26A, In step S7002, an administrator system 6801 may publish (via, e.g. a public or private website or mobile application) a contract having contract parameters. Contract parameters, as described in step S7002 may be retrieved from contract parameters database 6801B. In embodiments, as shown in FIG. 25A, contract parameters database 6801B as discussed before. The published contract, in embodiments, may have a graphical user interface (GUI), including such information as shown in connection with FIG. 27A. The published contract may show some or all of the data described earlier in connection with FIG. 25A. For example, as shown in FIG. 27A, the published contract 7102 may have (1) an inception date 7104 of Jul. 19, 2018; (2) an inception value 7106 of $10,000; (3) benchmark data 7108 from the S&P 500; (4) a contract duration 7110 of 5 days; (5) a collateral requirement 7112 of 100 Stable Value Coins; and (6) a notional value 7114 of $10,000. Other values and parameters may be included consistent with embodiments of the present invention. In embodiments, these other values and parameters may include information that may be used to determine the contract parameters discussed above, and/or other parameters including: (1) asset identification information; (2) a current (spot) price; (3) a type of derivative; (4) a side (buy/sell); (5) a call/put designation, (6) an expiration date or term, (7) a strike price; (8) pricing model information, and (10) volatility information, to name a few. In embodiments, user input of certain information may prompt requests for additional information. In one example, input of an identification of a particular type of derivative may require user identification of other information, such as upper or lower price limit, to name a few.

In embodiments, the type of derivative may be any one of: vanilla, fx hedge, flexi forward, knock out, knock in, double knockout, double knock in, no touch, one touch, double no touch, double one touch, digital, digital knockout, digital knockin, digital double knockout, digital double knockin, compound, sequential—kiko & kiki, koki—no sequential, digital sequential, average (Asian), fader, digital accrual, accrual, accumulator, accumulator KO, accumulator KI, cas, dcd vanilla, dcd knockout, dcd knockin, average forward, euro-american KO, target redemption forward, dual-strike tarf, kockin tarf, pivot tarf, variance swap, volatility swap and forward volatility agreement, to name a few.

In embodiments, the pricing model may be any one of: black-scholes, vanna-volga, heston, local vol, stoch-local vol, stochastic, to name a few.

In embodiments, the smart contract parameters database may further include: (7) early termination rule data 6914; and (8) second benchmark data 6916, to name a few. In embodiments, early termination rule data 6914 may include rules that charge a fee associated with a user terminating the smart contract before the contract duration is completed. Second benchmark data 6916 in some embodiments may be different than benchmark data 6906. The published contract, in embodiments, may include a GUI with such information as shown in connection with FIG. 27B. In embodiments, the published contract may show some or all of the data described earlier in connection with FIG. 25A. For example, as shown in FIG. 27B, the published contract 7116 may have (1) an inception date 7118 of Jul. 20, 2018; (2) an inception value 7120 of $1,000; (3) benchmark data 7122 from the S&P 500; (4) a contract duration 7124 of 2 days; (5) a collateral requirement 7126 of 10 Stable Value Coins; (6) a notional value 7128 of $1,000; (7) no early termination rules 7130; and (8) second benchmark data 7132 from Winkdex®. While there are no early termination rules shown in the published contract of FIG. 27B, early termination rules may include, for example, a fee for terminating the contract early. Other values and parameters may be included consistent with embodiments of the present invention.

Referring to FIG. 26A, In step S7004, the administrator system 6801 may receive a plurality of indications of interest ("IOIs") or bids from users. Referring to FIGS. 27C-27F, the IOIs may include at least a first indication of interest (e.g. first indication of interest 7134 described in connection with FIG. 27C or first indication of interest 7140 described in connection with FIG. 27D) and a second indication of interest (e.g. second indication of interest 7150 described in connection with FIG. 27E or second indication of interest 7156 described in connection with FIG. 27F). In embodiments, the first indication of interest may be a first user response sent from a first user device 105a to administrator system 6801. In embodiments, the first user device 105a may be associated with a first user (e.g. Alice). In embodiments, as illustrated in FIGS. 71C and 71D, the first indication of interest 7134, 7140 may include at least first user identification information 7136, 7142 associated with the first user (e.g., a name, user number, email address, to name a few used to identify the indication of interest as coming from the first user (Alice)), and first side information 7138, 7144 (e.g., buy). First side information may include identification of a first leg of the smart contract (e.g., buy or sell). In embodiments, additional information, such as shown in FIG. 27D may also be included in an indication of interest. For example, referring to FIG. 27C, a first indication of interest 7134 may be sent by Alice (as the first user) to Gemini (as the security token administrator). Alice's indication of interest 7134 may include her user identification number 7136, ID No. 12345 (as the first user identification information), and information indicating that Alice would like to buy 7138 (as the first side information).

In embodiments, the first indication of interest may further include additional information such as, a first user public address and/or first collateral information, to name a few. In embodiments, such additional information may not be necessary to include in the indication of interest because it may be included in the contract parameters as published and thus implied. First collateral information may be in stable value digital asset tokens (SVCoins). For example, referring to FIG. 27D, a first indication of interest 7140 may be sent by Alice (as a first user) to Gemini (as the security token administrator). Alice's indication of interest may include: (1) her user identification number 7142, ID No. 12345 (as the first user identification information); (2) information indicating that Alice would like to buy 7144 (as the first side information); Alice's Public Address 7146 (as the a first user public address); and (4) information indicating a collateral 7148 of 100 Stable Value Coins (as the first collateral information).

In embodiments, the second indication of interest may be a second user response sent from a second user device 105b to administrator system 6801. In embodiments, the second user device 105b may be associated with a second user (e.g. Bob). The second indication of interest (e.g. second indication of interest 7150 described in connection with FIG. 27E or second indication of interest 7156 described in connection with FIG. 27F) may include second user identification information 7152, 7158 associated with the second user (e.g. a name, user number, email address, to name a few used to identify the indication of interest as coming from the second user (Bob), and second side information (e.g. sell). The second side information may include identification of a second leg of the smart contract (e.g. buy or sell). In embodiments, the second leg is different from the first leg. In embodiments, additional information, such as shown in FIG. 27F, may also be included in an indication of interest. For example, referring to FIG. 27E, a second indication of interest 7150 may be sent by Bob (as the second user) to Gemini (as the security token administrator). Bob's indication of interest 7150 may include his user identification number 7152, ID No. 54321 (as the second user identification information), and information indicating 7154 that Bob would like to sell (as the first side information). In some embodiments, the second indication of interest my further include additional information such as, a second user public address 7162 and/or second collateral information 7164, to name a few. The second collateral information 7164 may be in stable value digital asset tokens ("SVCoins"). In embodiments, the second indication of interest may include the second user's digital signature which is based on their private key which corresponds to their public key which is associated with their public address. For example, referring to FIG. 27F, a second indication of interest 7156 may be sent by Bob (as the second user) to Gemini (as the security token administrator). Bob's indication of interest 7156 may include: (1) his user identification number 7158, ID No. 54321 (as the second user identification information) or Alice's digital signature which is based on her private key which corresponds to her public key which is associated with her Public Address; (2) information indicating that Bob would like to sell 7160 (as the second side information); Bob's Public Address 7162 (as the second user public address); and (4) information indicating a collateral 7164 of 100 Stable Value Coins (as the second collateral information). In embodiments, Bob's indication of interest may include the Bob's digital signature which is based on Bob's private key which corresponds to Bob's public key which is associated with Bob's Public Address.

In embodiments, step S7004 may further include the administrator system may receive a third and fourth user responses from a fourth user device and a fifth user device, for example. The third user response, in some embodiments, may include fourth user identification information associated with the fourth user. In embodiments, the third user response may also include third side information comprising identification of the first leg of the contract. In embodiments, the third user response may be similar to first indication of interest 7134 described in connection with FIG. 27C, first indication of interest 7140 described in connection with FIG. 27D, second indication of interest 7150 described in connection with FIG. 27E and/or second indication of interest 7156 described in connection with FIG. 27F, the descriptions of which applying herein.

The fourth user response may include fifth user identification information associated with the fifth user. In embodiments, the fourth user response may also include fourth side information comprising identification of the second leg of the contract, the fourth side information being different than the third side information. In embodiments, the fourth user response may be similar to first indication of interest 7134 described in connection with FIG. 27C, first indication of interest 7140 described in connection with FIG. 27D, second indication of interest 7150 described in connection with FIG. 27E and/or second indication of interest 7156 described in connection with FIG. 27F, the descriptions of which applying herein.

Referring back to FIG. 26A, after receiving the first user response (i.e. a first indication of interest) and the second user response (i.e. a second indication of interest), In step S7006, the administrator system 6801 matches the first user response with the second user response. For example, referring to FIGS. 27C-27F, administrator 6801 may match Alice with Bob because Alice wants to buy and Bob would like to sell. In embodiments, such as embodiments where more than one user has agreed to the contract provisions in the published contract (as discussed above in connection with FIG. 28), matching may not be required and step S7006 may be omitted.

In embodiments, such as the embodiments where a third user response and fourth user response are received by the administrator system, the third user response may be matched with the fourth user response.

In step S7008, a stable value token smart contract associated with a stable token 6807 and first smart contract instructions 6807B associated with a first contract address 6807A associated with the blockchain 6803 for the underlying digital asset are provided. In embodiments, the first smart contract instructions 6807B are saved in the blockchain 6803 for the underlying digital asset. In embodiments, the first smart contract instructions 6807B may include the stable value token smart contract instructions 6807B described in connection with FIG. 25C, the same description applying herein.

Referring back to FIG. 26A, In step S7010, a security token smart contract associated with a security token 6805 and second smart contract instructions 6805B associated with the blockchain 6803 for the underlying digital asset are provided. In embodiments, the second smart contract instructions 6805B are saved in the blockchain 6803 for the underlying digital asset. In embodiments, the second smart contract instructions 6805B may include the security token smart contract instructions 6805B described in connection with FIG. 25B, the same description applying herein.

In embodiments, step S7008 and step S7010 may be performed before step S7002, step S7004, and step S7006.

Referring back to FIG. 26A, the process may continue with step S7012, in which the administrator system 6801 sets up a first trade (e.g. trade001) between the first user (e.g. the user associated with first user device 105a) and the second user (e.g. the user associated with the second user device 105b) using the security token smart contract 6805B on the underlying blockchain 6803 with collateral in the form of stable value digital assets (i.e. stable value token 6807). Step S7012 is described in more detail in connection with FIGS. 70B-D.

Referring to FIG. 26B, in embodiments, setting up the first trade between the first user and the second user may begin at step S7016, where the administrator system 6801 generates first trade instructions for the security token smart contract 6805B. The first trade instructions may include instructions to execute the first trade between a first user public address associated with the first user (e.g. the user associated with user device 105a) and a second user public address associated with a second user (e.g. the user associated with user device 105b). In embodiments, the first trade is based at least on the contract terms from step S7002 (i.e. one or more of the contract parameters discussed in connection with FIG. 25A), the first user response from step S7004 (associated with a received IOI—i.e. the 101's described in connection with FIGS. 27C-27F), and the second user response from step S7004 (associated with another received IOI—i.e. the 101's described in connection with FIGS. 27E-27F).

In step S7018, the administrator system 6801 may generate first hashed trade instructions, the first hashed trade instructions being generated by applying a hash algorithm to the first trade instructions. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time In step S7020, the administrator system 6801 sends a first transaction request from an administrator public address associated with the administrator system 6801 to the second contract address 6805A via the underlying blockchain 6803. In embodiments, the first transaction request, includes a first message which may include: (1) the first hashed trade instructions; (2) a request to assign a first trade identification to a first trade associated with the hashed trade instructions. In embodiments, the first message may include requests to assign a first trade identification to the first trade associated with the hashed trade instructions and include the first trade identification associated with the first hashed trade instructions. In embodiments, the first transaction request may further include first transaction fee information. The first transaction fee information, in embodiments, may be for miners on the blockchain 6803 to process the first transaction request. The first transaction request may also be electronically signed by an administrator private key. The administrator private key may be mathematically related to the administrator public address.

The process may continue with step S7022. In step S7022, the administrator system 6801 obtains the first trade identification of the first trade. In embodiments, the administrator system 6801 may determine the first trade identification, as calculated by the security token smart contract, by monitoring transactions on the blockchain 6803 (as shown in connection with a step S7024 of FIG. 26B). In response to obtaining the first trade identification of the first trade, the administrator system 6801 may notify the first user (e.g. the user associated with user device 105*a*) and the second user (e.g. the user associated with user device 105*b*) of the first trade identification. In step S7026, the administrator system 6801 may send the first trade identification to the first user device 105*a* associated with the first user. Similarly, in step S7028, the administrator system 6801 sends the first trade identification to the second user device 105*b* associated with the second user.

In embodiments, as shown In step S7030, the first user device 105*a* may send a second transaction request from a first user public address (the first user public address being associated with the first user and the first user device 105*a*) to the first contract address 6807A via the underlying blockchain 6803. The second transaction request may include a second message, the second message including requests to the stable value token smart contract 6807B regarding a first transfer of a first amount of collateral. In embodiments, the second message may include the first trade information. In embodiments, the second transaction request may include second transaction fee information. The second transaction fee information may be for miners on the blockchain 6803 to process the second transaction request. In embodiments, the second message may also include a transfer request to the stable value smart contract to transfer the first amount of collateral in the form of stable value digital asset tokens 6807 from the first user public address to the second contract address 6805A. The transfer request, in embodiments, will be executed upon receipt of a first collateral request from the second contract address 6805A. In embodiments, the transfer request included in the second message may be executed upon receipt of a first collateral request from the administrator system 6801. The second transaction request is also electronically signed by a first user private key. The first user private key may be mathematically related to the first user public address.

In embodiments, the process described in FIG. 26B may continue with the process shown in connection with FIG. 26C. In embodiments, as shown In step S7032, the second user device may send a third transaction request from a second user public address (associated with the second user and the second user device 105*b*) to the second contract address 6805A via the underlying blockchain 6803. The third transaction request may include a third message including a second transfer request to the stable value token smart contract 6807B regarding a second transfer of the second amount of collateral from the second user public address to the second contract address 6807A. In embodiments, the third transaction request may further include third transaction fee information. The third transaction fee information, in embodiments, may be for miners on the blockchain 6803 to process the third transaction request. The second transfer request of the third message, in embodiments, will be executed upon receipt of a second collateral request from the second contract address 6805A. Alternatively, the second transfer request of the third message will be executed upon receipt of a second collateral request from the administrator system 6801. The third transaction request may also be electronically signed by a second user private key. The second user private key may is mathematically related to the second user public address.

The process may continue with a step S70121. In step S7034, the administrator system 6801 monitors transactions of the stable value digital asset tokens 6807 on the blockchain 6803 to determine that the second contract address 6805A has received at least the following: (1) the first amount of collateral in stable value digital asset tokens from the first user (e.g. the user associated with user device 105*a*); and (2) the second amount of collateral in stable value digital asset tokens from the second user (e.g. the user associated with user device 105*b*). In embodiments, the administrator system 6801 may further monitor the first contract address 6807A to determine whether the first amount of collateral is received at the second contract address 6805A and whether the second amount of collateral is received at the second contract address 6805A (as shown in connection with a step S7036 of FIG. 26C and step S7038 of FIG. 26C).

Alternatively, the administrator system 6801 may receive a collateral confirmation message confirming that the first amount of collateral and the second amount of collateral are received by the second contract address 6805A (as shown in connection with a step S7040 of FIG. 26C). In embodiments, either the first amount of collateral, the second amount of collateral, or both may not be received at the second contract address. If either or both are not received, in embodiments, the collateral confirmation message may indicate a lack of collateral, or the collateral confirmation message may not be sent.

Upon determining that the first amount of collateral from the first user (e.g. the user associated with user device 105*a*) and the second amount of collateral from the second user (e.g. the user associated with user device 105*b*) have both been received by the second contract address 6805A, In step S7042, the administrator system 6801 may send a fourth transaction request from the administrator public address to the second contract address 6805A via the underlying blockchain 6803. The fourth transaction request may include a fourth message including the first trade instructions and the first trade identification. In embodiments, the fourth transaction request may further include fourth transaction fee information. The fourth transaction fee information, in embodiments, may be for miners on the blockchain 6803 to process the fourth transaction request. The fourth transaction request may also be electronically signed by the administrator private key.

In embodiments, the second contract address 6805A may further include modules with instructions to: (1) generate a first collateral request when the third message is received by the second contract address 6805A; (2) send the first collateral request to the first contract address 6807A associated with the stable value token smart contract; (3) generate a second collateral request when the third message is received by the first contract address 6807A; (4) send the first collateral request to the first contract address 6807A associated with the stable value digital asset token smart contract; confirming that the first amount of collateral from the first user (e.g. a user associated with user device 105*a*) and the second amount of collateral from the second user (e.g. a user associated with user device 105*b*) has been received by the second contract address; and (5) sending a collateral confirmation message to the administrator public address.

Upon receiving the confirmation message, the administrator system 6801 may send a fourth transaction request from the administrator public address to the second contract address 6805A via the underlying blockchain 6803. The fourth transaction message may include a fourth message comprising first trade instructions and the first trade identification.

Referring now to FIG. 26D, in embodiments, step S7012 may being with a step S7042. In step S7042, the administrator system 6801 may send a first transaction request from the administrator public address to the second contract address 6805A via the underlying blockchain 6803. The first transaction request, in embodiments, may include a first message comprising requests to create a first trade between the first user and the second user in accordance with the security token smart contract 6805B. In embodiments, the first transaction request may further include first transaction fee information. The first transaction fee information, in embodiments, may be for miners on the blockchain 6803 to process the first transaction request. The first transaction request may also be electronically signed by the administrator private key. The administrator private key is mathematically related to the administrator public address.

In embodiments, as shown In step S7044, the first user device 105*a* may then send a second transaction request from a first user public address (the first user public address being associated with the first user and the first user device 105*a*) to the first contract address 6807A via the underlying blockchain 6803. The second transaction request may include a second message, the second message authorizing the stable value token smart contract 6807B to accept a request to transfer a first amount of collateral from the first user public address to the second contract address 6805A. In embodiments, the second transaction request may further include second transaction fee information. The second transaction fee information, in embodiments, may be for miners on the blockchain 6803 to process the second transaction request. The second transaction request may be electronically signed by the first user private key. The first user private key is mathematically related to the first user public address.

The process may continue at step S7046. At a step S7046, the second user device may send a third transaction request from a second user public address (associated with the second user and the second user device 105*b*) to the second contract address 6805A via the underlying blockchain 6803. The third transaction request may include a third message authorizing the stable value digital asset smart contract 6807B to accept a request to transfer a second amount of collateral from the second user public address to the second contract address 6805A. In embodiments, the third transaction request may further include third transaction fee information. The third transaction fee information, in embodiments, may be for miners on the blockchain 6803 to process the third transaction request. The third transaction request may be electronically signed by the second user private key. The second user private key is mathematically related to the second user public address.

In step S7048, the administrator system 6801 may send a fourth transaction request from the administrator public address to the first contract address 6807A via the underlying blockchain 6803. The fourth transaction request may include a fourth message including requests to: (1) transfer of the first amount of collateral of stable value digital asset tokens from the first user public address to the second contract address 6805A; and (2) transfer of a second amount of collateral of stable value digital asset tokens 6807 from the second user public address to the second contract address 6805A. The fourth transaction request may also be electronically signed by the administrator private key.

Alternatively, the second contract address 6805A may send a fourth transaction request to the first contract address 6807A via the underlying blockchain 6803. The fourth transaction request may similarly include a fourth message including requests to: (1) transfer of the first amount of collateral of stable value digital asset tokens 6807 from the first user public address to the second contract address 6805A; and (2) transfer of a second amount of collateral of stable value digital asset tokens from the second user public address to the second contract address 6805A.

In alternative embodiments, steps S7010 and S7012 (and accompanying substeps described above in connection with FIGS. 70B-D) may be replaced by a method of generating the security token contract associated with the security token 6805 associated with blockchain 6803 for the underlying digital asset. The method, in embodiments, may begin by an administrator 6801 generating the security token smart contract associated with a security token 6805 and second smart contract instructions 6805B associated with a second smart contract address 6805A associated with the blockchain 6803 for the underlying digital asset. In embodiments, the second smart contract instructions 6805B are saved in the blockchain 6803 for the underlying digital asset.

The second smart contract instructions 6805B may include one or more of the following: (1) first trade instructions for the security token smart contract; (2) fifth authorization instructions regarding transferring security tokens (which may be included in the transfer security tokens module 6920); (3) sixth authorization instructions regarding destroying security tokens (which may be included in the destroy security tokens module 6922); (4) seventh authorization instructions regarding transferring stable value tokens to the second contract address (which may be included in the authorize instructions module 6926); (5) eighth authorization instructions regarding transferring stable value tokens from the second contract address (which may be included in the authorize instructions module 6926); (6) calculating instructions regarding calculating excess collateral (which may be included in the calculate excess collateral module 6928); (7) generating collateral information instructions regarding excess collateral (which may be included in the generate collateral information message module 6930); and (8) sending collateral information message instructions regarding excess collateral (which may be included in the send collateral information message module 6932). In embodiments, the first trade instructions may include execution instructions to execute a first trade between the first user and the second user. The first trade, in embodiments, may be based on at least (1) the contract request or proposal and (2) the first user response.

In embodiments, once the security token contract is generated by an administrator 6801, the administrator 6801 may send the security token smart contract and associated second smart contract instructions 6805B to the second smart contract address 6805A via the blockchain 6803 for the underlying digital asset.

In embodiments, the first trade instructions may be implemented via the blockchain 6803 for the underlying digital asset by computers systems among the plurality of geographically distributed computer systems in the peer-to-peer network.

Referring back to FIG. 26A, the process of FIG. 26A may continue with step S7014. In step S7014, excess collateral from the first trade may be collected from the security token contract. Step S7014 is described in more detail in connection with FIGS. 70E-F.

Figure 26E:
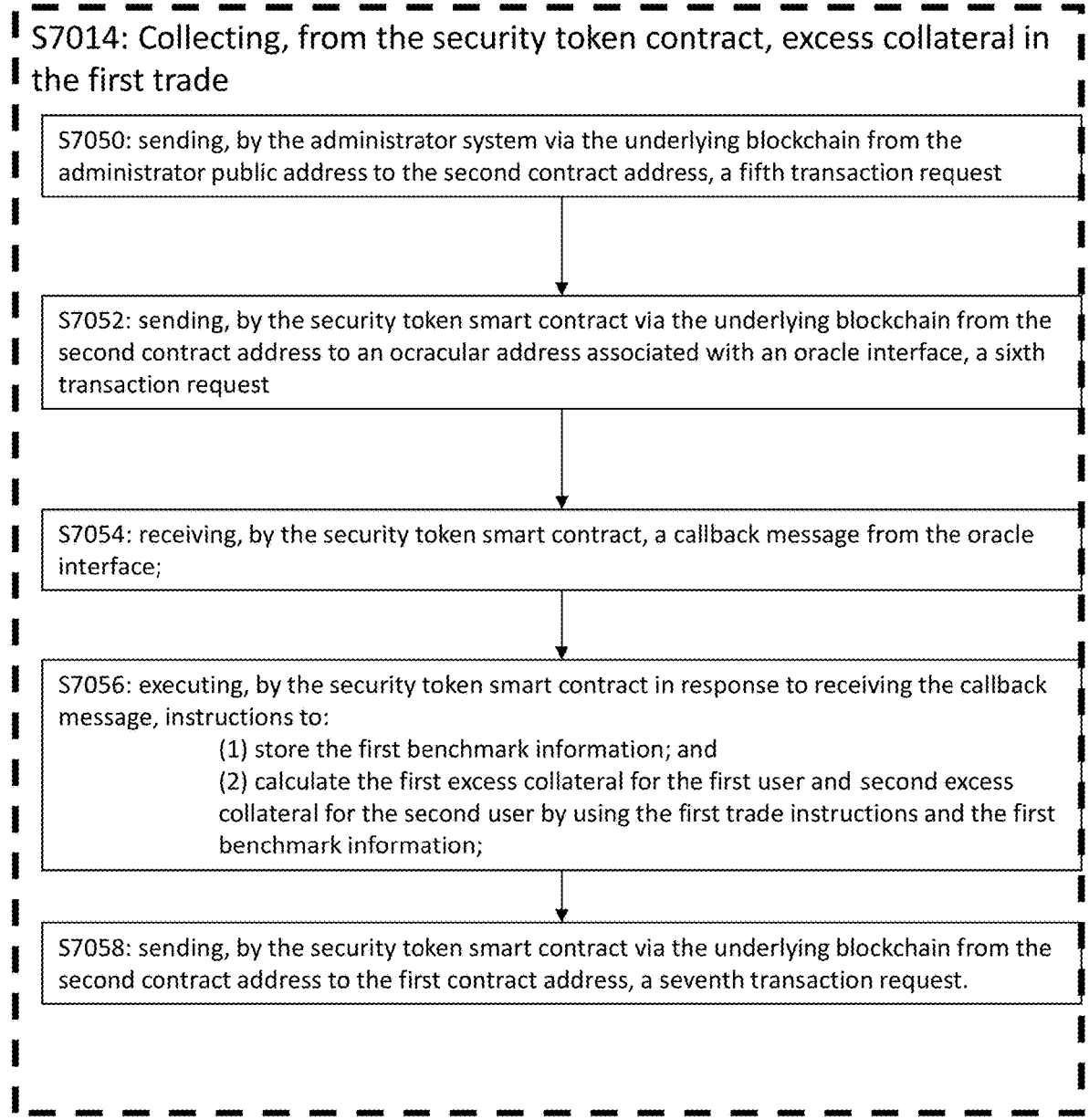
FIG. 26E is a flowchart of an exemplary sub-process of collecting excess collateral from a first user or a second user in a trade in accordance with exemplary embodiments.

Referring to FIG. 26E, in embodiments, collecting excess collateral may begin at step S7050. In step S7050, the administrator system 6801 may send a fifth transaction request from the administrator public address to the second contract address 6805A via the underlying blockchain 6803. In embodiments, the fifth transaction request may include a fifth message comprising requests for the security token smart contract 6805B to determine and distribute excess collateral for the first trade in accordance with the security token smart contract 6805B and the first trade instructions. The fifth transaction request may be electronically signed by the administrator private key. The administrator private key is mathematically related to the administrator public address.

In response to the requests contained in the fifth message, as shown in step S7052, the security token smart contract 6805B sends a sixth transaction request from the second contract address 6805A to an oracle address associated with an oracle smart contract on the blockchain 6803 associated with an oracle interface in contact with a trusted third party database. The sixth transaction request, in embodiments, may include a sixth message to obtain first benchmark data from the trusted third party database. In response to sending the sixth transaction request, in step S7054, the security token smart contract 6805B may receive a callback message from the oracle interface including the first benchmark information. In embodiments, access to the trusted third party database through the oracle smart contract may be limited to certain authorized or approved addresses on the blockchain. In embodiments, as described further below, a whitelist of authorized (or approved) requesting addresses may be provide in which the first benchmark information is provided only in response to requests from an authorized address. In embodiments, the whitelist of authorized requesting addresses may be updated. In embodiments, the administrator system may update the whitelist of authorized requesting addresses to reflect the address of the security token contract that is provided using the process of the present application.

In embodiments, the whitelist of authorized addresses may be included at the oracle smart contract address. In embodiments, the oracle smart contract address may include authorization instructions to request the first contract address only when the requester address is one of the addresses on the whitelist. In embodiments, the oracle smart contract may include authorization instructions related to an update key pair for updating the whitelist of authorized addresses to allow for the white list to be updated.

In embodiments, the whitelist of authorized addresses may be provided in memory element associated with the trusted third party database. In embodiments, the trusted third party database will not provide the first benchmark information to the oracle contract unless the requester address is included in the whitelist of authorized addresses.

In response to receiving a callback message, in step S7056, the security token smart contract 6805B executes instructions to: (1) store the first benchmark information and (2) calculate the excess collateral for the first user (e.g. the user associated with user device 105a) and the second excess collateral for the second user (e.g. the user associated with user device 105b) by using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7058, the security token smart contract 6805B sends a seventh transaction request from the second contract address 6805A to the first contract address 6807A via the underlying blockchain 6803. The seventh transaction request, in embodiments, may include a seventh message requesting the stable value token smart contract 6807B to transfer: (1) the first excess collateral in stable value digital asset token from the second contract address 6805A to the first user public address (associated with the first user and user device 105a), to the extent the first excess collateral is greater than zero; and (2) the second excess collateral in stable value digital asset token from the second contract address 6805A to the second user public address (associated with the second user and user device 105b).

Referring to FIG. 26F, in embodiments, collecting excess collateral may begin at step S7060 where an oracle service sends a fifth transaction request from an oracle address associated with an oracle interface to the second contract address 6805A via the underlying blockchain 6803. In embodiments, the fifth transaction request may include a fifth message comprising first benchmark information. In response to receiving the fifth message, in step S7062 the security token contract 6805B executes instructions to store first benchmark information.

The process in FIG. 26F may continue at step S7064. In step S7064, the administrator system 6801 may send a sixth transaction request from the administrator public address to the second contract address 6805A via the underlying blockchain 6803. The sixth transaction request, in embodiments, may include a sixth message comprising requests to the security token smart contract 6805B to determine and distribute excess collateral for the first trade in accordance with the security token smart contract 6805B and the first contract instructions. The sixth transaction request may also be electronically signed by an administrator private key (located in key information data base 6801C of FIG. 24). The administrator private key is mathematically related to the administrator public address. In embodiments, the sixth transaction request may be sent by user device 105a from the first user public address (associated with a first user and user device 105a) to the second contract address 6805A. In embodiments, where the sixth transaction request is sent by user device 105a, the sixth transaction request may also be electronically signed by a first user private key. The first user private key is mathematically related to the first user public address. Furthermore, in embodiments, the sixth transaction request may be sent by user device 105b from the second user public address (associated with a second user and user device 105b) to the second contract address 6805A. In embodiments, where the sixth transaction request is sent by user device 105b, the sixth transaction request may also be electronically signed by a second user private key. The second user private key is mathematically related to the second user public address.

In response to the requests contained in the sixth message, in step S7014'D, the security token smart contract 6805B executes instructions via the blockchain 6803 to calculate first excess collateral for the first user (e.g. a user associated with user device 105*a*) and second excess collateral for the second user (e.g. a user associated with user device 105*b*) using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7014'E, the security token smart contract 6805B sends a seventh transaction request from the second contract address 6805A to the first contract address 6807A via the underlying blockchain 6803. The seventh transaction request, in embodiments, may include a seventh message requesting the stable value token smart contract 6807B to transfer: (1) the first excess collateral in stable value token from the second contract address 6805A to the first user public address (associated with the first user and user device 105*a*), to the extent the first excess collateral is greater than zero; and (2) the second excess collateral in stable value token from the second contract address 6805A to the second user public address (associated with the second user and user device 105*b*). As in step S7014E, if there is excess collateral, the second contract address 6805A sends the excess collateral to the user of which that excess collateral belongs.

In embodiments, such as the embodiments where a third user response and fourth user response are received by the administrator system and matched, the administrator system may set up a second trade between the fourth user and the fifth user. This process of setting up a trade between two users may be similar to the process described in connection with FIGS. 26B-26D, the same description applying herein.

In embodiments, the steps within the process described above in connection with FIGS. 26A-26F may be rearranged or omitted.

In embodiments, a separate security token smart contract may be generated and published to the underlying blockchain for each separate trade.

For example, in embodiments, generating a security token smart contract between a first user and a second user may be implemented, in accordance with the following example. In embodiments, generating a security token smart contract between a first user and a second user may begin with an administrator system associated with an administrator 6809 of a security token smart contract receiving a contract proposal. In embodiments, the security token smart contract is maintained on a distributed public transaction ledger maintained by a plurality of geographically distributed computer systems in a peer-to-peer network in the form of a blockchain 6803 of an underlying digital asset. In embodiments, the underlying digital asset may be a digital math-based asset, Ether, or Neo, to name a few. In embodiments, the contract proposal includes: first user information associated with a first user device 105*a* that is associated with a first user; and first contract information including at least the following contract parameters 6801B: an inception date 6902; an inception value 6904; at least one benchmark 6906; a contract duration 6908; at least one collateral requirement 6910; a notional value of the smart contract 6912; and first side information, including identification of a first leg of the contract (e.g. the side information including a leg of a contract described in FIGS. 27C-27F—ref. nos. 7138, 7144, 7154, 7160 respectively). In embodiments, the first user information further includes a first user public address (e.g., Alice Public Address 7146 described above in reference to FIG. 27D) associated with the blockchain 6803 of the underlying digital asset. In embodiments, the first user public address corresponds to a first user private key that is mathematically related to the first user public address. In embodiments, the first contract information further includes at least one of the following: derivative type information; early termination rules 6914; a second benchmark 6916; asset identification information; pricing model information; and volatility information. In embodiments, the first contract information further includes first collateral information in stable value tokens (e.g., 100 Stable Value Coins 7148 described above in reference to FIG. 27D). In embodiments, the first contract information further includes second collateral information in stable value tokens. In embodiments, the first contract information includes first transaction fee information. In embodiments, the administrator system may generate graphical user interface information including at least one prompt for the first user to provide the contract proposal. The administrator system may then send the graphical user interface information to the first user device. In embodiments, the administrator system may then receive the contract proposal in response to the at least one prompt.

In embodiments, the method continues with the administrator system receiving at least one indication of interest (e.g., second indication of interest 7150 described above in reference to FIG. 27E). In embodiments, the at least one indication of interest includes at least a first user response, from a second user device 105*b* associated with a second user. In embodiments, the first user response includes second user information associated with the second user. In embodiments, the second user information further includes a second user public address (e.g., Bob Public Address 7162) associated with the blockchain 6803 of the underlying digital asset. In embodiments, the second user public address corresponds to a second user private key that is mathematically related to the second user public address. In embodiments, the first user response further includes second side information which may include an identification of a second leg of the contract (e.g. the side information including a leg of a contract described in FIGS. 27C-27F—reference numbers 7138, 7144, 7154, and 7160 respectively).

In embodiments, the method continues with the administrator system matching the first contract information and the first user response. Matching, by the administrator system, may be similar to S7006 of FIG. 26A.

In embodiments, the method continues with an administrator system providing a stable value token smart contract associated with a stable value token 6807 and first smart contract instructions 6807B for a digital asset token. The digital asset token, in embodiments, may be associated with a first smart contract address 6807A that may be associated with the blockchain 6803 for the underlying digital asset. In embodiments, the first smart contract instructions 6807B are saved in the blockchain 6803 for the underlying digital asset. In embodiments, the first smart contract instructions 6807B include: first authorization instructions regarding creating stable value tokens (which may be included in the create stable value token module 6934); second authorization instructions regarding transferring stable value tokens (which may be included in the transfer stable value token module 6936); third authorization instructions regarding destroying stable value tokens (which may be included in the destroy stable value token module 6938); and fourth authorization instructions regarding functions associated with the stable value token (which may be included in the authorization instruction module 6940). In embodiments, the first smart contract instructions of the first stable value smart contract are associated with more than one smart contract address. For example, Smart Contract Address 6807A may be associated with a plurality of smart contract addresses associated with the blockchain 6803 for the underlying digital asset.

In embodiments, the method continues with the administrator system generating the security token smart contract, which may be associated with a security token 6805 and second smart contract instructions 6805B which may be associated with a second smart contract address 6805A which may be associated with the blockchain for the underlying digital asset. In embodiments, the second smart contract instructions 6805B are saved in the blockchain 6803 for the underlying digital asset. In embodiments, the second smart contract instructions 6805B include: first trade instructions for the security token smart contract (which may be similar to step S7016 described above in reference to FIG. 26B), fifth authorization instructions regarding transferring security tokens (which may be included in transfer security tokens module 6920); sixth authorization instructions regarding destroying security tokens (which may be included in destroy security tokens module 6922); seventh authorization instructions regarding transferring stable value tokens to the second contract address (which may be included in authorize instructions module 6926); eighth authorization instructions regarding transferring stable value tokens from the second contract address (which may be included in authorize instructions module 6926); and calculating instructions regarding calculating excess collateral (which may be included in calculate excess collateral module 6928). In embodiments, the first trade instructions include execution instructions to execute a first trade between the first user and the second user (which may be included in authorize instructions module 6926). In embodiments, the first trade is based on at least: the contract proposal and the first user response.

In embodiments, the method continues with the administrator system sending the security token smart contract and associated second smart contract instructions. In embodiments, the security token smart contract and associated second smart contract instructions 6805B may be sent via the blockchain 6803 for the underlying digital asset to the second smart contract address 6805A.

In embodiments, the method may continue with the second smart contract address 6805A receiving a first amount of collateral. In embodiments, the first amount of collateral may be a first amount of stable value tokens associated with the first user as collateral. In embodiments, the first amount of stable value tokens associated with the first user is based on the at least one collateral requirement 6910. In embodiments, the first user device 105a may send a first message. The first message may include a request to transfer the first amount of collateral from the first user public address to the second smart contract address. In embodiments, the first message may be sent via the underlying blockchain 6803 from the first user public address associated with the underlying blockchain 6803 to the first smart contract address 6807A associated with the underlying blockchain 6803. In embodiments, the first user device 105a may send a second message to the first smart contract address 6807A. The second message may include authorization for the security token smart contract to request a transfer of the first amount of collateral. In embodiments, the administrator system may send a third message including instructions to send a request from the second smart contract address 6805A to the first smart contract address 6807A. The request, in embodiments, may be for the first amount of collateral to be transferred from the first user public address to the second smart contract address 6805A. In embodiments, the third message is sent by the administrator system via the underlying blockchain 6803 to the second smart contract address 6805A.

In embodiments, the method may continue with the second smart contract address 6805A receiving a second amount of collateral. In embodiments, the second amount of collateral may be a second amount stable value tokens associated with the second user as collateral. In embodiments, the second amount of stable value tokens associated with the second user is based on the at least one collateral requirement 6910. In embodiments, the second user device 105b may send a fourth message including a request. In embodiments, the request may be to transfer the second amount of collateral from the second user public address to the second smart contract address 6805A. In embodiments, the fourth message may be sent via the underlying blockchain 6803 from the second user public address associated with the underlying blockchain 6803 to the first smart contract address 6807A associated with the underlying blockchain 6803. In embodiments, the second user device 105b may send a fifth message to the first smart contract address 6807A. The fifth message, in embodiments, may include authorization for the security token smart contract to request a transfer of the second amount of collateral via the blockchain 6803. In embodiments, the administrator system may send a sixth message. The sixth message, in embodiments, may include instructions to send a request. The request, in embodiments, may be for the second amount of collateral to be transferred from the second user public address to the second smart contract address 6805A. In embodiments, the sixth message is sent via the underlying blockchain 6803 to the second smart contract address 6805A.

In embodiments, the first trade instructions are implemented via the blockchain for the underlying digital asset by computer systems among the plurality of geographically distributed computer systems in the peer-to-peer network. In embodiments, the first trade instructions are implemented as a result of a message sent from the administrator system via the blockchain 6803 to the second smart contract address 6805A.

In embodiments, the method may continue with the first collateral amount being recalculated based on the at least one collateral requirement 6910 and current benchmark information (this may be similar to steps S6310 and S6311, both described above in reference to FIG. 63C). In embodiments, the recalculation may be performed by the first user device 105a. In embodiments, the recalculation is performed by the administrator system. In embodiments, a first additional collateral amount may be determined based on a difference between the recalculated first collateral amount and the first collateral amount. The first additional collateral amount may then be received at the second smart contract address 6805A. In embodiments, the first additional collateral may not be received. In embodiments, the administrator system may generate an alert. The alert, in embodiments, may include the first additional collateral amount. Once generated, the administrator system may send the alert to the first user device 105a. In embodiments, the alert may be generated and sent by security token smart contract to the first user device 105a (e.g., using the generate collateral information message module 6930 and the send collateral information message module 6932). Once the alert regarding the first additional collateral amount is received by the first user device 105a, the method may continue with the administrator system monitoring the second contract address 6805A on the blockchain 6803 associated with the underlying digital asset (this may be similar to step S7034 described above in reference to FIG. 26C). The administrator system may then, in embodiments, determine whether the first additional collateral amount is received by the second contract address 6805A (this may be similar to step S7034 described above in reference to FIG. 26C). If the first additional collateral is not received by the second contract address 6805A, the administrator system may generate a default notification. The default notification may be sent by the administrator system to at least one of the first user device 105a, the second user device 105b, and the second smart contract address 6805A. In embodiments, the default notification may be generated and sent by security token smart contract to at least one of the first user device 105a and the second user device 105b (e.g., using the generate collateral information message module 6930 and the send collateral information message module 6932). After the default notification is sent, the administrator system, in embodiments, may generate a seventh message. The seventh message, in embodiments, may include a request to transfer the first collateral amount and the second collateral amount in accordance with the first trade instructions. The seventh message may be sent by the administrator system to the second smart contract address 6805A. In embodiments, the transfers of the first collateral amount and the second collateral amount are implemented by the plurality of geographically distributed computer systems in the peer-to-peer network.

In embodiments, the method may continue with the second collateral amount being recalculated based on the at least one collateral requirement 6910 and current benchmark information (this may be similar to steps S6310 and S6311, both described above in reference to FIG. 63C). In embodiments, the recalculating step is performed by the second user device 105b. In embodiments, the recalculating step is performed by the administrator system. In embodiments, a second additional collateral amount may be determined based on a difference between the recalculated second collateral amount and the second collateral amount. In embodiments, the second additional collateral amount is received at the second smart contract address 6805A. In embodiments, the second additional collateral may not be received and the administrator system may generate an alert. The alert, in embodiments, may include the second additional collateral amount. Once generated, the administrator system may send the alert to the second user device 105b. In embodiments, the alert may be generated and sent by security token smart contract to the second user device 105b (e.g., using the generate collateral information message module 6930 and the send collateral information message module 6932). Once the alert regarding the second additional collateral amount is received by the second user device 105b, the method may continue with the administrator system monitoring the second smart contract address 6805A on the blockchain 6803 associated with the underlying digital asset (this may be similar to step S7034 described above in reference to FIG. 26C). The administrator system may monitor the second smart contract address 6805A to determine whether the second additional collateral amount is received by the second contract address (this may be similar to step S7034 described above in reference to FIG. 26C). If the administrator system determines that the second additional collateral amount is not received by the second smart contract address 6805A, the administrator system may generate a default notification. The default notification may be sent by the administrator system to at least one of: the first user device 105a, the second user device 105b, and the second smart contract address 6805A. In embodiments, the default notification may be generated and sent by security token smart contract to at least one of the first user device 105a and the second user device 105b (e.g., using the generate collateral information message module 6930 and the send collateral information message module 6932). After sending the default notification, the administrator system may generate an eighth message. The eighth message, in embodiments, may include a request to transfer the first collateral amount and the second collateral amount in accordance with the first trade instructions. The eighth message, In embodiments, may be sent by the administrator system to the second smart contract address 6805A, where transfers of the first collateral amount and the second collateral amount are implemented by the plurality of geographically distributed computer systems in the peer-to-peer network.

In embodiments, the method may include the administrator system determining, at the end of the contract duration, a payout amount based on at least the first trade instructions. The payout instructions may be generated by the administrator system. In embodiments, the payout instructions may be based at least on the first side information and the second side information (e.g. the first and/or second side information including a leg of a contract described in FIGS. 27C-27F—ref. nos. 7138, 7144, 7154, 7160 respectively). The administrator system may, in embodiments, send the payout instructions to the second contract address 6805A via the blockchain 6803 for the underlying digital asset. The payout instructions may provide the payout amount to one of the first user public address and the second user public address. The payout amount, in embodiments, being based on at least the first trade instructions. In embodiments, the payout instructions are implemented by the plurality of geographically distributed computer systems in the peer-to-peer network.

In embodiments, the method may include the administrator system collecting excess collateral from the first trade (this may be similar to S7014 described above in reference to FIGS. 26A, 26E, and 26F). The administrator system may collect excess collateral by first sending a ninth message to the second smart contract address 6805A via the underlying blockchain 6803 for the underlying digital asset. The ninth message may include, in embodiments, requests for the security token to: determine first excess collateral for the first trade in accordance with the security token smart contract (this may be similar to S7014 described above in reference to FIGS. 26A, 26E, and 26F) and the first trade instructions; determine second excess collateral for the first trade in accordance with the security token smart contract and the first trade instructions (this may be similar to S7014 described above in reference to FIGS. 26A, 26E, and 26F); distribute the first excess collateral for the first trade in accordance with the security token smart contract and the first trade instructions to the first user address (this may be similar to S7014 described above in reference to FIGS. 26A, 26E, and 26F); and distribute the second excess collateral for the first trade in accordance with the security token smart contract and the first trade instructions to the second user address (this may be similar to S7014 described above in reference to FIGS. 26A, 26E, and 26F).

In embodiments, the administrator system may return the remaining collateral from the first trade (this may be similar to S7014 described above in reference to FIGS. 26A, 26E, and 26F). The remaining collateral, in embodiments, may be from the security token smart contract. In embodiments, returning the remaining collateral may begin by the administrator system sending a tenth message to the second smart contract address 6805. The tenth message, in embodiments, may include requests for the security token smart contract to: determine first remaining collateral for the first trade in accordance with the security token smart contract and the first trade instructions (e.g. using calculate excess collateral module 6928); determine second remaining collateral for the first trade in accordance with the security token smart contract and the first trade instructions (e.g. using calculate excess collateral module 6928); distribute the first remaining collateral for the first trade in accordance with the security token smart contract and the first trade instructions; and distribute the second remaining collateral for the first trade in accordance with the security token smart contract and the first trade instructions (this may be similar to S7014 described above in reference to FIGS. 26A, 26E, and 26F).

In embodiments, a first benchmark value 6906 may be determined. The first benchmark value 6906 may be determined by the security token smart contract sending, via the blockchain 6803 for the underlying digital asset, a request. The request may be sent from the second smart contract address 6805A to an oracle smart contract at a third contract address associated with the blockchain 6803 for the underlying digital asset (this may be similar to S7014 described above in reference to FIGS. 26A, 26E, and 26F). The oracle smart contract may be associated with an oracle interface in contact with an authorized third party database. The request may include an eleventh message (this may be similar to S7014 described above in reference to FIGS. 26A, 26E, and 26F). The eleventh message may include a request to obtain first benchmark value 6906 (this may be similar to S7014 described above in reference to FIGS. 26A, 26E, and 26F). In response to the eleventh message, the oracle smart contract may send the first benchmark value 6906 to the security token smart contract (this may be similar to S7014 described above in reference to FIGS. 26A, 26E, and 26F). In response to receiving the first benchmark value, the security token smart contract may execute instructions to store the first benchmark value 6906.

In the case where the first excess collateral is greater than zero the first excess collateral may be calculated for the first user (this may be similar to S7014 described above in reference to FIGS. 26A, 26E, and 26F). In the case where the second excess collateral is greater than zero, the second excess collateral may be calculated for the second user (this may be similar to S7014 described above in reference to FIGS. 26A, 26E, and 26F). The first and second excess collateral, in embodiments, may be calculated using the first trade instructions and the first benchmark information 6906 (this may be similar to S7014 described above in reference to FIGS. 26A, 26E, and 26F). Once the excess collateral is calculated, the second smart contract address may send a twelfth message to the first smart contract address. The twelfth message may include a request for the stable value token smart contract to transfer the excess collateral—the first excess collateral being requested to transfer if greater than zero and the second excess collateral being requested to transfer if greater than zero (this may be similar to S7014 described above in reference to FIGS. 26A, 26E, and 26F).

In embodiments, a method of issuing electronic payments using a fiat-backed digital asset on a digital asset security token comprising the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a distributed transaction ledger maintained by a plurality of geographically distributed computer systems in a peer-to-peer network; (b) providing a fiat-backed digital asset database stored on the distributed transaction ledger maintained by the plurality of geographically distributed computer systems in the peer-to-peer network, wherein the fiat-backed digital asset database comprises a log of fiat-backed digital assets including: (i) a second set of digital asset addresses including a second respective digital asset address for each respective fiat-backed digital asset holder; (ii) a respective fiat-backed digital asset amount for each respective fiat-backed digital asset holder, wherein the fiat-backed digital assets are issued by a fiat-backed digital asset issuer; (c) obtaining, by a trusted entity system associated with a trusted entity, a first sum of fiat-backed digital assets, wherein the first sum of fiat backed digital assets are backed by assets comprising at least a second amount of a first fiat maintained by a custodian; (d) accessing, by the trusted entity system, the digital asset security token database to determine: (i) each respective digital asset address of the first set of digital asset addresses for each respective digital asset security token holder; and (ii) the respective digital asset security token amount associated with each respective digital asset address; (e) determining a respective payment amount in fiat-backed digital assets to be made to each respective digital asset address of the first set of digital asset addresses based at least in part on the fixed notional amount, the first sum of fiat-backed digital assets and the respective digital asset security token amount associated with each respective digital asset address of the first set of digital asset addresses; (f) generating, by the trusted entity system, transaction instructions to transfer the respective payment amount of fiat-backed digital assets to each respective digital asset address of the first set of digital asset addresses from the issuer account to the security token holder accounts; (g) publishing, by the trusted entity system to the peer-to-peer network, transaction instructions associated with crediting the respective payment amount of fiat-backed digital assets to each respective digital asset address of the first set of digital asset addresses where ownership of each digital asset security token remains the same; (h) notifying, by the trusted entity system, each digital asset address of the first set of the digital asset addresses of each respective transfer of fiat-backed digital assets to each respective digital asset address of the first set of digital asset addresses.

In embodiments, the peer-to-peer network is the Ethereum network.

In embodiments, the peer-to-peer network is the Bitcoin network.

In embodiments, the peer-to-peer network is the Libra network.

In embodiments, the peer-to-peer network is the Stellar network.

In embodiments, the trusted entity is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the peer-to-peer network is based on a mathematical protocol for proof of work. In embodiments, the mathematical protocol is open source. In embodiments, the peer-to-peer network is based on a mathematical protocol for proof of stake. In embodiments, the mathematical protocol is open source.

In embodiments, the peer-to-peer network is based on a cryptographic mathematical protocol.

In embodiments, the method further includes a step of publishing, by the trusted entity system to a side ledger, the transaction instructions associated with crediting the respective payment amount of fiat-backed digital assets to each respective digital asset address of the first set of digital asset addresses and the publishing step (g) includes publishing the transaction instructions from the side ledger to the distributed asset ledger periodically or aperiodically.

In embodiments, the method further includes the steps of: receiving, at the digital asset security token issuer system, from at least one digital asset security token holder, a payment request prior to the obtaining step (c), the payment request including: (i) the digital asset address of the digital asset security token holder; and (ii) a request to transfer a payment amount of fiat-backed digital assets to the digital asset address of the digital asset security token holder; and confirming, at the digital asset security token issuer system, that: (i) the digital asset address of the digital asset security token holder is valid; (ii) the digital asset security token amount of digital asset security tokens associated with the address of the digital asset security token holder is more than zero; and (iii) the digital asset token security holder is entitled to payment.

In embodiments, the digital asset security token database is maintained and stored on the plurality of geographically distributed computer systems in the peer-to-peer network.

In embodiments, the digital asset security token database is maintained on a sidechain, separate from the peer-to-peer network, wherein information on the sidechain is published and stored on the peer-to-peer network periodically or aperiodically.

In embodiments, the generating step (f) includes generating, by the trusted entity system, transaction instructions for the first sum of fiat-backed digital assets by updating the fiat-backed digital asset database to reserve fiat-backed digital assets in the amount of the first sum.

In embodiments, the payment information relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the peer-to-peer network uses a *byzantine* fault tolerance protocol as a consensus mechanism.

In embodiments, the first sum of fiat-backed digital assets are backed by assets further comprising at least a third amount of a second fiat.

In embodiments, the assets further comprise at least one treasury. In embodiments, the assets further comprise one or more of the following types of fiat: (i) U.S. Dollars; (ii) Yen; and (iii) Euro.

In embodiments, the fiat-backed digital assets are issued by a fiat-backed digital asset issuer through one or more nodes associated with the issuer.

In embodiments, the digital asset address of the digital asset security token holder is generated by applying a hash algorithm to a public key associated with the digital asset security token holder.

In embodiments, the method further includes, after step (e) and before step (f), generating, by the trusted entity system, transaction instructions for the first sum of fiat-backed digital assets by updating the fiat-backed digital asset database to reflect the addition of new fiat-backed digital assets in the amount of the first sum and the corresponding digital asset addresses associated with each new fiat-backed digital asset.

In embodiments, a method of withdrawing an amount of a fiat-backed digital asset from a digital asset exchange computer system in exchange for fiat, wherein the method comprises the steps of: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic withdraw request comprising the steps of: (1) receiving, by the digital asset exchange computer system from the first user device, a first electronic request to withdraw the amount of the fiat-backed digital asset, wherein the fiat-backed digital asset are tied to a distributed transaction ledger which is maintained on a peer to peer network that includes a plurality of geographically distributed computer systems; (2) in response to the first electronic withdraw request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user; (3) generating, by the digital asset exchange computer system, second graphical user interface information including at least the first fiat account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of fiat-backed digital asset to be withdrawn; and (B) a destination public address on the distributed transaction ledger to transfer the first amount of fiat-backed digital asset; and (c) processing, by the digital asset exchange computer system, the withdraw request by the steps of: (1) calculating, by the digital asset exchange computer system, a second amount of fiat based on the first amount of fiat-backed digital asset, where the second amount of fiat is determined based on an exchange rate of fiat-backed digital asset to fiat; (2) comparing, by the digital asset exchange computer system, the first amount of available fiat of the first user to the second amount of fiat to determine that the second amount of fiat is less than or equal to the first amount of available fiat of the first user; (3) determining, by the digital asset exchange computer system, a third amount of fiat associated with an updated amount of available fiat of the first user, wherein the third amount of fiat equals the first amount of available fiat of the first user less the second amount of fiat; (4) updating, by the digital asset exchange computer system, the fiat account ledger database to reflect that the third amount of fiat is the updated first amount of available fiat of the first user; (5) updating, by the digital asset exchange computer system, a fiat-backed digital asset issuer fiat ledger, to increase a balance of fiat associated with the fiat-backed digital asset ledger by the second amount of fiat; (6) generating, by the digital asset exchange computer system, a first transaction request for the distributed transaction ledger, from a first digital asset exchange public key address on the distributed transaction ledger, which is associated with a first digital asset exchange private key, which is stored in the computer readable member accessible by the digital asset exchange computer system, to a first contract address associated with a fiat-backed digital asset issuer, a first message including: i. a request to obtain in a first designated public address of the first user the first amount of fiat-backed digital asset, wherein the first transaction request is signed with a digital signature generated using the digital asset exchange private key; (7)transmitting, by the digital asset exchange computer system to the peer-to-peer network via the Internet, the first transaction request; and (8) confirming, by the digital asset exchange computer system based on reference to the distributed transaction ledger, that the balance of fiat-backed digital asset in the first designated public address of the first user includes the first amount of fiat-backed digital asset.

In embodiments, the determining step (a)(2) further determines that the first user is a registered user of the digital asset exchange.

In embodiments, the digital asset exchange is licensed by a government regulatory authority.

In embodiments, the fiat-backed digital asset is a fiat-backed digital asset token. In embodiments, the fiat-backed digital asset token is Gemini Dollars.

In embodiments, the fiat-backed digital asset is a stable value digital asset token.

In embodiments, the fiat-backed digital asset is Libra.

In embodiments, the peer-to-peer network uses a proof of stake consensus protocol.

In embodiments, the peer-to-peer network uses a proof of work consensus protocol.

In embodiments, the peer-to-peer network uses a *byzantine* fault tolerance consensus protocol.

In embodiments, the peer-to-peer network is the Ethereum Network.

In embodiments, the peer-to-peer network is the Neo Network.

In embodiments, the peer-to-peer network is the Libra Network.

In embodiments, the peer-to-peer network is the Stellar Network.

In embodiments, the exchange rate is one fiat-backed digital asset is equal to one U.S. dollar.

In embodiments, the exchange rate is one hundred fiat-backed digital assets is equal to one U.S. dollar.

In embodiments, the first designated public address of the first user is generated by applying a hash algorithm to a public key associated with the first user.

In embodiments, the fiat-backed digital assets are backed by a plurality of assets comprising at least: (a) a fourth amount of a first type of fiat maintained by a custodian; and (b) a fifth amount of a second type of fiat maintained by the custodian. In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and (c) Euro. In embodiments, the first type of fiat and the second type of fiat are the same.

In embodiments, the updating step (c)(5) further comprises transferring the second amount of fiat from a digital asset exchange fiat account to a fiat-backed digital asset issuer fiat account.

In embodiments, the updating step (c)(5) further comprises periodically transferring fiat between the digital asset exchange fiat account and the fiat-backed digital asset issuer fiat account.

In embodiments, the request to obtain in the first designated public address of the first user the first amount of fiat-backed digital assets includes a request to generate the first amount of fiat-backed digital assets at the first designated public address of the first user.

In embodiments, the request to obtain the first designated public address of the first user the first amount of fiat-backed digital assets includes a request to transfer the first amount of fiat-backed digital assets from a fiat-backed digital asset issuer public address to the first designated public address of the first user.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

In embodiments, a method of depositing an amount of fiat-backed digital asset in exchange for fiat, wherein the method comprises the steps of: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic deposit request comprising the steps of: (1) receiving, by the digital asset exchange computer system from the first user device, a first electronic request to deposit a first amount of fiat-backed digital assets, wherein the fiat-backed digital assets are tied to a an distributed transaction ledger which is maintained on a peer-to-peer network that includes a plurality of geographically distributed computer systems; (2) in response to the first electronic request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user and from the distributed transaction ledger, first fiat-backed digital asset account balance information if the first user indicating a second amount of fiat based digital assets available for the first user; (3) obtaining, by the digital asset exchange computer system, a destination address; (4) generating, by the digital asset exchange computer system, second graphical user interface information including at least the first fiat account balance information the first fiat-backed digital account balance information and the destination address; (5) transmitting, by the digital asset exchange computer system to the first user device, the second graphical user interface information; and (6) receiving, by the digital asset exchange computer system from the first user device, a second electronic deposit request comprising at least: (A) the first amount of fiat-backed digital assets to be deposited; (B) a first designated public address of the first user on the distributed transaction ledger from which the first amount of fiat-backed digital assets will be transferred; and (C) a digital signature based on a first designated private key of the first user, wherein the first designated private key is associated with the first designated public address; and (c) processing, by the digital asset exchange computer system, the second electronic deposit request by the steps of: (1) calculating, by the digital asset exchange computer system, a second amount of fiat based on the first amount of fiat-backed digital assets, wherein the second amount of fiat is determined using an exchange rate of fiat-backed digital assets to fiat; (2) comparing, by the digital asset exchange computer system, the first amount of fiat-backed digital assets to the second amount of fiat-backed digital assets available of the first user to determine that the first amount of fiat-backed digital assets is less than or equal to the second amount of fiat-backed digital assets; (3) determining, by the digital asset exchange computer system, a third amount of fiat associated with an updated amount of available fiat of the first user, wherein the third amount of fiat equals the first amount of fiat available of the first user plus the second amount of fiat; (4) updating, by the digital asset exchange computer system, the fiat account ledger database to reflect that the third amount of fiat is the updated amount of available fiat of the first user; (5) generating, by the digital asset exchange computer system, a first transaction request for the peer-to-peer network, from a first digital asset exchange public key address on the peer-to-peer network, which is associated with a first digital asset exchange private key, which is stored in the computer readable member accessible by the digital asset exchange computer system, to a first contract address associated with a fiat-backed digital asset issuer, a first message including: i. a request to obtain from the first designated public address of the first user the first amount of fiat-backed digital assets and provide them to the destination address; and ii. a request to destroy the first amount of fiat-backed digital assets, wherein the first transaction request is signed with a digital signature generated based on the digital asset exchange private key of the digital asset exchange; (6) updating, by the digital asset exchange computer system, a fiat-backed digital asset issuer fiat ledger, to decrease a balance of fiat by the second amount of fiat; (7) transmitting, by the digital asset exchange computer system to the peer-to-peer network via the Internet, the first transaction request; and (8) confirming, by the digital asset exchange computer system based on reference to the distributed transaction ledger, that the first amount of fiat-backed digital assets are not present at the first designated public address of the first user.

In embodiments, the determining step (a)(2) further determines that the first user is a registered user of the digital asset exchange.

In embodiments, the digital asset exchange is licensed by a government regulatory authority.

In embodiments, the peer-to-peer network is the Ethereum Network.

In embodiments, the peer-to-peer network is the Neo Network.

In embodiments, the exchange rate is one fiat-backed digital asset is equal to one U.S. dollar.

In embodiments, the exchange rate is one hundred fiat-backed digital assets is equal to one U.S. dollar.

In embodiments, the updating step (c)(6) further comprises transferring the second amount of fiat from a digital asset exchange fiat account to a first user fiat account.

In embodiments, the updating step (c)(6) further comprises periodically transferring fiat between the digital asset exchange fiat account and the fiat-backed digital asset issuer fiat account.

In embodiments, the fiat-backed digital asset is a fiat-backed digital asset token. In embodiments, wherein the fiat-backed digital asset token is Gemini Dollars.

In embodiments, the fiat-backed digital asset is a stable value digital asset token.

In embodiments, the fiat-backed digital asset is Libra

In embodiments, the peer-to-peer network uses a proof of stake consensus protocol.

In embodiments, the peer-to-peer network uses a proof of work consensus protocol.

In embodiments, the peer-to-peer network uses a *byzantine* fault tolerance consensus protocol.

In embodiments, the first designated public address of the first user is generated by applying a hash algorithm to a public key associated with the first user.

In embodiments, the fiat-backed digital assets are backed by a plurality asset comprising at least: (a) a fourth amount of a first type of fiat maintained by a custodian; and (b) a fifth amount of a second type of fiat maintained by the custodian.

In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and Euro.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

In embodiments, a method of depositing an amount of fiat-backed digital asset in exchange for fiat, wherein the method comprises the steps of: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic deposit request comprising the steps of: (1) receiving, by the digital asset exchange computer system from the first user device, a first electronic request to deposit a first amount of fiat-backed digital assets, wherein the fiat-backed digital assets are tied to a distributed transaction ledger which is maintained on a peer-to-peer network that includes a plurality of geographically distributed computer systems; (2) in response to the first electronic request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user and from the distributed transaction ledger, first fiat-backed digital asset account balance information of the first user indicating a second amount of fiat-backed digital assets available for the first user; (3) obtaining, by the digital asset exchange computer system, a destination address; (4) generating, by the digital asset exchange computer system, second graphical user interface information including at least the first fiat account balance information, the first fiat-backed digital asset account information and the destination address; (5) transmitting, by the digital asset exchange computer system to the first user device, the second graphical user interface information; and (6) receiving, by the digital asset exchange computer system from the first user device, a second electronic deposit request comprising at least: (A the first amount of fiat-backed digital assets to be deposited; and (B) a first designated public address of the first user on the distributed transaction ledger from which the first amount of fiat-backed digital assets will be transferred; and (C) a digital signature based on a first designated private key of the first user, wherein the first designated private key is associated with the first designated public address; and (c) processing, by the digital asset exchange computer system, the second electronic deposit request by the steps of: (1) calculating, by the digital asset exchange computer system, a second amount of fiat based on the first amount of fiat-backed digital assets, wherein the second amount of fiat is determined using an exchange rate of fiat-backed digital assets to fiat; (2) comparing, by the digital asset exchange computer system, the first amount of fiat-backed digital assets to the second amount of fiat-backed digital assets available of the first user to determine that the first amount of fiat-backed digital assets is less than or equal to the second amount of fiat-backed digital assets; (3) determining, by the digital asset exchange computer system, a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the third amount of fiat is the updated amount of available fiat of the first user; (5) generating, by the digital asset exchange computer system, a first transaction request for the peer-to-peer network, from a first digital asset exchange public key address on the peer-to-peer network, which is associated with a first digital asset exchange private key, which is stored in the computer readable member accessible by the digital asset exchange computer system, to a first contract address associated with a fiat-backed digital asset issuer, a first message including: i. a request to obtain from the first designated public address of the first user the first amount of fiat-backed digital assets and provide them to the user specific destination address; and ii. a request to store the first amount of fiat-backed digital assets at the destination address, wherein the first transaction request is signed with a digital signature generated based on the digital asset exchange private key of the digital asset exchange; (6) transmitting, by the digital asset exchange computer system to the peer-to-peer network, via the Internet, the first transaction request; and (7) confirming, by the digital asset exchange computer system based on reference to the distributed transaction ledger, that the first amount of fiat-backed digital assets are not present at the first designated public address of the first user.

In embodiments, the determining step (a)(2) further determines that the first user is a registered user of the digital asset exchange.

In embodiments, the digital asset exchange is licensed by a government regulatory authority.

In embodiments, the peer-to-peer network is the Ethereum Network.

In embodiments, the peer-to-peer network is the Neo Network.

In embodiments, the peer-to-peer network is the Stellar Network.

In embodiments, the peer-to-peer network is the Libra Network.

In embodiments, the exchange rate is one fiat-backed digital asset is equal to one U.S. dollar.

In embodiments, exchange rate is one hundred fiat-backed digital assets is equal to one U.S. dollar.

In embodiments, the first designated public address of the first user is generated by applying a hash algorithm to a public key associated with the first user.

In embodiments, the fiat-backed digital assets are backed by a plurality of assets comprising at least: (a) a fourth amount of a first type of fiat maintained by a custodian; and (b) a fifth amount of a second type of fiat maintained by the custodian. In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and (c) Euro. In embodiments, the first type of fiat and the second type of fiat are the same.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A method comprising:
   (a) providing, by a non-fungible token platform, a first designated key pair comprising a first designated public key and a corresponding first designated private key,
      wherein the non-fungible token platform comprises one or more computer systems operatively connected to one or more memory devices,
      wherein the first designated private key is stored on the one or more memory devices,
      wherein the non-fungible token platform is associated with the first designated key pair comprising the first designated public key and the first designated private key,
      wherein the first designated public key corresponds to a first designated public address associated with an underlying digital asset, and
      wherein the underlying digital asset is maintained on a distributed public transaction ledger maintained in the form of a blockchain by a plurality of geographically distributed computer systems in a peer-to-peer network;
   (b) authenticating, by the non-fungible token platform, a first user associated with a first user device by performing the following steps:
      (i) receiving, by the non-fungible token platform from the first user device, a user login request comprising user login credential information associated with the first user associated with the first user device;
      (ii) obtaining, by the non-fungible token platform, verified credential information associated with the first user; and
      (iii) verifying, by the non-fungible token platform, that the user login credential information is associated with a registered user account based at least on the received user login credential information and the verified credential information associated with the first user;
   (c) receiving a first order to purchase an amount of a first non-fungible token, wherein receiving the first order comprises the following:
      (i) receiving, by the non-fungible token platform from the first user device, the first order, wherein the first order comprises:
         (1) an identifier associated with the first non-fungible token, the identifier indicating a first type of non-fungible token;
         (2) the amount of the first non-fungible token;
         (3) a first retail price of the first non-fungible token; and
         (4) user destination information associated with the first user,
         wherein the user destination information comprises a first user public address associated with the underlying digital asset,
         wherein the first user public address is associated with the first user, and
         wherein the user destination information is stored on the one or more memory devices;
      (ii) obtaining, by the non-fungible token platform, a first smart contract address associated with a first smart contract,
         wherein the first smart contract is associated with first smart contract instructions that are saved as part of the blockchain and include:
            (1) printing instructions indicating conditions under which the first non-fungible token is created;
            (2) modification instructions indicating conditions under which the first non-fungible token is modified; and
            (3) transfer instructions indicating conditions under which the first non-fungible token is transferred;
      (iii) receiving, by the non-fungible token platform, a first payment of the first retail price from the first user; and
      (iv) verifying, by the non-fungible token platform, the first order by verifying:
         (1) the identifier associated with the first non-fungible token;
         (2) the type of non-fungible token;
         (3) the amount of the first non-fungible token;
         (4) the first retail price of the first non-fungible token; and
         (5) the user destination information associated with the first user;
   (d) obtaining, by the non-fungible token platform at the first designated public address, at least a second amount of the underlying digital asset,
      wherein the second amount of the underlying digital asset corresponds to a first manufacturer's price indicating a cost of creating the amount of the first non-fungible token;
   (e) obtaining, by the non-fungible token platform at the first designated public address, the amount of the first non-fungible token, wherein obtaining the amount of the first non-fungible token comprises the following steps:
      (i) generating, by the non-fungible token platform, a first message from the first designated public address to the first smart contract address, comprising:
         (1) transfer instructions including a first transfer of the second amount of the underlying digital asset from the first designated public address to the first smart contract address; and
         (2) first generation instructions to generate the amount of the first non-fungible token to the first designated public address
         wherein the first message includes a first digital signature based at least on the first designated private key; and
      (ii) publishing, by the non-fungible token platform to the blockchain via the Internet, the first message,
      wherein, upon receipt of the first message, the first smart contract executes the transfer instructions in accordance with the first smart contract instructions and the first generation instructions in accordance with the first smart contract instructions to generate the amount of the first non-fungible token to the first designated public address;
   (f) transferring, by the non-fungible token platform from the first designated public address to the first user public address, the amount of the first non-fungible token, wherein transferring the amount comprises the following steps:
      (i) generating, by the non-fungible token platform, a first transaction request including a second transfer of the amount of the first non-fungible token from the first designated public address to the first user public address, wherein the first transaction request includes a second digital signature based at least on the first designated private key;

(ii) publishing, by the non-fungible token platform via the blockchain, the first transaction request to the plurality of geographically distributed computer systems, wherein the first transaction request is executed by the plurality of geographically distributed computer systems, and wherein the execution of the first transaction request results in the amount of the first non-fungible token being transferred from the first designated public address to the first user public address; and (iii) confirming, by the non-fungible token platform, that the amount of the first non-fungible token is present at the first user public address based on reference to the blockchain.

2. The method of claim 1, wherein receiving the first payment comprises:

(1) generating, by the non-fungible token platform, first machine-readable instructions including a first graphical user interface comprising a first prompt requesting payment information from the first user;

(2) sending, by the non-fungible token platform to the first user device, the first machine-readable instructions, wherein, upon receipt of the first machine-readable instructions, the first user device executes the first machine-readable instructions causing the first user device to display the first graphical user interface; and (3) receiving, by the non-fungible token platform from the first user device, user payment information associated with the first user, wherein the user payment information is stored on the one or more memory devices, and wherein the first payment is received by the non-fungible token platform using the user payment information.

3. The method of claim 2, wherein the user payment information comprises:

(A) a credit card number associated with the first user; and
(B) a billing address associated with the first user.

4. The method of claim 2, wherein the user payment information comprises a bank account number associated with the first user.

5. The method of claim 2, wherein the user payment information comprises automated clearing house payment information associated with the first user.

6. The method of claim 2, wherein the user payment information comprises a second user public address associated with the first user.

7. The method of claim 6, wherein the second user public address is the first user public address.

8. The method of claim 1, wherein receiving the first payment comprises:

(1) providing a user payment database operatively connected to the non-fungible token platform, wherein the user payment database comprises:

(A) user payment information associated with the first user;

(2) accessing, by the non-fungible token platform, the user payment database; and (3) retrieving, by the non-fungible token platform from the user payment database, the user payment information.

9. The method of claim 1, wherein obtaining the second amount of the underlying digital asset comprises:

(i) generating, by the non-fungible token platform, a second transaction request including:

(1) a third transfer of a third amount of digital asset from a public address associated with the non-fungible token platform and the underlying digital asset to a second public address associated with the underlying digital asset; and (2) a fourth transfer of the second amount of the underlying digital asset from the second public address to the public address associated with the non-fungible token platform, wherein the second transaction request includes a third digital signature based at least on the first designated private key;

(ii) publishing, by the non-fungible token platform via the blockchain, the second transaction request to the plurality of geographically distributed computer systems, wherein the second transaction request is executed by the plurality of geographically distributed computer systems, and wherein the execution of the second transaction request results in the third transfer being executed and the fourth transfer being executed; and (iii) receiving, by the non-fungible token platform at the public address associated with the non-fungible token platform, the second amount of the underlying digital asset.

10. The method of claim 9, wherein obtaining the second amount of the underlying digital asset further comprises:

(i) generating, by the non-fungible token platform, a fourth third transaction request including:

(1) a fifth transfer of the third amount of digital asset from the public address associated with the non-fungible token platform to the first designated public address, wherein the third transaction request includes a fourth digital signature based at least on the first designated private key;

(ii) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the fifth transfer being executed; and (iii) receiving, by the non-fungible token platform at the first designated public address, the second amount of the underlying digital asset.

11. The method of claim 9, wherein the public address associated with the non-fungible token platform is the first designated public address.

12. The method of claim 1, wherein obtaining the second amount of the underlying digital asset comprises:

(i) generating, by the non-fungible token platform, a second transaction request including:

(1) a third transfer of a third amount of digital asset from the first designated public address to a second public address associated with the underlying digital asset; and (2) a fourth transfer of the second amount of the underlying digital asset from the second public address to the first designated public address, wherein the second transaction request includes a third digital signature based at least on the first designated private key;
(ii) publishing, by the non-fungible token platform via the blockchain, the second transaction request to the plurality of geographically distributed computer systems,
wherein the second transaction request is executed by the plurality of geographically distributed computer systems, and
wherein the execution of the second transaction request results in the third transfer being executed and the fourth transfer being executed; and
(iii) receiving, by the non-fungible token platform at the first designated public address, the second amount of the underlying digital asset.

13. The method of claim 1, wherein receiving the first order further comprises:
(iv) generating, by the non-fungible token platform, a second transaction request including a request to generate a public address,
wherein the second transaction request includes a third digital signature based at least on the first designated private key;
(v) publishing, by the non-fungible token platform via the blockchain, the second transaction request to the plurality of geographically distributed computer systems,
wherein the second transaction request is executed by the plurality of geographically distributed computer systems, and
wherein the execution of the second transaction request results in the first user public address being returned to the first designated public address,
wherein, the execution of the second transaction request results in a second key pair being returned to the first designated public address,
wherein the second key pair comprises a first user public key and a corresponding first user private key,
wherein the first user private key is stored on the one or more memory devices, and
wherein the first user public key corresponds to the first user public address; and
(vi) sending, by the non-fungible token platform to the first user device, the first user public address and the first user public key.

14. The method of claim 13, wherein receiving the first order further comprises sending the first user private key, by the non-fungible token platform, to the first user device.

15. The method of claim 1, wherein receiving the first order further comprises:
(iv) receiving, by the non-fungible token platform from the first user device, the first user public address; and
(v) storing, by the non-fungible token platform using the one or more memory devices, the first user public address.

16. The method of claim 1, wherein receiving the first order further comprises:
(1) providing a user destination database operatively connected to the non-fungible token platform, wherein the user payment database comprises:
(A) the first user public address;
(2) accessing, by the non-fungible token platform, the user destination database; and
(3) retrieving, by the non-fungible token platform from the user destination database, the first user public address.

17. The method of claim 1, wherein the first smart contract instructions further include:

(4) combination instructions indicating conditions under which two or more of the first non-fungible token are combined to generate a new one of the first non-fungible token.

18. The method of claim 1, wherein the first retail price is a price of one of the first non-fungible token.

19. The method of claim 1, wherein the first retail price is a price of the amount of the first non-fungible token.

20. The method of claim 1, wherein the user login credential information comprises:
(i) a username associated with the first user; and
(ii) a password associated with the first user.

21. The method of claim 1, wherein the user login credential information comprises:
(i) biometric data associated with the first user.

22. The method of claim 1, wherein the user login credential information comprises:
(i) a phone number associated with the first user.

23. The method of claim 1, wherein the user login credential information comprises:
(i) a social security number associated with the first user.

24. The method of claim 1, wherein the user login credential information comprises:
(i) an e-mail address associated with the first user.

25. The method of claim 1, wherein the first digital signature and the second digital signature are the same.

26. The method of claim 1, wherein the first digital signature and the second digital signature are different.

27. The method of claim 1, wherein the first message includes a fee that is transferred from a public address associated with the non-fungible token platform to at least one miner of the blockchain.

28. The method of claim 1, wherein the first transaction request includes a fee that is transferred from a public address associated with the non-fungible token platform to at least one miner of the blockchain.

29. The method of claim 1, wherein the first non-fungible token is cryptokitty.

30. The method of claim 1, wherein the first non-fungible token is everdragon.

31. The method of claim 1, wherein the first non-fungible token is crypto baseball.

32. The method of claim 1, wherein the first non-fungible token is mycryptoheroes.

33. The method of claim 1, wherein the first non-fungible token is marblecard.

34. A method comprising:
(a) providing, by a non-fungible token platform, a first designated key pair comprising a first designated public key and a corresponding first designated private key,
wherein the non-fungible token platform comprises one or more computer systems operatively connected to one or more memory devices,
the first designated private key is stored on the one or more memory devices,
the non-fungible token platform is associated with the first designated key pair comprising the first designated public key and the first designated private key,
the first designated public key corresponds to a first designated public address associated with an underlying digital asset, and
the underlying digital asset is maintained on a distributed public transaction ledger maintained in the form of a blockchain by a plurality of geographically distributed computer systems in a peer-to-peer network;

(b) authenticating, by the non-fungible token platform, a first user associated with a first user device by performing the following steps:
  (i) receiving, by the non-fungible token platform from the first user device, a user login request comprising user login credential information associated with the first user associated with the first user device;
  (ii) obtaining, by the non-fungible token platform, verified credential information associated with the first user; and
  (iii) verifying, by the non-fungible token platform, that the user login credential information is associated with a registered user account based at least on the received user login credential information and the verified credential information associated with the first user;
(c) receiving a first order to purchase an amount of a first non-fungible token, receiving the first order comprising the following:
  (i) receiving, by the non-fungible token platform from the first user device, the first order, the first order comprising:
    (1) an identifier associated with the first non-fungible token, the identifier indicating a first type of non-fungible token; and
    (2) user destination information associated with the first user,
    the user destination information comprising an address
    associated with the first user;
  (ii) obtaining, by the non-fungible token platform, a first smart contract address associated with a first smart contract,
  the first smart contract being associated with first smart contract instructions that are saved as part of the blockchain and including:
    (1) printing instructions indicating conditions under which the first non-fungible token is created; and
    (2) transfer instructions indicating conditions under which the first non-fungible token is transferred;
  (iii) receiving, by the non-fungible token platform, a first payment from the first user; and
  (iv) verifying, by the non-fungible token platform, the first order by verifying:
    (1) the identifier associated with the first non-fungible token;
    (2) the type of non-fungible token; and
    (3) the user destination information associated with the first user;
(d) obtaining, by the non-fungible token platform at least a second amount of a first digital asset;
(e) obtaining, by the non-fungible token platform, the amount of the first non-fungible token, the obtaining the amount of the first non-fungible token comprising the following steps:
  (i) generating, by the non-fungible token platform, a first message to the first smart contract address, comprising:
    (1) transfer instructions including a first transfer of the second amount of the first digital asset to the first smart contract address; and
    (2) first generation instructions to generate the amount of the first non-fungible token
    the first message including a first digital signature based at least on the first designated private key; and
  (ii) publishing, by the non-fungible token platform to the blockchain via the Internet, the first message,
  the first smart contract, upon receipt of the first message, executing the transfer instructions in accordance with the first smart contract instructions and the first generation instructions in accordance with the first smart contract instructions to generate the amount of the first non-fungible token;
(f) transferring, by the non-fungible token platform, the amount of the first non-fungible token, the transferring the amount comprising the following steps:
  (i) generating, by the non-fungible token platform, a first transaction request including a second transfer of the amount of the first non-fungible token,
  the first transaction request including a second digital signature based at least on the first designated private key;
  (ii) publishing, by the non-fungible token platform via the blockchain, the first transaction request to the plurality of geographically distributed computer systems,
  the first transaction request being executed by the plurality of geographically distributed computer systems, and
  the execution of the first transaction request resulting in the amount of the first non-fungible token being transferred to the address associated with the first user; and
  (iii) confirming, by the non-fungible token platform, that the amount of the first non-fungible token is present at the address associated with the first user based on reference to the blockchain.

35. The method of claim 34, wherein receiving the first payment comprises:
  (1) generating, by the non-fungible token platform, first machine-readable instructions including a first graphical user interface comprising a first prompt requesting payment information from the first user;
  (2) sending, by the non-fungible token platform to the first user device, the first machine-readable instructions,
  the first user device, upon receipt of the first machine-readable instructions, executing the first machine-readable instructions causing the first user device to display the first graphical user interface; and
  (3) receiving, by the non-fungible token platform from the first user device, user payment information associated with the first user,
  the user payment information being stored on the one or more memory devices, and
  the first payment being received by the non-fungible token platform using the user payment information.

36. The method of claim 35, wherein the user payment information comprises:
  (A) a credit card number associated with the first user; and
  (B) a billing address associated with the first user.

37. The method of claim 35, wherein the user payment information comprises a bank account number associated with the first user.

38. The method of claim 35, wherein the user payment information comprises automated clearing house payment information associated with the first user.

39. The method of claim 35, wherein the user payment information comprises a second address associated with the first user.

40. The method of claim 39, wherein the address associated with first user is a first user public address and the second address is the first user public address.

41. The method of claim 34, wherein receiving the first payment comprises:
(1) providing a user payment database operatively connected to the non-fungible token platform, the user payment database comprising:
(A) user payment information associated with the first user;
(2) accessing, by the non-fungible token platform, the user payment database; and
(3) retrieving, by the non-fungible token platform from the user payment database, the user payment information.

42. The method of claim 34, wherein obtaining the second amount of the first digital asset comprises:
(i) generating, by the non-fungible token platform, a second transaction request including:
(1) a third transfer of a third amount of a second digital asset from a public address associated with the non-fungible token platform and the underlying digital asset to a second public address associated with the underlying digital asset; and
(2) a fourth transfer of the second amount of the first digital asset from the second public address to the public address associated with the non-fungible token platform,
the second transaction request including a third digital signature based at least on the first designated private key;
(ii) publishing, by the non-fungible token platform via the blockchain, the second transaction request to the plurality of geographically distributed computer systems,
the second transaction request being executed by the plurality of geographically distributed computer systems, and
the execution of the second transaction request resulting in the third transfer being executed and the fourth transfer being executed; and
(iii) receiving, by the non-fungible token platform at the public address associated with the non-fungible token platform, the second amount of the first digital asset.

43. The method of claim 42, wherein obtaining the second amount of the first digital asset further comprises:
(i) generating, by the non-fungible token platform, a fourth third transaction request including:
(1) a fifth transfer of the third amount of the second digital asset from the public address associated with the non-fungible token platform to the first designated public address,
the third transaction request including a fourth digital signature based at least on the first designated private key;
(ii) publishing, by the non-fungible token platform via the blockchain, the third transaction request to the plurality of geographically distributed computer systems,
the third transaction request being executed by the plurality of geographically distributed computer systems, and
the execution of the third transaction request resulting in the fifth transfer being executed; and
(iii) receiving, by the non-fungible token platform at the first designated public address, the third amount of the first digital asset.

44. The method of claim 42, wherein the public address associated with the non-fungible token platform is the first designated public address.

45. The method of claim 34, wherein obtaining the second amount of the first digital asset comprises:
(i) generating, by the non-fungible token platform, a second transaction request including:
(1) a third transfer of a third amount of a second digital asset from the first designated public address to a second public address associated with the underlying digital asset; and
(2) a fourth transfer of the second amount of the first digital asset from the second public address to the first designated public address,
the second transaction request including a third digital signature based at least on the first designated private key;
(ii) publishing, by the non-fungible token platform via the blockchain, the second transaction request to the plurality of geographically distributed computer systems,
the second transaction request being executed by the plurality of geographically distributed computer systems, and
the execution of the second transaction request resulting in the third transfer being executed and the fourth transfer being executed; and
(iii) receiving, by the non-fungible token platform at the first designated public address, the second amount of the first digital asset.

46. The method of claim 34, wherein the address associated with the first user is a first user public address, the receiving the first order further comprising:
(iv) generating, by the non-fungible token platform, a second transaction request including a request to generate a public address,
the second transaction request includes a third digital signature based at least on the first designated private key;
(v) publishing, by the non-fungible token platform via the blockchain, the second transaction request to the plurality of geographically distributed computer systems,
the second transaction request being executed by the plurality of geographically distributed computer systems, and
the execution of the second transaction request resulting in the first user public address being returned to the first designated public address,
the execution of the second transaction request resulting in a second key pair being returned to the first designated public address,
the second key pair comprising a first user public key and a corresponding first user private key,
the first user private key being stored on the one or more memory devices, and
the first user public key corresponding to the first user public address; and
(vi) sending, by the non-fungible token platform to the first user device, the first user public address and the first user public key.

47. The method of claim 46, wherein receiving the first order further comprises sending the first user private key, by the non-fungible token platform, to the first user device.

48. The method of claim 34, wherein the address associated with the first user is a first user public address, the receiving the first order further comprising:
(iv) receiving, by the non-fungible token platform from the first user device, the first user public address; and
(v) storing, by the non-fungible token platform using the one or more memory devices, the first user public address.

49. The method of claim 34, wherein the address associated with the first user is a first user public address, the receiving the first order further comprising:
(1) providing a user destination database operatively connected to the non-fungible token platform, the user payment database comprising:
(A) the first user public address;
(2) accessing, by the non-fungible token platform, the user destination database; and
(3) retrieving, by the non-fungible token platform from the user destination database, the first user public address.

50. The method of claim 34, wherein the first smart contract instructions further include:
(4) combination instructions indicating conditions under which two or more of the first non-fungible token are combined to generate a new one of the first non-fungible token.

51. The method of claim 34, wherein the first order further comprises a first retail price of the first non-fungible token, the first retail price being a price of one of the first non-fungible token.

52. The method of claim 34, wherein the first order further comprises a first retail price of the first non-fungible token, the first retail price being a price of the amount of the first non-fungible token.

53. The method of claim 34, wherein the user login credential information comprises:
(i) a username associated with the first user; and
(ii) a password associated with the first user.

54. The method of claim 34, wherein the user login credential information comprises:
(i) biometric data associated with the first user.

55. The method of claim 34, wherein the user login credential information comprises:
(i) a phone number associated with the first user.

56. The method of claim 34, wherein the user login credential information comprises:
(i) a social security number associated with the first user.

57. The method of claim 34, wherein the user login credential information comprises:
(i) an e-mail address associated with the first user.

58. The method of claim 34, wherein the first digital signature and the second digital signature are the same.

59. The method of claim 34, wherein the first digital signature and the second digital signature are different.

60. The method of claim 34, wherein the first message includes a fee that is transferred from a public address associated with the non-fungible token platform to at least one miner of the blockchain.

61. The method of claim 34, wherein the first transaction request includes a fee that is transferred from a public address associated with the non-fungible token platform to at least one miner of the blockchain.

62. The method of claim 34, wherein the first non-fungible token is cryptokitty.

63. The method of claim 34, wherein the first non-fungible token is everdragon.

64. The method of claim 34, wherein the first non-fungible token is crypto baseball.

65. The method of claim 34, wherein the first non-fungible token is mycryptoheroes.

66. The method of claim 34, wherein the first non-fungible token is marblecard.

67. The method of claim 34, wherein the first digital asset is bitcoin.

68. The method of claim 34, wherein the first digital asset is ether.

69. The method of claim 34, wherein the first digital asset is litecoin.

70. The method of claim 34, wherein the first digital asset is bitcoin cash.

71. The method of claim 34, wherein the first digital asset is zcash.

72. The method of claim 34, wherein the first digital asset is in token form.

73. The method of claim 72, wherein the digital asset token is Gemini dollar.

\* \* \* \* \*